US011784704B2

(12) United States Patent
Murakami et al.

(10) Patent No.: US 11,784,704 B2
(45) Date of Patent: Oct. 10, 2023

(54) REPEATER DEVICE AND REPEATING METHOD

(71) Applicant: Panasonic Intellectual Property Corporation of America, Torrance, CA (US)

(72) Inventors: Yutaka Murakami, Kanagawa (JP); Nobuhiko Hashida, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/076,188

(22) Filed: Oct. 21, 2020

(65) Prior Publication Data

US 2021/0036761 A1 Feb. 4, 2021

Related U.S. Application Data

(63) Continuation of application No. PCT/JP2019/018459, filed on May 8, 2019.

(Continued)

(30) Foreign Application Priority Data

Sep. 6, 2018 (JP) ................................ 2018-167358

(51) Int. Cl.
*H04B 7/15* (2006.01)
*H04B 7/06* (2006.01)
(Continued)

(52) U.S. Cl.
CPC ............ *H04B 7/15* (2013.01); *H04B 7/0617* (2013.01); *H04B 7/086* (2013.01); *H04L 5/003* (2013.01); *H04W 28/14* (2013.01); *H04W 88/10* (2013.01)

(58) Field of Classification Search
CPC ........ H04W 88/04; H04B 7/0689; H04B 7/15
See application file for complete search history.

(56) References Cited

U.S. PATENT DOCUMENTS

| | | | | |
|---|---|---|---|---|
| 6,226,494 B1 * | 5/2001 | Lundstrom | ........ | H04B 7/18513 455/13.1 |
| 6,567,645 B1 * | 5/2003 | Wiedeman | ......... | H04B 7/18534 455/430 |

(Continued)

FOREIGN PATENT DOCUMENTS

| | | |
|---|---|---|
| JP | 2015-207149 | 11/2015 |
| WO | 2011/055536 | 5/2011 |
| WO | 2016/135947 | 9/2016 |

OTHER PUBLICATIONS

International Search Report (ISR) dated Jul. 30, 2019 in International (PCT) Application No. PCT/JP2019/018459.

(Continued)

*Primary Examiner* — Sulaiman Nooristany
(74) *Attorney, Agent, or Firm* — Wenderoth, Lind & Ponack, L.L.P.

(57) ABSTRACT

In a repeater device: a communication device receives position information of a forwarding source device and a forwarding destination device using a first communication scheme; based on the position information of the forwarding source device, a moving mechanism moves the repeater device to a position at which it is capable of communicating with the forwarding source device using a second communication scheme; the communication device receives data from the forwarding source device using the second communication scheme; a storage device stores the data; based on the position information of the forwarding destination device received by the communication device, the moving mechanism moves the repeater device to a position at which it is capable of communicating with the forwarding destination device using a second communication scheme; the communication device receives data from the forwarding source device using the second communication scheme; a storage device stores the data; based on the position information of the forwarding destination device received by the communication device, the moving mechanism moves the repeater device to a position at which it is capable of communicating with the forwarding desti- (Continued)

nation device using the second communication scheme, and the communication device transmits the data stored in the storage device to the forwarding destination device using the second communication scheme.

2 Claims, 166 Drawing Sheets

Related U.S. Application Data

(60) Provisional application No. 62/686,877, filed on Jun. 19, 2018, provisional application No. 62/679,414, filed on Jun. 1, 2018, provisional application No. 62/668,539, filed on May 8, 2018.

(51) Int. Cl.
*H04B 7/08* (2006.01)
*H04L 5/00* (2006.01)
*H04W 28/14* (2009.01)
*H04W 88/10* (2009.01)

(56) References Cited

U.S. PATENT DOCUMENTS

| | | | | |
|---|---|---|---|---|
| 2010/0165999 | A1* | 7/2010 | Tchepnda ............. | H04W 12/06 370/400 |
| 2012/0220239 | A1 | 8/2012 | Hosoya et al. | |
| 2017/0123415 | A1 | 5/2017 | Thörn | |
| 2017/0293297 | A1 | 10/2017 | Kim et al. | |
| 2017/0325051 | A1* | 11/2017 | Fujita .................... | H04W 52/02 |
| 2018/0049110 | A1 | 2/2018 | Hasegawa | |
| 2018/0139016 | A1* | 5/2018 | Moshfeghi ............ | H04W 24/08 |

OTHER PUBLICATIONS

Communication pursuant to Article 94(3) EPC dated Mar. 22, 2023 in corresponding European Patent Application No. 19799134.2.

* cited by examiner

EXAMPLE IN WHICH TWO TRANSCEIVERS ARE USED

REPEATER DEVICE AND REPEATING METHOD

CROSS REFERENCE TO RELATED APPLICATIONS

This application is a U.S. continuation application of PCT International Patent Application Number PCT/JP2019/018459 filed on May 8, 2019, claiming the benefit of priority of U.S. Provisional Patent Application No. 62/668,539 filed on May 8, 2018, U.S. Provisional Patent Application No. 62/679,414 filed on Jun. 1, 2018, U.S. Provisional Patent Application No. 62/686,877 filed on Jun. 19, 2018, and Japanese Patent Application Number 2018-167358 filed on Sep. 6, 2018 the entire contents of which are hereby incorporated by reference.

BACKGROUND

1. Technical Field

The present disclosure relates to a repeater device, a repeating method, a transmitting method, a transmitting device, a receiving method, and a receiving device.

2. Description of the Related Art

A conventional example of a communication method performed using a plurality of antennas is a communication method called multiple-input multiple-output (MIMO). In multi-antenna communication typified by MIMO, data reception quality and/or a data communication rate (per unit time) can be enhanced by modulating transmission data of a plurality of streams and simultaneously transmitting modulated signals from different antennas using the same frequency (common frequency).

Furthermore, in such multi-antenna communication, an antenna having a quasi-omni pattern which allows a transmitting device to have a substantially constant antenna gain in various directions in a space may be used when multicast/broadcast communication is performed. For example, WO2011/055536 discloses that a transmitting device transmits a modulated signal using an antenna having a quasi-omni pattern.

On the other hand, even if high transmission speeds were achieved in a wireless communication scheme, if a surrounding network is slow, a system for taking advantage of the high speeds needs to be constructed.

SUMMARY

There is a desire for further improvement in performance of the entire system and support for new forms of services when a communication method exemplified by a communication method that uses a plurality of antennas is used.

A transmitting device according to one aspect of the present disclosure includes a plurality of transmit antennas, and further includes: a signal processor configured to generate a first baseband signal by modulating data of a first stream and generate a second baseband signal by modulating data of a second stream; and a transmission unit configured to generate, from the first baseband signal, a plurality of first transmission signals having mutually different directivities, generate, from the second baseband signal, a plurality of second transmission signals having mutually different directivities, and transmit the plurality of first transmission signals and the plurality of second transmission signals at the same time. When a request for transmission of the first stream is received from a terminal, the transmission unit is further configured to generate, from the first baseband signal, a plurality of third transmission signals having mutually different directivities and being different from the plurality of first transmission signals, and transmit the plurality of third transmission signals.

According to the present disclosure, it possible to facilitate an improvement in performance of the communication system and support for new forms of services.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 112 illustrates an example of a configuration of a communication system;

FIG. 113 illustrates an example of a configuration of a communication device;

FIG. 114 illustrates one example of procedures in a first repeating process;

FIG. 115 illustrates an example of a configuration of a communication system;

FIG. 116 illustrates one example of procedures in a second repeating process;

FIG. 117 illustrates an example of a configuration of a communication system;

FIG. 118 illustrates one example of procedures in a third repeating process;

FIG. 119 illustrates an example of a configuration of a communication system;

FIG. 120 illustrates one example of procedures in a fourth repeating process;

FIG. 121 illustrates an example of a configuration of a communication system;

FIG. 122 illustrates an example of a configuration of a mobile device;

FIG. 123 illustrates one example of operations in a communication system;

Figure 124:
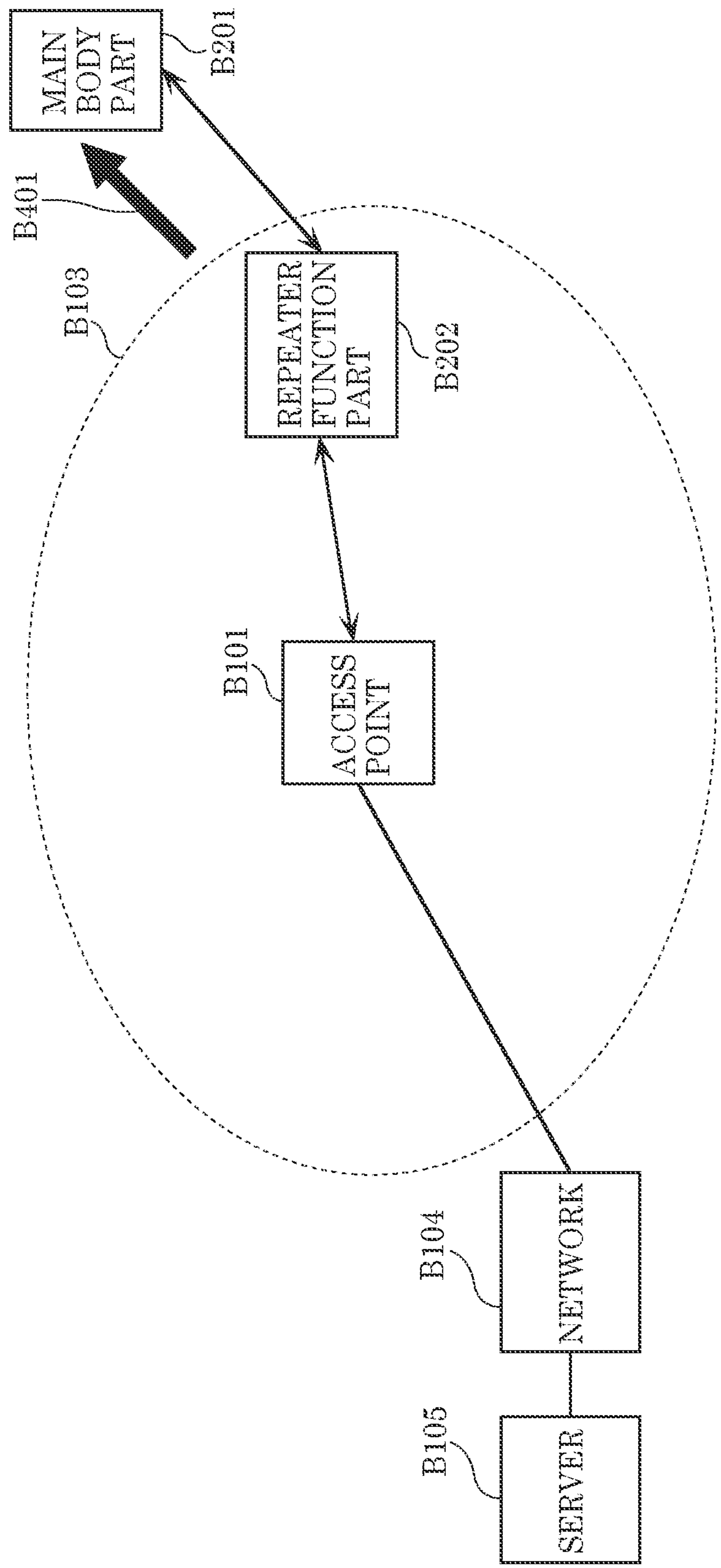
Figure 125:
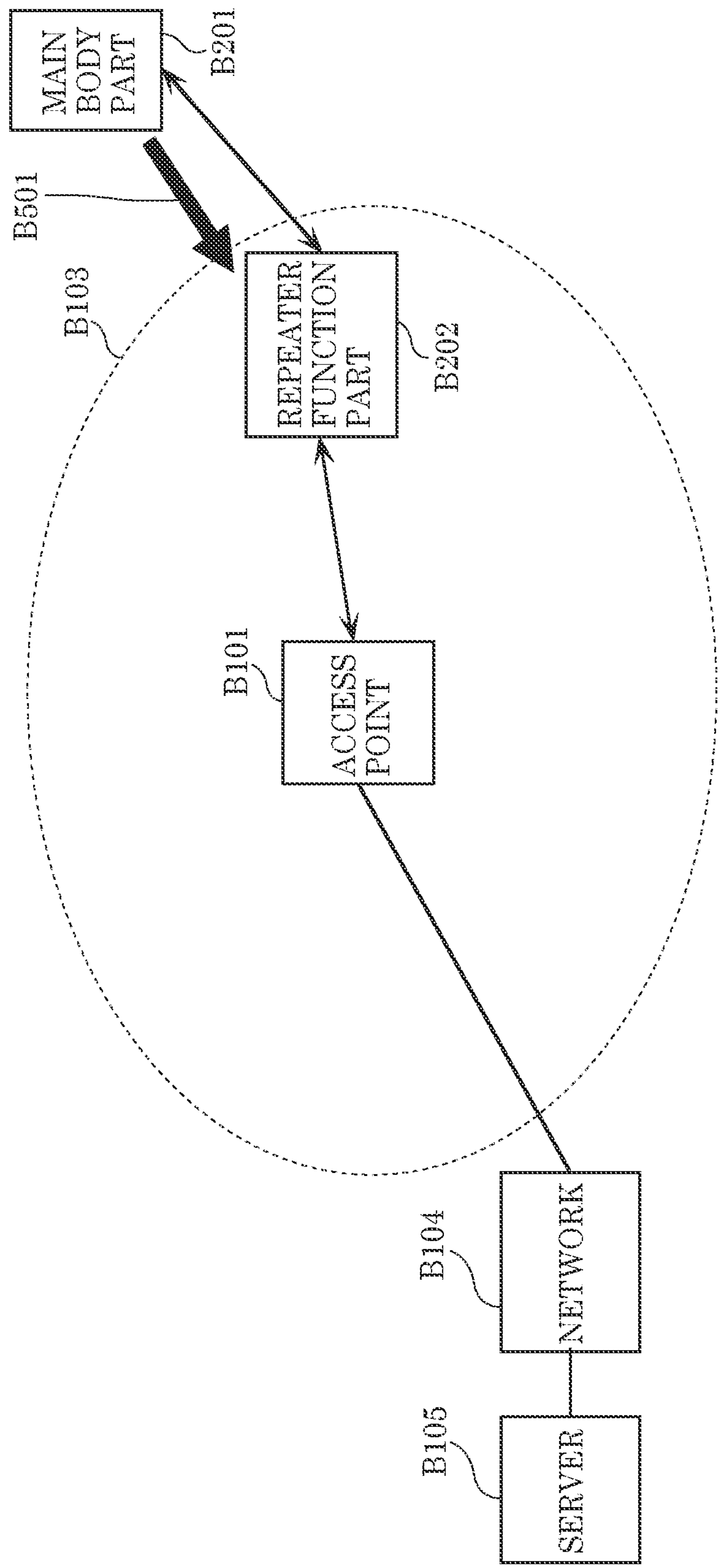
Figure 126:
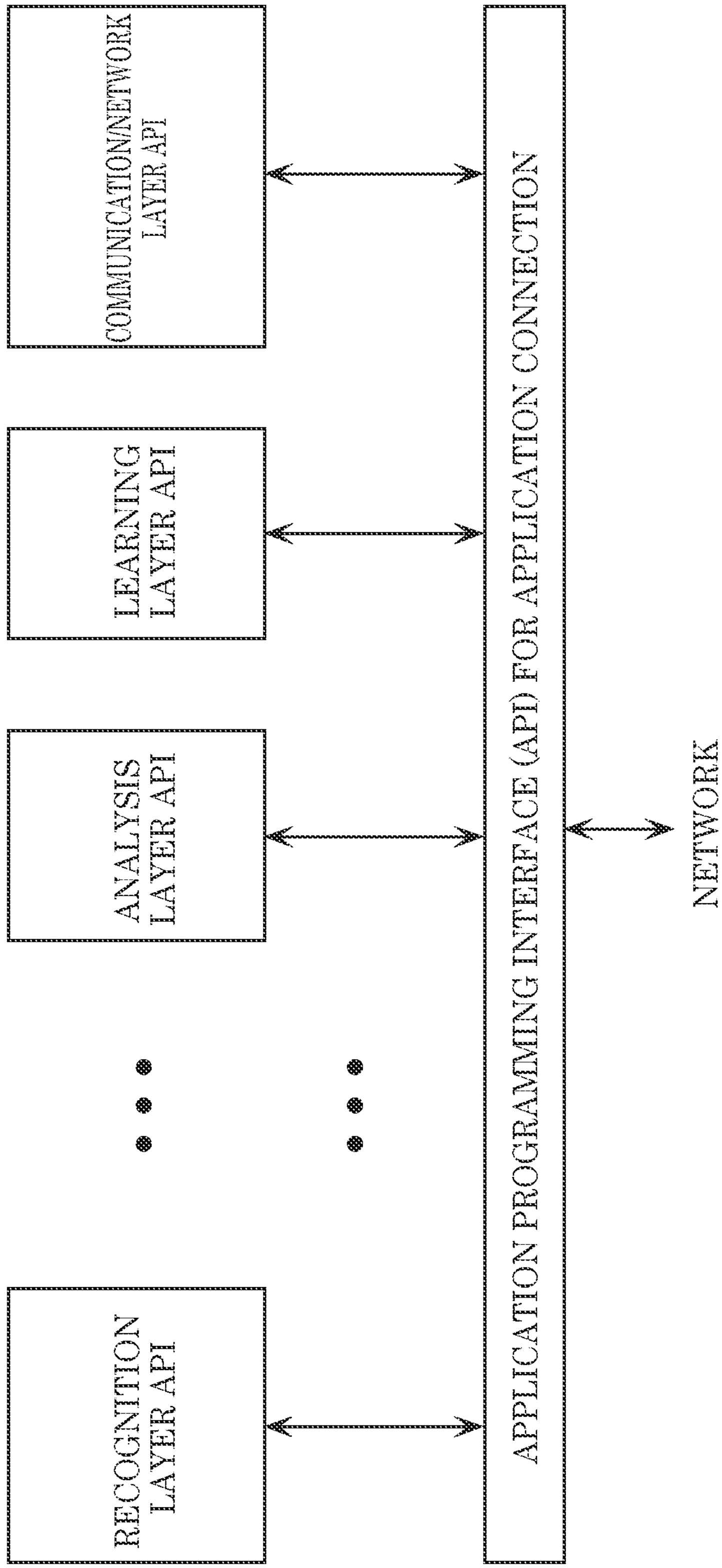
Figure 127:
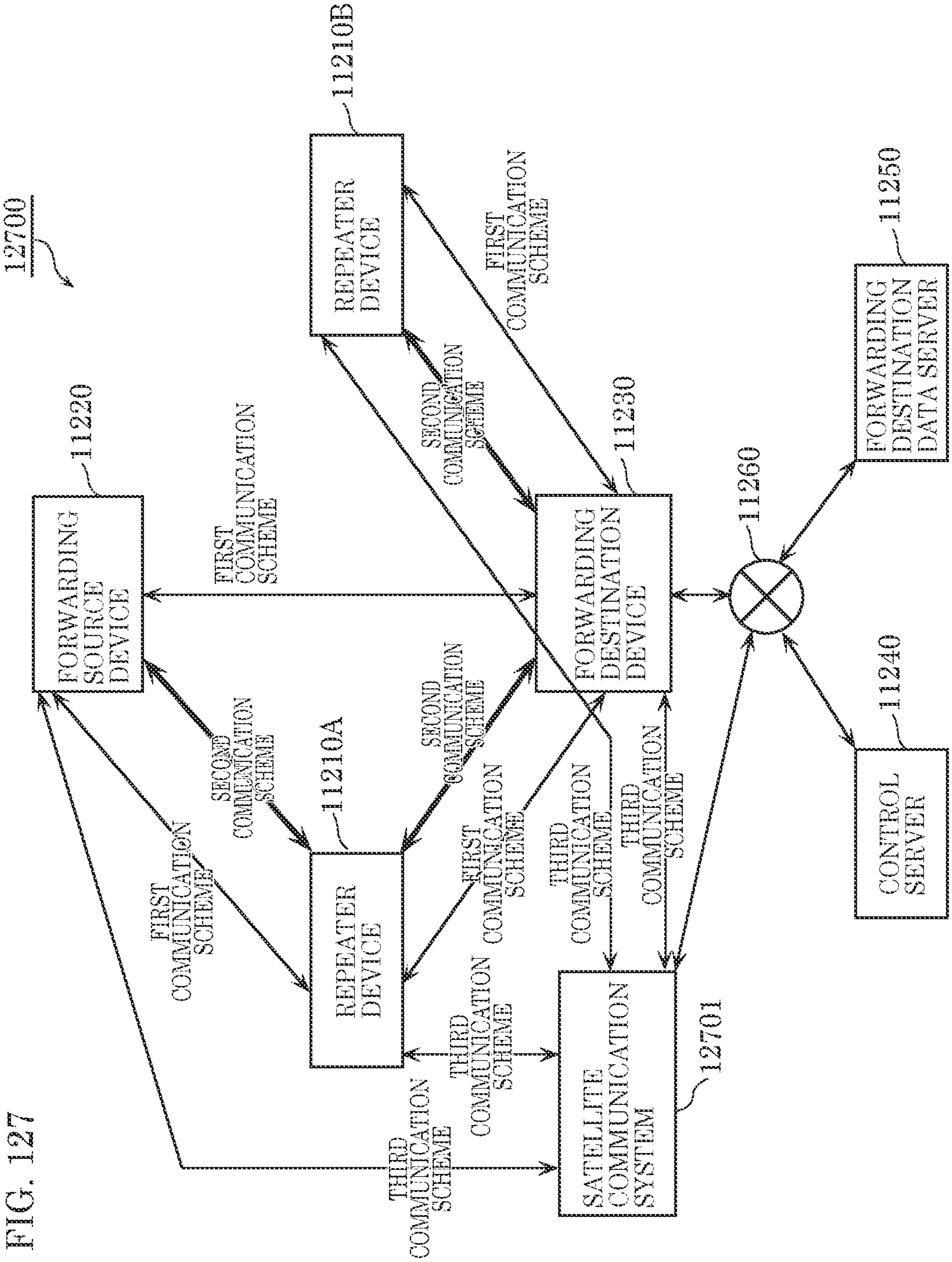
Figure 128:
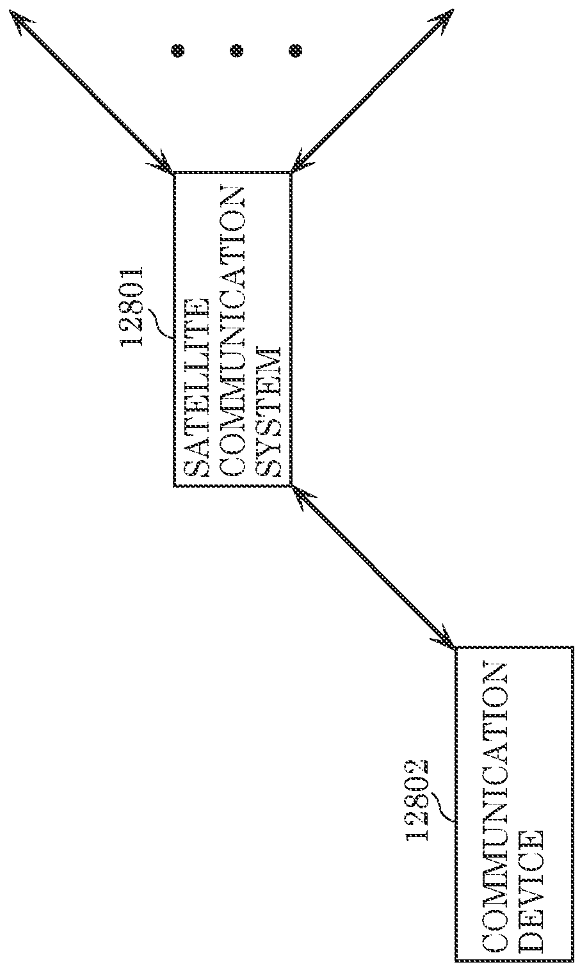
Figure 129:
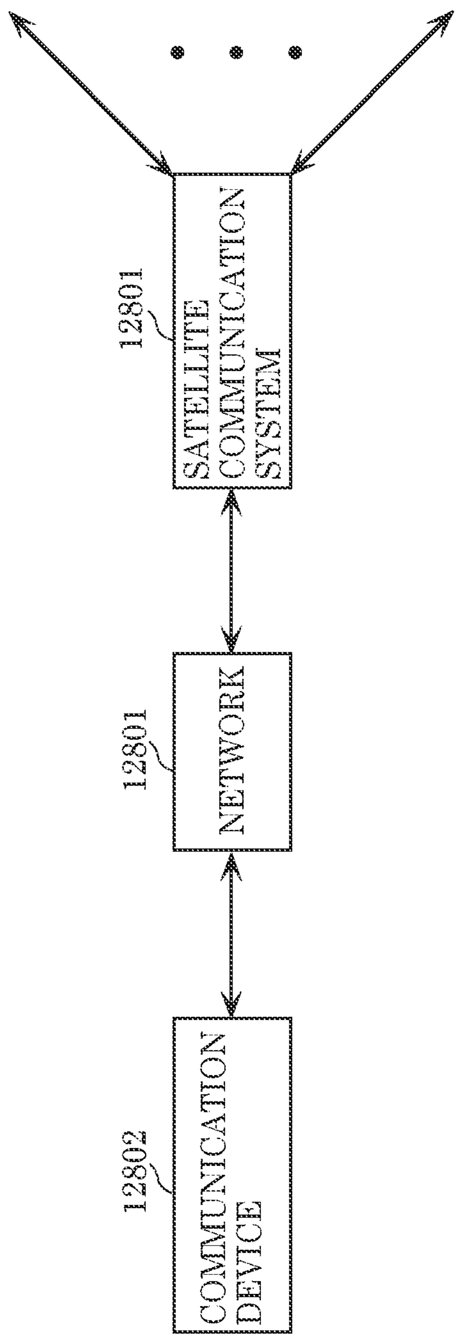
Figure 130:
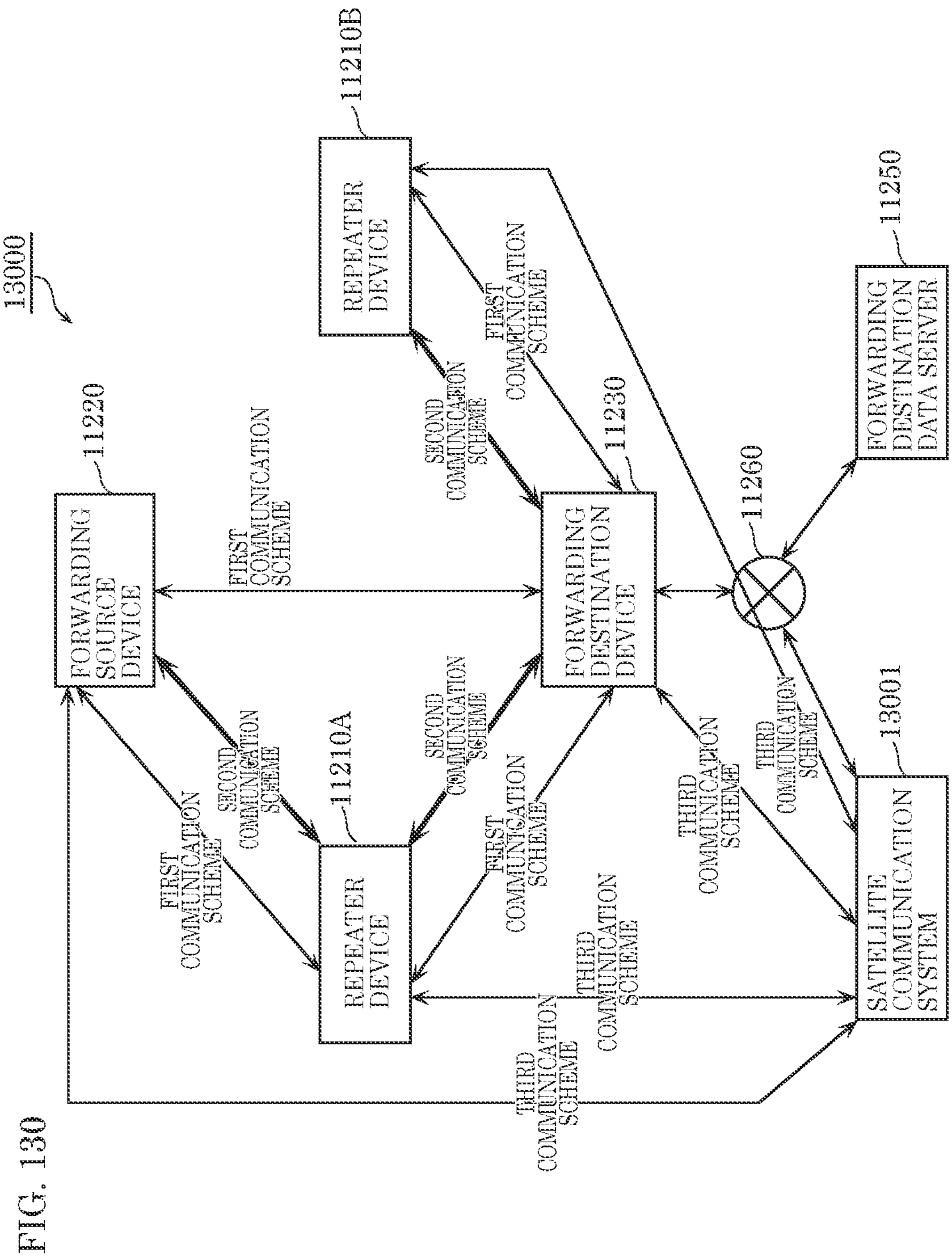
Figure 131:
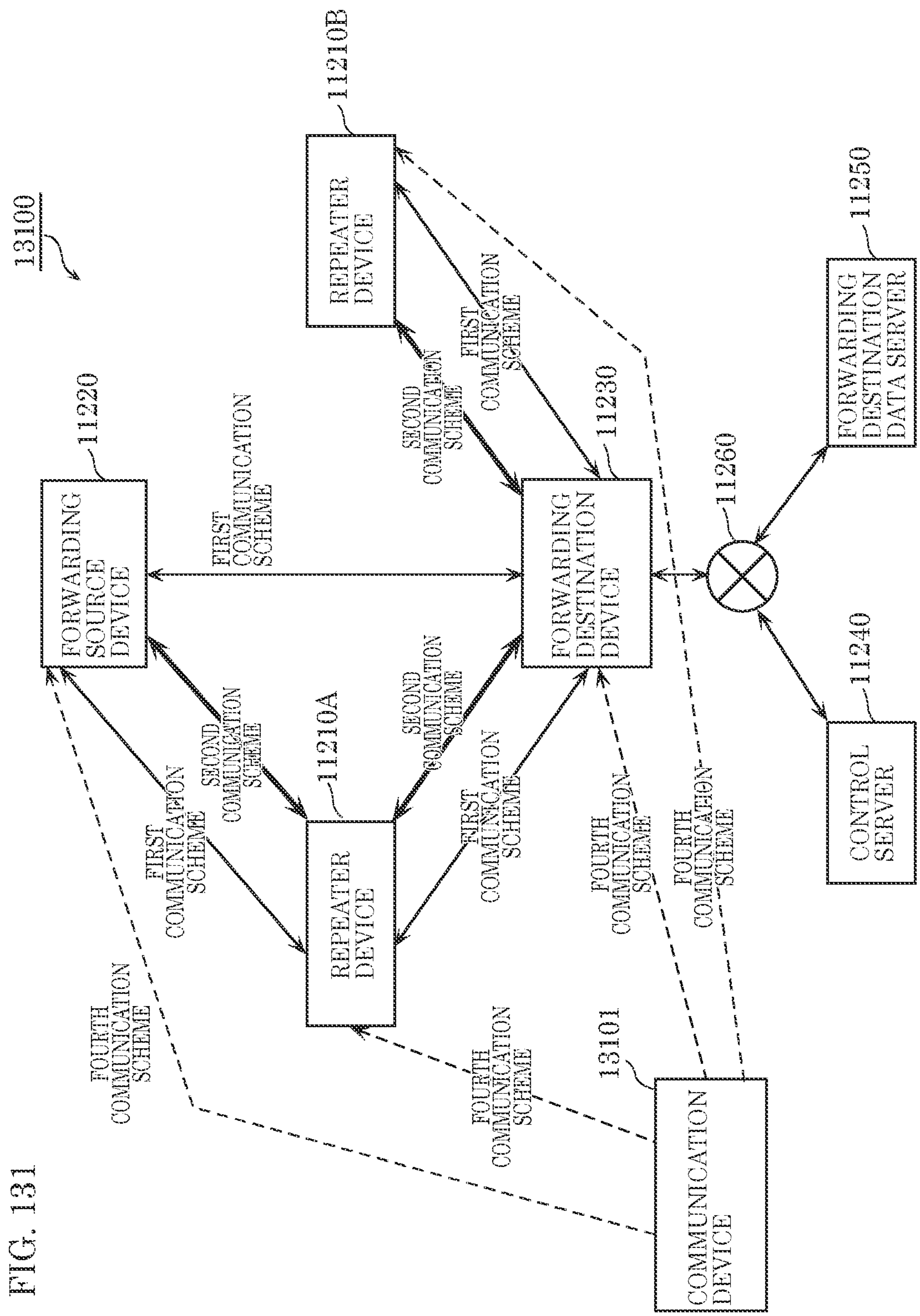
Figure 132:
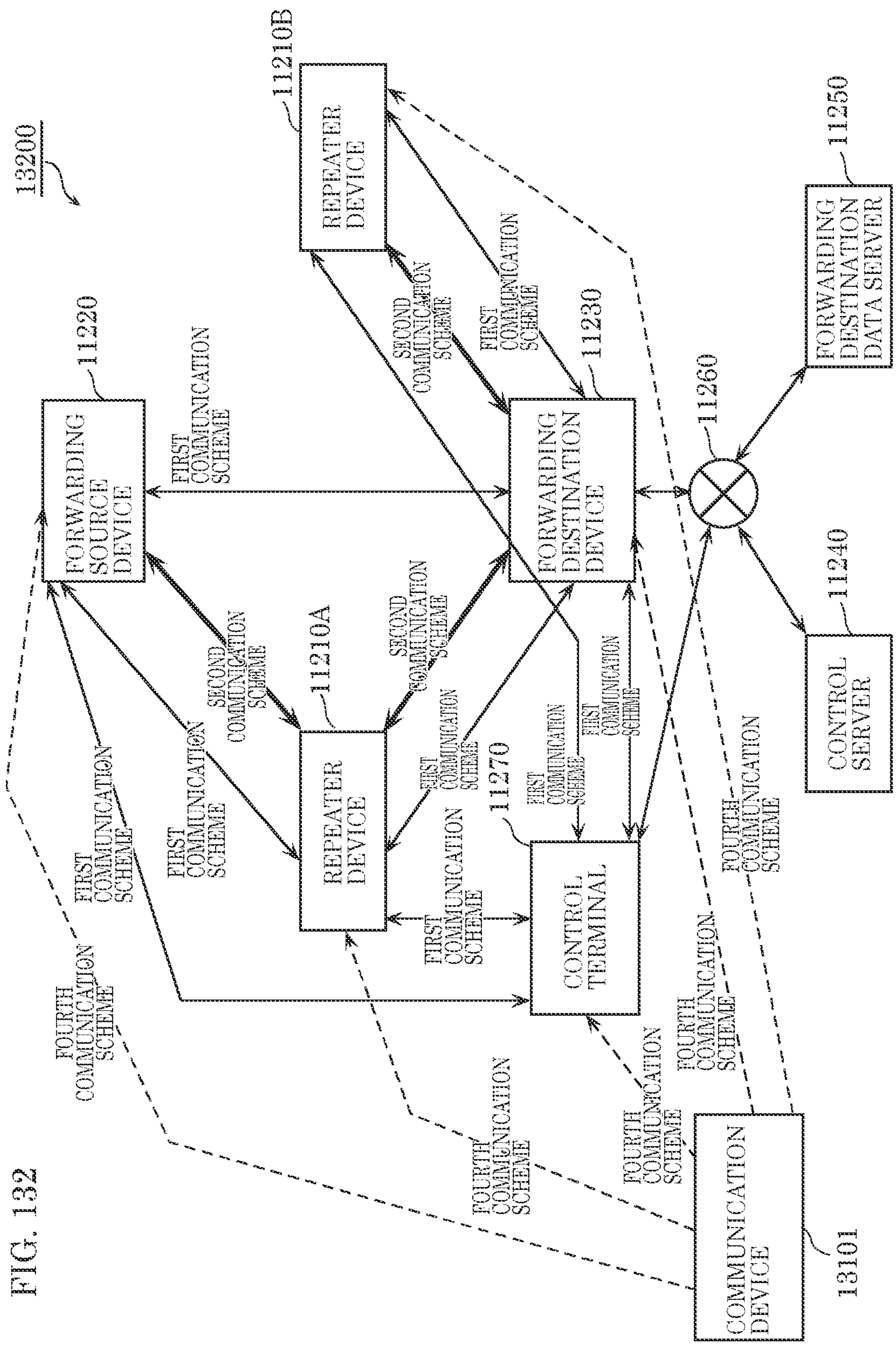
Figure 133:
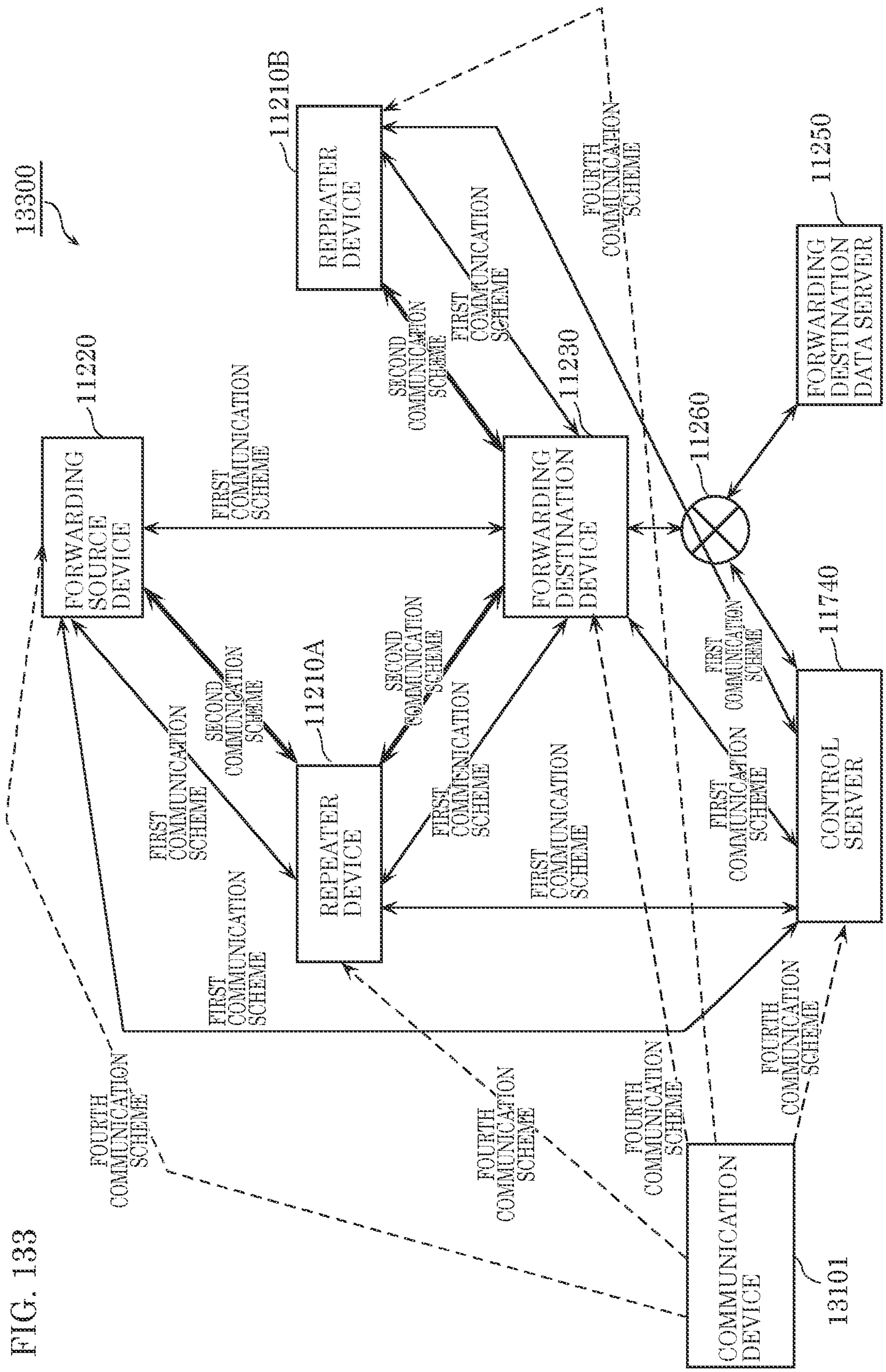
Figure 134:
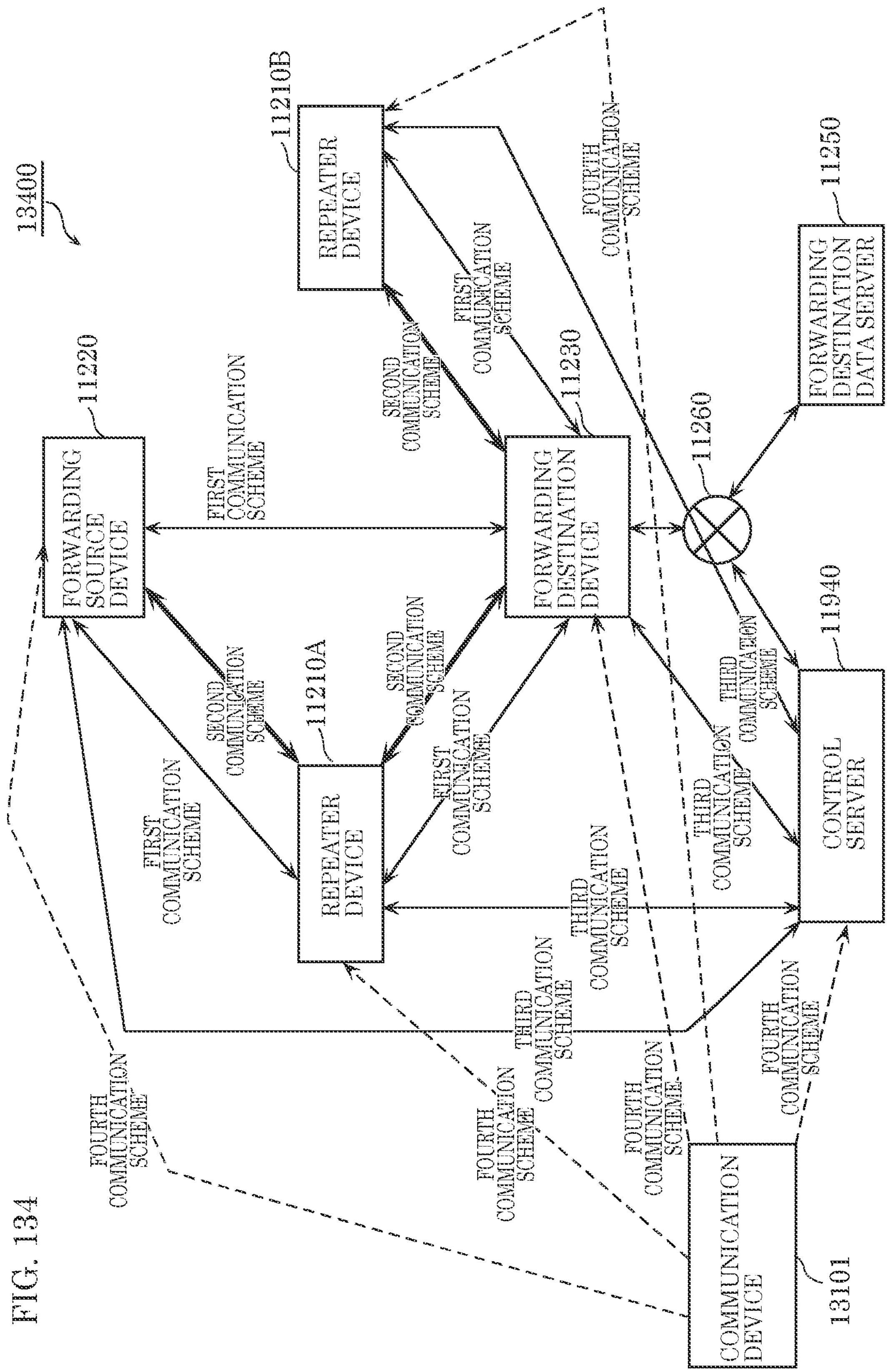
Figure 135:
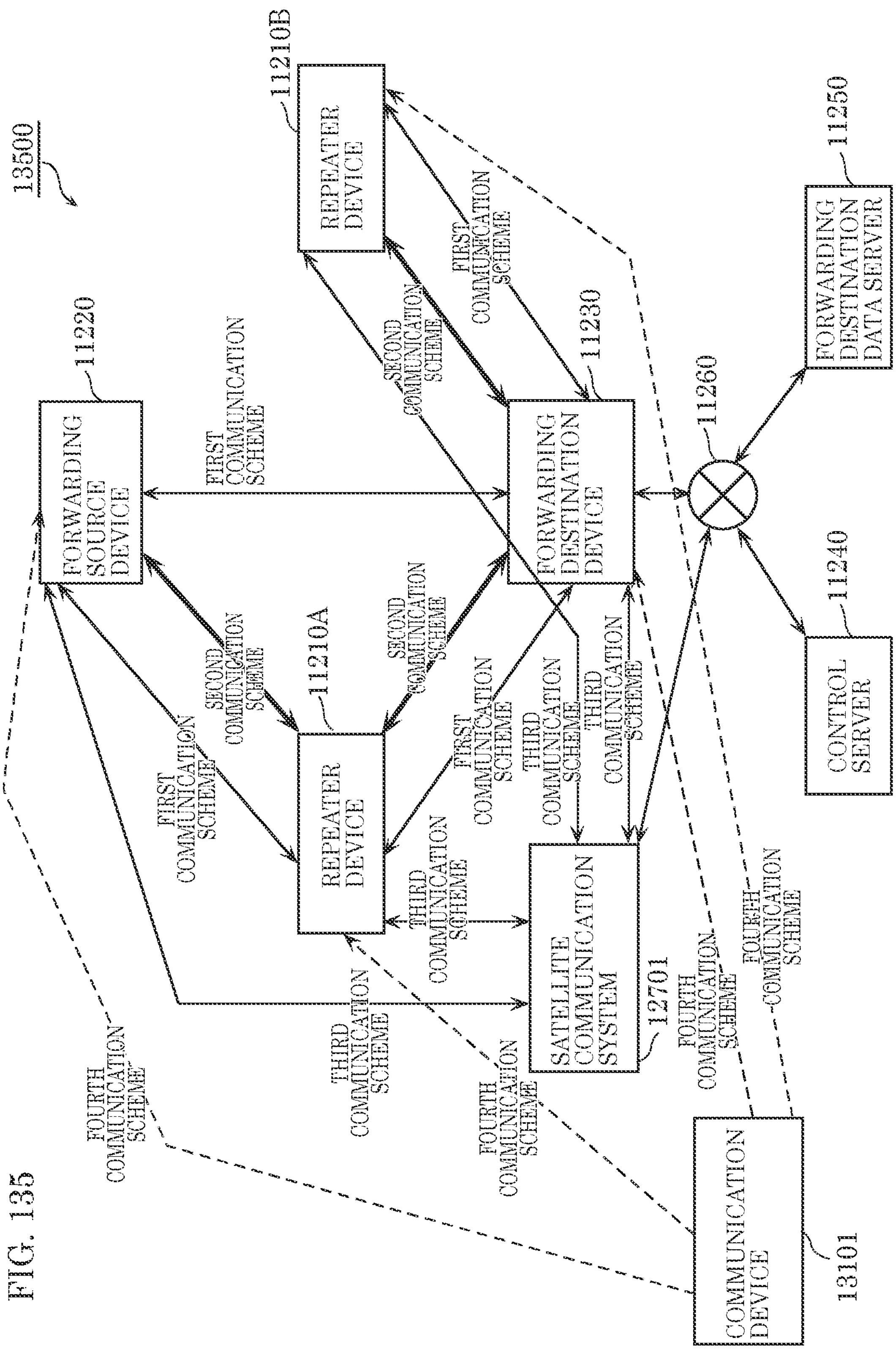
Figure 136:
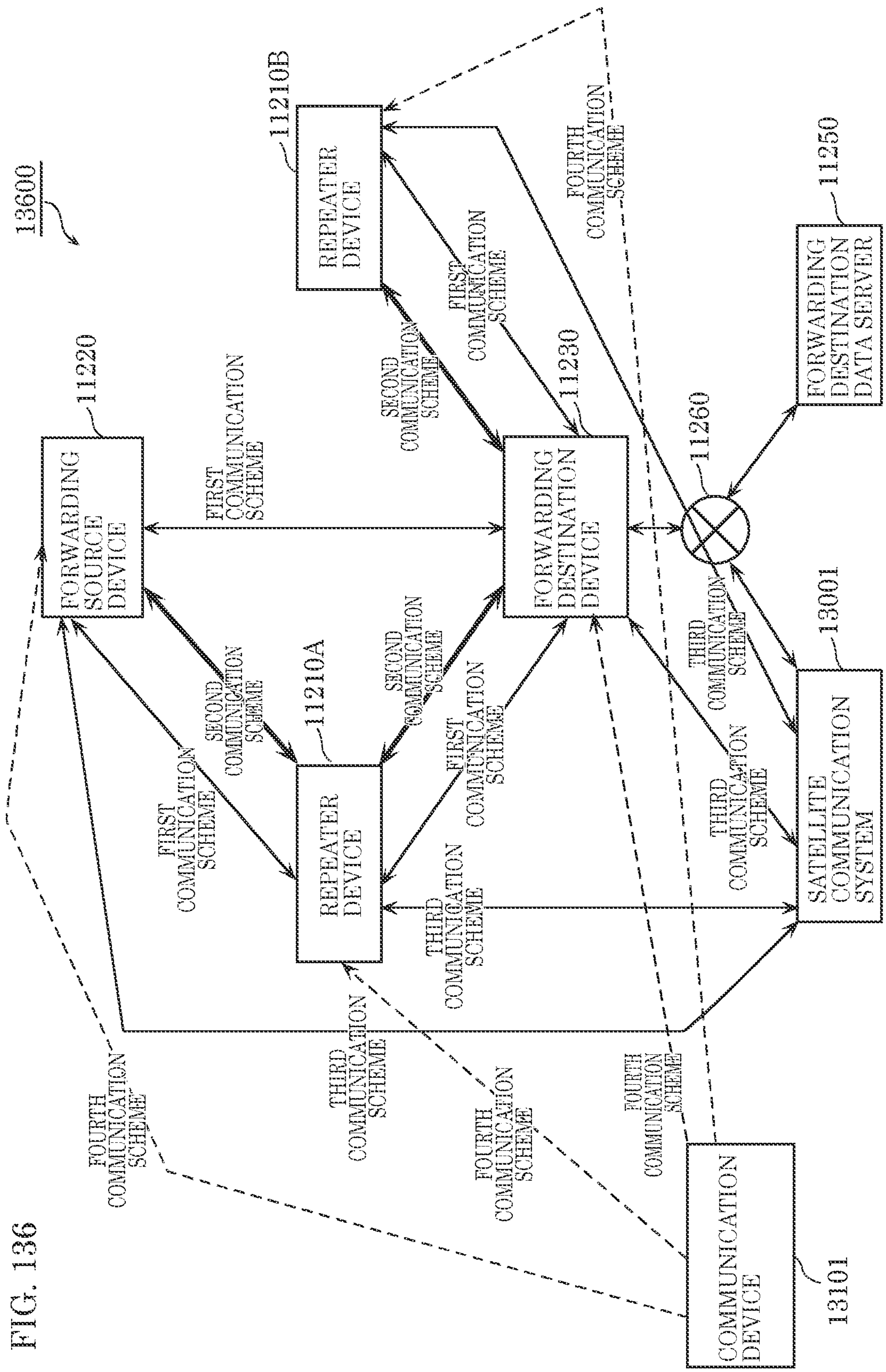
Figure 137:
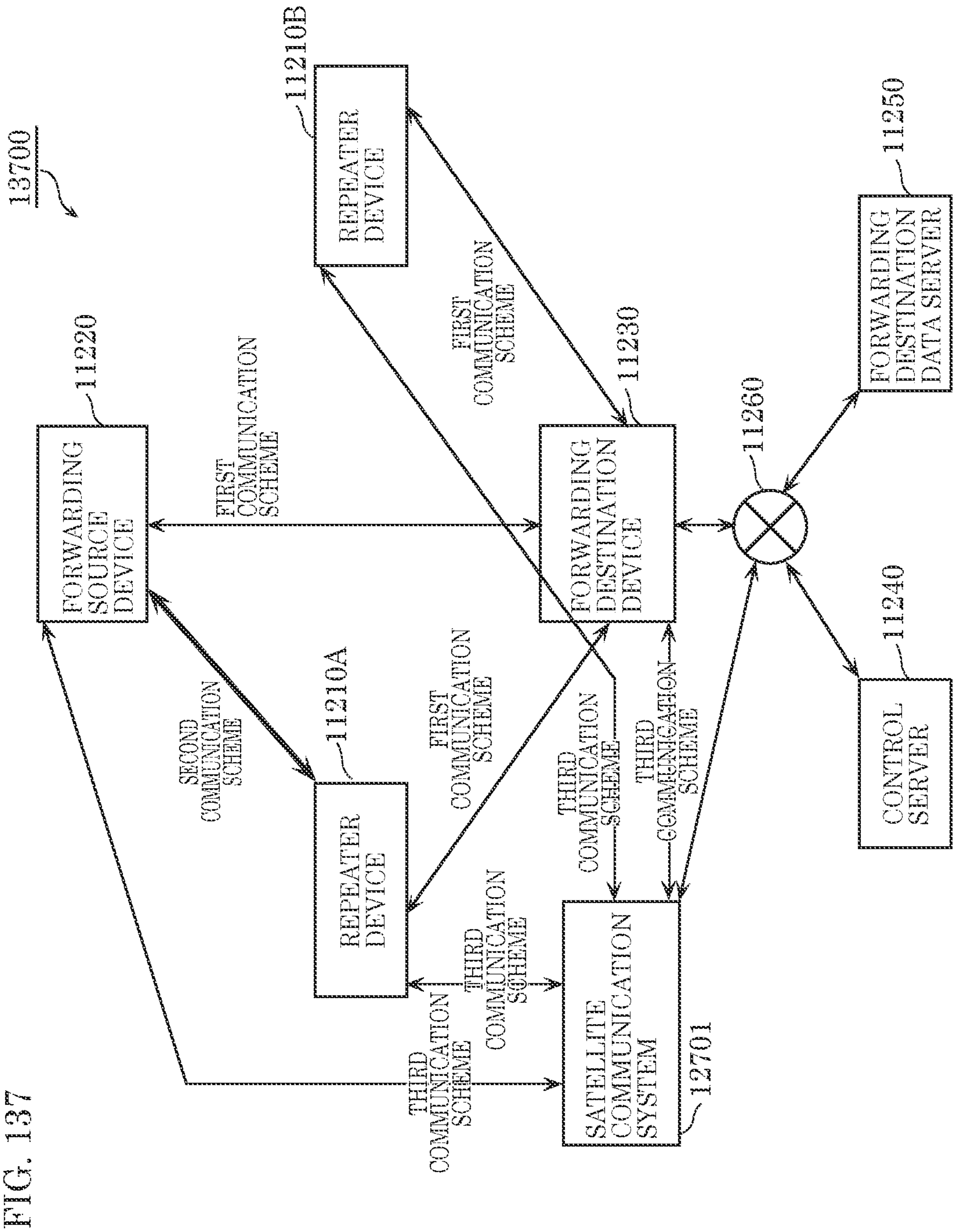
Figure 138:
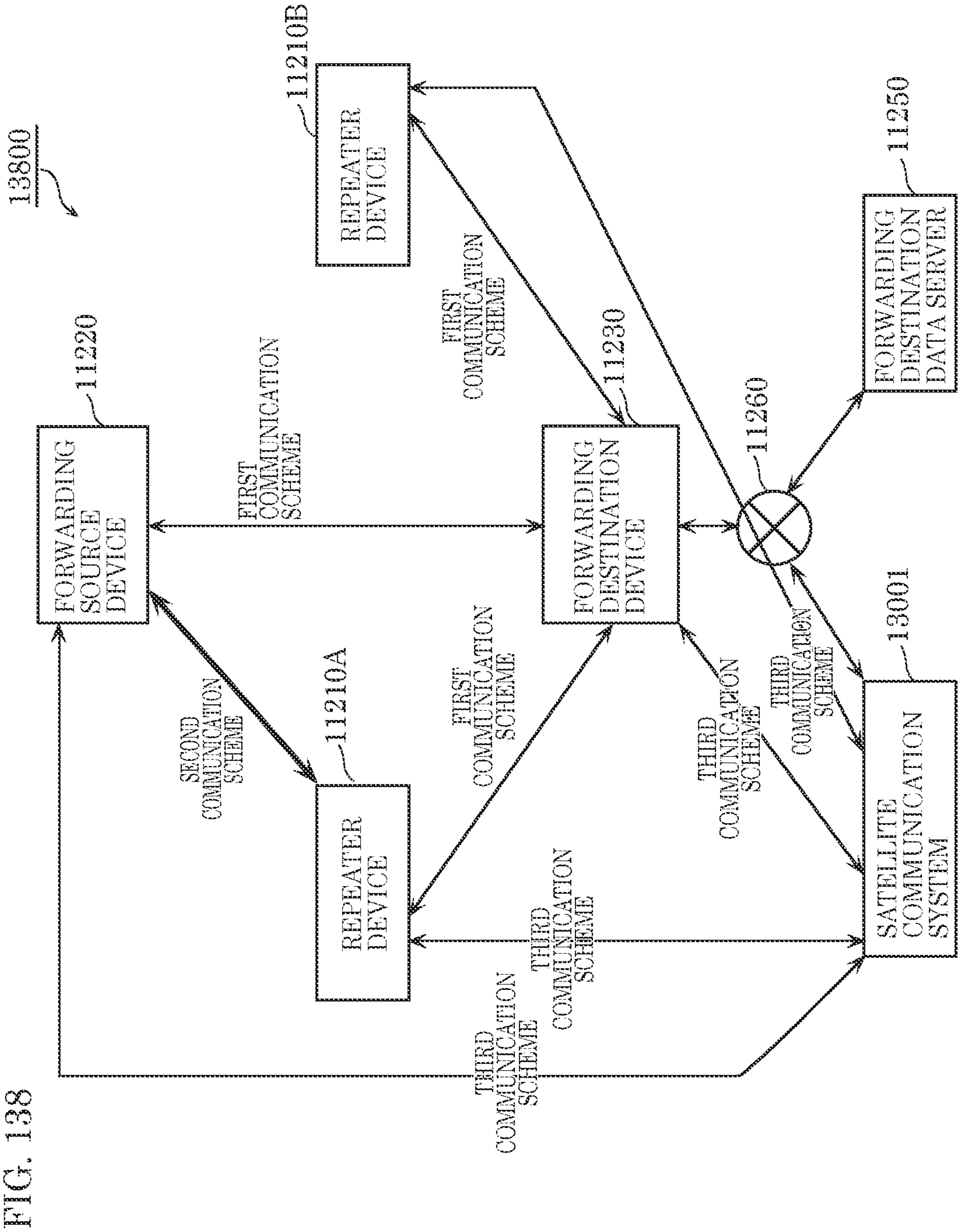
Figure 139:
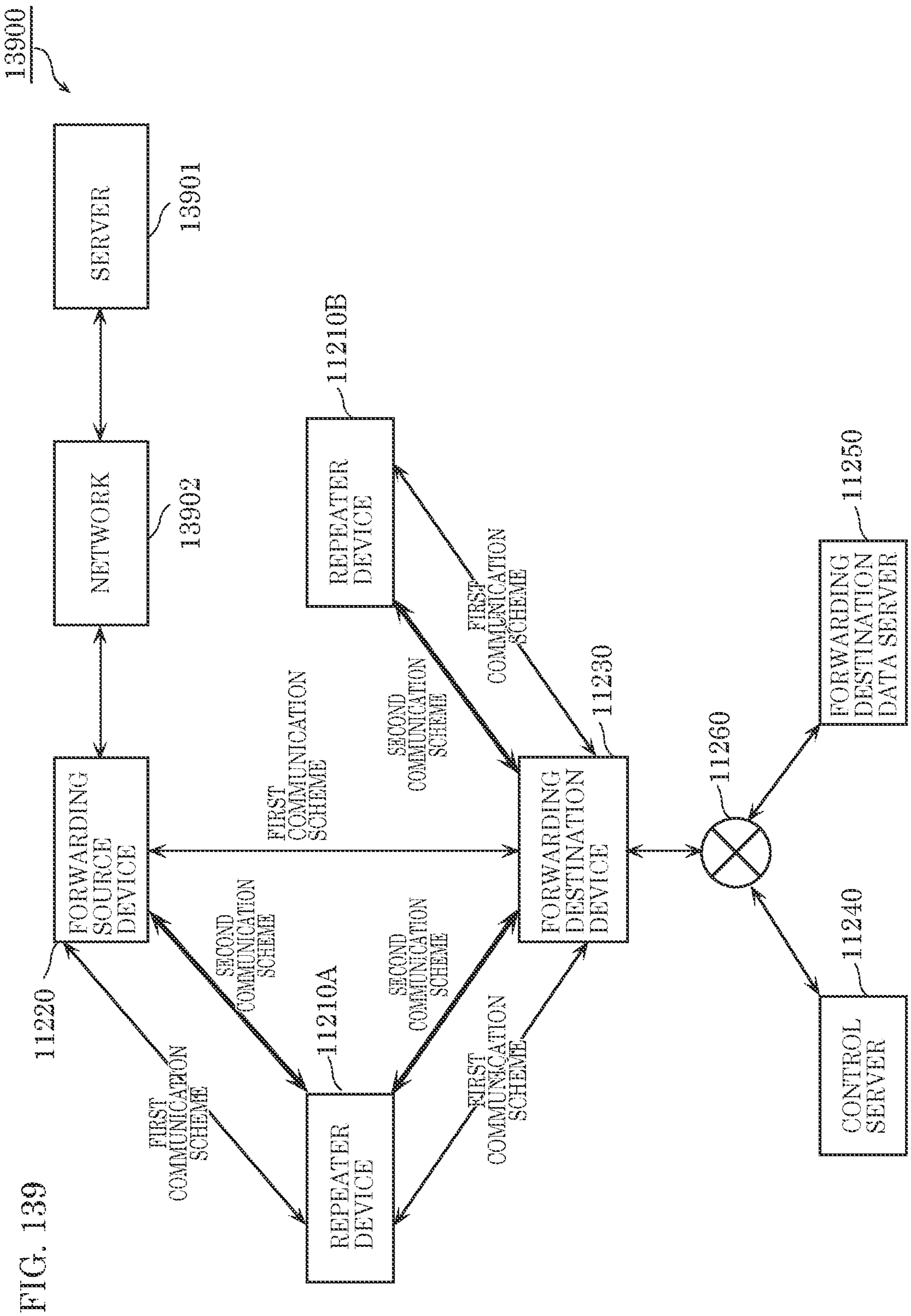
Figure 140:
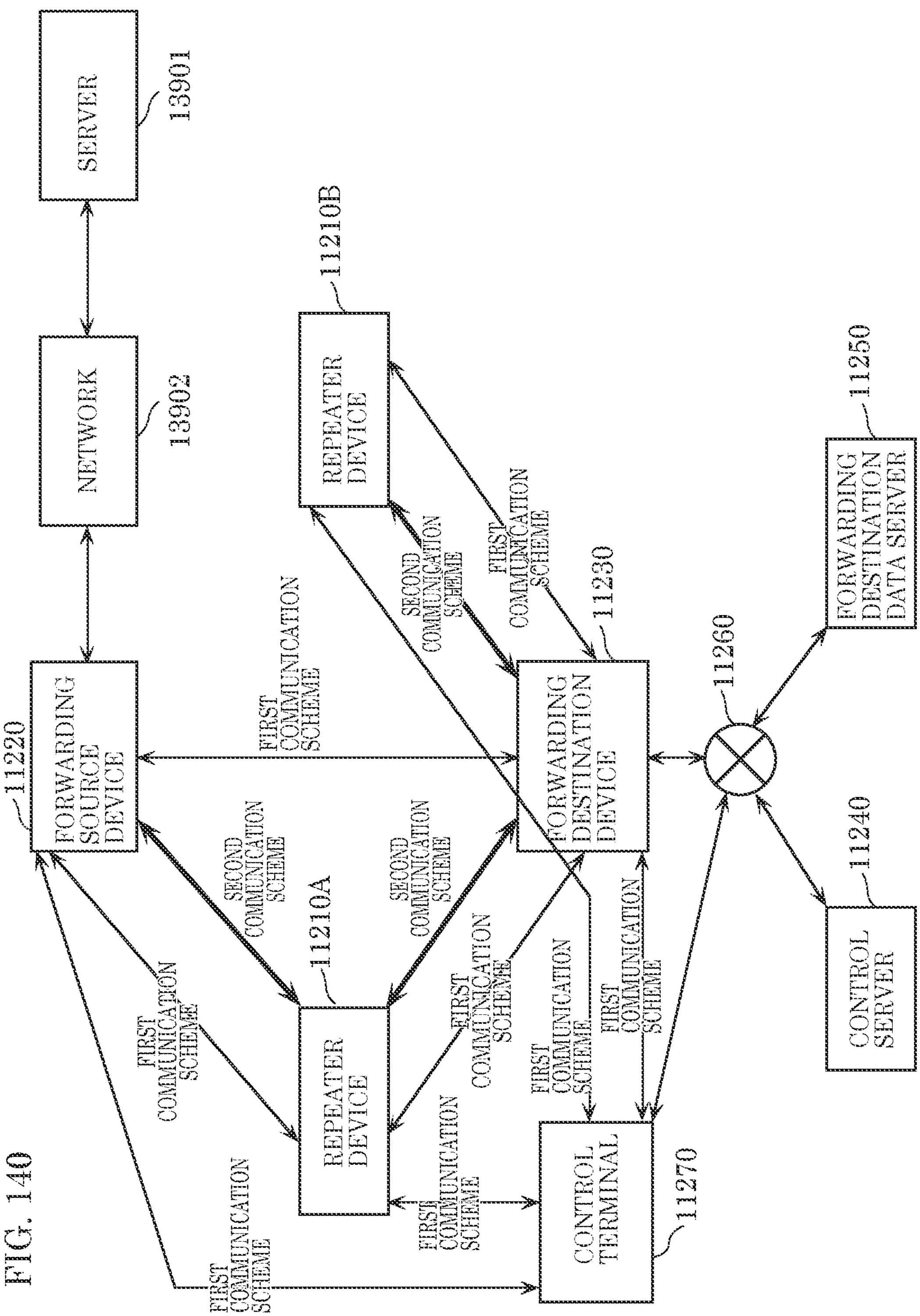
Figure 141:
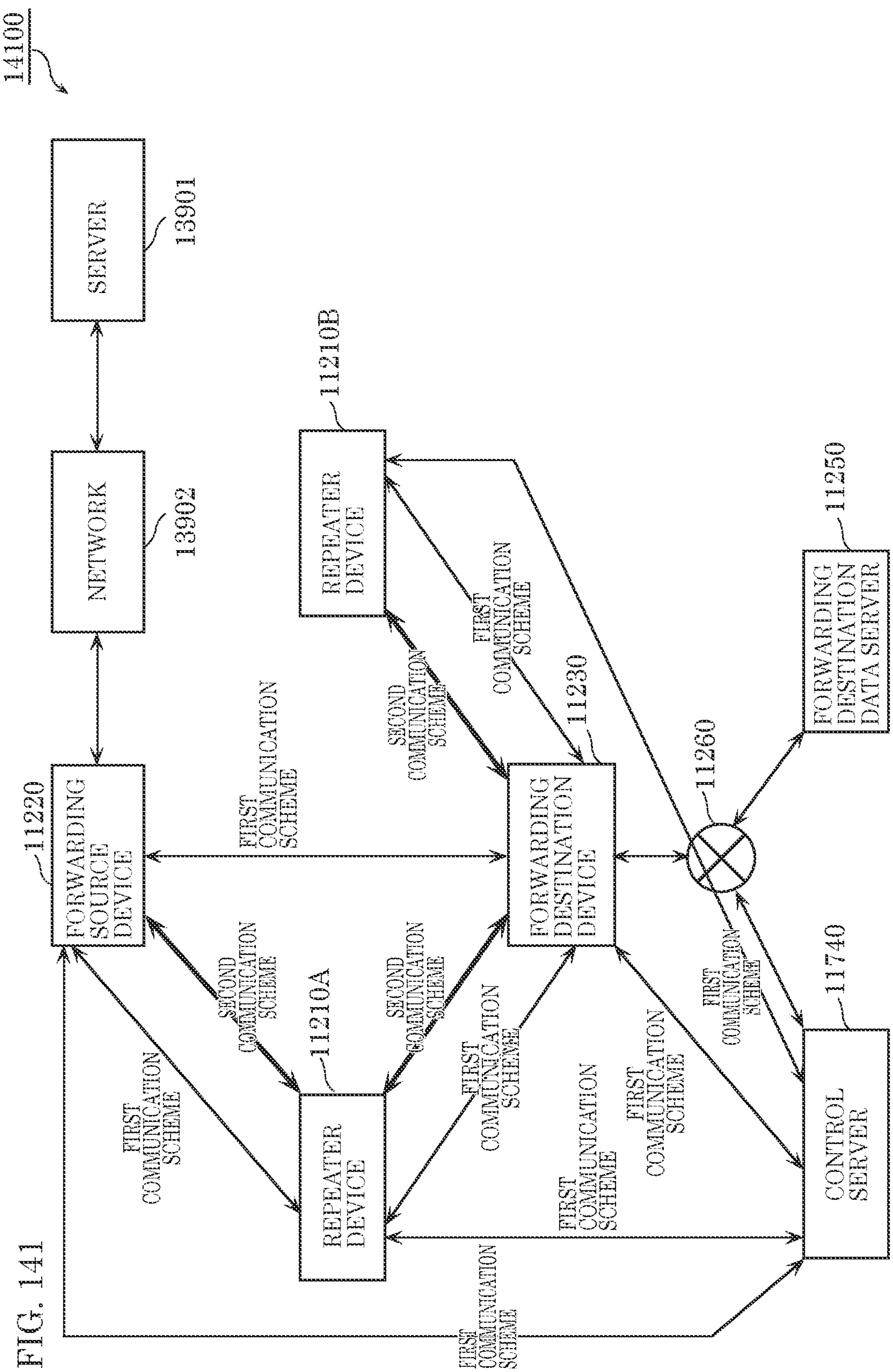
Figure 142:
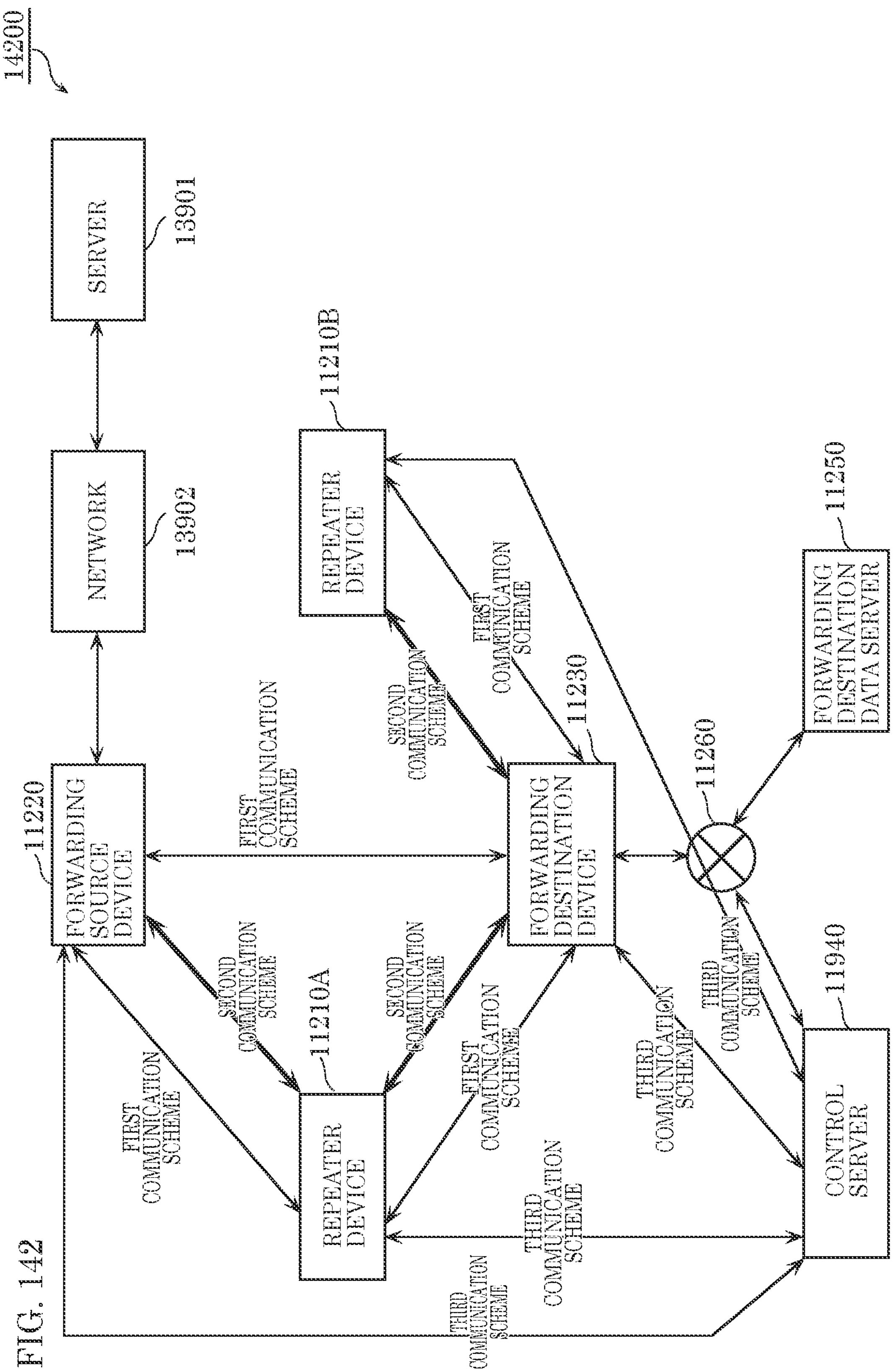
Figure 143:
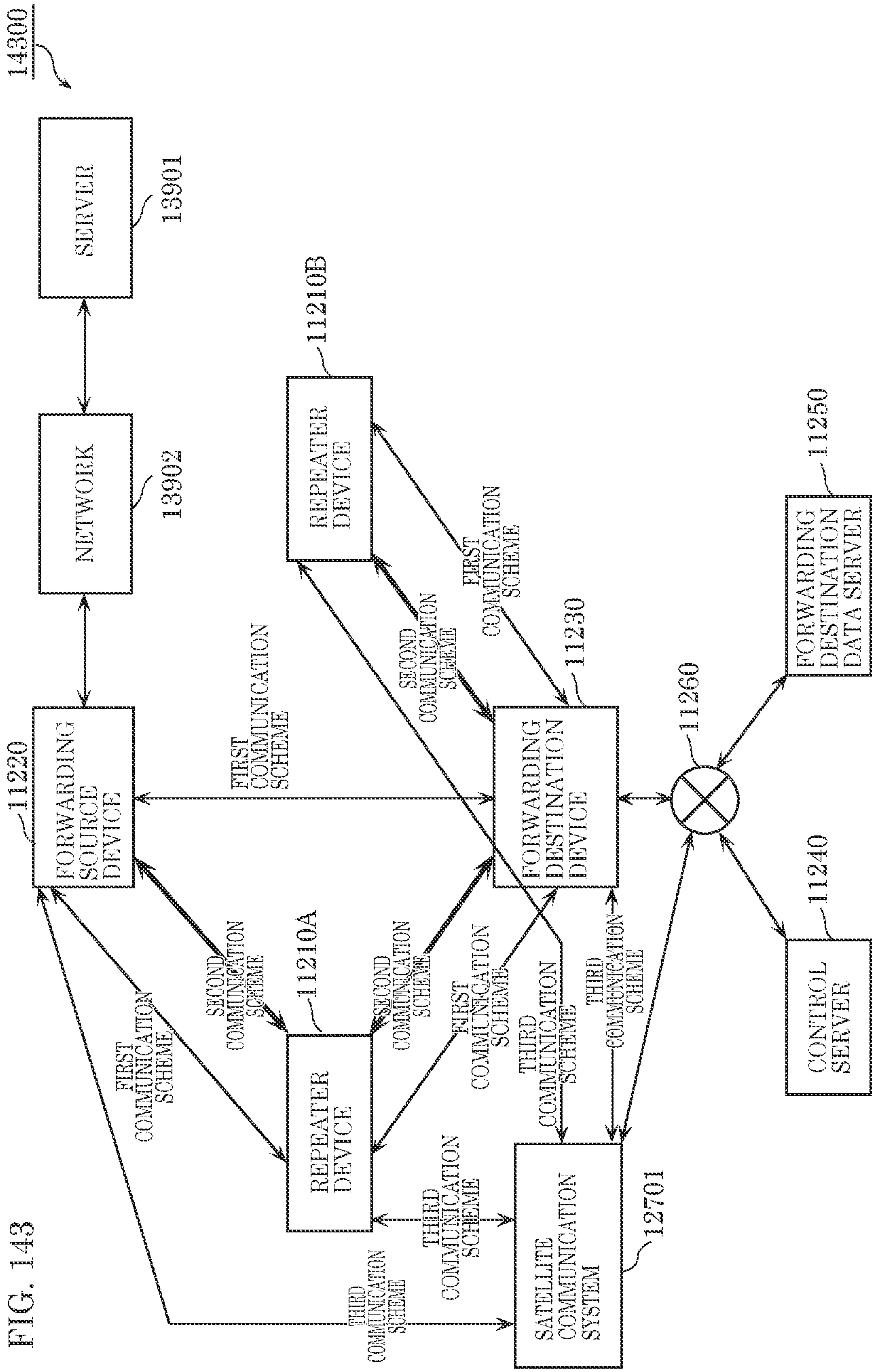
Figure 144:
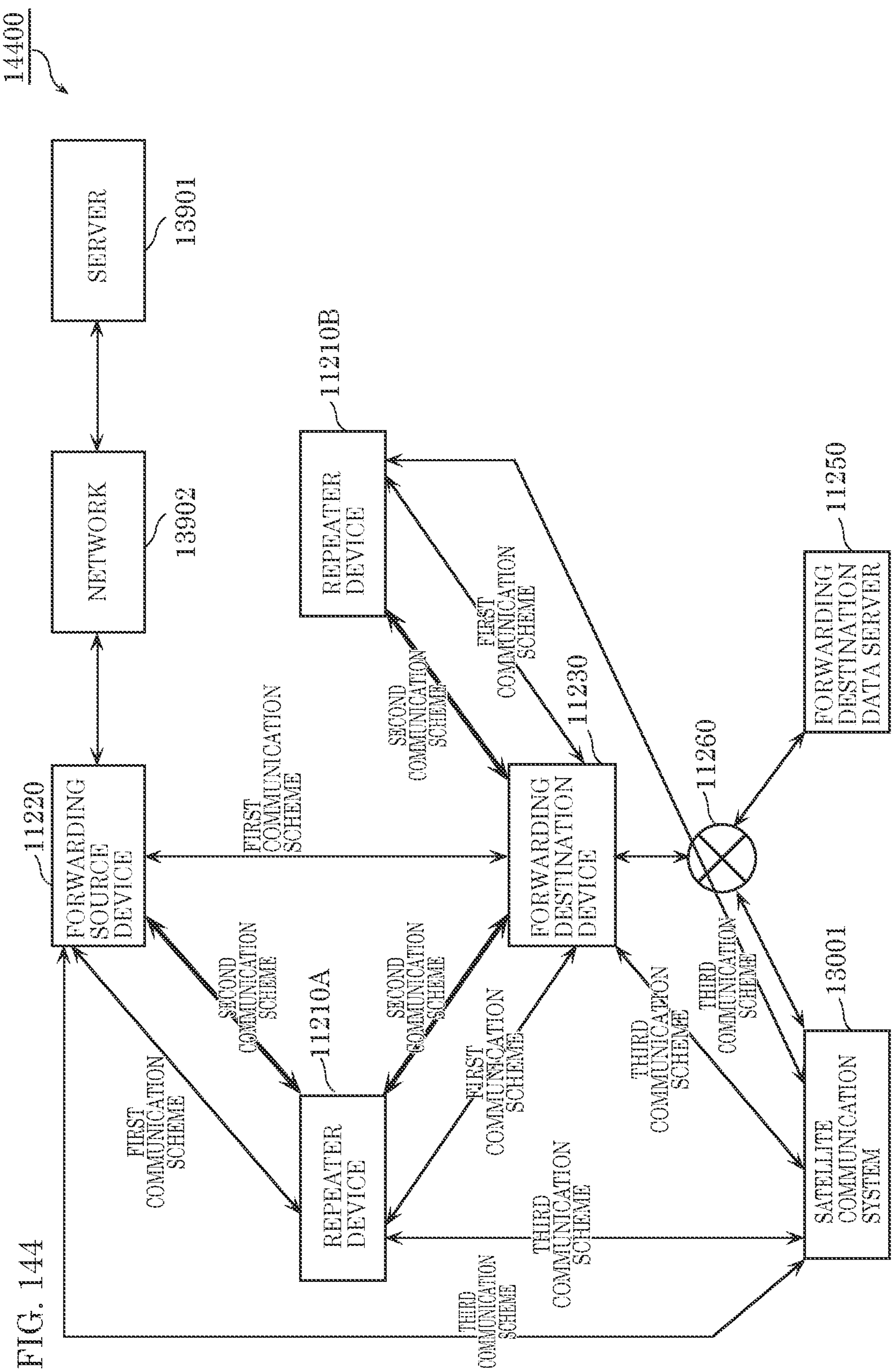
Figure 145:
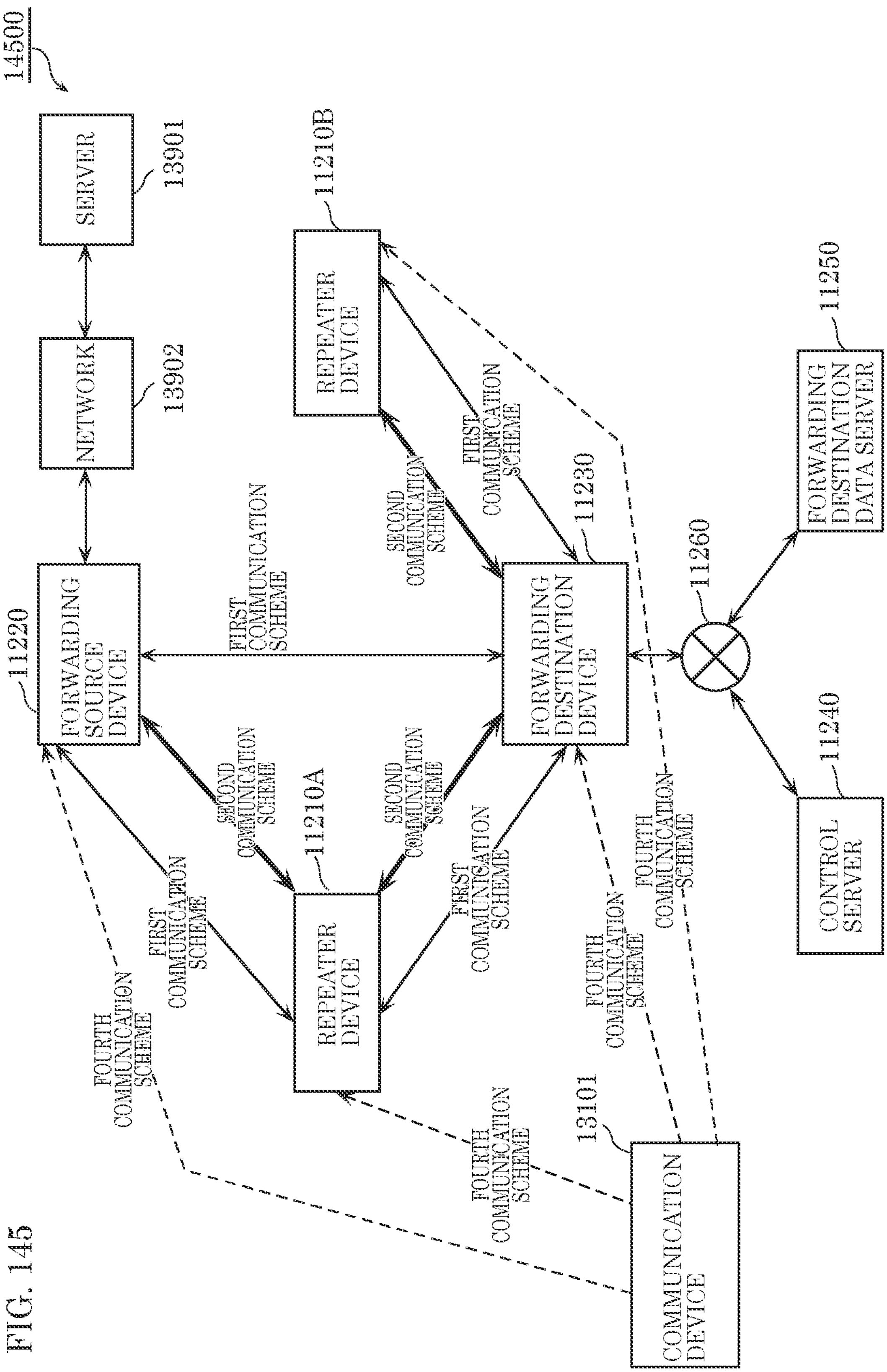
Figure 146:
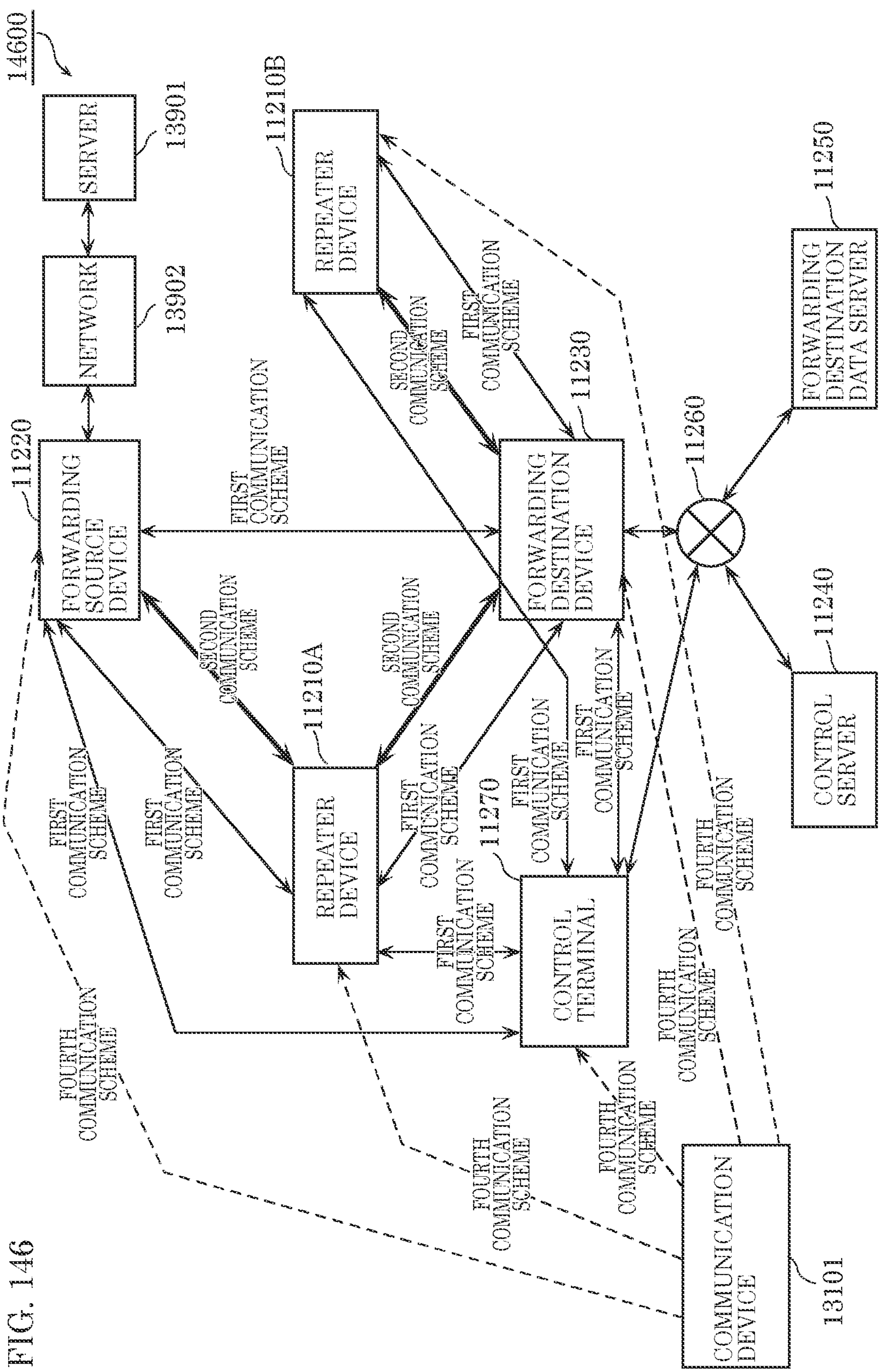
Figure 147:
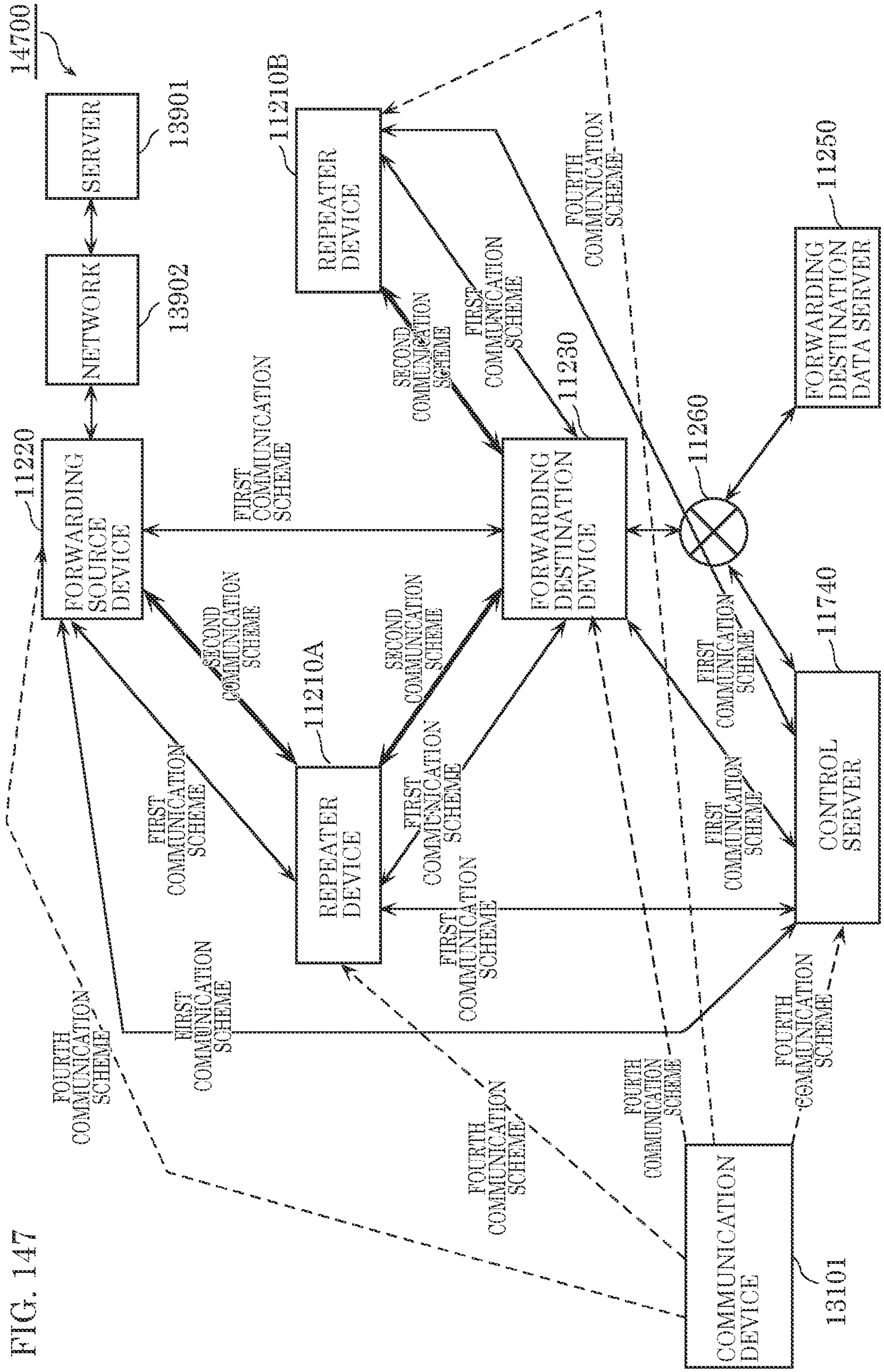
Figure 148:
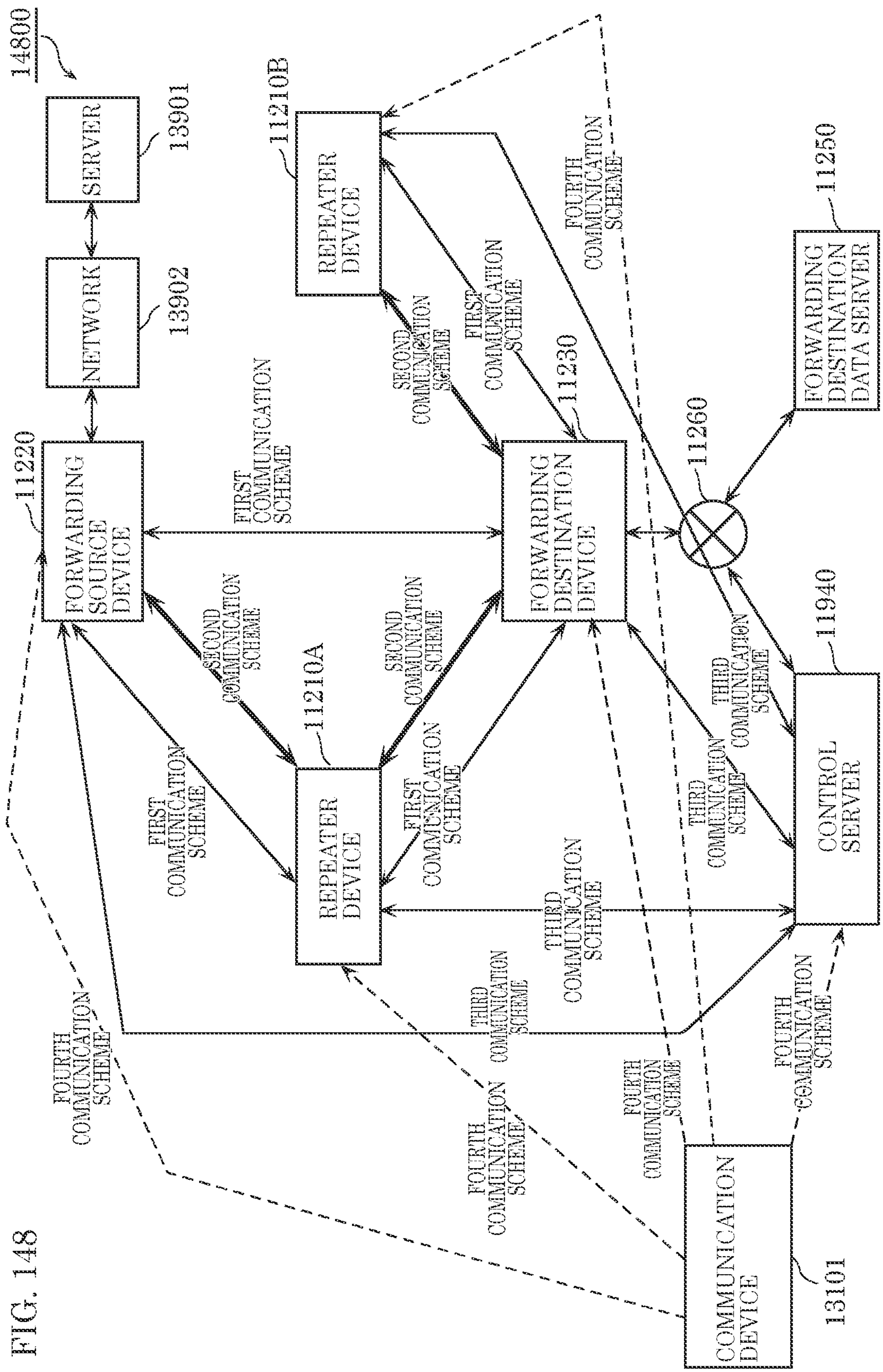
Figure 149:
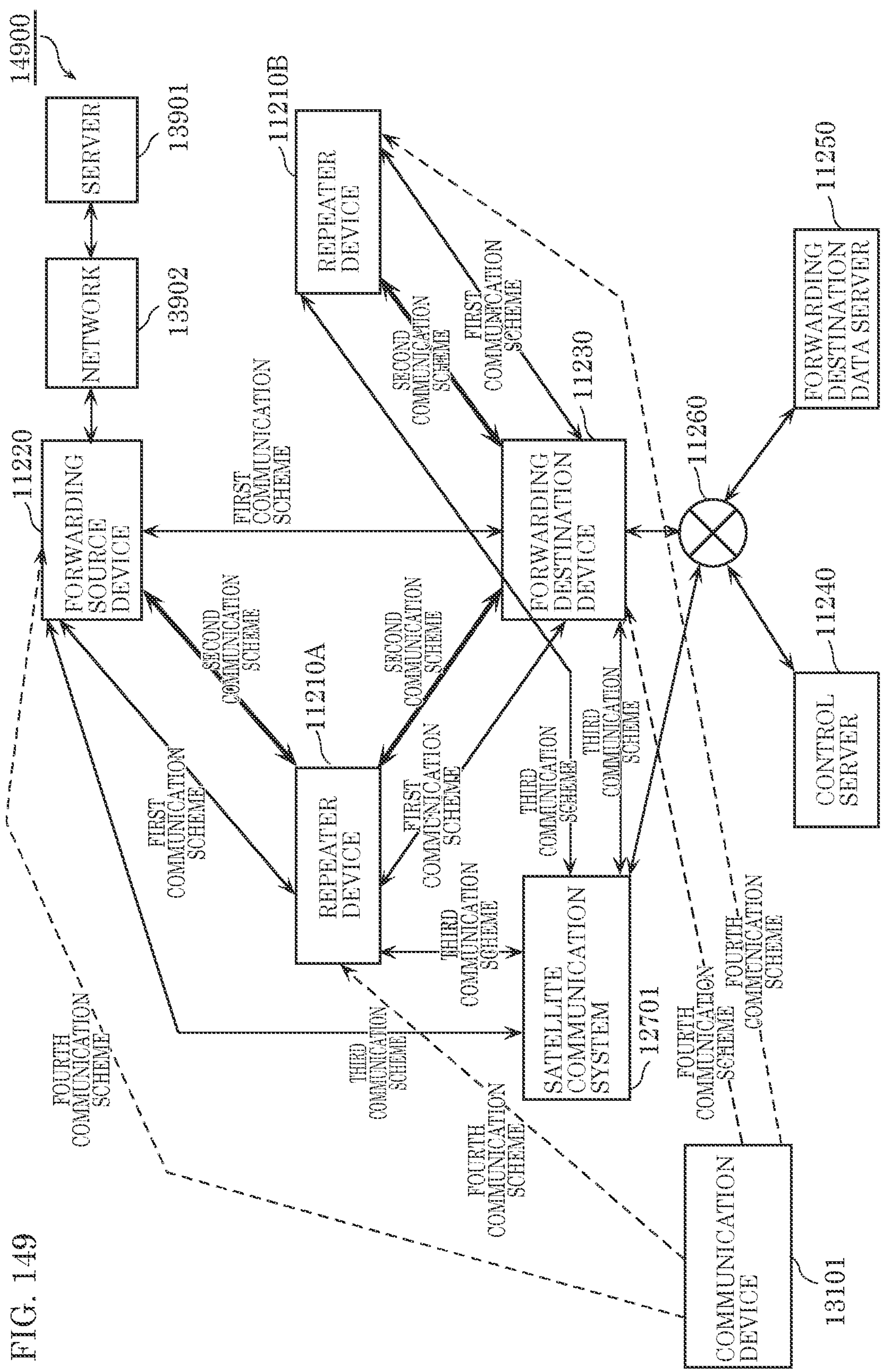
Figure 150:
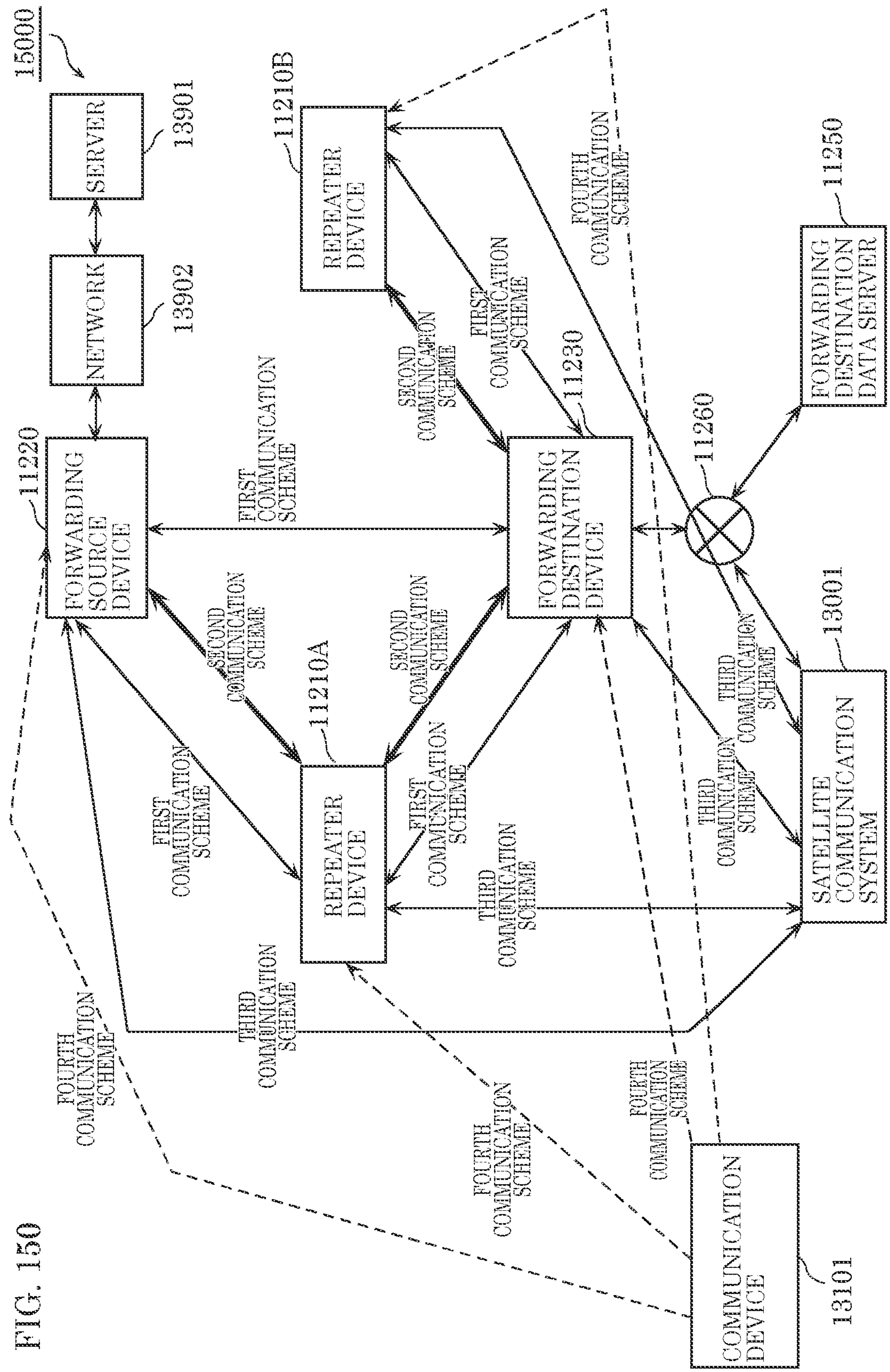
Figure 151:
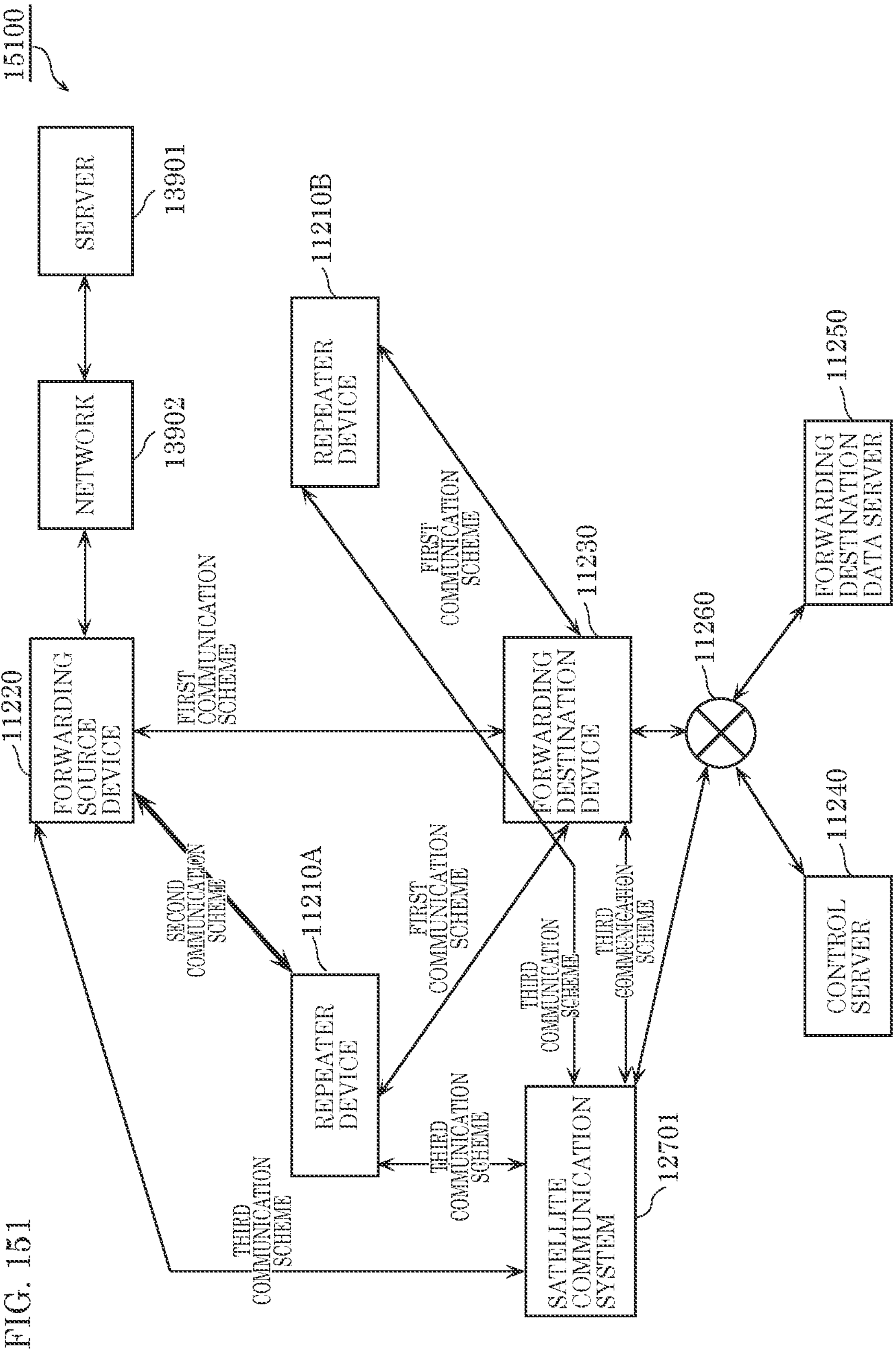
Figure 152:
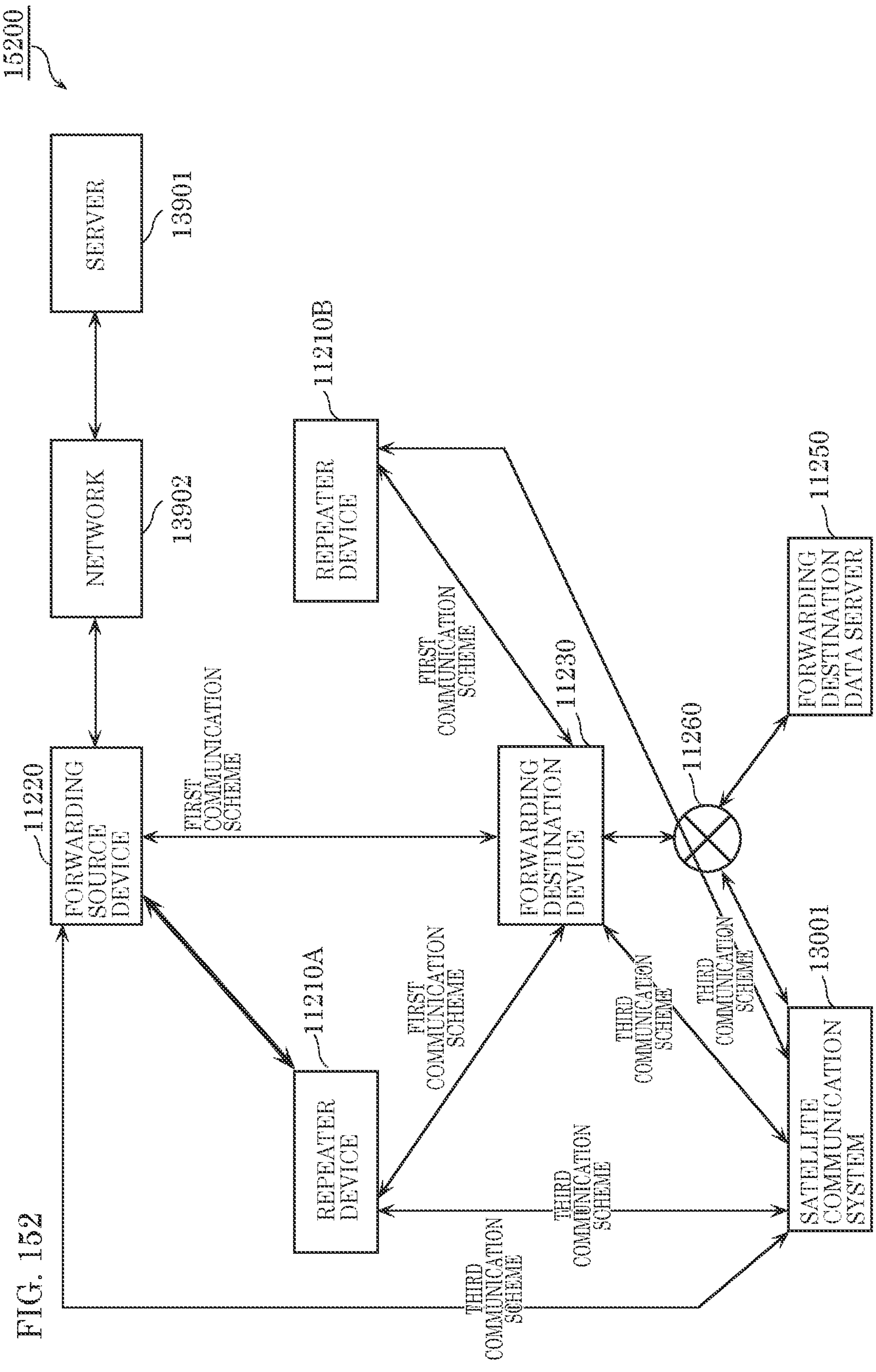
Figure 153A:
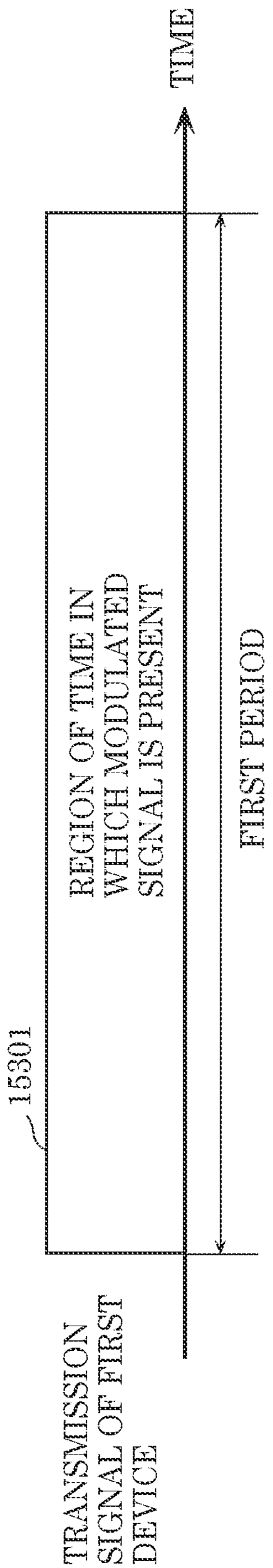
Figure 153B:
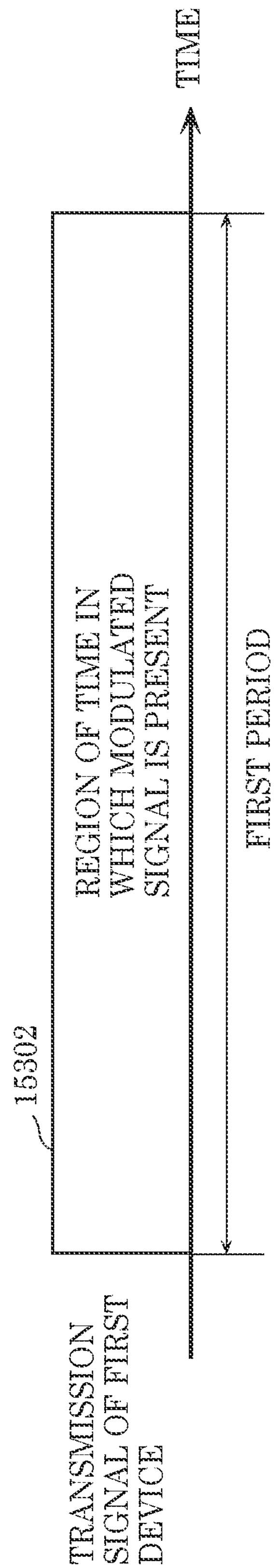
Figure 154A:
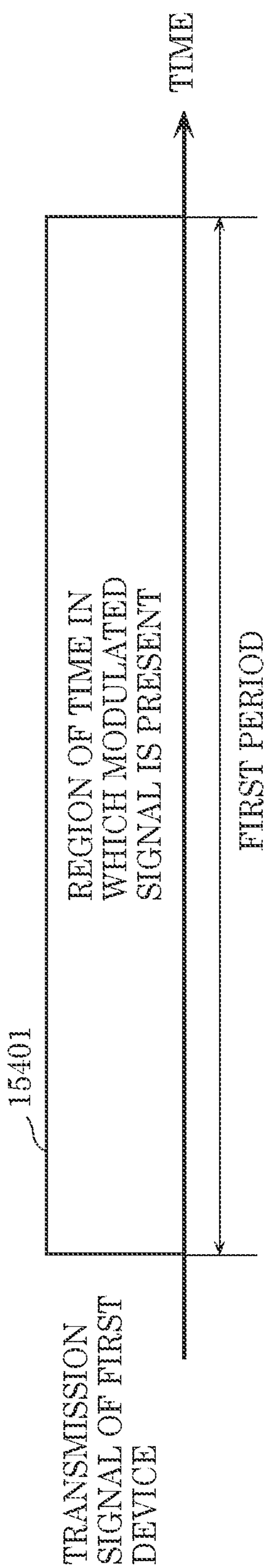
Figure 154B:
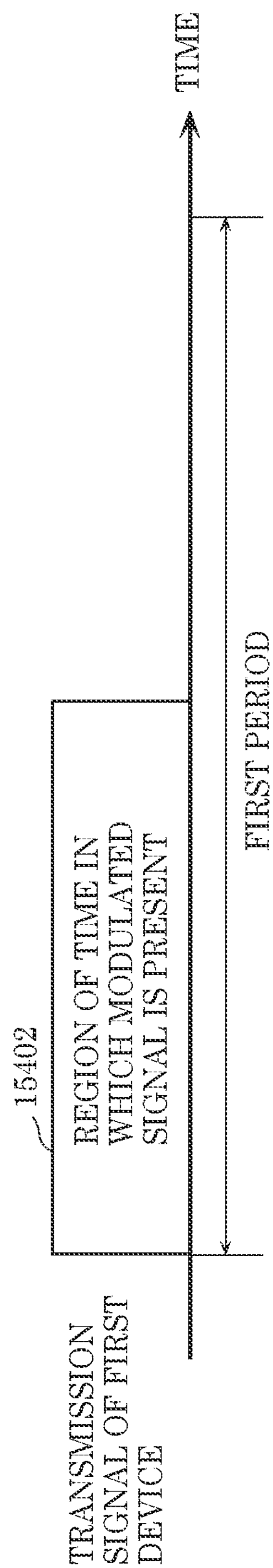
Figure 155A:
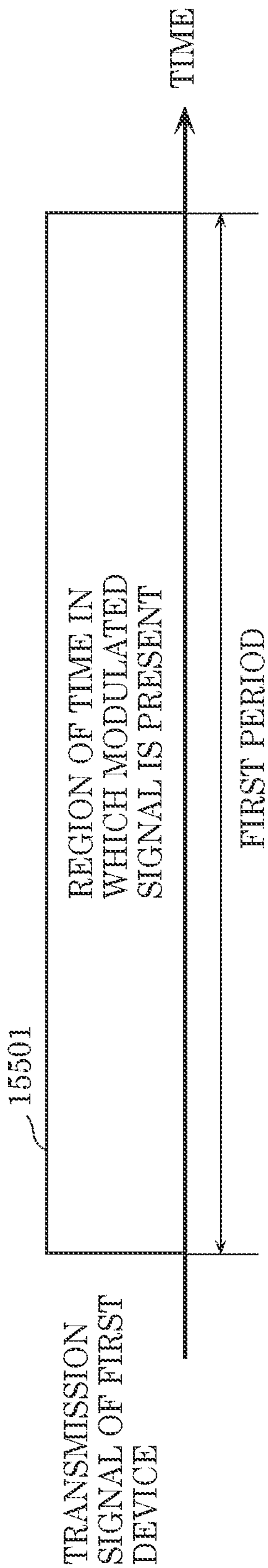
Figure 155B:
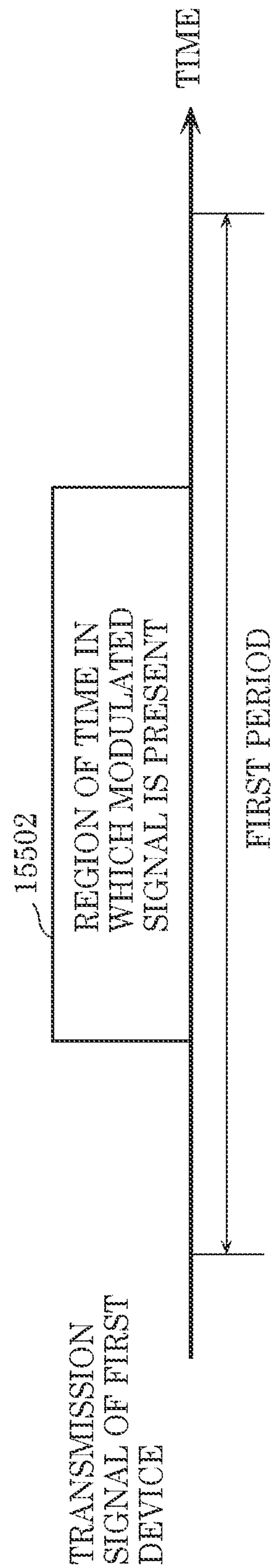
Figure 156A:
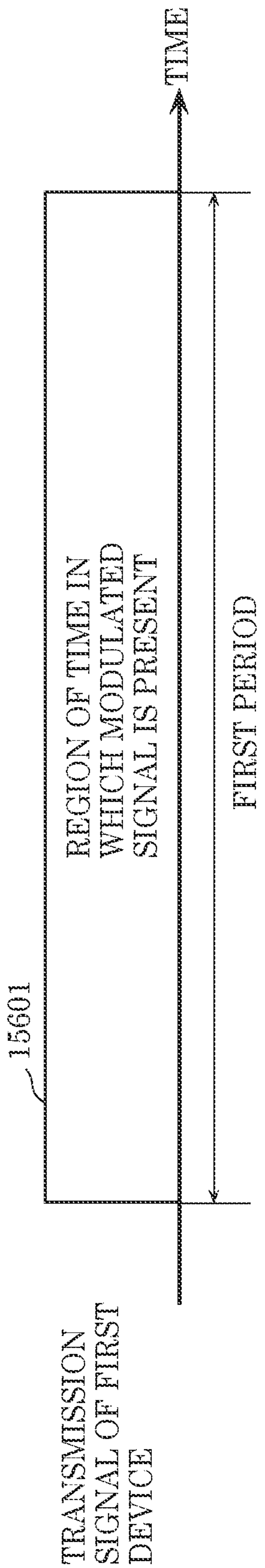
Figure 156B:
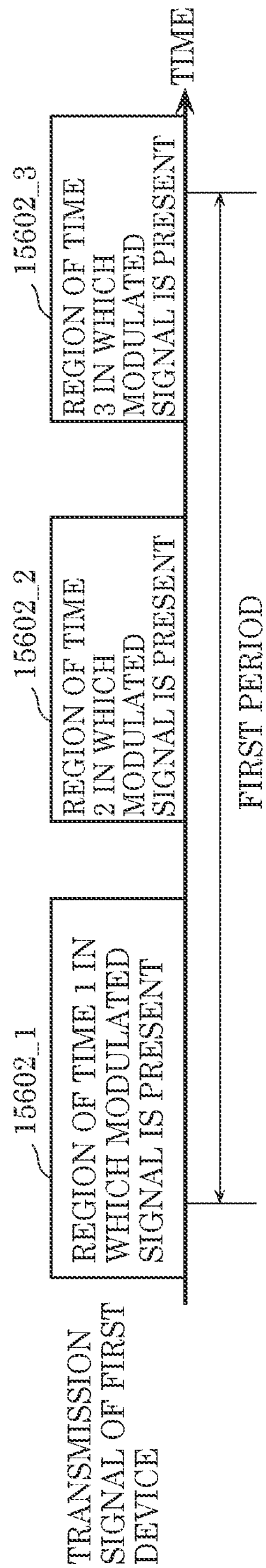
Figure 157A:
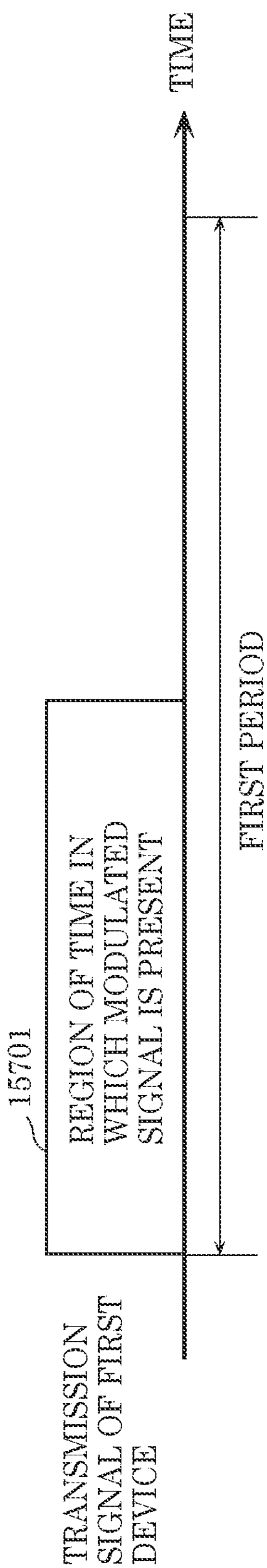
Figure 157B:
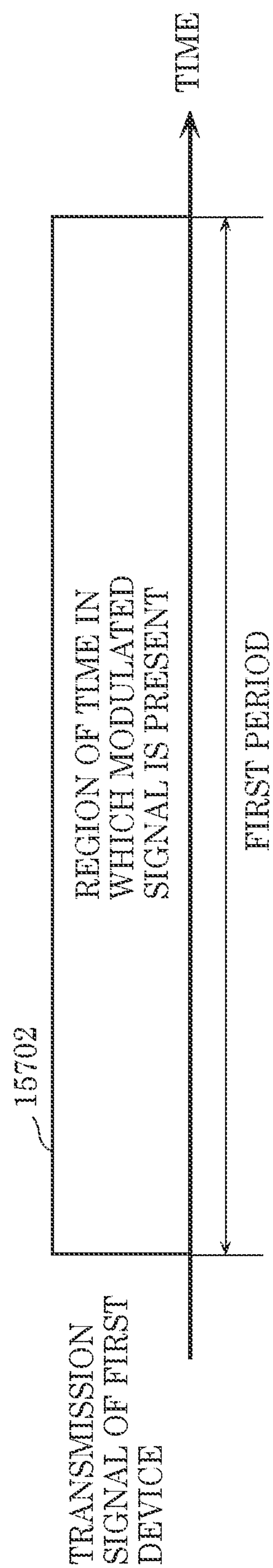
Figure 158A:
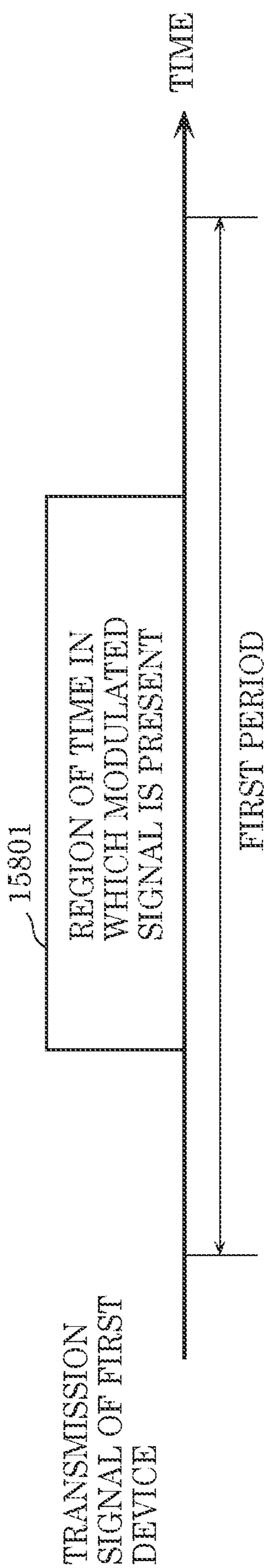
Figure 158B:
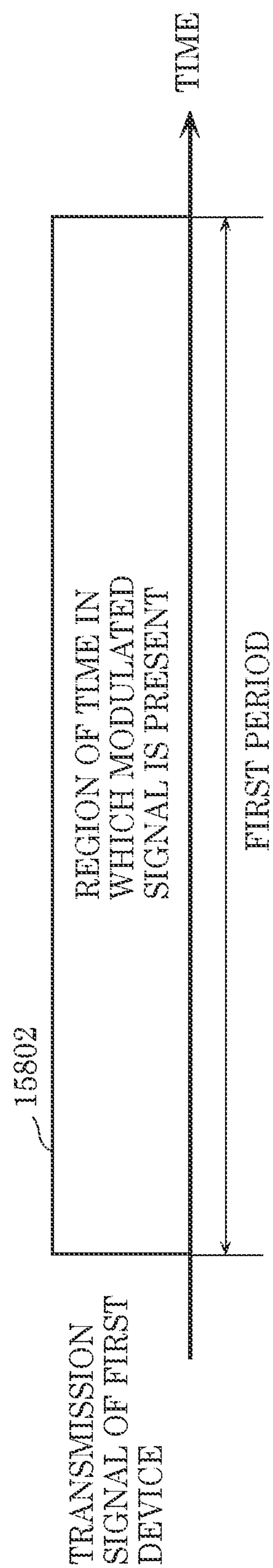
Figure 159A:
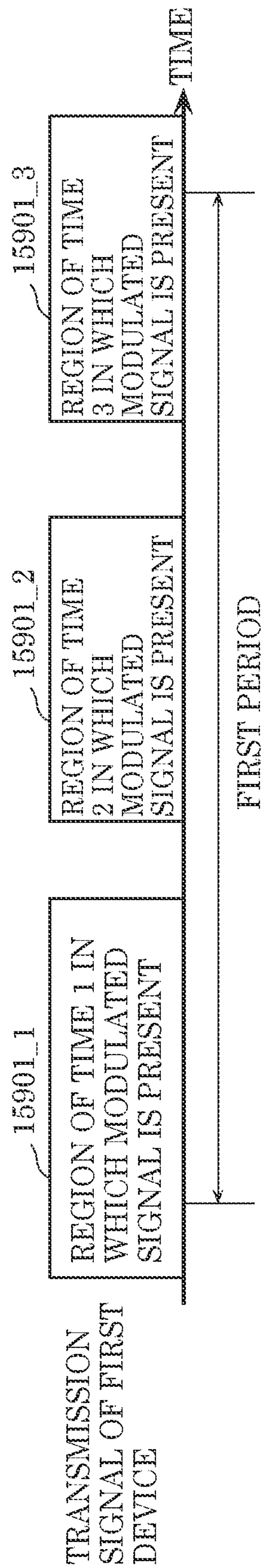
Figure 159B:
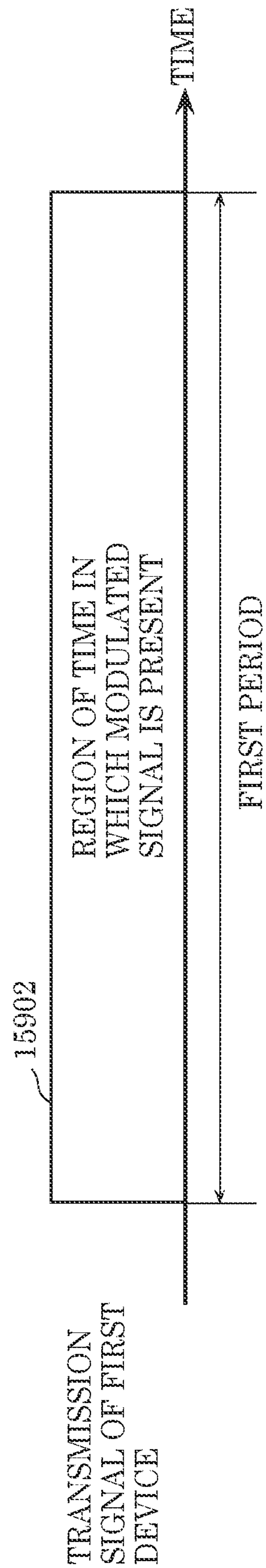
Figure 160:
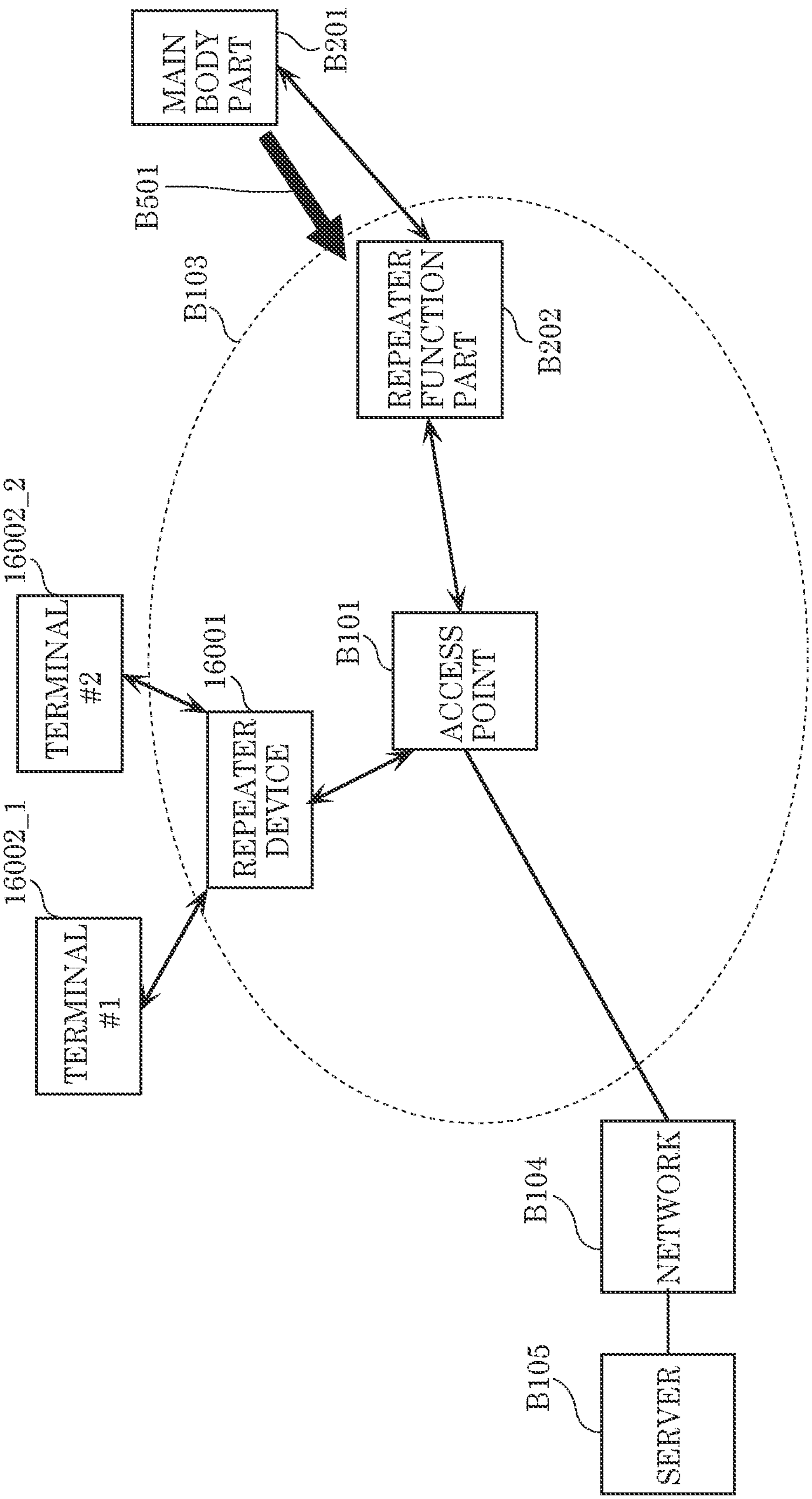
Figure 161:
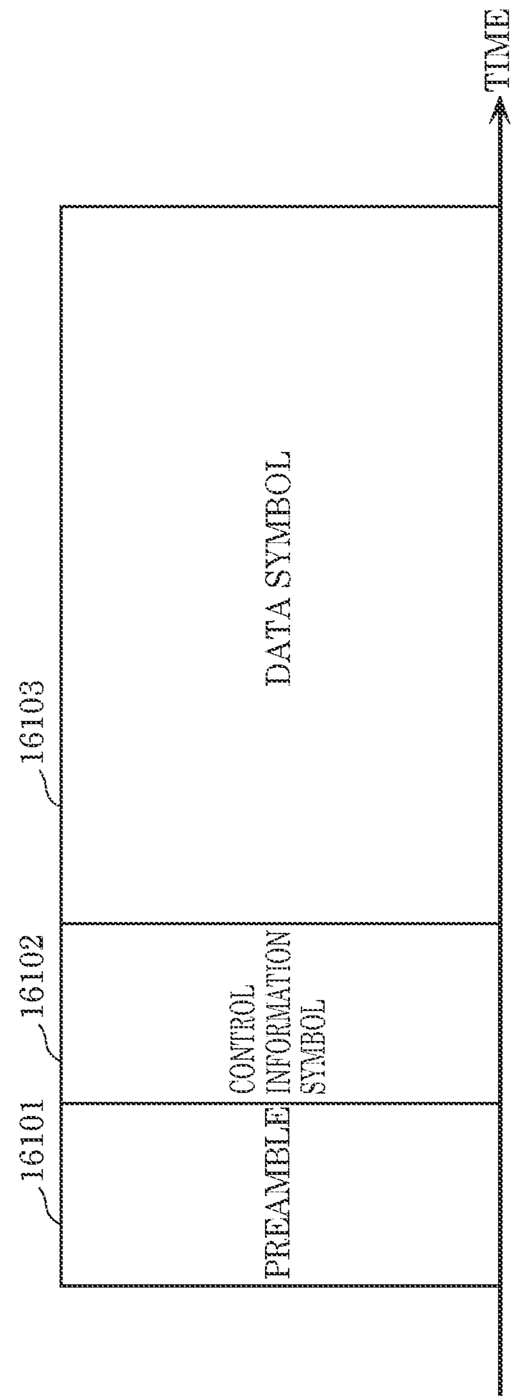
Figure 162:
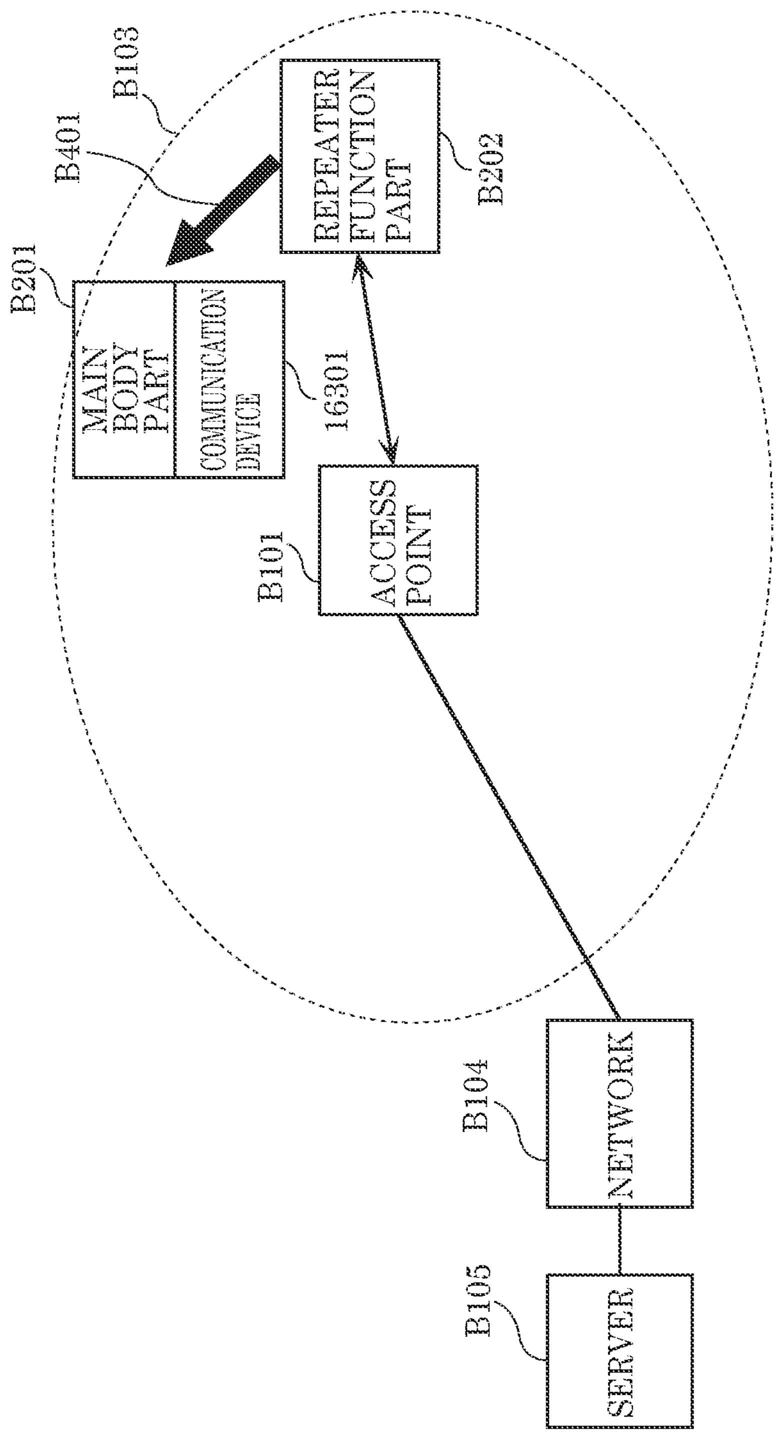
Figure 163:
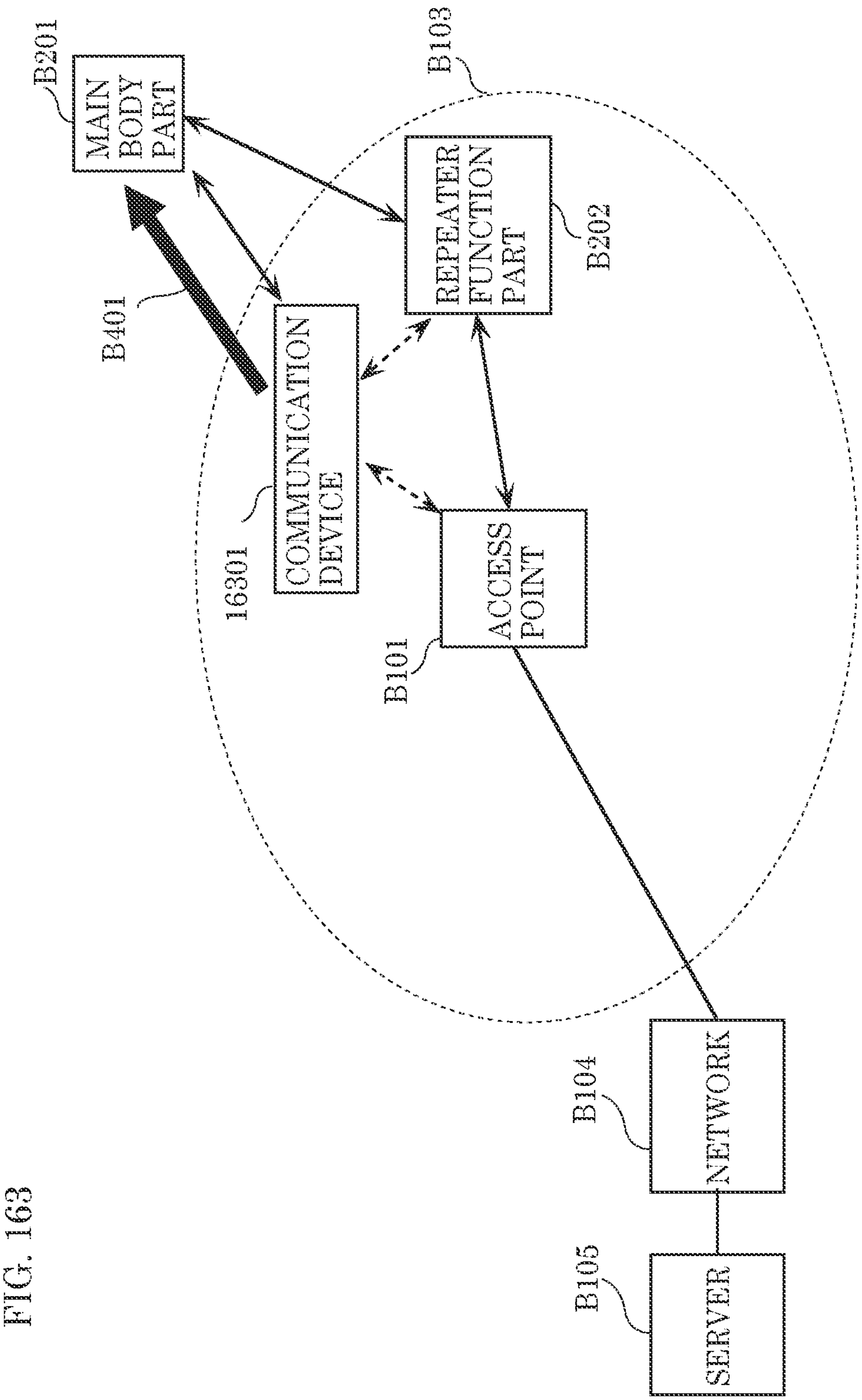
Figure 164:
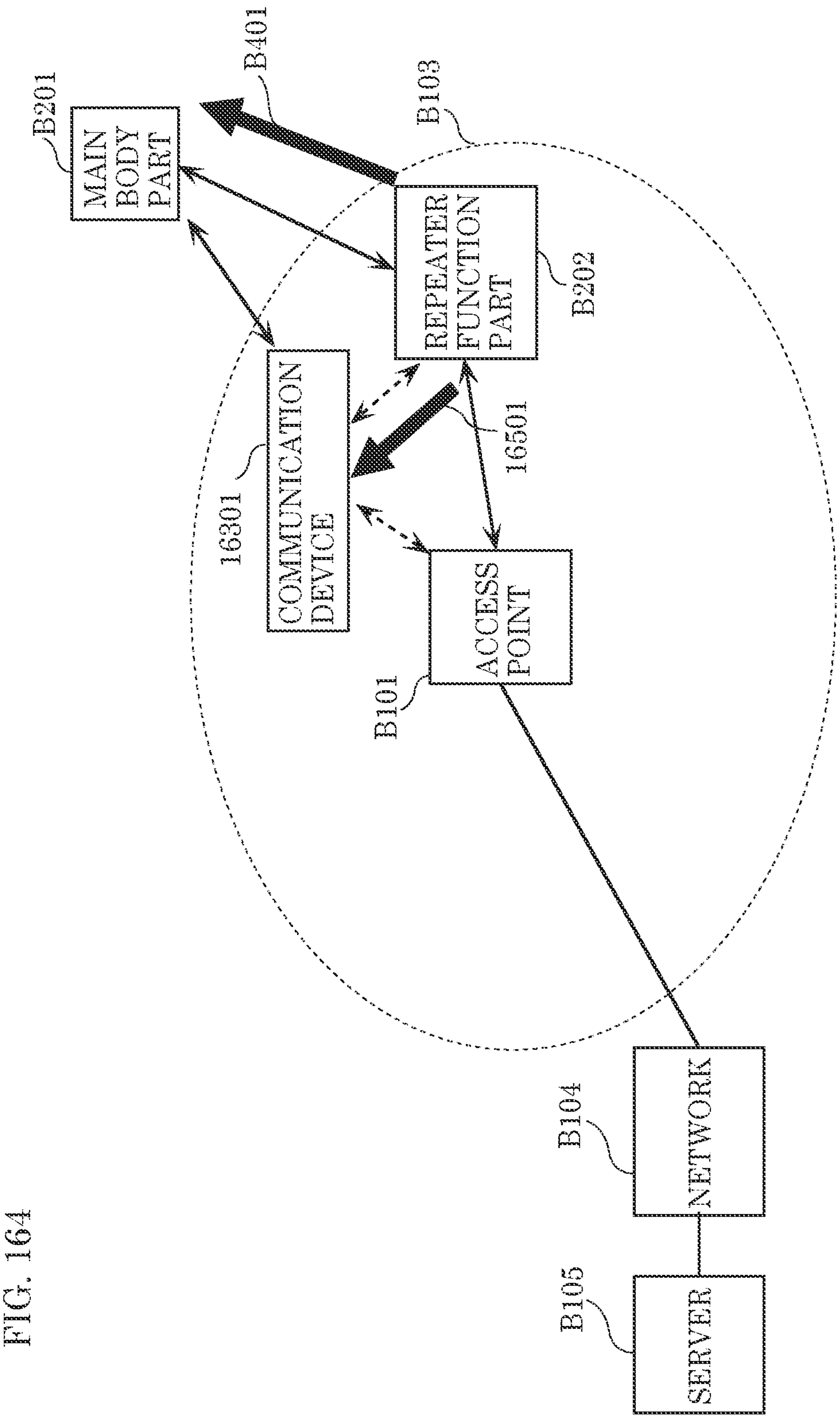

FIG. 124 illustrates one example of operations in a communication system;

FIG. 125 illustrates one example of operations in a communication system;

FIG. 126 illustrates an example of a configuration of a server;

FIG. 127 illustrates an example of a configuration of a communication system;

FIG. 128 illustrates one example of communication in a satellite communication system;

FIG. 129 illustrates one example of communication in a satellite communication system;

FIG. 130 illustrates an example of a configuration of a communication system;

FIG. 131 illustrates an example of a configuration of a communication system;

FIG. 132 illustrates an example of a configuration of a communication system;

FIG. 133 illustrates an example of a configuration of a communication system;

FIG. 134 illustrates an example of a configuration of a communication system;

FIG. 135 illustrates an example of a configuration of a communication system;

FIG. 136 illustrates an example of a configuration of a communication system;

FIG. 137 illustrates an example of a configuration of a communication system;

FIG. 138 illustrates an example of a configuration of a communication system;

FIG. 139 illustrates an example of a configuration of a communication system;

FIG. 140 illustrates an example of a configuration of a communication system;

FIG. 141 illustrates an example of a configuration of a communication system;

FIG. 142 illustrates an example of a configuration of a communication system;

FIG. 143 illustrates an example of a configuration of a communication system;

FIG. 144 illustrates an example of a configuration of a communication system;

FIG. 145 illustrates an example of a configuration of a communication system;

FIG. 146 illustrates an example of a configuration of a communication system;

FIG. 147 illustrates an example of a configuration of a communication system;

FIG. 148 illustrates an example of a configuration of a communication system;

FIG. 149 illustrates an example of a configuration of a communication system;

FIG. 150 illustrates an example of a configuration of a communication system;

FIG. 151 illustrates an example of a configuration of a communication system;

FIG. 152 illustrates an example of a configuration of a communication system;

FIG. 153A relates to the presence of a modulated signal conforming to the first communication scheme;

FIG. 153B relates to the presence of a modulated signal conforming to the second communication scheme;

FIG. 154A relates to the presence of a modulated signal conforming to the first communication scheme;

FIG. 154B relates to the presence of a modulated signal conforming to the second communication scheme;

FIG. 155A relates to the presence of a modulated signal conforming to the first communication scheme;

FIG. 155B relates to the presence of a modulated signal conforming to the second communication scheme;

FIG. 156A relates to the presence of a modulated signal conforming to the first communication scheme;

FIG. 156B relates to the presence of a modulated signal conforming to the second communication scheme;

FIG. 157A relates to the presence of a modulated signal conforming to the first communication scheme;

FIG. 157B relates to the presence of a modulated signal conforming to the second communication scheme;

FIG. 158A relates to the presence of a modulated signal conforming to the first communication scheme;

FIG. 158B relates to the presence of a modulated signal conforming to the second communication scheme;

FIG. 159A relates to the presence of a modulated signal conforming to the first communication scheme;

FIG. 159B relates to the presence of a modulated signal conforming to the second communication scheme;

FIG. 160 illustrates one example of operations in a communication system;

FIG. 161 illustrates one example of a configuration of a frame of a modulated signal;

FIG. 162 illustrates one example of operations in a communication system;

FIG. 163 illustrates one example of operations in a communication system; and FIG. 164 illustrates one example of operations in a communication system.

DETAILED DESCRIPTION OF THE EMBODIMENTS

Hereinafter, first, an example of a communication method that uses a plurality of antennas and can be applied to the communication system (to be described later) according to the present disclosure will be described.

Embodiment 1

Figure 1:
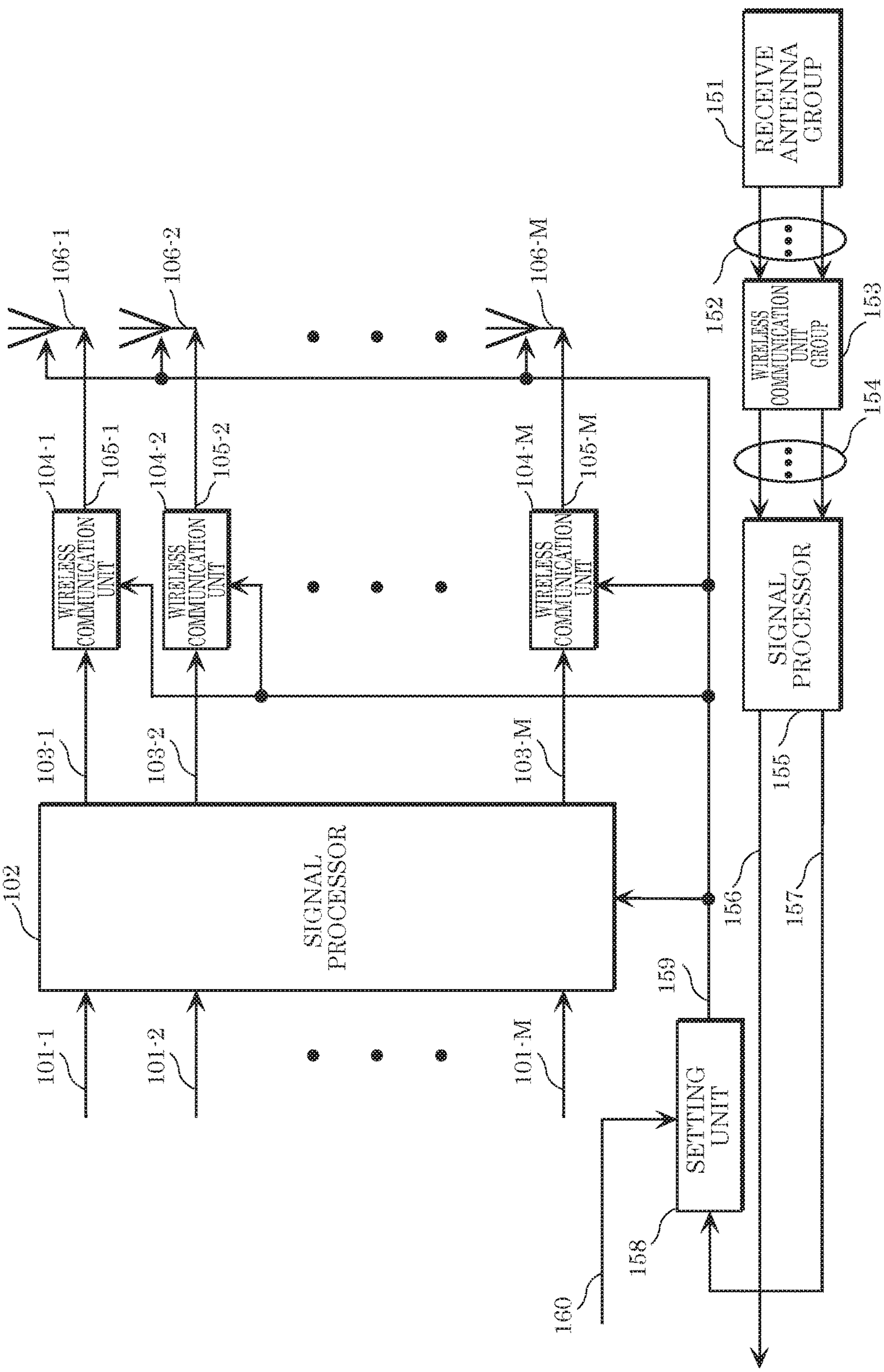
FIG. 1 is a diagram illustrating an example of a configuration of a base station.

FIG. 1 illustrates an example of a configuration of a base station (or an access point, for instance) in the present embodiment.

101-1 denotes #1 information, 101-2 denotes #2 information, . . . , and 101-M denotes #M information. 101-*i* denotes #i information, where i is an integer of 1 or greater and M or smaller. Note that M is an integer greater than or equal to 2. Note that not all the information items from #1 information to #M information are necessarily present.

Signal processor 102 receives inputs of #1 information 101-1, #2 information 101-2, . . . , #M information 101-M, and control signal 159. Signal processor 102 performs signal processing based on information included in control signal 159 such as "information on a method of error correction coding (a coding rate, a code length (block length))", "information on a modulation method", "information on precoding", "a transmitting method (multiplexing method)", "whether to perform transmission for multicasting or transmission for unicasting (transmission for multicasting and transmission for unicasting may be carried out simultaneously)", "the number of transmission streams when multicasting is performed", and "a transmitting method performed when transmitting a modulated signal for multicasting (this point will be later described in detail)", and outputs signal 103-1 obtained as a result of the signal processing, signal 103-2 obtained as a result of the signal processing, . . . , and signal 103-M obtained as a result of the signal processing, that is, signal 103-*i* obtained as a result of the signal processing. Note that not all the signals from signal #1 obtained as a result of the signal processing to signal #M obtained as a result of the signal processing are necessarily present. At this time, signal processor 102 performs error correction coding on #i information 101-*i*, and thereafter maps resultant information according to a modulation method which has been set, thus obtaining a baseband signal.

Signal processor 102 collects baseband signals corresponding to information items, and precodes the baseband signals. For example, orthogonal frequency division multiplexing (OFDM) may be applied.

Wireless communication unit 104-1 receives inputs of signal 103-1 obtained as a result of the signal processing and control signal 159. Wireless communication unit 104-1 performs processing such as band limiting, frequency conversion, and amplification, based on control signal 159, and outputs transmission signal 105-1. Then, transmission signal 105-1 is output as a radio wave from antenna unit 106-1.

Similarly, wireless communication unit 104-2 receives inputs of signal 103-2 obtained as a result of the signal processing and control signal 159. Wireless communication unit 104-2 performs processing such as band limiting, frequency conversion, and amplification, based on control signal 159, and outputs transmission signal 105-2. Then, transmission signal 105-2 is output as a radio wave from antenna unit 106-2. A description of wireless communication unit 104-3 to wireless communication unit 104-(M−1) is omitted.

Wireless communication unit 104-M receives inputs of signal 103-M obtained as a result of the signal processing and control signal 159. Wireless communication unit 104-M performs processing such as band limiting, frequency conversion, and amplification, based on control signal 159, and outputs transmission signal 105-M. Then, transmission signal 105-M is output as a radio wave from antenna unit 106-M.

Note that the wireless communication units may not perform the above processing when a signal obtained as a result of the signal processing is not present.

Wireless communication unit group 153 receives inputs of received signal group 152 received by receive antenna group 151. Wireless communication unit group 153 performs processing such as frequency conversion and outputs baseband signal group 154.

Signal processor 155 receives an input of baseband signal group 154, and performs demodulation and error correction decoding, and thus also performs processing such as time synchronization, frequency synchronization, and channel estimation. At this time, signal processor 155 receives modulated signals transmitted by one or more terminals and performs processing, and thus obtains data transmitted by the one or more terminals and control information transmitted by the one or more terminals. Accordingly, signal processor 155 outputs data group 156 corresponding to the one or more terminals, and control information group 157 corresponding to the one or more terminals.

Setting unit 158 receives inputs of control information group 157 and setting signal 160. Setting unit 158 determines, based on control information group 157, "a method of error correction coding (a coding rate, a code length (block length))", "a modulation method", "a precoding method", "a transmitting method", "antenna settings", "whether to perform transmission for multicasting or transmission for unicasting (transmission for multicasting and transmission for unicasting may be carried out simultaneously)", "the number of transmission streams when multicasting is performed", and "a transmitting method performed when transmitting a modulated signal for multicasting", for instance, and outputs control signal 159 that includes such information items determined.

Antenna units 106-1, 106-2, . . . , and 106-M each receive an input of control signal 159. The operation at this time is to be described with reference to FIG. 2.

Figure 2:
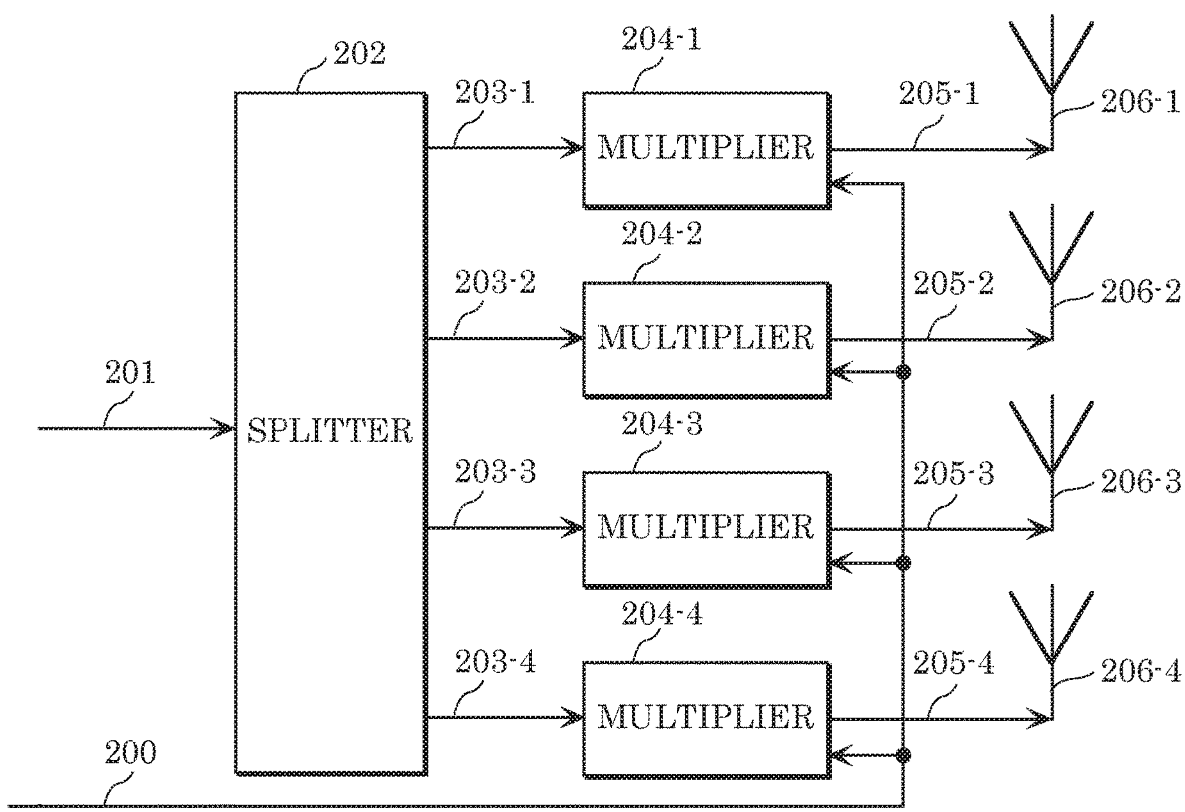
FIG. 2 is a diagram illustrating an example of a configuration of an antenna unit of the base station.

FIG. 2 illustrates an example of a configuration of antenna units 106-1, 106-2, . . . , and 106-M. Each antenna unit includes a plurality of antennas, as illustrated in FIG. 2. Note that FIG. 2 illustrates four antennas, yet each antenna unit may include at least two antennas. Note that the number of antennas is not limited to 4.

FIG. 2 illustrates a configuration of antenna unit 106-*i*, where i is an integer of 1 or greater and M or smaller.

Splitter 202 receives an input of transmission signal 201 (corresponding to transmission signal 105-*i* in FIG. 1). Splitter 202 splits transmission signal 201, and outputs signals 203-1, 203-2, 203-3, and 203-4.

Multiplier 204-1 receives inputs of signal 203-1 and control signal 200 (corresponding to control signal 159 in FIG. 1). Multiplier 204-1 multiplies signal 203-1 by coefficient W1, based on information on a multiplication coefficient included in control signal 200, and outputs signal 205-1 obtained as a result of the multiplication. Note that coefficient W1 can be defined by a complex number. Accordingly, W1 can also be a real number. Thus, if signal 203-1 is v1(t), signal 205-1 obtained as a result of the multiplication can be expressed by W1×v1(t) (t denotes time). Then, signal 205-1 obtained as a result of the multiplication is output as a radio wave from antenna 206-1.

Similarly, multiplier 204-2 receives inputs of signal 203-2 and control signal 200. Multiplier 204-2 multiplies signal 203-2 by coefficient W2, based on information on a multiplication coefficient included in control signal 200, and outputs signal 205-2 obtained as a result of the multiplication. Note that coefficient W2 can be defined by a complex number. Accordingly, W2 can also be a real number. Thus, if signal 203-2 is v2(t), signal 205-2 obtained as a result of the multiplication can be expressed by W2×v2(t) (t denotes time). Then, signal 205-2 obtained as a result of the multiplication is output as a radio wave from antenna 206-2.

Multiplier 204-3 receives inputs of signal 203-3 and control signal 200. Multiplier 204-3 multiplies signal 203-3 by coefficient W3, based on information on a multiplication coefficient included in control signal 200, and outputs signal 205-3 obtained as a result of the multiplication. Note that coefficient W3 can be defined by a complex number. Accordingly, W3 can also be a real number. Thus, if signal 203-3 is expressed by v3(t), signal 205-3 obtained as a result of the multiplication can be expressed by W3×v3(t) (t denotes time). Then, signal 205-3 obtained as a result of the multiplication is output as a radio wave from antenna 206-3.

Multiplier 204-4 receives inputs of signal 203-4 and control signal 200. Multiplier 204-2 multiplies signal 203-4 by coefficient W4, based on information on a multiplication coefficient included in control signal 200, and outputs signal 205-4 obtained as a result of the multiplication. Note that coefficient W4 can be defined by a complex number. Accordingly, W4 can also be a real number. Thus, if signal 203-4 is v4(t), signal 205-4 obtained as a result of the multiplication can be expressed by W4×v4(t) (t denotes time). Then, signal 205-4 obtained as a result of the multiplication is output as a radio wave from antenna 206-4.

Note that the absolute value of W1, the absolute value of W2, the absolute value of W3, and the absolute value of W4 may be equal to one another.

Figure 3:
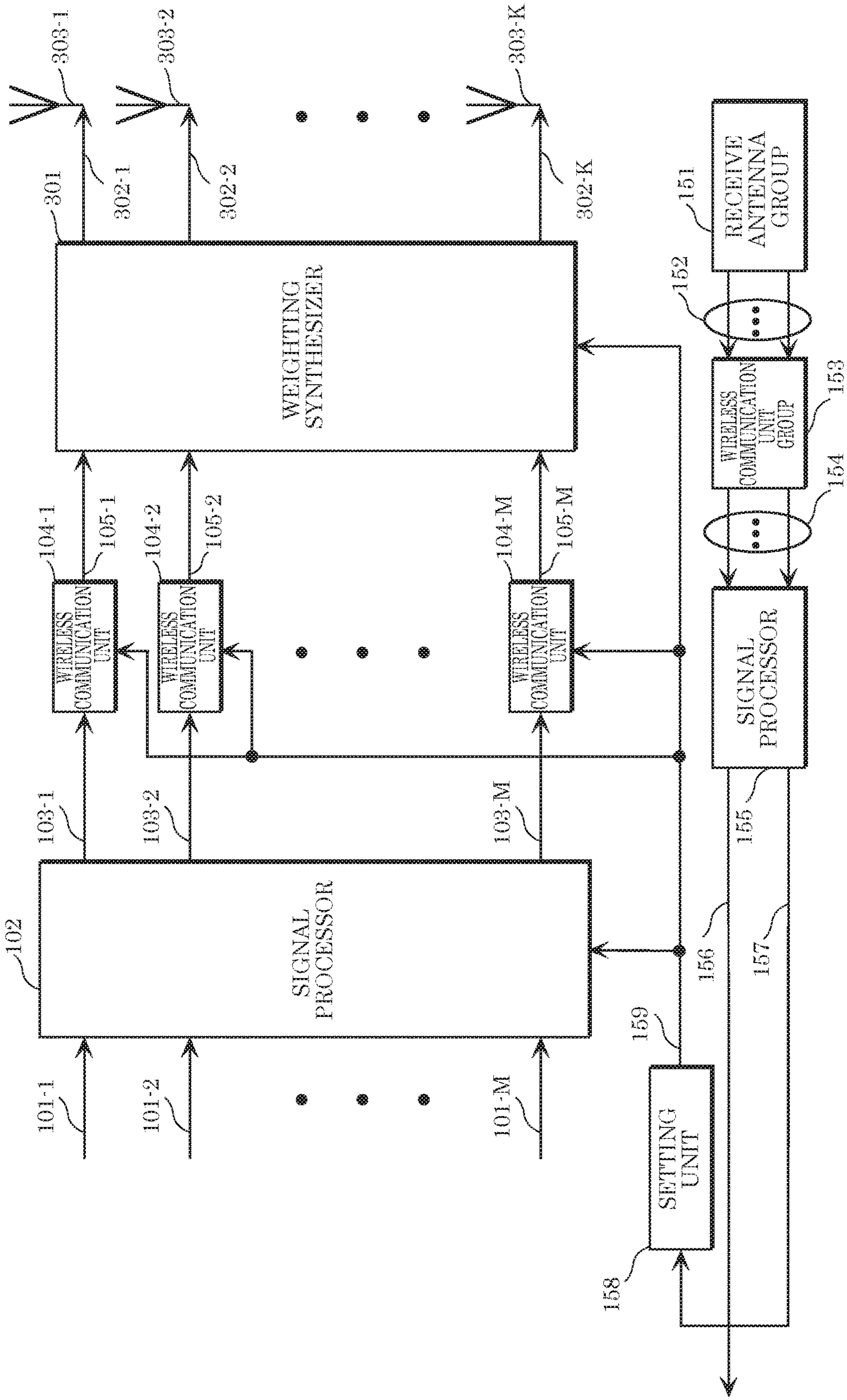
FIG. 3 is a diagram illustrating an example of a configuration of the base station.

FIG. 3 illustrates a configuration of the base station different from the configuration of the base station in FIG. 1 in the present embodiment. In FIG. 3, the same reference signs are assigned to elements which operate in the same manner as those in FIG. 1, and a description thereof is omitted below.

Weighting synthesizer 301 receives inputs of modulated signal 105-1, modulated signal 105-2, . . . , modulated signal 105-M, and control signal 159. Then, weighting synthesizer 301 weighting synthesizes modulated signal 105-1, modulated signal 105-2, . . . , and modulated signal 105-M, based on information on weighting synthesis included in control signal 159, and outputs signals 302-1, 302-2, . . . , and 302-K obtained as a result of the weighting synthesis. K is an integer of 1 or greater. Signal 302-1 obtained as a result of the weighting synthesis is output as a radio wave from antenna 303-1, signal 302-2 obtained as a result of the weighting synthesis is output as a radio wave from antenna 303-2, . . . , and signal 302-K obtained as a result of the weighting synthesis is output as a radio wave from antenna 303-K.

Signal $y_i(t)$ 302-*i* (i is an integer of 1 or greater and K or smaller) obtained as a result of the weighting synthesis is expressed as follows (t denotes time).

[Math. 1]

$$y_i(t) = A_{i1} \times x_1(t) + A_{i2} \times x_2(t) + \ldots + A_{iM} \times x_M(t) = \sum_{j=1}^{M} A_{ij} \times x_j(t) \qquad \text{Expression (1)}$$

Note that in Expression (1), $A_{ij}$ is a value which can be defined by a complex number. Accordingly, $A_{ij}$ can also be a real number, and $x_j(t)$ is modulated signal 105-*j*, where j is an integer of 1 or greater and M or smaller.

Figure 4:
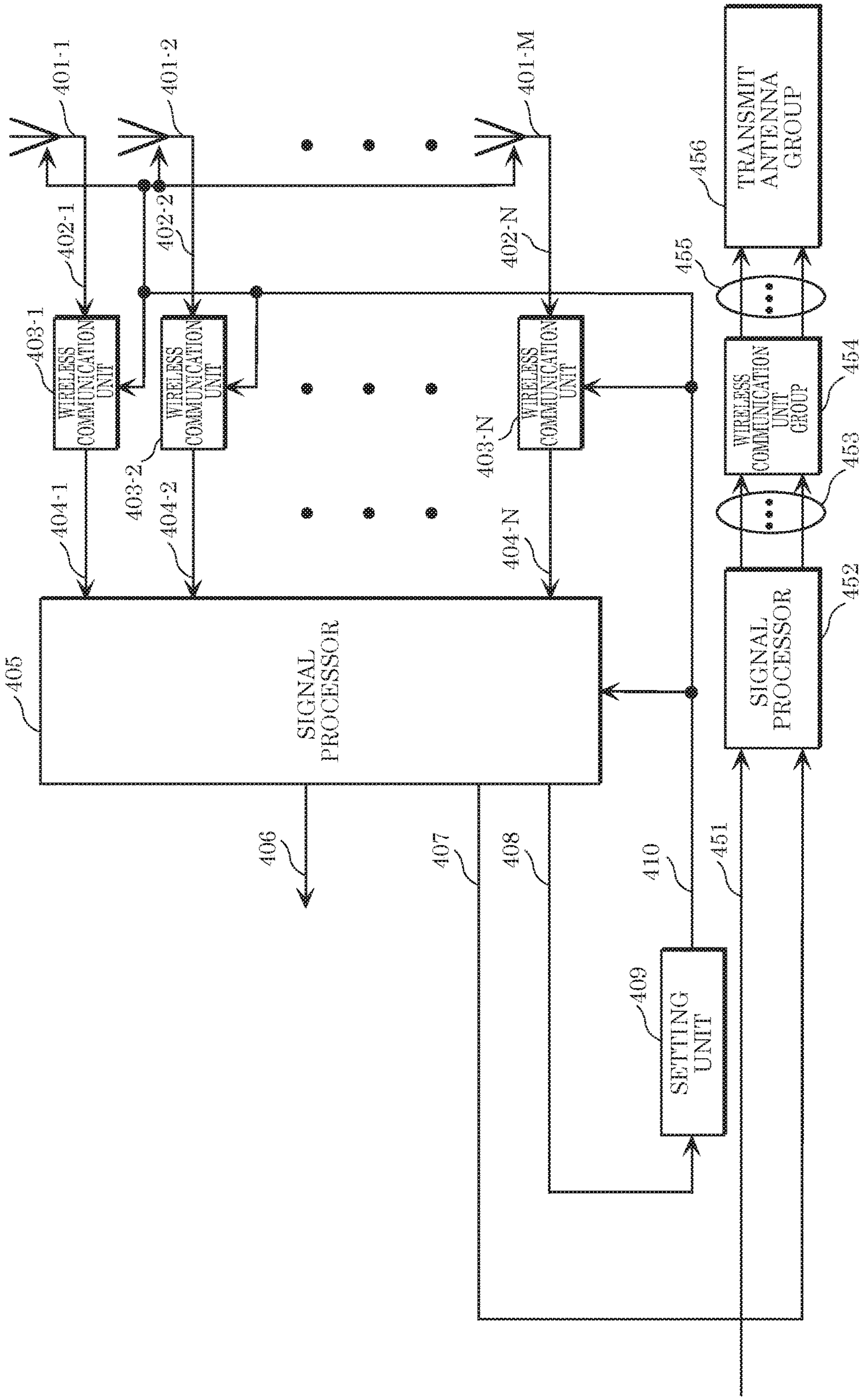
FIG. 4 is a diagram illustrating an example of a configuration of a terminal.

FIG. 4 illustrates an example of a configuration of a terminal. Antenna units 401-1, 401-2, . . . , and 401-N each receive an input of control signal 410, where N is an integer of 1 or greater.

Wireless communication unit 403-1 receives inputs of received signal 402-1 received by antenna unit 401-1 and control signal 410. Based on control signal 410, wireless communication unit 403-1 performs processing such as frequency conversion on received signal 402-1, and outputs baseband signal 404-1.

Similarly, wireless communication unit 403-2 receives inputs of received signal 402-2 received by antenna unit 401-2 and control signal 410. Based on control signal 410, wireless communication unit 403-2 performs processing such as frequency conversion on received signal 402-2, and outputs baseband signal 404-2. Note that a description of wireless communication units 403-3 to 403-(N−1) is omitted.

Wireless communication unit 403-N receives inputs of received signal 402-N received by antenna unit 401-N and control signal 410. Based on control signal 410, wireless communication unit 403-N performs processing such as frequency conversion on received signal 402-N, and outputs baseband signal 404-N.

Note that not all of wireless communication units 403-1, 403-2, . . . , and 403-N may operate. Accordingly, not all of baseband signals 404-1, 404-2, . . . , and 404-N are necessarily present.

Signal processor 405 receives inputs of baseband signals 404-1, 404-2, . . . , 404-N, and control signal 410. Based on control signal 410, signal processor 405 performs demodulation and error correction decoding processing, and outputs data 406, control information 407 for transmission, and control information 408. Specifically, signal processor 405 also performs processing such as time synchronization, frequency synchronization, and channel estimation.

Setting unit 409 receives an input of control information 408. Setting unit 409 performs setting with regard to a receiving method, and outputs control signal 410.

Signal processor 452 receives inputs of information 451 and control information 407 for transmission. Signal processor 452 performs processing such as error correction coding and mapping according to a modulation method which has been set, and outputs baseband signal group 453.

Wireless communication unit group 454 receives an input of baseband signal group 453. Wireless communication unit group 454 performs processing such as band limiting, frequency conversion, and amplification, and outputs transmission signal group 455. Transmission signal group 455 is output as a radio wave from transmit antenna group 456.

Figure 5:
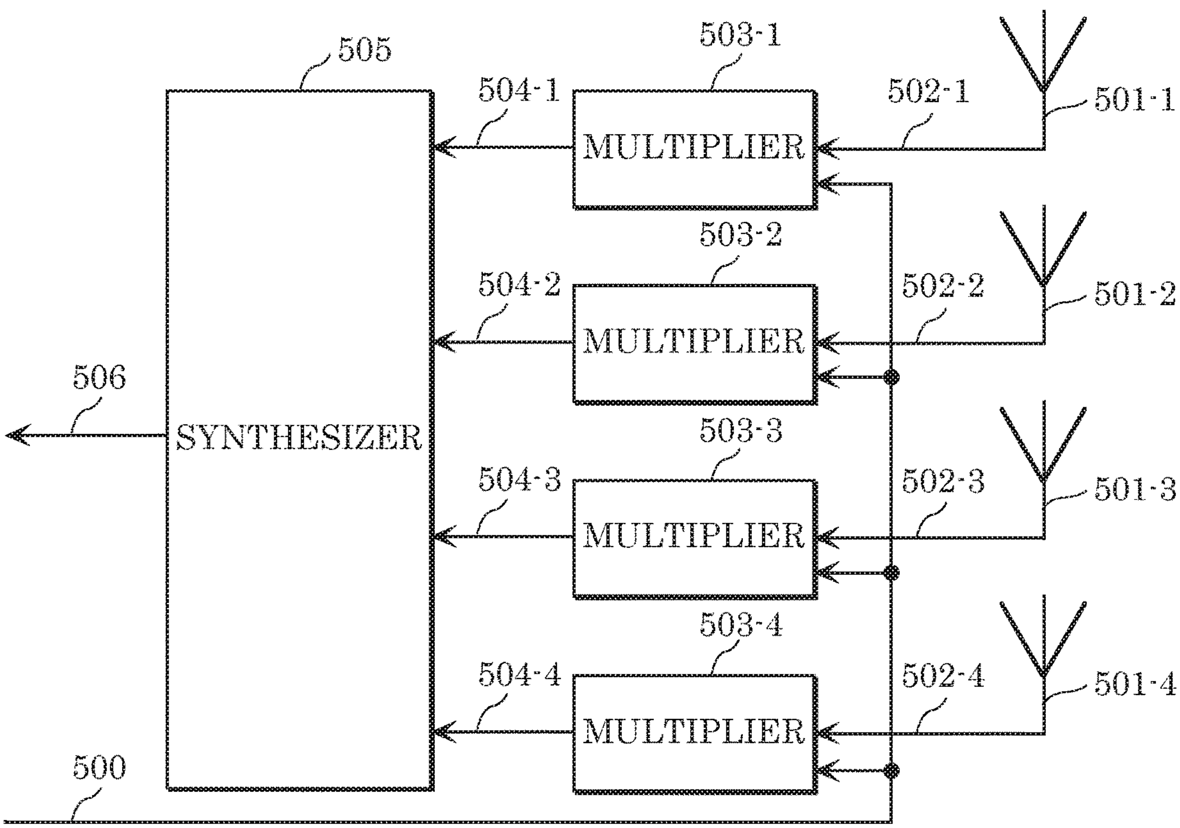
FIG. 5 is a diagram illustrating an example of a configuration of an antenna unit of a terminal.

FIG. 5 illustrates an example of a configuration of antenna units 401-1, 401-2, . . . , and 401-N. Each antenna unit includes a plurality of antennas, as illustrated in FIG. 5. Note that FIG. 5 illustrates four antennas, yet each antenna unit may include at least two antennas. Note that the number of antennas included in each antenna unit is not limited to 4.

FIG. 5 illustrates a configuration of antenna unit 401-*i*, where i is an integer of 1 or greater and N or smaller.

Multiplier 503-1 receives inputs of received signal 502-1 received by antenna 501-1 and control signal 500 (corresponding to control signal 410 in FIG. 4). Multiplier 503-1 multiplies received signal 502-1 by coefficient D1, based on information on a multiplication coefficient included in control signal 500, and outputs signal 504-1 obtained as a result of the multiplication. Note that coefficient D1 can be defined by a complex number. Accordingly, D1 can also be a real number. Thus, if received signal 502-1 is expressed by e1(t), signal 504-1 obtained as a result of the multiplication can be expressed by D1×e1(t) (t denotes time).

Similarly, multiplier 503-2 receives inputs of received signal 502-2 received by antenna 501-2 and control signal 500. Based on information on a multiplication coefficient included in control signal 500, multiplier 503-2 multiplies received signal 502-2 by coefficient D2, and outputs signal 504-2 obtained as a result of the multiplication. Note that coefficient D2 can be defined by a complex number. Accordingly, D2 can also be a real number. Thus, if received signal 502-2 is expressed by e2(t), signal 504-2 obtained as a result of the multiplication can be expressed by D2×e2(t) (t denotes time).

Multiplier 503-3 receives inputs of received signal 502-3 received by antenna 501-3 and control signal 500. Based on information on a multiplication coefficient included in control signal 500, multiplier 503-3 multiplies received signal 502-3 by coefficient D3, and outputs signal 504-3 obtained as a result of the multiplication. Note that coefficient D3 can be defined by a complex number. Accordingly, D3 can also be a real number. Thus, if received signal 502-3 is expressed by e3(t), signal 504-3 obtained as a result of the multiplication can be expressed by D3×e3(t) (t denotes time).

Multiplier 503-4 receives inputs of received signal 502-4 received by antenna 501-4 and control signal 500. Based on information on a multiplication coefficient included in control signal 500, multiplier 503-4 multiplies received signal 502-4 by coefficient D4, and outputs signal 504-4 obtained as a result of the multiplication. Note that coefficient D4 can be defined by a complex number. Accordingly, D4 can also be a real number. Thus, if received signal 502-4 is expressed by e4(t), signal 504-4 obtained as a result of the multiplication can be expressed by D4×e4(t) (t denotes time).

Synthesizer 505 receives inputs of signals 504-1, 504-2, 504-3, and 504-4 obtained as a result of the multiplication. Synthesizer 505 adds signals 504-1, 504-2, 504-3, and 504-4 obtained as a result of the multiplication, and outputs synthesized signal 506 (corresponding to received signal 402-*i* in FIG. 4). Thus, synthesized signal 506 is expressed by D1×e1(t)+D2×e2(t)+D3×e3(t)+D4×e4(t).

Figure 6:
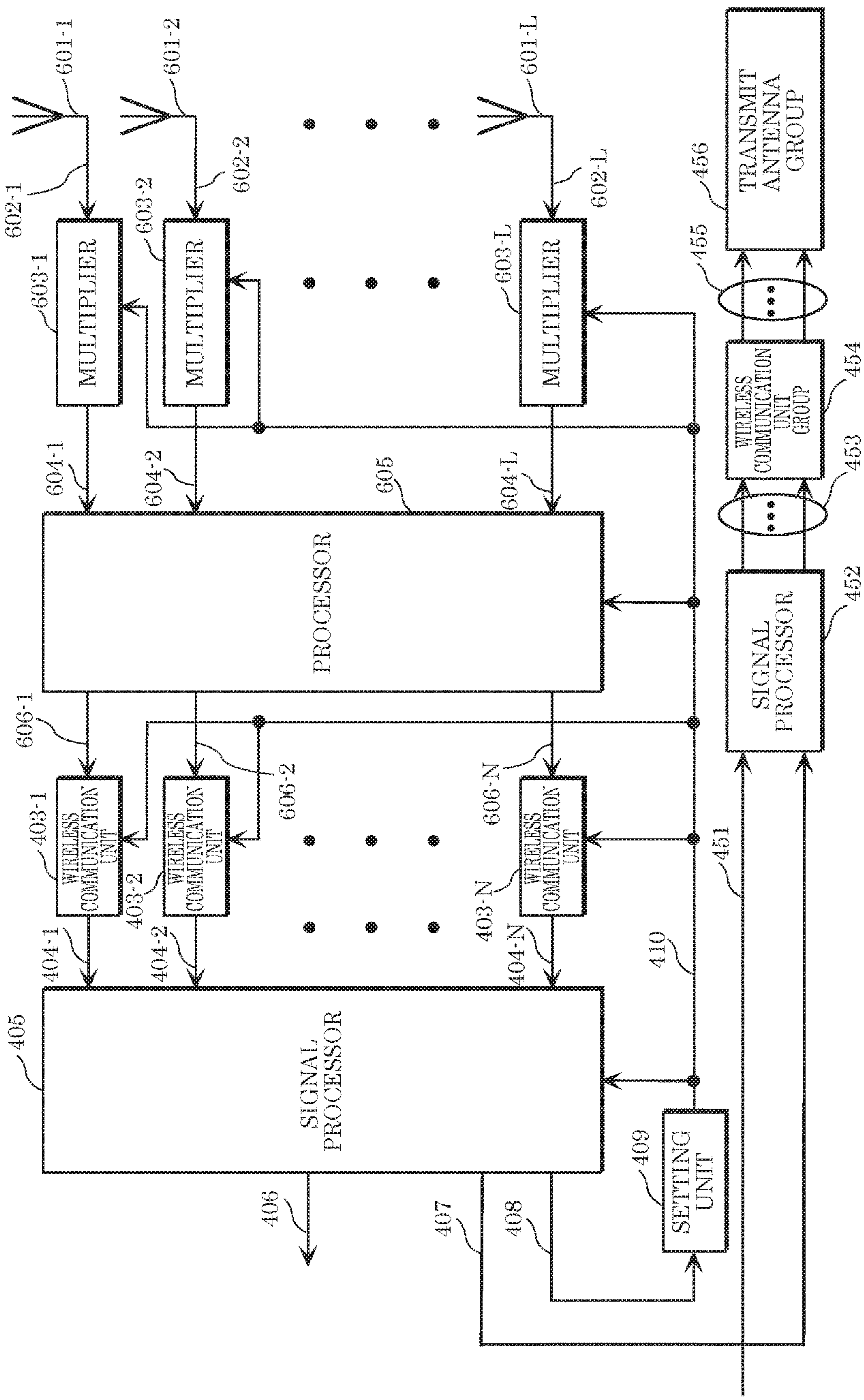
FIG. 6 is a diagram illustrating an example of a configuration of a terminal.

FIG. 6 illustrates a configuration of a terminal different from the configuration of the terminal in FIG. 4 in the present embodiment. Elements which operate in the same manner as those in FIG. 4 are assigned the same reference signs in FIG. 6, and a description thereof is omitted below.

Multiplier 603-1 receives inputs of received signal 602-1 received by antenna 601-1 and control signal 410. Based on information on a multiplication coefficient included in control signal 410, multiplier 603-1 multiplies received signal 602-1 by coefficient G1, and outputs signal 604-1 obtained as a result of the multiplication. Note that coefficient G1 can be defined by a complex number. Accordingly, G1 can also be a real number. Thus, if received signal 602-1 is expressed by c1(t), signal 604-1 obtained as a result of the multiplication can be expressed by G1×c1(t) (t denotes time).

Similarly, multiplier 603-2 receives inputs of received signal 602-2 received by antenna 601-2 and control signal 410. Based on information on a multiplication coefficient included in control signal 410, multiplier 603-2 multiplies received signal 602-2 by coefficient G2, and outputs signal 604-2 obtained as a result of the multiplication. Note that coefficient G2 can be defined by a complex number. Accordingly, G2 can also be a real number. Thus, if received signal 602-2 is expressed by c2(t), signal 604-2 obtained as a result of the multiplication can be expressed by G2×c2(t) (t denotes time). A description of multiplier 603-3 to multiplier 603-(L−1) is omitted.

Multiplier 603-L receives inputs of received signal 602-L received by antenna 601-L and control signal 410. Based on information on a multiplication coefficient included in control signal 410, multiplier 603-L multiplies received signal 602-L by coefficient GL, and outputs signal 604-L obtained as a result of the multiplication. Note that coefficient GL can be defined by a complex number. Accordingly, GL can also be a real number. Thus, if received signal 602-L is expressed by cL(t), signal 604-L obtained as a result of the multiplication can be expressed by GL×cL(t) (t denotes time).

Accordingly, multiplier 603-*i* receives inputs of received signal 602-*i* received by antenna 601-*i* and control signal 410. Based on information on a multiplication coefficient included in control signal 410, multiplier 603-*i* multiplies received signal 602-*i* by coefficient Gi, and outputs signal 604-*i* obtained as a result of the multiplication. Note that coefficient Gi can be defined by a complex number. Accordingly, Gi can also be a real number. Thus, if received signal 602-*i* is expressed by ci(t), signal 604-*i* obtained as a result of the multiplication can be expressed by Gi×ci(t) (t denotes time). Note that i is an integer of 1 or greater and L or smaller, and L is an integer of 2 or greater.

Processor 605 receives inputs of signals 604-1, 604-2, . . . , and 604-L obtained as a result of the multiplication and control signal 410. Based on control signal 410, processor 605 performs signal processing, and outputs signals 606-1, 606-2, . . . , and 606-N obtained as a result of the signal processing, where N is an integer of 2 or greater. At this time, signal 604-*i* obtained as a result of the multiplication is expressed by $p_i(t)$ (i is an integer of 1 or greater and L or smaller). Then, signal 606-*j* ($r_j(t)$) as a result of the processing is expressed as follows (j is an integer of 1 or greater and N or smaller).

[Math. 2]

$$r_j(t) = B_{j1} \times p_1(t) + B_{j2} \times p_2(t) + \ldots + B_{jL} \times p_L(t) = \sum_{i=1}^{L} B_{ji} \times p_i(t) \qquad \text{Expression (2)}$$

Note that in Expression (2), $B_{ji}$ is a value which can be defined by a complex number. Accordingly, $B_{ji}$ can also be a real number.

Figure 7:
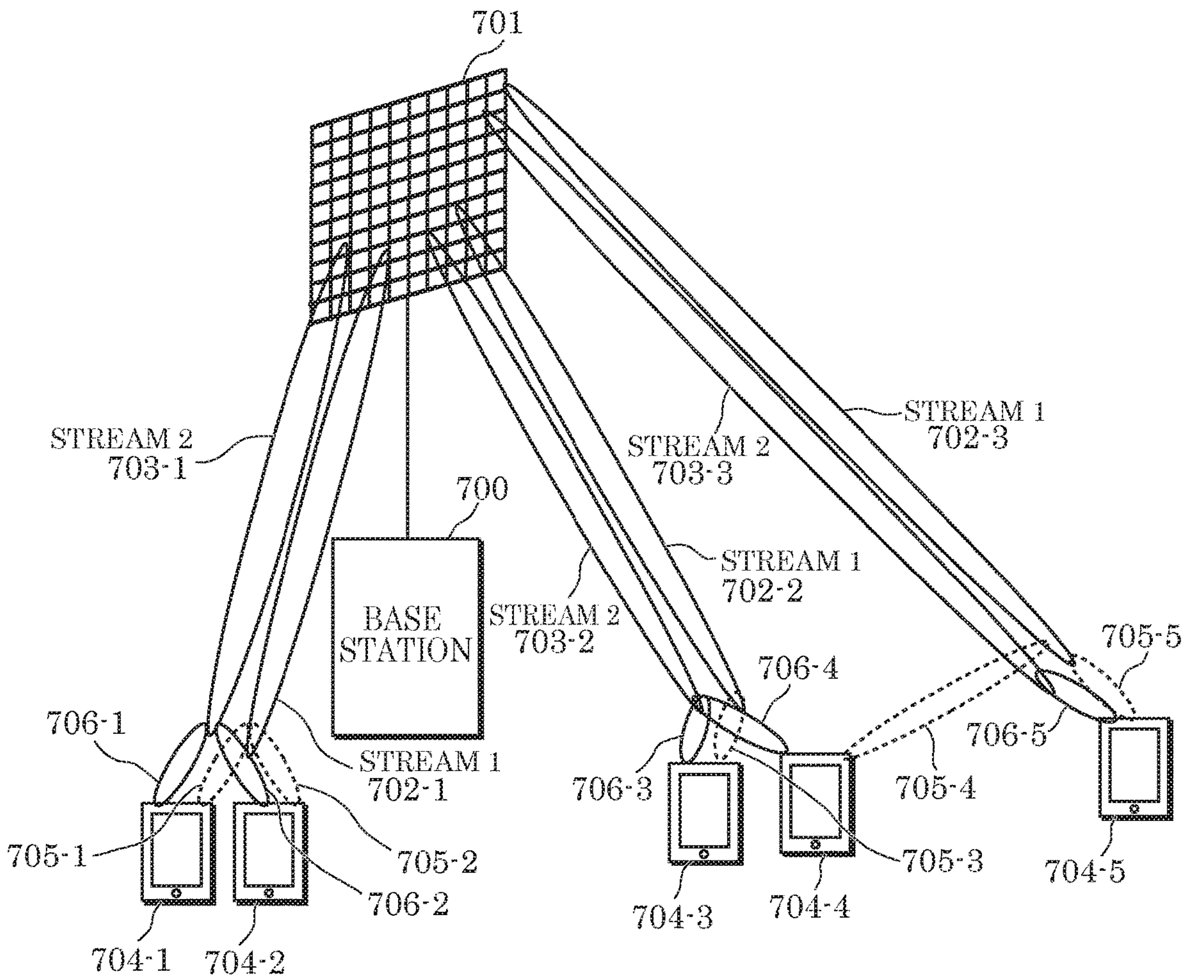
FIG. 7 is a diagram illustrating an example of a state of communication between the base station and terminals.

FIG. 7 illustrates an example of a state of communication between the base station and terminals. Note that the base station may be referred to as an access point or a broadcast station, for instance.

Base station 700 includes a plurality of antennas, and transmits a plurality of transmission signals from antenna 701 for transmission. At this time, base station 700 has a configuration as illustrated in FIG. 1 or 3, for example, and performs transmission beamforming (directivity control) by signal processor 102 (and/or weighting synthesizer 301) performing precoding (weighting synthesis).

FIG. 7 illustrates transmission beam 702-1 for transmitting data of stream 1, transmission beam 702-2 for transmitting data of stream 1, and transmission beam 702-3 for transmitting data of stream 1.

FIG. 7 illustrates transmission beam 703-1 for transmitting data of stream 2, transmission beam 703-2 for transmitting data of stream 2, and transmission beam 703-3 for transmitting data of stream 2.

Note that in FIG. 7, the number of transmission beams for transmitting data of stream 1 is 3 and the number of transmission beams for transmitting data of stream 2 is 3, yet the present disclosure is not limited to such numbers. The number of transmission beams for transmitting data of stream 1 may be at least two, and the number of transmission beams for transmitting data of stream 2 may be at least two.

FIG. 7 includes terminals 704-1, 704-2, 704-3, 704-4, and 704-5, and the terminals have the configuration same as the configuration of the terminals illustrated in FIGS. 4 and 5, for example.

For example, terminal 704-1 performs directivity control for receiving, via "signal processor 405" and/or "antennas 401-1 to 401-N" and/or "multipliers 603-1 to 603-L and processor 605", and forms receiving directivity 705-1 and receiving directivity 706-1. Receiving directivity 705-1 allows terminal 704-1 to receive and demodulate transmission beam 702-1 for transmitting data of stream 1, and receiving directivity 706-1 allows terminal 704-1 to receive and demodulate transmission beam 703-1 for transmitting data of stream 2.

Similarly, terminal 704-2 performs directivity control for receiving, via "signal processor 405" and/or "antennas 401-1 to 401-N" and/or "multipliers 603-1 to 603-L and processor 605", and forms receiving directivity 705-2 and receiving directivity 706-2. Receiving directivity 705-2 allows terminal 704-2 to receive and demodulate transmission beam 702-1 for transmitting data of stream 1, and receiving directivity 706-2 allows terminal 704-2 to receive and demodulate transmission beam 703-1 for transmitting data of stream 2.

Terminal 704-3 performs directivity control for receiving, via "signal processor 405" and/or "antennas 401-1 to 401-N" and/or "multipliers 603-1 to 603-L and processor 605", and forms receiving directivity 705-3 and receiving directivity 706-3.

Receiving directivity 705-3 allows terminal 704-3 to receive and demodulate transmission beam 702-2 for transmitting data of stream 1, and receiving directivity 706-3 allows terminal 704-3 to receive and demodulate transmission beam 703-2 for transmitting data of stream 2.

Terminal 704-4 performs directivity control for receiving, via "signal processor 405" and/or "antennas 401-1 to 401-N" and/or "multipliers 603-1 to 603-L and processor 605", and forms receiving directivity 705-4 and receiving directivity 706-4. Receiving directivity 705-4 allows terminal 704-4 to receive and demodulate transmission beam 702-3 for transmitting data of stream 1, and receiving directivity 706-4 allows terminal 704-4 to receive and demodulate transmission beam 703-2 for transmitting data of stream 2.

Terminal 704-5 performs directivity control for receiving, via "signal processor 405" and/or "antennas 401-1 to 401-N" and/or "multipliers 603-1 to 603-L and processor 605", and forms receiving directivity 705-5 and receiving directivity 706-5. Receiving directivity 705-5 allows terminal 704-5 to receive and demodulate transmission beam 702-3 for transmitting data of stream 1, and receiving directivity 706-5 allows terminal 704-5 to receive and demodulate transmission beam 703-3 for transmitting data of stream 2.

In FIG. 7, a terminal selects, according to a spatial position, at least one transmission beam from among transmission beams 702-1, 702-2, and 702-3 for transmitting data of stream 1, and can obtain data of stream 1 with high quality by directing a receiving directivity to the selected transmission beam(s). Furthermore, the terminal selects, according to a spatial position, at least one transmission beam from among transmission beams 703-1, 703-2, and 703-3 for transmitting data of stream 2, and can obtain data of stream 2 with high quality by directing a receiving directivity to the selected transmission beam(s).

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Base station 700 transmits transmission beam 702-3 for transmitting data of stream 1 and transmission beam 703-3 for transmitting data of stream 2, using the same frequency (the same frequency band) at the same time.

Transmission beams 702-1, 702-2, and 702-3 for transmitting data of stream 1 may be beams having the same frequency (the same frequency band) or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

A description of operation of setting unit 158 of the base station in FIGS. 1 and 3 is to be given.

Setting unit 158 receives an input of setting signal 160. Setting signal 160 includes information with regard to "whether to perform transmission for multicasting or transmission for unicasting", and if the base station performs transmission as illustrated in FIG. 7, information indicating "to perform transmission for multicasting" is input to setting unit 158 according to setting signal 160.

Setting signal 160 includes information with regard to "the number of transmission streams when multicasting is performed" and if the base station performs transmission as illustrated in FIG. 7, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 7, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", information with regard to "how many transmission beams are to be used to transmit each stream". Accordingly, a terminal can appropriately receive data. A configuration of a control information symbol will be later described in detail.

Figure 8:
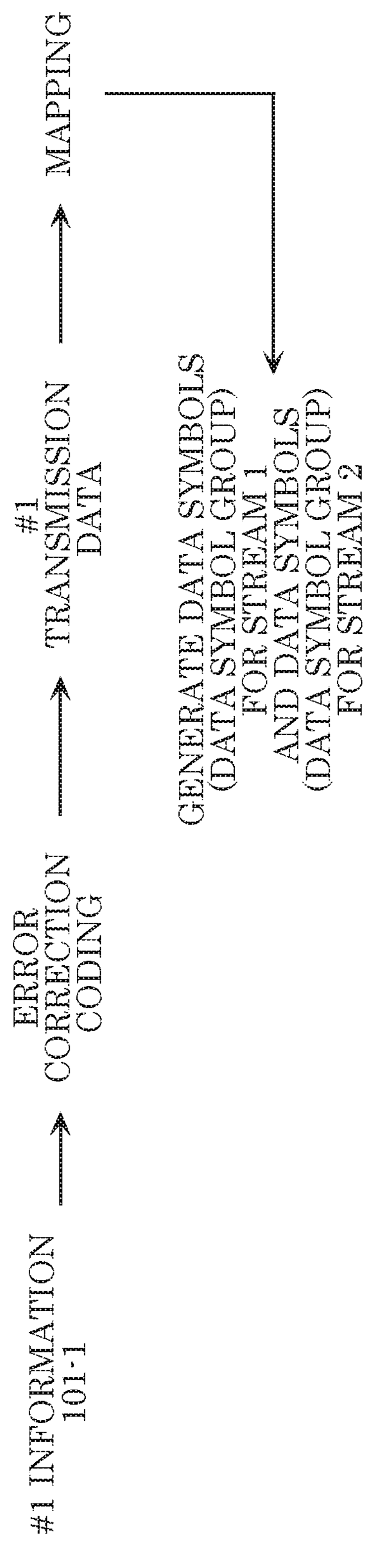
FIG. 8 is a diagram for describing a relation of a plurality of streams.

FIG. 8 is a drawing for describing a relation between #i information 101-*i* in FIGS. 1 and 3 and "stream 1" and "stream 2" described with reference to FIG. 7. For example, processing such as error correction coding is performed on #1 information 101-1, and data obtained as a result of the error correction coding is obtained. The data obtained as a result of the error correction coding is named #1 transmission data. Data symbols are obtained by mapping #1 transmission data. By separating data symbols into data symbols for stream 1 and data symbols for stream 2, data symbols (data symbol group) for stream 1 and data symbols (data symbol group) for stream 2 are obtained. The symbol group for stream 1 includes data symbols (data symbol group) for stream 1, and is transmitted from the base station in FIGS. 1 and 3. The symbol group for stream 2 includes data symbols (data symbol group) for stream 2, and is transmitted from the base station in FIGS. 1 and 3.

Figure 9:
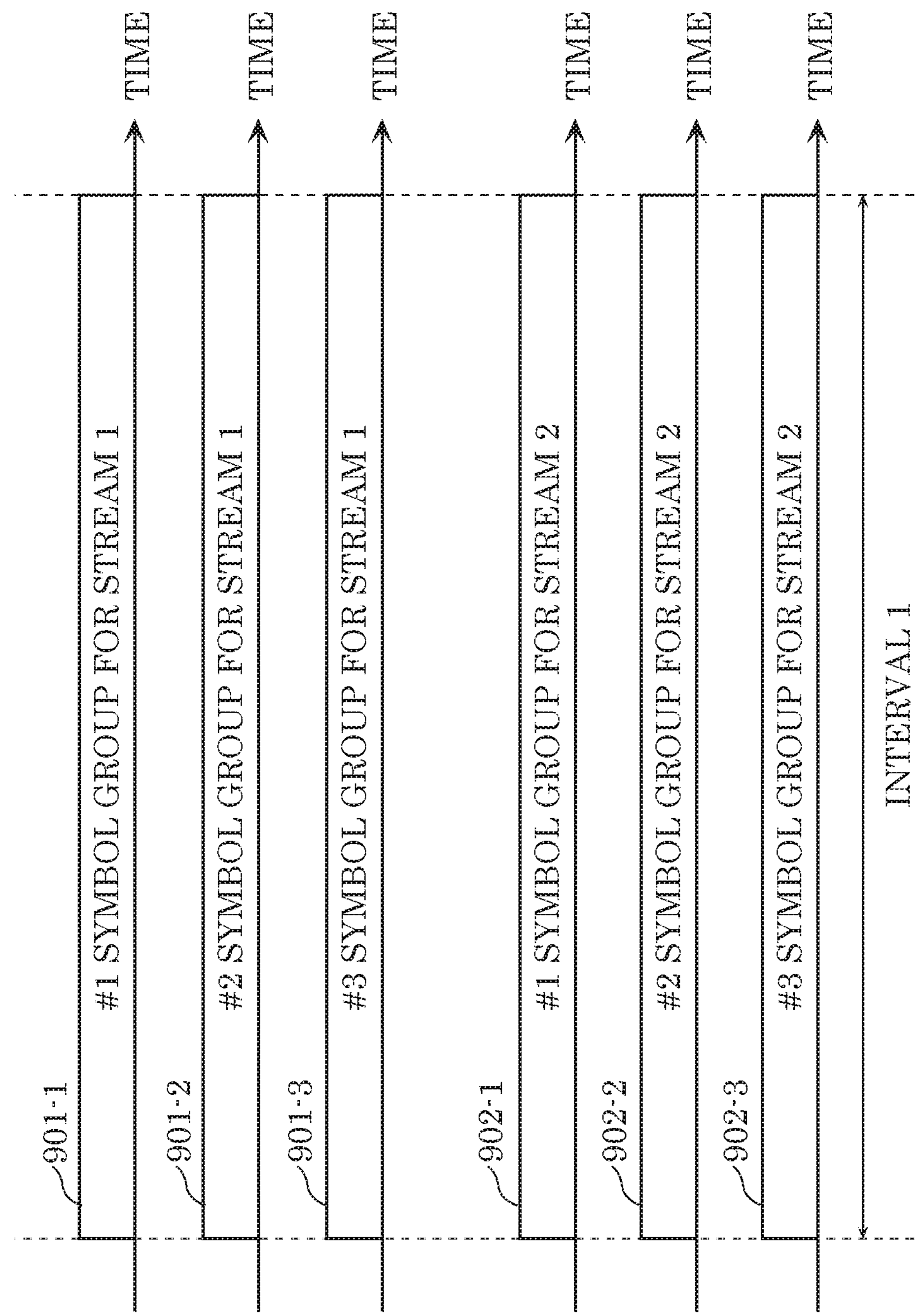
FIG. 9 is a diagram illustrating an example of a frame configuration.

FIG. 9 illustrates an example of a frame configuration when the horizontal axis indicates time.

#1 symbol group 901-1 for stream 1 in FIG. 9 is a symbol group for transmission beam 702-1 for transmitting data of stream 1 in FIG. 7.

#2 symbol group 901-2 for stream 1 in FIG. 9 is a symbol group for transmission beam 702-2 for transmitting data of stream 1 in FIG. 7.

#3 symbol group 901-3 for stream 1 in FIG. 9 is a symbol group for transmission beam 702-3 for transmitting data of stream 1 in FIG. 7.

#1 symbol group 902-1 for stream 2 in FIG. 9 is a symbol group for transmission beam 703-1 for transmitting data of stream 2 in FIG. 7.

#2 symbol group 902-2 for stream 2 in FIG. 9 is a symbol group for transmission beam 703-2 for transmitting data of stream 2 in FIG. 7. #3 symbol group 902-3 for stream 2 in FIG. 9 is a symbol group for transmission beam 703-3 for transmitting data of stream 2 in FIG. 7.

#1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 are present in time interval 1, for example.

As described above, #1 symbol group 901-1 for stream 1 and #2 symbol group 902-1 for stream 2 are transmitted using the same frequency (the same frequency band), #2 symbol group 901-2 for stream 1 and #2 symbol group 902-2 for stream 2 are transmitted using the same frequency (the same frequency band), and #3 symbol group 901-3 for stream 1 and #3 symbol group 902-3 for stream 2 are transmitted using the same frequency (the same frequency band).

For example, "data symbol group A for stream 1" and "data symbol group A for stream 2" are generated from information, following the procedure in FIG. 8. The symbol group, namely "data symbol group A-1 for stream 1" which includes the same symbols as symbols included in "data symbol group A for stream 1", the symbol group, namely "data symbol group A-2 for stream 1" which includes the same symbols as symbols included in "data symbol group A for stream 1", and the symbol group, namely "data symbol group A-3 for stream 1" which includes the same symbols as symbols included in "data symbol group A for stream 1" are prepared.

Thus, the symbols included in "data symbol group A-1 for stream 1", the symbols included in "data symbol group A-2 for stream 1", and the symbols included in "data symbol group A-3 for stream 1" are the same.

At this time, #1 symbol group 901-1 for stream 1 in FIG. 9 includes "data symbol group A-1 for stream 1", #2 symbol group 901-2 for stream 1 in FIG. 9 includes "data symbol group A-2 for stream 1", and #3 symbol group 901-3 for stream 1 in FIG. 9 includes "data symbol group A-3 for stream 1". Accordingly, #1 symbol group 901-1 for stream 1, #2 symbol group 901-2 for stream 1, and #3 symbol group 901-3 for stream 1 include the same data symbol group.

The symbol group, namely "data symbol group A-1 for stream 2" which includes the same symbols as symbols included in "data symbol group A for stream 2", the symbol group, namely "data symbol group A-2 for stream 2" which includes the same symbols as symbols included in "data symbol group A for stream 2", and the symbol group, namely "data symbol group A-3 for stream 2" which includes the same symbols as symbols included in "data symbol group A for stream 2" are prepared.

Accordingly, the symbols included in "data symbol group A-1 for stream 2", the symbols included in "data symbol group A-2 for stream 2", and the symbols included in "data symbol group A-3 for stream 2" are the same.

At this time, #1 symbol group 902-1 for stream 2 in FIG. 9 includes "data symbol group A-1 for stream 2", #2 symbol group 902-2 for stream 2 in FIG. 9 includes "data symbol group A-2 for stream 2", and #3 symbol group 902-3 for stream 2 in FIG. 9 includes "data symbol group A-3 for stream 2". Accordingly, #1 symbol group 902-1 for stream 2, #2 symbol group 902-2 for stream 2, and #3 symbol group 902-3 for stream 2 include the same data symbol group.

Figure 10:
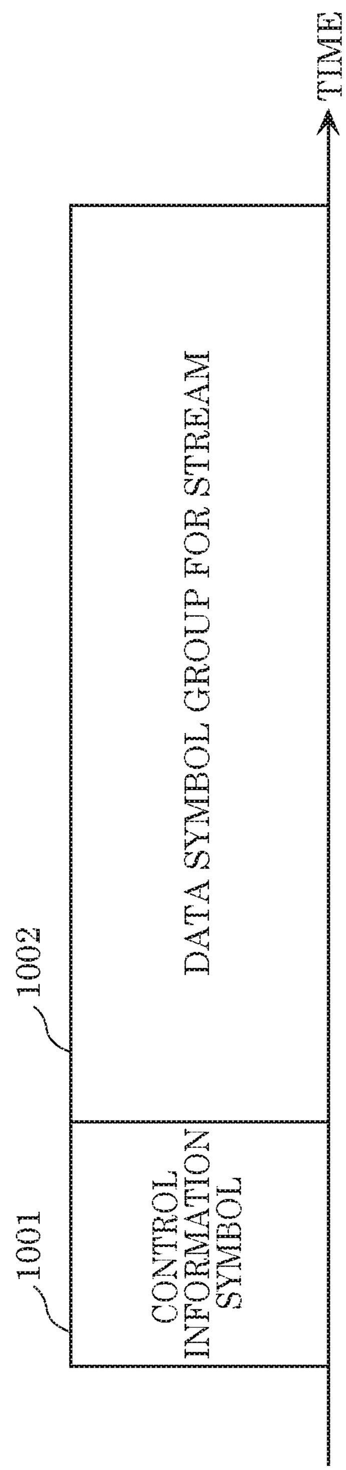
FIG. 10 is a diagram illustrating an example of a frame configuration.

FIG. 10 illustrates an example of a frame configuration of "symbol group #Y for stream X" (X=1, 2; Y=1, 2, 3) described with reference to FIG. 9. In FIG. 10, while the horizontal axis indicates time, 1001 denotes a control information symbol and 1002 denotes a data symbol group for a stream. At this time, data symbol group 1002 for the stream includes symbols for transmitting "data symbol group A for stream 1" or "data symbol group A for stream 2" described with reference to FIG. 9.

Note that a multi-carrier method such as the orthogonal frequency division multiplexing (OFDM) method may be used for the frame configuration in FIG. 10, and symbols may be present in the direction of the frequency axis, in this case. The symbols may include a reference symbol for a receiving device to perform time synchronization and frequency synchronization, a reference symbol for a receiving device to detect a signal, and a reference symbol for a receiving device to perform channel estimation, for instance. The frame configuration is not limited to the configuration in FIG. 10, and control information symbol 1001 and data symbol group 1002 for a stream may be arranged in any manner. Note that the reference symbol may be referred to as a preamble and a pilot symbol.

The following describes a configuration of control information symbol 1001.

Figure 11:
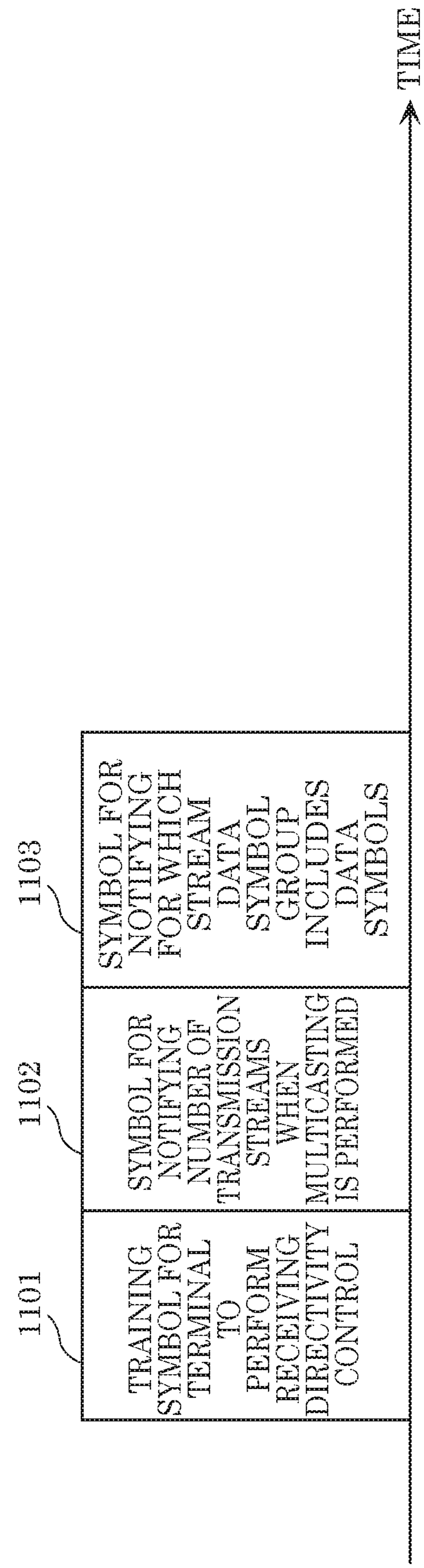
FIG. 11 is a diagram illustrating an example of a symbol configuration.

FIG. 11 illustrates an example of a configuration of symbols transmitted as a control information symbol in FIG. 10, and the horizontal axis indicates time. In FIG. 11, a terminal receives "training symbol for a terminal to perform receiving directivity control" 1101 to determine a signal processing method for the directivity control for receiving, which is implemented by "signal processor 405" and/or "antennas 401-1 to 401-N" and/or "multipliers 603-1 to 603-L and processor 605".

A terminal receives "symbol for notifying the number of transmission streams when multicasting is performed" 1102 so that the terminal is informed of the number of streams to be obtained.

A terminal receives "symbol for notifying for which stream data symbols are" 1103 so that the terminal can be informed which stream has been successfully received among the streams which the base station is transmitting.

A description of an example with regard to the above is to be given.

The case where the base station transmits streams using transmission beams as illustrated in FIG. 7 is to be described. Specific information indicated by a control information symbol in #1 symbol group 901-1 for stream 1 in FIG. 9 is to be described.

In the case of FIG. 7, since the base station is transmitting "stream 1" and "stream 2", information indicated by "symbol for notifying the number of transmission streams when multicasting is performed" 1102 indicates "2".

#1 symbol group 901-1 for stream 1 in FIG. 9 is for transmitting data symbols for stream 1, and thus information indicated by "symbol for notifying for which stream data symbols are" 1103 indicates "stream 1".

The case where, for example, a terminal receives #1 symbol group 901-1 for stream 1 in FIG. 9 is to be described. At this time, the terminal becomes aware that "the number of transmission streams is 2" from "symbol for notifying the number of transmission streams when multicasting is performed" 1102, and that the terminal has obtained "data symbols for stream 1" from "symbol 1103 for notifying for which stream data symbol group includes data symbols".

After that, since the terminal becomes aware that "the number of transmission streams is 2" and the obtained data symbols are "data symbols for stream 1", the terminal is aware that the terminal is to obtain "data symbols for stream 2". Thus, the terminal can start operation for searching for a symbol group for stream 2. For example, the terminal searches for one of transmission beams for transmitting #1 symbol group 902-1 for stream 2, #2 symbol group 902-2 for stream 2, and #3 symbol group 902-3 for stream 2 in FIG. 9.

Then, the terminal obtains one of transmission beams for transmitting #1 symbol group 902-1 for stream 2, #2 symbol group 902-2 for stream 2, and #3 symbol group 902-3 for stream 2, to obtain data symbols for both streams 1 and 2.

Configuring control information symbols in this manner yields an advantageous effect that a terminal can obtain data symbols precisely.

As described above, the base station transmits data symbols using a plurality of transmission beams, and a terminal selectively receives a transmission beam with good quality among the plurality of transmission beams in multicast transmission and broadcast data transmission, and furthermore, transmission directivity control and receiving directivity control have been performed on modulated signals transmitted by the base station, thus achieving advantageous effects of increasing an area where high data receiving quality is achieved.

In the above description, a terminal performs receiving directivity control, yet advantageous effects can be obtained as mentioned above without the terminal performing receiving directivity control.

Note that the modulating method for "data symbol group for a stream" 1002 in FIG. 10 may be any modulating method, and a mapping method according to the modulating method for "data symbol group for a stream" 1002 may be changed for each symbol. Accordingly, a phase of a constellation may be changed for each symbol on an in-phase I-quadrature Q plane after mapping.

Figure 12:
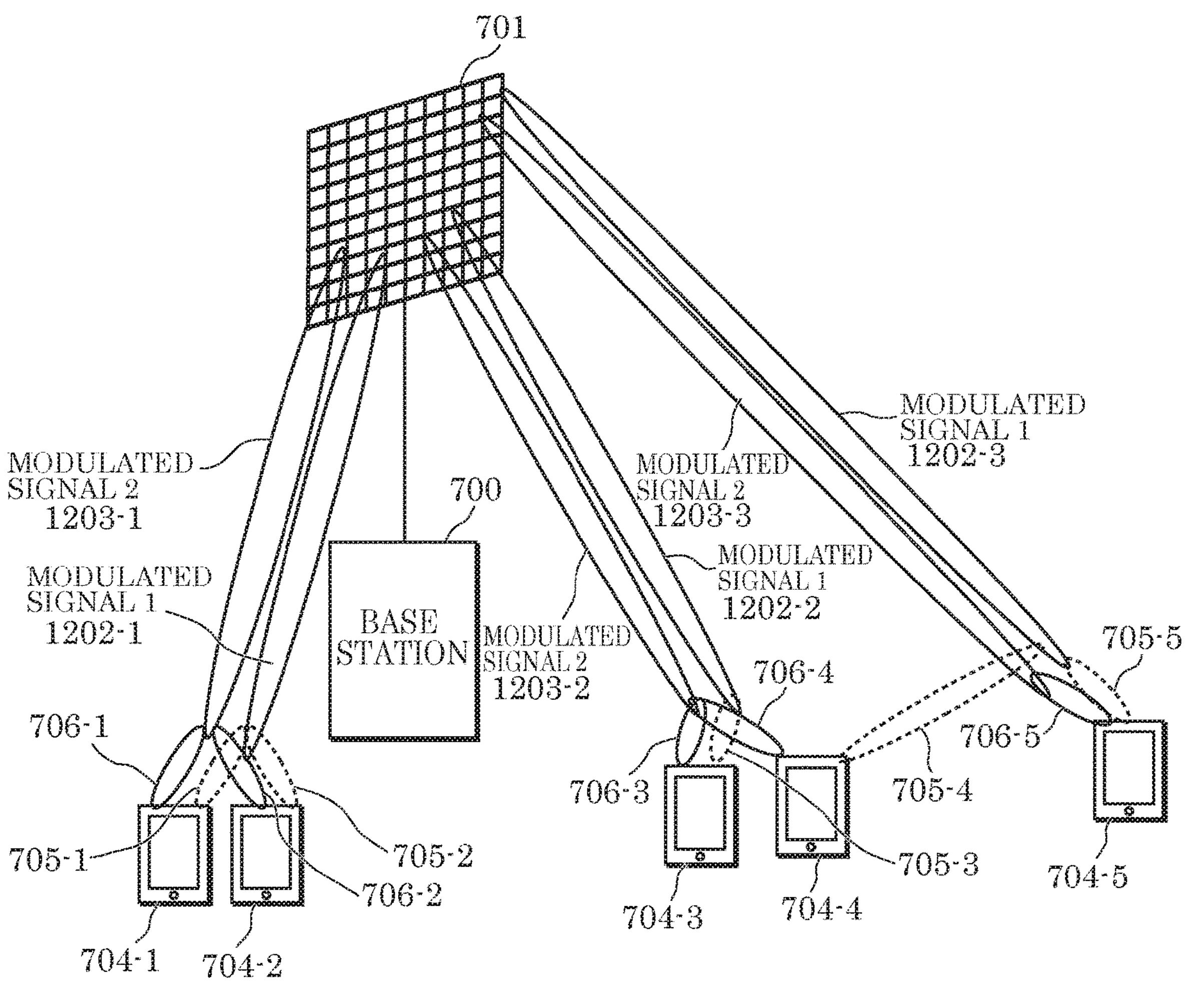
FIG. 12 is a diagram illustrating an example of a state of communication between the base station and terminals.

FIG. 12 illustrates an example of a state of communication between a base station and terminals different from the example in FIG. 7. Note that elements which operate in the same manner as those in FIG. 7 are assigned the same reference signs in FIG. 12.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

FIG. 12 illustrates transmission beam 1202-1 for transmitting "modulated signal 1", transmission beam 1202-2 for transmitting "modulated signal 1", and transmission beam 1202-3 for transmitting "modulated signal 1".

FIG. 12 illustrates transmission beam 1203-1 for transmitting "modulated signal 2", transmission beam 1203-2 for transmitting "modulated signal 2", and transmission beam 1203-3 for transmitting "modulated signal 2".

Note that although in FIG. 12, the number of transmission beams for transmitting "modulated signal 1" is 3 and the number of transmission beams for transmitting "modulated signal 2" is 3, the present disclosure is not limited to such numbers, and the number of transmission beams for transmitting "modulated signal 1" may be at least 2 and the number of transmission beams for transmitting "modulated signal 2" may be at least 2. A detailed description of "modulated signal 1" and "modulated signal 2" will be given later.

FIG. 12 includes terminals 704-1, 704-2, 704-3, 704-4, and 704-5, and the terminals have the same configuration as those in FIGS. 4 and 5, for example.

For example, terminal 704-1 performs directivity control for receiving, via "signal processor 405" and/or "antennas 401-1 to 401-N" and/or "multipliers 603-1 to 603-L and processor 605", and forms receiving directivity 705-1 and receiving directivity 706-1. Receiving directivity 705-1 allows terminal 704-1 to receive and demodulate transmission beam 1202-1 for transmitting "modulated signal 1", and receiving directivity 706-1 allows terminal 704-1 to receive and demodulate transmission beam 1203-1 for transmitting "modulated signal 2".

Similarly, terminal 704-2 performs directivity control for receiving, via "signal processor 405" and/or "antennas 401-1 to 401-N" and/or "multipliers 603-1 to 603-L and processor 605", and forms receiving directivity 705-2 and receiving directivity 706-2. Receiving directivity 705-2 allows terminal 704-2 to receive and demodulate transmission beam 1202-1 for transmitting "modulated signal 1", and receiving directivity 706-2 allows terminal 704-2 to receive and demodulate transmission beam 1203-1 for transmitting "modulated signal 2".

Terminal 704-3 performs directivity control for receiving, via "signal processor 405" and/or "antennas 401-1 to 401-N" and/or "multipliers 603-1 to 603-L and processor 605", and forms receiving directivity 705-3 and receiving directivity 706-3.

Receiving directivity 705-3 allows terminal 704-3 to receive and demodulate transmission beam 1202-2 for transmitting "modulated signal 1", and receiving directivity 706-3 allows terminal 704-3 to receive and demodulate transmission beam 1203-2 for transmitting "modulated signal 2".

Terminal 704-4 performs directivity control for receiving, via "signal processor 405" and/or "antennas 401-1 to 401-N" and/or "multipliers 603-1 to 603-L and processor 605", and forms receiving directivity 705-4 and receiving directivity 706-4. Receiving directivity 705-4 allows terminal 704-4 to receive and demodulate transmission beam 1202-3 for transmitting "modulated signal 1", and receiving directivity 706-4 allows terminal 704-4 to receive and demodulate transmission beam 1203-2 for transmitting "modulated signal 2".

Terminal 704-5 performs directivity control for receiving, via "signal processor 405" and/or "antennas 401-1 to 401-N" and/or "multipliers 603-1 to 603-L and processor 605", and forms receiving directivity 705-5 and receiving directivity 706-5. Receiving directivity 705-5 allows terminal 704-5 to receive and demodulate transmission beam 1202-3 for transmitting "modulated signal 1", and receiving directivity 706-5 allows terminal 704-5 to receive and demodulate transmission beam 1203-3 for transmitting "modulated signal 2".

Distinguishing points in FIG. 12 are that a terminal selects, based on a spatial position, at least one transmission beam from among transmission beams 1202-1, 1202-2, and 1202-3 for transmitting "modulated signal 1", and can obtain "modulated signal 1" with high quality by directing a receiving directivity to the selected transmission beam(s). Further, the terminal selects, based on a spatial position, at least one transmission beam from among transmission beams 1203-1, 1203-2, and 1203-3 for transmitting "modulated signal 2", and can obtain "modulated signal 2" with high quality by directing a receiving directivity to the selected transmission beam(s).

Note that base station 700 transmits transmission beam 1202-1 for transmitting "modulated signal 1" and transmission beam 1203-1 for transmitting "modulated signal 2" using the same frequency (the same frequency band) at the same time. Then, base station 700 transmits transmission beam 1202-2 for transmitting "modulated signal 1" and transmission beam 1203-2 for transmitting "modulated signal 2" using the same frequency (the same frequency band) at the same time. Further, base station 700 transmits transmission beam 1202-3 for transmitting "modulated signal 1" and transmission beam 1203-3 for transmitting "modulated signal 2" using the same frequency (the same frequency band) at the same time.

Transmission beams 1202-1, 1202-2, and 1202-3 for transmitting "modulated signal 1" may be beams having the same frequency (the same frequency band) or may be beams having different frequencies (different frequency bands). Transmission beams 1203-1, 1203-2, and 1203-3 for transmitting "modulated signal 2" may be beams having the same frequency (the same frequency band) or may be beams having different frequencies (different frequency bands).

A description of operation of setting unit 158 of the base station in FIGS. 1 and 3 is to be given.

Setting unit 158 receives an input of setting signal 160. Setting signal 160 includes information with regard to "whether to perform transmission for multicasting or transmission for unicasting", and if the base station performs transmission as illustrated in FIG. 12, information indicating "to perform transmission for multicasting" is input to setting unit 158 according to setting signal 160.

Setting signal 160 includes information with regard to "the number of transmission modulated signals when multicasting is performed" and if the base station performs transmission as illustrated in FIG. 12, information indicating that "the number of transmission modulated signals is 2" is input to setting unit 158 according to setting signal 160.

Setting signal 160 may include information with regard to "how many transmission beams are to be used to transmit each modulated signal". If the base station performs transmission as illustrated in FIG. 12, information indicating that "the number of transmission beams for transmitting modulated signal 1 is 3 and the number of transmission beams for transmitting modulated signal 2 is 3" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission modulated signals when multicasting is performed", information with regard to "how many transmission beams are to be used to transmit each modulated signal". Accordingly, a terminal can appropriately receive data. A configuration of a control information symbol will be later described in detail.

Figure 13:
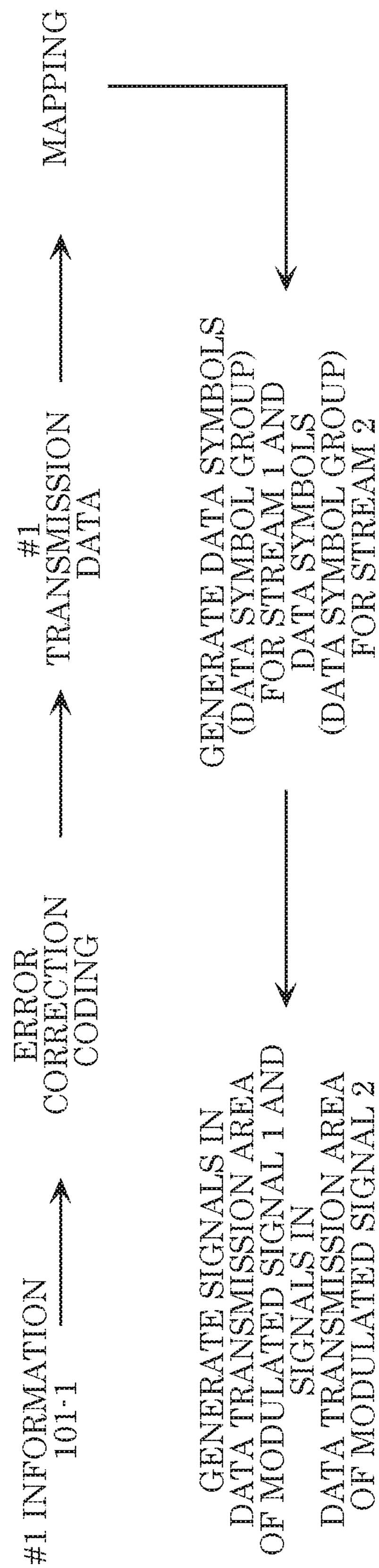
FIG. 13 is a diagram illustrating a relation of a plurality of modulated signals.

FIG. 13 is a drawing for describing a relation between #i information 101-*i* in FIGS. 1 and 3 and "modulated signal 1" and "modulated signal 2" described with reference to FIG. 12.

For example, #1 information 101-1 is subjected to error correction coding, for instance, and data obtained as a result of the error correction coding is obtained. The data obtained as a result of the error correction coding is named #1 transmission data. Data symbols are obtained by mapping #1 transmission data. The data symbols are separated into data symbols for stream 1 and data symbols for stream 2, so that data symbols (data symbol group) for stream 1 and data symbols (data symbol group) for stream 2 are obtained. At this time, a data symbol having symbol number i for stream 1 is s1(i) and a data symbol having symbol number i for stream 2 is s2(i). Then, “modulated signal 1” tx1(i) having symbol number i is expressed as follows, for example.

[Math. 3]

$$tx1(i)=\alpha(i)\times s1(i)+\beta(i)\times s2(i) \quad \text{Expression (3)}$$

Then, “modulated signal 2” tx2(i) having symbol number i is expressed as follows, for example.

[Math. 4]

$$tx2(i)=\gamma(i)\times s1(i)+\delta(i)\times s2(i) \quad \text{Expression (4)}$$

Note that in Expressions (3) and (4), α(i) can be defined by a complex number (and thus may be a real number), β(i) can be defined by a complex number (and thus may be a real number), γ(i) can be defined by a complex number (and thus may be a real number), and δ(i) can be defined by a complex number (and thus may be a real number). Furthermore, although α(i) is indicated, α(i) may not be a function of symbol number i (may be a fixed value), although β(i) is indicated, β(i) may not be a function of symbol number i (may be a fixed value), although γ(i) is indicated, γ(i) may not be a function of symbol number i (may be a fixed value), and although δ(i) is indicated, δ(i) may not be a function of symbol number i (may be a fixed value).

Then, “a symbol group for modulated signal 1” which includes “signals in a data transmission area of modulated signal 1” which are constituted by data symbols is transmitted from the base station in FIG. 1 or 3. Further, “a symbol group for modulated signal 2” which includes “signals in a data transmission area of modulated signal 2” which are constituted by data symbols is transmitted from the base station in FIG. 1 or 3.

Note that signal processing such as phase modification and cyclic delay diversity (CDD) may be performed on “modulated signal 1” and “modulated signal 2”. Note that the method for signal processing is not limited to those.

Figure 14:
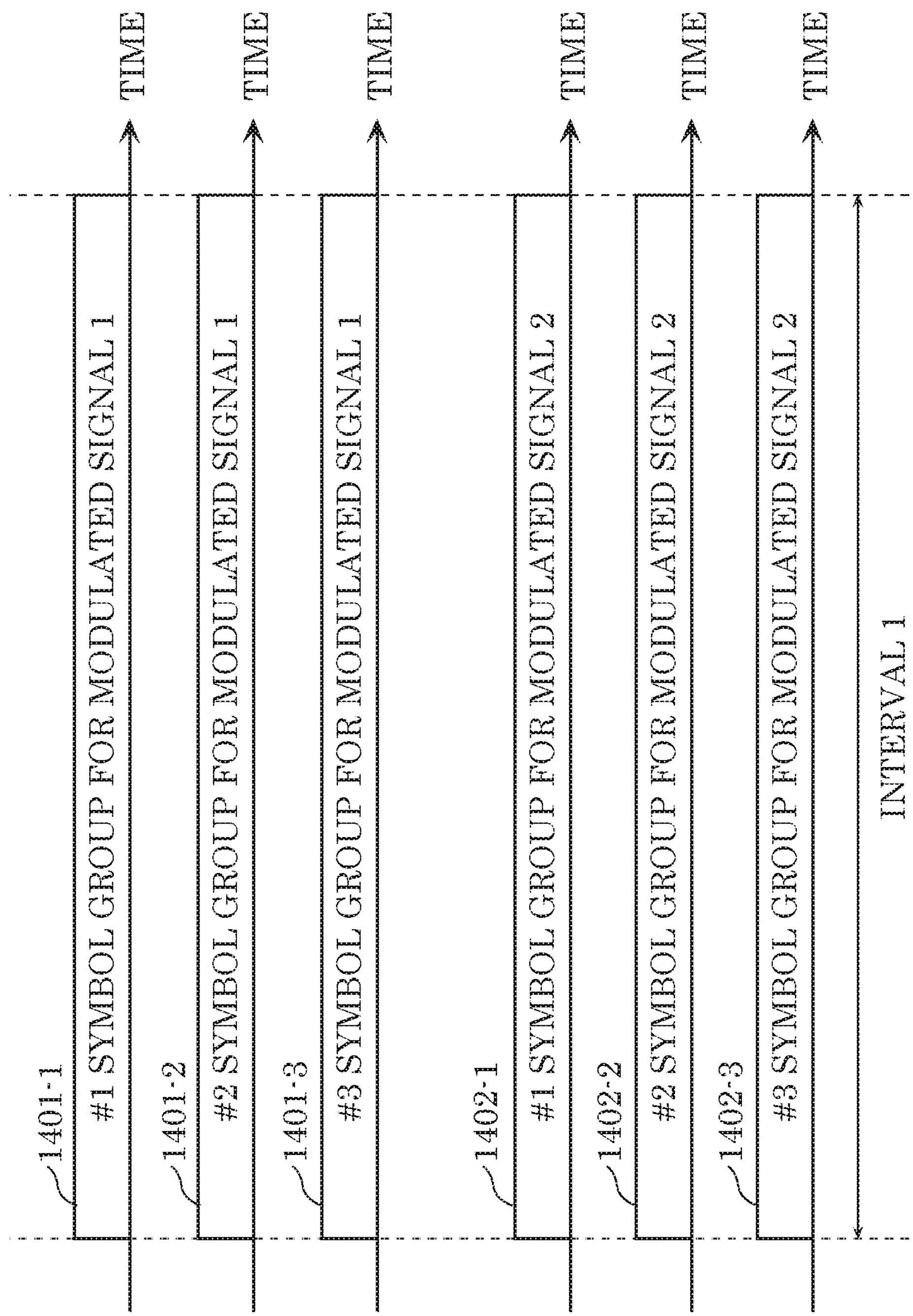
FIG. 14 is a diagram illustrating an example of a frame configuration.

FIG. 14 illustrates an example of a frame configuration when the horizontal axis indicates time.

#1 symbol group (1401-1) for modulated signal 1 in FIG. 14 is a symbol group for transmission beam 1202-1 for transmitting data of modulated signal 1 in FIG. 12.

#2 symbol group (1401-2) for modulated signal 1 in FIG. 14 is a symbol group for transmission beam 1202-2 for transmitting data of modulated signal 1 in FIG. 12.

#3 symbol group (1401-3) for modulated signal 1 in FIG. 14 is a symbol group for transmission beam 1202-3 for transmitting data of modulated signal 1 in FIG. 12.

#1 symbol group (1402-1) for modulated signal 2 in FIG. 14 is a symbol group for transmission beam 1203-1 for transmitting data of modulated signal 2 in FIG. 12.

#2 symbol group (1402-2) for modulated signal 2 in FIG. 14 is a symbol group for transmission beam 1203-2 for transmitting data of modulated signal 2 in FIG. 12.

#3 symbol group (1402-3) for modulated signal 2 in FIG. 14 is a symbol group for transmission beam 1203-3 for transmitting data of modulated signal 2 in FIG. 12.

#1 symbol group (1401-1) for modulated signal 1, #2 symbol group (1401-2) for modulated signal 1, #3 symbol group (1401-3) for modulated signal 1, #1 symbol group (1402-1) for modulated signal 2, #2 symbol group (1402-2) for modulated signal 2, and #3 symbol group (1402-3) for modulated signal 2 are present in time interval 1, for example.

As previously described, #1 symbol group (1401-1) for modulated signal 1 and #1 symbol group (1402-1) for modulated signal 2 are transmitted using the same frequency (the same frequency band), #2 symbol group (1401-2) for modulated signal 1 and #2 symbol group (1402-2) for modulated signal 2 are transmitted using the same frequency (the same frequency band), and #3 symbol group (1401-3) for modulated signal 1 and #3 symbol group (1402-3) for modulated signal 2 are transmitted using the same frequency (the same frequency band).

For example, “signal A in the data transmission area of modulated signal 1” and “signal A in the data transmission area of modulated signal 2” are generated from information in accordance with the procedure in FIG. 13.

“Signal A-1 in the data transmission area of modulated signal 1” which is a signal constituted by a signal equivalent to a signal which constitutes “signal A in the data transmission area of modulated signal 1”, “signal A-2 in the data transmission area of modulated signal 1” which is a signal constituted by a signal equivalent to a signal which constitutes “signal A in the data transmission area of modulated signal 1”, and “signal A-3 in the data transmission area of modulated signal 1” which is a signal constituted by a signal equivalent to a signal which constitutes “signal A in the data transmission area of modulated signal 1” are prepared (thus, the signal which constitutes “signal A-1 in the data transmission area of modulated signal 1”, the signal which constitutes “signal A-2 in the data transmission area of modulated signal 1”, and the signal which constitutes “signal A-3 in the data transmission area of modulated signal 1” are the same).

At this time, #1 symbol group (1401-1) for modulated signal 1 in FIG. 14 includes “signal A-1 in the data transmission area of modulated signal 1”, #2 symbol group (1401-2) for modulated signal 1 in FIG. 14 includes “signal A-2 in the data transmission area of modulated signal 1”, and #3 symbol group (1401-3) for modulated signal 1 in FIG. 14 includes “signal A-3 in the data transmission area of modulated signal 1”. Specifically, #1 symbol group (1401-1) for modulated signal 1, #2 symbol group (1401-2) for modulated signal 1, and #3 symbol group (1401-3) for modulated signal 1 include equivalent signals.

Further, “signal A-1 in the data transmission area of modulated signal 2” which is a signal constituted by a signal equivalent to a signal which constitutes “signal A in the data transmission area of modulated signal 2”, “signal A-2 in the data transmission area of modulated signal 2” which is a signal constituted by a signal equivalent to a signal which constitutes “signal A in the data transmission area of modulated signal 2”, and “signal A-3 in the data transmission area of modulated signal 2” which is a signal constituted by a signal equivalent to a signal which constitutes “signal A in the data transmission area of modulated signal 2” are prepared (thus, the signal which constitutes “signal A-1 in the data transmission area of modulated signal 2”, the signal which constitutes “signal A-2 in the data transmission area of modulated signal 2”, and the signal which constitutes “signal A-3 in the data transmission area of modulated signal 2” are the same).

At this time, #1 symbol group (1402-1) for modulated signal 2 in FIG. 14 includes “signal A-1 in the data transmission area of modulated signal 2”, #2 symbol group (1402-2) for stream 2 in FIG. 14 includes “signal A-2 in the data transmission area of modulated signal 2”, and #3 symbol group (1402-3) for modulated signal 2 in FIG. 14 includes “signal A-3 in the data transmission area of modulated signal 2”. Specifically, #1 symbol group (1402-1) for modulated signal 2, #2 symbol group (1402-2) for modulated signal 2, and #3 symbol group (1402-3) for modulated signal 2 include equivalent signals.

Figure 15:
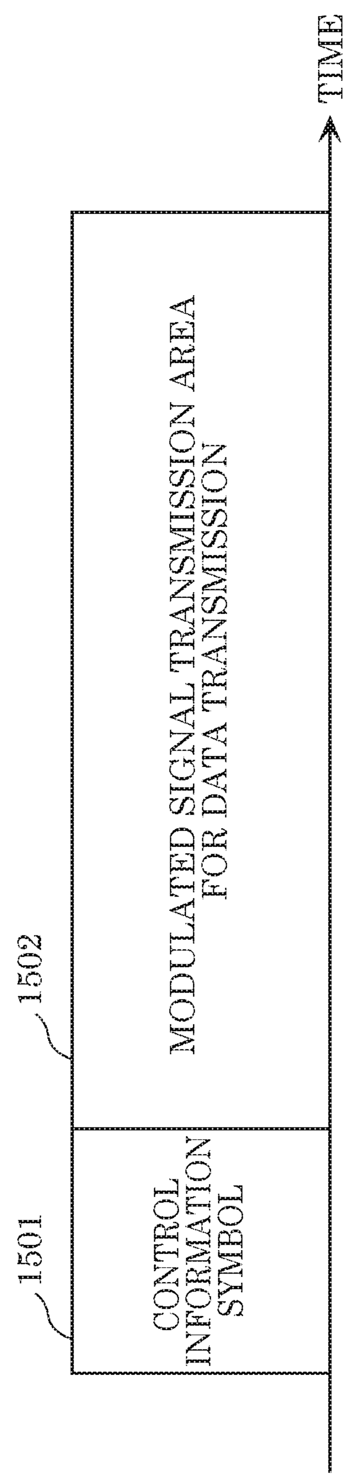
FIG. 15 is a diagram illustrating an example of a frame configuration.

FIG. 15 illustrates an example of a frame configuration of "symbol group #Y for modulated signal X" (X=1, 2; Y=1, 2, 3) described with reference to FIG. 14. In FIG. 15, the horizontal axis indicates time, 1501 indicates a control information symbol, and 1502 indicates a modulated signal transmission area for data transmission. At this time, modulated signal transmission area 1502 for data transmission includes symbols for transmitting "signal A in the data transmission area of modulated signal 1" or "signal A in the data transmission area of modulated signal 2" described with reference to FIG. 14.

Note that in the frame configuration in FIG. 15, a multi-carrier method such as an orthogonal frequency division multiplexing (OFDM) method may be used, and in this case, symbols may be present in the direction of the frequency axis. The symbols may each include a reference symbol for a receiving device to perform time synchronization and frequency synchronization, a reference symbol for a receiving device to detect a signal, and a reference symbol for a receiving device to perform channel estimation, for instance. The frame configuration is not limited to the configuration in FIG. 15, and control information symbol 1501 and modulated signal transmission area 1502 for data transmission may be arranged in any manner. A reference symbol may also be called a preamble and a pilot symbol, for example.

Next is a description of a configuration of control information symbol 1501.

Figure 16:
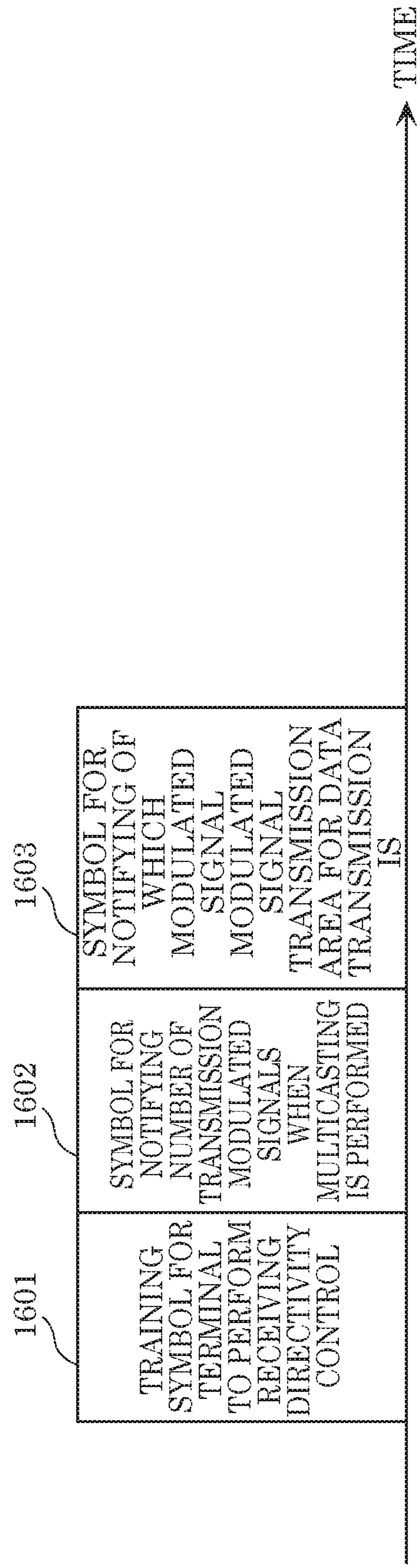
FIG. 16 is a diagram illustrating an example of a symbol configuration.

FIG. 16 illustrates an example of a configuration of symbols which are to be transmitted as a control information symbol in FIG. 15, and the horizontal axis indicates time. In FIG. 16, 1601 denotes "a training symbol for a terminal to perform receiving directivity control", and the terminal determines a signal processing method for the directivity control for receiving, which is performed by "signal processor 405" and/or "antennas 401-1 to 401-N" and/or "multipliers 603-1 to 603-L and processor 605", by receiving "training symbol for a terminal to perform receiving directivity control" 1601.

1602 denotes "a symbol for notifying the number of transmission modulated signals when multicasting is performed", and the terminal is informed of the number of modulated signals which are to be obtained, by receiving "symbol for notifying the number of transmission modulated signals when multicasting is performed" 1602.

1603 denotes "a symbol for notifying of which modulated signal a modulated signal transmission area for data transmission is", and the terminal can be informed of which modulated signal has been successfully received among modulated signals which the base station is transmitting, by receiving "symbol for notifying of which modulated signal a modulated signal transmission area for data transmission is" 1603.

An example of the above is to be described.

Now consider the case where the base station is transmitting "modulated signals" using transmission beams as illustrated in FIG. 12. Specific information on a control information symbol in #1 symbol group 1401-1 for modulated signal 1 in FIG. 14 is to be described.

In the case of FIG. 12, the base station is transmitting "modulated signal 1" and "modulated signal 2", and thus information indicated by "symbol for notifying the number of transmission modulated signals when multicasting is performed" 1602 is "2".

#1 symbol group 1401-1 for modulated signal 1 in FIG. 14 is for transmitting a signal in the data transmission area of modulated signal 1, and thus information indicated by "symbol for notifying of which modulated signal a modulated signal transmission area for data transmission is" 1603 indicates "modulated signal 1".

For example, a terminal is assumed to receive #1 symbol group 1401-1 for modulated signal 1 in FIG. 14. At this time, the terminal becomes aware that "the number of modulated signals is 2" is obtained from "symbol for notifying the number of transmission modulated signals when multicasting is performed" 1602, and that "modulated signal 1" from "symbol for notifying of which modulated signal a modulated signal transmission area for data transmission is" 1603.

The terminal then becomes aware that "the number of present modulated signals is 2" and that the obtained modulated signal is "modulated signal 1", and thus the terminal is aware that "modulated signal 2" is to be obtained. Accordingly, the terminal can start operation of searching for "modulated signal 2". The terminal searches for one of transmission beams for any of "#1 symbol group 1402-1 for modulated signal 2", "#2 symbol group 1402-2 for modulated signal 2", "#3 symbol group 1402-3 for modulated signal 2" in FIG. 14, for example.

The terminal obtains both "modulated signal 1" and "modulated signal 2", and can obtain data symbols for stream 1 and data symbols for stream 2 with high quality, by obtaining one transmission beam for "#1 symbol group 1402-1 for modulated signal 2", "#2 symbol group 1402-2 for modulated signal 2", and "#3 symbol group 1402-3 for modulated signal 2".

Configuring a control information symbol in the above manner yields advantageous effects that the terminal can precisely obtain data symbols.

As described above, in multicast data transmission and broadcast data transmission, the base station transmits data symbols using a plurality of transmission beams, and a terminal selectively receives a transmission beam with good quality among the plurality of transmission beams, thus achieving advantageous effects that a modulated signal which the base station has transmitted increases an area where high data receiving quality is achieved. This is because the base station performs transmission directivity control and receiving directivity control.

In the above description, a terminal performs receiving directivity control, yet advantageous effects can be obtained as mentioned above without the terminal performing receiving directivity control.

Note that the case where each terminal obtains both a modulated signal of stream 1 and a modulated signal of stream 2 is described with reference to FIG. 7, yet the present disclosure is not limited to such an embodiment. For example, an embodiment in which a modulated signal desired to be obtained varies depending on a terminal may be achieved as in a case where there are a terminal which desires to obtain a modulated signal of stream 1, a terminal which desires to obtain a modulated signal of stream 2, and a terminal which desires to obtain both a modulated signal of stream 1 and a modulated signal of stream 2.

Embodiment 2

Embodiment 1 has described a method in which a base station transmits data symbols using a plurality of transmission beams in multicast data transmission and broadcast data transmission. The present embodiment describes, as a variation of Embodiment 1, the case where a base station performs unicast data transmission as well as multicast data transmission and broadcast data transmission.

Figure 17:
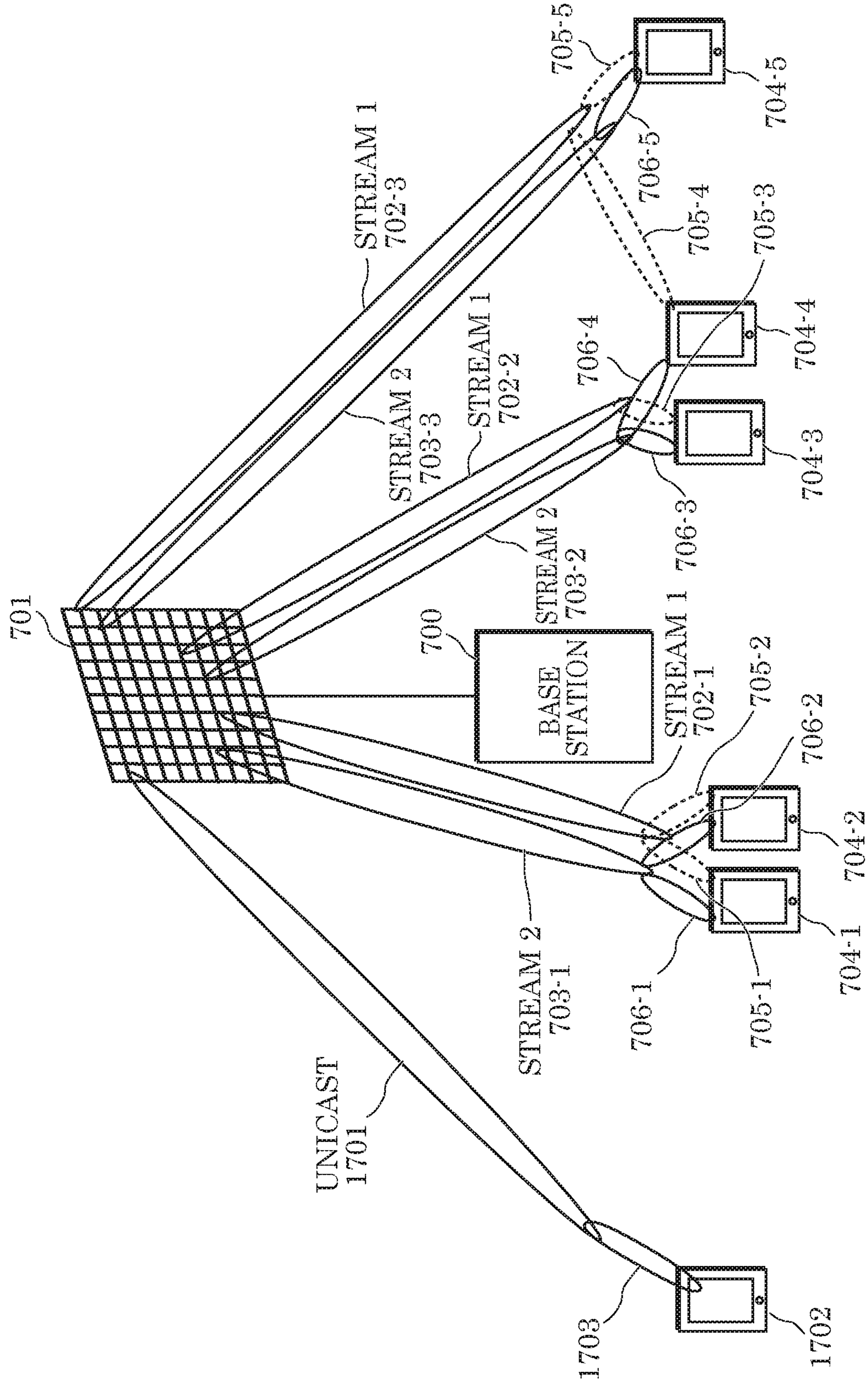
FIG. 17 is a diagram illustrating an example of a state of communication between the base station and terminals.

FIG. 17 illustrates an example of a state of communication between the base station (or an access point, for instance) and terminals. Elements which operate in the same manner as those in FIG. 7 are assigned the same reference signs, and a detailed description thereof is omitted.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

Then, transmission beams 702-1, 702-2, 702-3, 703-1, 703-2, and 703-3 are as described with reference to FIG. 7, and thus a description thereof is omitted.

Terminals 704-1, 704-2, 704-3, 704-4, and 704-5, and receiving directivities 705-1, 705-2, 705-3, 705-4, 705-5, 706-1, 706-2, 706-3, 706-4, and 706-5 are as described with reference to FIG. 7, and thus a description thereof is omitted.

In FIG. 17, a distinguishing point is that the base station performs multicasting, as described with reference to FIG. 7, and also base station 700 and a terminal (for example, 1702) perform unicast communication.

In addition to transmission beams for multicasting 702-1, 702-2, 702-3, 703-1, 703-2, and 703-3, in FIG. 17, base station 700 generates transmission beam 1701 for unicasting, and transmits to terminal 1702 data therefor. Note that FIG. 17 illustrates an example in which base station 700 transmits one transmission beam 1701 to terminal 1702. Yet, the number of transmission beams is not limited to one, and base station 700 may transmit a plurality of transmission beams to terminal 1702 (may transmit a plurality of modulated signals).

Terminal 1702 performs directivity control for receiving, via "signal processor 405" and/or "antennas 401-1 to 401-N" and/or "multipliers 603-1 to 603-L and signal processor 605", and forms receiving directivity 1703. This allows terminal 1702 to receive and demodulate transmission beam 1701.

Note that in order to generate transmission beams which include transmission beam 1701, the base station performs precoding (weighting synthesis) using signal processor 102 (and/or weighting synthesizer 301) in the configuration as illustrated in FIG. 1 or 3, for example.

On the contrary, when terminal 1702 transmits a modulated signal to base station 700, terminal 1702 performs precoding (or weighting synthesis), and transmits transmission beam 1703. Base station 700 performs directivity control for receiving and forms receiving directivity 1701. Accordingly, base station 700 can receive and demodulate transmission beam 1703.

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Further, base station 700 transmits transmission beam 702-3 for transmitting data of stream 1 and transmission beam 703-3 for transmitting data of stream 2, using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Then, transmission beam 1701 for unicasting may be a beam having the same frequency (the same frequency band) as or a different frequency (a different frequency band) from those of transmission beams 702-1, 702-2, 702-3, 703-1, 703-2, and 703-3.

A description has been given with reference to FIG. 17, assuming that a terminal which performs unicast communication is a single terminal, yet the number of terminals which perform unicast communication with the base station may be two or more.

Operation of setting unit 158 at this time in the base station having the configuration illustrated in FIG. 1 or 3 is described.

Setting unit 158 receives an input of setting signal 160. Setting signal 160 includes information with regard to "whether to perform transmission for multicasting or transmission for unicasting", and if the base station performs transmission as illustrated in FIG. 17, information indicating "to perform both transmission for multicasting and transmission for unicasting" is input to setting unit 158 according to setting signal 160.

Also, setting signal 160 includes information with regard to "the number of transmission streams when multicasting is performed" and if the base station performs transmission as illustrated in FIG. 17, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 17, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes information with regard to "whether to perform transmission for multicasting or transmission for unicasting", information with regard to "the number of transmission streams when multicasting is performed", information with regard to "how many transmission beams are to be used to transmit each stream", and others. Accordingly, a terminal can appropriately receive data.

Furthermore, the base station may transmit, to a terminal with which the base station performs unicast communication, a control information symbol for training for the base station to perform directivity control, and a control information symbol for training for a terminal to perform directivity control.

Figure 18:
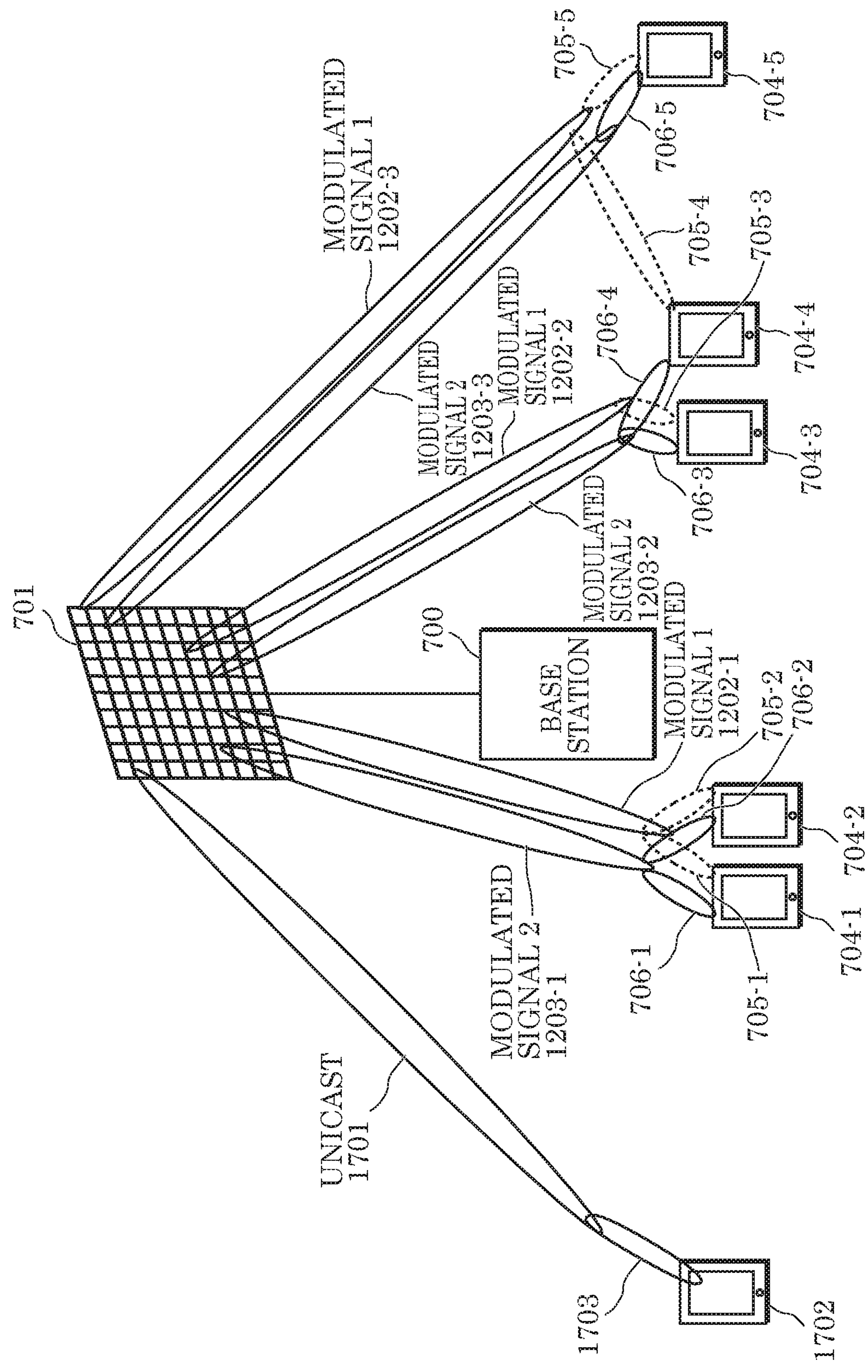
FIG. 18 is a diagram illustrating an example of a state of communication between the base station and terminals.

FIG. 18 illustrates an example of a state of communication between a base station (or an access point or the like) and terminals, and elements which operate in the same manner as those in FIGS. 7 and 12 are assigned the same reference signs in FIG. 18, and a detailed description thereof is omitted.

Base station 700 includes a plurality of antennas, and transmits a plurality of transmission signals from antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 1202-1, 1202-2, 1202-3, 1203-1, 1203-2, and 1203-3 is as described with reference to FIG. 12, and thus a description thereof is omitted.

A description of terminals 704-1, 704-2, 704-3, 704-4, and 704-5, and receiving directivities 705-1, 705-2, 705-3, 705-4, 705-5, 706-1, 706-2, 706-3, 706-4, and 706-5 is as given with reference to FIG. 12, and thus a description thereof is omitted.

A distinguishing point in FIG. 18 is that while the base station performs multicasting, as described with reference to FIG. 12, base station 700 and a terminal (for example, 1702) perform unicast communication.

In FIG. 18, base station 700 generates transmission beam 1701 for unicasting in addition to transmission beams 1202-1, 1202-2, 1202-3, 1203-1, 1203-2, and 1203-3 for multicasting, and transmits to terminal 1702 data therefor. Note that FIG. 18 illustrates an example in which base station 700 transmits one transmission beam 1701 to terminal 1702, yet the number of transmission beams is not limited to one, and base station 700 may transmit a plurality of transmission beams to terminal 1702 (may transmit a plurality of modulated signals).

Terminal 1702 performs directivity control for receiving, via "signal processor 405" and/or "antennas 401-1 to 401-N" and/or "multipliers 603-1 to 603-L and signal processor 605", and forms receiving directivity 1703. Accordingly, terminal 1702 can receive and demodulate transmission beam 1701.

Note that in order to generate transmission beams which include transmission beam 1701, the base station performs precoding (weighting synthesis) in signal processor 102 (and/or, weighting synthesizer 301) in the configuration as illustrated in, for example, FIG. 1 or 3.

On the contrary, when terminal 1702 transmits a modulated signal to base station 700, terminal 1702 performs precoding (or weighting synthesis), and transmits transmission beam 1703, and base station 700 performs directivity control for receiving, and forms receiving directivity 1701. Accordingly, base station 700 can receive and demodulate transmission beam 1703.

Note that base station 700 transmits transmission beam 1202-1 for transmitting "modulated signal 1" and transmission beam 1203-1 for transmitting "modulated signal 2", using the same frequency (the same frequency band) at the same time. Then, base station 700 transmits transmission beam 1202-2 for transmitting "modulated signal 1" and transmission beam 1203-2 for transmitting "modulated signal 2", using the same frequency (the same frequency band) at the same time. Further, base station 700 transmits transmission beam 1202-3 for transmitting "modulated signal 1" and transmission beam 1203-3 for transmitting "modulated signal 2", using the same frequency (the same frequency band) at the same time.

Transmission beams 1202-1, 1202-2, and 1202-3 for transmitting "modulated signal 1" may be beams having the same frequency (the same frequency band) or may be beams having different frequencies (different frequency bands). Transmission beams 1203-1, 1203-2, and 1203-3 for transmitting "modulated signal 2" may be beams having the same frequency (the same frequency band) or may be beams having different frequencies (different frequency bands).

Transmission beam 1701 for unicasting may be a beam having the same frequency (the same frequency band) as or a different frequency (different frequency band) from those of transmission beams 1202-1, 1202-2, 1202-3, 1203-1, 1203-2, and 1203-3.

A description has been given with reference to FIG. 18, assuming that a terminal which performs unicast communication is a single terminal, yet the number of terminals which perform unicast communication with the base station may be two or more.

Operation of setting unit 158 at this time in the base station having the configuration illustrated in FIG. 1 or 3 is described.

Setting unit 158 receives an input of setting signal 160. Setting signal 160 includes information with regard to "whether to perform transmission for multicasting or transmission for unicasting", and if the base station performs transmission as illustrated in FIG. 18, information indicating "to perform both transmission for multicasting and transmission for unicasting" is input to setting unit 158 according to setting signal 160.

Setting signal 160 also includes information with regard to "the number of transmission streams when multicasting is performed" and if the base station performs transmission as illustrated in FIG. 18, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 18, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes information with regard to "whether to perform transmission for multicasting or transmission for unicasting", information with regard to "the number of transmission streams when multicasting is performed", and information with regard to "how many transmission beams are to be used to transmit each stream", for instance. Accordingly, a terminal can appropriately receive data.

Furthermore, the base station may transmit, to a terminal with which the base station performs unicast communication, a control information symbol for training for the base station to perform directivity control, and a control information symbol for training for a terminal to perform directivity control.

The following describes the case where the base station transmits a plurality of data by multicasting, as a variation of Embodiment 1.

Figure 19:
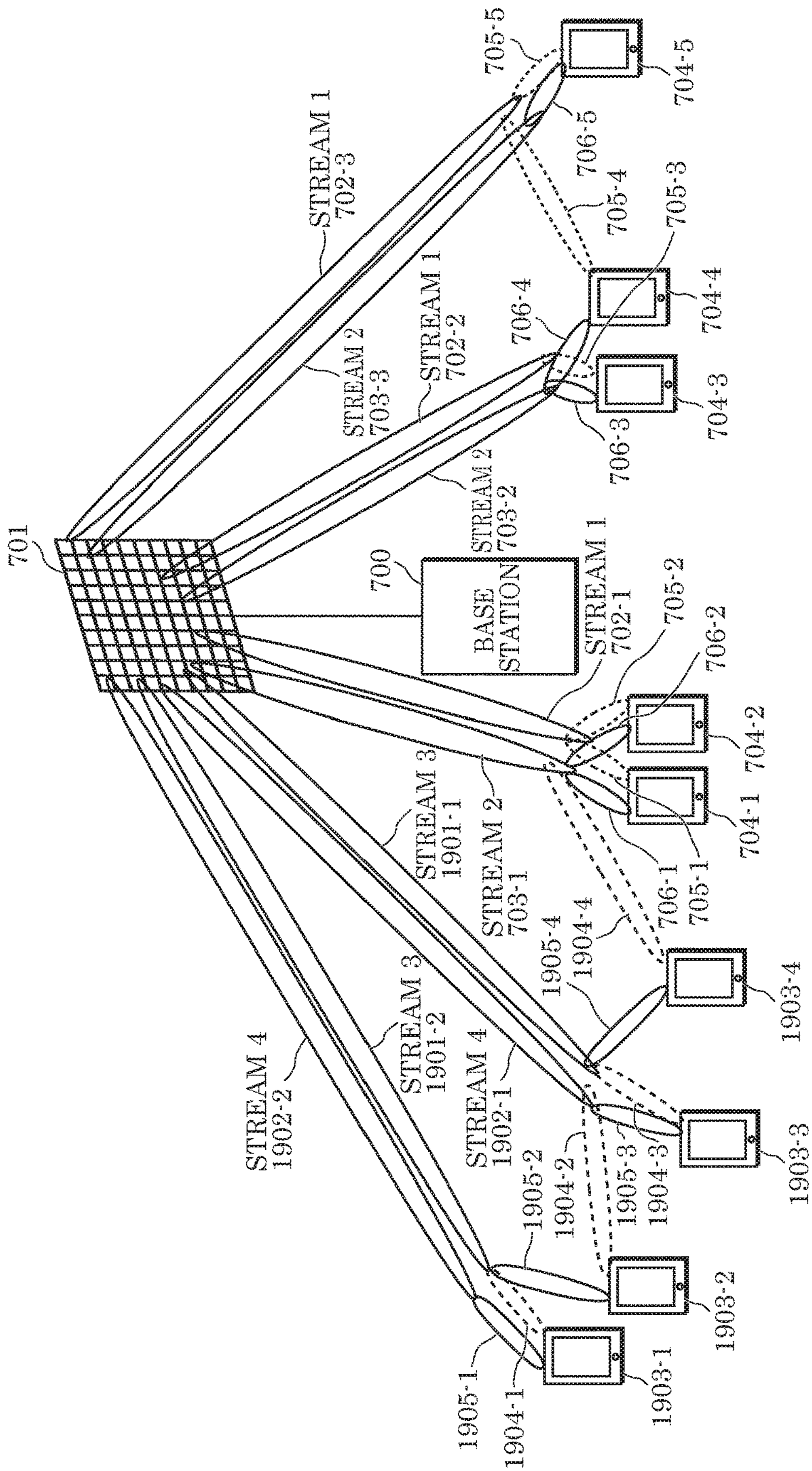
FIG. 19 is a diagram illustrating an example of a state of communication between the base station and terminals.

FIG. 19 illustrates an example of a state of communication between the base station (or an access point, for instance) and terminals, and elements which operate in the same manner as those in FIG. 7 are assigned the same reference signs in FIG. 19, so that a detailed description thereof is omitted.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 702-1, 702-2, 702-3, 703-1, 703-2, and 703-3 is as given with reference to FIG. 7, and thus a description thereof is omitted.

A description of terminals 704-1, 704-2, 704-3, 704-4, and 704-5 and receiving directivities 705-1, 705-2, 705-3, 705-4, 705-5, 706-1, 706-2, 706-3, 706-4, and 706-5 is as described with reference to FIG. 7, and thus a description thereof is omitted.

Base station 700 transmits transmission beams 1901-1, 1901-2, 1902-1, and 1902-2, in addition to transmission beams 702-1, 702-2, 702-3, 703-1, 703-2, and 703-3.

Transmission beam 1901-1 is a transmission beam for transmitting data of stream 3. Transmission beam 1901-2 is also a transmission beam for transmitting data of stream 3.

Transmission beam 1902-1 is a transmission beam for transmitting data of stream 4. Transmission beam 1902-2 is also a transmission beam for transmitting data of stream 4.

Reference signs 704-1, 704-2, 704-3, 704-4, 704-5, 1903-1, 1903-2, and 1903-3 denote terminals, and each have a configuration as illustrated in FIGS. 4 and 5, for example. Note that operation of terminals 704-1, 704-2, 704-3, 704-4, and 704-5 is as described with reference to FIG. 7.

Terminal 1903-1 performs directivity control for receiving, via "signal processor 405" and/or "antennas 401-1 to 401-N" and/or "multipliers 603-1 to 603-L and processor 605", and forms receiving directivity 1904-1 and receiving directivity 1905-1. Receiving directivity 1904-1 allows terminal 1903-1 to receive and demodulate transmission beam 1901-2 for transmitting data of stream 3, and receiving directivity 1905-1 allows terminal 1903-1 to receive and demodulate transmission beam 1902-2 for transmitting data of stream 4.

Terminal 1903-2 performs directivity control for receiving, via "signal processor 405" and/or "antennas 401-1 to 401-N" and/or "multipliers 603-1 to 603-L and processor 605", and forms receiving directivity 1904-2 and receiving directivity 1905-2. Receiving directivity 1904-2 allows terminal 1903-2 to receive and demodulate transmission beam 1902-1 for transmitting data of stream 4, and receiving directivity 1905-2 allows terminal 1903-2 to receive and demodulate transmission beam 1901-2 for transmitting data of stream 3.

Terminal 1903-3 performs directivity control for receiving, via "signal processor 405" and/or "antennas 401-1 to 401-N" and/or "multipliers 603-1 to 603-L and processor 605", and forms receiving directivity 1904-3 and receiving directivity 1905-3. Receiving directivity 1904-3 allows terminal 1903-3 to receive and demodulate transmission beam 1901-1 for transmitting data of stream 3, and receiving directivity 1905-3 allows terminal 1903-3 to receive and demodulate transmission beam 1902-1 for transmitting data of stream 4.

Terminal 1903-4 performs directivity control for receiving, via "signal processor 405" and/or "antennas 401-1 to 401-N" and/or "multipliers 603-1 to 603-L and processor 605", and forms receiving directivity 1904-4 and receiving directivity 1905-4. Receiving directivity 1904-4 allows terminal 1903-4 to receive and demodulate transmission beam 703-1 for transmitting data of stream 2, and receiving directivity 1905-4 allows terminal 1903-4 to receive and demodulate transmission beam 1901-1 for transmitting data of stream 3.

In FIG. 19, a distinguishing point is that the base station transmits a plurality of streams each including data for multicasting, and also transmits each stream using a plurality of transmission beams, and each terminal selectively receives one or more transmission beams for one more streams among a plurality of streams.

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Further, base station 700 transmits transmission beam 702-3 for transmitting data of stream 1 and transmission beam 703-3 for transmitting data of stream 2, using the same frequency (the same frequency band) at the same time.

Base station 700 transmits transmission beam 1901-1 for transmitting data of stream 3 and transmission beam 1902-1 for transmitting data of stream 4, using the same frequency (the same frequency band) at the same time. Base station 700 transmits transmission beam 1901-2 for transmitting data of stream 3 and transmission beam 1902-2 for transmitting data of stream 4, using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Transmission beams 1901-1 and 1901-2 for transmitting data of stream 3 may be beams having the same frequency (the same frequency band), or may be beams having different frequencies (different frequency bands). Transmission beams 1902-1 and 1902-2 for transmitting data of stream 4 may be beams having the same frequency (the same frequency band), or may be beams having different frequencies (different frequency bands).

Then, data symbols for stream 1 and data symbols for stream 2 may be generated from #1 information 101-1 in FIG. 1, and data symbols for stream 3 and data symbols for stream 4 may be generated from #2 information 101-2. Note that error correction coding may be performed on each of #1 information 101-1 and #2 information 101-2, and thereafter data symbols may be generated therefrom.

Data symbols for stream 1 may be generated from #1 information 101-1 in FIG. 1, data symbols for stream 2 may be generated from #2 information 101-2 in FIG. 1, data symbols for stream 3 may be generated from #3 information 101-3 in FIG. 1, and data symbols for stream 4 may be generated from #4 information 101-4 in FIG. 1. Note that error correction coding may be performed on each of #1 information 101-1, #2 information 101-2, #3 information 101-3, and #4 information 101-4, and thereafter data symbols may be generated therefrom.

Specifically, data symbols for streams may be generated from any of the information in FIG. 1. This yields advantageous effect that a terminal can selectively obtain a stream for multicasting.

Operation of setting unit 158 at this time in the base station having the configuration illustrated in FIG. 1 or 3 is to be described. Setting unit 158 receives an input of setting signal 160. Setting signal 160 includes information with regard to "whether to perform transmission for multicasting or transmission for unicasting", and if the base station performs transmission as illustrated in FIG. 19, information indicating "to perform transmission for multicasting" is input to setting unit 158 according to setting signal 160.

Setting signal 160 includes information with regard to "the number of transmission streams when multicasting is performed" and if the base station performs transmission as illustrated in FIG. 19, information indicating that "the number of transmission streams is 4" is input to setting unit 158 according to setting signal 160.

Setting signal 160 may include information with regard to "how many transmission beams are to be used to transmit each stream". If the base station performs transmission as illustrated in FIG. 19, information indicating that "the number of transmission beams for transmitting stream 1 is 3, the number of transmission beams for transmitting stream 2 is 3, the number of transmission beams for transmitting stream 3 is 2, and the number of transmission beams for transmitting stream 4 is 2" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", and information with regard to "how many transmission beams are to be used to transmit each stream". Accordingly, a terminal can appropriately receive data.

The following describes the case where the base station transmits a plurality of data by multicasting, as a variation of Embodiment 1.

Figure 20:
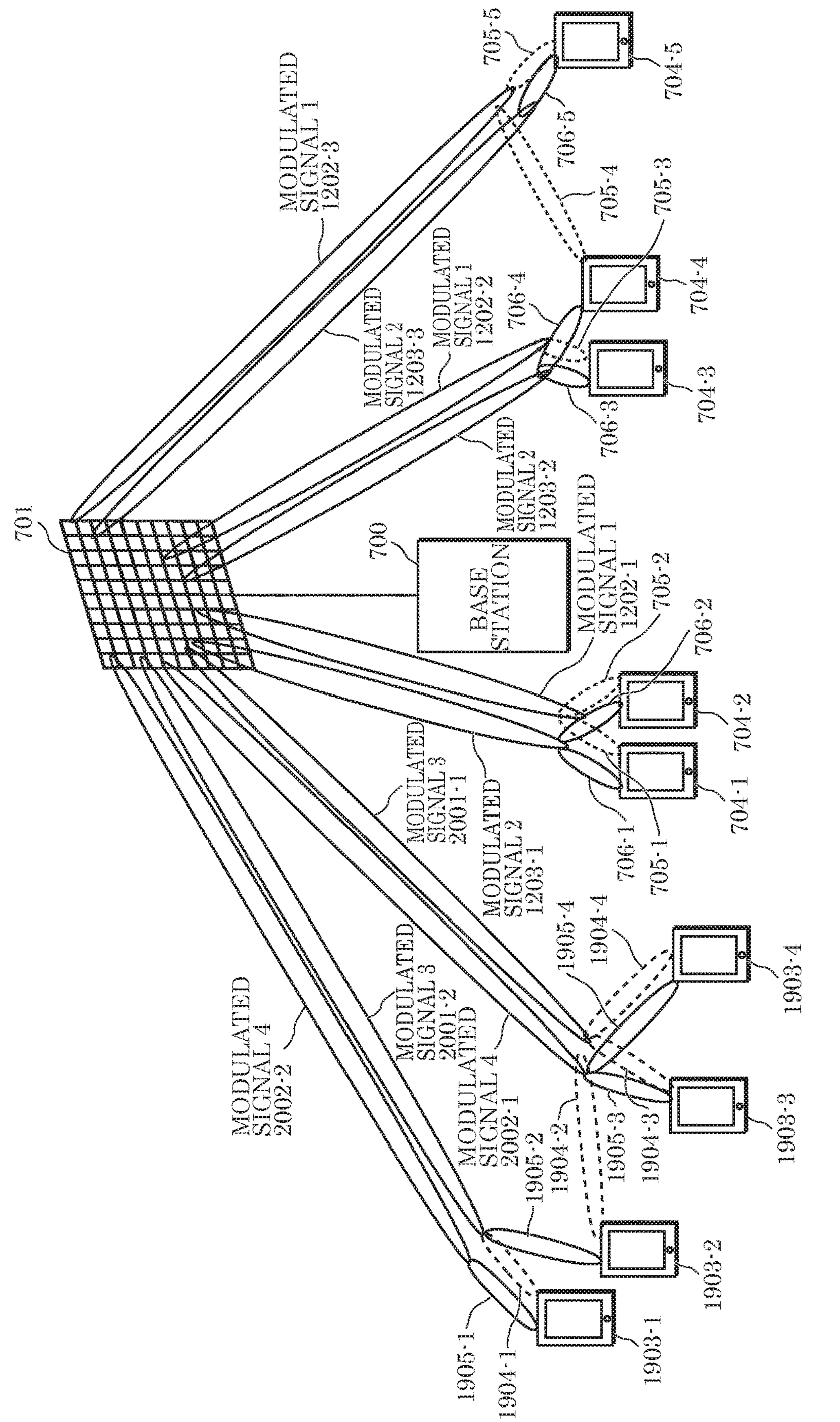
FIG. 20 is a diagram illustrating an example of a state of communication between the base station and terminals.

FIG. 20 illustrates an example of a state of communication between the base station (or an access point, for instance) and terminals, and elements which operate in the same manner as those in FIGS. 7, 12, and 19 are assigned the same reference signs in FIG. 20, so that a detailed description thereof is omitted.

Base station 700 includes a plurality of antennas, and transmits a plurality of transmission signals from antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 1202-1, 1202-2, 1202-3, 1203-1, 1203-2, and 1203-3 overlaps a description given with reference to FIG. 12, and thus a description thereof is omitted.

A description of terminals 704-1, 704-2, 704-3, 704-4, and 704-5, and receiving directivity 705-1, 705-2, 705-3, 705-4, 705-5, 706-1, 706-2, 706-3, 706-4, and 706-5 overlaps a description given with reference to FIG. 12, and thus a description thereof is omitted.

Base station 700 transmits transmission beams 2001-1, 2001-2, 2002-1, and 2002-2, in addition to transmission beams 1202-1, 1202-2, 1202-3, 1203-1, 1203-2, and 1203-3.

Transmission beam 2001-1 is a transmission beam for transmitting "modulated signal 3". Transmission beam 2001-2 is also a transmission beam for transmitting "modulated signal 3".

Transmission beam 2002-1 is a transmission beam for transmitting "modulated signal 4". Transmission beam 2002-2 is also a transmission beam for transmitting "modulated signal 4".

Terminals 704-1, 704-2, 704-3, 704-4, 704-5, 1903-1, 1903-2, and 1903-3 have the same configuration as those illustrated in FIGS. 4 and 5, for example. Note that operation of terminals 704-1, 704-2, 704-3, 704-4, and 704-5 is the same as a description given with reference to FIG. 7.

Terminal 1903-1 performs directivity control for receiving, via "signal processor 405" and/or "antennas 401-1 to 401-N" and/or "multipliers 603-1 to 603-L and processor 605", and forms receiving directivity 1904-1 and receiving directivity 1905-1. Receiving directivity 1904-1 allows terminal 1903-1 to receive and demodulate transmission beam 2001-2 for transmitting "modulated signal 3", and receiving directivity 1905-1 allows terminal 1903-1 to receive and demodulate transmission beam 2002-2 for transmitting "modulated signal 4".

Terminal 1903-2 performs directivity control for receiving, via "signal processor 405" and/or "antennas 401-1 to 401-N" and/or "multipliers 603-1 to 603-L and processor 605", and forms receiving directivity 1904-2 and receiving directivity 1905-2. Receiving directivity 1904-2 allows terminal 1903-2 to receive and demodulate transmission beam 2002-1 for transmitting "modulated signal 4", and receiving directivity 1905-2 allows terminal 1903-2 to receive and demodulate transmission beam 2001-2 for transmitting "modulated signal 3".

Terminal 1903-3 performs directivity control for receiving, via "signal processor 405" and/or "antennas 401-1 to 401-N" and/or "multipliers 603-1 to 603-L and processor 605", and forms receiving directivity 1904-3 and receiving directivity 1905-3. Receiving directivity 1904-3 allows terminal 1903-3 to receive and demodulate transmission beam 2001-1 for transmitting "modulated signal 3", and receiving directivity 1905-3 allows terminal 1903-3 to receive and demodulate transmission beam 2002-1 for transmitting "modulated signal 4".

Terminal 1903-4 performs directivity control for receiving, via "signal processor 405" and/or "antennas 401-1 to 401-N" and/or "multipliers 603-1 to 603-L and processor 605", and forms receiving directivity 1904-4 and receiving directivity 1905-4. Receiving directivity 1904-4 allows terminal 1903-4 to receive and demodulate transmission beam 2001-1 for transmitting "modulated signal 3", and receiving directivity 1905-4 allows terminal 1903-4 to receive and demodulate transmission beam 2002-1 for transmitting "modulated signal 4".

In FIG. 20, the base station transmits a plurality of modulated signals each including data for multicasting, and transmits each modulated signal using a plurality of transmission beams. Each terminal selectively receives one or more transmission beams used to transmit one or more streams among the plurality of modulated signals.

Note that base station 700 transmits transmission beam 1202-1 for transmitting "modulated signal 1" and transmission beam 1203-1 for transmitting "modulated signal 2", using the same frequency (the same frequency band) at the same time. Then, base station 700 transmits transmission beam 1202-2 for transmitting "modulated signal 1" and transmission beam 1203-2 for transmitting "modulated signal 2", using the same frequency (the same frequency band) at the same time. Further, base station 700 transmits transmission beam 1202-3 for transmitting "modulated signal 1" and transmission beam 1203-3 for transmitting "modulated signal 2", using the same frequency (the same frequency band) at the same time.

Base station 700 transmits transmission beam 2001-1 for transmitting "modulated signal 3" and transmission beam 2002-1 for transmitting "modulated signal 4", using the same frequency (the same frequency band) at the same time. Then, base station 700 transmits transmission beam 2001-2 for transmitting "modulated signal 3" and transmission beam 2002-2 for transmitting "modulated signal 4", using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Transmission beams 2001-1 and 2001-2 for transmitting "modulated signal 3" may be beams having the same frequency (the same frequency band) or may be beams having different frequencies (different frequency bands). Transmission beams 2002-1 and 2002-2 for transmitting "modulated signal 4" may be beams having the same frequency (the same frequency band) or may be beams having different frequencies (different frequency bands).

Operation of setting unit 158 at this time in the base station having the configuration illustrated in FIG. 1 or 3 is to be described. Setting unit 158 receives an input of setting signal 160. Setting signal 160 includes information with regard to "whether to perform transmission for multicasting or transmission for unicasting", and if the base station performs transmission illustrated in FIG. 19, information indicating "to perform transmission for multicasting" is input to setting unit 158 according to setting signal 160.

Setting signal 160 includes information with regard to "the number of transmission modulated signals when multicasting is performed", and if the base station performs transmission illustrated in FIG. 20, information indicating "the number of transmission modulated signals is 4" is input to setting unit 158 according to setting signal 160.

Setting signal 160 may include information with regard to "how many transmission beams are to be used to transmit each modulated signal". When the base station performs transmission illustrated in FIG. 20, information indicating that "the number of transmission beams for transmitting modulated signal 1 is 3, the number of transmission beams for transmitting modulated signal 2 is 3, the number of transmission beams for transmitting modulated signal 3 is 2, and the number of transmission beams for transmitting modulated signal 4 is 2" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", information with regard to "how many transmission beams are to be used to transmit each stream". Accordingly, a terminal can appropriately receive data.

Note that in FIG. 20, if a terminal receives both a transmission beam for "modulated signal 1", and a transmission beam for "modulated signal 2", the terminal can obtain data of stream 1 and data of stream 2 with high receiving quality.

Similarly, if a terminal receives both a transmission beam for "modulated signal 3", and a transmission beam for "modulated signal 4", the terminal can obtain data of stream 3 and data of stream 4 with high receiving quality.

FIG. 20 illustrates an example in which the base station transmits "modulated signal 1", "modulated signal 2", "modulated signal 3", and "modulated signal 4", yet the base station may transmit "modulated signal 5" and "modulated signal 6" for transmitting data of stream 5 and data of stream 6, respectively, and may transmit more modulated signals in order to transmit more streams. Note that the base station transmits each of the modulated signals using one or more transmission beams.

Furthermore, as described with reference to FIGS. 17 and 18, one or more transmission beams for unicasting (or receiving directivity control) may be present.

Figure 21:
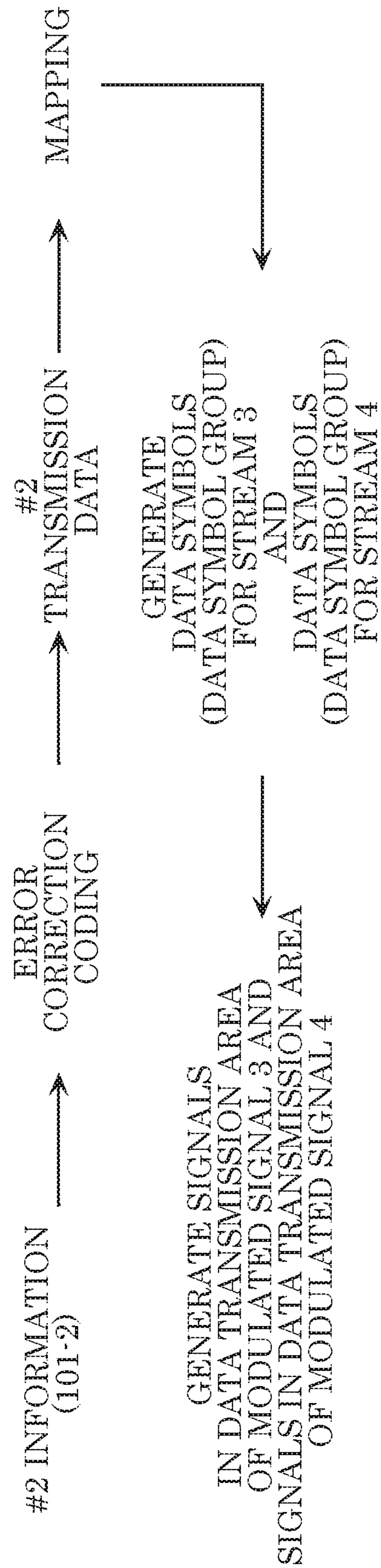
FIG. 21 is a diagram illustrating a relation of a plurality of modulated signals.

A description of a relation between "modulated signal 1" and "modulated signal 2" overlaps a description with reference to FIG. 13, and thus the description thereof is omitted. Here, a description of a relation between "modulated signal 3" and "modulated signal 4" is given with reference to FIG. 21.

For example, #2 information 101-2 is subjected to processing such as error correction coding, and data obtained as a result of the error correction coding is obtained. The data obtained as a result of the error correction coding is named #2 transmission data. Data symbols are obtained by mapping #2 transmission data. The data symbols are separated into data symbols for stream 3 and data symbols for stream 4, so that data symbols (data symbol group) for stream 3 and data symbols (data symbol group) for stream 4 are obtained. At this time, a data symbol having symbol number i for stream 3 is s3(i), and a data symbol having symbol number i for stream 4 is s4(i). Then, "modulated signal 3" tx3(i) having symbol number i is expressed as follows, for example.

[Math. 5]

$$tx3(i)=e(i)\times s3(i)+f(i)\times s4(i) \quad \text{Expression (5)}$$

Then, "modulated signal 4" tx4(i) having symbol number i is expressed as follows, for example.

[Math. 6]

$$tx4(i)=g(i)\times s3(i)+h(i)\times s4(i) \quad \text{Expression (6)}$$

Note that e(i), f(i), g(i), and h(i) in Expressions (5) and (6) can be defined by complex numbers, and thus may be real numbers.

Although e(i), f(i), g(i), and h(i) are indicated, e(i), f(i), g(i), and h(i) may not be functions of symbol number i and may be fixed values.

Then, the base station in FIG. 1 or 3 transmits "a symbol group for modulated signal 3" which includes "signals in a data transmission area of modulated signal 3" which are constituted by data symbols. Then, the base station in FIG. 1 or 3 transmits "a symbol group for modulated signal 4" which includes "signals in a data transmission area of modulated signal 4" which are constituted by data symbols.

Supplementary Note

As a matter of course, the present disclosure may be carried out by combining a plurality of the exemplary embodiments and other contents described herein.

Moreover, each exemplary embodiment and the other contents are only examples. For example, while a "modulating method, an error correction coding method (an error correction code, a code length, a coding rate and the like to be used), control information and the like" are exemplified, it is possible to carry out the present disclosure with the same configuration even when other types of a "modulating method, an error correction coding method (an error correction code, a code length, a coding rate and the like to be used), control information and the like" are applied.

As for a modulating method, even when a modulating method other than the modulating methods described herein is used, it is possible to carry out the exemplary embodiments and the other contents described herein. For example, amplitude phase shift keying (APSK), pulse amplitude modulation (PAM), phase shift keying (PSK), and quadrature amplitude modulation (QAM) may be applied, or in each modulating method, uniform mapping or non-uniform mapping may be performed. APSK includes 16APSK, 64APSK, 128APSK, 256APSK, 1024APSK, and 4096APSK, for example. PAM includes 4PAM, 8PAM, 16PAM, 64PAM, 128PAM, 256PAM, 1024PAM, and 4096PAM, for example. PSK includes BPSK, QPSK, 8PSK, 16PSK, 64PSK, 128PSK, 256PSK, 1024PSK, and 4096PSK, for example. QAM includes 4QAM, 8QAM, 16QAM, 64QAM, 128QAM, 256QAM, 1024QAM, and 4096QAM, for example.

A method for arranging signal points, such as 2 signal points, 4 signal points, 8 signal points, 16 signal points, 64 signal points, 128 signal points, 256 signal points, and 1024 signal points on an I-Q plane (a modulating method having 2 signal points, 4 signal points, 8 signal points, 16 signal points, 64 signal points, 128 signal points, 256 signal points, and 1024 signal points, for instance) is not limited to a signal point arranging method according to the modulating methods described herein.

The "base station" described herein may be a broadcast station, a base station, an access point, a terminal, or a mobile phone, for example. Then, the "terminal" described herein may be a television, a radio, a terminal, a personal computer, a mobile phone, an access point, or a base station, for instance. The "base station" and the "terminal" in the present disclosure may be devices having a communication function, and such devices may be configured to be connected with devices for running applications such as a television, a radio, a personal computer, and a mobile phone, via a certain interface. Furthermore, in the present embodiment, symbols other than data symbols, such as, for example, a pilot symbol and a symbol for control information may be arranged in any manner in frames.

Then, any names may be given to a pilot symbol and a symbol for control information, and such symbols may be, for example, known symbols modulated using PSK modulation in a transmitting device or a receiving device. Alternatively, the receiving device may be able to learn a symbol transmitted by the transmitting device by establishing synchronization. The receiving device performs, using the symbol, frequency synchronization, time synchronization, channel estimation of each modulated signal (estimation of channel state information (CSI)), and signal detection, for instance. Note that a pilot symbol may be referred to as a preamble, a unique word, a postamble, or a reference symbol, for instance.

Moreover, the control information symbol is a symbol for transmitting information that is used for realizing communication other than communication for data (data of an application, for instance) and that is to be transmitted to a communicating party (for example, a modulating method used for communication, an error correction coding method, a coding rate of the error correction coding method, setting information in an upper layer, and the like).

Note that the present disclosure is not limited to each exemplary embodiment, and can be carried out with various modifications. For example, the case where the present disclosure is performed as a communication device is described in each exemplary embodiment. However, the present disclosure is not limited to this case, and this communication method can also be used as software.

Note that a program for executing the above-described communication method may be stored in a ROM (Read Only Memory) in advance, and a CPU (Central Processing Unit) may be caused to operate this program.

Moreover, the program for executing the above-described communication method may be stored in a computer-readable storage medium, the program stored in the recording medium may be recorded in a RAM (Random Access Memory) of a computer, and the computer may be caused to operate according to this program.

Then, the configurations of the above-described exemplary embodiments, for instance, may be each realized as an LSI (Large Scale Integration) which is typically an integrated circuit having an input terminal and an output terminal. The configurations may be separately formed as one chip, or all or at least one of the configurations of the exemplary embodiments may be formed as one chip. The LSI is described here, but the integrated circuit may also be referred to as an IC (Integrated Circuit), a system LSI, a super LSI, or an ultra LSI, depending on a degree of integration. Moreover, a circuit integration technique is not limited to the LSI, and may be realized by a dedicated circuit or a general purpose processor. After manufacturing of the LSI, a programmable FPGA (Field Programmable Gate Array) or a reconfigurable processor which is reconfigurable in connection or settings of circuit cells inside the LSI may be used. Further, when development of a semiconductor technology or another derived technology provides a circuit integration technology which replaces the LSI, as a matter of course, functional blocks may be integrated by using this technology. Application of biotechnology, for instance, is one such possibility.

Embodiment 3

The present embodiment describes a multicast communication method when beamforming different from the beamforming in Embodiments 1 and 2 is applied.

The configuration of the base station is as described with reference to FIGS. 1 to 3 in Embodiment 1, and thus a description of portions which operate in the same manner as those in Embodiment 1 is omitted. Also, the configuration of a terminal which communicates with a base station is as described with reference to FIGS. 4 to 6 in Embodiment 1, and thus a description of portions which operate in the same manner as those in Embodiment 1 is omitted.

The following describes an example of operation of a base station and a terminal in the present embodiment.

Figure 22:
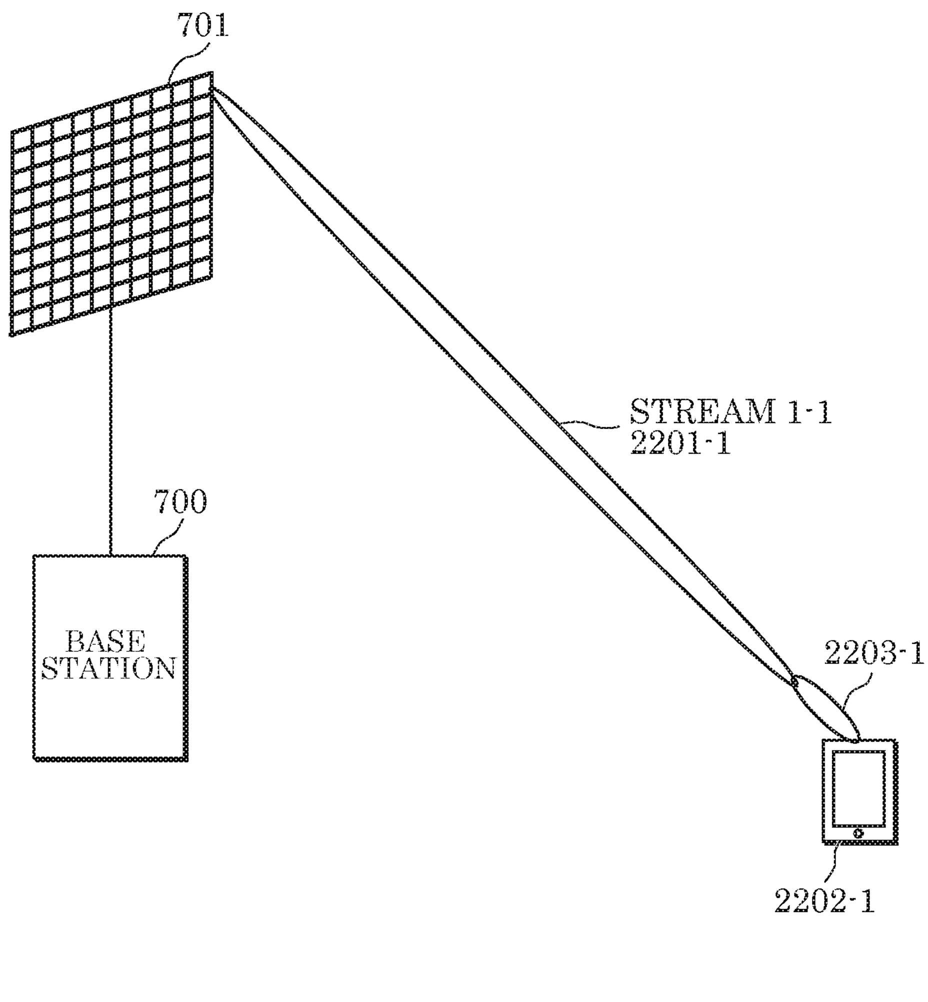
FIG. 22 is a diagram illustrating an example of a state of communication between the base station and a terminal.

FIG. 22 illustrates the case where the base station transmits a transmission stream for multicasting to one terminal.

In FIG. 22, base station 700 transmits transmission beam 2201-1 for "stream 1-1 (a first beam for stream 1) (for multicasting)" from an antenna for transmission to terminal 2202-1, and terminal 2202-1 performs directivity control to generate receiving directivity 2203-1, and receives transmission beam 2201-1 for "stream 1-1".

Figure 23:
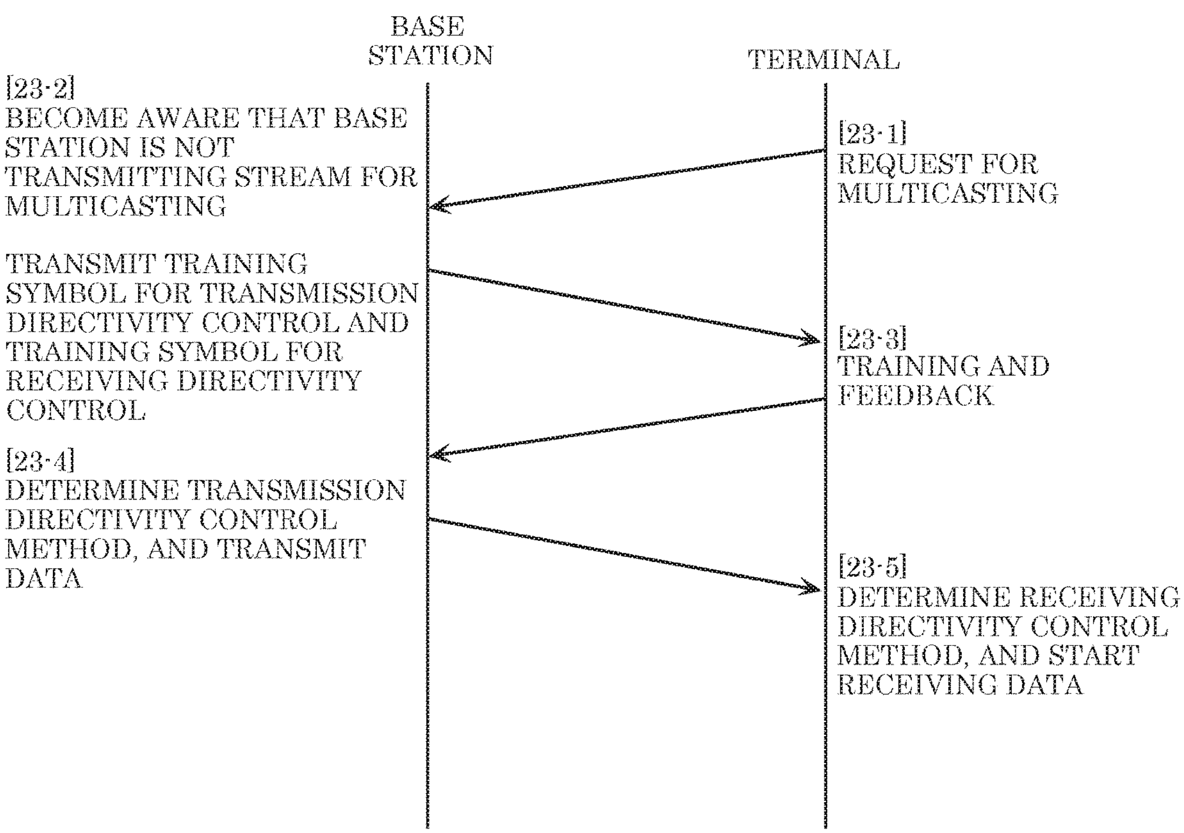
FIG. 23 is a diagram illustrating a procedure of performing communication between the base station and a terminal.

FIG. 23 is for describing a "procedure for performing communication between a base station and a terminal" to achieve the state of communication between the base station and the terminal as illustrated in FIG. 22.

[23-1] First, the terminal transmits a "request to transmit stream 1 by multicasting" to a base station.

[23-2] Upon receiving [23-1], the base station becomes aware that the base station "is not transmitting stream 1 by multicasting". Then, the base station transmits, to the terminal, a training symbol for transmission directivity control, and a training symbol for receiving directivity control, in order to transmit stream 1 by multicasting.

[23-3] The terminal receives the training symbol for transmission directivity control and the training symbol for receiving directivity control transmitted by the base station, and transmits feedback information to the base station in order that the base station performs transmission directivity control and the terminal performs receiving directivity control.

[23-4] The base station determines a method for transmission directivity control (determines, for instance, a weighting factor to be used for directivity control), based on the feedback information transmitted by the terminal, performs transmission directivity control, and transmits data symbols for stream 1.

[23-5] The terminal determines a receiving directivity control method (determines, for instance, a weighting factor to be used for directivity control), and starts receiving the data symbols for stream 1 transmitted by the base station.

Note that the "procedure for a base station and a terminal to communicate" in FIG. 23 is an example, and the order of transmitting information items is not limited to the order in FIG. 23, and communication between the base station and the terminal can be similarly established even if the order of transmitting information items has changed. FIG. 23 illustrates, as an example, the case in which the terminal performs receiving directivity control, yet the terminal may not perform receiving directivity control. In such a case, the base station may not transmit a training symbol for receiving directivity control and the terminal does not determine a receiving directivity control method, in FIG. 23.

When the base station performs transmission directivity control, if the base station has a configuration in FIG. 1, for example, multiplication coefficients for multipliers 204-1, 204-2, 204-3, and 204-4 in FIG. 2 are determined, whereas if the base station has a configuration in FIG. 3, weighting factors for weighting synthesizer 301 are determined, for example. Note that the number of streams to be transmitted is "1" in FIG. 22, yet the present disclosure is not limited to this.

When the terminal performs receiving directivity control, if the terminal has a configuration in FIG. 4, for example, multiplication coefficients for multipliers 503-1, 503-2, 503-3, and 503-4 in FIG. 5 are determined, whereas when the terminal has the configuration in FIG. 6, multiplication coefficients for multipliers 603-1, 603-2, . . . , and 603-L, for example, are determined.

Figure 24:
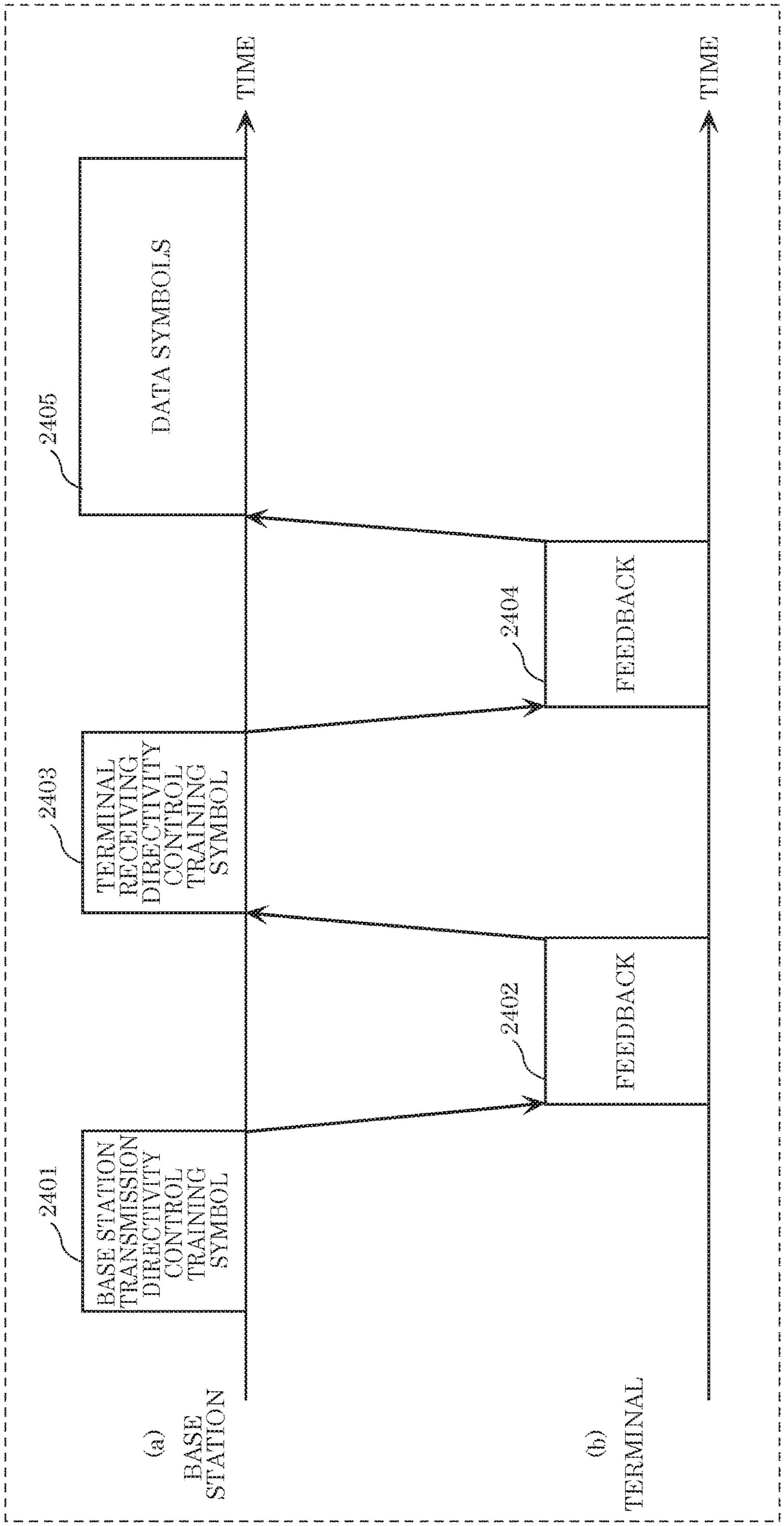
FIG. 24 is a diagram illustrating examples of symbols which the base station and a terminal transmit.

FIG. 24 is a diagram illustrating examples of symbols which the base station transmits and symbols which a terminal transmits along a time-axis, when the base station in FIG. 23 transmits a symbol for transmission directivity control, a symbol for receiving directivity control, and data symbols. In FIG. 24, (a) is a diagram illustrating examples of symbols which the base station transmits, along the time-axis, and (b) is a diagram illustrating examples of symbols which the terminal transmits along the time-axis, while the horizontal axis indicates time in both of (a) and (b).

When the base station and the terminal communicate with each other as illustrated in FIG. 23, first, the base station transmits "base station transmission directivity control training symbol" 2401 as illustrated in FIG. 24. For example, "base station transmission directivity control training symbol" 2401 includes a control information symbol and a known PSK symbol.

Then, the terminal receives "base station transmission directivity control training symbol" 2401 transmitted by the base station, and transmits, as feedback information symbol 2402, information on an antenna to be used by the base station for transmission and information on multiplication coefficients (or weighting factors) to be used for directivity control, for example.

The base station receives "feedback information symbol" 2402 transmitted by the terminal, determines an antenna to be used for transmission from feedback information symbol 2402, and determines a coefficient to be used for transmission directivity control from feedback information symbol 2402. After that, the base station transmits "terminal receiving directivity control training symbol" 2403. For example, "terminal receiving directivity control training symbol" 2403 includes a control information symbol and a known PSK symbol.

Then, the terminal receives "terminal receiving directivity control training symbol" 2403 transmitted by the base station, and determines an antenna which the terminal is to use for receiving and a multiplication coefficient which the terminal is to use for receiving directivity control, for example. Then, the terminal transmits feedback information symbol 2404, notifying that preparation for receiving data symbols is completed.

Then, the base station receives "feedback information symbol" 2404 transmitted by the terminal, and outputs data symbols 2405 based on feedback information symbol 2404.

Note that communication between the base station and the terminal in FIG. 24 is an example, and the order of transmitting symbols and the order in which the base station and the terminal transmit symbols are not limited to those illustrated therein. "Base station transmission directivity control training symbol" 2401, "feedback information symbol" 2402, "terminal receiving directivity control training symbol" 2403, "feedback information symbol" 2404, and "data symbols" 2405 may each include: a preamble for signal detection, time synchronization, frequency synchronization, frequency offset estimation, and channel estimation, a reference symbol, a pilot symbol, and a symbol for transmitting control information, for instance.

Figure 25:
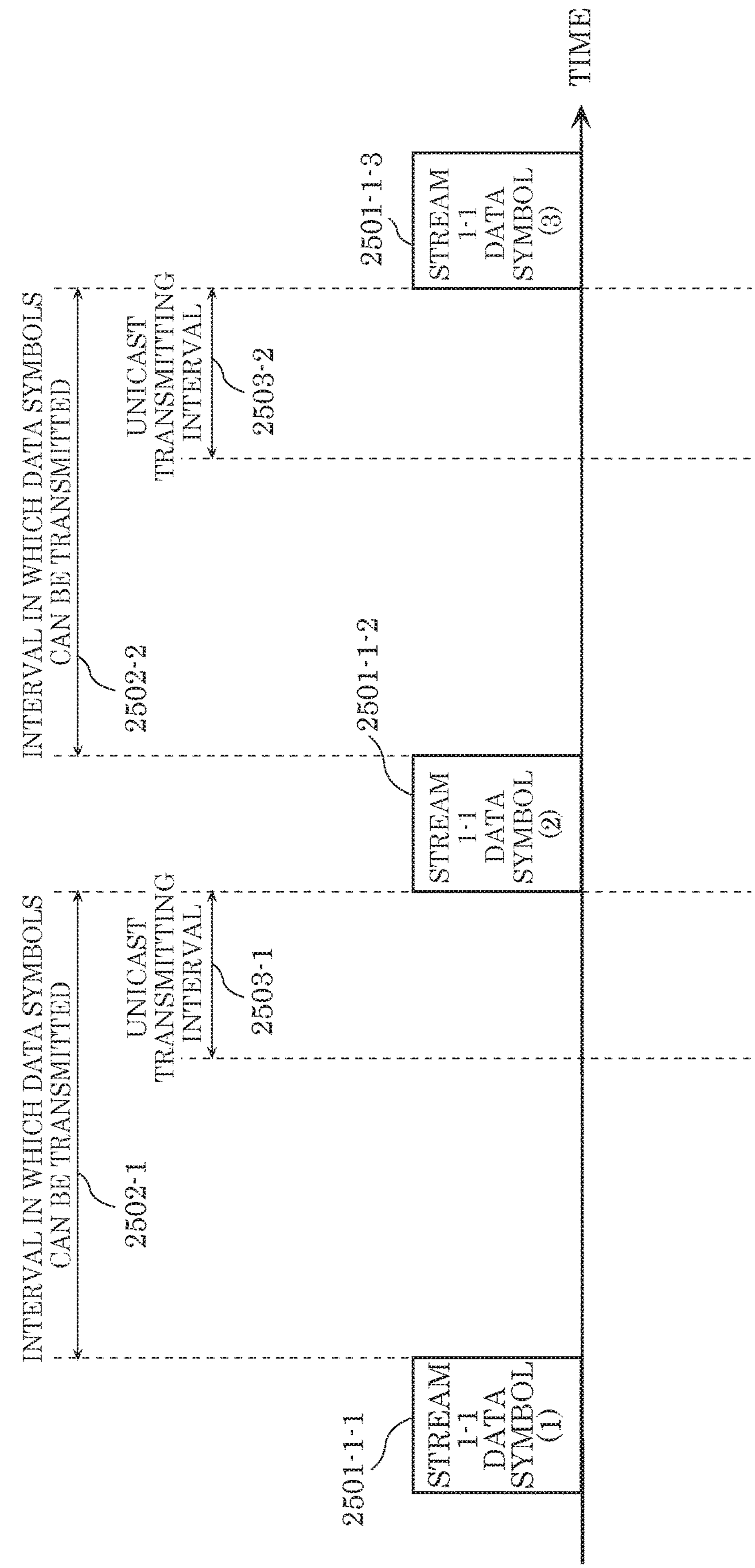
FIG. 25 is a diagram illustrating examples of symbols which the base station transmits.

FIG. 25 illustrates examples of symbols which the base station transmits when the base station transmits data symbols for stream 1 after communication between the base station and the terminal in FIG. 23 is completed, while the horizontal axis indicates time.

In FIG. 25, the base station transmits a first data symbol for transmission beam 1 for stream 1 as "stream 1-1 data symbol (1) (for multicasting)" 2501-1-1. After that, interval 2502-1 in which data symbols can be transmitted is arranged.

After that, the base station transmits a second data symbol for transmission beam 1 for stream 1 (for multicasting) as "stream 1-1 data symbol (2) (for multicasting)" 2501-1-2. After that, interval 2502-2 in which data symbols can be transmitted is arranged.

After that, the base station transmits a third data symbol for transmission beam 1 for stream 1 (for multicasting) as "stream 1-1 data symbol (3) (for multicasting)" 2501-1-3.

Accordingly, the base station transmits data symbols for "stream (for multicasting) 1-1" 2201-1 illustrated in FIG. 22. Note that in FIG. 25, "stream 1-1 data symbol (1) (for multicasting)" 2501-1-1, "stream 1-1 data symbol (2) (for multicasting)" 2501-1-2, "data symbol 1-1 data symbol (3) (for multicasting)" 2501-1-3, and so on may each include, other than a data symbol, a preamble for signal detection, time synchronization, frequency synchronization, frequency offset estimation, and channel estimation, a reference symbol, a pilot symbol, and a symbol for transmitting control information, for instance.

Note that in FIG. 25, interval 2502-1 in which data symbols can be transmitted includes unicast transmitting interval 2503-1, and interval 2502-2 in which data symbols can be transmitted includes unicast transmitting interval 2503-2.

In FIG. 25, a frame includes unicast transmitting intervals 2503-1 and 2503-2. For example, in FIG. 25, the base station may transmit symbols for multicasting in an interval within interval 2502-1 in which data symbols can be transmitted and other than unicast transmitting interval 2503-1, and an interval within interval 2502-2 in which data symbols can be transmitted and other than unicast transmitting interval 2503-2. This point will be described later using an example.

Thus, including a unicast transmitting interval in a frame is a useful feature for stably operating a wireless communication system. This point will be later described using an example. Note that the unicast transmitting intervals may not be in the temporal positions as illustrated in FIG. 25, and may be arranged in any temporal positions. Note that in the unicast transmitting intervals, the base station may transmit symbols or the terminal may transmit symbols.

Furthermore, a configuration may be adopted in which the base station can directly set a unicast transmitting interval, or as another method, the base station may set the maximum transmission-data transmission speed for transmitting symbols for multicasting.

For example, when the transmission speed at which the base station can transmit data is 2 Gbps (bps: bits per second) and the maximum transmission speed at which the base station can transmit data that can be assigned to transmit symbols for multicasting is 1.5 Gbps, a unicast transmitting interval corresponding to 500 Mbps can be set.

Accordingly, a configuration may be adopted in which the base station can indirectly set a unicast transmitting interval. Note that another specific example will be described later.

Note that in accordance with the state in FIG. 22, FIG. 25 illustrates a frame configuration in which "stream 1-1 data symbol (1) (for multicasting)" 2501-1-1, "stream 1-1 data symbol (2) (for multicasting)" 2501-1-2, and "stream 1-1 data symbol (3) (for multicasting)" 2501-1-3 are present, yet the present disclosure is not limited to such a frame configuration. For example, a data symbol for a stream for multicasting other than stream 1 (stream 1-1) may be present, a data symbol for stream 1-2 which is a second transmission beam for stream 1, and a data symbol for stream 1-3 which is a third transmission beam for stream 1 may be present. This point will be described later.

Figure 26:
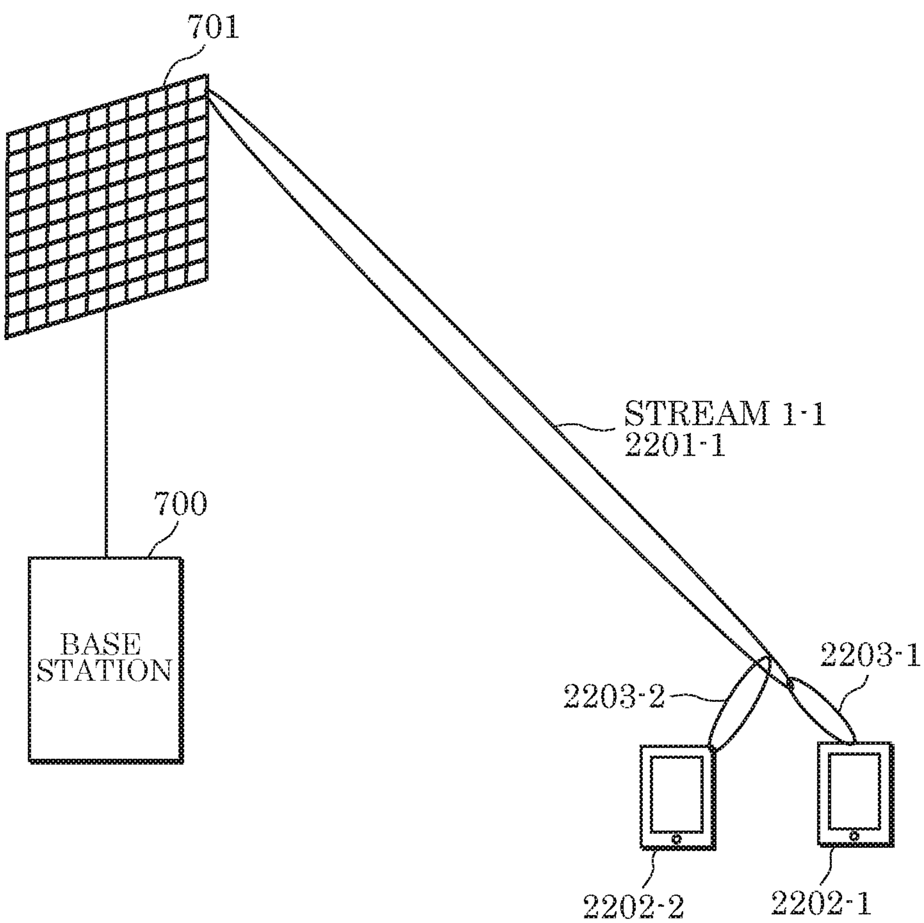
FIG. 26 is a diagram illustrating an example of a state of communication between the base station and terminals.

FIG. 26 illustrates a state when a terminal is newly added to the state in FIG. 22 in which the base station transmits transmission streams for multicasting to one terminal, and elements which operate in the same manner as those in FIG. 22 are assigned the same reference signs.

In FIG. 26, the terminal newly added is 2202-2. Terminal 2202-2 generates receiving directivity 2203-2 by performing directivity control, and receives transmission beam 2201-1 for "stream 1-1 (for multicasting)".

The following describes FIG. 26.

Figure 27:
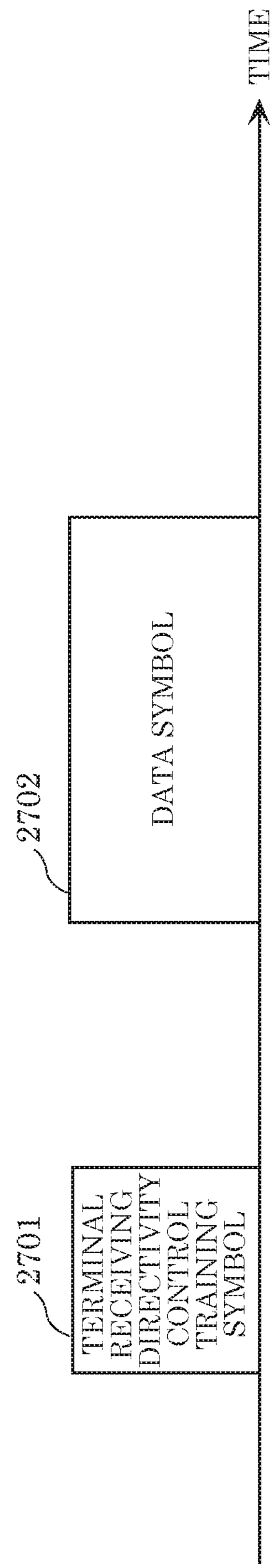
FIG. 27 is a diagram illustrating examples of symbols which the base station transmits.

In the following description, in FIG. 26, terminal 2202-2 newly participates in the multicast communication in a state where base station 700 and terminal 2202-1 are performing multicast communication. Thus, as illustrated in FIG. 27, the base station transmits "terminal receiving directivity control training symbol" 2701 and "data symbol" 2702, and does not transmit "base station transmission training symbol" illustrated in FIG. 24. Note that in FIG. 27, the horizontal axis indicates time.

Figure 28:
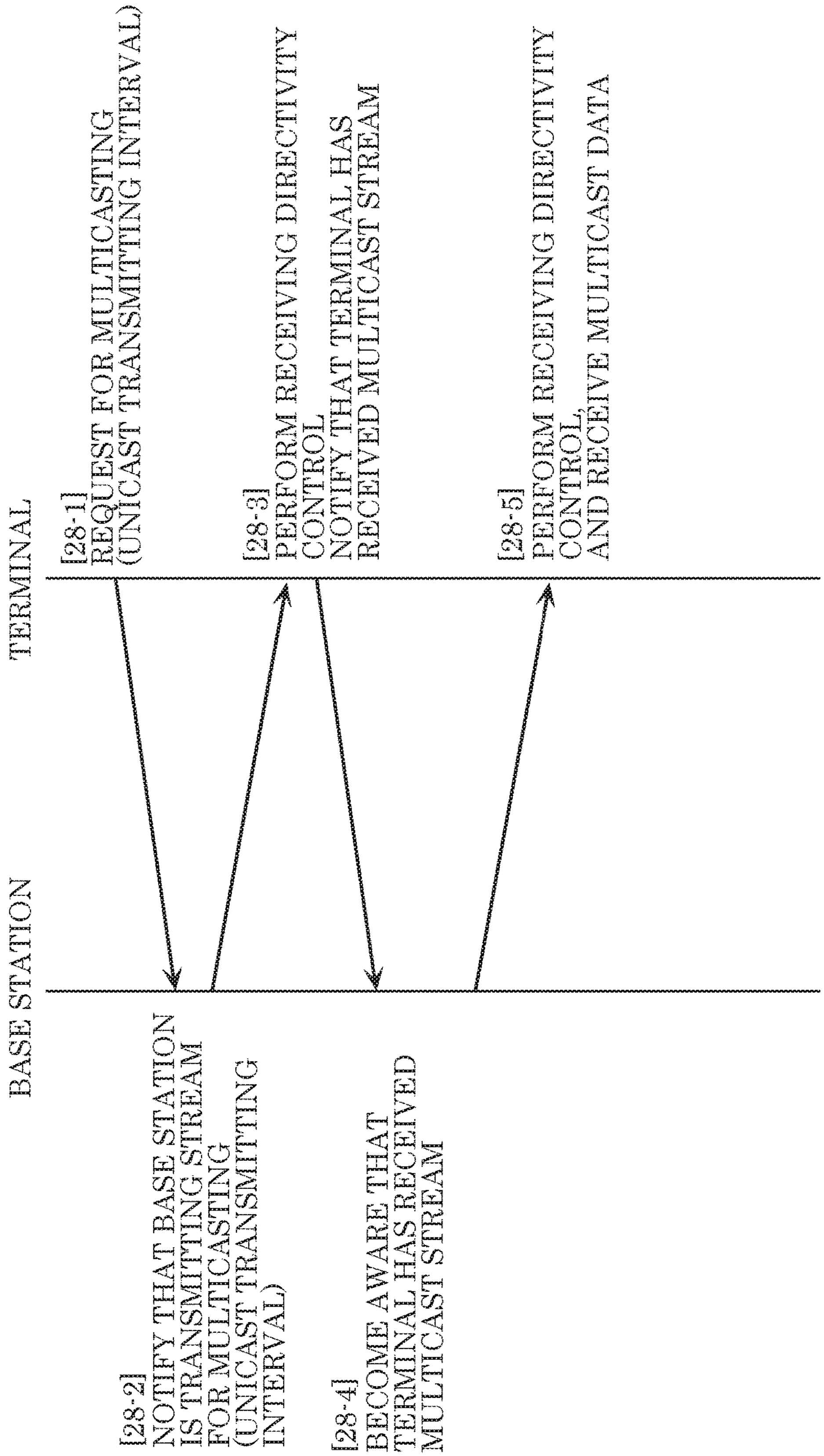
FIG. 28 is a diagram illustrating a procedure of performing communication between the base station and a terminal.

FIG. 28 illustrates an example of operation performed to achieve a state in which the base station transmits transmission beams for multicasting to two terminals as illustrated in FIG. 26.

[28-1] Terminal 2202-2 transmits a "request to transmit stream 1 by multicasting" to the base station. Note that the "request to transmit stream 1 by multicasting" is transmitted in a unicast transmitting interval in FIG. 25.

[28-2] Upon receiving [28-1], the base station notifies terminal 2202-2 that "the base station is transmitting stream 1 for multicasting". Note that the base station transmits a notification indicating that "the base station is transmitting stream 1 for multicasting" in a unicast transmitting interval in FIG. 25.

[28-3] Upon receiving [28-2], terminal 2202-2 performs receiving directivity control, in order to start receiving stream 1 for multicasting. Then, terminal 2202-2 performs receiving directivity control, and notifies the base station that "terminal 2202-2 has successfully received stream 1 for multicasting".

[28-4] Upon receiving [28-3], the base station becomes aware that the terminal has successfully received "stream 1 for multicasting".

[28-5] Terminal 2202-2 performs receiving directivity control, and starts receiving "stream 1 for multicasting".

Figure 29:
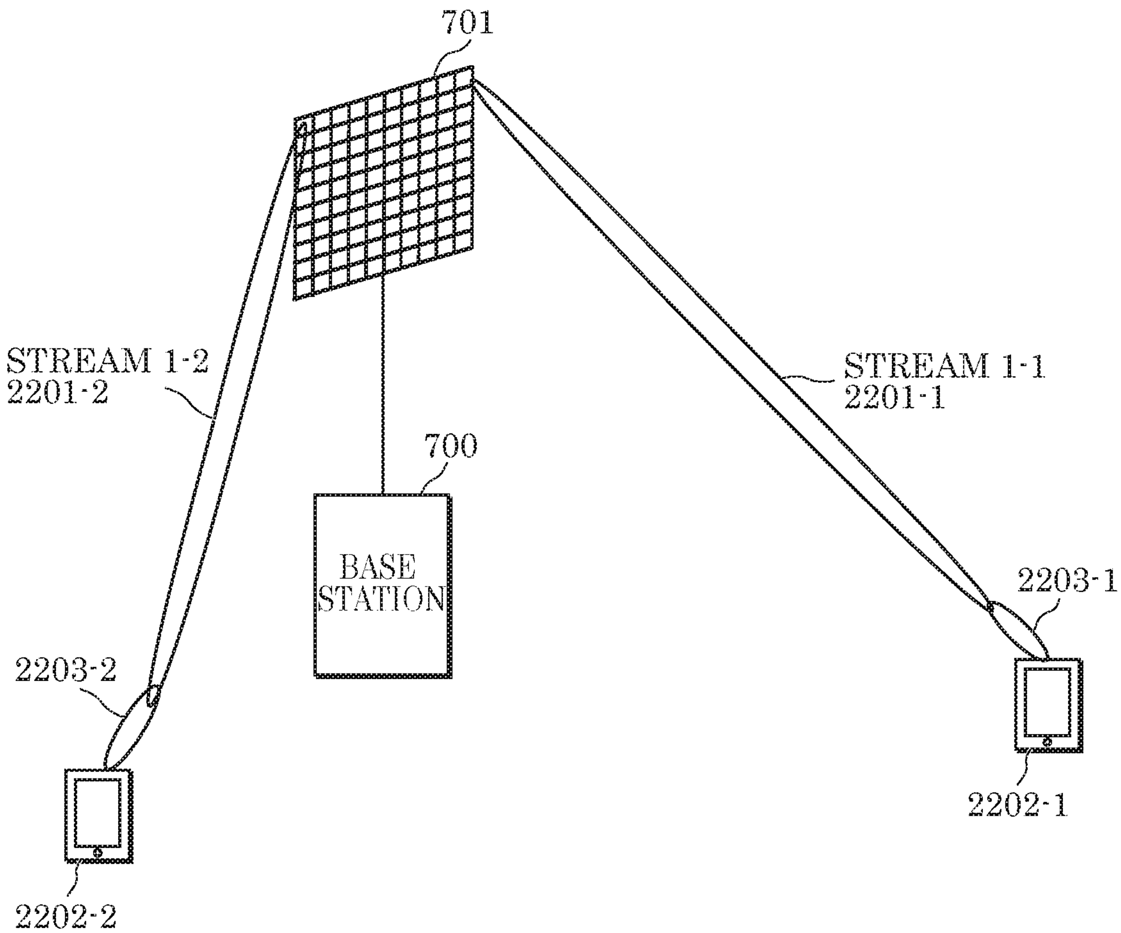
FIG. 29 is a diagram illustrating an example of a state of communication between the base station and terminals.

FIG. 29 illustrates that a terminal is newly added to a state in FIG. 22 in which the base station is transmitting a transmission stream for multicasting to one terminal. Elements which operate in the same manner as those in FIG. 22 are assigned the same reference signs.

In FIG. 29, the terminal newly added is 2202-2. At this time, different points from FIG. 26 are that base station 700 newly transmits transmission beam 2201-2 for "stream 1-2 (second transmission beam for stream 1) (for multicasting)", and terminal 2202-2 performs directivity control to generate receiving directivity 2203-2, and receives transmission beam 2201-2 for "stream 1-2 (for multicasting)".

The following describes control for achieving the state as in FIG. 29.

In the following description, in FIG. 29, terminal 2202-2 newly participates in multicast communication in a state in which base station 700 and terminal 2202-1 are performing multicast communication.

Figure 30:
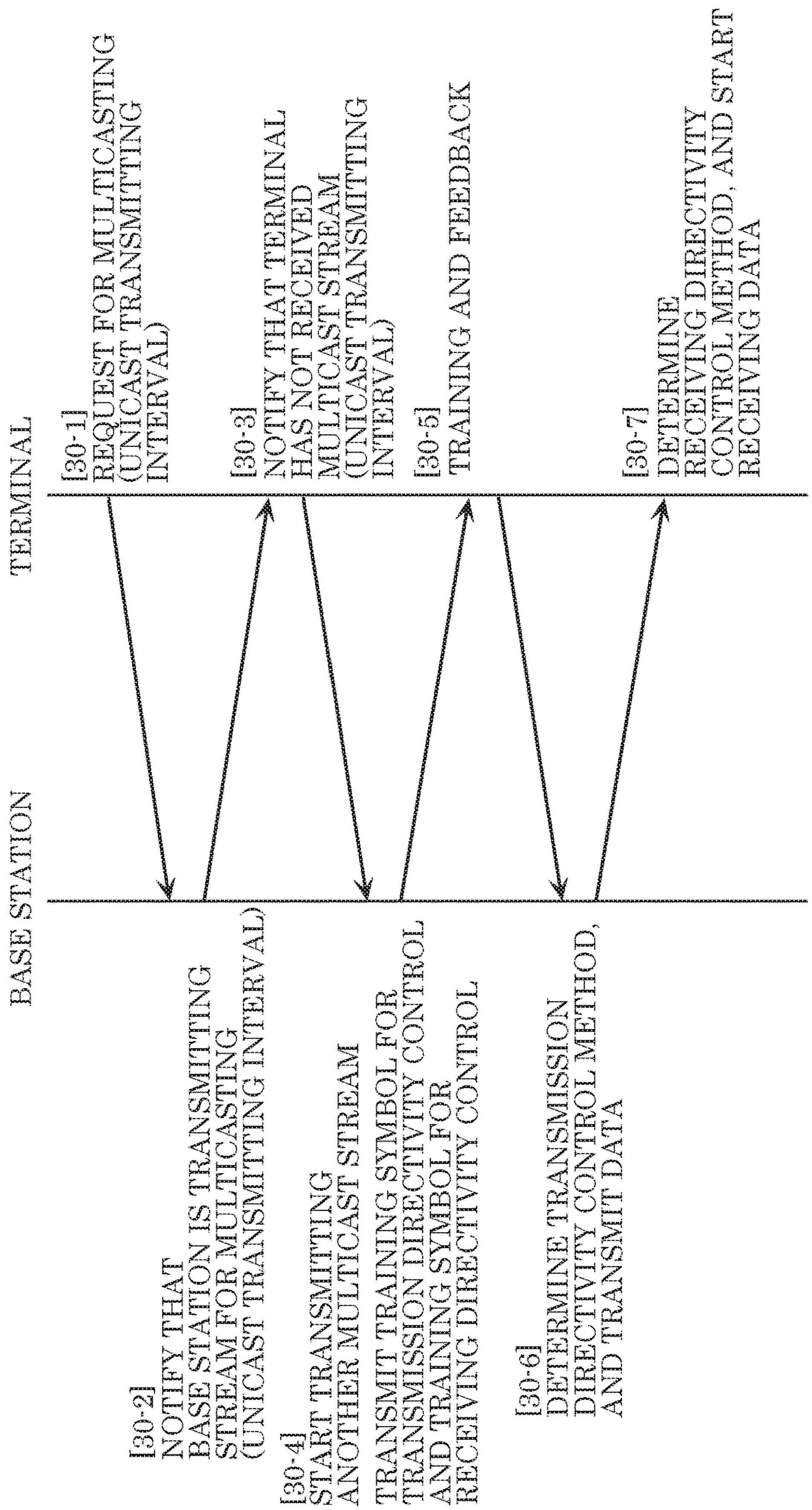
FIG. 30 is a diagram illustrating a procedure of performing communication between the base station and a terminal.

FIG. 30 illustrates an example of operation performed in order to achieve a state in which the base station transmits transmission beams for multicasting to two terminals, as illustrated in FIG. 29.

[30-1] Terminal 2202-2 transmits a "request to transmit stream 1 by multicasting" to the base station. Note that the "request to transmit stream 1 by multicasting" is transmitted in a unicast transmitting interval in FIG. 25.

[30-2] Upon receiving [30-1], the base station notifies terminal 2202-2 that "the base station is transmitting stream 1 for multicasting". Note that the base station transmits a notification indicating that "the base station is transmitting stream 1 for multicasting" in a unicast transmitting interval in FIG. 25.

[30-3] Upon receiving [30-2], terminal 2202-2 notifies the base station that "terminal 2202-2 has not received stream 1 for multicasting". Note that terminal 2202-2 transmits the notification indicating that "stream 1 for multicasting is not received" in a unicast transmitting interval in FIG. 25.

[30-4] Upon receiving [30-3], the base station determines to transmit another transmission beam (specifically, transmission beam 2201-2 in FIG. 29) for stream 1 for multicasting. Note that here, the base station determines to transmit another transmission beam for stream 1 for multicasting, yet the base station may determine not to transmit another transmission beam for stream 1 for multicasting. This point will be later described.

Thus, the base station transmits a training symbol for transmission directivity control and a training symbol for receiving directivity control to terminal 2202-2, in order to transmit stream 1 by multicasting. Note that the base station transmits a transmission beam for stream 1-1 in FIG. 29, separately from transmission of these symbols. This point will be described later.

[30-5] Terminal 2202-2 receives a training symbol for transmission directivity control and a training symbol for receiving directivity control which the base station has transmitted, and transmits feedback information to the base station in order that the base station performs transmission directivity control and terminal 2202-2 performs receiving directivity control.

[30-6] Based on the feedback information transmitted by terminal 2202-2, the base station determines a method for transmission directivity control (determines, for instance, a weighting factor to be used when performing directivity control), and transmits a data symbol for stream 1 (transmission beam 2201-2 for stream 1-2 in FIG. 29).

[30-7] Terminal 2202-2 determines a receiving directivity control method (determines, for instance, a weighting factor to be used when performing directivity control), and starts receiving data symbols for stream 1 (transmission beam 2201-2 for stream 1-2 in FIG. 29) which the base station has transmitted.

Note that the "procedure for a base station and a terminal to communicate" in FIG. 30 is an example, and the order of transmitting information items is not limited to the order in FIG. 30. Thus, communication between the base station and the terminal can be similarly established even if the order of transmitting information items has changed.

FIG. 30 illustrates an example in which the terminal performs receiving directivity control, yet the terminal may not perform receiving directivity control. In such a case, the base station may not transmit a training symbol for receiving directivity control, and the terminal may not determine a receiving directivity control method, in FIG. 30.

When the base station performs transmission directivity control, if the base station has a configuration in FIG. 1, for example, multiplication coefficients for multipliers 204-1, 204-2, 204-3, and 204-4 in FIG. 2 are determined, whereas if the base station has a configuration in FIG. 3, weighting factors for weighting synthesizer 301 are determined, for example. Note that the number of streams to be transmitted is "2" in the case of FIG. 29, yet the present disclosure is not limited to this.

Then, when terminals 2202-1 and 2202-2 perform receiving directivity control, if the terminals have a configuration in FIG. 4, for example, multiplication coefficients for multiplier 503-1, 503-2, 503-3, and 503-4 in FIG. 5 are determined, whereas when the terminals have a configuration in FIG. 6, multiplication coefficients for multipliers 603-1, 603-2, . . . , and 603-L are determined, for example.

Figure 31:
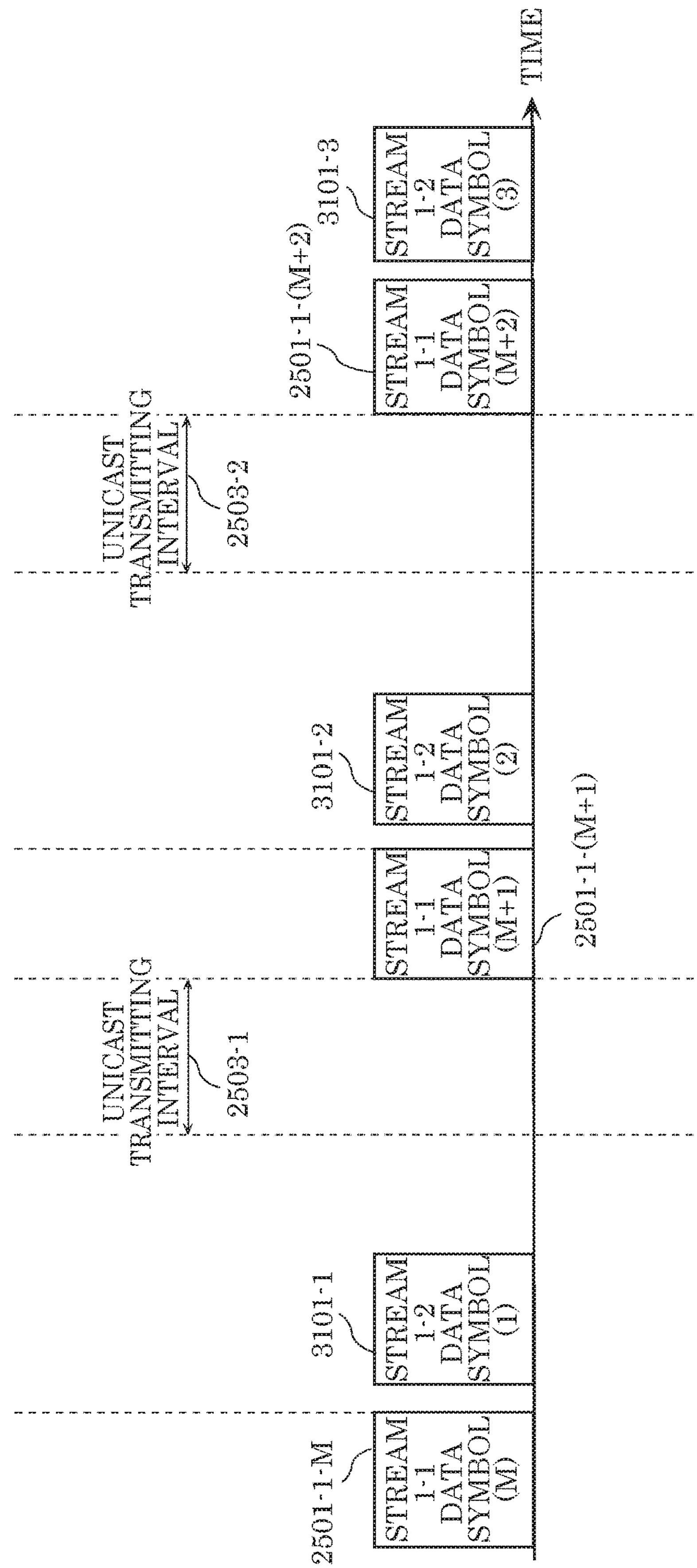
FIG. 31 is a diagram illustrating examples of symbols which the base station transmits.

FIG. 31 illustrates examples of symbols transmitted by the base station when the base station transmits data symbols for stream 1 after communication between the base station and the terminal in FIG. 30 is completed, while the horizontal axis indicates time.

In FIG. 31, "stream 1-1" in FIG. 29 is present, and thus similarly to FIG. 25, "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are present. Note that "(M), (M+1), (M+2)" are illustrated, and this is because stream 1-1 (for multicasting) is already present before stream 1-2 (for multicasting) is present. Accordingly, in FIG. 31, M is assumed to be an integer of 2 or greater.

Then, as illustrated in FIG. 31, "stream 1-2 data symbol (1) (for multicasting)" 3101-1, "stream 1-2 data symbol (2) (for multicasting)" 3101-2, and "stream 1-2 data symbol (3) (for multicasting)" 3101-3 are present in intervals other than unicast transmitting intervals 2503-1 and 2503-2.

The features are as follows as described above.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (1) (for multicasting)" 3101-1, "stream 1-2 data symbol (2) (for multicasting)" 3101-2, and "stream 1-2 data symbol (3) (for multicasting)" 3101-3 are all data symbols for transmitting "stream 1".

The terminal can obtain "data of stream 1" by obtaining "data symbols for stream 1-1". The terminal can obtain "data of stream 1" by obtaining "data symbols for stream 1-2".

The directivities of transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from the directivities of transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3. Thus, a set of multiplication coefficients (or weighting factors) for the transmitting device of the base station used in order to generate transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from a set of multiplication coefficients (or weighting factors) for the transmitting device of the base station used in order to generate transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

The above allows two terminals to receive multicast streams which the base station has transmitted. At this time, directivity control is performed by the transmitting device and the receiving device, and thus an advantageous effect of increasing an area in which streams for multicasting can be received is yielded. Furthermore, streams and transmission beams are added only when necessary, and thus an advantageous effect of effectively utilizing frequency, time, and space resources for transmitting data.

Note that control as described below may be performed. The details of the control are as follows.

Figure 32:
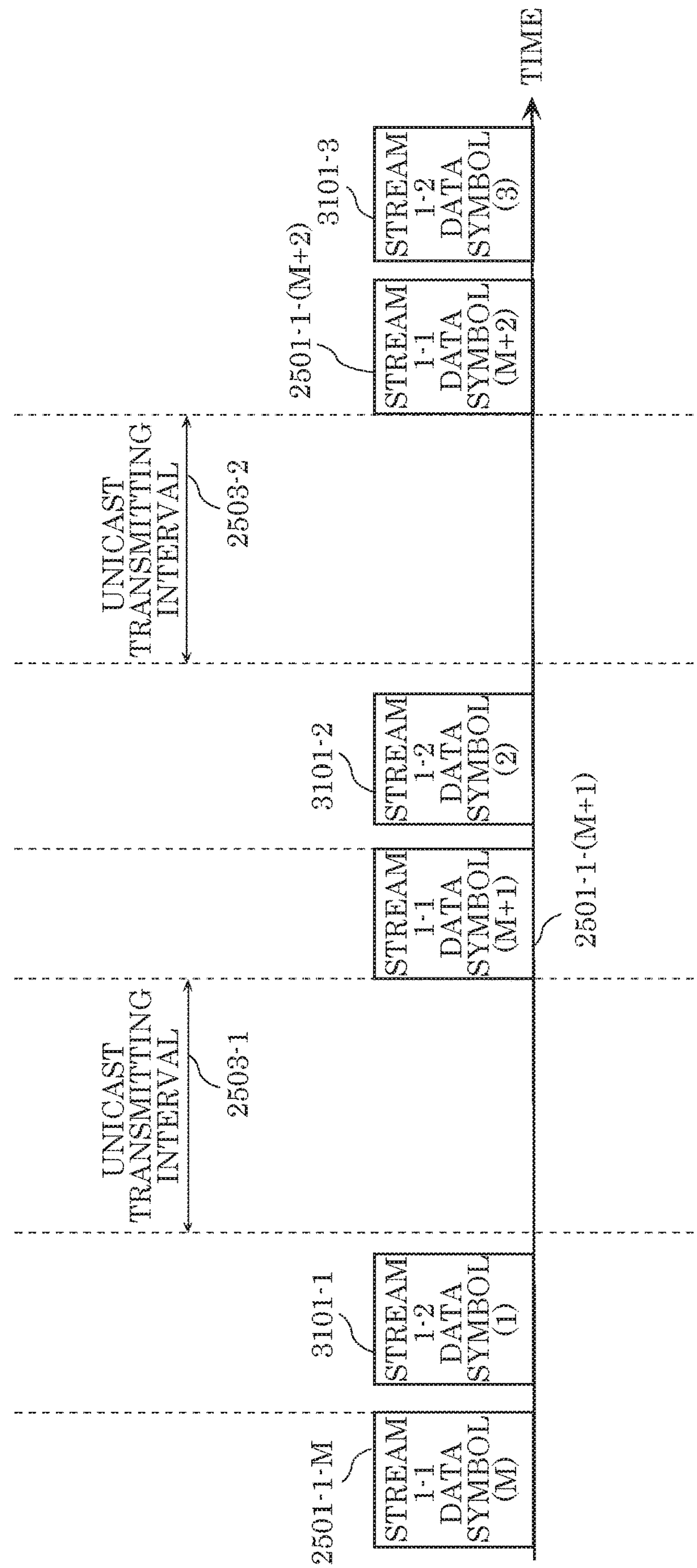
FIG. 32 is a diagram illustrating examples of symbols which the base station transmits.

FIG. 32 illustrates "examples of symbols which the base station transmits when the base station transmits data symbols (for stream 1) after communication between the base station and the terminal in FIG. 30 is completed", which are different from FIG. 31, where the horizontal axis indicates time. Note that elements which operate in the same manner as in FIGS. 25 and 31 are assigned the same reference signs in FIG. 32.

Different points in FIG. 32 from FIG. 31 are that unicast transmitting intervals 2503-1 and 2503-2 are set to longer time periods, and thus the base station does not further add and transmit symbols for multicasting.

Figure 33:
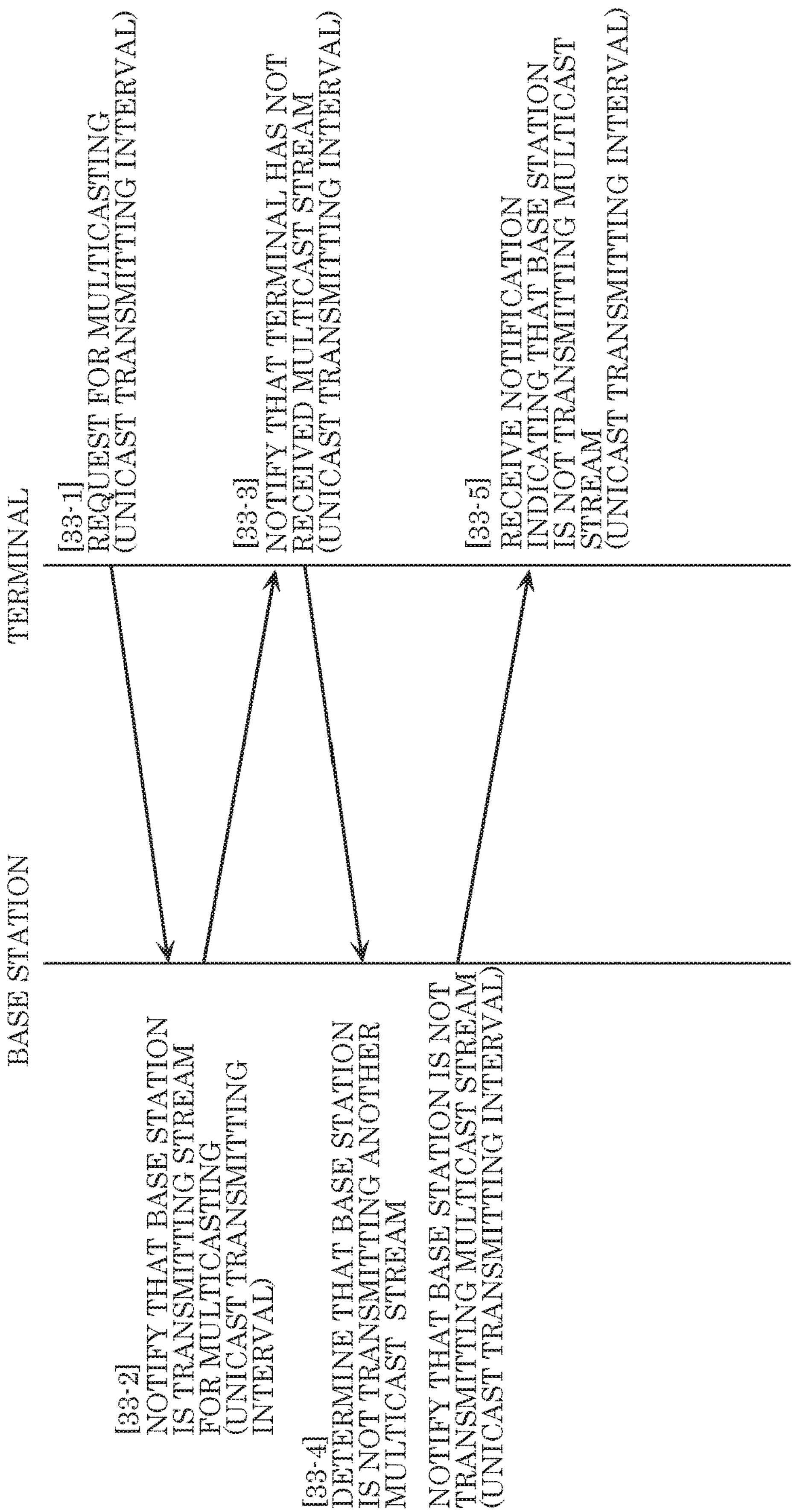
FIG. 33 is a diagram illustrating a procedure of performing communication between the base station and a terminal.

FIG. 33 illustrates an example of operation when new terminal 2202-3 transmits a request to the base station to add a transmission beam, in addition to transmission beams for multicasting transmitted by the base station to two terminals (terminals 2202-1 and 2202-2), as illustrated in FIG. 29. Note that FIG. 32 illustrates a frame of a modulated signal which the base station transmits.

[33-1] Terminal 2202-3 transmits to the base station a "request to transmit stream 1 by multicasting". Note that terminal 2202-3 transmits the "request to transmit stream 1 by multicasting" in a unicast transmitting interval in FIG. 32.

[33-2] Upon receiving [33-1], the base station notifies terminal 2202-3 that "the base station is transmitting stream 1 for multicasting". Note that the base station transmits the "notification indicating that the base station is transmitting stream 1 for multicasting" in a unicast transmitting interval in FIG. 32.

[33-3] Upon receiving [33-2], terminal 2202-3 notifies the base station that "terminal 2202-3 has not received stream 1 for multicasting". Note that terminal 2202-3 transmits the "notification indicating that stream 1 for multicasting has not been received" in a unicast transmitting interval in FIG. 32.

[33-4] Upon receiving [33-3], the base station determines whether a transmission beam other than the transmission beam for stream 1-1 and the transmission beam for stream 1-2 can be transmitted as a transmission beam for stream 1 for multicasting. At this time, taking into consideration that the frame is as illustrated in FIG. 32, the base station determines not to transmit another transmission beam for stream 1 for multicasting. Accordingly, the base station notifies terminal 2202-3 that "the base station is not to transmit another transmission beam for stream 1 for multicasting". Note that the base station transmits the "notification indicating that the base station is not to transmit another transmission beam for stream 1 for multicasting" in a unicast transmitting interval in FIG. 32.

[33-5] Terminal 2202-3 receives the "notification indicating that the base station is not to transmit another transmission beam for stream 1 for multicasting".

Note that the "procedure for a base station and a terminal to communicate" in FIG. 33 is an example, and the order of transmitting information items is not limited to the order in FIG. 33, so that communication between the base station and the terminal can be similarly established even if the order of transmitting items has changed. In this manner, if there are insufficient communication resources for multicast transmission, a multicast transmission beam may not be added.

Figure 34:
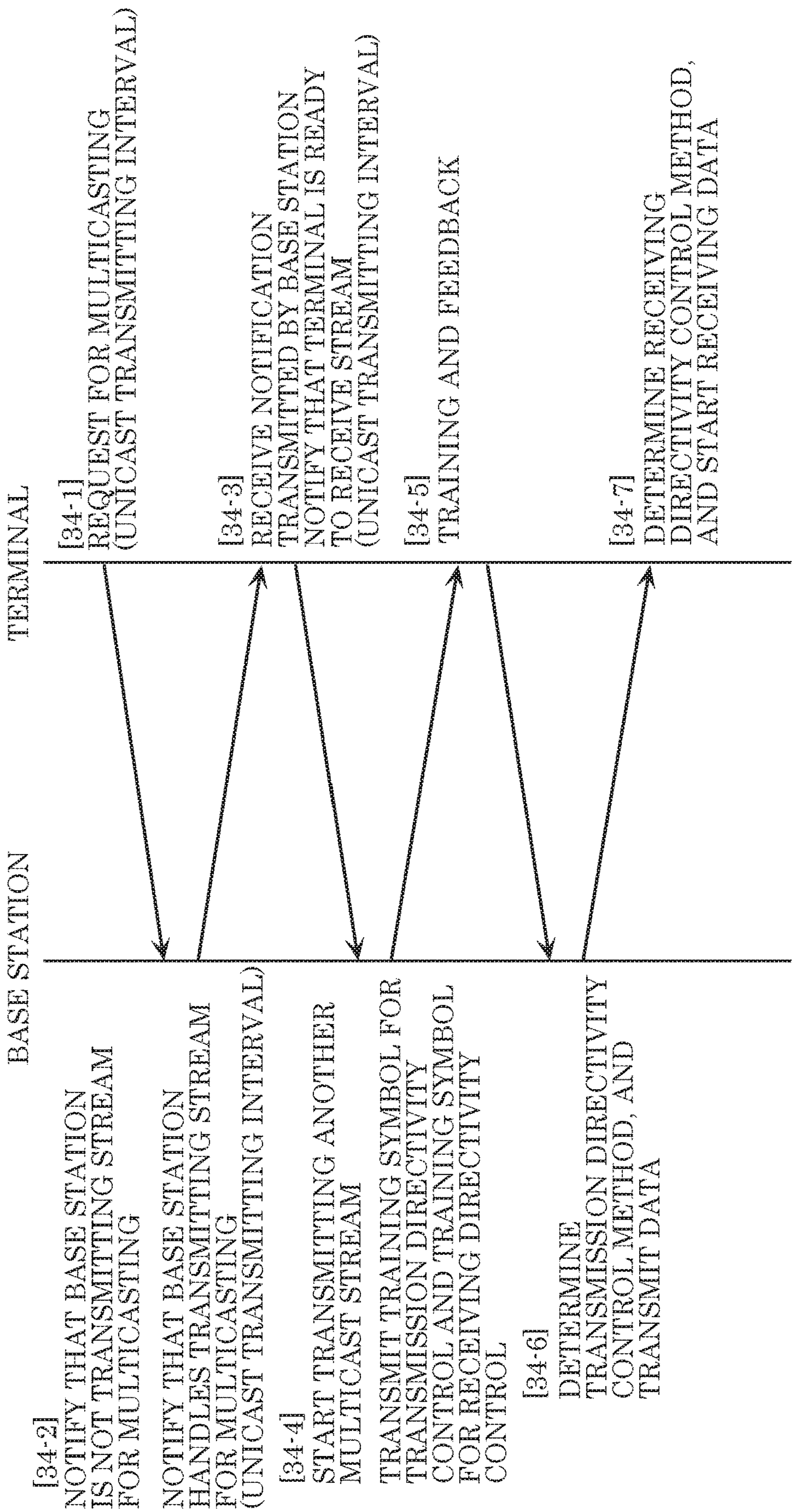
FIG. 34 is a diagram illustrating a procedure of performing communication between the base station and a terminal.

FIG. 34 illustrates an example of operation when new terminal 2202-3 transmits a request to the base station to add a transmission beam for another stream for multicasting (stream 2), in addition to transmission beams for multicasting transmitted by the base station to two terminals (terminals 2202-1 and 2202-2), illustrated in FIG. 29. Note that a frame of a modulated signal transmitted by the base station is in the state as illustrated in FIG. 31.

[34-1] Terminal 2202-3 transmits to the base station a "request to transmit stream 2 by multicasting". Note that terminal 2202-3 transmits the "request to transmit stream 2 by multicasting" in unicast transmitting interval 2503 in FIG. 31.

[34-2] Upon receiving [34-1], the base station notifies terminal 2202-3 that "the base station is not transmitting stream 2 for multicasting". In addition, the base station determines "whether the base station can add and transmit a transmission beam for stream 2 for multicasting". At this time, taking into consideration that the frame is in the state as illustrated in FIG. 31, the base station notifies terminal 2202-3 that "the base station is able to transmit a transmission beam for stream 2 for multicasting". Note that the base station transmits the "notification indicating that the base station is not transmitting stream 2 for multicasting" and the "notification indicating that the base station is able to transmit a transmission beam for stream 2 for multicasting" in unicast transmitting interval 2503 in FIG. 31.

[34-3] Upon receiving [34-2], terminal 2202-3 notifies the base station that "terminal 2203-3 is ready to receive stream 2 for multicasting". Note that terminal 2202-3 transmits the notification indicating that "terminal 2202-3 is ready to receive stream 2 for multicasting" in unicast transmitting interval 2503 in FIG. 31.

[34-4] Upon receiving [34-3], the base station determines to transmit a transmission beam for stream 2 for multicasting. Then, the base station transmits a training symbol for transmission directivity control and a training symbol for receiving directivity control, in order to transmit stream 2 to terminal 2202-3 by multicasting. Note that the base station transmits transmission beams for streams 1-1 and 1-2, as illustrated in FIG. 31, separately from transmission of the above symbols. This point will be described later.

[34-5] Terminal 2202-3 receives the training symbol for transmission directivity control and the training symbol for receiving directivity control which the base station has transmitted, and transmits feedback information to the base station in order that the base station performs transmission directivity control and terminal 2202-3 performs receiving directivity control.

[34-6] Based on the feedback information transmitted by terminal 2202-3, the base station determines a method for transmission directivity control (determines a weighting factor used for directivity control, for instance), and transmits data symbols for stream 2.

[34-7] Terminal 2202-3 determines a receiving directivity control method (determines a weighting factor used for directivity control, for instance), and starts receiving the data symbols for stream 2 which the base station has transmitted.

Note that the "procedure for a base station and a terminal to communicate" in FIG. 34 is an example, and the order of transmitting information items is not limited to the order in FIG. 34, and communication between the base station and the terminal can be similarly established even if the order of transmitting information items has changed. FIG. 34 illustrates an example in which the terminal performs receiving directivity control, yet the terminal may not perform receiving directivity control. In such a case, the base station may not transmit a training symbol for receiving directivity control, and the terminal does not determine a receiving directivity control method, in FIG. 34.

When the base station performs transmission directivity control, for example, multiplication coefficients for multipliers 204-1, 204-2, 204-3, and 204-4 in FIG. 2 are determined if the base station has a configuration in FIG. 1.

Then, when terminals 2202-1, 2202-2, and 2202-3 perform receiving directivity control, if the terminals have a configuration in FIG. 4, multiplication coefficients for multipliers 503-1, 503-2, 503-3, and 503-4 in FIG. 5 are determined, for example, whereas if the terminals have a configuration in FIG. 6, multiplication coefficients for multipliers 603-1, 603-2, . . . , and 603-L are determined, for example.

Figure 35:
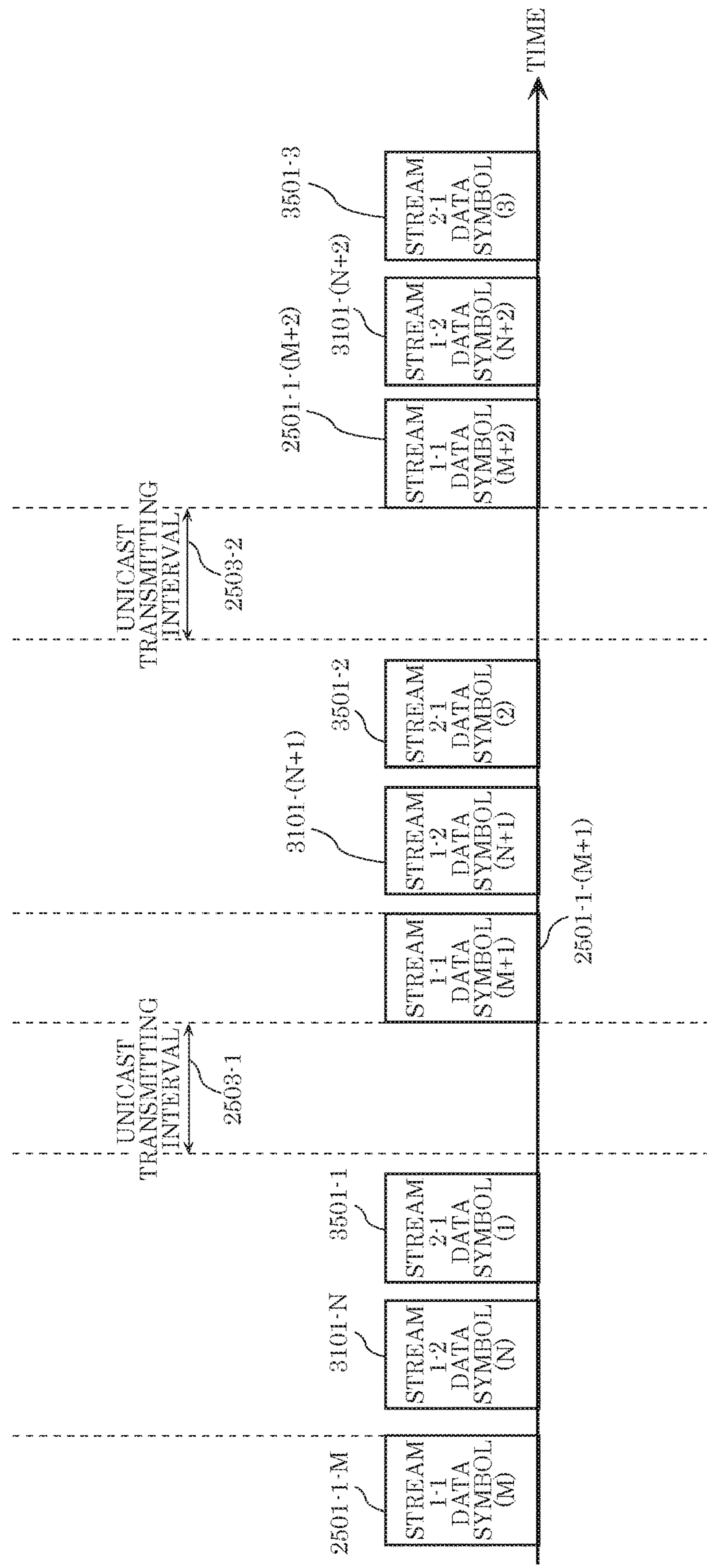
FIG. 35 is a diagram illustrating examples of symbols which the base station transmits.

FIG. 35 illustrates examples of symbols which the base station transmits when the base station transmits data symbols for stream 1 and stream 2 after communication between the base station and a terminal in FIG. 34 is completed, where the horizontal axis indicates time.

In FIG. 35, "stream 1-1" and "stream 1-2" illustrated in FIG. 31 are present, and thus "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are present. In addition, "stream 1-2 data symbol (N) (for multicasting)" 3101-N, "stream 1-2 data symbol (N+1) (for multicasting)" 3101-(N+1), and "stream 1-2 data symbol (N+2) (for multicasting)" 3101-(N+2) are present. Note that N and M are integers of 2 or greater.

As illustrated in FIG. 35, in intervals other than unicast transmitting intervals 2503-1 and 2503-2, "stream 2-1 data symbol (1) (for multicasting)" 3501-1, "stream 2-1 data symbol (2) (for multicasting)" 3501-2, and "stream 2-1 data symbol (3) (for multicasting)" 3501-3 are present.

As described above, the features achieved at this time are as follows.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (N) (for multicasting)" 3101-N, "stream 1-2 data symbol (N+1) (for multicasting)" 3101-(N+1), and "stream 1-2 data symbol (N+2) (for multicasting)" 3101-(N+2) are all data symbols for transmitting "stream 1".

A terminal obtains "data of stream 1" by obtaining "data symbols for stream 1-1". Further, the terminal obtains "data of stream 1" by obtaining "data symbols for stream 1-2".

The directivities of transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from the directivities of transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

Thus, a set of multiplication coefficients (or weighting factors) for the transmitting device of the base station used in order to generate transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) is different from a set of multiplication coefficients (or weighting factors) for the transmitting device of the base station used in order to generate transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

"Stream 2-1 data symbol (1) (for multicasting)" 3501-1, "stream 2-1 data symbol (2) (for multicasting)" 3501-2, and "stream 2-1 data symbol (3) (for multicasting)" 3501-3 are data symbols for transmitting "stream 2".

A terminal obtains data of "stream 2" by obtaining "data symbols for stream 2-1". The above allows the terminal to receive a plurality of multicast streams (streams 1 and 2) transmitted by the base station. At this time, directivity control is performed by the transmitting device and the receiving device, and thus an advantageous effect of increasing an area in which streams for multicasting can be received is yielded. Furthermore, streams and transmission beams are added only when necessary, and thus an advantageous effect of effectively utilizing frequency, time, and space resources for transmitting data.

Note that control as described below may be performed. The details of the control are as follows.

FIG. 32 illustrates "examples of symbols which the base station transmits when the base station transmits data symbols (for stream 1)", which is different from FIG. 35, where the horizontal axis indicates time. Note that elements which operate in the same manner as those in FIGS. 25 and 31 are assigned the same reference signs in FIG. 32.

Different points in FIG. 32 from FIG. 35 are that unicast transmitting intervals 2503-1 and 2503-2 are set to longer time periods, and thus the base station does not add and transmit any more symbols for multicasting, that is, for example, symbols for a new stream.

Figure 36:
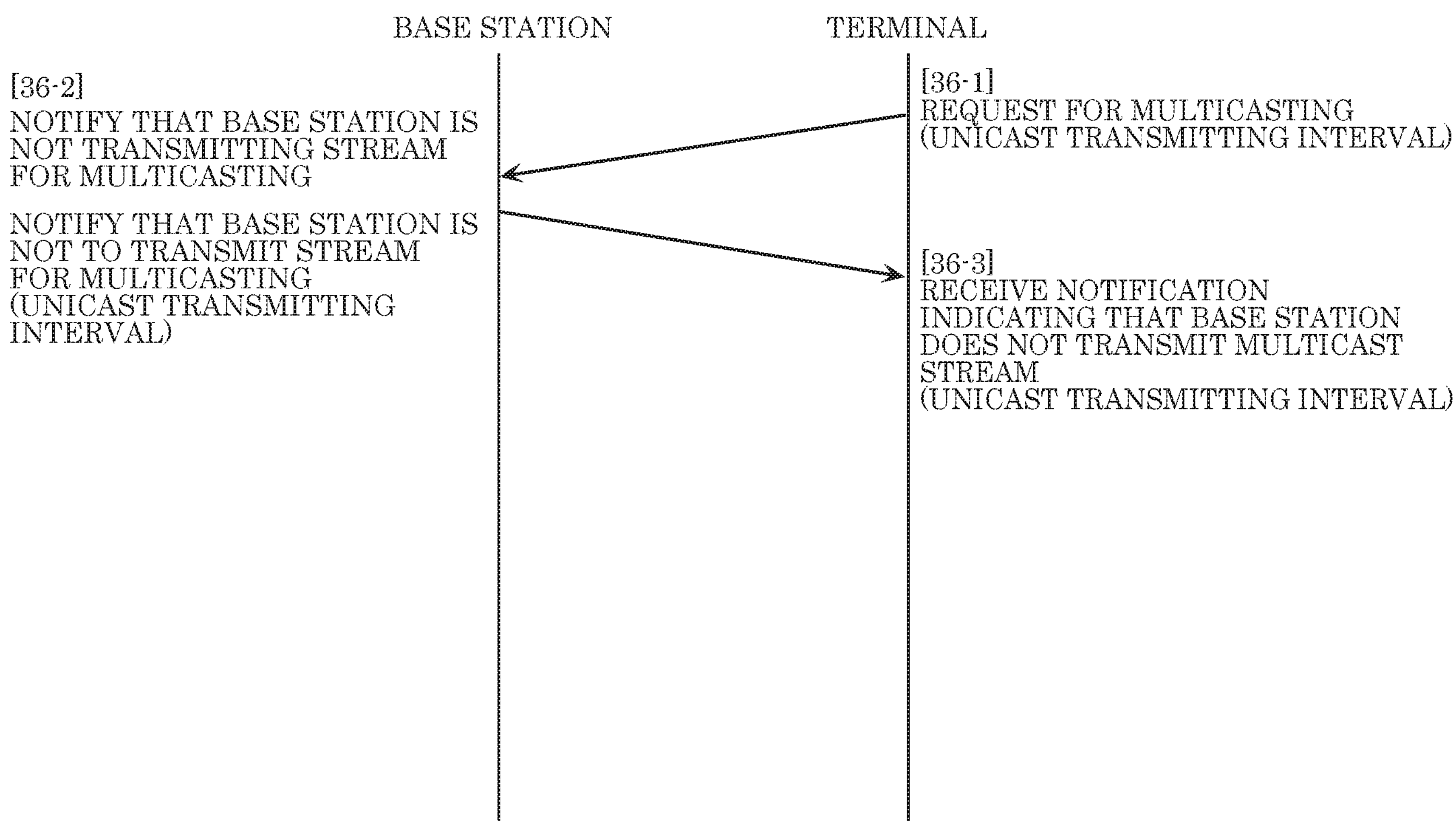
FIG. 36 is a diagram illustrating a procedure of performing communication between the base station and a terminal.

FIG. 36 illustrates an example of operation when new terminal 2202-3 transmits a request to the base station to add a transmission beam for another stream for multicasting (stream 2), in addition to transmission beams for multicasting transmitted by the base station to two terminals (terminals 2202-1 and 2202-2), as illustrated in FIG. 29. Note that FIG. 32 illustrates a frame of a modulated signal which the base station transmits.

[36-1] Terminal 2202-3 transmits to the base station a "request to transmit stream 2 by multicasting". Note that terminal 2202-3 transmits the "request to transmit stream 2 by multicasting" in a unicast transmitting interval in FIG. 32.

[36-2] Upon receiving [36-1], the base station notifies terminal 2202-3 that "the base station is not transmitting stream 2 for multicasting". Note that the base station transmits the notification indicating that "the base station is not transmitting stream 2 for multicasting" in a unicast transmitting interval in FIG. 32. In addition, the base station determines whether a transmission beam for stream 2 for multicasting can be transmitted. Taking the frame illustrated in FIG. 32 into consideration, the base station determines not to transmit a transmission beam for stream 2 for multicasting. Thus, the base station notifies terminal 2202-3 that "the base station is not to transmit stream 2 for multicasting". Note that the base station transmits the "notification indicating that the base station is not to transmit stream 2 for multicasting" in a unicast transmitting interval in FIG. 32.

[36-3] Terminal 2202-3 receives the "notification indicating that the base station is not to transmit stream 2 for multicasting".

Note that the "procedure for a base station and a terminal to communicate" in FIG. 36 is an example, and the order of transmitting information items is not limited to the order in FIG. 36. Communication between the base station and the terminal can be similarly established even if the procedure of transmitting items has changed. In this manner, if there are insufficient communication resources for multicast transmission, a stream and a multicast transmission beam may not be added.

Note that a supplemental description of a method for setting unicast transmitting intervals 2503-1 and 2503-2 illustrated in, for instance, FIG. 35 is now given.

For example, in FIG. 35, the maximum value of the number of transmission beams for multicasting is determined in advance or is set.

In response to requests from the terminals, the base station transmits transmission beams for multicasting, the number of which is smaller than or equal to the maximum value. For example, in the case of FIG. 35, the number of transmission beams for multicasting is 3. Then, the base station transmits a plurality of transmission beams for multicasting, and temporal idle time after transmitting the transmission beams is set as a unicast transmitting interval.

The unicast transmitting intervals may be determined as described above.

Supplementary Note 1

Supplementary Note 1 describes the case where a base station performs unicast communication with a plurality of terminals, or in other words, communicates separately with a plurality of terminals.

At this time, for example, #1 symbol group 901-1 for stream 1, #2 symbol group 901-2 for stream 1, and #3 symbol group 901-3 for stream 1 in FIG. 9 may be control information for broadcast channels, that is, control information which the base station transmits to a plurality of terminals by broadcasting in order to perform data communication with the plurality of terminals. Note that control information is to be used to, for example, establish data communication between the base station and a terminal.

For example, #1 symbol group 901-1 for stream 1, #2 symbol group 901-2 for stream 1, and #3 symbol group 901-3 for stream 1 in FIG. 9 may be common search spaces. Note that a common search space is control information for cell control. Also, a common search space is control information broadcast to a plurality of terminals.

Similarly, for example, #1 symbol group 902-1 for stream 2, #2 symbol group 902-2 for stream 2, and #3 symbol group 902-3 for stream 2 in FIG. 9 may be control information for broadcast channels, that is, control information which the base station transmits to a plurality of terminals by broadcasting in order to perform data communication with the plurality of terminals.

For example, #1 symbol group 902-1 for stream 2, #2 symbol group 902-2 for stream 2, and #3 symbol group 902-3 for stream 2 in FIG. 9 may be common search spaces.

Note that features of #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 are as described in the above embodiments.

For example, #1 symbol group 1401-1 for modulated signal 1, #2 symbol group 1401-2 for modulated signal 1, and #3 symbol group 1401-3 for modulated signal 1 in FIG. 14 may be control information for broadcast channels, that is, control information which the base station transmits to a plurality of terminals by broadcasting in order to perform data communication with the plurality of terminals.

In addition, for example, #1 symbol group 1401-1 for modulated signal 1, #2 symbol group 1401-2 for modulated signal 1, and #3 symbol group 1401-3 for modulated signal 1 in FIG. 14 may be common search spaces.

For example, #1 symbol group 1402-1 for modulated signal 2, #2 symbol group 1402-2 for modulated signal 2, and #3 symbol group 1402-3 for modulated signal 2 in FIG. 14 may be control information for broadcast channels, that is, control information which the base station transmits to a plurality of terminals by broadcasting in order to perform data communication with the plurality of terminals.

For example, #1 symbol group 1402-1 for modulated signal 2, #2 symbol group 1402-2 for modulated signal 2, and #3 symbol group 1402-3 for modulated signal 2 in FIG. 14 may be common search spaces.

Note that #1 symbol group 1401-1 for modulated signal 1, #2 symbol group 1401-2 for modulated signal 1, and #3 symbol group 1401-3 for modulated signal 1 in FIG. 14 are as described in the above embodiments, and #1 symbol group 1402-1 for modulated signal 2, #2 symbol group 1402-2 for modulated signal 2, and #3 symbol group 1402-3 for modulated signal 2 in FIG. 14 are as described in the above embodiments.

For example, stream 1-1 data symbol (1) 2501-1-1, stream 1-1 data symbol (2) 2501-1-2, and stream 1-1 data symbol (3) 2501-1-3 in FIG. 25 may be control information for broadcast channels, that is, control information which the base station transmits to a plurality of terminals by broadcasting in order to perform data communication with the plurality of terminals.

Stream 1-1 data symbol (1) 2501-1-1, stream 1-1 data symbol (2) 2501-1-2, and stream 1-1 data symbol (3) 2501-1-3 in FIG. 25 may be common search spaces.

Note that stream 1-1 data symbol (1) 2501-1-1, stream 1-1 data symbol (2) 2501-1-2, and stream 1-1 data symbol (3) 2501-1-3 in FIG. 25 are as described in the above embodiments.

For example, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be control information for broadcast channels, that is, control information which the base station transmits to a plurality of terminals by broadcasting in order to perform data communication with the plurality of terminals.

Further, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be common search spaces.

Note that stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 are as described in the above embodiments.

For example, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be control information for broadcast channels, that is, control information which the base station transmits to a plurality of terminals by broadcasting in order to perform data communication with the plurality of terminals.

Further, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be common search spaces.

For example, stream 2-1 data symbol (1) 3501-1, stream 2-1 data symbol (2) 3501-2, and stream 2-1 data symbol (3) 3501-3 in FIG. 35 may be control information for broadcast channels, that is, control information which the base station transmits to a plurality of terminals by broadcasting in order to perform data communication with the plurality of terminals.

Further, stream 2-1 data symbol (1) 3501-1, stream 2-1 data symbol (2) 3501-2, and stream 2-1 data symbol (3) 3501-3 in FIG. 35 may be common search spaces.

Note that in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) are as described in the above embodiments, and stream 2-1 data symbol (1) 3501-1, stream 2-1 data symbol (2) 3501-2, and stream 2-1 data symbol (3) 3501-3 in FIG. 35 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Supplementary Note 2

Supplementary Note 2 describes the case where the base station performs unicast communication with a plurality of terminals, or in other words, communicates separately with a plurality of terminals.

At this time, for example, #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 may be data addressed to the base station or data addressed to a terminal among a plurality of terminals communicating with the base station. At this time, such data may include control information.

Note that #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 are as described in the above embodiments.

For example, #1 symbol group 1401-1 for modulated signal 1, #2 symbol group 1401-2 for modulated signal 1, #3 symbol group 1401-3 for modulated signal 1, #1 symbol group 1401-3 for modulated signal 2, and #2 symbol group 1402-2 for modulated signal 2, and #3 symbol group 1402-3 for modulated signal 2 in FIG. 14 may be data addressed to the base station or data addressed to a terminal among a plurality of terminals communicating with the base station. At this time, such data may include control information.

Note that #1 symbol group 1401-1 for modulated signal 1, #2 symbol group 1401-2 for modulated signal 1, #3 symbol group 1401-3 for modulated signal 1, #1 symbol group 1401-3 for modulated signal 2, and #2 symbol group 1402-2 for modulated signal 2, and #3 symbol group 1402-3 for modulated signal 2 in FIG. 14 are as described in the above embodiments.

For example, stream 1-1 data symbol (1) 2501-1-1, stream 1-1 data symbol (2) 2501-1-2, and stream 1-1 data symbol (3) 2501-1-3 in FIG. 25 may be data addressed to the base station or data addressed to a terminal among a plurality of terminals communicating with the base station. At this time, such data may include control information.

Note that stream 1-1 data symbol (1) 2501-1-1, stream 1-1 data symbol (2) 2501-1-2, and stream 1-1 data symbol (3) 2501-1-3 in FIG. 25 are as described in the above embodiments.

For example, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be data addressed to the base station or data addressed to a terminal among a plurality of terminals communicating with the base station. At this time, such data may include control information.

Note that stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 are as described in the above embodiments.

For example, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be data addressed to the base station or data addressed to a terminal among a plurality of terminals communicating with the base station. At this time, such data may include control information.

For example, stream 2-1 data symbol (1) 3501-1, stream 2-1 data symbol (2) 3501-2, and stream 2-1 data symbol (3) 3501-3 in FIG. 35 may be data addressed to the base station or data addressed to a terminal among a plurality of terminals communicating with the base station. At this time, such data may include control information.

Note that in FIG. 35, stream 1-1 data symbol (M) 2501-1-M, stream 1-1 data symbol (M+1) 2501-1-(M+1), stream 1-1 data symbol (M+2) 2501-1-(M+2), and stream 1-2 data symbol (N) 3101-N, stream 1-2 data symbol (N+1) 3101-(N+1), stream 1-2 data symbol (N+2) 3101-(N+2), stream 2-1 data symbol (1) 3501-1, stream 2-1 data symbol (2) 3501-2, and stream 2-1 data symbol (3) 3501-3 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier).

Note that when the horizontal axis indicates frequency (carrier), the base station transmits data symbols using one or more carriers or subcarriers.

Supplementary Note 3

In a time period in which the base station transmits #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 are transmitted as shown in the frame configuration in FIG. 9, the base station may transmit another symbol group using a transmission beam different from "a transmission beam for #1 symbol group 901-1 for stream 1, a transmission beam for #2 symbol group 901-2 for stream 1, a transmission beam for #3 symbol group 901-3 for stream 1, a transmission beam for #1 symbol group 902-1 for stream 2, a transmission beam for #2 symbol group 902-2 for stream 2, and a transmission beam for #3 symbol group 902-3 for stream 2".

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Further, in a time period in which the base station transmits #1 symbol group 1401-1 for modulated signal 1, #2 symbol group 1401-2 for modulated signal 1, #3 symbol group 1401-3 for modulated signal 1, #1 symbol group 1402-1 for modulated signal 2, #2 symbol group 1402-2 for modulated signal 2, and #3 symbol group 1402-3 for modulated signal 2 as shown in the frame configuration in FIG.

14, the base station may transmit another symbol group using a transmission beam different from "a transmission beam for #1 symbol group 1401-1 for modulated signal 1, a transmission beam for #2 symbol group 1401-2 for modulated signal 1, a transmission beam for #3 symbol group 1401-3 for modulated signal 1, a transmission beam for #1 symbol group 1402-1 for modulated signal 2, a transmission beam for #2 symbol group 1402-2 for modulated signal 2, and a transmission beam for #3 symbol group 1402-3 for modulated signal 2".

At this time, the "other symbol group" may be a symbol group which includes a data symbol addressed to a certain terminal, may be a symbol group which includes a control information symbol group, or may be a symbol group which includes another data symbol for multicasting, as described in other portions of the present disclosure.

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Supplementary Note 4

In time periods in which a base station transmits stream 1-1 data symbol (1) 2501-1-1, stream 1-1 data symbol (2) 2501-1-2, and stream 1-1 data symbol (3) 2501-1-3 as shown in the frame configuration in FIG. 25, the base station may transmit another symbol group using a transmission beam different from "transmission beams for transmitting stream 1-1 data symbol (1) 2501-1-1, stream 1-1 data symbol (2) 2501-1-2, and stream 1-1 data symbol (3) 2501-1-3".

Note that the same also applies to the case where the horizontal axis indicates frequency in FIG. 25, and in time periods in which the base station transmits stream 1-1 data symbol (1) 2501-1-1, stream 1-1 data symbol (2) 2501-1-2, and stream 1-1 data symbol (3) 2501-1-3, the base station may transmit another symbol group using a transmission beam different from "transmission beams for transmitting stream 1-1 data symbol (1) 2501-1-1, stream 1-1 data symbol (2) 2501-1-2, and stream 1-1 data symbol (3) 2501-1-3".

In time periods in which the base station transmits stream 1-1 data symbol (M) 2501-1-M, stream 1-1 data symbol (M+1) 2501-1-(M+1), and stream 1-1 data symbol (M+2) 2501-1-(M+2) as shown in the frame configuration in FIGS. 31 and 32, the base station may transmit another symbol group using a transmission beam different from "transmission beams for transmitting stream 1-1 data symbol (M) 2501-1-M, stream 1-1 data symbol (M+1) 2501-1-(M+1), and stream 1-1 data symbol (M+2) 2501-1-(M+2)".

Note that the same also applies to the case where the horizontal axis indicates frequency in FIGS. 31 and 32, and in time periods in which the base station transmits stream 1-1 data symbol (M) 2501-1-M, stream 1-1 data symbol (M+1) 2501-1-(M+1), and stream 1-1 data symbol (M+2) 2501-1-(M+2), the base station may transmit another symbol group using a transmission beam different from "transmission beams for transmitting stream 1-1 data symbol (M) 2501-1-M, stream 1-1 data symbol (M+1) 2501-1-(M+1), and stream 1-1 data symbol (M+2) 2501-1-(M+2)".

In time periods in which the base station transmits stream 1-2 data symbol (1) 3101-1, stream 1-2 data symbol (2) 3101-2, and stream 1-2 data symbol (3) 3101-3 as shown in the frame configuration in FIGS. 31 and 32, the base station may transmit another symbol group using a transmission beam different from "transmission beams for transmitting stream 1-2 data symbol (1) 3101-1, stream 1-2 data symbol (2) 3101-2, and stream 1-2 data symbol (3) 3101-3".

Note that in FIGS. 31 and 32, the same also applies to the case where the horizontal axis indicates frequency in FIGS. 31 and 32, and in time periods in which the base station transmits stream 1-2 data symbol (1) 3101-1, stream 1-2 data symbol (2) 3101-2, and stream 1-2 data symbol (3) 3101-3, the base station may transmit another symbol group using a transmission beam different from transmission beams for transmitting "stream 1-2 data symbol (1) 3101-1, stream 1-2 data symbol (2) 3101-2, and stream 1-2 data symbol (3) 3101-3".

In time periods in which the base station transmits stream 1-1 data symbol (M) 2501-1-M, stream 1-1 data symbol (M+1) 2501-(M+1), and stream 1-1 data symbol (M+2) 2501-(M+2) as shown in the frame configuration in FIG. 35, the base station may transmit another symbol group using a transmission beam different from transmission beams for transmitting "stream 1-1 data symbol (M) 2501-1-M, stream 1-1 data symbol (M+1) 2501-(M+1), and stream 1-1 data symbol (M+2) 2501-(M+2)".

Note that in FIG. 35, the same also applies to the case where the horizontal axis indicates frequency, and in time periods in which the base station transmits stream 1-1 data symbol (M) 2501-1-M, stream 1-1 data symbol (M+1) 2501-(M+1), and stream 1-1 data symbol (M+2) 2501-(M+2), the base station may transmit another symbol group using a transmission beam different from "transmission beams for transmitting stream 1-1 data symbol (M) 2501-1-M, stream 1-1 data symbol (M+1) 2501-(M+1), and stream 1-1 data symbol (M+2) 2501-(M+2)".

In time periods in which the base station transmits stream 1-2 data symbol (N) 3101-N, stream 1-2 data symbol (N+1) 3101-(N+1), and stream 1-2 data symbol (N+2) 3101-(N+2) as shown in the frame configuration in FIG. 35, the base station may transmit another symbol group using a transmission beam different from "transmission beams for transmitting stream 1-2 data symbol (N) 3101-N, stream 1-2 data symbol (N+1) 3101-(N+1), and stream 1-2 data symbol (N+2) 3101-(N+2)".

Note that the same also applies to the case where the horizontal axis indicates frequency in FIG. 35, and in time periods in which the base station transmits stream 1-2 data symbol (N) 3101-N, stream 1-2 data symbol (N+1) 3101-(N+1), and stream 1-2 data symbol (N+2) 3101-(N+2), the base station may transmit another symbol group using a transmission beam different from "transmission beams for transmitting stream 1-2 data symbol (N) 3101-N, stream 1-2 data symbol (N+1) 3101-(N+1), and stream 1-2 data symbol (N+2) 3101-(N+2)".

In time periods in which the base station transmits stream 2-1 data symbol (1) 3501-1, stream 2-1 data symbol (2) 3501-2, and stream 2-1 data symbol (3) 3501-3 as shown in the frame configuration in FIG. 35, the base station may transmit another symbol group using a transmission beam different from "transmission beams for transmitting stream 2-1 data symbol (1) 3501-1, stream 2-1 data symbol (2) 3501-2, and stream 2-1 data symbol (3) 3501-3".

Note that the same also applies to the case where the horizontal axis indicates frequency in FIG. 35, and in time periods in which the base station transmits stream 2-1 data symbol (1) 3501-1, stream 2-1 data symbol (2) 3501-2, and stream 2-1 data symbol (3) 3501-3, the base station may transmit another symbol group using a transmission beam different from "transmission beams for transmitting stream 2-1 data symbol (1) 3501-1, stream 2-1 data symbol (2) 3501-2, and stream 2-1 data symbol (3) 3501-3".

In the above, the "other symbol group" may be a symbol group which includes a data symbol addressed to a certain terminal, or may be a symbol group which includes a control information symbol or a symbol group which includes another data symbol for multicasting, as described in other portions of the specification.

At this time, the base station in FIG. 1 may generate a transmission beam for the above "other symbol group" through signal processing by signal processor 102, or may generate a transmission beam for the above "other symbol group" by selecting antennas from antenna unit 106-1 to antenna unit 106-M.

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Then, unicast transmitting intervals 2503-1 and 2503-2 as illustrated in FIGS. 25, 31, and 32 may not be set.

Supplementary Note 5

A description with regard to FIGS. 31 and 32 includes the statement as follows.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (1) (for multicasting)" 3101-1, "stream 1-2 data symbol (2) (for multicasting)" 3101-2, and "stream 1-2 data symbol (3) (for multicasting)" 3101-3 are all data symbols for transmitting "stream 1".

A terminal can obtain "data of stream 1" by obtaining "data symbols for stream 1-1". Furthermore, a terminal can obtain "data of stream 1" by obtaining "data symbols for stream 1-2".

A description with regard to FIG. 35 includes the following statement.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (N) (for multicasting)" 3101-N, "stream 1-2 data symbol (N+1) (for multicasting)" 3101-(N+1), and "stream 1-2 data symbol (N+2) (for multicasting)" 3101-(N+2) are all data symbols to transmit "stream 1".

A terminal can obtain "data of stream 1" by obtaining "data symbols for stream 1-1". Furthermore, a terminal can obtain "data of stream 1" by obtaining "data symbols for stream 1-2".

The following gives a supplementary description with regard to the above. For example, in FIG. 35, the above can be achieved using <method 1-1>, <method 1-2>, <method 2-1>, or <method 2-2> as below.

<Method 1-1>

Stream 1-1 data symbol (M) 2501-1-M and stream 1-2 data symbol (N) 3101-N include the same data.

Then, stream 1-1 data symbol (M+1) 2501-1-(M+1) and stream 1-2 data symbol (N+1) 3101-(N+1) include the same data.

Stream 1-1 data symbol (M+2) 2501-1-(M+2) and stream 1-2 data symbol (N+2) 3101-(N+2) include the same data.

<Method 1-2>

Stream 1-2 data symbol (L) 3101-L which includes the same data as the data included in stream 1-1 data symbol (K) 2501-1-K is present. Note that K and L are integers.

<Method 2-1>

Stream 1-1 data symbol (M) 2501-1-M and stream 1-2 data symbol (N) 3101-N include the same data in part.

Then, stream 1-1 data symbol (M+1) 2501-1-(M+1) and stream 1-2 data symbol (N+1) 3101-(N+1) include the same data in part.

Stream 1-1 data symbol (M+2) 2501-1-(M+2) and stream 1-2 data symbol (N+2) 3101-(N+2) include the same data in part.

<Method 2-2>

Stream 1-2 data symbol (L) 3101-L which includes a part of data included in stream 1-1 data symbol (K) 2501-1-K is present. Note that K and L are integers.

Specifically, a first base station or a first transmission system generates a first packet group which includes data of a first stream, and a second packet group which includes data of the first stream, transmits a packet included in the first packet group in a first period using a first transmission beam, and transmits a packet included in the second packet group in a second period using a second transmission beam different from the first transmission beam. The first period and the second period do not overlap.

Here, the second packet group may include a second packet which includes data same as data included in a first packet included in the first packet group. As a configuration different from the above, the second packet group may include a third packet which includes data same as a part of the data included in the first packet included in the first packet group.

The first transmission beam and the second transmission beam may be transmission beams transmitted using the same antenna unit and having different directivities, or may be transmission beams transmitted using different antenna units.

In addition to the configuration of the first base station or the first transmission system, a second base station or a second transmission system further generates a third packet group which includes data of the first stream, and transmits a packet included in the third packet group in a third period using a third transmission beam different from the first transmission beam and the second transmission beam. The third period does not overlap the first period and the second period.

Here, the second base station or the second transmission system may repeatedly set the first period, the second period, and the third period in a predetermined order.

Further, in addition to the configuration of the first base station or the first transmission system, the third base station or the third transmission system further generates a third packet group which includes data of the first stream, and transmits a packet included in the third packet group in the third period using the third transmission beam different from the first transmission beam and the second transmission beam. At least a portion of the third period overlaps the first period.

Here, the third base station or the third transmission system may repeatedly set the first period, the second period, and the third period, the third periods repeatedly set may each at least partially overlap the first period, or at least one of the third periods repeatedly set may not overlap the first period(s).

Further, in addition to the configuration of the first base station or the first transmission system, a fourth base station or a fourth transmission system further generates a fourth packet which includes data of a second stream, and transmits the fourth packet in a fourth period using a fourth transmission beam different from the first transmission beam. At least a portion of the fourth period overlaps the first period.

Note that the first period and the second period do not overlap in the above description, yet the first period and the second period may partially overlap, the entire first period may overlap the second period, or the entire first period may overlap the entire second period.

A fifth base station or a fifth transmission system may generate one or more packet groups each of which includes data of the first stream, transmit the one or more packet groups using a different transmission beam for each packet group, and increase or decrease the number of packet groups to be generated, based on a signal transmitted from a terminal.

Note that the above describes "streams", yet as described in other portions of the specification, "stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3" in FIGS. 31 and 32, and "stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2)" in FIG. 35 may be symbols which include data symbols addressed to a certain terminal, symbols which include a control information symbol, or symbols which include a data symbol for multicasting.

Embodiment 4

The present embodiment is to describe specific examples of the communication system described in Embodiments 1 to 3.

The communication system according to the present embodiment includes a base station (or a plurality of base stations) and a plurality of terminals. For example, consider a communication system which includes, for instance, base station 700 as illustrated in, for instance, FIGS. 7, 12, 17, 19, 20, 26, and 29 and terminals 704-1 and 704-2.

Figure 37:
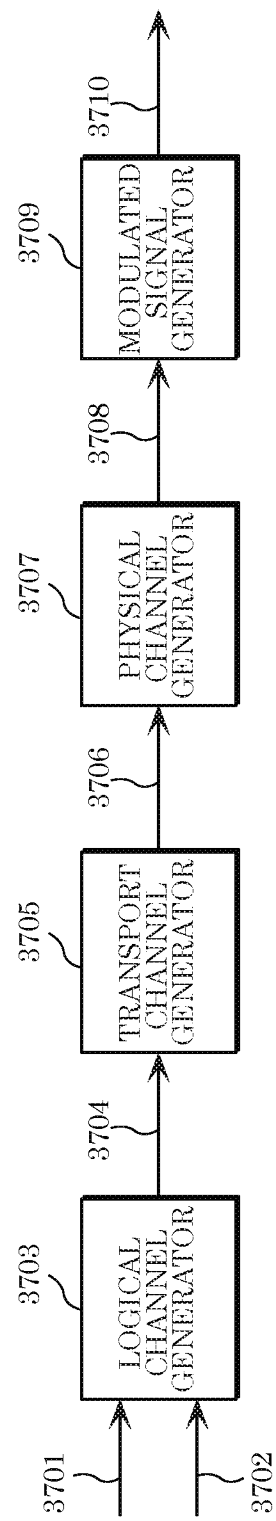
FIG. 37 illustrates an example of a configuration of the base station.

FIG. 37 illustrates an example of a configuration of a base station (700).

Logical channel generator 3703 receives inputs of data 3701 and control data 3702, and outputs logical channel signal 3704. For example, the channel for logical channel signal 3704 is constituted by at least one of "a broadcast control channel (BCCH), a paging control channel (PCCH), a common control channel (CCCH), a multicast control channel (MCCH), and a dedicated control channel (DCCH)" which are logical channels for control, and "a dedicated traffic channel (DTCH) and a multicast traffic channel (MTCH)" which are logical channels for data.

Note that "a BCCH is a downlink channel for informing system control information", "a PCCH is a downlink channel for paging information", "a CCCH is a downlink common control channel used when radio resource control (RRC) connection is not present", "an MCCH is a point-to-multipoint downlink control channel for multicast channel scheduling for multimedia broadcast multicast service (MBMS)", "a DCCH is a downlink dedicated control channel used by a terminal with RRC connection", "a DTCH is a downlink dedicated traffic channel of a user equipment (UE) terminal or a downlink user-data dedicated channel", and "an MTCH is a point-to-multipoint downlink channel for MBMS user data".

Transport channel generator 3705 receives inputs of logical channel signal 3704, and generates and outputs transport channel signal 3706. The channel for transport channel signal 3706 is constituted by, for example, at least one of a broadcast channel (BCH), a downlink shared channel (DL-SCH), a paging channel (PCH), and a multicast channel (MCH), for instance.

Note that "a BCH is a channel for system information notified throughout the entire cell", "a DL-SCH is a channel for which user data, control information, and system information are used", "a PCH is a channel for paging information notified throughout the entire cell", and "an MCH is a control channel for MBMS traffic notified throughout the entire cell".

Physical channel generator 3707 receives inputs of transport channel signal 3706, and generates and outputs physical channel signal 3708. The channel for physical channel signal 3708 is constituted by, for example, at least one of a physical broadcast channel (PBCH), a physical multicast channel (PMCH), a physical downlink shared channel (PDSCH), and a physical downlink control channel (PDCCH), for instance.

Note that "a PBCH is for BCH transport channel transmission", "a PMCH is for MCH transport channel transmission", "a PDSCH is for DL-SCH and transport channel transmission", and "a PDCCH is for transmission of downlink Layer 1 (L1)/Layer 2 (L2) control signal".

Modulated signal generator 3709 receives inputs of physical channel signal 3708, and generates and outputs modulated signal 3710 based on physical channel signal 3708. Then, base station 700 transmits modulated signal 3710 as a radio wave.

First, consider the case where the base station performs unicast communication with the plurality of terminals, or in other words, communicates separately with the plurality of terminals.

At this time, for example, the channels for symbol group #1 for stream 1 indicated by 901-1, symbol group #2 for stream 1 indicated by 901-2, and symbol group #3 for stream 1 indicated by 901-3 in FIG. 9 may be broadcast channels (that is, channels used for control information which the base station transmits to the plurality of terminals by broadcasting in order to perform data communication with the plurality of terminals). Note that control information is to be used to, for example, establish data communication between the base station and a terminal.

Here, broadcast channels are to be described. A broadcast channel corresponds to a "PBCH", a "PMCH", or "a portion of a PD-SCH" among physical channels (for physical channel signal 3708).

A broadcast channel corresponds to a "BCH", "a portion of a DL-SCH", "a PCH", or "a MCH" among transport channels (for transport channel signal 3706).

A broadcast channel corresponds to "a BCCH", "a CCCH", "an MCCH", "a portion of a DTCH", or "an MTCH" among logical channels (for logical channel signal 3704).

Similarly, for example, the channels for symbol group #1 for stream 2 indicated by 902-1, symbol group #2 for stream 2 indicated by 902-2, and symbol group #3 for stream 2 indicated by 902-3 in FIG. 9 may be broadcast channels (that is, channels used for control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among physical channels (for physical channel signal 3708).

Further, a broadcast channel corresponds to "a BCH", "a portion of a DL-SCH", "a PCH", or "an MCH" among transport channels (for transport channel signal 3706).

A broadcast channel corresponds to "a BCCH", "a CCCH", "an MCCH", "a portion of a DTCH", or "an MTCH" among logical channels (for logical channel signal 3704).

At this time, features of symbol group #1 for stream 1 indicated by 901-1, symbol group #2 for stream 1 indicated by 901-2, and symbol group #3 for stream 1 indicated by 901-3 in FIG. 9 are as described in the above embodiments, and furthermore, features of symbol group #1 for stream 2 indicated by 902-1, symbol group #2 for stream 2 indicated by 902-2, and symbol group #3 for stream 2 indicated by 902-3 in FIG. 9 are as described in the above embodiments.

Note that stream 2 may not be transmitted since symbol group #1 for stream 2 (902-1), symbol group #2 for stream 2 (902-2), and symbol group #3 for stream 2 (902-3) in FIG. 9 are not transmitted. In particular, when a signal having a broadcast channel is transmitted, the base station may not transmit a symbol group for stream 2 (at this time, base station 701 does not transmit 703-1, 703-2, and 703-3 in FIG. 7, for example).

For example, symbol group #1 for modulated signal 1 indicated by 1401-1, symbol group #2 for modulated signal 1 indicated by 1401-2, and symbol group #3 for modulated signal 1 indicated by 1401-3 in FIG. 14 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

A broadcast channel corresponds to "a BCH", "a portion of a DL-SCH", "a PCH", or "an MCH" among transport channels (for transport channel signal 3706).

A broadcast channel corresponds to "a BCCH", "a CCCH", "an MCCH", "a portion of a DTCH", or "an MTCH" among the logical channels (for logical channel signal 3704).

For example, symbol group #1 for modulated signal 2 indicated by 1402-1, symbol group #2 for modulated signal 2 indicated by 1402-2, and symbol group #3 for modulated signal 2 indicated by 1402-3 in FIG. 14 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

Note that features of symbol group #1 for modulated signal 1 indicated by 1401-1, symbol group #2 for modulated signal 1 indicated by 1401-2, and symbol group #3 for modulated signal 1 indicated by 1401-3 in FIG. 14 are as described in the above embodiments, and symbol group #1 for modulated signal 2 indicated by 1402-1, symbol group #2 for modulated signal 2 indicated by 1402-2, and symbol group #3 for modulated signal 2 indicated by 1402-3 in FIG. 14 are as described in the above embodiments.

For example, stream 1-1 data symbol (1) indicated by 2501-1-1, stream 1-1 data symbol (2) indicated by 2501-1-2, and stream 1-1 data symbol (3) indicated by 2501-1-3 in FIG. 25 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

Note that features of stream 1-1 data symbol (1) indicated by 2501-1-1, stream 1-1 data symbol (2) indicated by 2501-1-2, and stream 1-1 data symbol (3) indicated by 2501-1-3 in FIG. 25 are as described in the above embodiments.

For example, stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (1) indicated by 3101-1, stream 1-2 data symbol (2) indicated by 3101-2, and stream 1-2 data symbol (3) indicated by 3101-3 in FIGS. 31 and 32 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channels corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

Note that features of stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (1) indicated by 3101-1, stream 1-2 data symbol (2) indicated by 3101-2, and stream 1-2 data symbol (3) indicated by 3101-3 in FIGS. 31 and 32 are as described in the above embodiments.

For example, stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (N) indicated by 3101-N, stream 1-2 data symbol (N+1) indicated by 3101-(N+1), and stream 1-2 data symbol (N+2) indicated by 3101-(N+2) in FIG. 35 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to “a PBCH”, “a PMCH”, or “a portion of a PD-SCH” among the physical channels (for physical channel signal 3708).

Further, a broadcast channel corresponds to “a BCH”, “a portion of a DL-SCH”, “a PCH”, or “an MCH” among the transport channels (for transport channel signal 3706).

A broadcast channel corresponds to “a BCCH”, “a CCCH”, “an MCCH”, “a portion of a DTCH”, or “an MTCH” among the logical channels (for logical channel signal 3704).

For example, stream 2-1 data symbol (1) indicated by 3501-1, stream 2-1 data symbol (2) indicated by 3501-2, and stream 2-1 data symbol (3) indicated by 3501-3 in FIG. 35 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to “a PBCH”, “a PMCH”, or “a portion of a PD-SCH” among the physical channels (for physical channel signal 3708).

Further, a broadcast channel corresponds to “a BCH”, “a portion of a DL-SCH”, “a PCH”, or “an MCH” among the transport channels (for transport channel signal 3706).

A broadcast channel corresponds to “a BCCH”, “a CCCH”, “an MCCH”, “a portion of a DTCH”, or “an MTCH” among the logical channels (for logical channel signal 3704).

Note that features of stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (N) indicated by 3101-N, stream 1-2 data symbol (N+1) indicated by 3101-(N+1), and stream 1-2 data symbol (N+2) indicated by 3101-(N+2) in FIG. 35 are as described in the above embodiments, and features of stream 2-1 data symbol (1) indicated by 3501-1, stream 2-1 data symbol (2) indicated by 3501-2, and stream 2-1 data symbol (3) indicated by 3501-3 in FIG. 35 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Note that the symbol groups for stream 1 in FIG. 9 may include data to be transmitted to a single terminal (unicast data) (or one or more symbols). Similarly, the symbol groups for stream 2 in FIG. 9 may include data to be transmitted to a single terminal (unicast data) (or one or more symbols).

Note that the symbol groups for stream 1 in FIG. 14 may include data to be transmitted to a single terminal (unicast data) (or one or more symbols). Similarly, the symbol groups for stream 2 in FIG. 14 may include data to be transmitted to a single terminal (unicast data) (or one or more symbols).

Note that the symbols for stream 1-1 in FIG. 25 may include data to be transmitted to a single terminal (unicast data) (or one or more symbols). The symbols for stream 1-1 and stream 1-2 in FIGS. 31 and 32 may include data to be transmitted to a single terminal (unicast data) (or one or more symbols).

A PBCH may have a configuration of “being used to transmit minimum information (including a system bandwidth, a system frame number, and the number of transmission antennas) which a UE is to read first after cell searching”, for example.

A PMCH may have a configuration of “being used to utilize a multicast-broadcast single-frequency network (MBSFN), for example”.

A PDSCH may have a configuration of “being, for example, a shared downlink data channel for transmitting user data and for collectively transmitting all data, irrespective of C-plane (control plane) and U-plane (user plane)”.

A PDCCH may have a configuration of “being used to notify, for example, a user selected by eNodeB (gNodeB) (base station) through scheduling of information indicating allocation of radio resources”.

Through the above implementation, in multicast and broadcast data transmission, the base station transmits data symbols and control information symbols using a plurality of transmission beams, and a terminal selectively receives a transmission beam with good quality among the plurality of transmission beams and receives data symbols based on the received transmission beam, thus achieving advantageous effects that the terminal can achieve high data receiving quality.

Embodiment 5

The present embodiment gives a supplemental description of configurations of the symbol groups for stream 1 and the symbol groups for stream 2 in FIG. 9 which a base station (700) transmits.

Figure 38:
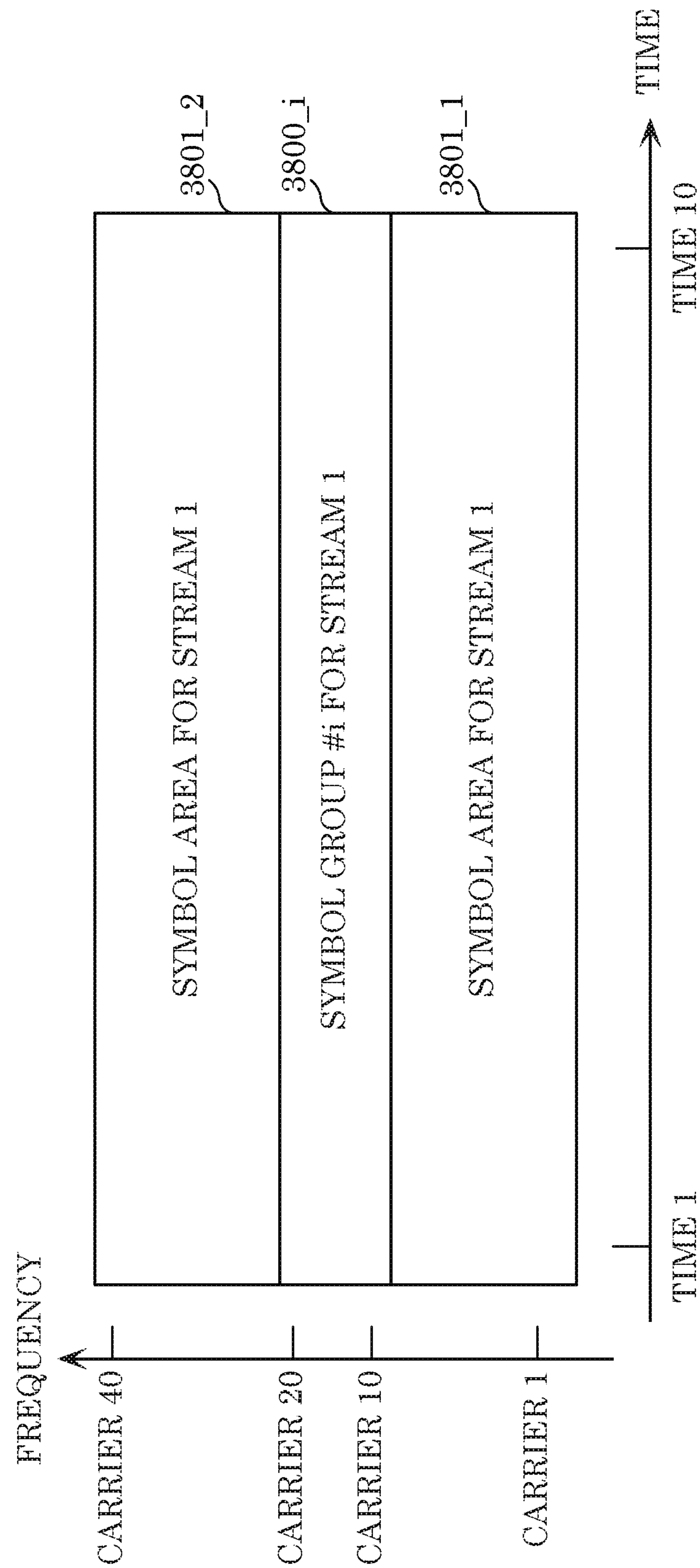
FIG. 38 illustrates an example of a frame configuration.

FIG. 38 illustrates an example of a frame configuration for stream 1 which the base station (700) transmits, the horizontal axis indicates time and the vertical axis indicates frequency in the frame configuration in FIG. 38, and the frame configuration from time 1 to time 10 and carrier 1 to carrier 40 is illustrated. Accordingly, FIG. 38 illustrates a frame configuration according to a multi-carrier transmission method such as the orthogonal frequency division multiplexing (OFDM) method.

Symbol area 3801_1 for stream 1 in FIG. 38 is present from time 1 to time 10 and from carrier 1 to carrier 9.

Symbol group #i (3800_*i*) for stream 1 is present from time 1 to time 10 and from carrier 10 to carrier 20. Note that symbol group #i (3800_*i*) for stream 1 corresponds to symbol group #i (901-*i*) for stream 1 in FIG. 9.

Symbol area 3801_2 for stream 1 is present from time 1 to time 10 and from carrier 21 to carrier 40.

At this time, for example, as described in Embodiment 4, for instance, when the base station transmits (unicasts), to one or more terminals, data therefor, symbol areas 3801_1 and 3801_2 for stream 1 in FIG. 38 can be used.

Symbol group #i (3800_*i*) for stream 1 in FIG. 38 is to be used by the base station to transmit data for multicasting, as described in, for instance, Embodiments 1 and 4.

Figure 39:
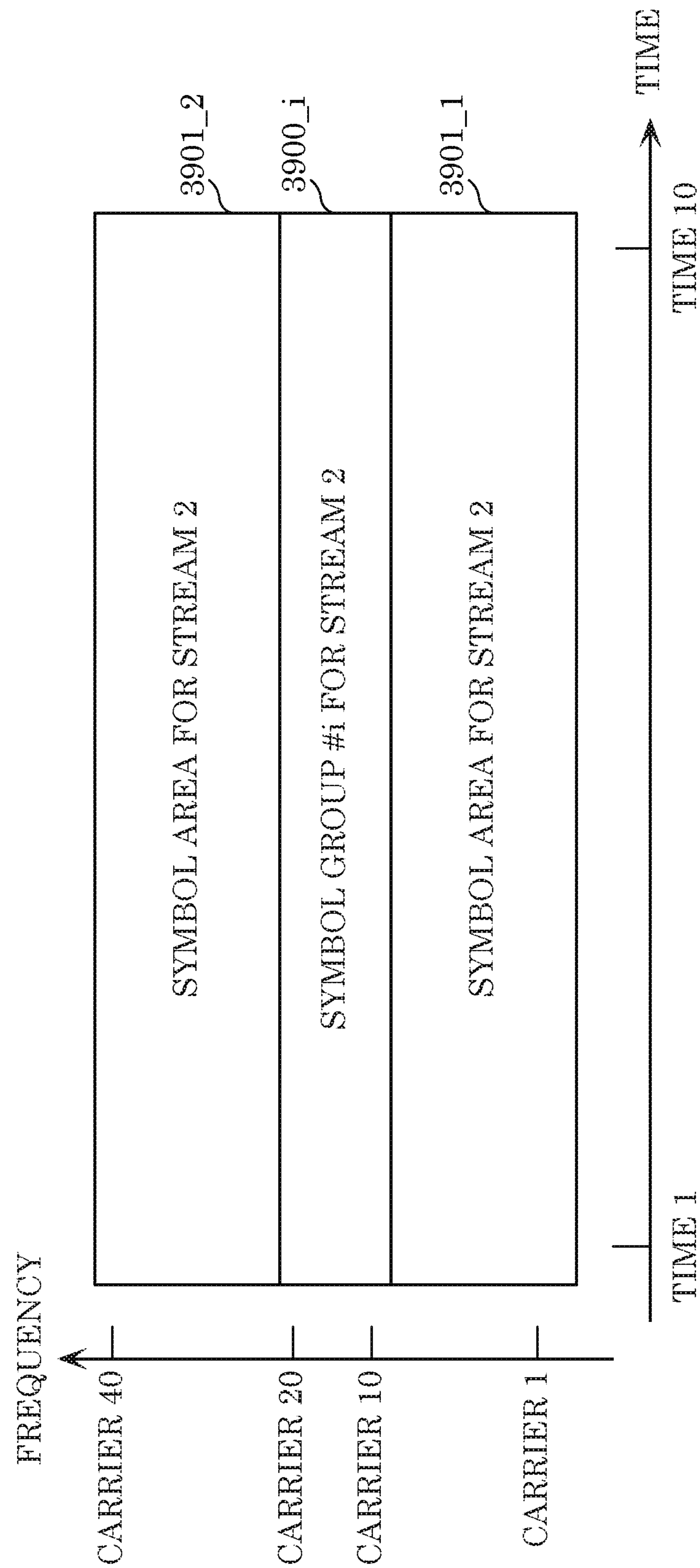
FIG. 39 illustrates an example of a frame configuration.

FIG. 39 illustrates an example of a frame configuration for stream 2 which the base station (700) transmits, the horizontal axis indicates time and the vertical axis indicates frequency in the frame configuration in FIG. 39, and the frame configuration from time 1 to time 10 and carrier 1 to carrier 40 is illustrated. Accordingly, FIG. 39 illustrates a frame according to a multi-carrier transmission method such as the OFDM method.

Symbol area 3901_1 for stream 2 in FIG. 39 is present from time 1 to time 10 and from carrier 1 to carrier 9.

Symbol group #i (3900_*i*) for stream 2 is present from time 1 to time 10 and from carrier 10 to carrier 20. Note that symbol group #i (3900_*i*) for stream 2 corresponds to symbol group #i (902-*i*) for stream 2 in FIG. 9.

Symbol area 3901_2 for stream 2 is present from time 1 to time 10 and from carrier 21 to carrier 40.

At this time, for example, as described in Embodiment 4, for instance, when the base station transmits (unicasts), to one or more terminals, data therefor, symbol areas 3901_1 and 3901_2 for stream 2 in FIG. 39 can be used.

Symbol group #i (3900_*i*) for stream 2 in FIG. 39 is to be used by the base station to transmit data for multicasting, as described in Embodiments 1 and 4, for instance.

Note that the base station transmits, using the same frequency at the same time, a symbol at time X (in the case of FIG. 38, X is an integer in a range from 1 to 10) and carrier Y (in the case of FIG. 38, Y is an integer in a range from 1 to 40) in FIG. 38, and a symbol at time X and carrier Y in FIG. 39.

Features of symbol group #1 for stream 1 indicated by 901-1, symbol group #2 for stream 1 indicated by 901-2, and symbol group #3 for stream 1 indicated by 901-3 in FIG. 9 are as described in the above embodiments. Thus, the features of symbol group #i for stream 1 in FIG. 38 are the same as the features of the symbol groups for stream 1 in FIG. 9, and are as described in the above embodiments.

Further, features of symbol group #1 for stream 2 indicated by 902-1, symbol group #2 for stream 2 indicated by 902-2, and symbol group #3 for stream 2 indicated by 902-3 in FIG. 9 are as described in the above embodiments. Specifically, the features of symbol group #i for stream 2 in FIG. 39 are the same as the features of the symbol groups for stream 2 in FIG. 9, and are as described in the above embodiments.

Note that if symbols are present after time 11 from carrier 10 to carrier 20 in the frame configuration in FIGS. 38 and 39, the symbols may be used for multicast transmission or dedicated data transmission (unicast transmission).

If the base station transmits a frame as in FIG. 9 using the frame configuration in FIG. 38 or 39, implementation described in Embodiments 1 and 4 may be performed similarly.

Through the above implementation, in multicast and broadcast data transmission, the base station transmits data symbols and control information symbols using a plurality of transmission beams, and a terminal selectively receives a beam with good quality among the plurality of transmission beams and receives data symbols based on the received transmission beam, thus achieving advantageous effects that the terminal can achieve high data receiving quality.

Embodiment 6

The present embodiment gives a supplemental description of the configurations of the symbol groups for modulated signal 1 and the symbol groups for modulated signal 2 in FIG. 14 that a base station (700) transmits.

Figure 40:
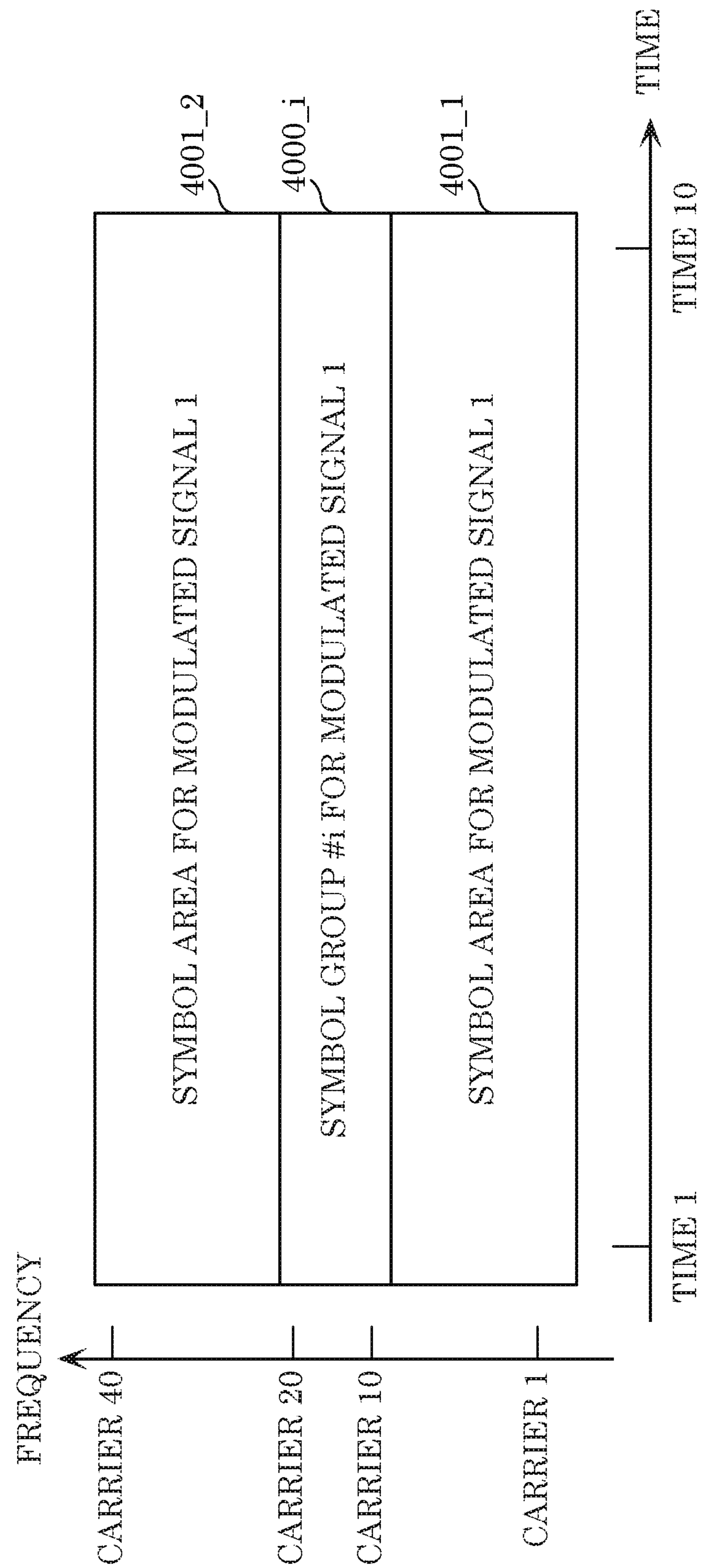
FIG. 40 illustrates an example of a frame configuration.

FIG. 40 illustrates an example of a frame configuration for modulated signal 1 which the base station (700) transmits, the horizontal axis indicates time and the vertical axis indicates frequency in the frame configuration in FIG. 40, and the frame configuration from time 1 to time 10 and carrier 1 to carrier 40 is illustrated. Accordingly, FIG. 40 illustrates a frame configuration according to a multi-carrier transmission method such as the orthogonal frequency division multiplexing (OFDM) method.

Symbol area 4001_1 for modulated signal 1 in FIG. 40 is present from time 1 to time 10 and from carrier 1 to carrier 9.

Symbol group #i (4000_*i*) for modulated signal 1 is present from time 1 to time 10 and from carrier 10 to carrier 20. Note that symbol group #i (4000_*i*) for modulated signal 1 corresponds to symbol group #i (1401-*i*) for modulated signal 1 in FIG. 14.

Symbol area 4001_2 for modulated signal 1 is present from time 1 to time 10 and from carrier 21 to carrier 40.

At this time, for example, as described in Embodiment 4, for instance, when the base station transmits (unicasts), to one or more terminals, data therefor, symbol areas 4001_1 and 4001_2 for stream 1 in FIG. 40 can be used.

Then, symbol group #i (4000_*i*) for modulated signal 1 in FIG. 40 is to be used by the base station to transmit data for multicasting, as described in Embodiments 1 and 4, for instance.

Figure 41:
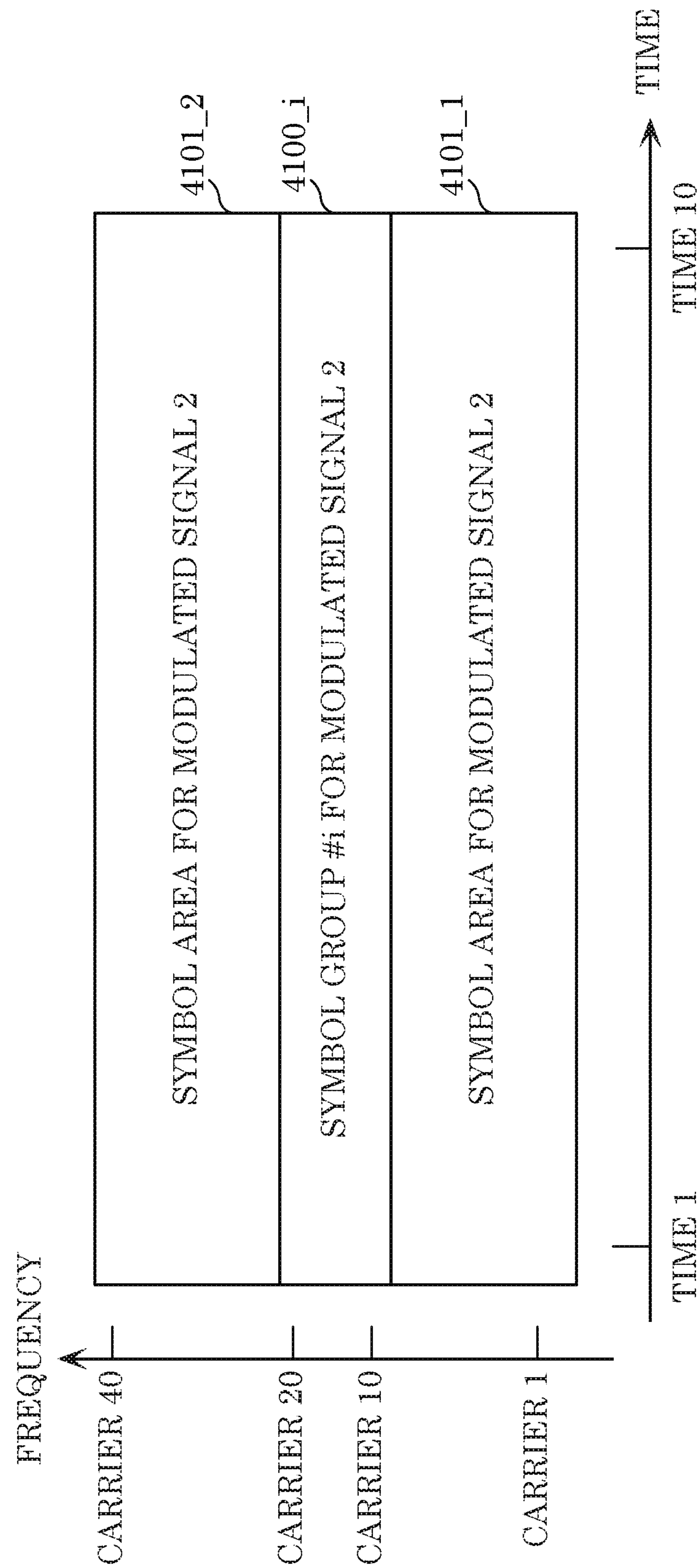
FIG. 41 illustrates an example of a frame configuration.

FIG. 41 illustrates an example of a frame configuration for modulated signal 2 which the base station (700) transmits, the horizontal axis indicates time and the vertical axis indicates frequency in the frame configuration in FIG. 41, and the frame configuration from time 1 to time 10 and carrier 1 to carrier 40 is illustrated. Accordingly, FIG. 41 illustrates a frame according to a multi-carrier transmission method such as the OFDM system.

Symbol area 4101_1 for modulated signal 2 in FIG. 41 is present from time 1 to time 10 and from carrier 1 to carrier 9.

Symbol group #i (4100_*i*) for modulated signal 2 is present from time 1 to time 10 and from carrier 10 to carrier 20. Note that symbol group #i (4100_*i*) for modulated signal 2 corresponds to symbol group #i (1402-*i*) for modulated signal 2 in FIG. 14.

Symbol area 4101_2 for modulated signal 2 is present from time 1 to time 10 and from carrier 21 to carrier 40.

At this time, for example, as described in Embodiment 4, for instance, when the base station transmits (unicasts), to one or more terminals, data therefor, symbol areas 4101_1 and 4101_2 for modulated signal 2 in FIG. 41 can be used.

Then, symbol group #i (4100_*i*) for modulated signal 2 in FIG. 41 is to be used by the base station to transmit data for multicasting, as described in Embodiments 1 and 4, for instance.

Note that the base station transmits, using the same frequency at the same time, a symbol at time X (in the case of FIG. 40, X is an integer in a range from 1 to 10) and carrier Y (in the case of FIG. 40, Y is an integer in a range from 1 to 40) in FIG. 40, and a symbol at time X and carrier Y in FIG. 41.

Then, features of symbol group #1 for stream 1 indicated by 1401_1, symbol group #2 for modulated signal 1 indicated by 1401_2, and symbol group #3 for modulated signal 1 indicated by 1401_3 in FIG. 14 are as described in the above embodiments. Specifically, the features of symbol group #i for modulated signal 1 in FIG. 40 are the same as the features of the symbol groups for modulated signal 1 in FIG. 14, and are as described in the above embodiments.

Symbol group #1 for modulated signal 2 indicated by 1402_1, symbol group #2 for modulated signal 2 indicated by 1402_2, and symbol group #3 for modulated signal 2 indicated by 1402_3 in FIG. 14 are as described in the above embodiments. Specifically, the features of symbol group #i for modulated signal 2 in FIG. 41 are the same as the features of the symbol groups for modulated signal 2 in FIG. 14, and are as described in the above embodiments.

Note that if symbols are present after time 11 from carrier 10 to carrier 20 in the frame configuration in FIGS. 40 and 41, the symbols may be used for multicast transmission or dedicated data transmission (unicast transmission).

When the base station transmits a frame as in FIG. 14 using the frame configuration in FIG. 40 or 41, data transmission described in Embodiments 1 and 4 may be similarly carried out.

Examples of use of symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41 in the above description are to be described.

Figure 42:
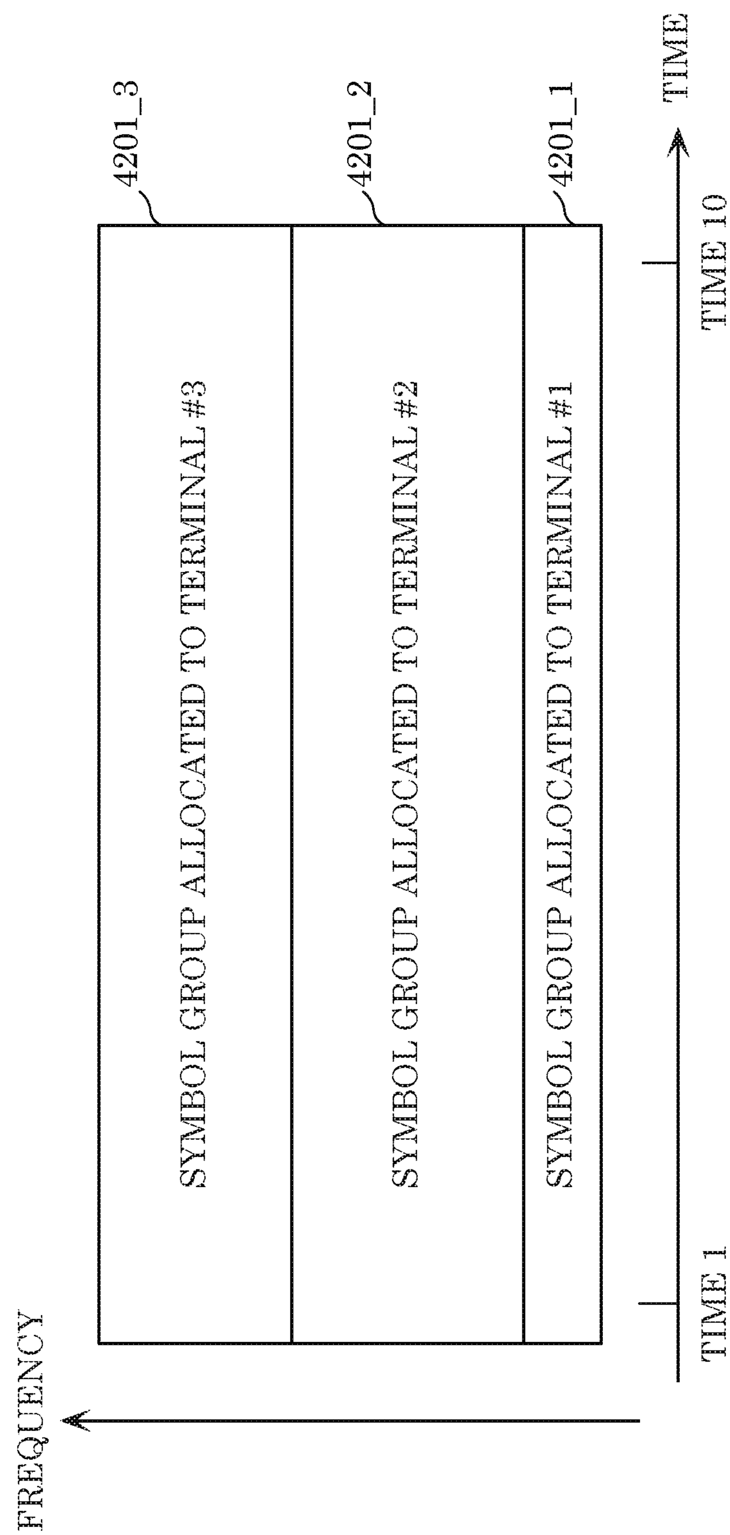
FIG. 42 illustrates an example of allocation of symbol areas to terminals.

FIG. 42 illustrates an example of allocation of "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" to terminals. Note that in FIG. 42, the horizontal axis indicates time, and the vertical axis indicates frequency (carrier).

As illustrated in FIG. 42, for example, "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" are subjected to frequency division, and allocated to the terminals. 4201_1 is a symbol group allocated to terminal #1, 4201_2 is a symbol group allocated to terminal #2, and 4201_3 is a symbol group allocated to terminal #3.

For example, the base station (700) communicates with terminal #1, terminal #2, and terminal #3, and when the base station transmits data to terminal #1, the base station transmits data to terminal #1, using "symbol group 4201_1 allocated to terminal #1" in FIG. 42. When the base station transmits data to terminal #2, the base station transmits data to terminal #2 using "symbol group 4201_2 allocated to terminal #2" in FIG. 42. When the base station transmits data to terminal #3, the base station transmits data to terminal #3 using "symbol group 4201_3 allocated to terminal #3" in FIG. 42.

Note that the method of allocating symbol groups to terminals is not limited to the method in FIG. 42, and thus the frequency band (the carrier number) may be changed with time or may be set in any manner. Furthermore, the method of allocating symbol groups to terminals may be changed with time.

Figure 43:
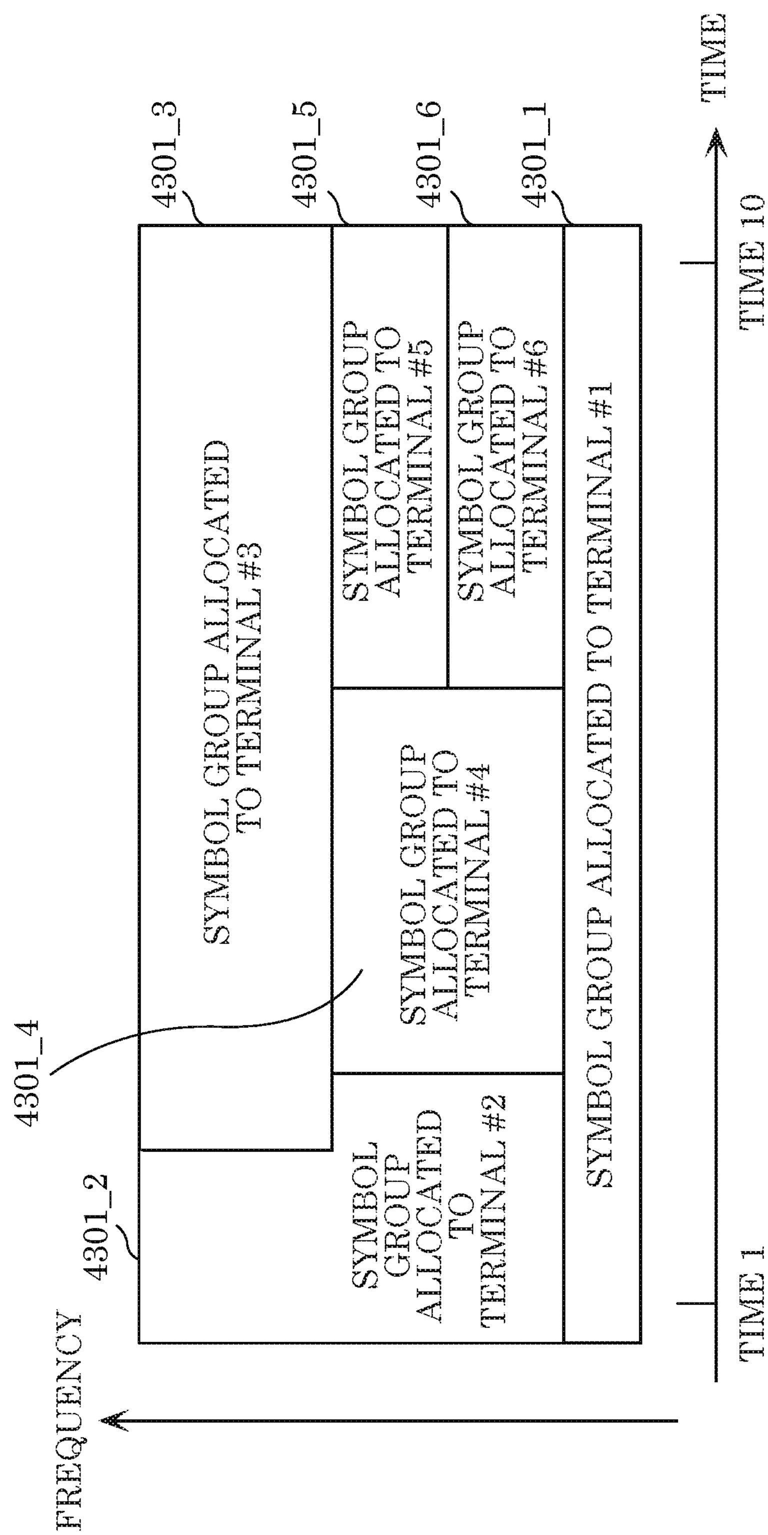
FIG. 43 illustrates an example of allocation of symbol areas to terminals.

FIG. 43 illustrates an example of allocation of "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" to terminals, which is different from the allocation in FIG. 42. Note that in FIG. 43, the horizontal axis indicates time, and the vertical axis indicates frequency (carrier).

As illustrated in FIG. 43, for example, "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" are subjected to time and frequency division, and allocated to the terminals. Then, 4301_1 is a symbol group allocated to terminal #1, 4301_2 is a symbol group allocated to terminal #2, 4301_3 is a symbol group allocated to terminal #3, 4301_4 is a symbol group allocated to terminal #4, 4301_5 is a symbol group allocated to terminal #5, and 4301_6 is a symbol group allocated to terminal #6.

For example, the base station (700) communicates with terminal #1, terminal #2, terminal #3, terminal #4, terminal #5, and terminal #6, and when the base station transmits data to terminal #1, the base station transmits data to terminal #1, using "symbol group 4301_1 allocated to terminal #1" in FIG. 43. Then, when the base station transmits data to terminal #2, the base station transmits data to terminal #2 using "symbol group 4301_2 allocated to terminal #2" in FIG. 43. When the base station transmits data to terminal #3, the base station transmits data to terminal #3 using "symbol group 4301_3 allocated to terminal #3" in FIG. 43. When the base station transmits data to terminal #4, the base station transmits data to terminal #4 using "symbol group 4301_4 allocated to terminal #4" in FIG. 43. When the base station transmits data to terminal #5, the base station transmits data to terminal #5 using "symbol group 4301_5 allocated to terminal #5" in FIG. 43. When the base station transmits data to terminal #6, the base station transmits data to terminal #6 using "symbol group 4301_6 allocated to terminal #6" in FIG. 43.

Note that the method of allocating symbol groups to terminals is not limited to the method in FIG. 43, and thus the frequency band (the carrier number) and the time width may be changed or may be set in any manner. Furthermore, the method of allocating symbol groups to terminals may be changed with time.

Figure 44:
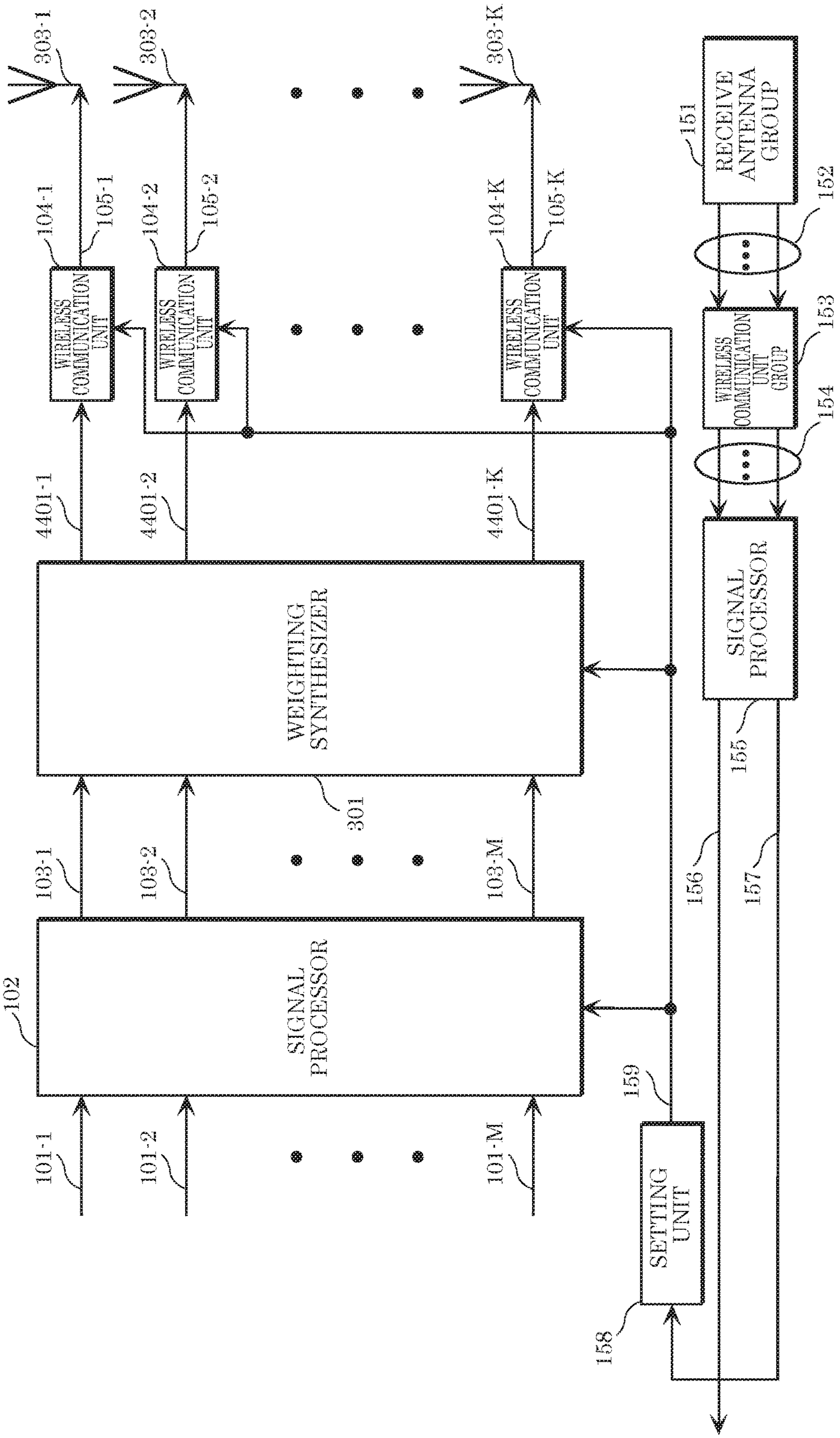
FIG. 44 illustrates an example of a configuration of the base station.

Further, different weighting synthesis may be performed for each carrier in the symbol areas for stream 1, the symbol areas for stream 2, the symbol areas for modulated signal 1, the symbol areas for modulated signal 2 in FIGS. 38, 39, 40, and 41, respectively, and a weighting-synthesis method may be determined for a unit of a plurality of carriers. As illustrated in FIGS. 43 and 44, a weighting synthesis parameter may be set for each allocated terminal. Setting of the weighting synthesis method for carriers is not limited to these examples.

Through the above implementation, in multicast and broadcast data transmission, the base station transmits data symbols and control information symbols using a plurality of transmission beams, and a terminal selectively receives a beam with good quality among the plurality of transmission beams and receives data symbols based on the received transmission beam, thus achieving advantageous effects that the terminal can achieve high data receiving quality.

Embodiment 7

In this specification, the configurations of base stations 700 in FIGS. 7, 12, 17, 18, 19, 20, and 22 and the configurations of the base stations described in other embodiments may each be a configuration as illustrated in FIG. 44.

The following describes operation of the base station in FIG. 44. Elements which operate in the same manner as those in FIGS. 1 and 3 are assigned the same reference signs in FIG. 44, and a description thereof is omitted.

Weighting synthesizer 301 receives inputs of signals 103_1, 103_2, . . . , and 103_M obtained as a result of signal processing, and control signal 159, performs weighting synthesis on the signals based on control signal 159, and outputs weighting-synthesis signals 4401_1, 4401_2, . . . , and 4401_K. Note that M is an integer of 2 or more, and K is an integer of 2 or more.

For example, if signal **103_*i* obtained as a result of the signal processing (i is an integer of 1 or more and M or less) is represented by ui(t) (t is time) and signal 4401_*g*** (g is an integer of 1 or more and K or less) obtained as a result of the weighting synthesis is represented by vg(t), vg(t) can be represented by the following expression.

[Math. 7]

$$v_g(t) = Q_{g1} \times u_1(t) + Q_{g2} \times u_2(t) + \ldots + Q_{gM} \times u_M(t) = \sum_{j=1}^{M} Q_{gj} \times u_j(t) \quad \text{Expression (7)}$$

Wireless communication unit **104_*g* receives inputs of signal 4401_*g* obtained as a result of the weighting synthesis and control signal 159, performs predetermined processing on the signal based on control signal 159, and generates and outputs transmission signal 105_*g*. Then, transmission signal 105_*g* is transmitted from antenna 303_1**.

Note that the transmission method which the base station supports may be a multi-carrier method such as OFDM or a single carrier method. Furthermore, the base station may support both the multi-carrier method and the single carrier method. At this time, there are methods for generating modulated signals to be transmitted according to the single carrier method, and signals generated according to any of the methods can be transmitted. Examples of the single carrier method include "discrete Fourier transform (DFT)-spread orthogonal frequency division multiplexing (OFDM)", "trajectory constrained DFT-spread OFDM", "OFDM based single carrier (SC)", "single carrier (SC)-frequency division multiple access (FDMA)", and "guard interval DFT-spread OFDM".

Expression (7) is indicated by the function of time, yet Expression (7) may be a function of frequency in addition to time in the case of a multi-carrier method such as the OFDM method.

For example, according to the OFDM method, different weighting synthesis may be performed for each carrier, and a weighting-synthesis method may be determined for a unit of a plurality of carriers. Setting of the weighting synthesis method for carriers is not limited to these examples.

Supplementary Note 6

As a matter of course, the present disclosure may be carried out by combining a plurality of the exemplary embodiments and other contents such as supplementary notes described herein.

As the configuration of the base station, the examples of the configuration are not limited to those in FIGS. 1 and 3, and as long as the base station includes a plurality of transmission antennas and generates and transmits a plurality of transmission beams (transmission directivity beams), the present disclosure can be carried out with such a base station.

Moreover, the exemplary embodiments are mere examples. For example, while a "modulating method, an error correction coding method (an error correction code, a code length, a coding rate and the like to be used), control information and the like" are exemplified, it is possible to carry out the present disclosure with the same configuration even when other types of "a modulating method, an error correction coding method (an error correction code, a code length, a coding rate and the like to be used), control information and the like" are applied.

As for a modulating method, even when a modulating method other than the modulating methods described herein is used, it is possible to carry out the exemplary embodiments and the other contents described herein. For example, APSK (such as 16APSK, 64APSK, 128APSK, 256APSK, 1024APSK, and 4096APSK), PAM (such as 4PAM, 8PAM, 16PAM, 64PAM, 128PAM, 256PAM, 1024PAM and 4096PAM), PSK (such as BPSK, QPSK, 8PSK, 16PSK, 64PSK, 128PSK, 256PSK, 1024PSK and 4096PSK), and QAM (such as 4QAM, 8QAM, 16QAM, 64QAM, 128QAM, 256QAM, 1024QAM and 4096QAM) may be applied, or in each modulating method, uniform mapping or non-uniform mapping may be performed. Moreover, a method for arranging signal points, such as 2 signal points, 4 signal points, 8 signal points, 16 signal points, 64 signal points, 128 signal points, 256 signal points, and 1024 signal points on an I-Q plane (a modulating method having signal points such as 2 signal points, 4 signal points, 8 signal points, 16 signal points, 64 signal points, 128 signal points, 256 signal points, and 1024 signal points) is not limited to a signal point arranging method of the modulating methods described herein.

Herein, it can be considered that communication/broadcast apparatuses, such as a broadcast station, a base station, an access point, a terminal, and a mobile phone, each include the transmitting device. In this case, it can be considered that communication apparatuses, such as a television, a radio, a terminal, a personal computer, a mobile phone, an access point, and a base station, each include the receiving device. Moreover, it can be also considered that each of the transmitting device and the receiving device according to the present disclosure is an apparatus having communication functions and has a form connectable via any interface to devices for running applications such as a television, a radio, a personal computer, and a mobile phone. Moreover, in the present exemplary embodiment, symbols other than data symbols, for example, pilot symbols (such as preambles, unique words, postambles, and reference symbols), and control information symbols may be arranged in frames in any way. Then, these symbols are named a pilot symbol and a control information symbol here, but may be named in any way, and a function itself is important.

Moreover, the pilot symbol only needs to be a known symbol modulated by using PSK modulation in a transmitting device and a receiving device. The receiving device performs frequency synchronization, time synchronization, channel estimation of each modulated signal (estimation of CSI (Channel State Information)), signal detection, and the like by using this symbol. Alternatively, the pilot symbol may allow the receiving device to learn a symbol transmitted by the transmitting device by establishing synchronization.

Moreover, the control information symbol is a symbol for transmitting information that is used for realizing communication other than communication for data (data of an application, for instance) and that is to be transmitted to a communicating party (for example, a modulating method used for communication, an error correction coding method, a coding rate of the error correction coding method, setting information in an upper layer, and the like).

Note that the present disclosure is not limited to the exemplary embodiments, and can be carried out with various modifications. For example, the case where the present disclosure is performed as a communication device is described in the exemplary embodiments. However, the present disclosure is not limited to this case, and this communication method can also be used as software.

Note that a program for executing the above-described communication method may be stored in a ROM in advance, and a CPU may be caused to operate this program.

Moreover, the program for executing the communication method may be stored in a computer-readable storage medium, the program stored in the recording medium may be recorded in a RAM of a computer, and the computer may be caused to operate according to this program.

Then, the configurations of the above-described exemplary embodiments, for instance, may be each realized as an LSI (Large Scale Integration) which is typically an integrated circuit having an input terminal and an output terminal. The configurations may be separately formed as one chip, or all or at least one of the configurations of the exemplary embodiments may be formed as one chip. The LSI is described here, but the integrated circuit may also be referred to as an IC (Integrated Circuit), a system LSI, a super LSI, or an ultra LSI, depending on a degree of integration. Moreover, a circuit integration technique is not limited to the LSI, and may be realized by a dedicated circuit or a general purpose processor. After manufacturing of the LSI, a programmable FPGA (Field Programmable Gate Array) or a reconfigurable processor which is reconfigurable in connection or settings of circuit cells inside the LSI may be used. Further, when development of a semiconductor technology or another derived technology provides a circuit integration technology which replaces the LSI, as a matter of course, functional blocks may be integrated by using this technology. Application of biotechnology, for instance, is one such possibility.

Various frame configurations have been described herein. For example, the base station (AP) which includes the transmitting device in FIG. 1 transmits a modulated signal having a frame configuration described herein, using a multi-carrier method such as an OFDM method. At this time, it is conceivable to apply a method in which when a terminal (user) communicating with the base station (AP) transmits a modulated signal, the modulated signal may be transmitted by the terminal according to a single carrier method (the base station (AP) can simultaneously transmit data symbol groups to a plurality of terminals using the OFDM method, and the terminal can reduce power consumption by using a single carrier method).

A time division duplex (TDD) method in which a terminal transmits a modulation signal, using a portion of a frequency band used for a modulated signal transmitted by the base station (AP) may be applied.

The configuration of antenna units 106-1, 106-2, . . . , and 106-M in FIG. 1 is not limited to the configurations described in the embodiments. For example, antenna units 106-1, 106-2, . . . , and 106-M may not each include a plurality of antennas, and may not receive an input of signal 159.

The configuration of antenna units 401-1, 401-2, . . . , and 401-N in FIG. 4 is not limited to the configuration described in the embodiments. For example, antenna units 401-1, 401-2, . . . , and 401-N may not each include a plurality of antennas, and may not receive an input of signal 410.

Note that the transmission method which the base station and the terminals support may be a multi-carrier method such as OFDM or a single carrier method. Furthermore, the base station may support both the multi-carrier method and the single carrier method. At this time, there are methods for generating modulated signals according to the single carrier method, and signals generated according to any of the methods can be transmitted. Examples of the single carrier system include "discrete Fourier transform (DFT)-spread orthogonal frequency division multiplexing (OFDM)", "trajectory constrained DFT-spread OFDM", "OFDM based single carrier (SC)", and "single carrier (SC)-frequency division multiple access (FDMA)", and "guard interval DFT-spread OFDM".

Furthermore, at least multicast (broadcast) data is included in information #1 (101_1), information #2 (101_2), . . . , and information #M (101_M) in FIGS. 1, 3, and 44. For example, in FIG. 1, if information #1 (101_1) is data for multicasting, a plurality of streams or modulated signals that include such data are generated by signal processor 102, and output from an antenna.

In FIG. 3, if information #1 (101_1) is data for multicasting, a plurality of streams or modulated signals that include such data are generated by signal processor 102 and/or weighting synthesizer 301, and output from an antenna.

In FIG. 44, if information #1 (101_1) is data for multicasting, a plurality of streams or modulated signals that include such data are generated by signal processor 102 and/or weighting synthesizer 301, and output from an antenna.

Note that the states of the streams and modulated signals are as described with reference to FIGS. 7, 9, 12, 14, 17, 18, and 19.

Furthermore, information #1 (101_1), information #2 (101_2), . . . , and information #M (101_M) in FIGS. 1, 3, and 44 may include data addressed to individual terminals. With regard to this point, a description is as given in the embodiments in the specification.

Note that a configuration may be adopted in which at least one of a field programmable gate array (FPGA) and a central processing unit (CPU) can download the entirety of or a portion of software necessary to achieve the communication method described in the present disclosure by wireless communication or wire communication. Furthermore, the configuration may allow downloading the entirety of or a portion of software for update by wireless communication or wire communication. Then, the downloaded software may be stored into a storage, and at least one of an FPGA and a CPU may be operated based on the stored software, so that the digital signal processing described in the present disclosure may be performed.

At this time, a device that includes at least one of an FPGA and a CPU may be connected with a communication modem in a wireless or wired manner, and this device and the communication modem may achieve the communication method described in the present disclosure.

For example, the base station, an access point, and communication devices such as terminals described in this specification may each include at least one of an FPGA and a CPU, and the communication devices may each include an interface for receiving, from the outside, software for operating at least one of the FPGA and the CPU. Furthermore, the communication devices may include a storage for storing the software obtained from the outside, and cause the FPGA and the CPU to operate based on the stored software, thus achieving signal processing described in the present disclosure.

Hereinafter, an example of a communication system to which the wireless communication method that uses a plurality of antennas that is described in Embodiments 1 through 7 can be applied will be given. Each of the wireless communication methods that uses a plurality of antennas described in Embodiments 1 through 7 is merely one example of a wireless communication method that is applicable to the communication system to be described below. In other words, the wireless communication method used in the communication system to be described below may be one of the wireless communication methods described in Embodiments 1 through 7, and may be some other wireless communication method that uses a plurality of antennas. The wireless communication method used by the communication system to be described below may be a wireless communication method that uses a single antenna, and may be a communication method that performs communication using a device other than an antenna, such as an optical communication device, for example. Moreover, the transmitting device may employ a method in which one or more modulated signals are transmitted at the same frequency and time, and may employ a method in which one or more streams of a modulated signal are transmitted at the same frequency and time.

Embodiment 8

In the present embodiment, an example of a case in which data held by communication device #A is transmitted to a plurality of communication devices will be given.

Figure 45:
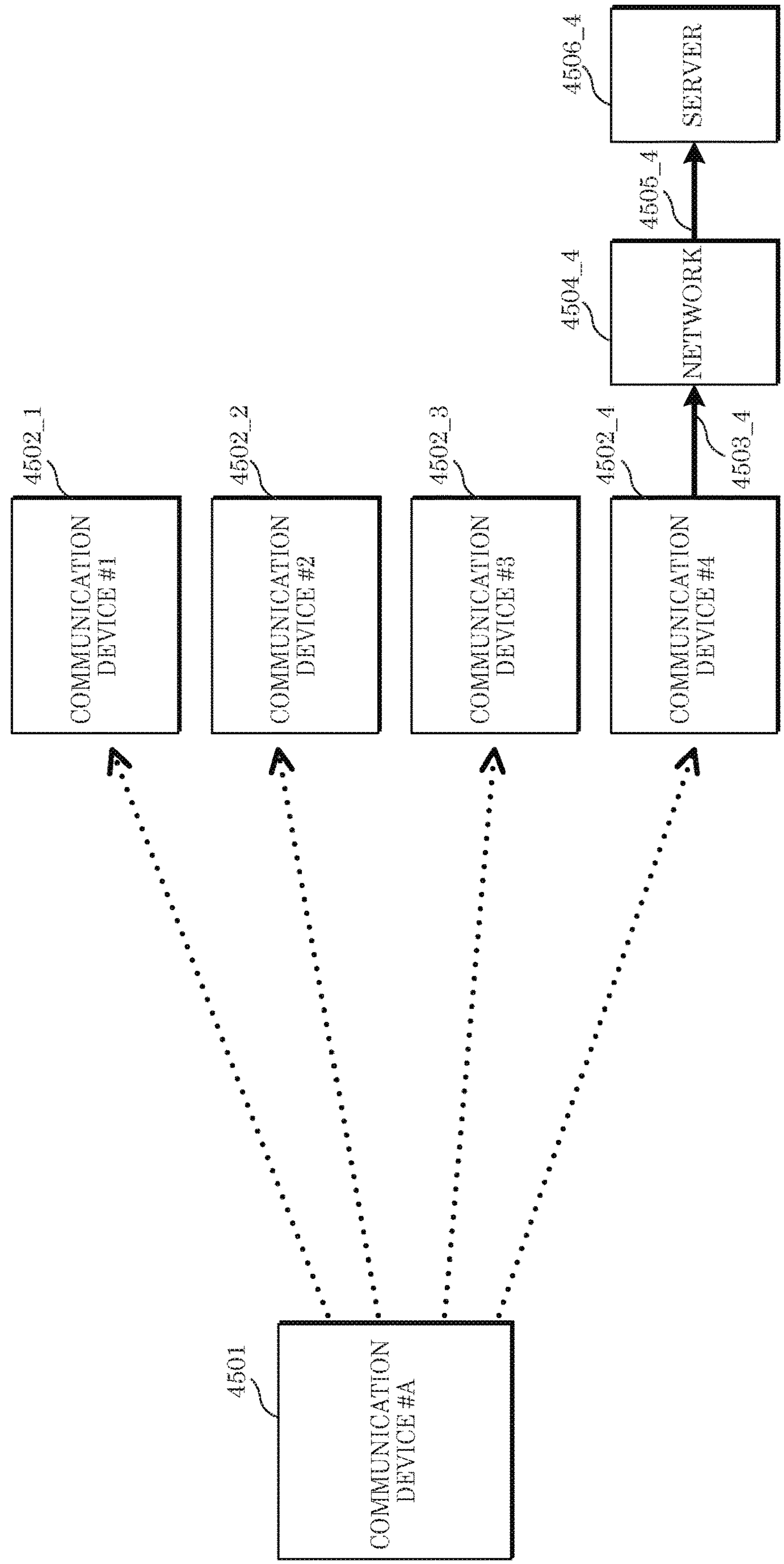
FIG. 45 illustrates an example of a case in which data held by a communication device is transmitted to a plurality of communication devices.

FIG. 45 illustrates an example of a case in which data held by communication device #A is transmitted to a plurality of communication devices. Communication device #A labeled as 4501, for example, accumulates a first file configured of first data in an accumulation unit, and communication device #A labeled as 4501 transmits the first data to communication device #1 labeled as 4502_1, communication device #2 labeled as 4502_2, communication device #3 labeled as 4502_3, and communication device #4 labeled as 4502_4.

Communication device #4 labeled as 4502_4 transmits the first data obtained from communication device #A labeled as 4501 to server 4506_4 via network 4503.

Next, operations performed by communication device #A labeled as 4501, communication device #1 labeled as 4502_1, communication device #2 labeled as 4502_2, communication device #3 labeled as 4502_3, and communication device #4 labeled as 4502_4 in FIG. 45 will be described in detail.

For example, communication device #A labeled as 4501 has the configuration illustrated in FIG. 1 (or FIG. 3 or FIG. 44). Communication device #1 labeled as 4502_1, communication device #2 labeled as 4502_2, communication device #3 labeled as 4502_3, and communication device #4 labeled as 4502_4 have, for example, the configuration illustrated in FIG. 4. Note that as operations performed by each element illustrated in FIG. 1 (FIG. 3, FIG. 44) and operations performed by each element illustrated in FIG. 4 have already been described, repeated description thereof will be omitted.

Signal processor 102 included in communication device #A labeled as 4501 receives inputs of information 101-1 including first data, and control signal 159, and signal processing is performed based on "information on a method of error correction coding (a coding rate, a code length (block length))", "information on a modulation method", and "a transmitting method (multiplexing method)", etc., that are included in control signal 159.

At this time, signal processor 102 generates, based on information 101-1 including first data, a signal obtained as a result of signal processing to be transmitted to communication device #1 labeled as 4502_1, a signal obtained as a result of signal processing to be transmitted to communication device #2 labeled as 4502_2, a signal obtained as a result of signal processing to be transmitted to communication device #3 labeled as 4502_3, and a signal obtained as a result of signal processing to be transmitted to communication device #4 labeled as 4502_4. In one example, the signal obtained as a result of signal processing to be transmitted to communication device #1 labeled as 4502_1 is labeled as 103-1, the signal obtained as a result of signal processing to be transmitted to communication device #2 labeled as 4502_2 is labeled as 103-2, the signal obtained as a result of signal processing to be transmitted to communication device #3 labeled as 4502_3 is labeled as 103-3, and the signal obtained as a result of signal processing to be transmitted to communication device #4 labeled as 4502_4 is labeled as 103-4.

Signal 103-1 obtained as a result of signal processing to be transmitted to communication device #1 labeled as 4502_1 is transmitted from antenna unit 106-1 as transmission signal 105-1 via wireless communication unit 104-1. Similarly, signal 103-2 obtained as a result of signal processing to be transmitted to communication device #2 labeled as 4502_2 is transmitted from antenna unit 106-2 as transmission signal 105-2 via wireless communication unit 104-2, signal 103-3 obtained as a result of signal processing to be transmitted to communication device #3 labeled as 4502_3 is transmitted from antenna unit 106-3 as transmission signal 105-3 via wireless communication unit 104-3, and signal 103-4 obtained as a result of signal processing to be transmitted to communication device #4 labeled as 4502_4 is transmitted from antenna unit 106-4 as transmission signal 105-4 via wireless communication unit 104-4.

Next, a method for setting the frequencies of transmission signals 105-1, 105-2, 105-3, and 105-4 at this time will be described with reference to FIG. 46.

Figure 46:
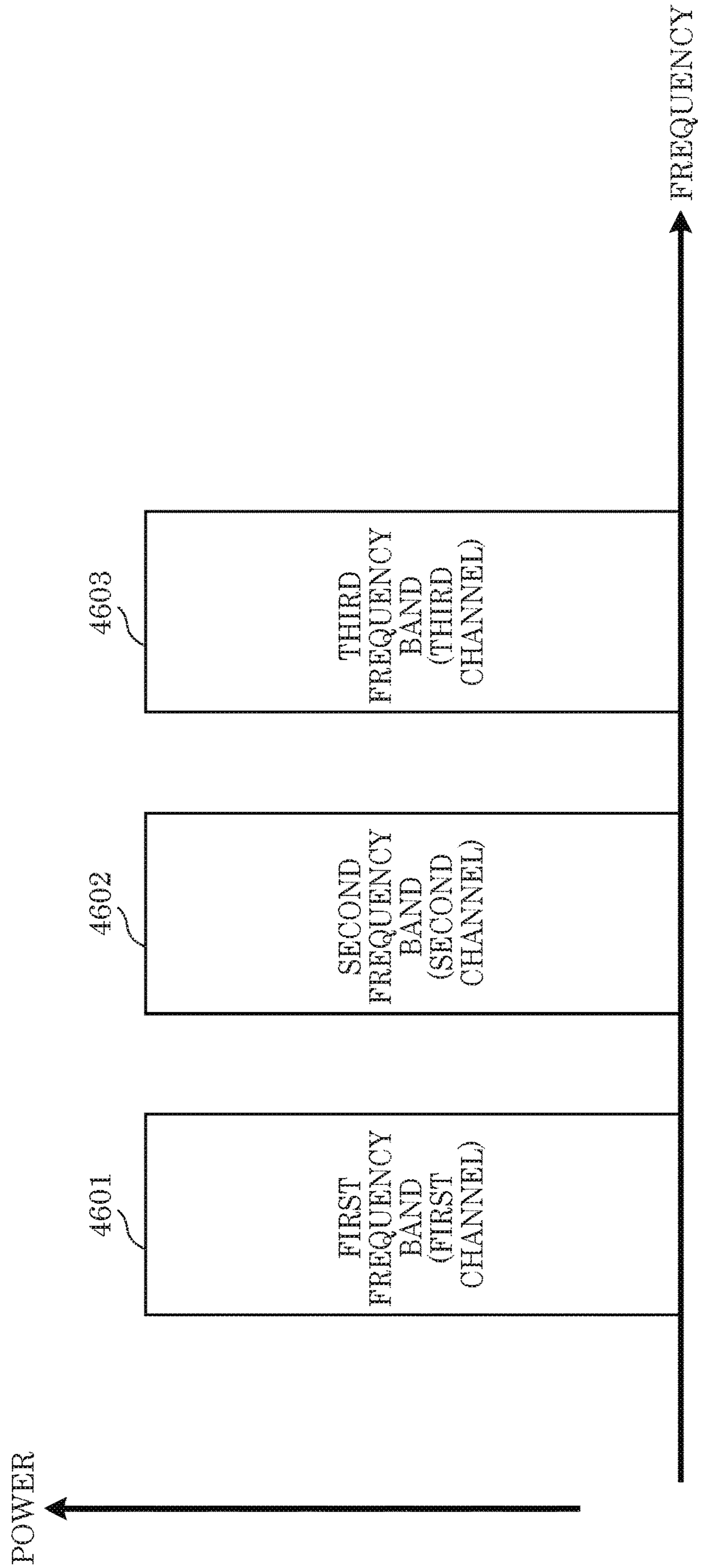
FIG. 46 illustrates one example of spectrums.

In FIG. 46, frequency is represented on the horizontal axis, and power is represented on the vertical axis. Transmission signals 105-1, 105-2, 105-3, and 105-4 are signals having any one of a spectrum including spectrum 4601 in a first frequency band (first channel), a spectrum including spectrum 4602 in a second frequency band (second channel), and a spectrum including spectrum 4603 in a third frequency band (third channel).

Specific examples will be given with reference to FIG. 47, FIG. 48, FIG. 49, and FIG. 50.

Figure 47:
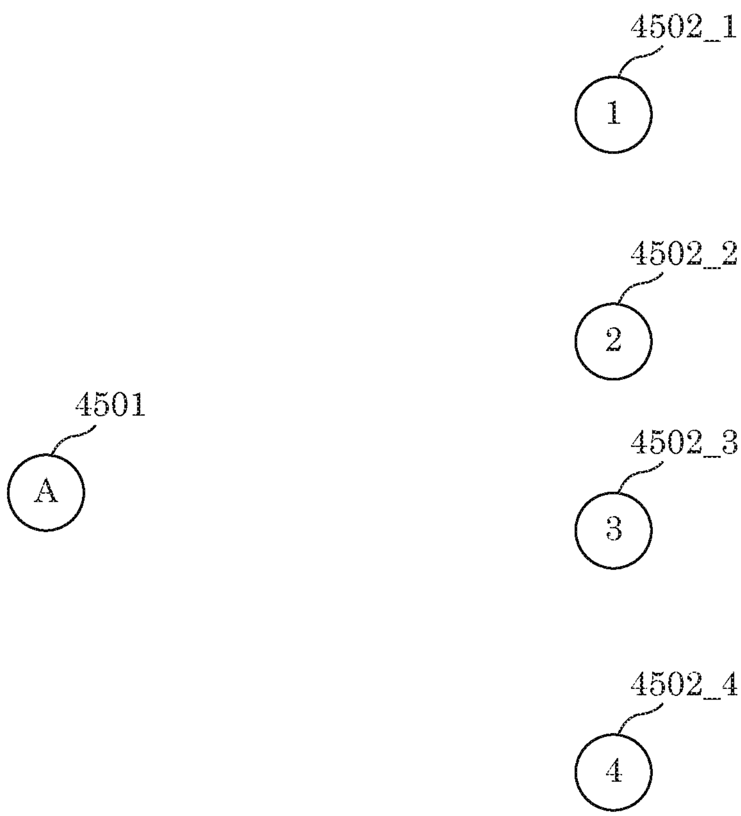
FIG. 47 illustrates one example of a positional relationship between communication devices.

FIG. 47 illustrates a positional relationship between communication device #A labeled as 4501, communication device #1 labeled as 4502_1, communication device #2 labeled as 4502_2, communication device #3 labeled as 4502_3, and communication device #4 labeled as 4502_4 illustrated in FIG. 45. Accordingly, the reference signs used in FIG. 45 are also used in FIG. 47.

With the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4601 having the first frequency band that is illustrated in FIG. 46, can use, as the spectrum to be used by transmission signal 105-3 to be transmitted to communication device #3 labeled as 4502_3, spectrum 4601 having the first frequency band that is illustrated in FIG. 46, and can use, as the spectrum to be used by transmission signal 105-4 to be transmitted to communication device #4 labeled as 4502_4, spectrum 4601 having the first frequency band that is illustrated in FIG. 46. In this way, the frequency band used by the transmission signal to be transmitted to communication device #1 labeled as 4502_1, the frequency band used by the transmission signal to be transmitted to communication device #2 labeled as 4502_2, the frequency band used by the transmission signal to be transmitted to communication device #3 labeled as 4502_3, and the frequency band used by the transmission signal to be transmitted to communication device #4 labeled as 4502_4 can be set to the same frequency band. This achieves the advantageous effect that the frequency usage efficiency can be improved.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 4502_4 will be described.

Figure 51:
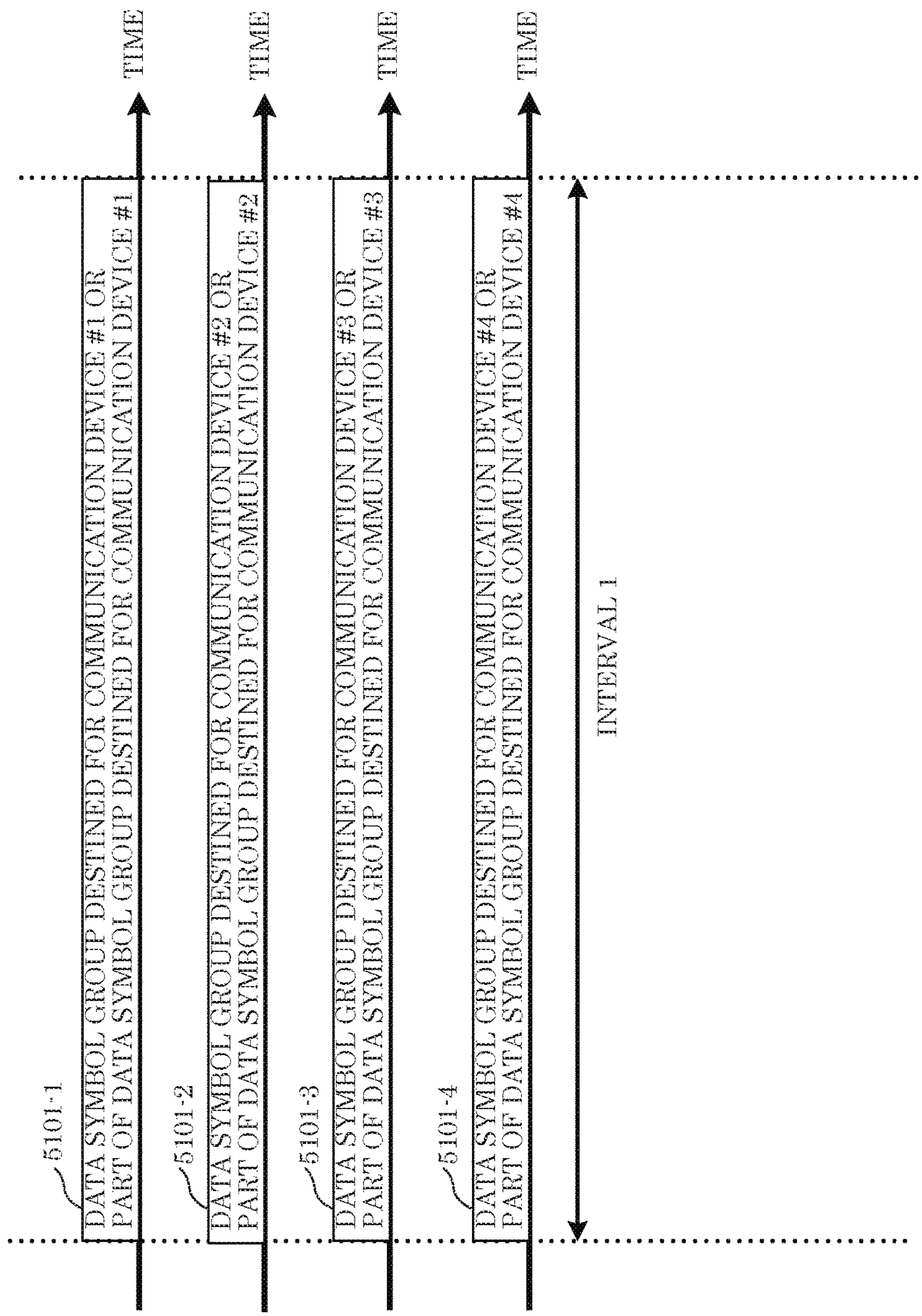
FIG. 51 illustrates one example of a frame configuration of a modulated signal transmitted by a communication device.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Figure 48:
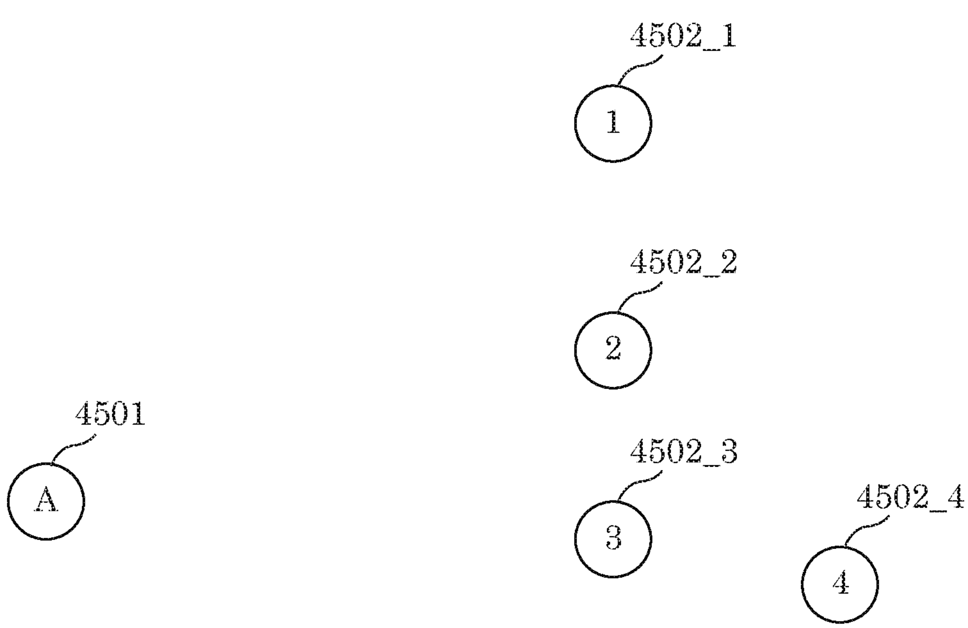
FIG. 48 illustrates another example of a positional relationship between communication devices.

FIG. 48 illustrates a positional relationship between communication device #A labeled as 4501, communication device #1 labeled as 4502_1, communication device #2 labeled as 4502_2, communication device #3 labeled as 4502_3, and communication device #4 labeled as 4502_4 illustrated in FIG. 45 that differs from the example illustrated in FIG. 47. Accordingly, the reference signs used in FIG. 45 are also used in FIG. 48.

With the example illustrated in FIG. 48, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4601 having the first frequency band that is illustrated in FIG. 46, uses, as the spectrum to be used by transmission signal 105-3 to be transmitted to communication device #3 labeled as 4502_3, spectrum 4601 having the first frequency band that is illustrated in FIG. 46, and uses, as the spectrum to be used by transmission signal 105-4 to be transmitted to communication device #4 labeled as 4502_4, spectrum 4602 having the second frequency band that is illustrated in FIG. 46. At this time, the reason why the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-3 to be transmitted to communication device #3 labeled as 4502_3 and the frequency band used by transmission signal 105-4 to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4601 having the first frequency band that is illustrated in FIG. 46, can use, as the spectrum to be used by transmission signal 105-3 to be transmitted to communication device #3 labeled as 4502_3, spectrum 4601 having the first frequency band that is illustrated in FIG. 46, and can use, as the spectrum to be used by transmission signal 105-4 to be transmitted to communication device #4 labeled as 4502_4, spectrum 4602 having the second frequency band that is illustrated in FIG. 46.

Figure 49:
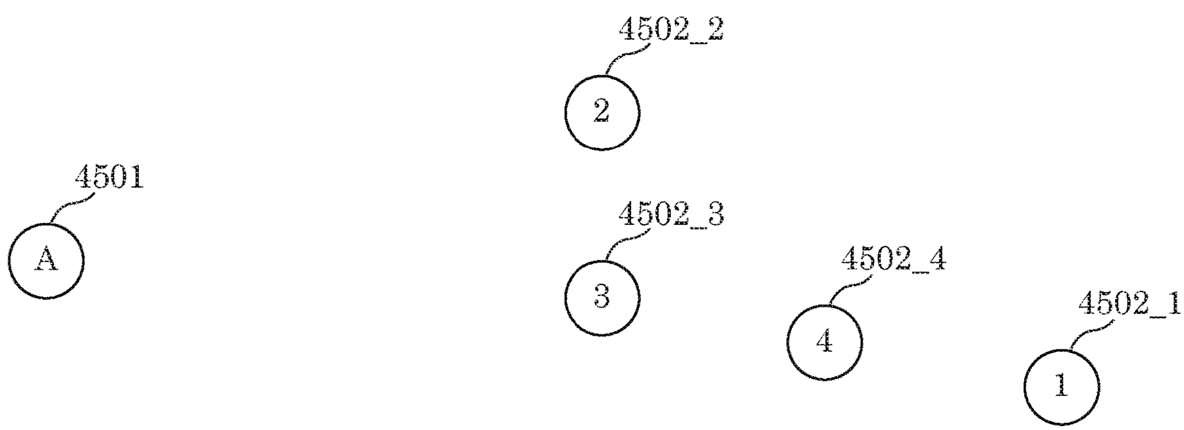
FIG. 49 illustrates another example of a positional relationship between communication devices.

FIG. 49 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47 and FIG. 48. Accordingly, the reference signs used in FIG. 45 are also used in FIG. 49.

With the example illustrated in FIG. 49, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46. At this time, the reason why the frequency band used by transmission signal 105-1 to be transmitted to communication device #1 labeled as 4502_1, the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-1 to be transmitted to communication device #1 labeled as 4502_1, the frequency band used by transmission signal 105-3 to be transmitted to communication device #3 labeled as 4502_3 and the frequency band used by transmission signal 105-4 to be transmitted to communication device #4 labeled as 4502_4 the same, communication device #1 labeled as 4502_1, communication device #3 labeled as 4502_3, and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4602 having the second frequency band that is illustrated in FIG. 46, can use, as the spectrum to be used by transmission signal 105-3 to be transmitted to communication device #3 labeled as 4502_3, spectrum 4602 having the second frequency band that is illustrated in FIG. 46, and can use, as the spectrum to be used by transmission signal 105-4 to be transmitted to communication device #4 labeled as 4502_4, spectrum 4603 having the third frequency band that is illustrated in FIG. 46.

Figure 50:
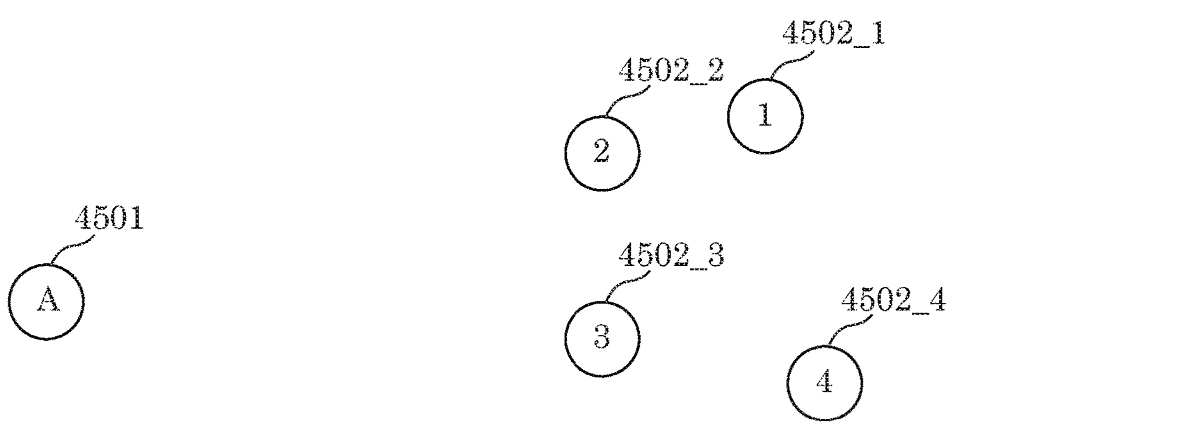
FIG. 50 illustrates another example of a positional relationship between communication devices.

FIG. 50 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47, FIG. 48, and FIG. 49. Accordingly, the reference signs used in FIG. 45 are also used in FIG. 50.

With the example illustrated in FIG. 50, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4601 having the first frequency band that is illustrated in FIG. 46.

At this time, the reason why the frequency band used by transmission signal 105-1 to be transmitted to communication device #1 labeled as 4502_1 and the frequency band used by transmission signal 105-2 to be transmitted to communication device #2 labeled as 4502_2 are different is because when transmitting device #A labeled as 4501 tries to make the frequency band used by transmission signal 105-1 to be transmitted to communication device #1 labeled as 4502_1 and the frequency band used by transmission signal 105-2 to be transmitted to communication device #2 labeled as 4502_2 the same, communication device #1 labeled as 4502_1 and communication device #2 labeled as 4502_2 have difficulty in splitting the beam whereby interference increases, which results in a reduction in data reception quality.

Similarly, the reason why the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-3 to be transmitted to communication device #3 labeled as 4502_3 and the frequency band used by transmission signal 105-4 to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4602 having the second frequency band that is illustrated in FIG. 46, can use, as the spectrum to be used by transmission signal 105-3 to be transmitted to communication device #3 labeled as 4502_3, spectrum 4602 having the second frequency band that is illustrated in FIG. 46, and can use, as the spectrum to be used by transmission signal 105-4 to be transmitted to communication device #4 labeled as 4502_4, spectrum 4601 having the first frequency band that is illustrated in FIG. 46.

Moreover, with the example illustrated in FIG. 50, even when communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46, the advantageous effect that the frequency usage efficiency can be improved while ensuring high data reception quality can be achieved.

Furthermore, with the example illustrated in FIG. 50, even when communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4601 having the first frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46, the advantageous effect that the frequency usage efficiency can be improved while ensuring high data reception quality can be achieved.

Note that communication device #1 labeled as 4502_1, communication device #2 labeled as 4502_2, communication device #3 labeled as 4502_3, and communication device #4 labeled as 4502_4 have, for example, the configuration illustrated in FIG. 4, receive a desired signal, and obtain desired data by causing the reception part in FIG. 4 to operate.

As described above, when transmitting the same data to a plurality of communication devices, by employing any one of: (1) using a plurality of beams and a plurality of frequency bands; (2) using a plurality of beams and a specific frequency band; (3) using a specific beam and a plurality of frequency bands, it is possible to achieve high data reception quality and achieve the advantageous effect that a high frequency usage efficiency can be achieved.

Next, a case in which communication device #A labeled as 4501 has, for example, the configuration illustrated in FIG. 3, and communication device #1 labeled as 4502_1, communication device #2 labeled as 4502_2, communication device #3 labeled as 4502_3, and communication device #4 labeled as 4502_4 have, for example, the configuration illustrated in FIG. 4 will be described.

Signal processor 102 included in communication device #A labeled as 4501 receives inputs of information 101-1 including first data, and control signal 159, and signal processing is performed based on "information on a method of error correction coding (a coding rate, a code length (block length))", "information on a modulation method", and "a transmitting method (multiplexing method)", etc., that are included in control signal 159.

At this time, signal processor 102 generates, based on information 101-1 including first data, a signal obtained as a result of signal processing to be transmitted to communication device #1 labeled as 4502_1, a signal obtained as a result of signal processing to be transmitted to communication device #2 labeled as 4502_2, a signal obtained as a result of signal processing to be transmitted to communication device #3 labeled as 4502_3, and a signal obtained as a result of signal processing to be transmitted to communication device #4 labeled as 4502_4. In one example, the signal obtained as a result of signal processing to be transmitted to communication device #1 labeled as 4502_1 is labeled as 103-1, the signal obtained as a result of signal processing to be transmitted to communication device #2 labeled as 4502_2 is labeled as 103-2, the signal obtained as a result of signal processing to be transmitted to communication device #3 labeled as 4502_3 is labeled as 103-3, and the signal obtained as a result of signal processing to be transmitted to communication device #4 labeled as 4502_4 is labeled as 103-4.

Wireless communication unit 104-1 receives an input of signal 103-1 obtained as a result of signal processing to be transmitted to communication device #1 labeled as 4502_1, and outputs transmission signal 105-1. Similarly, wireless communication unit 104-2 receives an input of signal 103-2 obtained as a result of signal processing to be transmitted to communication device #2 labeled as 4502_2, and outputs transmission signal 105-2. Wireless communication unit 104-3 receives an input of signal 103-3 obtained as a result of signal processing to be transmitted to communication device #3 labeled as 4502_3, and outputs transmission signal 105-3. Wireless communication unit 104-4 receives an input of signal 103-4 obtained as a result of signal processing to be transmitted to communication device #4 labeled as 4502_4, and outputs transmission signal 105-4.

Weighting synthesizer 301 receives inputs of at least transmission signal 105-1, transmission signal 105-2, transmission signal 105-3, and transmission signal 105-4, performs weighting synthesis calculation, and outputs signals 302-1, 302-2, . . . , and 302-K obtained as a result of the weighting synthesis, and signals 302-1, 302-2, . . . , and 302-K obtained as a result of the weighting synthesis are then output as radio waves from antennas 303-1, 303-2, . . . , and 303-K. Accordingly, transmission signal 105-1 is transmitted using one or more antennas from among antennas 303-1, 303-2, . . . , and 303-K. Similarly, transmission signal 105-2 is transmitted using one or more antennas from among antennas 303-1, 303-2, . . . , and 303-K, transmission signal 105-3 is transmitted using one or more antennas from among antennas 303-1, 303-2, . . . , and 303-K, and transmission signal 105-4 is transmitted using one or more antennas from among antennas 303-1, 303-2, . . . , and 303-K.

Note that each of antennas 303-1, 303-2, . . . , and 303-K may have the configuration illustrated in FIG. 2.

Next, the method of setting the frequencies of transmission signals 105-1, 105-2, 105-3, and 105-4 at this time will be described with reference to FIG. 46.

In FIG. 46, frequency is represented on the horizontal axis, and power is represented on the vertical axis. Transmission signals 105-1, 105-2, 105-3, and 105-4 are signals having any one of a spectrum including spectrum 4601 in a first frequency band (first channel), a spectrum including spectrum 4602 in a second frequency band (second channel), and a spectrum including spectrum 4603 in a third frequency band (third channel).

Specific examples will be given with reference to FIG. 47, FIG. 48, FIG. 49, and FIG. 50.

FIG. 47 illustrates a positional relationship between communication device #A labeled as 4501, communication device #1 labeled as 4502_1, communication device #2 labeled as 4502_2, communication device #3 labeled as 4502_3, and communication device #4 labeled as 4502_4 illustrated in FIG. 45. Accordingly, the reference signs used in FIG. 45 are also used in FIG. 47.

With the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4601 having the first frequency band that is illustrated in FIG. 46, can use, as the spectrum to be used by transmission signal 105-3 to be transmitted to communication device #3 labeled as 4502_3, spectrum 4601 having the first frequency band that is illustrated in FIG. 46, and can use, as the spectrum to be used by transmission signal 105-4 to be transmitted to communication device #4 labeled as 4502_4, spectrum 4601 having the first frequency band that is illustrated in FIG. 46. In this way, the frequency band used by the transmission signal to be transmitted to communication device #1 labeled as 4502_1, the frequency band used by the transmission signal to be transmitted to communication device #2 labeled as 4502_2, the frequency band used by the transmission signal to be transmitted to communication device #3 labeled as 4502_3, and the frequency band used by the transmission signal to be transmitted to communication device #4 labeled as 4502_4 can be set to the same frequency band. This achieves the advantageous effect that the frequency usage efficiency can be improved.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

FIG. 48 illustrates a positional relationship between communication device #A labeled as 4501, communication device #1 labeled as 4502_1, communication device #2 labeled as 4502_2, communication device #3 labeled as 4502_3, and communication device #4 labeled as 4502_4 illustrated in FIG. 45 that differs from the example illustrated in FIG. 47. Accordingly, the reference signs used in FIG. 45 are also used in FIG. 48.

With the example illustrated in FIG. 48, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4601 having the first frequency band that is illustrated in FIG. 46, uses, as the spectrum to be used by transmission signal 105-3 to be transmitted to communication device #3 labeled as 4502_3, spectrum 4601 having the first frequency band that is illustrated in FIG. 46, and uses, as the spectrum to be used by transmission signal 105-4 to be transmitted to communication device #4 labeled as 4502_4, spectrum 4602 having the second frequency band that is illustrated in FIG. 46. At this time, the reason why the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-3 to be transmitted to communication device #3 labeled as 4502_3 and the frequency band used by transmission signal 105-4 to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4601 having the first frequency band that is illustrated in FIG. 46, can use, as the spectrum to be used by transmission signal 105-3 to be transmitted to communication device #3 labeled as 4502_3, spectrum 4601 having the first frequency band that is illustrated in FIG. 46, and can use, as the spectrum to be used by transmission signal 105-4 to be transmitted to communication device #4 labeled as 4502_4, spectrum 4602 having the second frequency band that is illustrated in FIG. 46.

FIG. 49 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47 and FIG. 48. Accordingly, the reference signs used in FIG. 45 are also used in FIG. 49.

With the example illustrated in FIG. 49, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46. At this time, the reason why the frequency band used by transmission signal 105-1 to be transmitted to communication device #1 labeled as 4502_1, the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-1 to be transmitted to communication device #1 labeled as 4502_1, the frequency band used by transmission signal 105-3 to be transmitted to communication device #3 labeled as 4502_3 and the frequency band used by transmission signal 105-4 to be transmitted to communication device #4 labeled as 4502_4 the same, communication device #1 labeled as 4502_1, communication device #3 labeled as 4502_3, and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4602 having the second frequency band that is illustrated in FIG. 46, can use, as the spectrum to be used by transmission signal 105-3 to be transmitted to communication device #3 labeled as 4502_3, spectrum 4602 having the second frequency band that is illustrated in FIG. 46, and can use, as the spectrum to be used by transmission signal 105-4 to be transmitted to communication device #4 labeled as 4502_4, spectrum 4603 having the third frequency band that is illustrated in FIG. 46.

FIG. 50 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47, FIG. 48, and FIG. 49. Accordingly, the reference signs used in FIG. 45 are also used in FIG. 50.

With the example illustrated in FIG. 50, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4601 having the first frequency band that is illustrated in FIG. 46.

At this time, the reason why the frequency band used by transmission signal 105-1 to be transmitted to communication device #1 labeled as 4502_1 and the frequency band used by transmission signal 105-2 to be transmitted to communication device #2 labeled as 4502_2 are different is because when transmitting device #A labeled as 4501 tries to make the frequency band used by transmission signal 105-1 to be transmitted to communication device #1 labeled as 4502_1 and the frequency band used by transmission signal 105-2 to be transmitted to communication device #2 labeled as 4502_2 the same, communication device #1 labeled as 4502_1 and communication device #2 labeled as 4502_2 have difficulty in splitting the beam whereby interference increases, which results in a reduction in data reception quality.

Similarly, the reason why the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-3 to be transmitted to communication device #3 labeled as 4502_3 and the frequency band used by transmission signal 105-4 to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4602 having the second frequency band that is illustrated in FIG. 46, can use, as the spectrum to be used by transmission signal 105-3 to be transmitted to communication device #3 labeled as 4502_3, spectrum 4602 having the second frequency band that is illustrated in FIG. 46, and can use, as the spectrum to be used by transmission signal 105-4 to be transmitted to communication device #4 labeled as 4502_4, spectrum 4601 having the first frequency band that is illustrated in FIG. 46.

Moreover, with the example illustrated in FIG. 50, even when communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46, the advantageous effect that the frequency usage efficiency can be improved while ensuring high data reception quality can be achieved.

Furthermore, with the example illustrated in FIG. 50, even when communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4601 having the first frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46, the advantageous effect that the frequency usage efficiency can be improved while ensuring high data reception quality can be achieved.

Note that communication device #1 labeled as 4502_1, communication device #2 labeled as 4502_2, communication device #3 labeled as 4502_3, and communication device #4 labeled as 4502_4 have, for example, the configuration illustrated in FIG. 4, receive a desired signal, and obtain desired data by causing the reception part in FIG. 4 to operate.

Next, a case in which communication device #A labeled as 4501 has, for example, the configuration illustrated in FIG. 4, and communication device #1 labeled as 4502_1, communication device #2 labeled as 4502_2, communication device #3 labeled as 4502_3, and communication device #4 labeled as 4502_4 have, for example, the configuration illustrated in FIG. 44 will be described.

Signal processor 102 included in communication device #A labeled as 4501 receives inputs of information 101-1 including first data, and control signal 159, and signal processing is performed based on "information on a method of error correction coding (a coding rate, a code length (block length))", "information on a modulation method", and "a transmitting method (multiplexing method)", etc., that are included in control signal 159.

At this time, signal processor 102 generates, based on information 101-1 including first data, a signal obtained as a result of signal processing to be transmitted to communication device #1 labeled as 4502_1, a signal obtained as a result of signal processing to be transmitted to communication device #2 labeled as 4502_2, a signal obtained as a result of signal processing to be transmitted to communication device #3 labeled as 4502_3, and a signal obtained as a result of signal processing to be transmitted to communication device #4 labeled as 4502_4. In one example, the signal obtained as a result of signal processing to be transmitted to communication device #1 labeled as 4502_1 is labeled as 103-1, the signal obtained as a result of signal processing to be transmitted to communication device #2 labeled as 4502_2 is labeled as 103-2, the signal obtained as a result of signal processing to be transmitted to communication device #3 labeled as 4502_3 is labeled as 103-3, and the signal obtained as a result of signal processing to be transmitted to communication device #4 labeled as 4502_4 is labeled as 103-4.

Weighting synthesizer 301 receives inputs of at least signal 103-1 obtained as a result of signal processing, signal 103-2 obtained as a result of signal processing, signal 103-3 obtained as a result of signal processing, and signal 103-4 obtained as a result of signal processing, performs weighting synthesis calculation, and outputs signals 4402-1, 4402-2, . . . , and 4402-K obtained as a result of the weighting synthesis. Accordingly, signal 103-1 obtained as a result of signal processing is transmitted using one or more antennas from among antennas 303-1, 303-2, . . . , and 303-K. Similarly, signal 103-2 obtained as a result of signal processing is transmitted using one or more antennas from among antennas 303-1, 303-2, . . . , and 303-K, signal 103-3 obtained as a result of signal processing is transmitted using one or more antennas from among antennas 303-1, 303-2, . . . , and 303-K, and signal 103-4 obtained as a result of signal processing is transmitted using one or more antennas from among antennas 303-1, 303-2, . . . , and 303-K.

Note that each of antennas 303-1, 303-2, . . . , and 303-K may have the configuration illustrated in FIG. 2.

Next, the method of setting the frequencies of signals 103-1, 103-2, 103-3, and 103-4 obtained as a result of signal processing at this time will be described with reference to FIG. 46.

In FIG. 46, frequency is represented on the horizontal axis, and power is represented on the vertical axis. Signals 103-1, 103-2, 103-3, and 103-4 obtained as a result of signal processing are, after frequency conversion, signals having any one of a spectrum including spectrum 4601 in a first frequency band (first channel), a spectrum including spectrum 4602 in a second frequency band (second channel), and a spectrum including spectrum 4603 in a third frequency band (third channel).

Note that, for example, when a transmitting device having the configuration in FIG. 1 or FIG. 3 generates a modulated signal of first frequency band 4601, a modulated signal of second frequency band 4602, and a modulated signal of third frequency band 4603, in the antenna units in FIG. 1 and the weighting synthesizer in FIG. 3 and FIG. 44, settings may be configured so that the directivity of the modulated signal of first frequency band 4601 and the directivity of the modulated signal of second frequency band 4602 are different. Similarly, in the antenna units in FIG. 1 and the weighting synthesizer in FIG. 3 and FIG. 44, settings may be configured so that the directivity of the modulated signal of first frequency band 4601 and the directivity of the modulated signal of third frequency band 4603 are different. Moreover, in the antenna units in FIG. 1 and the weighting synthesizer in FIG. 3 and FIG. 44, settings may be configured so that the directivity of the modulated signal of second frequency band 4602 and the directivity of the modulated signal of third frequency band 4603 are different.

Specific examples will be given with reference to FIG. 47, FIG. 48, FIG. 49, and FIG. 50.

FIG. 47 illustrates a positional relationship between communication device #A labeled as 4501, communication device #1 labeled as 4502_1, communication device #2 labeled as 4502_2, communication device #3 labeled as 4502_3, and communication device #4 labeled as 4502_4 illustrated in FIG. 45. Accordingly, the reference signs used in FIG. 45 are also used in FIG. 47.

With the example illustrated in FIG. 47, communication device #A labeled as 4501 can use spectrum 4601 of the first frequency band illustrated in FIG. 46 as the spectrum to be used, after frequency conversion, by signal 103-1 obtained as a result of signal processing that is to be transmitted to communication device #1 labeled as 4502_1, can use spectrum 4601 of the first frequency band illustrated in FIG. 46 as the spectrum to be used, after frequency conversion, by signal 103-2 obtained as a result of signal processing that is to be transmitted to communication device #2 labeled as 4502_2, can use spectrum 4601 of the first frequency band illustrated in FIG. 46 as the spectrum to be used, after frequency conversion, by signal 103-3 obtained as a result of signal processing that is to be transmitted to communication device #3 labeled as 4502_3, and can use spectrum 4601 of the first frequency band illustrated in FIG. 46 as the spectrum to be used, after frequency conversion, by signal 103-4 obtained as a result of signal processing that is to be transmitted to communication device #4 labeled as 4502_4. In this way, the frequency band used by the transmission signal to be transmitted to communication device #1 labeled as 4502_1, the frequency band used by the transmission signal to be transmitted to communication device #2 labeled as 4502_2, the frequency band used by the transmission signal to be transmitted to communication device #3 labeled as 4502_3, and the frequency band used by the transmission signal to be transmitted to communication device #4 labeled as 4502_4 can be set to the same frequency band. This achieves the advantageous effect that the frequency usage efficiency can be improved.

Next, the temporal presence of signal 103-1 obtained as a result of signal processing that is to be transmitted to communication device #1 labeled as 4502_1, signal 103-2 obtained as a result of signal processing that is to be transmitted to communication device #2 labeled as 4502_2, signal 103-3 obtained as a result of signal processing that is to be transmitted to communication device #3 labeled as 4502_3, and signal 103-4 obtained as a result of signal processing that is to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2"

5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

FIG. 48 illustrates a positional relationship between communication device #A labeled as 4501, communication device #1 labeled as 4502_1, communication device #2 labeled as 4502_2, communication device #3 labeled as 4502_3, and communication device #4 labeled as 4502_4 illustrated in FIG. 45 that differs from the example illustrated in FIG. 47. Accordingly, the reference signs used in FIG. 45 are also used in FIG. 48.

With the example illustrated in FIG. 48, communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4601 of the first frequency band illustrated in FIG. 46 as the spectrum to be used, after frequency conversion, by signal 103-2 obtained as a result of signal processing that is to be transmitted to communication device #2 labeled as 4502_2, uses spectrum 4601 of the first frequency band illustrated in FIG. 46 as the spectrum to be used, after frequency conversion, by signal 103-3 obtained as a result of signal processing that is to be transmitted to communication device #3 labeled as 4502_3, and uses spectrum 4602 of the second frequency band illustrated in FIG. 46 as the spectrum to be used, after frequency conversion, by signal 103-4 obtained as a result of signal processing that is to be transmitted to communication device #4 labeled as 4502_4. At this time, the reason why the frequency band used, after frequency conversion, by signal 103-3 obtained as a result of signal processing that is to be transmitted to communication device #3 labeled as 4502_3 and the frequency band used, after frequency conversion, by signal 103-4 obtained as a result of signal processing that is to be transmitted to communication device #4 labeled as 4502_4 are different is because when transmitting device #A labeled as 4501 tries to make the frequency band used, after frequency conversion, by signal 103-3 obtained as a result of signal processing that is to be transmitted to communication device #3 labeled as 4502_3 and the frequency band used, after frequency conversion, by signal 103-4 obtained as a result of signal processing that is to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of signal 103-1 obtained as a result of signal processing that is to be transmitted to communication device #1 labeled as 4502_1, signal 103-2 obtained as a result of signal processing that is to be transmitted to communication device #2 labeled as 4502_2, signal 103-3 obtained as a result of signal processing that is to be transmitted to communication device #3 labeled as 4502_3, and signal 103-4 obtained as a result of signal processing that is to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even with the example illustrated in FIG. 47, communication device #A labeled as 4501 can use spectrum 4601 of the first frequency band illustrated in FIG. 46 as the spectrum to be used, after frequency conversion, by signal 103-1 obtained as a result of signal processing that is to be transmitted to communication device #1 labeled as 4502_1, can use spectrum 4601 of the first frequency band illustrated in FIG. 46 as the spectrum to be used, after frequency conversion, by signal 103-2 obtained as a result of signal processing that is to be transmitted to communication device #2 labeled as 4502_2, can use spectrum 4601 of the first frequency band illustrated in FIG. 46 as the spectrum to be used, after frequency conversion, by signal 103-3 obtained as a result of signal processing that is to be transmitted to communication device #3 labeled as 4502_3, and can use spectrum 4602 of the second frequency band illustrated in FIG. 46 as the spectrum to be used, after frequency conversion, by signal 103-4 obtained as a result of signal processing that is to be transmitted to communication device #4 labeled as 4502_4.

FIG. 49 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47 and FIG. 48. Accordingly, the reference signs used in FIG. 45 are also used in FIG. 49.

With the example illustrated in FIG. 49, communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4602 of the second frequency band illustrated in FIG. 46 as the spectrum to be used, after frequency conversion, by signal 103-2 obtained as a result of signal processing that is to be transmitted to communication device #2 labeled as 4502_2, uses spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and uses spectrum 4603 of the third frequency band illustrated in FIG. 46 as the spectrum to be used, after frequency conversion, by signal 103-4 obtained as a result of signal processing that is to be transmitted to communication device #4 labeled as 4502_4. At this time, the reason why the frequency band used by signal 103-1 obtained as a result of signal processing that is to be transmitted to communication device #1 labeled as 4502_1, the frequency band used, after frequency conversion, by transmission signal 105-3 that is to be transmitted to communication device #3 labeled as 4502_3, and the frequency band used, after frequency conversion, by signal 103-4 obtained as a result of signal processing that is to be transmitted to communication device #4 labeled as 4502_4 are different is because when transmitting device #A labeled as 4501 tries to make the frequency band used, after frequency conversion, by signal 103-1 obtained as a result of signal processing that is to be transmitted to communication device #1 labeled as 4502_1, the frequency band used, after frequency conversion, by signal 103-3 obtained as a result of signal processing that is to be transmitted to communication device #3 labeled as 4502_3, and the frequency band used, after frequency conversion, by signal 103-4 obtained as a result of signal processing that is to be transmitted to communication device #4 labeled as 4502_4 the same, communication device #1 labeled as 4502_1, communication device #3 labeled as 4502_3, and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of signal 103-1 obtained as a result of signal processing that is to be transmitted to communication device #1 labeled as 4502_1, signal 103-2 obtained as a result of signal processing that is to be transmitted to communication device #2 labeled as 4502_2, signal 103-3 obtained as a result of signal processing that is to be transmitted to communication device #3 labeled as 4502_3, and signal 103-4 obtained as a result of signal processing that is to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even with the example illustrated in FIG. 47, communication device #A labeled as 4501 can use spectrum 4601 of the first frequency band illustrated in FIG. 46 as the spectrum to be used, after frequency conversion, by signal 103-1 obtained as a result of signal processing that is to be transmitted to communication device #1 labeled as 4502_1, can use spectrum 4602 of the second frequency band illustrated in FIG. 46 as the spectrum to be used, after frequency conversion, by signal 103-2 obtained as a result of signal processing that is to be transmitted to communication device #2 labeled as 4502_2, can use spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and can use spectrum 4603 of the third frequency band illustrated in FIG. 46 as the spectrum to be used, after frequency conversion, by signal 103-4 obtained as a result of signal processing that is to be transmitted to communication device #4 labeled as 4502_4.

FIG. 50 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47, FIG. 48, and FIG. 49. Accordingly, the reference signs used in FIG. 45 are also used in FIG. 50.

With the example illustrated in FIG. 50, communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4602 of the second frequency band illustrated in FIG. 46 as the spectrum to be used, after frequency conversion, by signal 103-2 obtained as a result of signal processing that is to be transmitted to communication device #2 labeled as 4502_2, uses spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and uses spectrum 4601 of the first frequency band illustrated in FIG. 46 as the spectrum to be used, after frequency conversion, by signal 103-4 obtained as a result of signal processing that is to be transmitted to communication device #4 labeled as 4502_4.

At this time, the reason why the frequency band used, after frequency conversion, by signal 103-1 obtained as a result of signal processing that is to be transmitted to communication device #1 labeled as 4502_1 and the frequency band used, after frequency conversion, by signal 103-2 obtained as a result of signal processing that is to be transmitted to communication device #2 labeled as 4502_2 are different is because when transmitting device #A labeled as 4501 tries to make the frequency band used, after frequency conversion, by signal 103-1 obtained as a result of signal processing that is to be transmitted to communication device #1 labeled as 4502_1 and the frequency band used, after frequency conversion, by signal 103-2 obtained as a result of signal processing that is to be transmitted to communication device #2 labeled as 4502_2 the same, communication device #1 labeled as 4502_1 and communication device #2 labeled as 4502_2 have difficulty in splitting the beam whereby interference increases, which results in a reduction in data reception quality.

Similarly, the reason why the frequency band used, after frequency conversion, by signal 103-3 obtained as a result of signal processing that is to be transmitted to communication device #3 labeled as 4502_3 and the frequency band used, after frequency conversion, by signal 103-4 obtained as a result of signal processing that is to be transmitted to communication device #4 labeled as 4502_4 are different is because when transmitting device #A labeled as 4501 tries to make the frequency band used, after frequency conversion, by signal 103-3 obtained as a result of signal processing that is to be transmitted to communication device #3 labeled as 4502_3 and the frequency band used, after frequency conversion, by signal 103-4 obtained as a result of signal processing that is to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of signal 103-1 obtained as a result of signal processing that is to be transmitted to communication device #1 labeled as 4502_1, signal 103-2 obtained as a result of signal processing that is to be transmitted to communication device #2 labeled as 4502_2, signal 103-3 obtained as a result of signal processing that is to be transmitted to communication device #3 labeled as 4502_3, and signal 103-4 obtained as a result of signal processing that is to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even with the example illustrated in FIG. 47, communication device #A labeled as 4501 can use spectrum 4601 of the first frequency band illustrated in FIG. 46 as the spectrum to be used, after frequency conversion, by signal 103-1 obtained as a result of signal processing that is to be transmitted to communication device #1 labeled as 4502_1, can use spectrum 4602 of the second frequency band illustrated in FIG. 46 as the spectrum to be used, after frequency conversion, by signal 103-2 obtained as a result of signal processing that is to be transmitted to communication device #2 labeled as 4502_2, can use spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and can use spectrum 4601 of the first frequency band illustrated in FIG. 46 as the spectrum to be used, after frequency conversion, by signal 103-4 obtained as a result of signal processing that is to be transmitted to communication device #4 labeled as 4502_4.

Moreover, with the example illustrated in FIG. 50, even when communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4602 of the second frequency band illustrated in FIG. 46 as the spectrum to be used, after frequency conversion, by signal 103-2 obtained as a result of signal processing that is to be transmitted to communication device #2 labeled as 4502_2, uses spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and uses spectrum 4603 of the third frequency band illustrated in FIG. 46 as the spectrum to be used, after frequency conversion, by signal 103-4 obtained as a result of signal processing that is to be transmitted to communication device #4 labeled as 4502_4.

Furthermore, with the example illustrated in FIG. 50, even when communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4602 of the second frequency band illustrated in FIG. 46 as the spectrum to be used, after frequency conversion, by signal 103-2 obtained as a result of signal processing that is to be transmitted to communication device #2 labeled as 4502_2, uses spectrum 4601 of the first frequency band illustrated in FIG. 46 as the spectrum to be used, after frequency conversion, by signal 103-3 obtained as a result of signal processing that is to be transmitted to communication device #3 labeled as 4502_3, and uses spectrum 4603 of the third frequency band illustrated in FIG. 46 as the spectrum to be used, after frequency conversion, by signal 103-4 obtained as a result of signal processing that is to be transmitted to communication device #4 labeled as 4502_4.

Note that communication device #1 labeled as 4502_1, communication device #2 labeled as 4502_2, communication device #3 labeled as 4502_3, and communication device #4 labeled as 4502_4 have, for example, the configuration illustrated in FIG. 4, receive a desired signal, and obtain desired data by causing the reception part in FIG. 4 to operate.

In the present embodiment, when the modulation method and the error correction coding method for generating "data symbol group destined for communication device #1 labeled as 4502_1 or part of a data symbol group destined for communication device #1 labeled as 4502_1" 5101_1, the modulation method and the error correction coding method for generating "data symbol group destined for communication device #2 labeled as 4502_2 or part of a data symbol group destined for communication device #2 labeled as 4502_2" 5101-2, the modulation method and the error correction coding method for generating "data symbol group destined for communication device #3 labeled as 4502_3 or part of a data symbol group destined for communication device #3 labeled as 4502_3" 5101_3, and the modulation method and the error correction coding method for generating "data symbol group destined for communication device #4 labeled as 4502_4 or part of a data symbol group destined for communication device #4 labeled as 4502_4" 5101_4 in FIG. 51 are the same modulation method and error correction coding method, and the frequency band used for each channel is the same, it is possible to achieve the advantageous effect that the time it takes to transmit these data symbol groups can be shortened. Moreover, it is possible to achieve the advantageous effect that these data symbol groups can be transmitted in synchronization (the transmission start time and transmission end time of these data symbol groups can be made to be the same). Note that it is possible to use different modulation methods or error correction coding methods for the data symbol groups.

Moreover, the present embodiment describes a case in which communication device #A labeled as 4501 transmits modulated signals including first data to communication device #1 labeled as 4502_1, communication device #2 labeled as 4502_2, communication device #3 labeled as 4502_3, and communication device #4 labeled as 4502_4, but communication device #A labeled as 4501 may transmit a modulated signal including first data to a single communication device.

Figure 52:
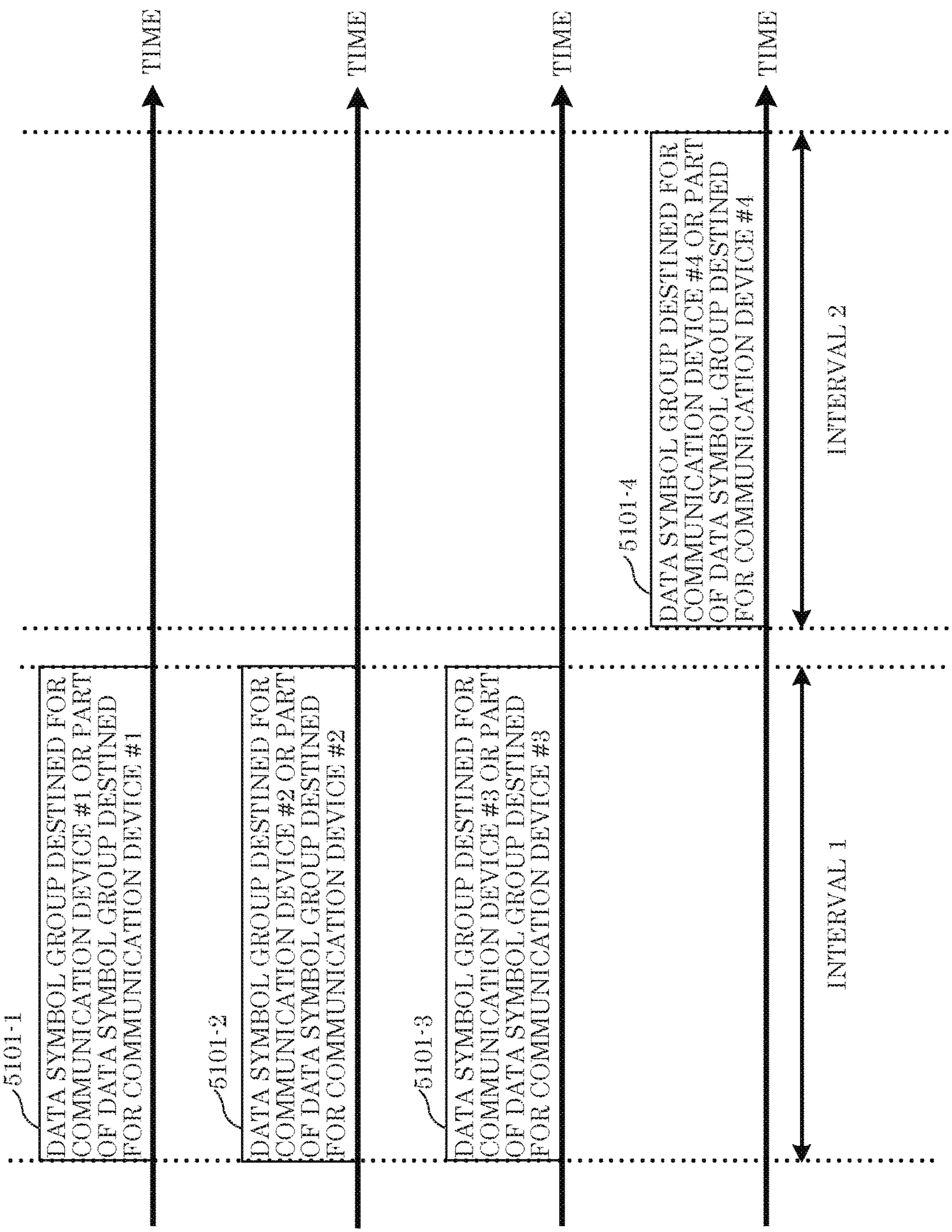
FIG. 52 illustrates another example of a frame configuration of a modulated signal transmitted by a communication device.

For example, time sharing may be used, like in FIG. 52. Note that in FIG. 52, elements that are the same as those in FIG. 51 have the same reference signs, and time is represented on the horizontal axis. As illustrated in FIG. 52, 5101-1 indicating a data symbol group destined for communication device #1 or part of a data symbol group destined for communication device #1, 5101-2 indicating a data symbol group destined for communication device #2 or part of a data symbol group destined for communication device #2, and 5101-3 indicating a data symbol group destined for communication device #3 or part of a data symbol group destined for communication device #3 are transmitted by communication device #A labeled as 4501 using interval 1, and 5101-4 indicating a data symbol group destined for communication device #4 or part of a data symbol group destined for communication device #4 is transmitted by communication device #A labeled as 4501 using interval 2.

When, for example, communication device #A labeled as 4501, communication device #1 labeled as 4502_1, communication device #2 labeled as 4502_2, communication device #3 labeled as 4502_3, and communication device #4 labeled as 4502_4 have a positional relationship like that illustrated in FIG. 49, upon communication device #A labeled as 4501 transmitting a data symbol to communication device #4 labeled as 4502_4, the data symbol is transmitted using interval 2 like illustrated in FIG. 52, and upon communication device #A labeled as 4501 transmitting a data symbol to communication device #1 labeled as 4502_1, communication device #2 labeled as 4502_2, and communication device #3 labeled as 4502_3, the data symbol is transmitted using interval 1 like illustrated in FIG. 52. Note that the method of using a frequency band upon transmitting the data symbol group or part of the data symbol group for communication device #1 labeled as 4502_1, the data symbol group or part of the data symbol group for communication device #2 labeled as 4502_2, and the data symbol group or part of the data symbol group for communication device #3 labeled as 4502_3 may be the same as performed in the description made with reference to FIG. 49.

In this way, it is possible to achieve the above-described advantageous effect even when data symbols are transmitted using time sharing.

Note that in the present embodiment, a device is referred to as "server" (4506_4), but even if this device is a communication device rather than a server, the present embodiment can still be carried out in the same manner.

Moreover, the wireless communication between communication device #A labeled as 4501 and communication device #1 labeled as 4502_1, the wireless communication between communication device #A labeled as 4501 and communication device #2 labeled as 4502_2, the wireless communication between communication device #A labeled as 4501 and communication device #3 labeled as 4502_3, and the wireless communication between communication device #A labeled as 4501 communication device #4 labeled as 4502_4 described in the present embodiment may be carried out via MIMO transmission like described in other embodiments, that is to say, a plurality of transmit antennas and a plurality of receive antennas (a single receive antenna is acceptable) may be provided and the transmitting device may transmit a plurality of modulated signals from a plurality of antennas at the same frequency and at the same time. Moreover, the wireless communication may be carried out using a method by which a single modulated signal is transmitted. Note that an example of a configuration of the transmitting device and receiving device in such cases is as described in other embodiments.

Embodiment 9

In the present embodiment, a specific example of communication between communication device #A labeled as 4501 and communication device #4 labeled as 4502_4 illustrated in FIG. 45 described in Embodiment 8 will be given.

As illustrated in FIG. 45, communication device #4 labeled as 4502_4 can communicate over a wired connection to a network.

For example, assume the maximum data transmission speed when communication device #A labeled as 4501 transfers data to communication device #4 labeled as 4502_4 via wireless communication is faster than the maximum data transmission speed via communication over the wired connection of communication device #4 labeled as 4502_4 (however, the present embodiment can be partially carried out even when this condition is not satisfied).

Figure 53:
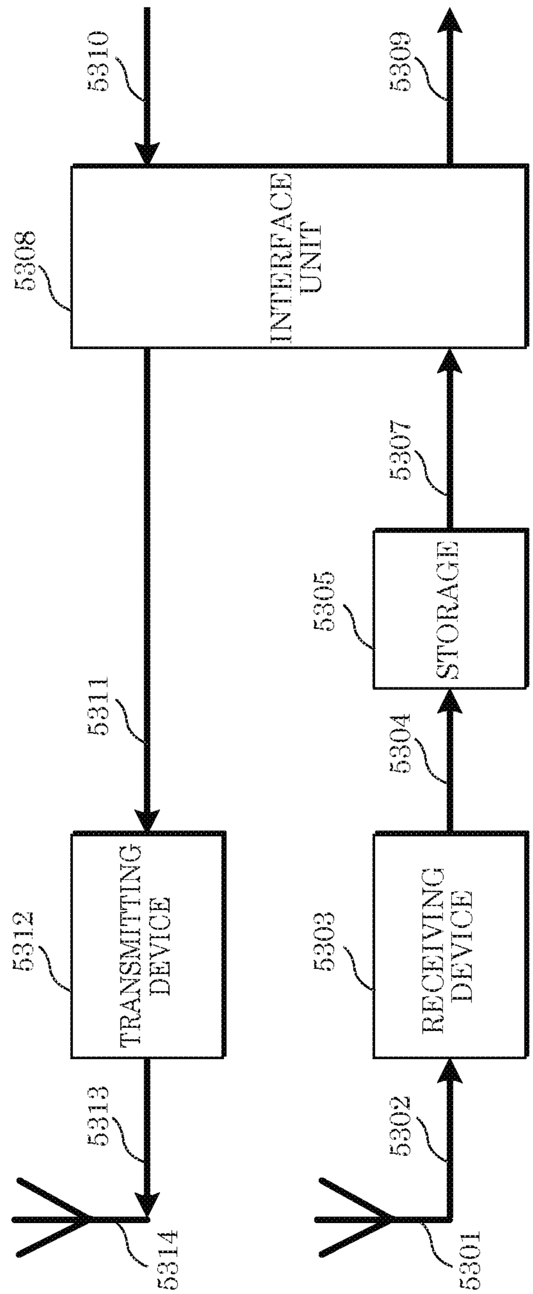
FIG. 53 illustrates an example of a configuration of a communication device.

An example of a configuration of communication device #4 labeled as 4502_4 in this case is illustrated in FIG. 53. In FIG. 53, receiving device 5303 receives an input of received signal 5302 received by antenna 5301, performs processing such as demodulation and error correction decoding, and outputs reception data 5304. For example, in the case of FIG. 45, receiving device 5303 receives modulated signal including data transmitted by communication device #A labeled as 4501, performs processing such as demodulation, and obtains reception data 5304.

Note that in FIG. 53, antenna 5301 is exemplified as including a single antenna, but the device may include a plurality of reception antennas and may receive and demodulate a plurality of modulated signals.

Storage 5305 receives an input of reception data 5304 and temporarily stores the reception data. This is because the maximum data transmission speed when communication device #A labeled as 4501 transfers data to communication device #4 labeled as 4502_4 via wireless communication is faster than the maximum data transmission speed via communication over the wired connection of communication device #4 labeled as 4502_4, so if storage 5305 is not included, there is a possibility that part of reception data 5304 will be lost.

Interface 5308 receives an input of data 5307 output from the storage, and this becomes data 5309 for wired communication after passing through interface 5308.

Data 5310 for wired communication generates data 5311 via interface 5308, and transmitting device 5312 receives an input of data 5311, performs processing such as error correction coding, mapping, and frequency conversion, and generates and outputs transmission signal 5313. Transmission signal 5313 is output from antenna 5314 as radio waves, whereby data is transmitted to a communication partner.

Figure 54:
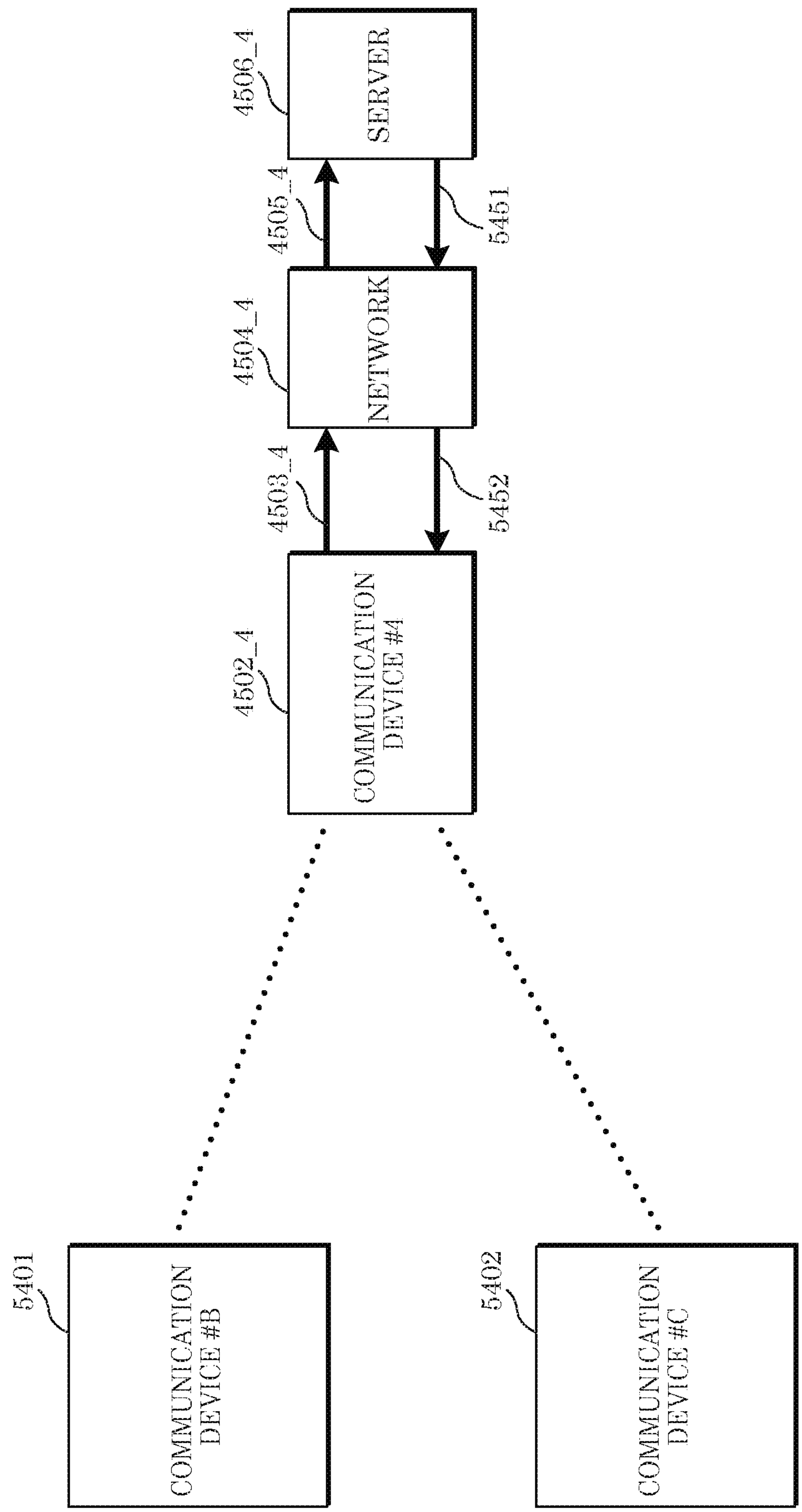
FIG. 54 illustrates one example of communication between communication devices.

Next, FIG. 54 will be described. As described in Embodiment 8 with reference to FIG. 45, communication device #4 labeled as 4502_4 obtains data from communication device #A 4501. In addition, communication device #4 labeled as 4502_4, like a base station or access point, performs communication with a terminal other than communication device #A 4501 and provides information to, for example, a server, via a network, or, alternatively, receives information from a server and provides information to a terminal other than communication device #A 4501. FIG. 54 illustrates a state in which communication device #4 labeled as 4502_4 is communicating with terminals other than communication device #A 4501, i.e., communication device #B labeled as 5401 and communication device #C labeled as 5402.

As illustrated in FIG. 54, for example, communication device #B labeled as 5401 transmits a modulated signal, and communication device #4 labeled as 4502_4 receives the modulated signal. Communication device #4 labeled as 4502_4 then demodulates the modulated signal and obtains and outputs reception data 4503_4. Moreover, reception data 4503_4 is transmitted to, for example, server 4506_4 via network 4504_4.

As illustrated in FIG. 54, data 5451 output by server 4506_4 is input into communication device #4 labeled as 4502_4 via network 4504_4, and communication device #4 labeled as 4502_4 performs processing such as error correction coding and modulation to generate a modulated signal, and transmits the modulated signal to communication device #B labeled as 5401.

Similarly, for example, communication device #C labeled as 5402 transmits a modulated signal, and communication device #4 labeled as 4502_4 receives the modulated signal. Communication device #4 labeled as 4502_4 then demodulates the modulated signal and obtains and outputs reception data 4503_4. Moreover, reception data 4503_4 is transmitted to, for example, server 4506_4 via network 4504_4.

As illustrated in FIG. 54, data 5451 output by server 4506_4 is input into communication device #4 labeled as 4502_4 via network 4504_4, and communication device #4 labeled as 4502_4 performs processing such as error correction coding and modulation to generate a modulated signal, and transmits the modulated signal to communication device #C labeled as 5402.

Figure 55:
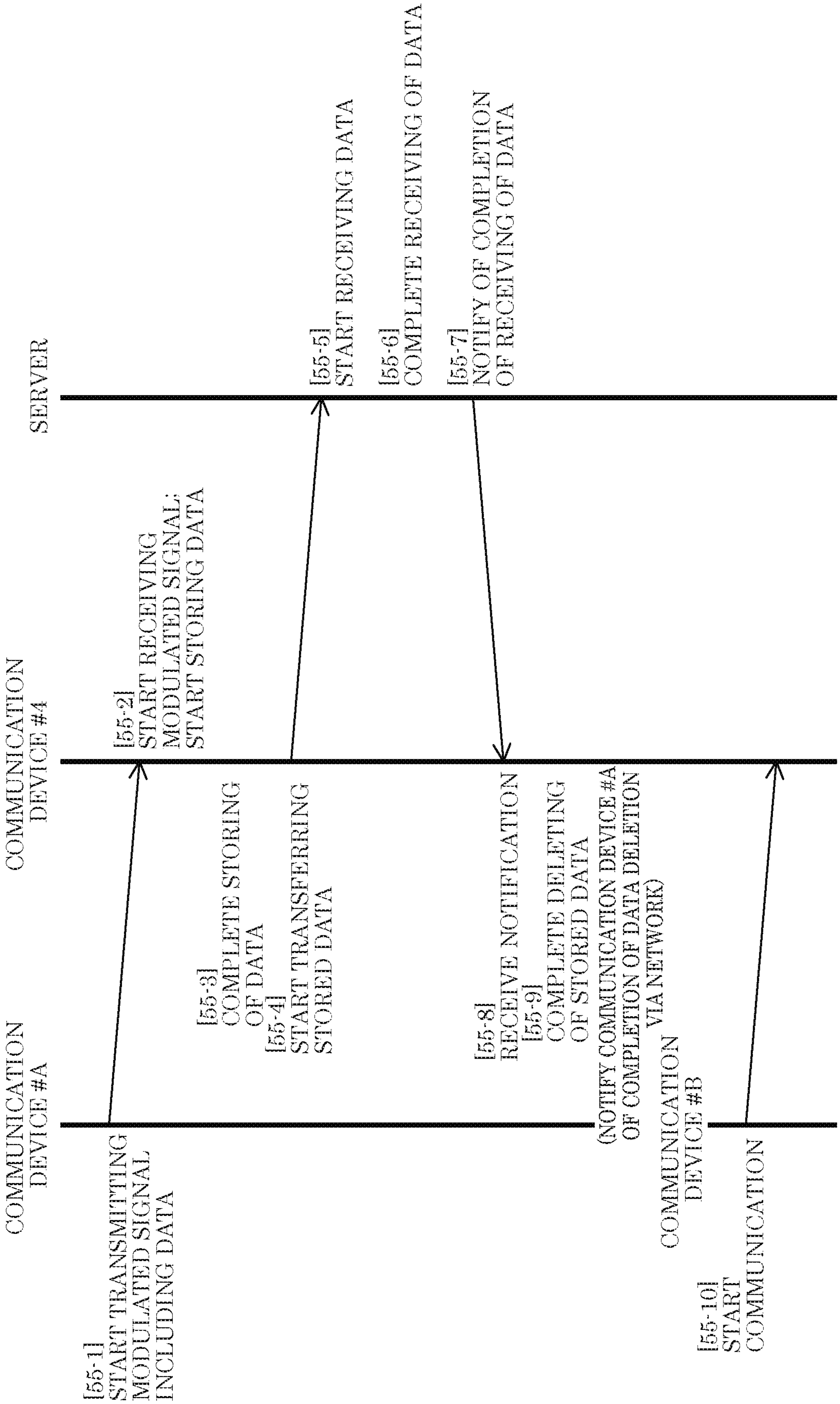
FIG. 55 illustrates one example of a procedure for communication performed by each communication device.

FIG. 55 illustrates an example of communication between (i) communication device #4 labeled as 4502_4 and (ii) communication device #A labeled as 4501 and communication device #B labeled as 5401.

First, as indicated by [55-1], communication device #A labeled as 4501 starts transmitting a modulated signal including data to communication device #4 labeled as 4502_4.

As indicated by [55-2], communication device #4 labeled as 4502_4 starts receiving the modulated signal transmitted by communication device #A labeled as 4501. Storage 5305 included in communication device #4 labeled as 4502_4 then starts storing the data obtained as a result of the reception.

As indicated by [55-3], communication device #4 labeled as 4502_4 completes communication with communication device #A labeled as 4501 and completes the storing of the data.

As indicated by [55-4], communication device #4 labeled as 4502_4 starts transferring the data obtained from communication device #A labeled as 4501 and held in storage 5305 to server 4506_4.

Note that the transferring of data may be started before the completion of the storing of the data in [55-3].

As indicated by [55-5], server 4506_4 starts receiving the data transferred by communication device #4 labeled as 4502_4 (that was obtained from communication device #A labeled as 4501).

As indicated by [55-6], server 4506_4 completes receiving the data transferred by communication device #4 labeled as 4502_4 (that was obtained from communication device #A labeled as 4501).

As indicated by [55-7], server 4506_4 notifies communication device #4 labeled as 4502_4 of the completion of reception of the data transferred by communication device #4 labeled as 4502_4 (that was obtained from communication device #A labeled as 4501).

[55-8] Communication device #4 labeled as 4502_4 receives the notification from server 4506_4 of the completion of the reception of the data.

[55-9] Communication device #4 labeled as 4502_4 deletes the data obtained from communication device #A labeled as 4501 and held in storage 5305.

Note that communication device #A may be notified of the deletion of this data.

[55-10] Communication device #B labeled as 5401 starts communicating with communication device #A labeled as 4501.

In FIG. 55, the function whereby communication device #4 labeled as 4502_4 deletes the data obtained from communication device #A labeled as 4501 and held in storage 5305 is important. This makes it possible to achieve the advantageous effect that the probability that the data from communication device #A labeled as 4501 will be stolen by another communication device can be reduced.

Figure 56:
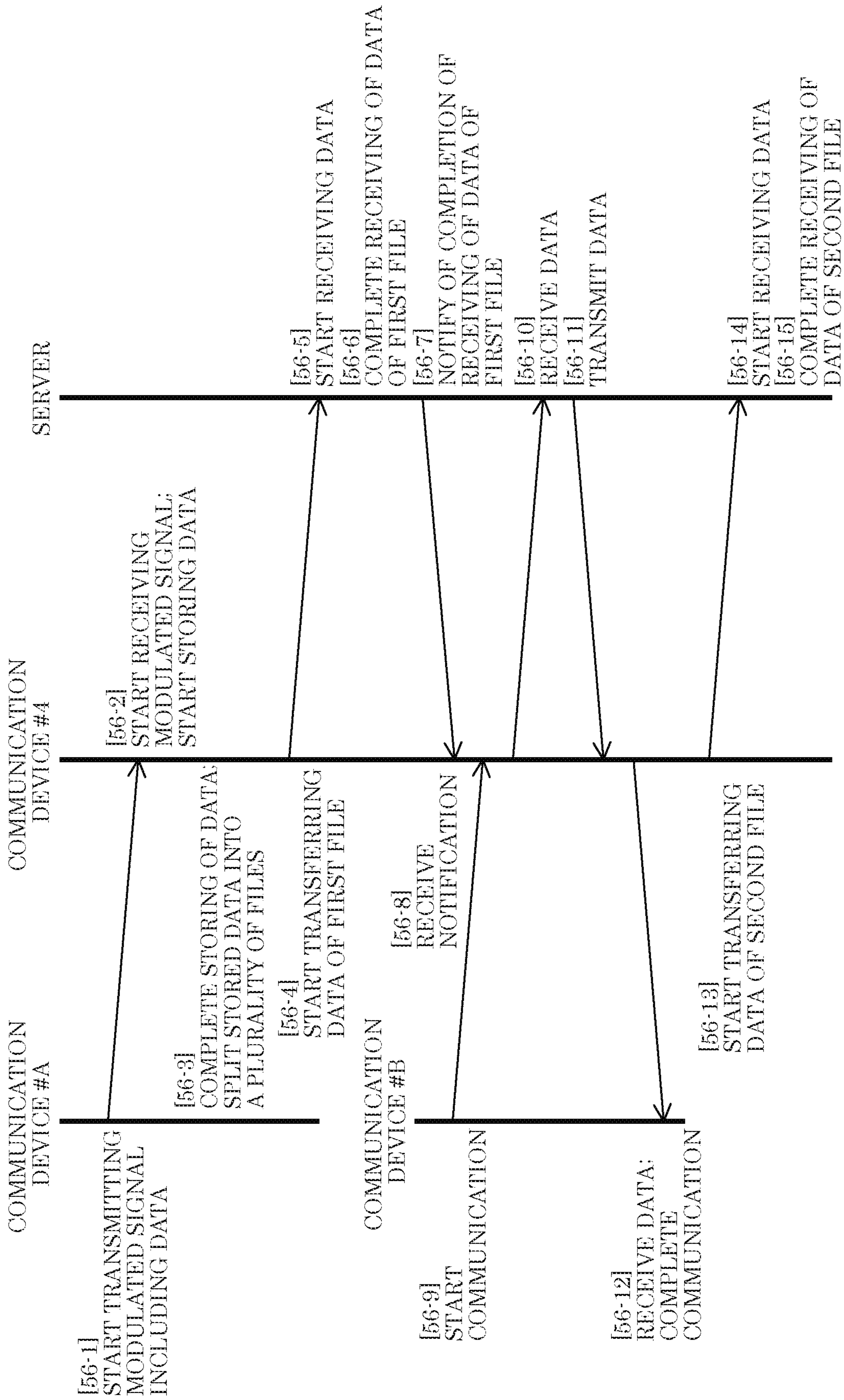
FIG. 56 illustrates another example of a procedure for communication performed by each communication device.

FIG. 56 illustrates an example of communication between (i) communication device #4 labeled as 4502_4 and (ii) communication device #A labeled as 4501 and communication device #B labeled as 5401 that differs from the example given in FIG. 55.

First, as indicated by [56-1], communication device #A labeled as 4501 starts transmitting a modulated signal including data to communication device #4 labeled as 4502_4.

As indicated by [56-2], communication device #4 labeled as 4502_4 starts receiving the modulated signal transmitted by communication device #A labeled as 4501. Storage 5305 included in communication device #4 labeled as 4502_4 then starts storing the data obtained as a result of the reception.

As indicated by [56-3], the communication device labeled as 4502_4 completes communication with communication device #A labeled as 4501 and completes the storing of the data. The stored data is split into a plurality of files. In this example, N files are created. N is an integer that is greater than or equal to 1 or an integer that is greater than or equal to 2 (hereinafter, these files will be named first file, second file, . . . , and N-th file).

As indicated by [56-4], communication device #4 labeled as 4502_4 starts transferring, from among the data obtained from communication device #A labeled as 4501 and held in storage 5305, the data of a first file, to 4506_4.

Note that the transferring of data may be started before the completion of the storing of the data in [56-3].

As indicated by [56-5], server 4506_4 starts receiving the data of the first file from among the data transferred by communication device #4 labeled as 4502_4 (that was obtained from communication device #A labeled as 4501).

As indicated by [56-6], server 4506_4 starts receiving the data of the first file transferred by communication device #4 labeled as 4502_4.

As indicated by [56-7], server 4506_4 notifies communication device #4 labeled as 4502_4 of the completion of the reception of the data of the first file transferred by communication device #4 labeled as 4502_4.

[56-8] Communication device #4 labeled as 4502_4 receives the notification from server 4506_4 of the completion of the reception of the data of the first file.

[56-9] Communication device #B labeled as 5401 starts communicating with communication device #A labeled as 4501.

[56-10] Server 4506_4 receives the data transmitted by communication device #B labeled as 5401, via communication device #4 labeled as 4502_4.

[56-11] In response to this, for example, server 4506_4 transmits the data.

As indicated by [56-12], communication device #B labeled as 5401 receives the data transmitted by server 4506_4, via communication device #4 labeled as 4502_4.

As indicated by [56-13], communication device #4 labeled as 4502_4 starts transferring, from among the data obtained from communication device #A labeled as 4501 and held in storage 5305, the data of a second file, to 4506_4.

As indicated by [56-14], server 4506_4 starts receiving the data of the second file from among the data transmitted by communication device #4 labeled as 4502_4 (that was obtained from communication device #A labeled as 4501).

As indicated by [56-15], server 4506_4 completes the reception of the data of the second file transferred by communication device #4 labeled as 4502_4.

In FIG. 56, the function whereby communication device #4 labeled as 4502_4 deletes the data obtained from communication device #A labeled as 4501 and held in storage 5305 is important. This makes it possible to achieve the advantageous effect that the probability that the data from communication device #A labeled as 4501 will be stolen by another communication device can be reduced (i.e., can ensure security).

With respect to the above, the following two methods are applicable.

First Method:

In [56-8] in FIG. 56, communication device #4 labeled as 4502_4 that received the notification transmitted by the server of the completion of reception of the data of the first file deletes the data of the first file at this point in time (accordingly, communication device #4 labeled as 4502_4 receives the notification transmitted by the server of the completion of reception of data of the X-th file, and deletes the data of the X-th file (note there here, X is an integer that is greater than or equal to 1 and less than or equal to N)).

As an example of a variation of the first method, communication device #4 labeled as 4502_4 may delete the data of the X-th file along with the completion of the transmission of the data of the X-th file to the server.

Second Method:

Communication device #4 labeled as 4502_4 completes transmission of the data of the first file through the N-th file, receives notification that reception of the data of all files is complete from the server, and thereafter deletes the data of the first file through the N-th file.

As an example of a variation of the second method, communication device #4 labeled as 4502_4 may delete the data of the first file through the N-th file along with the completion of the transmission of the data of the first file through the N-th file to the server.

As described above, when the maximum data transmission speed when a first communication device transfers data to a second communication device via wireless communication is faster than the maximum data transmission speed via communication over the wired connection of the second communication device, the second communication device that received the data transmitted by the first communication device stores the data in a storage, and after the second communication device transmits the stored data to another communication device, the second communication device deletes the stored data, which achieves the advantageous effect that data security can be ensured.

Next, the maximum data transmission speed when a first communication device transfers data to a second communication device via wireless communication being faster than the maximum data transmission speed via communication over the wired connection of the second communication device will be described.

For example, assume the first communication device uses frequency band A [Hz] when transferring data to the second communication device via wireless communication. Here, for example, the transmission speed when one stream is transmitted using BPSK without using error correction code is approximately A [bits per second (bps)], the transmission speed when one stream is transmitted using QPSK without using error correction code is approximately 2×A [bits per second (bps)], the transmission speed when one stream is transmitted using 16QAM without using error correction code is approximately 4×A [bits per second (bps)], and the transmission speed when one stream is transmitted using 64QAM without using error correction code is approximately 6×A [bits per second (bps)]. Furthermore, the transmission speed when two streams are transmitted (for example, via MIMO transmission) using BPSK is approximately 2×A [bits per second (bps)], the transmission speed when two streams are transmitted using QPSK is approximately 4×A [bits per second (bps)], the transmission speed when two streams are transmitted using 16QAM without using error correction code is approximately 8×A [bits per second (bps)], and the transmission speed when two streams are transmitted using 64QAM without using error correction code is approximately 12×A [bits per second (bps)].

Here, the maximum data transmission speed via communication over the wired connection of the second communication device is B [bps].

Here, when A≥B, with the majority of configurations of communication parameters, the condition "the maximum data transmission speed when a first communication device transfers data to a second communication device via wireless communication is faster than the maximum data transmission speed via communication over the wired connection of the second communication device" is satisfied, (however, even if this condition is not satisfied, the present embodiment can be partially carried out).

Accordingly, even when A≥B is satisfied, the second communication device that received the data transmitted by the first communication device stores the data in a storage, and the second communication device deletes the stored data after the second communication device transmits the stored data to another communication device, the advantageous effect that data security can be ensured can be achieved.

Note that in the present embodiment, a device is referred to as "server" (4506_4), but even if this device is a communication device rather than a server, the present embodiment can still be carried out in the same manner.

Moreover, network 4504_4 may be a network based on wireless communication. In such cases, the maximum data transmission speed when a first communication device transfers data to a second communication device via first wireless communication being faster than the maximum data transmission speed via second wireless communication, which is different from the first wireless communication, of the second communication device is important. Furthermore, when the maximum data transmission speed via the second wireless communication of the second communication device is expressed as B [bps], satisfying the condition A≥B is important (however, even if this condition is not satisfied, the present embodiment can be partially carried out).

Moreover, the wireless communication between communication device #A labeled as 4501 and communication device #1 labeled as 4502_1, the wireless communication between communication device #A labeled as 4501 and communication device #2 labeled as 4502_2, the wireless communication between communication device #A labeled as 4501 and communication device #3 labeled as 4502_3, the wireless communication between communication device #A labeled as 4501 communication device #4 labeled as 4502_4, the wireless communication between communication device #B labeled as 5401 and communication device #4 labeled as 4502_4, and the communication between communication device #C labeled as 5402 and communication device #4 labeled as 4502_4 described in the present embodiment may be carried out via MIMO transmission like described in other embodiments, that is to say, a plurality of transmit antennas and a plurality of receive antennas (a single receive antenna is acceptable) may be provided and the transmitting device may transmit a plurality of modulated signals from a plurality of antennas at the same frequency and at the same time. Moreover, the wireless communication may be carried out using a method by which a single modulated signal is transmitted. Note that an example of a configuration of the transmitting device and receiving device in such cases is as described in other embodiments.

Embodiment 10

In the present embodiment, a variation of Embodiment 9 will be described.

Figure 57:
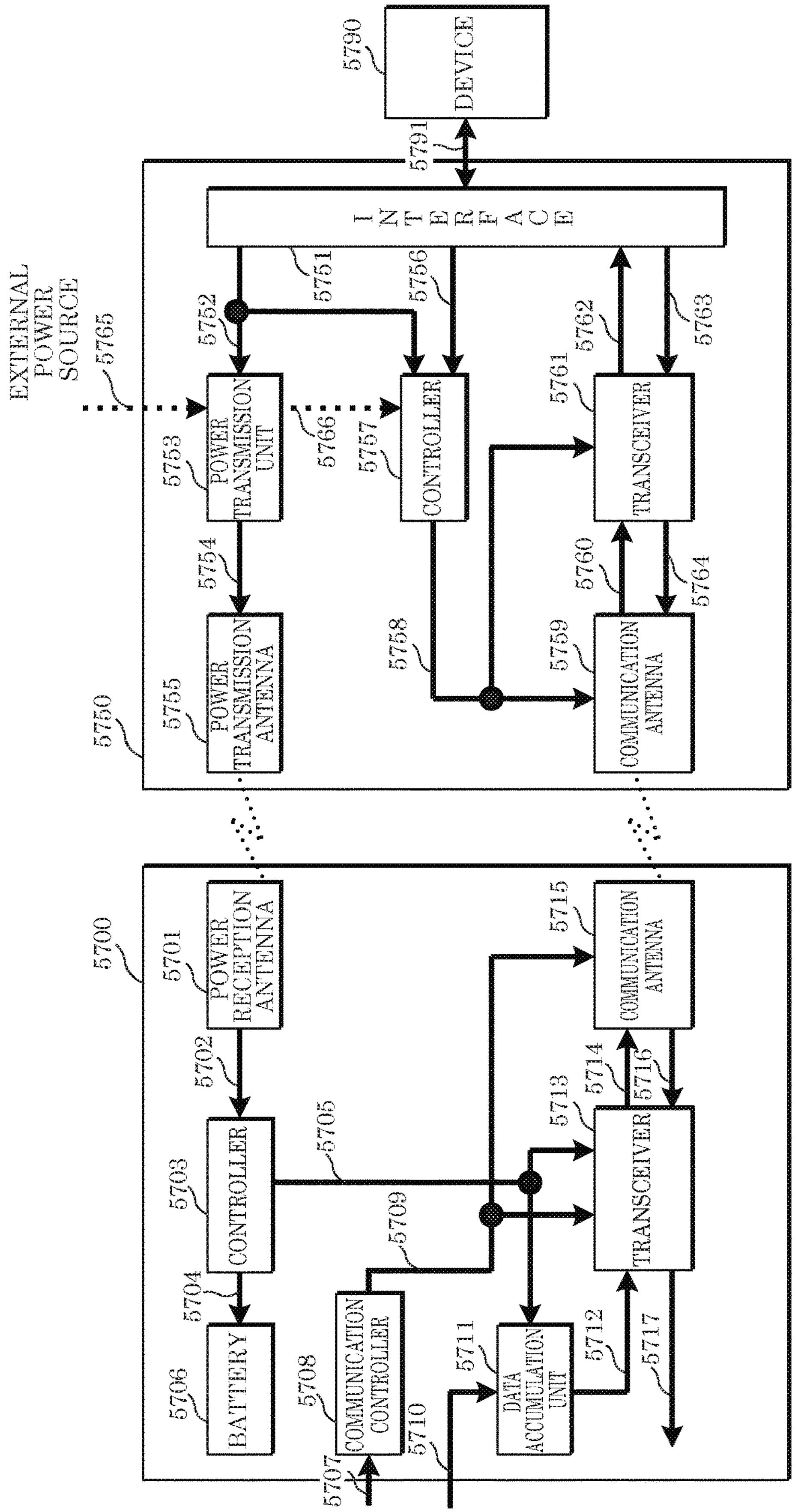
FIG. 57 illustrates an example of a configuration of a communication device and a power transmission device.
Figure 58:
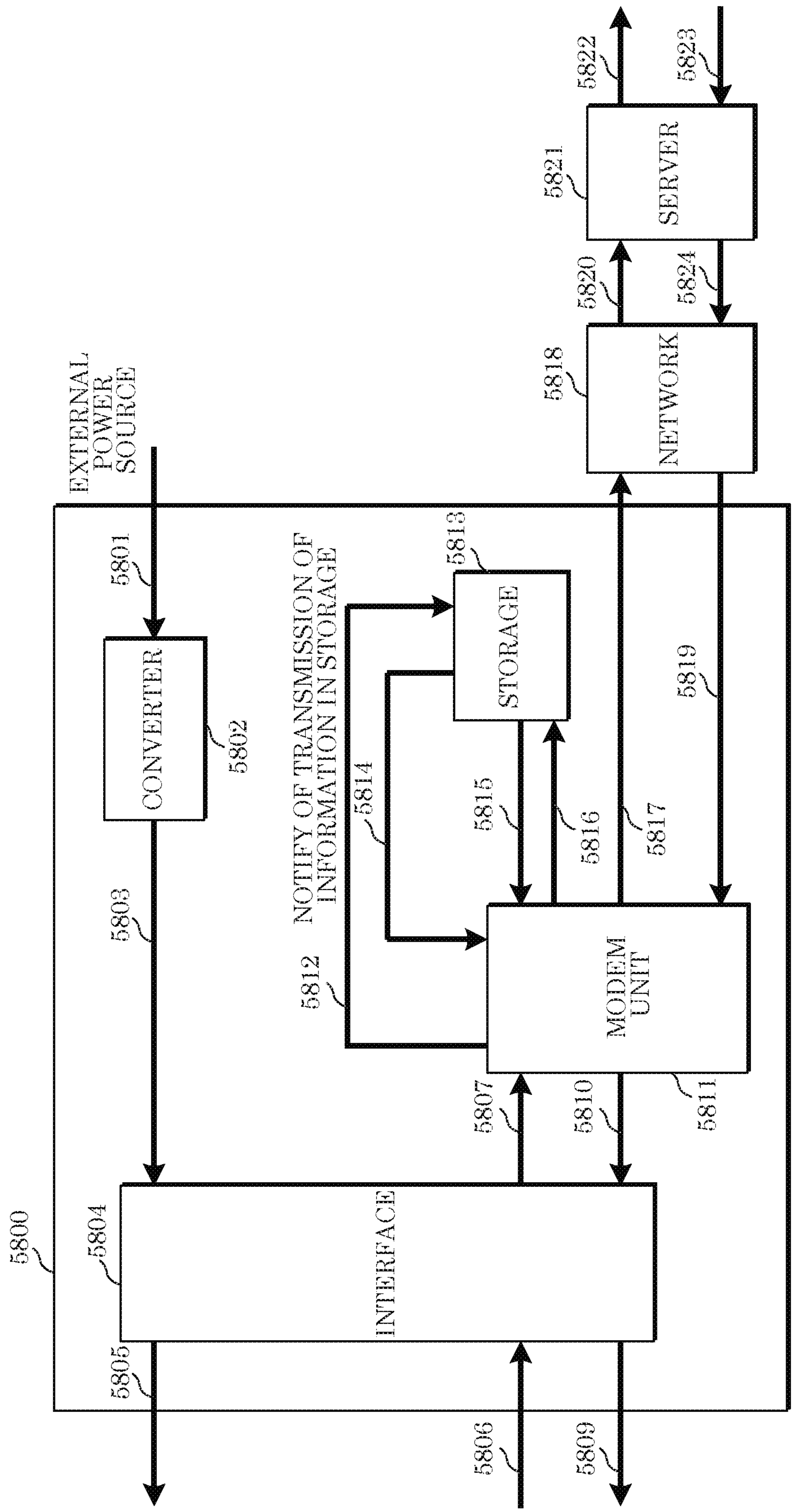
FIG. 58 illustrates an example of a configuration of a device.

In FIG. 57, 5700 indicates a communication device, 5750 indicates a power transmission device, and 5790 indicates a device. In FIG. 58, 5800 indicates the device labeled as 5790 in FIG. 57, and 5821 indicates a server.

In this example, communication device 5700 and power transmission device 5750 illustrated in FIG. 57 communicate wirelessly, for example.

Moreover, power transmission device 5750 illustrated in FIG. 57 transmits power, communication device 5700 receives power and charges a battery.

Power transmission device 5750 illustrated in FIG. 57 and device 5790 communicate with one another (for example, over a wired connection; however, note that the communication may be wireless).

Moreover, as illustrated in FIG. 58, device 5800 (in other words, device 5790 in FIG. 57) communicates with server 5821 via network 5817.

In this example, the maximum data transmission speed when communication device 5700 transfers data to power transmission device 5750 via wireless communication is faster than the maximum data transmission speed via communication over the wired connection (or via the wireless communication) of device 5800 (in other words, device 5790 in FIG. 57) (however, even if this condition is not satisfied, the present embodiment can be partially carried out).

Stated differently, when the frequency band used when communication device 5700 transfers data to power transmission device 5750 via wireless communication is expressed as A [Hz] and the maximum transmission speed via communication over the wired connection (or via the wireless communication) of device 5800 (in other words, device 5790 in FIG. 57) is expressed as B [bps], A≥B is satisfied (however, even if this condition is not satisfied, the present embodiment can be partially carried out).

Next, the detailed operation example in FIG. 57 will be described. Power transmission unit 5753 included in power transmission device 5750 receives input(s) of a supply of power 5752 from interface 5751 and/or a supply of power 5765 from external power source, outputs power transmission signal 5754, and power transmission signal 5754 is transmitted wirelessly from power transmission antenna 5755.

Controller 5703 included in communication device 5700 receives an input of received signal 5702 received by power reception antenna 5701.

In the description above, the terminology "power transmission antenna" 5755 is written, but this may be referred to as a power transmission coil. Moreover, the terminology "power reception antenna" 5701 is used, but this may be referred to as a power reception coil.

Controller 5757 outputs power supply signal 5704 and control signal 5705. Battery 5706 is charged in response to input of power supply signal 5704.

Based on the voltage and/or current, for example, controller 5757 knows whether power is currently being received, and outputs control signal 5705 including information on whether power is currently being received or not. Note that the element related to power reception may include a communication function, controller 5757 may know whether power is currently being received or not via communication, and may output control signal 5705 including information on whether power is currently being received or not. Moreover, control signal 5705 may include control information other than the above-described information.

Data accumulation unit 5711 receives an input of data 5710, and accumulates data. Note that data 5710 may be data generated by communication device 5700.

Data accumulation unit 5711 receives an input of control signal 5705, and based on control signal 5705, outputs data 5712 accumulated in data accumulation unit 5711.

Communication controller 5708 receives an input of control information 5707, and outputs communication control signal 5709.

Transceiver 5713 receives inputs of data 5712, control signal 5705, and communication control signal 5709, and based on control signal 5705 and communication control signal 5709, determines, for example, the transmitting method to be used, generates a modulated signal including data 5712, and outputs transmission signal 5714 from communication antenna 5715 as, for example, radio waves.

Moreover, transceiver 5713 receives an input of received signal 5716 received by communication antenna 5715, performs processing such as demodulation and error correction decoding, and outputs reception data 5717.

Controller 5757 included in power transmission device 5750 receives inputs of a supply of power 5752 and information 5756 from device 5790, and outputs communication control signal 5758.

Communication antenna 5759 receives the transmission signal transmitted by the communication partner (communication device 5700). Transceiver 5761 receives inputs of received signal 5760 received by communication antenna 5759, and communication control signal 5758, performs processing such as demodulation and error correction decoding, and outputs reception data 5762.

Moreover, transceiver 5761 receives inputs of data 5763 and communication control signal 5758, and based on communication control signal 5758, determines, for example, the modulation method and transmitting method to be used, generates a modulated signal, and outputs transmission signal 5764. Transmission signal 5764 is output from communication antenna 5759 as radio waves.

Signal 5791 is input into and output from power transmission device 5750. Signal 5791 is also input into and output from device 5790.

Signal 5791 includes supply of power 5752, information 5756, reception 5762, and data 5763. Interface 5751 is an interface for (i) signal 5791 and (ii) supply of power 5752, information 5756, reception 5762, and data 5763.

FIG. 58 illustrates a configuration of device 5790 illustrated in FIG. 57 (device 5800), and network 5818 and server 5821 which are connected to device 5800.

Converter 5802 receives an input of, for example, a supply of alternating current (AC) power 5801 from an external power source, performs AC to direct current (DC) conversion, and outputs a supply of DC power 5803. The supply of DC power 5803 becomes 5805 after passing through interface 5804.

Storage 5813 outputs notification signal 5814 for notifying that device 5800 includes a storage. Modem unit 5811 receives an input of notification signal 5814, and outputs data (or modulated signal) 5810 including information indicating that device 5800 includes a storage, in order to notify power transmission device 5750 illustrated in FIG. 57 that device 5800 includes a storage. Data (or modulated signal) 5810 becomes 5809 after passing through interface 5804.

Modem unit 5811 receives, via interface 5804, as 5807, an input of data 5806 obtained from power transmission device 5750 illustrated in FIG. 57. Modem unit 5811 determines whether to store the data in storage 5813. When it is determined to store the data in storage 5813, control signal 5812 includes notification information indicating "store the data in the storage". Moreover, modem unit 5811 outputs the obtained data 5807 as 5816.

Storage 5813 then stores data 5816.

Moreover, there are instances in which modem unit 5811 transmits data to server 5821 via network 5818. For example, there are instances in which modem unit 5811 transmits data stored in storage 5813 to server 5821. Modem unit 5811 outputs, to storage 5813, control signal 5812 including information on a notification to transmit data included in storage 5813 to server 5821.

Then, storage 5813 receives the information on the notification to transmit data included in storage 5813 to server 5821 that is included in control signal 5812, and outputs the stored data 5815.

Modem unit 5811 receives an input of the stored data 5815, and outputs data 5816 (or a modulated signal including data) that corresponds to this data. Data (or modulated signal) 5816 (5820) arrives at server 5821 via network 5818. If necessary, server 5821 transmits the data to another device (5822).

Server 5821 receives an input of data 5823 from another device, which arrives at modem unit 5811 via a network. If necessary, modem unit 5811 transmits the data obtained from server 5821 (or a modulated signal including the data) to power transmission device 5750 illustrated in FIG. 57.

Note that "the maximum data transmission speed when communication device 5700 transfers data to power transmission device 5750 via wireless communication" is faster than the maximum data transmission speeds of 5816 and 5819 in FIG. 58 (however, even if this condition is not satisfied, the present embodiment can be partially carried out).

Stated differently, when the frequency band used when communication device 5700 transfers data to power transmission device 5750 via wireless communication is expressed as A [Hz] and the maximum transmission speed of 5816 and 5819 in FIG. 58 is expressed as B [bps], $A \geq B$ is satisfied (however, even if this condition is not satisfied, the present embodiment can be partially carried out).

Moreover, data transfers 5806 and 5809 in FIG. 58 are capable of ensuring sufficient data transmission speeds.

Next, a detailed example of communication between communication device 5700 in FIG. 57, power transmission device 5750 in FIG. 57, device 5790 in FIG. 57 (corresponding to device 5800 in FIG. 58), and server 5821 in FIG. 58 will be given with reference to FIG. 59 and FIG. 60.

Figure 59:
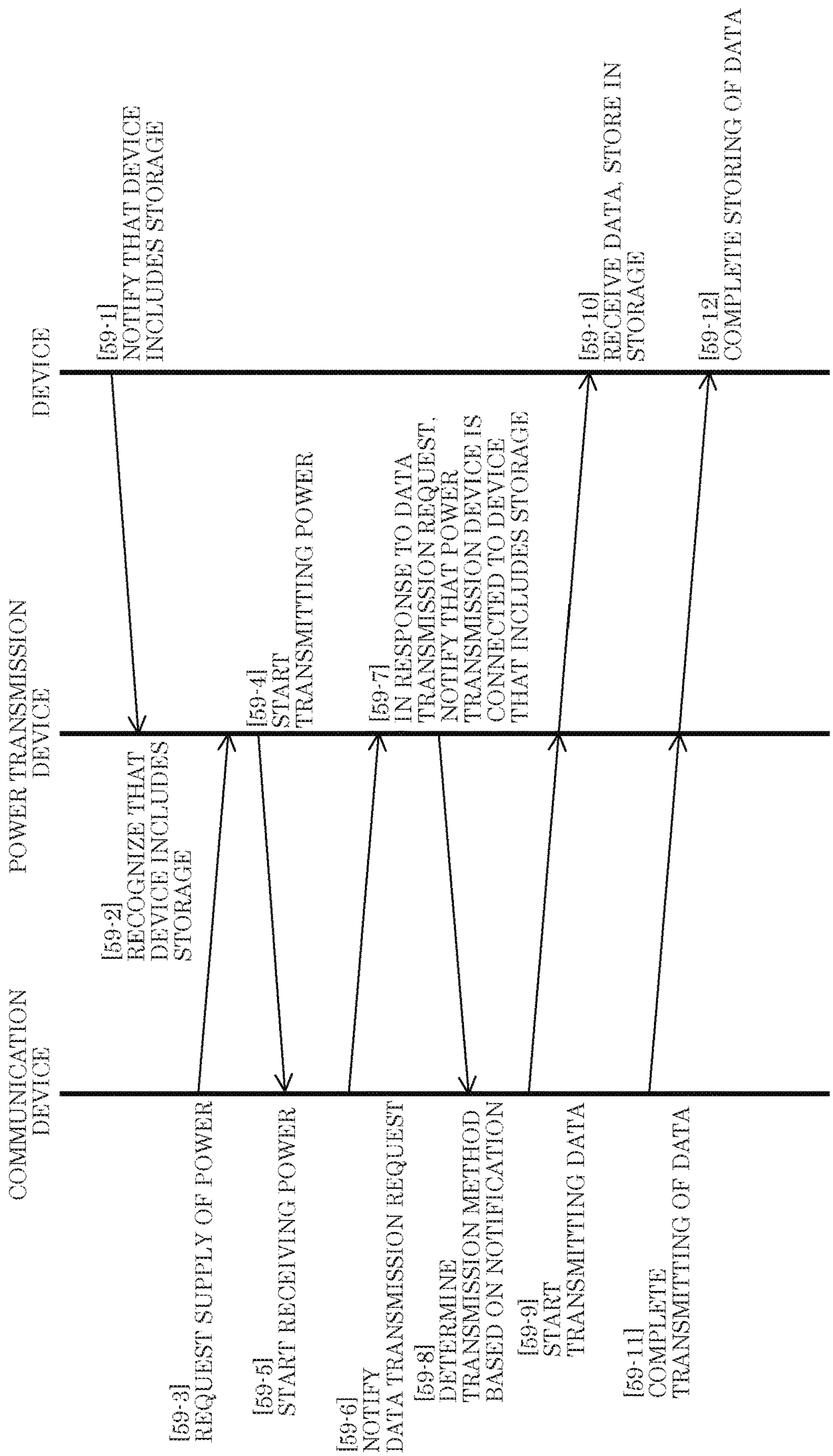
FIG. 59 illustrates one example of a procedure for communication performed by each device.

As illustrated in FIG. 59, [59-1] first, device 5790 in FIG. 57, that is to say, device 5800 in FIG. 58 notifies power transmission device 5750 in FIG. 57 that it includes storage 5813.

[59-2] Power transmission device 5750 receives the notification, and recognizes that device 5790 in FIG. 57, that is to say, device 5800 in FIG. 58 includes storage 5813.

[59-3] Communication device 5700 in FIG. 57 makes a request to power transmission device 5750 in FIG. 57 for a supply of power.

[59-4] Power transmission device 5750 in FIG. 57 receives the request, and starts transmitting power to communication device 5700 in FIG. 57.

[59-5] Accordingly, communication device 5700 in FIG. 57 starts receiving power, that is to say, the battery included in communication device 5700 in FIG. 57 starts charging.

[59-6] In accordance with starting to receive power, communication device 5700 in FIG. 57 notifies power transmission device 5750 in FIG. 57 with a data transmission request.

By the communication device in FIG. 57 requesting power transmission device 5750 to transmit data in accordance with the communication device in FIG. 57 receiving the power, it is possible to achieve the advantageous effect that high data transmission speeds can be achieved. Since it is possible to receive power, this means that the communication distance for the data transmission is extremely short, which in turn means that there is a high probability of a favorable communication environment. Accordingly, the communication device in FIG. 57 can select a modulation method and an error correction coding method that allow of high data transmission speeds when transmitting the modulation method.

[59-7] Power transmission device 5750 in FIG. 57 receives the data transmission request from communication device 5700 in FIG. 57, and notifies the communication device in FIG. 57 that power transmission device 5750 is connected to device 5800 that includes storage 5813.

[59-8] Communication device 5700 in FIG. 57 receives this notification and determines a transmission method (transmitting method) to be used. At this time, a transmission method is selected by communication device 5700 that satisfies the condition "the maximum data transmission speed when communication device 5700 transmits data to power transmission device 5750 via wireless communication is faster than the maximum data transmission speed of 5816 and 5819 in FIG. 58". Stated differently, a transmission method is selected by communication device 5700 that satisfies the condition "when the frequency band used when communication device 5700 transmits data to power transmission device 5750 via wireless communication is expressed as A [Hz] and the maximum transmission speed of 5816 and 5819 in FIG. 58 is expressed as B [bps], A≥B".

As described in Embodiment 9, even when such a selection is made, it is possible to reduce the probability that part of the data will be lost during communication.

[59-9] Communication device 5700 in FIG. 57 starts transmitting the data (wirelessly).

In [59-10] and [59-9], power transmission device 5750 receives the data transmitted by communication device 5700 in FIG. 57, and transmits the data to device 5790 in FIG. 57, that is to say, device 5800 in FIG. 58. Device 5790 in FIG. 57, that is to say, device 5800 in FIG. 58 receives the data and stores the received data in storage 5813 in FIG. 58.

[59-11] Communication device 5700 in FIG. 57 completes the transmitting of the data (wirelessly).

[59-12] In accordance with the completion of the transmitting of data in [59-11], device 5790 in FIG. 57, that is to say, device 5800 in FIG. 58 completes the storing of the received data into storage 5813.

Figure 60:
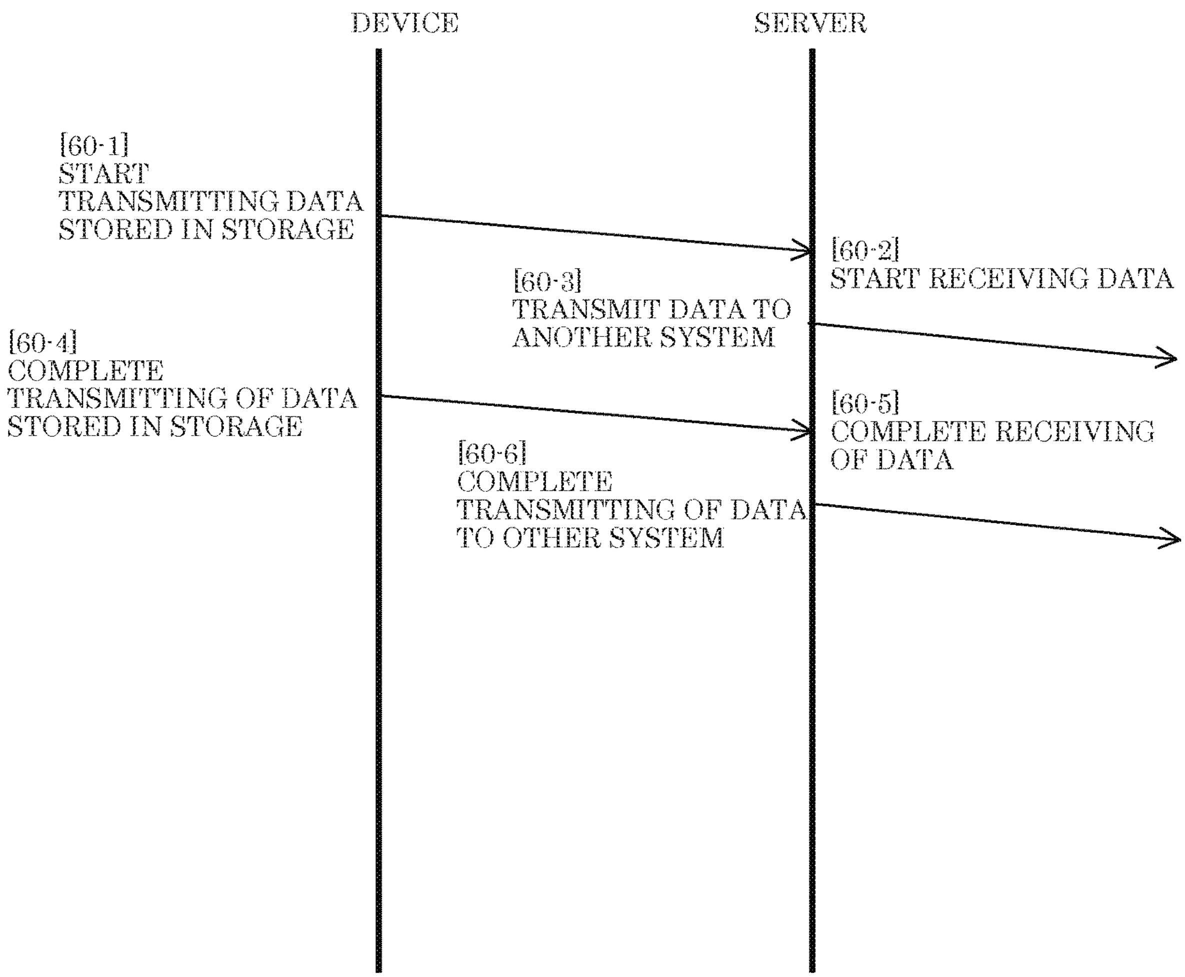
FIG. 60 illustrates one example of a procedure for communication between a device and a server.

In accordance with the completion of the storing in [59-12] in FIG. 59, processing can proceed to the operations in FIG. 60. FIG. 60 illustrates an example of communication between device 5790 in FIG. 57, that is to say, device 5800 in FIG. 58, and server 5821 in FIG. 58.

[60-1] Device 5790 in FIG. 57, that is to say, device 5800 in FIG. 58 starts transmitting data stored in storage 5813 to server 5821 via network 5818.

[60-2] Server 5821 in FIG. 58 starts receiving the data.

[60-3] For example, server 5821 in FIG. 58 transmits the received data to another system.

[60-4] Device 5790 in FIG. 57, that is to say, device 5800 in FIG. 58 completes the transmission of the data stored in storage 5813.

[60-5] Server 5821 in FIG. 58 completes the reception of the data.

[60-6] For example, server 5821 in FIG. 58 completes the transmission of the received data to another system.

As described above, communication device 5700 in FIG. 57 recognizes that the power transmission device labeled as 5750 in FIG. 57, which is the communication partner of communication device 5700 in FIG. 57, is connected to a device that includes a storage, and selects a communication method based on this. As a result, it is possible to achieve the advantageous effect that the probability of loss of data resulting from transmitting data to another system can be reduced.

Note that in the above description, the wireless communication between communication device 5700 and power transmission device 5750 illustrated in FIG. 57 may be carried out via MIMO transmission like described in other embodiments, that is to say, a plurality of transmit antennas and a plurality of receive antennas (a single receive antenna is acceptable) may be provided and the transmitting device may transmit a plurality of modulated signals from a plurality of antennas at the same frequency and at the same time. Moreover, the wireless communication may be carried out using a method by which a single modulated signal is transmitted. Note that an example of a configuration of the transmitting device and receiving device in such cases is as described in other embodiments.

Moreover, communication device 5700 in FIG. 57 may be included in a mobile phone terminal, and an example in which communication device 5700 in FIG. 57 is included in a conveyance such as a car is conceivable. Moreover, an example in which device 5790 is included in a base station, access point, computer, or server, for example, is conceivable.

Next, problems related to communication antenna arrangement in power transmission device 5750 illustrated in FIG. 57 will be described with reference to FIG. 61.

Figure 61:
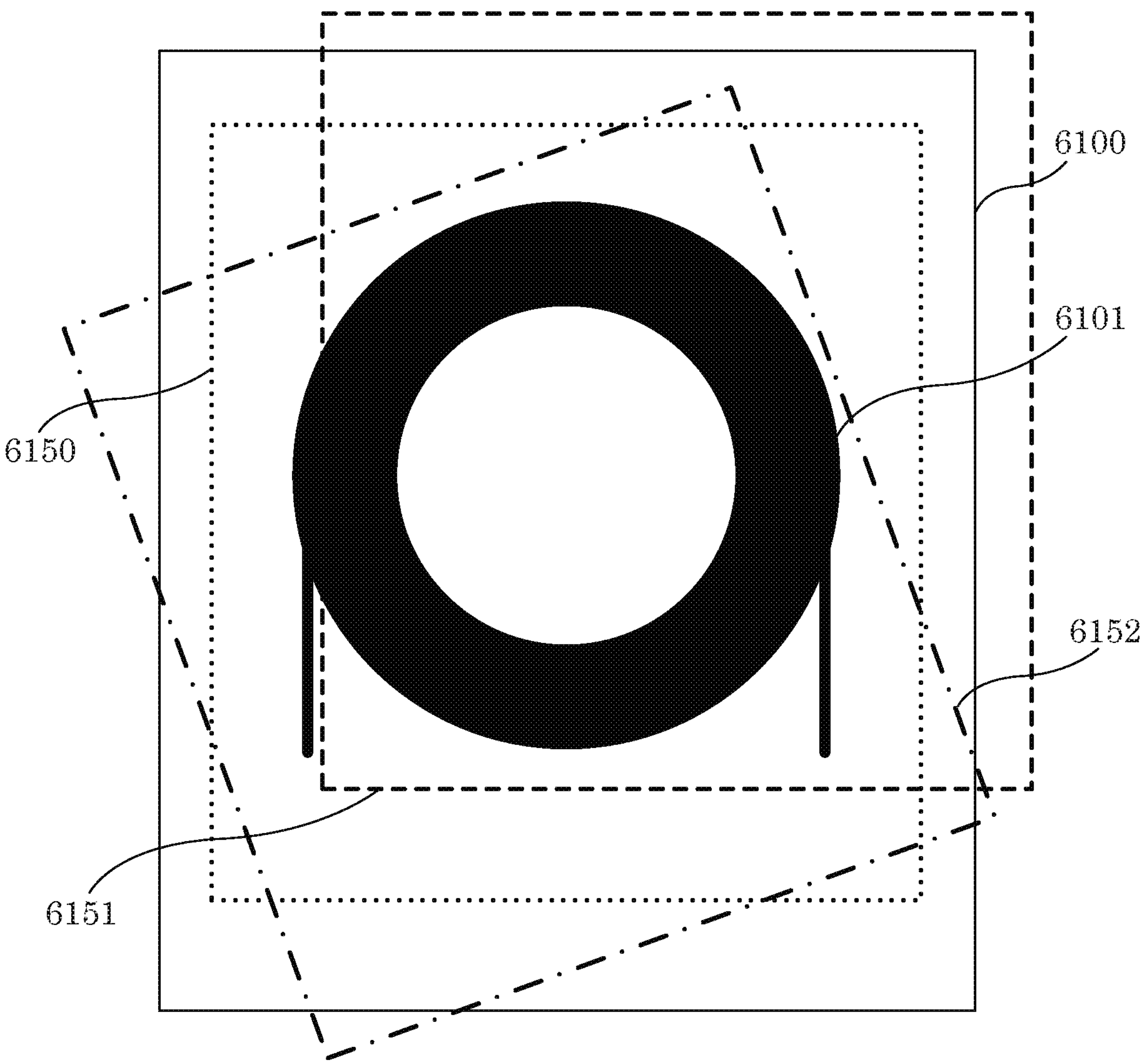
FIG. 61 illustrates a problem related to the arrangement of communication antennas.

In FIG. 61, 6100 indicates the contour of the power transmission device in FIG. 57. 6101 indicates power transmission coil 5755. Note that in FIG. 57, "power transmission coil" is phrased as "power transmission antenna".

In this example, communication device 5700 in FIG. 57 includes a power reception coil as power reception antenna 5701.

6150, 6151, and 6152 indicate the contour of communication device 5700 in FIG. 57. As illustrated in FIG. 61, when the user of communication device 5700 in FIG. 57 causes communication device 5700 to receive power, there are a variety of ways in which the user may arrange communication device 5700, such as the arrangement indicated by 6150, the arrangement indicated by 6151, and the arrangement indicated by 6152.

When wireless communication is performed between communication device 5700 and power transmission device 5750 in such arrangements, there is a desire for a communication method to be selected that achieves fast data transmission speeds and yields high data reception quality, in other words, this desire is a problem to be overcome.

Regarding communication device 5700 that communicates with power transmission device 5750, since communication devices vary from user to user, for example, the arrangement and such of communication antenna 5715 may differ from communication device to communication device. Even under such conditions, when communication device 5700 and power transmission device 5750 wirelessly communicate, there is a desire for a communication method to be selected that achieves fast data transmission speeds and yields high data reception quality, in other words, this desire is a problem to be overcome.

The present embodiment will describe a configuration of power transmission device 5750 illustrated in FIG. 57 for overcoming this problem.

Figure 62:
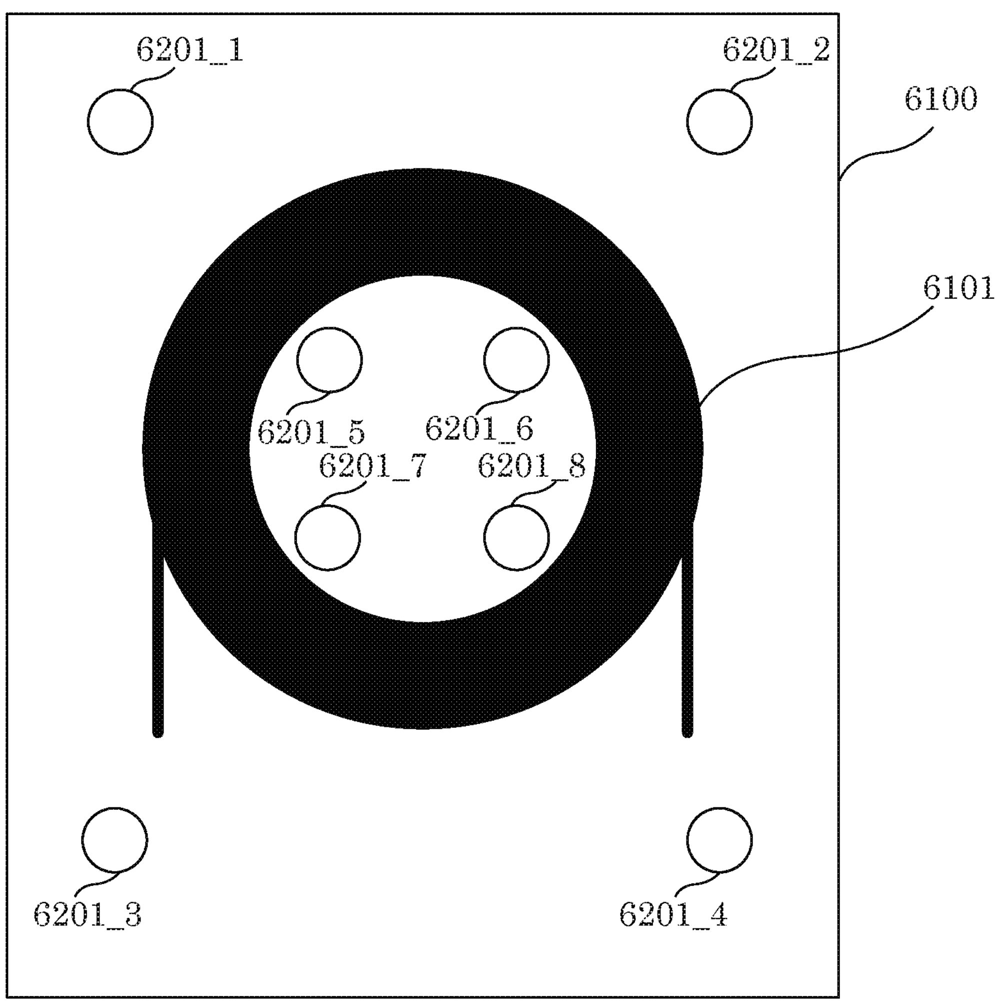
FIG. 62 illustrates one example of an arrangement of communication antennas.

FIG. 62 illustrates an example of a favorable arrangement of communication antenna 5759 and power transmission coil 5755 in power transmission device 5750 illustrated in FIG. 57. Note that in FIG. 62, elements which operate in the same manner as those in FIG. 61 are assigned the same reference signs, and repeated description thereof is omitted.

In FIG. 62, 6201_1, 6201_2, 6201_3, 6201_4, 6201_5, 6201_6, 6201_7, and 6201_8 are communication antennas of power transmission device 5750.

As illustrated in FIG. 62, since power transmission device 5750 needs to transmit power to power reception coil 5701 included in communication device 5700, power transmission coil 6101 (corresponding to power transmission coil 5755 in FIG. 57) is disposed, for example, in the central region, like illustrated in FIG. 62.

In this example, power transmission coil 5755 is arranged in a circular shape (so as to form a closed loop). This aspect corresponds to the black portion of 6101 in FIG. 62. Accordingly, this circular shape defines a space inside the circle and a space outside the circle.

In this example, communication antennas of power transmission device 5750 are arranged inside of the circular coil and outside of the circular coil. In the example illustrated in FIG. 62, communication antennas 6201_5, 6201_6, 6201_7, and 6201_8 are arranged inside the circular coil, and communication antennas 6201_1, 6201_2, 6201_3, and 6201_4 are arranged outside the circular coil.

When the communication antennas of power transmission device 5750 are arranged in this manner, communication antennas are densely arranged with respect to plane 6100, so no matter how communication device 5700 is arranged with respect to plane 6100, in communication device 5700 and power transmission device 5750, the probability that modulated signal reception electric field strength can be ensured is increased. This makes it possible to achieve the advantageous effect that it is possible to select a communication method that achieves a high data transmission speed and ensure high data reception quality. Moreover, when the communication antennas of power transmission device 5750 are arranged in this manner, no matter how the communication antennas are arranged and included in communication device 5700, communication antennas are densely arranged with respect to plane 6100, so in communication device 5700 and power transmission device 5750, the probability that modulated signal reception electric field strength can be ensured is increased.

Figure 63:
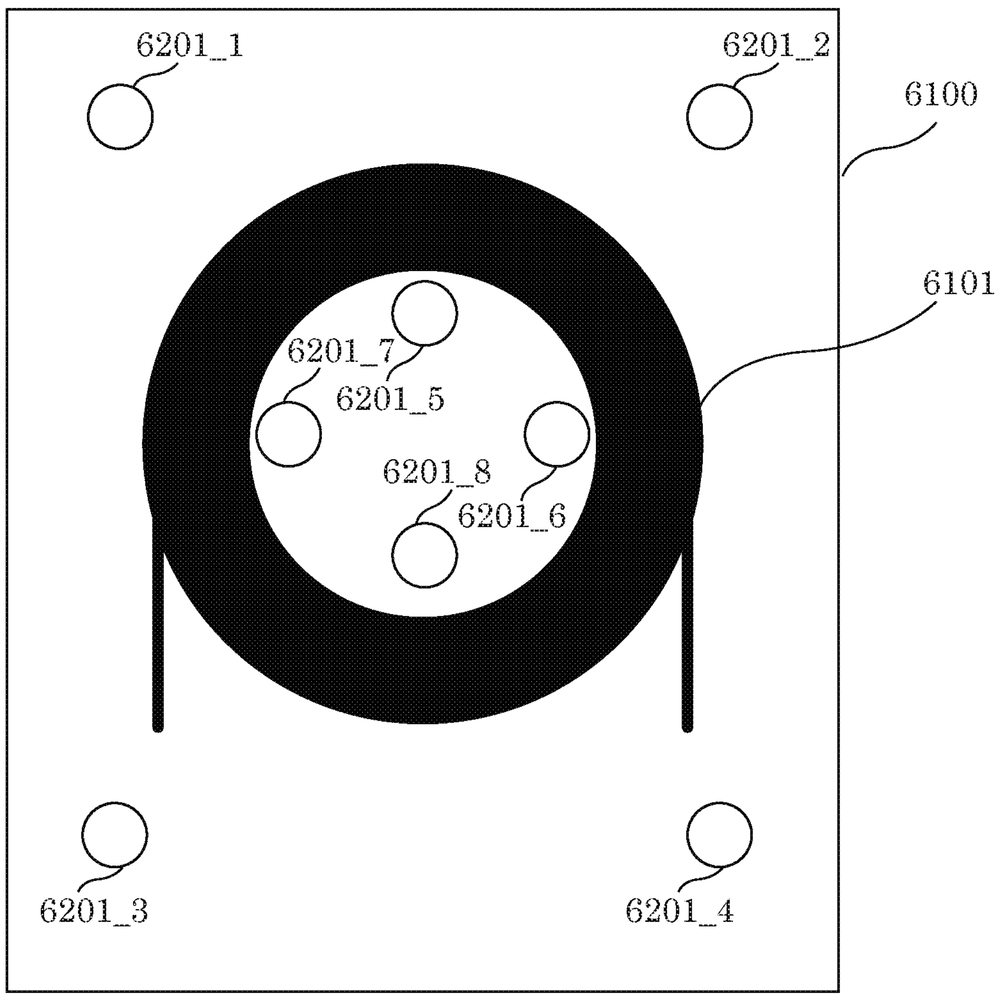
FIG. 63 illustrates another example of an arrangement of communication antennas.
Figure 64:
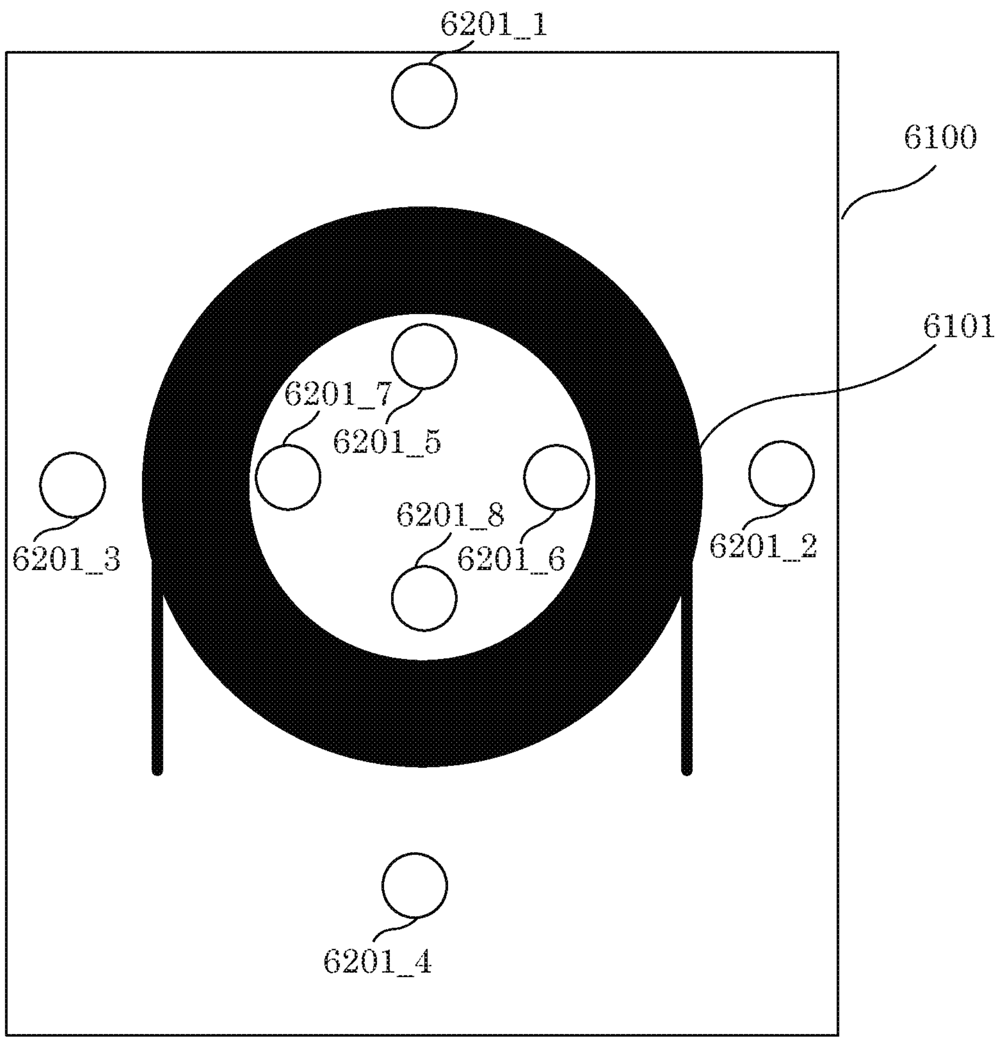
FIG. 64 illustrates another example of an arrangement of communication antennas.

Note that the arrangement of the communication antennas of power transmission device 5750 is not limited to an arrangement like that of FIG. 61. For example, the communication antennas of power transmission device 5750 may be arranged like in FIG. 62, FIG. 63, or FIG. 64. Note that in FIG. 62, FIG. 63, and FIG. 64, elements which operate in the same manner as those in FIG. 61 are assigned the same reference signs, and repeated description thereof is omitted. Here, the characterizing point is the formation of a quadrangular shape by communication antennas 6201_5, 6201_6, 6201_7, and 6201_8.

A configuration other than a configuration in which four communication antennas are arranged inside the circular coil and four communication antennas are arranged outside the circular coil is also acceptable.

For example, even when one or two or more of the communication antennas of power transmission device 5750 are arranged inside the circular coil and one or two or more of the communication antennas of power transmission device 5750 are arranged outside the circular coil, the advantageous effects described above can be achieved.

Moreover, when N (N is an integer that is greater than or equal to 1 or greater than or equal to 2) communication antennas of power transmission device 5750 are arranged inside the circular coil and M (M is an integer that is greater than or equal to 1 or greater than or equal to 2) communication antennas of power transmission device 5750 are arranged outside the circular coil, N=M may be satisfied, and, alternatively, N≠M may be satisfied. Moreover, when M is greater than N, it is possible to more densely arrange the antennas.

Figure 65:
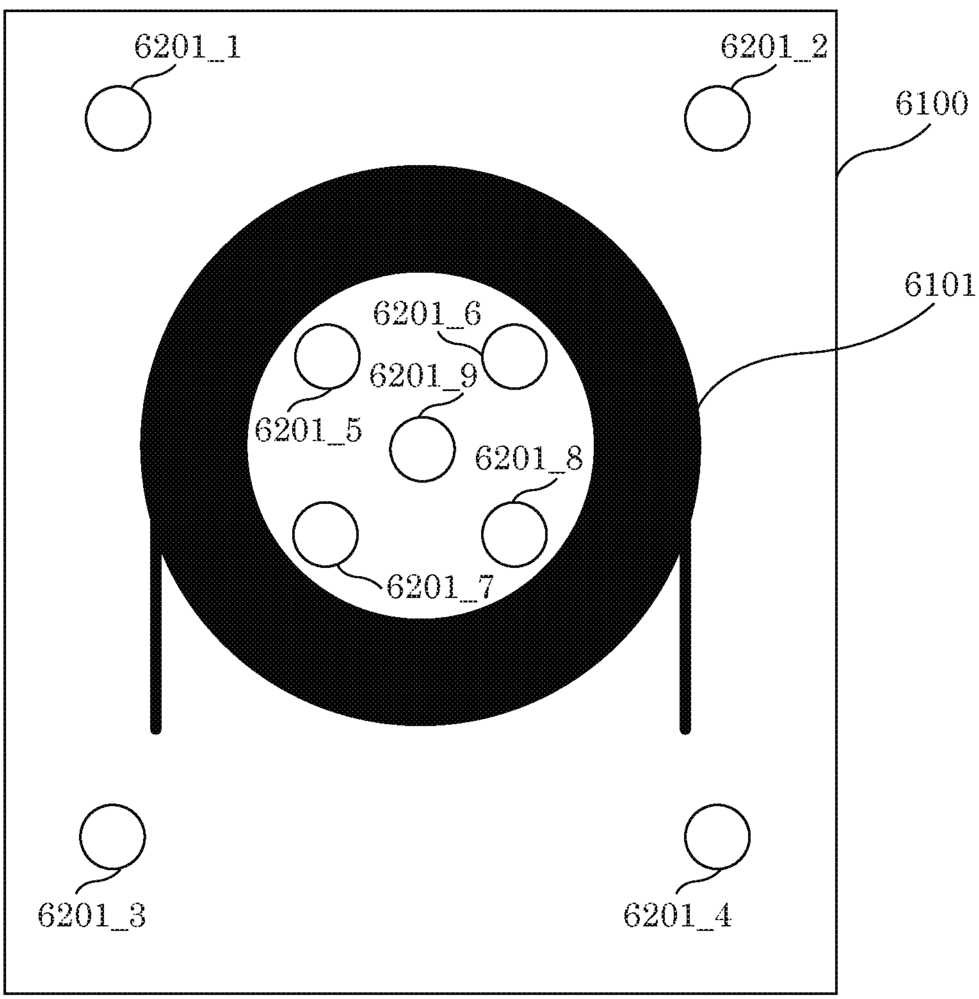
FIG. 65 illustrates another example of an arrangement of communication antennas.
Figure 66:
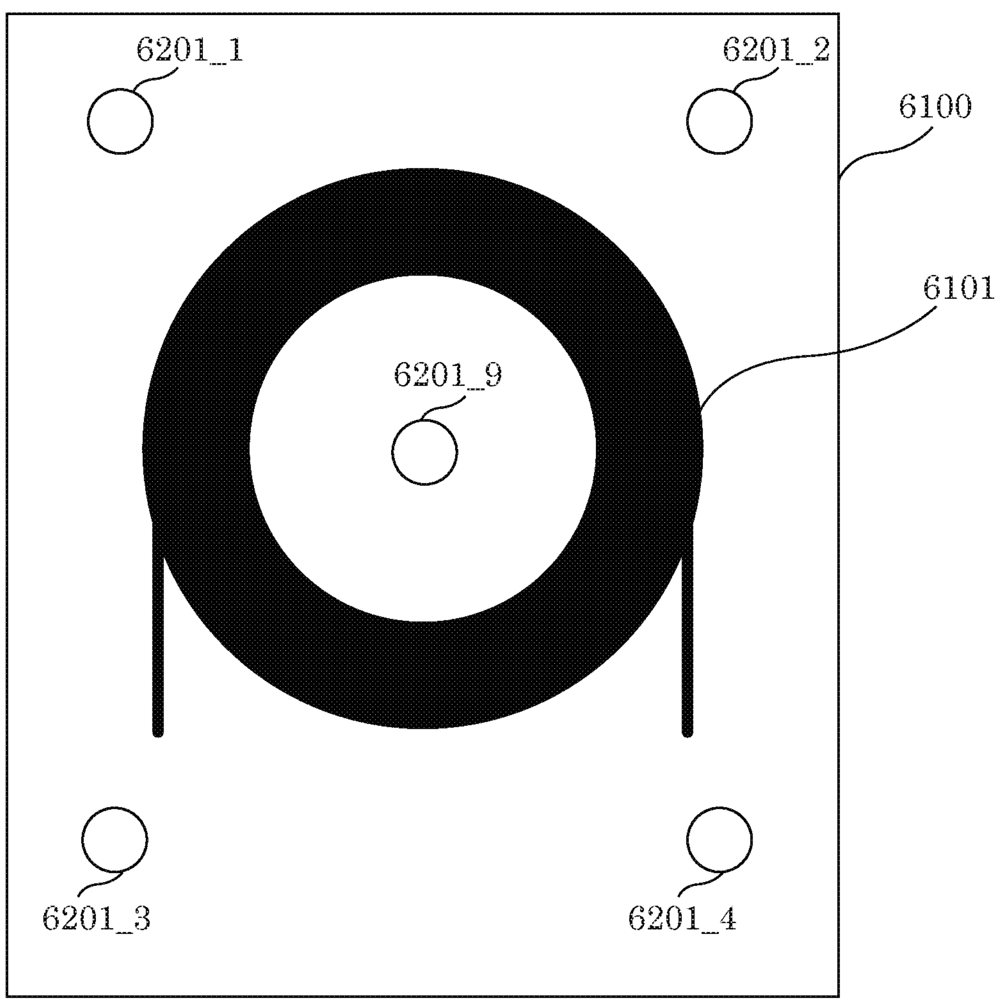
FIG. 66 illustrates another example of an arrangement of communication antennas.

FIG. 65 and FIG. 66 each illustrate an example of an arrangement of communication antennas where N≠M. Note that in FIG. 65 and FIG. 66, elements which operate in the same manner as those in FIG. 61 and FIG. 62 are assigned the same reference signs. In FIG. 65 and FIG. 66, 6201_1, 6201_2, 6201_3, 6201_4, 6201_5, 6201_6, 6201_7, 6201_8, and 6201_9 are communication antennas of power transmission device 5750.

Figure 67:
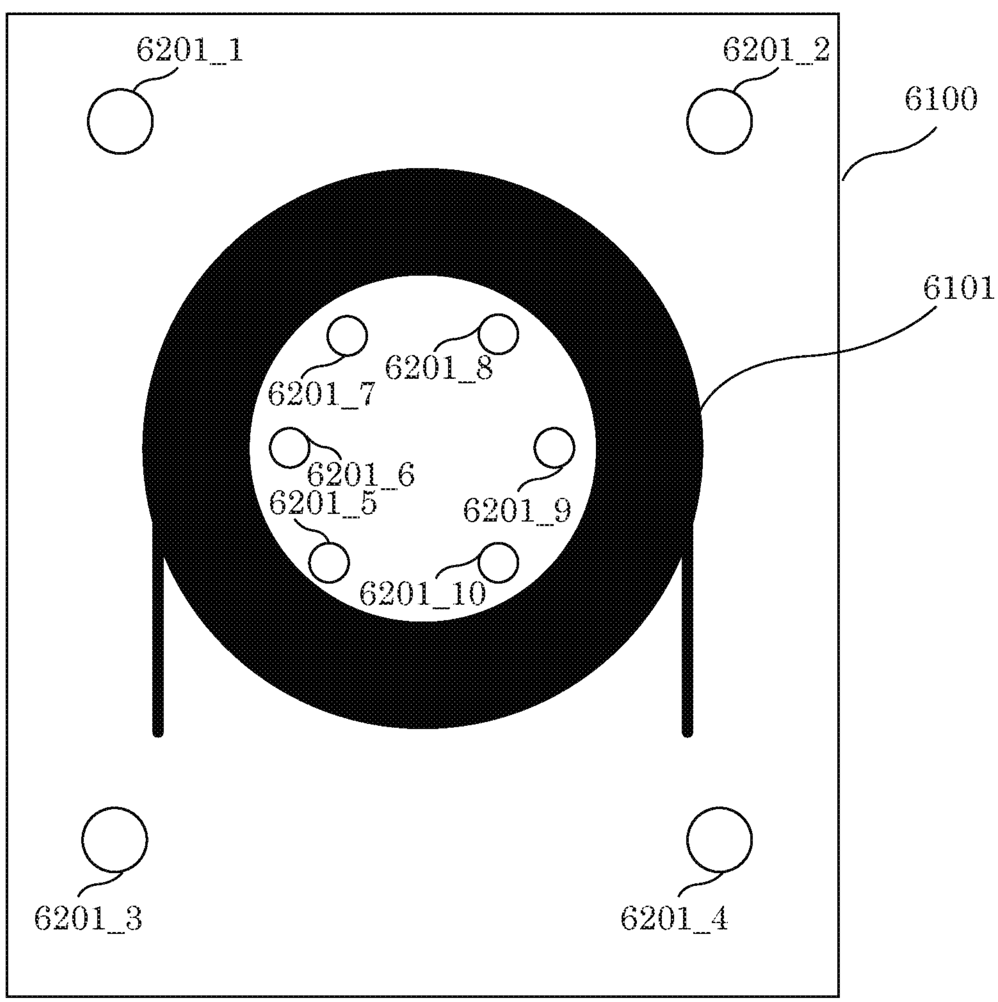
FIG. 67 illustrates another example of an arrangement of communication antennas.
Figure 68:
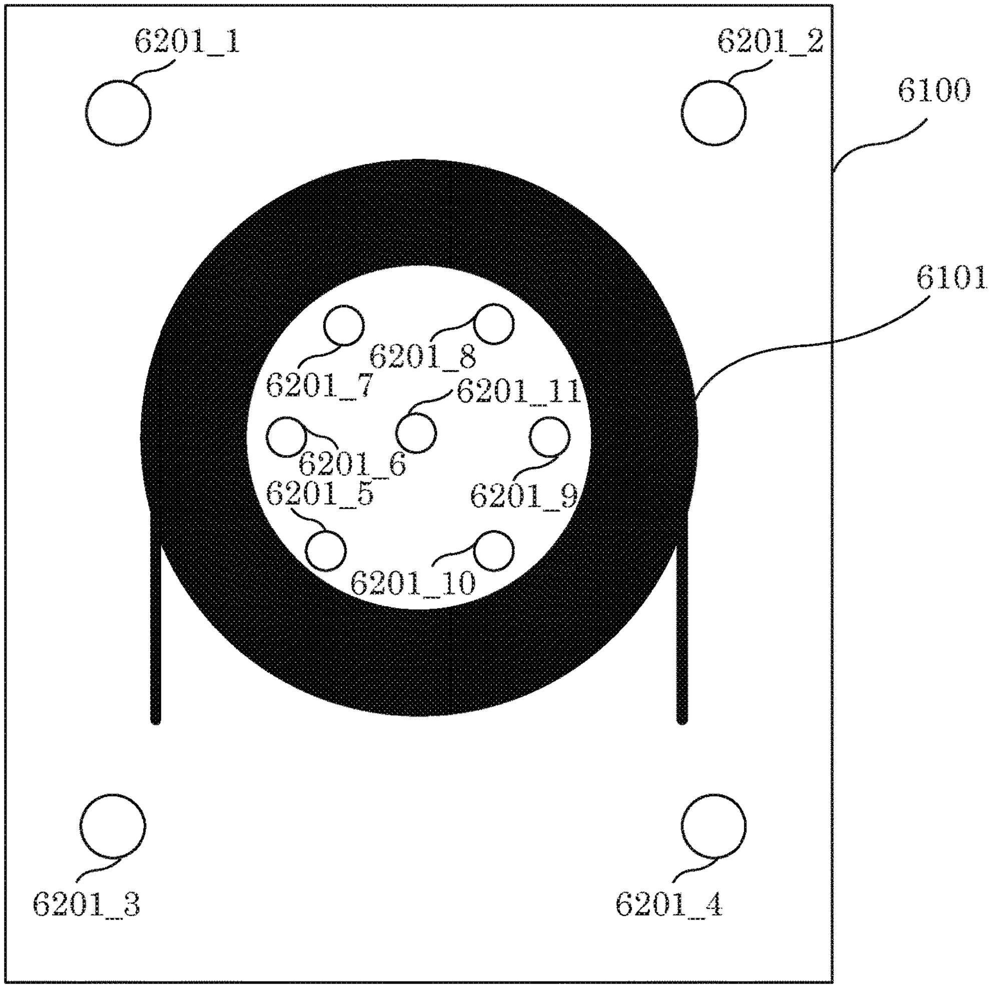
FIG. 68 illustrates another example of an arrangement of communication antennas.

Moreover, focusing on the inside of the circular coil, when the communication antennas of power transmission device 5750 are arranged like in FIG. 67 and FIG. 68, it is possible to more densely arrange the communication antennas. Note that in FIG. 67 and FIG. 68, elements which operate in the same manner as those in FIG. 61 and FIG. 62 are assigned the same reference signs. 6201_1, 6201_2, 6201_3, 6201_4, 6201_5, 6201_6, 6201_7, 6201_8, 6201_9, 6201_10, and 6201_11 are communication antennas of power transmission device 5750. Here, the characterizing point is the formation of a hexagonal shape by communication antennas 6201_5, 6201_6, 6201_7, 6201_8, 6201_9, and 6201_10.

In, for example, FIG. 62, FIG. 63, FIG. 64, FIG. 65, FIG. 66, FIG. 67, and FIG. 68, power transmission coil 5755 of power transmission device 5750 need not be circular in shape. For example, power transmission coil 5755 may be configured as a closed loop that defines a space inside the loop and a space outside the loop, and the communication antennas of power transmission device 5750 may be arranged both inside and outside of the closed loop. Here, the number of communication antennas arranged inside the closed loop and the number of communication antennas arranged outside the closed loop may be the same as when communication antennas are arranged inside the circle and communication antennas are arranged outside the circle.

Hereinbefore, methods of arranging the communication antennas of power transmission device 5750 have been described, but when the communication antennas of communication device 5700 are arranged in accordance with the same method of arranging the communication antennas of power transmission device 5750, the same advantageous effects can be achieved.

For example, in FIG. 62, FIG. 63, FIG. 64, FIG. 65, FIG. 66, FIG. 67, and FIG. 68, if 6100 is considered to indicate the contour of communication device 5700, 6101 is considered to indicate the power reception coil 5701 of communication device 5700, and 6201_1, 6201_2, 6201_3, 6201_4, 6201_5, 6201_6, 6201_7, 6201_8, 6201_9, 6201_10, 6201_11 are considered to indicate communication antennas of communication device 5700, if such an embodiment is carried out such that the configuration requirements described above are satisfied, the advantageous effects described above can be achieved.

Note that when controller 5757 of power transmission device in FIG. 57 recognizes that it is not connected to device 5790 from signals 5752, 5756, and 5763 from interface 5751, controller 5757 may instruct, via 5758, transceiver 5761 and communication antenna 5759 to stop the communication function.

Moreover, power transmission device 5750 may include a function for recognizing a required current (or power) for power transmission and a required current (or power) for communication via controller 5757, and notifying that current (or power) is insufficient in the supply of power 5752 from interface 5751 (for example, by causing a lamp such as a light emitting diode (LED) to emit light).

Embodiment 11

In the present embodiment, a specific example of operations performed by the communication device and the power transmission device described in Embodiment 10 will be given.

Figure 69:
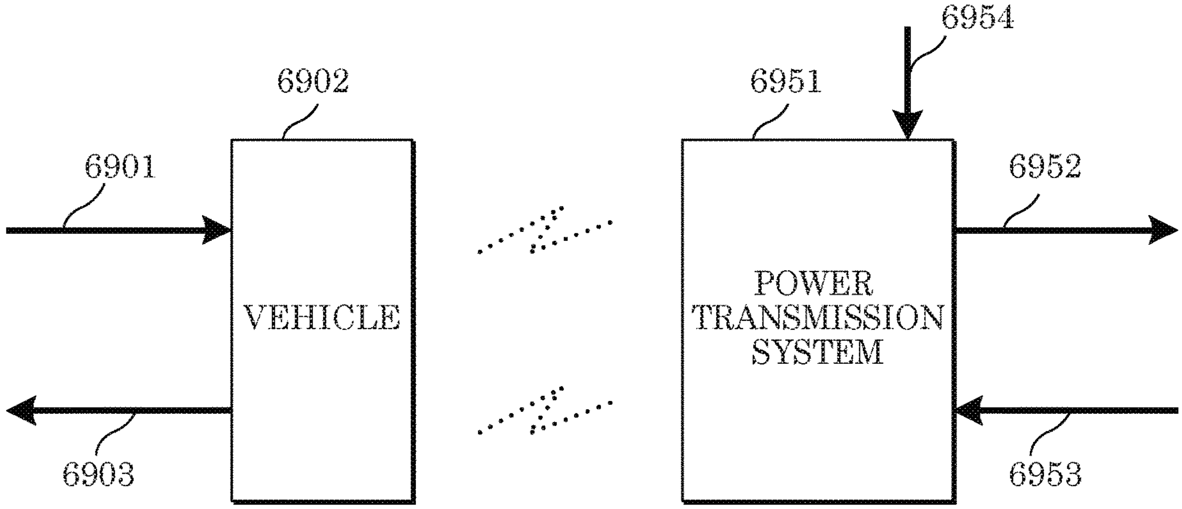
FIG. 69 illustrates a schematic of a system.

FIG. 69 illustrates a schematic of a system according to the present embodiment. In FIG. 69, a vehicle labeled as 6902 is equipped with a communication device like the one described in Embodiment 10. In other words, the vehicle is capable of receiving power wirelessly and capable of communicating wirelessly.

Vehicle 6902 that includes the communication device receives radio waves from power transmission system 6951 via a power reception antenna, and charges a battery. Vehicle 6902 including the communication device receives an input of data 6901, performs processing such as error correction coding and modulation, generates a modulated signal, and outputs the modulated signal as, for example, radio waves.

Power transmission system 6951 receives the modulated signal transmitted by vehicle 6902 that includes the communication device, implements processing such as demodulation and error correction decoding, obtains data, and outputs data 6952 generated based on the obtained data, or signal 6952 including the data generated based on the obtained data.

Power transmission system 6951 receives an input of data 6953 or signal 6953 including the data, implements processing such as error correction coding and modulation on data obtained from this data, generates a modulated signal, and outputs the modulated signal as, for example, radio waves.

Vehicle 6902 including the communication device receives the modulated signal transmitted by power transmission system 6951, implements processing such as demodulation and error correction decoding, obtains data, and outputs data 6903 generated based on the obtained data, or signal 6903 including the data generated based on the obtained data.

Figure 70:
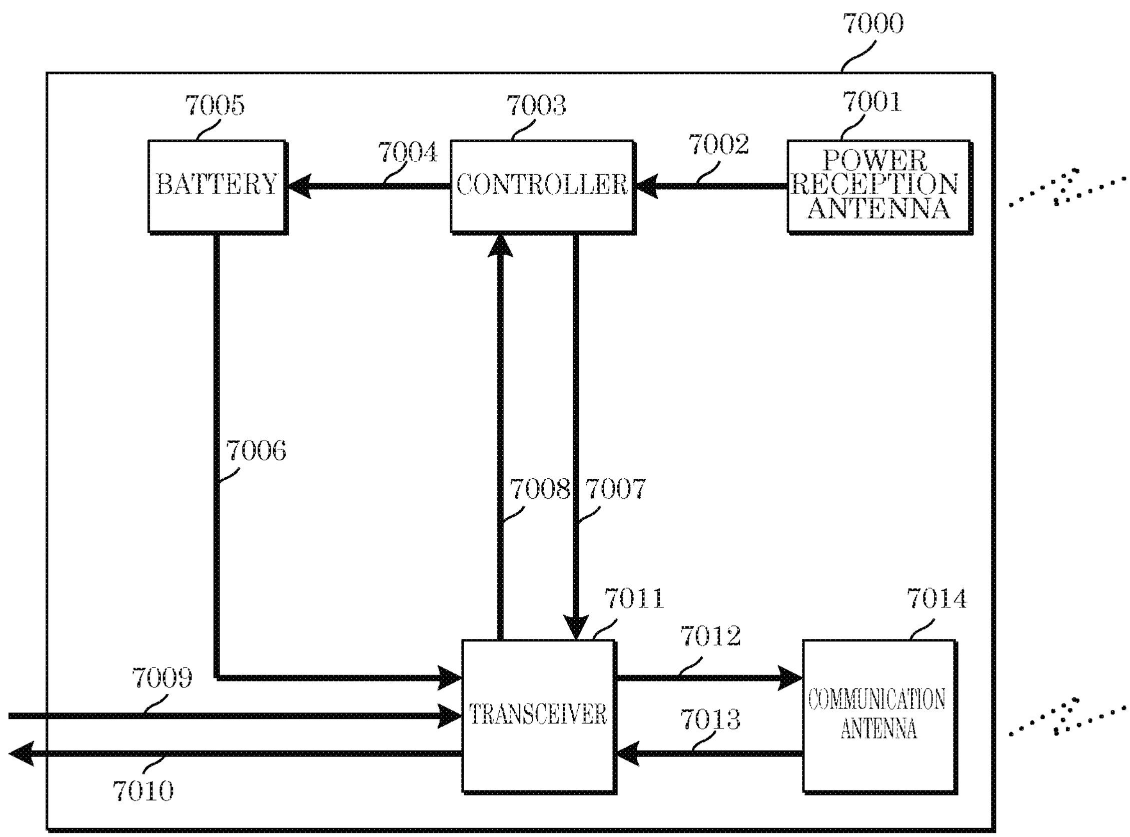
FIG. 70 illustrates an example of a configuration of a communication device.

7000 in FIG. 70 is an example of a configuration of communication device 6902 illustrated in FIG. 69. Controller 7003 receives an input of received signal 7002 received by power reception antenna 7001, and second control signal 7008, performs power reception control, and outputs power supply signal 7004 and first control signal 7007.

Battery 7005 receives an input of power supply signal 7004, charges the battery, and outputs signal 7006.

Transceiver 7011 receives an input of first data 7009, signal 7006, and first control signal 7007, implements processing such as error correction coding and modulation, generates a modulated signal including first data 7009, and outputs the modulated signal as transmission signal 7012. Transmission signal 7012 is output from communication antenna 7014 as, for example, radio waves.

Moreover, transceiver 7010 receives an input of received signal 7013 received by receive antenna 7014, implements processing such as demodulation and error correction decoding, and outputs second data 7010 and second control signal 7008.

Figure 71:
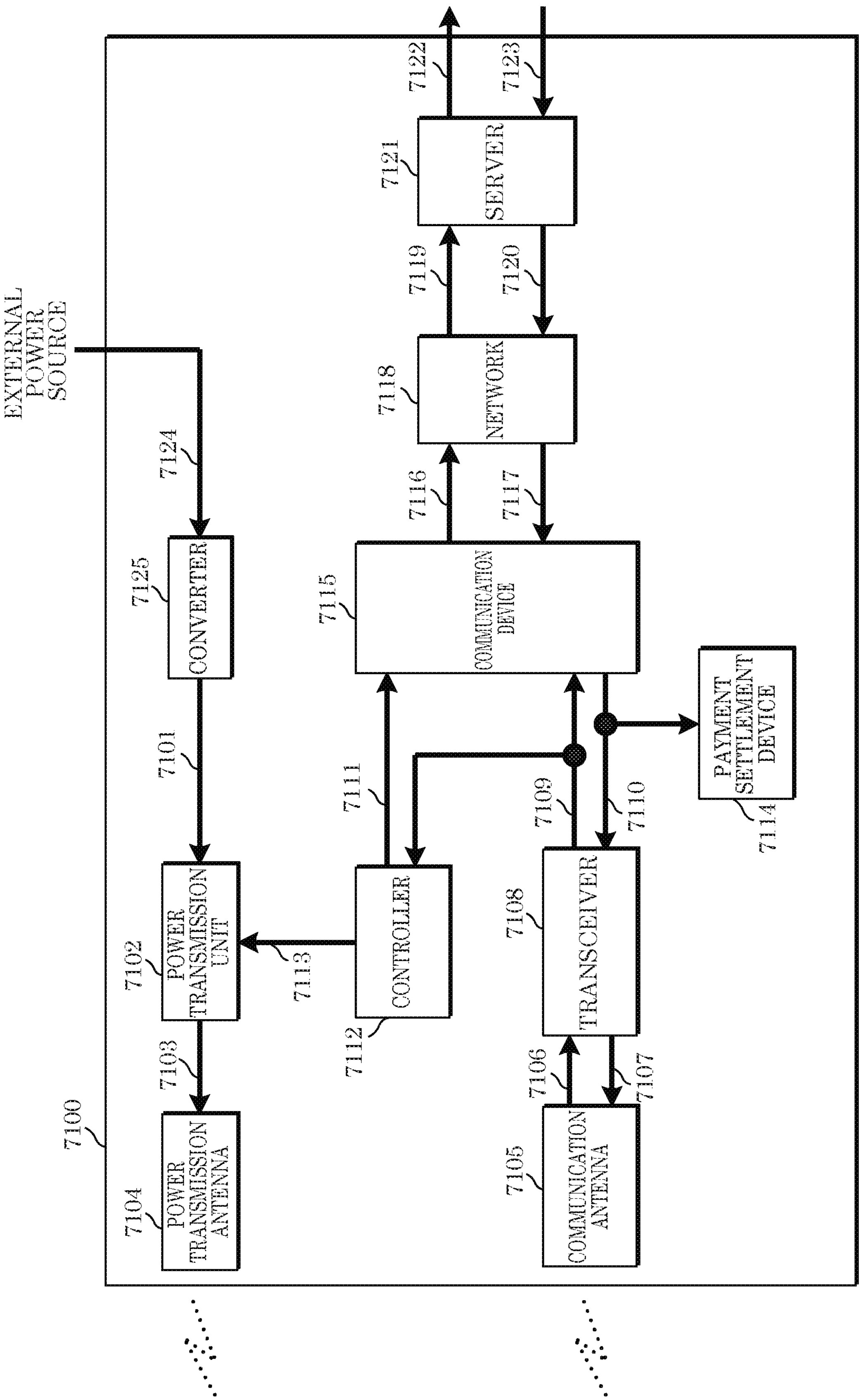
FIG. 71 illustrates an example of a configuration of a power transmission system.

7100 in FIG. 71 indicates an example of a configuration of power transmission system 6951 illustrated in FIG. 69. Converter 7125 receives an input of a supply of AC power 7124 obtained from an external power source, performs AC-DC conversion, and outputs a supply of DC power 7101.

Power transmission unit 7102 receives inputs of a supply of DC power 7101 and fourth control signal 7113, and generates and outputs power transmission signal 7103 based on fourth control signal 7113. Power transmission signal 7103 is then output from power transmission antenna 7104. At this time, upon receipt of this signal, the communication device illustrated in FIG. 70 receives power.

Server 7121 receives an input of third data 7123, and outputs data or modulated signal 7120 including the third data. The data or modulated signal 7120 including the third data is input into communication device 7115 via network 7118.

Communication device 7115 receives inputs of third control signal 7111 and data or modulated signal 7117 including the third data, and generates and outputs fifth data 7110.

Transceiver device 7108 receives an input of fifth data 7110, implements processing such as error correction coding and modulation, generates a modulated signal, and outputs the modulated signal as transmission signal 7107. Transmission signal 7107 is then output from communication antenna 7105 as, for example, radio waves, and, for example, communication device 7000 illustrated in FIG. 70 receives this signal.

Moreover, transceiver 7108 receives an input of received signal 7106 output from communication antenna 7105, performs processing such as demodulation and error correction decoding, and outputs sixth data 7109.

Communication device 7115 receives inputs of third control signal 7111 and sixth data 7109, and generates and outputs data or modulated signal 7116 including the data included in the received third control signal 7111 and sixth data 7109.

This signal 7116 is input into server 7121 via network 7118. Server 7121 then obtains and outputs fourth data 7122 from signal 7116.

Payment settlement device 7114 receives an input of fifth data 7110, whereby payment can be settled. However, power transmission system 7100 need not include payment settlement device 7114.

Controller 7112 receives an input of sixth data 7109, and outputs third control signal 7111 and fourth control signal 7113.

Note that specific operations performed by the elements included in communication device 7000 in FIG. 70 and power transmission system 7100 will be described in the descriptions of FIG. 72, FIG. 73, FIG. 74, FIG. 75, FIG. 76, and FIG. 76.

Figure 72:
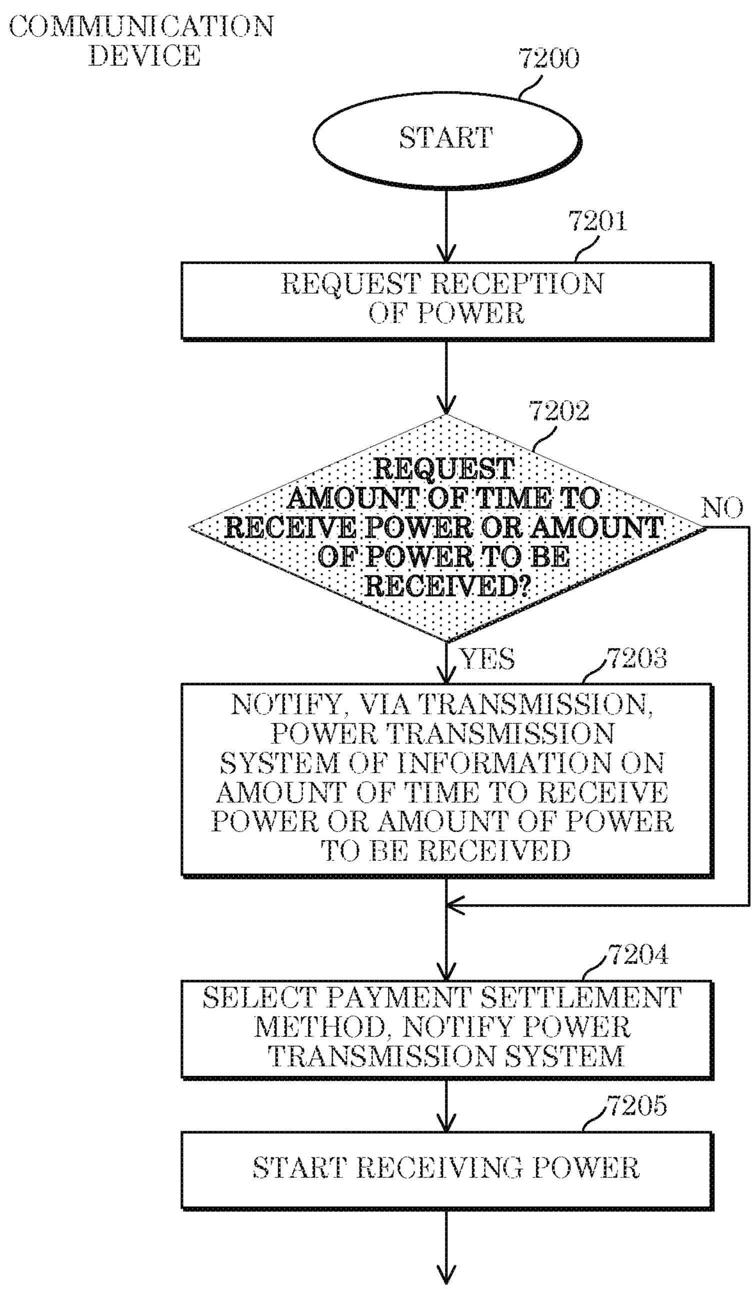
FIG. 72 illustrates one example of processing operations performed by a communication device.

First, communication device 7000 accesses power transmission system 7100. Then, a procedure screen is displayed on the display included in communication device 7000 (note that the display is not illustrated in FIG. 70), and, for example, first, operations such as those in FIG. 72 are performed. Next, FIG. 72 will be described.

The following procedures start at "start" labeled 7200.

As illustrated in FIG. 72, communication device 7000 requests the reception of power (7201) from power transmission system 7100. For example, controller 7003 in FIG. 70 outputs information indicating a request for the reception of power (7201) using first control signal 7007, and transceiver 7011 generates transmission signal 7012 including this information, and outputs transmission signal 7012 from communication antenna 7014 as radio waves. Power transmission system 7100 then receives this signal. Note that controller 7003 in FIG. 70 may request the reception of power (7201) via an external input.

Next, communication device 7000 determines whether to request an amount of time to receive power or an amount of power to be received from power transmission system 7100 (7202).

When communication device 7000 does not request an amount of time to receive power or an amount of power to be received, processing proceeds to 7204. When communication device 7000 does request an amount of time to receive power or an amount of power to be received, communication device 7000 notifies (7203) the power transmission system (7100) of information on the amount of time to receive power or the amount of power to be received. For example, controller 7003 in FIG. 70 outputs information indicating the notifying of the power transmission system (7100) of information on the amount of time to receive power or the amount of power to be received, using first control signal 7007, and transceiver 7011 generates transmission signal 7012 including this information, and outputs transmission signal 7012 from communication antenna 7014 as radio waves. Power transmission system 7100 then receives this signal. Note that controller 7003 in FIG. 70 may obtain the information on the amount of time to receive power or the amount of power to be received via an external input.

Next, communication device 7000 selects a payment settlement method and notifies the power transmission system of the selected payment settlement method (7204). For example, controller 7003 in FIG. 70 outputs information indicating the selection of a payment settlement method and the notification of the power transmission system of the selected payment settlement method (7204), using first control signal 7007, and transceiver 7011 generates transmission signal 7012 including this information, and outputs transmission signal 7012 from communication antenna 7014 as radio waves. Power transmission system 7100 then receives this signal. Note that controller 7003 in FIG. 70 may obtain the payment settlement method information via an external input.

With this, communication device 7000 starts receiving power (7205).

Figure 73:
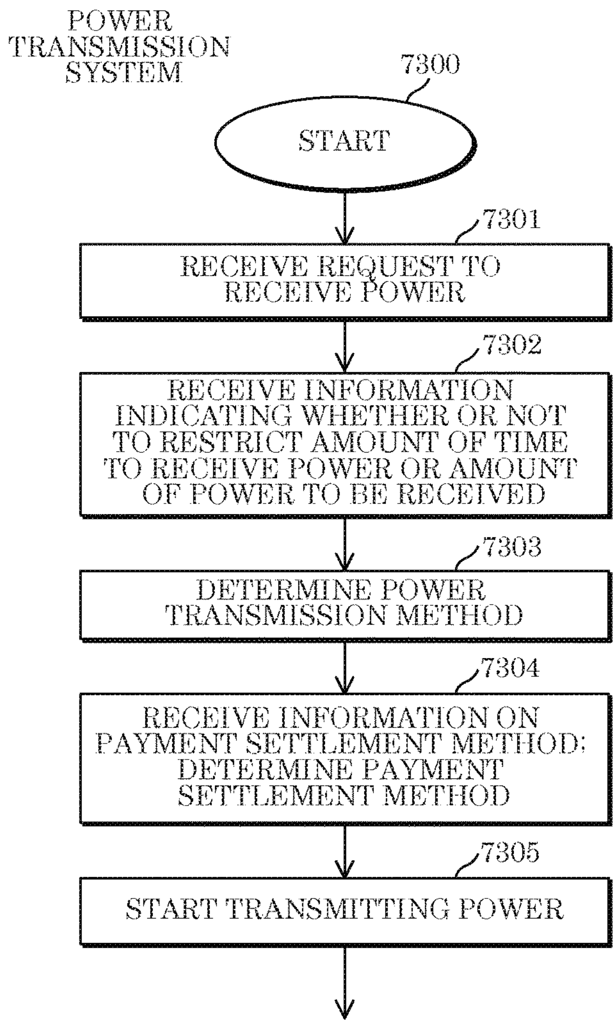
FIG. 73 illustrates one example of processing operations performed by a power transmission system.

FIG. 73 illustrates operations performed by power transmission system 7100 in response to the operations of communication device 7000 in FIG. 72. Power transmission system 7100 receives a request to receive power (7301) from communication device 7000. For example, transceiver 7108 in power transmission system 7100 receives an input of received signal 7106 received from communication antenna 7105, and obtains the request to receive power (7301) included in received signal 7106.

Power transmission system 7100 then receives, from communication device 7000, information on whether or not to restrict the amount of time to receive power or the amount of power to be received (7302). For example, transceiver 7108 in power transmission system 7100 receives an input of received signal 7106 received from communication antenna 7105, and obtains information on whether or not to restrict the amount of time to receive power or the amount of power to be received (7302) that is included in received signal 7106.

Next, power transmission system 7100 determines a power transmission method (7303). For example, if power transmission system 7100 is to restrict the amount of time that (communication device 7000) is to receive the power or the amount of power to be received (by communication device 7000) (i.e., the amount of time that power transmission system 7100 is to transmit the power or the amount of power that power transmission system 7100 is to transmit), power transmission system 7100 determines the restriction method. Moreover, if power transmission system 7100 is not to restrict the amount time that (communication device 7000) is to receive the power or the amount of power to be received (by communication device 7000) (i.e., the amount time that power transmission system 7100 is to transmit the power or the amount of power that power transmission system 7100 is to transmit), power transmission system 7100 determines to not restrict the above. For example, transceiver 7108 in power transmission system 7100 receives an input of received signal 7106 received from communication antenna 7105, obtains information on whether or not to restrict the amount of time to receive power or the amount of power to be received (7302) that is included in received signal 7106, and controller 7112 determines a power transmission method from this information, and outputs fourth control signal 7113 including information on the determined power transmission method.

Next, power transmission system 7100 receives information on the payment settlement method from communication device 7000 and determines the payment settlement method (7304). For example, transceiver 7108 in power transmission system 7100 receives an input of received signal 7106 received from communication antenna 7105, obtains the information on the payment settlement method included in received signal 7106, and controller 7112 determines the payment settlement method from this information. Communication device 7115 then obtains this information, and passes the information on the payment settlement method to server 7121 and passes the information on the determined payment settlement method to payment settlement device 7114, and payment settlement device 7114 thus knows the payment settlement method.

This sequence of operations ends, and power transmission system 7110 starts transmitting power (7305) to communication device 7000.

Figure 74:
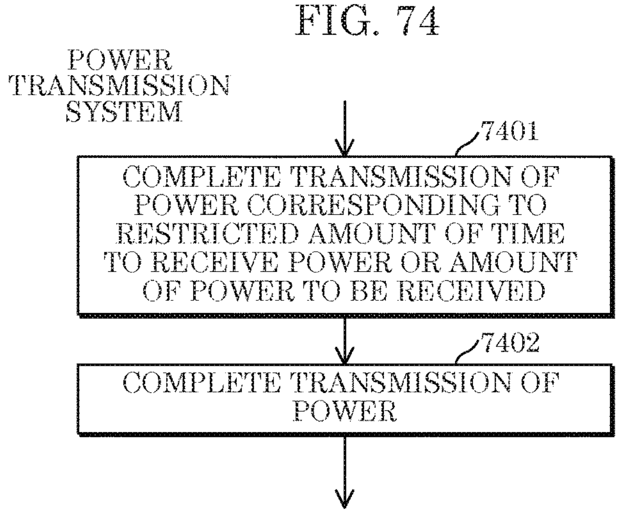
FIG. 74 illustrates another example of processing operations performed by a power transmission system.

FIG. 74 illustrates operations performed by power transmission system 7110 after the operations illustrated in FIG. 72 and FIG. 73. Since communication device 7000 has transmitted information related to power reception, i.e., the information on the restriction of the amount of time to receive power or the amount of power to be received, power transmission system 7110 completes the transmission of power (7402) at the point in time that the restricted amount of time to receive power is reached or the transmission of the restricted amount of power to be received is complete (7401).

Moreover, when, unlike the case illustrated in FIG. 74, power transmission system 7110 does not receive, from communication device 7000, a restriction of the amount of time to receive power or the amount of power to be received, or receives a restriction of the amount of time to transmit power or the amount of power to be received but the restriction has not yet been reached, and then receives a request to end the reception of power (the transceiver included in communication device 7000 transmits this information and the transceiver included in the power transmission system receives this information), power transmission system 7110 ends the transmission of power.

Figure 75:
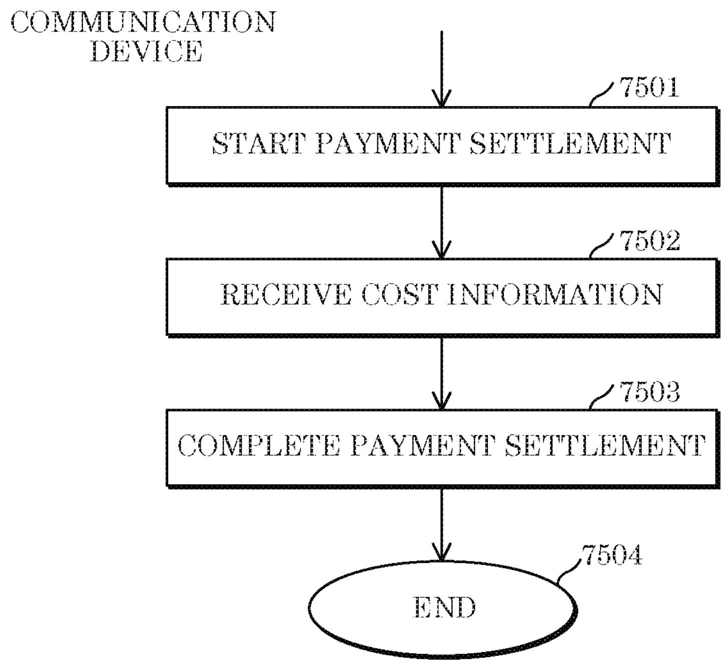
FIG. 75 illustrates another example of processing operations performed by a communication device.

With this, as illustrated in FIG. 75, communication device 7000 starts the payment settlement (7501). Accordingly, communication device 7000 uses transceiver 7011 to convey to power transmission system 7110 that communication device 7000 will start the payment settlement.

Consequently, communication device 7000 receives cost information from power transmission system 7110 (7502). Thus, power transmission system 7110 generates, in transceiver 7108, a modulated signal including the cost information, and transmits the modulated signal. Communication device 7000 receives the modulated signal including this information via transceiver 7011, and thus obtains the cost information.

Communication device 7000 then completes the payment settlement (7503), and ends the processing (7504).

Figure 76:
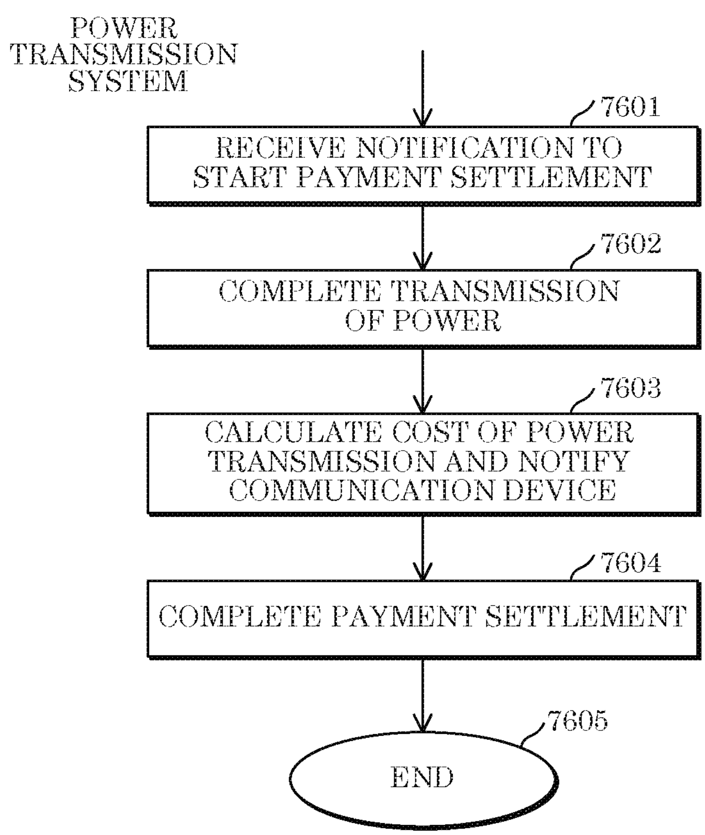
FIG. 76 illustrates yet another example of processing operations performed by a power transmission system.

At this time, as illustrated in FIG. 76, power transmission system 7100 receives, from communication device 7000, a notification to start payment settlement (7601). Consequently, power transmission system 7100 ends the transmission of power (7602).

Power transmission system 7100 then calculates the cost for the transmission of power, and notifies communication device 7000 of the cost (7603).

In accordance with the settlement of payment by communication device 7000, power transmission system 7100 ends payment settlement procedure (7604), and then ends the procedure (7605).

As a result of communication device 7000 and power transmission system 7100 operating in the manner described above, it is possible to achieve an advantageous effect whereby the amount of power to be transmitted/the amount of power to be received can be restricted, and a payment settlement system based on the restricted amount of power to be transmitted/the amount of power to be received can be provided.

Note that the communication between communication device 7000 and power transmission system 7100 in the present embodiment may be wireless communication via radio waves, and, alternatively, may be optical communication via visible light.

Embodiment 12

In the present embodiment, a specific example of operations performed by the communication device and the power transmission device described in Embodiment 10 and Embodiment 11 will be given.

Figure 77:
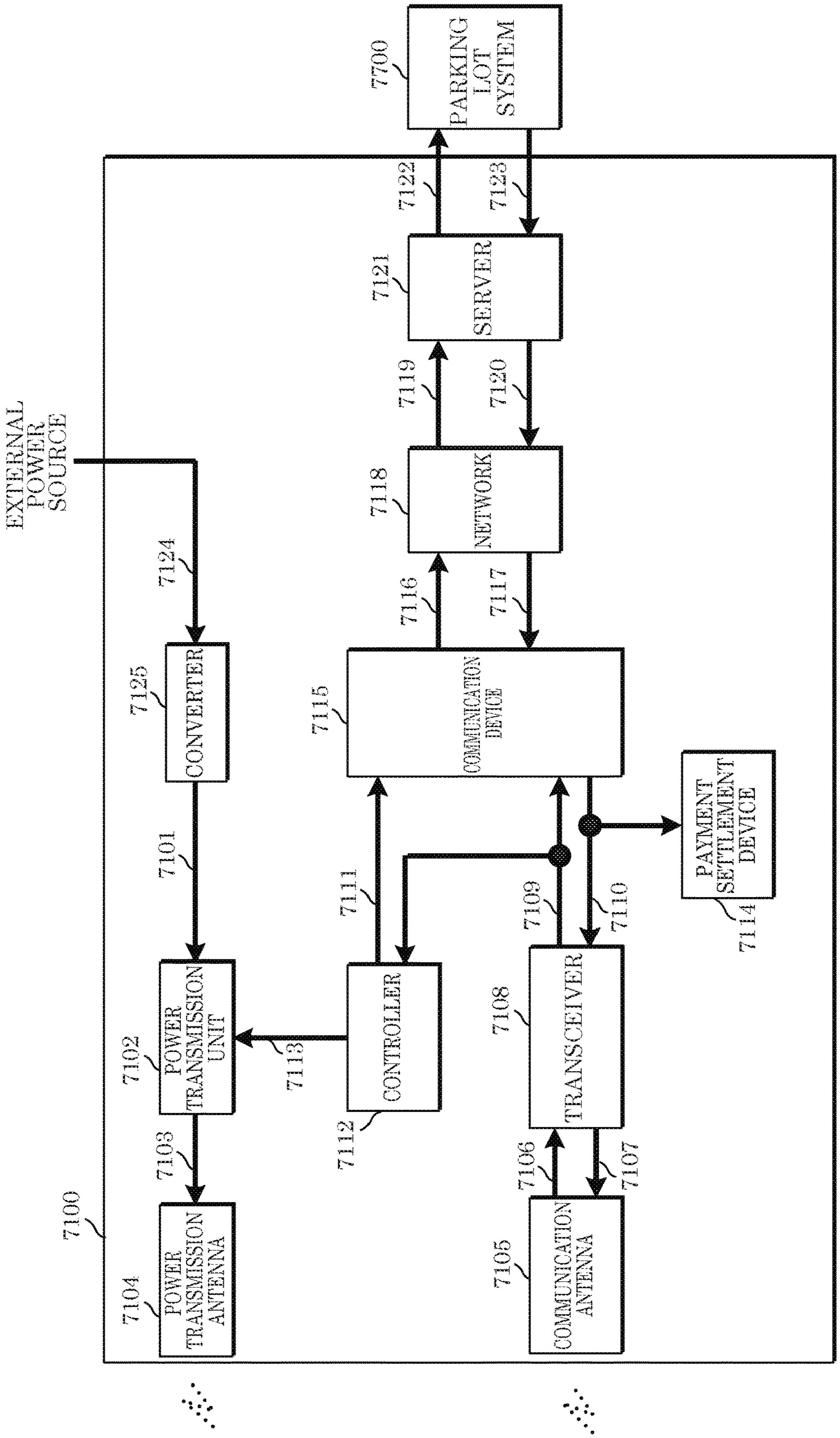
FIG. 77 illustrates an example of a configuration of a power transmission system.

Note that 7100 in FIG. 77 indicates an example of a configuration of power transmission system 6951 illustrated in FIG. 69, and elements in FIG. 77 which operate in the same manner as those in FIG. 71 are assigned the same reference signs, and repeated description thereof is omitted.

Parking lot system 7700 in FIG. 77 communicates with, for example, server 7121 of power transmission system 7100.

For example, server 7121 transmits data 7122 including a request for payment of a parking fee.

Then, parking lot system 7700 transmits, to server 7121, data 7123 including information on the parking fee.

Note that parking lot system 7700 is a system that, for example, manages the amount of time that a vehicle is parked, manages parking fees commensurate with the amount of time that a vehicle is parked, and manages the entering and exiting of vehicles.

Figure 78:
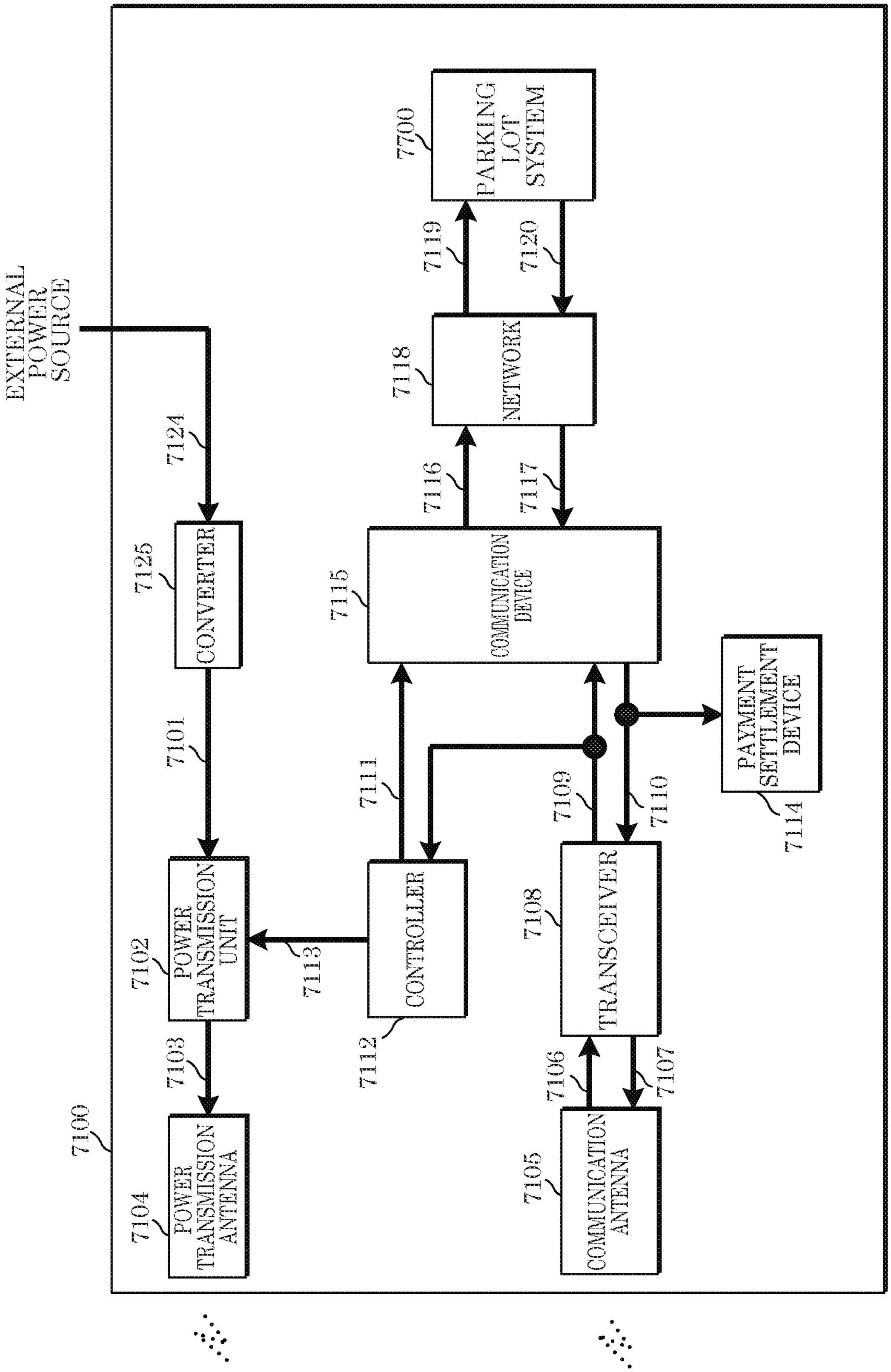
FIG. 78 illustrates an example of a configuration of a power transmission system.

7100 in FIG. 78 indicates an example of a configuration of power transmission system 6951 illustrated in FIG. 69, and differs from FIG. 77 in that power transmission system 7100 includes parking lot system 7700.

For example, parking lot system 7700 in FIG. 78 communicates with communication device 7115 via network 7118.

For example, communication device 7115 transmits data 7116 including a request for payment of a parking fee.

Then, parking lot system 7700 transmits, via network 7118, data 7120 including information on the parking fee.

Note that as the configuration of, for example, the communication device included in vehicle 6902 that communicates with power transmission system 6951 (for example, FIG. 77 and FIG. 78) in FIG. 69, has already been described in another embodiment, repeated description will be omitted.

Figure 79:
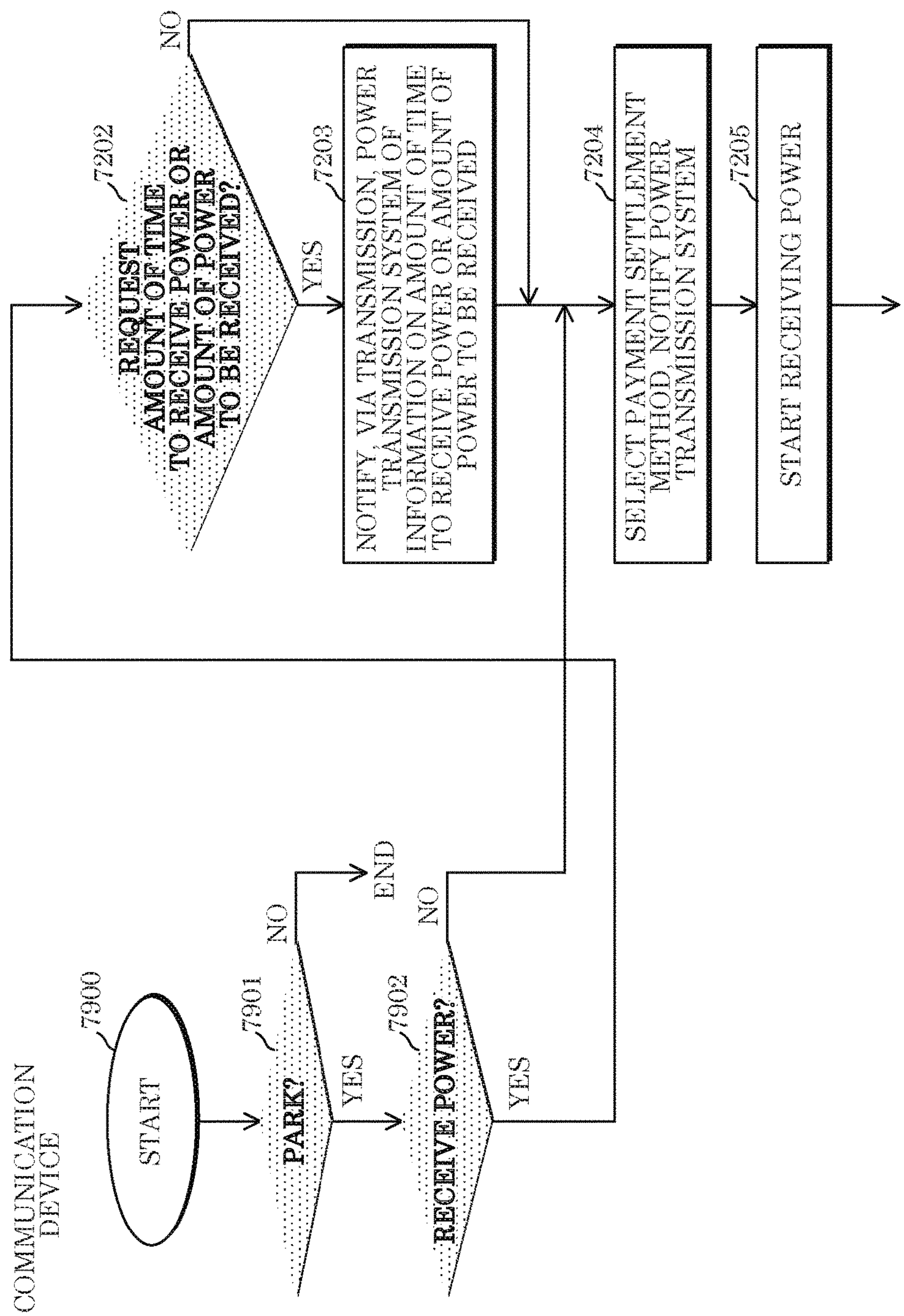
FIG. 79 relates to operations performed by a communication device included in a vehicle.

FIG. 79 relates to operations performed by the communication device included in vehicle 6902 illustrated in FIG. 69.

The communication device included in vehicle 6902 illustrated in FIG. 69 first, for example, accesses power transmission system 7100 illustrated in FIG. 77 and FIG. 78. Then, a procedure screen is displayed on the display included in the communication device included in vehicle 6902 illustrated in FIG. 69, and the operations illustrated in FIG. 79 are performed. Next, FIG. 79 will be described.

Upon start (7900), the following procedure starts.

As illustrated in FIG. 79, the communication device included in vehicle 6902 illustrated in FIG. 69 tells power transmission system 7100 whether vehicle 6902 will park in the parking lot or not (7901). For example, when the communication device included in vehicle 6902 has the configuration illustrated in FIG. 70, transceiver 7011 generates and outputs transmission signal 7012 including information on whether vehicle 6902 will park or not, and outputs transmission signal 7012 as radio waves from communication antenna 7014. Power transmission system 7100 then receives this signal.

When vehicle 6902 will not park in the parking lot, that is to say, when the answer is NO to 7901, the procedure ends. On the other hand, when vehicle 6902 will park in the parking lot, that is to say, when the answer is YES to 7901, the procedure proceeds to 7902.

The communication device included in vehicle 6902 illustrated in FIG. 69 tells power transmission system 7100 whether vehicle 6902 will receive power or not (7902). For example, when the communication device included in vehicle 6902 has the configuration illustrated in FIG. 70, controller 7003 outputs information indicating whether to receive power or not (7902) using first control signal 7007, transceiver 7011 generates and outputs transmission signal 7012 including this information, and outputs transmission signal 7012 from communication antenna 7014 as radio waves. Power transmission system 7100 then receives this signal. Note that controller 7003 in FIG. 70 may request the reception of power (7201) via an external input.

When vehicle 6902 will not receive power, that is to say, when the answer is NO to 7902, the procedure proceeds to 7204. On the other hand, when vehicle 6902 will receive power, that is to say, when the answer is YES to 7902, the procedure proceeds to step 7202.

The communication device included in vehicle 6902 illustrated in FIG. 69 requests to receive power (7201) from power transmission system 7100. Then, the communication device included in vehicle 6902 illustrated in FIG. 69 determines whether to request an amount of time to receive power or an amount of power to be received (7202).

When the communication device included in vehicle 6902 illustrated in FIG. 69 does not request an amount of time to receive power or an amount of power to be received, processing proceeds to 7204. When the communication device included in vehicle 6902 illustrated in FIG. 69 does request an amount of time to receive power or an amount of power to be received, communication device 7000 notifies (7203) the power transmission system (7100) of information on the amount of time to receive power or the amount of power to be received. For example, when communication device included in vehicle 6902 has the configuration illustrated in FIG. 70, controller 7003 in FIG. 70 outputs information indicating the notifying of the power transmission system (7100) of information on the amount of time to receive power or the amount of power to be received, using first control signal 7007, and transceiver 7011 generates transmission signal 7012 including this information, and outputs transmission signal 7012 from communication antenna 7014 as radio waves. Power transmission system 7100 then receives this signal. Note that controller 7003 in FIG. 70 may obtain the information on the amount of time to receive power or the amount of power to be received via an external input.

Next, the communication device included in vehicle 6902 illustrated in FIG. 69 selects a payment settlement method and notifies the power transmission system of the selected payment settlement method (7204). For example, when the communication device included in vehicle 6902 has the configuration illustrated in FIG. 70, controller 7003 in FIG. 70 outputs information indicating the selection of a payment settlement method and the notification of the power transmission system of the selected payment settlement method (7204), using first control signal 7007, and transceiver 7011 generates transmission signal 7012 including this information, and outputs transmission signal 7012 from communication antenna 7014 as radio waves. Power transmission system 7100 then receives this signal. Note that controller 7003 in FIG. 70 may obtain the payment settlement method information via an external input.

With this, communication device 7000 starts receiving power (7205).

Figure 80:
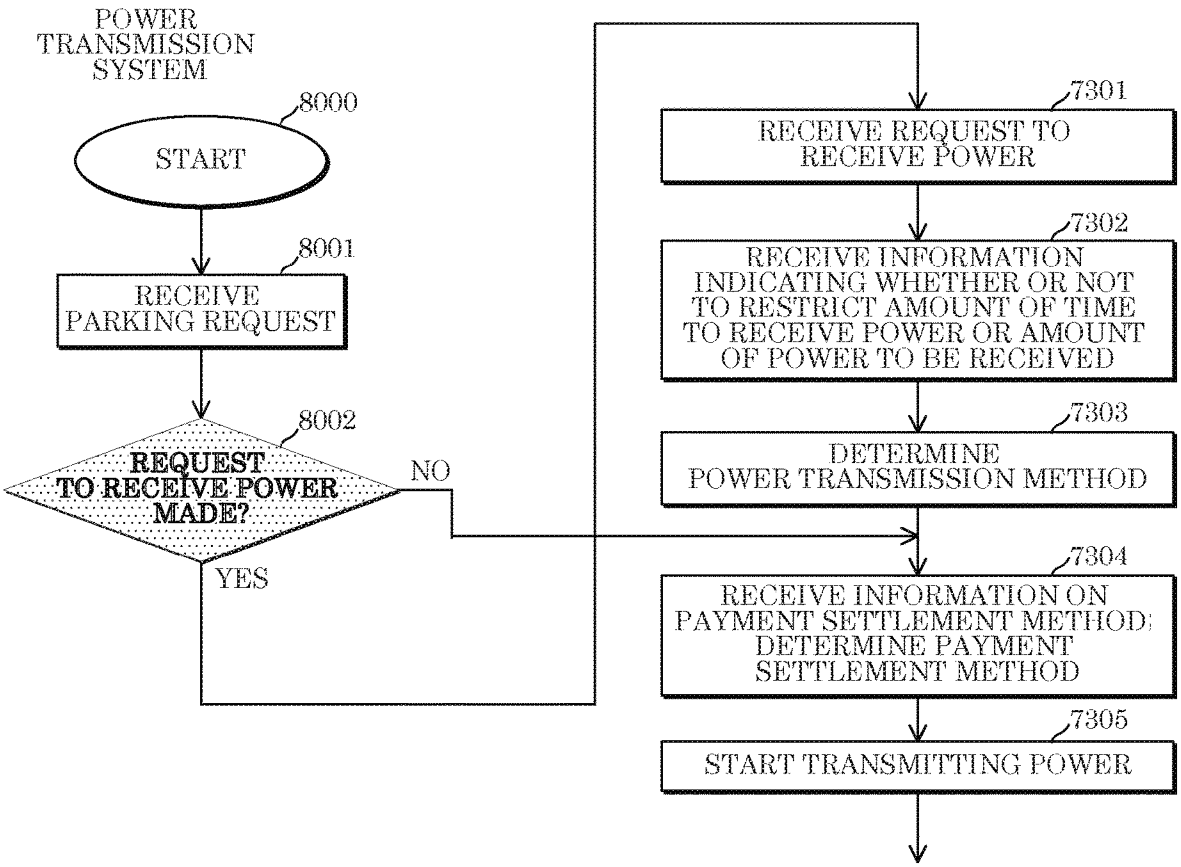
FIG. 80 relates to operations performed by a power transmission system.

FIG. 80 relates to operations performed by power transmission system 6951 illustrated in FIG. 69, that is to say, for example, power transmission system 7100 illustrated in FIG. 77 and FIG. 78.

Power transmission system 7100 receives a request to park (8001) from the communication device included in vehicle 6902 illustrated in FIG. 69.

Next, power transmission system 7100 receives "request to receive power made? (8002)" from the communication device included in vehicle 6902 illustrated in FIG. 69.

For example, transceiver 7108 in power transmission system 7100 receives an input of received signal 7106 received from communication antenna 7105, and obtains information on "request to receive power made? (8002)" included in received signal 7106.

When a request to receive power is not obtained, that is to say, when the answer is NO to 8002, the procedure proceeds to 7304. On the other hand, when a request to receive power is obtained, that is to say, when the answer is YES to 8002, the procedure proceeds to step 7301.

Power transmission system 7100 then receives, from the communication device included in vehicle 6902 illustrated in FIG. 69, information on whether or not to restrict the amount of time to receive power or the amount of power to be received (7302). For example, transceiver 7108 in power transmission system 7100 receives an input of received signal 7106 received from communication antenna 7105, and obtains information on whether or not to restrict the amount of time to receive power or the amount of power to be received (7302) that is included in received signal 7106.

Next, power transmission system 7100 determines a power transmission method (7303). For example, if power transmission system 7100 is to restrict the amount of time that (the communication device included in vehicle 6902 illustrated in FIG. 69) is to receive the power or the amount of power to be received (by communication device included in vehicle 6902 illustrated in FIG. 69) (i.e., the amount time that power transmission system 7100 is to transmit the power or the amount of power that power transmission system 7100 is to transmit), power transmission system 7100 determines the restriction method. Moreover, if power transmission system 7100 is not to restrict the amount time that (communication device included in vehicle 6902 illustrated in FIG. 69) is to receive the power or the amount of power to be received (by communication device included in vehicle 6902 illustrated in FIG. 69) (i.e., the amount time that power transmission system 7100 is to transmit the power or the amount of power that power transmission system 7100 is to transmit), power transmission system 7100 determines to not restrict the above. For example, transceiver 7108 in power transmission system 7100 receives an input of received signal 7106 received from communication antenna 7105, obtains information on whether or not to restrict the amount of time to receive power or the amount of power to be received (7302) that is included in received signal 7106, and controller 7112 determines a power transmission method from this information, and outputs fourth control signal 7113 including information on the determined power transmission method.

Next, power transmission system 7100 receives information on the payment settlement method from the communication device included in vehicle 6902 illustrated in FIG. 69 and determines the payment settlement method (7304). For example, transceiver 7108 in power transmission system 7100 receives an input of received signal 7106 received from communication antenna 7105, obtains the information on the payment settlement method included in received signal 7106, and controller 7112 determines the payment settlement method from this information. Communication device 7115 then obtains this information, and passes the information on the payment settlement method to server 7121 and passes the information on the determined payment settlement method to payment settlement device 7114, and payment settlement device 7114 thus knows the payment settlement method.

This sequence of operations ends, and power transmission system 7110 starts transmitting power (7305) to vehicle 6902 illustrated in FIG. 69.

FIG. 74 illustrates operations performed by power transmission system 7110 after the operations illustrated in FIG. 79 and FIG. 80. Since the communication device included in vehicle 6902 illustrated in FIG. 69 has transmitted information related to power reception, i.e., the information on the restriction of the amount of time to receive power or an amount of power to be received, power transmission system 7110 completes the transmission of power (7402) at the point in time that the restricted amount of time to receive power is reached or the transmission of the restricted amount of power to be received is complete (7401).

Moreover, when, unlike the case illustrated in FIG. 74, power transmission system 7110 does not receive, from the communication device included in vehicle 6902 illustrated in FIG. 69, a restriction of the amount of time to receive power or the amount of power to be received, or receives a restriction of the amount of time to receive power or the amount of power to be received but the restriction has not yet been reached, and then receives a request to end the reception of power (the transceiver included in the communication device included in vehicle 6902 illustrated in FIG. 69 transmits this information and the transceiver included in the power transmission system receives this information), power transmission system 7110 ends the transmission of power.

With this, the communication device included in vehicle 6902 illustrated in FIG. 69 starts the payment settlement (7501). Accordingly, the communication device included in vehicle 6902 illustrated in FIG. 69 uses transceiver 7011 to convey to power transmission system 7110 that the communication device will start the payment settlement.

Consequently, communication device 7000 receives cost information from power transmission system 7110 (7502).

Here, the cost includes either a parking fee or both a parking fee and a power reception fee.

Thus, power transmission system 7110 generates, in transceiver 7108, a modulated signal including the cost information, and transmits the modulated signal. The communication device included in vehicle 6902 illustrated in FIG. 69 receives the modulated signal including this information via transceiver 7011, and thus obtains the cost information.

The communication device included in vehicle 6902 illustrated in FIG. 69 then completes the payment settlement (7503), and ends the processing (7504).

At this time, power transmission system 7100 receives, from the communication device included in vehicle 6902 illustrated in FIG. 69, a notification to start payment settlement (7601). Consequently, power transmission system 7100 ends the transmission of power (7602).

Power transmission system 7100 then calculates the cost for the transmission of power and the cost related to parking, and notifies communication device 7000 of the costs (7603).

In accordance with the settlement of payment by the communication device included in vehicle 6902 illustrated in FIG. 69, power transmission system 7100 ends payment settlement procedure (7604), and then ends the procedure (7605).

As a result of the communication device included in vehicle 6902 illustrated in FIG. 69 and power transmission system 7100 operating in the manner described above, it is possible to achieve an advantageous effect whereby the amount of power to be transmitted/the amount of power to be received can be restricted, and a system which simultaneously achieves payment settlement based on the restricted amount of power to be transmitted/the amount of power to be received and payment settlement related to parking can be provided.

Note that the communication between the communication device included in vehicle 6902 illustrated in FIG. 69 and power transmission system 7100 in the present embodiment may be wireless communication via radio waves, and, alternatively, may be optical communication via visible light.

Embodiment 13

In the present embodiment, a specific example of operations performed by the communication device and the power transmission device described in Embodiment 10 and Embodiment 11 will be given.

Figure 81:
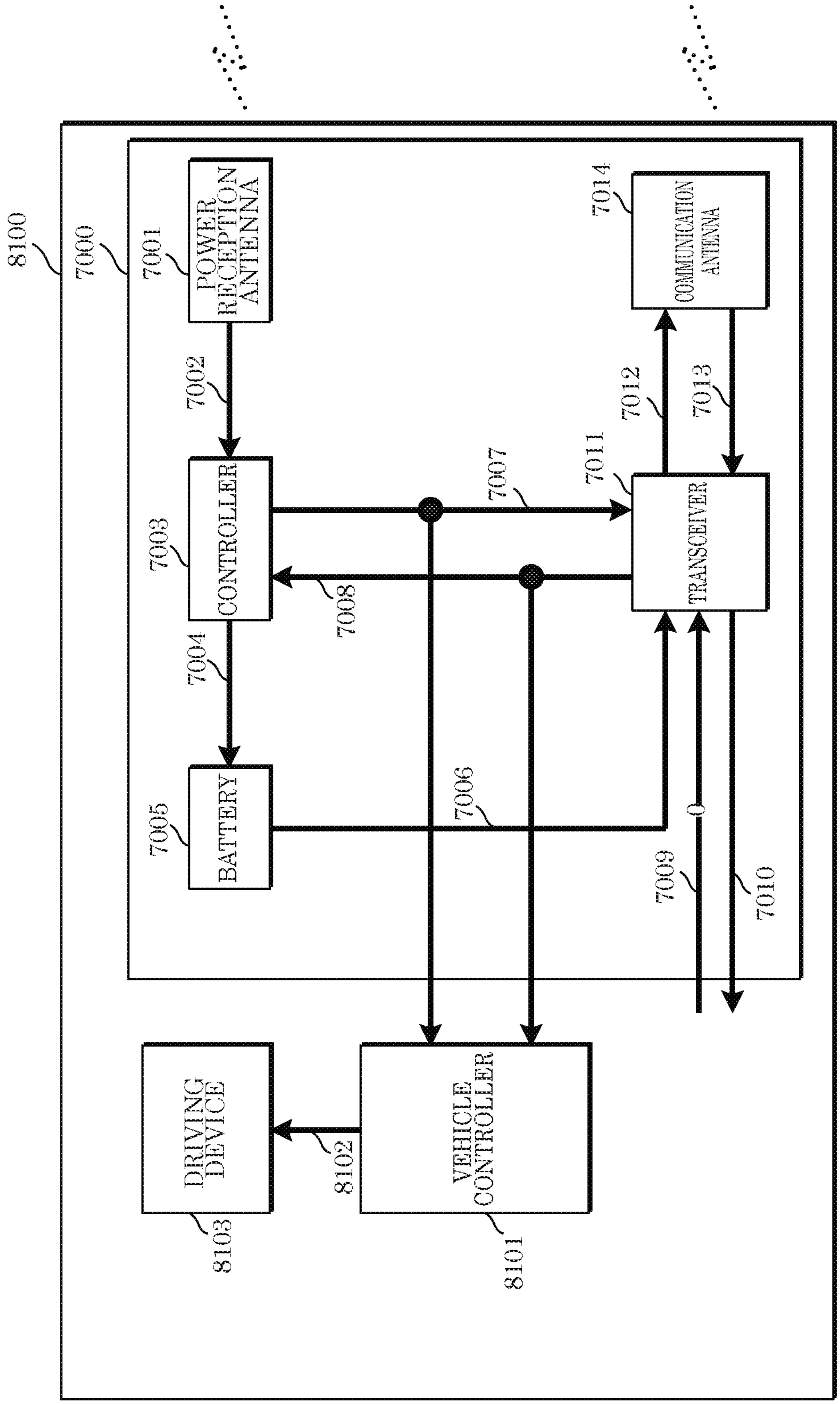
FIG. 81 illustrates an example of a configuration of a vehicle.

FIG. 81 illustrates a configuration corresponding to vehicle 6902, among vehicle 6902 and power transmission system 6951 illustrated in FIG. 69.

Note that in FIG. 81, elements which operate in the same manner as those in FIG. 70 are assigned the same reference signs, and repeated description thereof is omitted. In FIG. 81, 8100 is a vehicle. Vehicle controller 8101 receives inputs of first control signal 7007 and second control signal 7008, determines a control method for the vehicle based on information included in first control signal 7007 and information included in second control signal 7008, and outputs vehicle control signal 8102.

Driving device 8103 receives an input of vehicle control signal 8102, and based on vehicle control signal 8102, controls the motor, driving system, steering wheel, steering—which are all powered—whereby the vehicle moves to a desired location.

Since the configuration of the system that corresponds to power transmission system 6951 illustrated in FIG. 69 is as shown in FIG. 71, FIG. 77, and FIG. 78, and thus has already been described, repeated description will be omitted. Power transmission system 6951 may have a configuration that includes a function for power supply payment settlement (power transmission payment settlement), and, alternatively, may have a configuration that includes a function for power supply payment settlement and parking payment settlement, and may have a configuration that includes neither.

Figure 82:
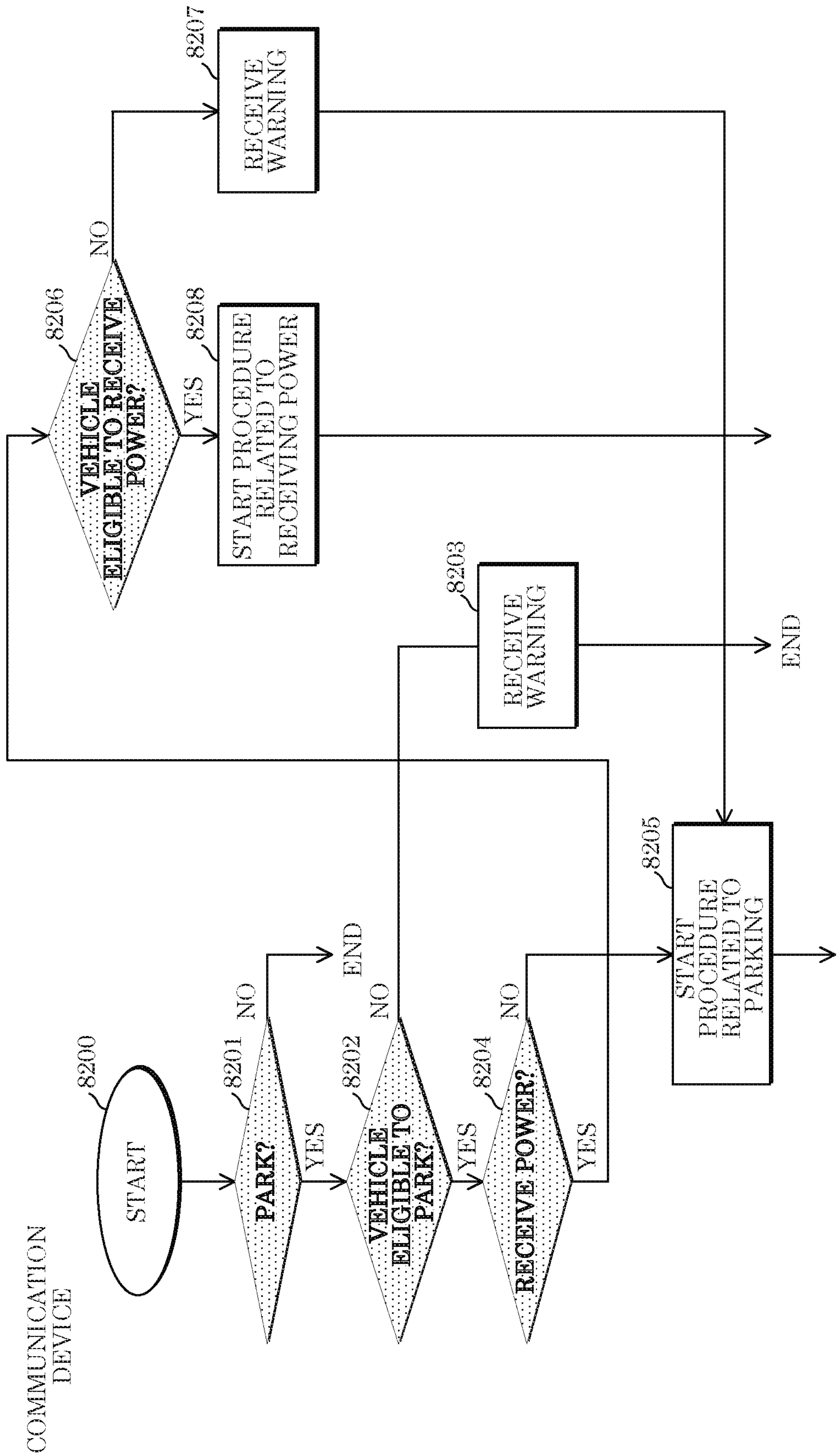
FIG. 82 relates to operations related to a communication device included in a vehicle.

FIG. 82 relates to operations related to the communication device included in vehicle 6902 illustrated in FIG. 69 (vehicle 8100 illustrated in FIG. 81).

Vehicle 8100 illustrated in FIG. 81 first accesses power transmission system 7100 illustrated in FIG. 71, FIG. 77 and FIG. 78. Then, a procedure screen is displayed on the display included 8100 illustrated in FIG. 81, whereby the operations illustrated in FIG. 82 are performed. Next, FIG. 82 will be described.

Upon start (8200), the following procedure starts.

As illustrated in FIG. 82, vehicle 8100 illustrated in FIG. 81 tells power transmission system 7100 whether vehicle 8100 will park in the parking lot or not (8201). For example, when the communication device included in vehicle 8100 has the configuration illustrated in FIG. 81, transceiver 7011 generates and outputs transmission signal 7012 including information on whether vehicle 8100 will park or not, and outputs transmission signal 7012 as radio waves from communication antenna 7014. Power transmission system 7100 then receives this signal.

When vehicle 8100 will not park in the parking lot, that is to say, when the answer is NO to 8201, the procedure ends. On the other hand, when vehicle 8100 will park in the parking lot, that is to say, when the answer is YES to 8201, the procedure proceeds to the next step.

Next, determination for determining whether vehicle 8100 is a type of vehicle that may park in the parking lot is performed, that is to say, vehicle 8100 communicates with power transmission system 7100, and determines whether it is eligible to park or not (8202).

For example, when the communication device included in vehicle 8100 has the configuration illustrated in FIG. 81, transceiver 7011 generates and outputs transmission signal 7012 including information on the type of vehicle that vehicle 8100 is (for example, a truck, bus, or standard-sized automobile) and/or the model of vehicle that vehicle 8100 is, and outputs transmission signal 7012 as radio waves from communication antenna 7014.

Power transmission system 7100 receives this signal via communication antenna 7105, and transceiver 7108 included in the power transmission system obtains information on the type of vehicle that vehicle 8100 is (for example, a truck, bus, or standard-sized automobile) and/or the model of vehicle that vehicle 8100 is, determines whether vehicle 8100 is a type of vehicle that may park in the parking lot, generates and outputs modulated signal 7107 including information on the result of the determination, and outputs modulated signal 7107 from communication antenna 7105 as radio waves.

Vehicle 8100 receives this signal via communication antenna 7014, and transceiver 7011 obtains the determination result.

Note that the above operations will be described in even further detail later on.

When the result of the determination of whether the vehicle is eligible to park or not (8202) is that the vehicle is not eligible to park, that is to say, when the answer to 8202 is NO, vehicle 8100 receives a warning (8203), for example. In other words, vehicle 8100 knows that it is not eligible to park in the parking lot.

On the other hand, when the result of the determination of whether the vehicle is eligible to park or not (8202) is that the vehicle is eligible to park, that is to say, when the answer to 8202 is YES, the procedure proceeds to the next step.

The communication device included in vehicle 8100 tells power transmission system 7100 whether vehicle 8100 will receive power or not (8204). For example, when the communication device included in vehicle 8100 has the configuration illustrated in FIG. 81, controller 7003 outputs information indicating whether to receive power or not (7902) using first control signal 7007, transceiver 7011 generates and outputs transmission signal 7012 including this information, and outputs transmission signal 7012 from communication antenna 7014 as radio waves. Power transmission system 7100 then receives this signal. Note that controller 7003 in FIG. 81 may request the reception of power (7201) via an external input.

When vehicle 8100 will not receive power, that is to say, when the answer is NO to 8204, the procedure proceeds to 8205. Vehicle 8100 then starts the procedure related to parking (8205).

Note that one conceivable example of the procedure related to parking 8205 is a procedure like that in Embodiment 12, but the method used for the procedure related to parking 8205 is not limited to this example.

On the other hand, when vehicle 8100 will receive power, that is to say, when the answer is YES to 8204, the procedure proceeds to step 8206.

Then, vehicle 8100 determines whether it is eligible to receive power (8206) by communicating with power transmission system 7100.

For example, when the communication device included in vehicle 8100 has the configuration illustrated in FIG. 81, transceiver 7011 generates and outputs transmission signal 7012 including information on the type of vehicle that vehicle 8100 is (for example, a truck, bus, or standard-sized automobile) and/or the model of vehicle that vehicle 8100 is, and outputs transmission signal 7012 as radio waves from communication antenna 7014.

Power transmission system 7100 receives this signal via communication antenna 7105, and transceiver 7108 included in the power transmission system obtains information on the type of vehicle that vehicle 8100 is (for example, a truck, bus, or standard-sized automobile) and/or the model of vehicle that vehicle 8100 is, determines whether vehicle 8100 is a vehicle that is eligible to receive power, generates and outputs modulated signal 7107 including information on the result of the determination, and outputs modulated signal 7107 from communication antenna 7105 as radio waves.

Vehicle 8100 receives this signal via communication antenna 7014, and transceiver 7011 obtains the determination result.

When the result of the determination of whether the vehicle is eligible to receive power or not (8206) is that the vehicle is not eligible to receive power, that is to say, when the answer to 8206 is NO, vehicle 8100 receives a warning (8207), for example. In other words, vehicle 8100 knows that it is not eligible to receive power. Vehicle 8100 then starts the procedure related to parking (8205).

On the other hand, when the result of the determination of whether the vehicle is eligible to receive power or not (8206) is that the vehicle is eligible to receive power, that is to say, when the answer to 8206 is YES, the procedure proceeds to the next step. Vehicle 8100 then starts the procedure related to receiving power (8208).

Note that one conceivable example of the procedure related to receiving power 8208 is a procedure like those in Embodiment 11 and Embodiment 12, but the method used for the procedure related to receiving power 8208 is not limited to these examples.

Figure 83:
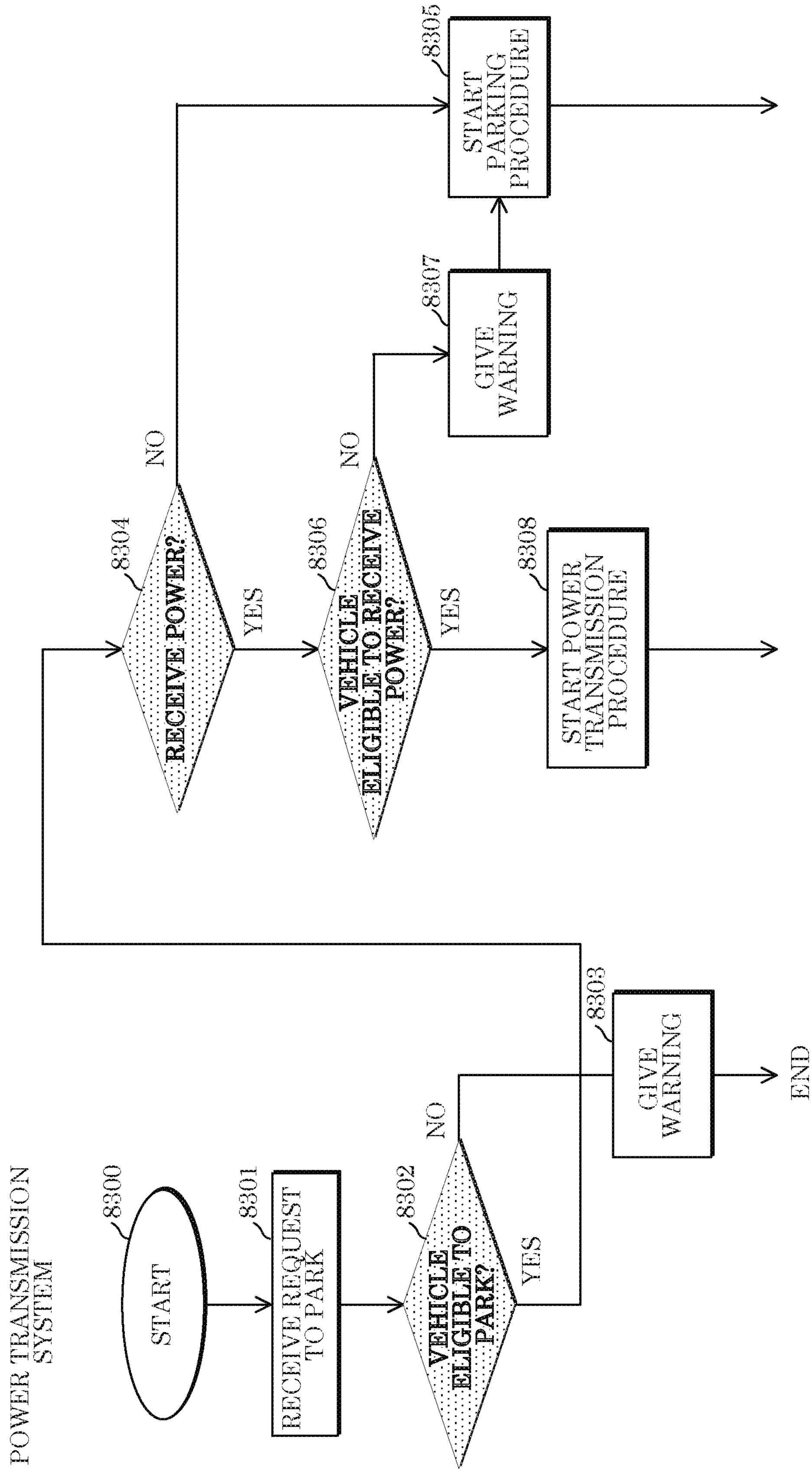
FIG. 83 relates to operations performed by a power transmission system.

FIG. 83 relates to operations performed by power transmission system 7100.

Power transmission system 7100 receives a request to park (8301) from the communication device included in vehicle 8100.

Next, power transmission system 7100 communicates with vehicle 8100 as described in FIG. 82 to determine whether vehicle 8100 is a vehicle that is eligible to park or not (8302). Note that details regarding this process are as described with reference to FIG. 82.

Power transmission system 7100 determines whether vehicle 8100 is eligible to park or not (8302), and when power transmission system 7100 determines that vehicle 8100 is not eligible to park, that is to say, determines that the answer to 8302 is NO, power transmission system 7100 transmits a modulated signal including warning information (8303).

Power transmission system 7100 determines whether vehicle 8100 is eligible to park or not (8302), and when power transmission system 7100 determines that vehicle 8100 is eligible to park, that is to say, determines that the answer to 8302 is YES, power transmission system 7100 transmits a modulated signal including information indicating that vehicle 8100 is eligible to park.

Power transmission system 7100 then receives, from vehicle 8100, information on whether vehicle 8100 will receive power or not (8304).

When the information on whether vehicle 8100 will receive power or not (8304) indicates that vehicle 8100 will not receive power, that is to say, when the answer to 8304 is NO, the procedure proceeds to 8305. Power transmission system 7100 then notifies vehicle 8100 of the start of the procedure related to parking (8305).

Note that one conceivable example of the procedure related to parking 8305 is a procedure like that in Embodiment 12, but the method used for the procedure related to parking 8305 is not limited to this example.

When the information on whether vehicle 8100 will receive power or not (8304) indicates that vehicle 8100 will receive power, that is to say, when the answer to 8304 is YES, the procedure proceeds to 8306. Then, power transmission system 7100 determines whether vehicle 8100 is a vehicle that is eligible to receive power or not (8306).

When power transmission system 7100 determines that vehicle 8100 is not eligible to receive power, that is to say, when the answer to 8306 is NO, power transmission system 7100 warns (8307) vehicle 8100, and notifies vehicle 8100 of the start of the procedure for parking (8305).

On the other hand, when power transmission system 7100 determines that vehicle 8100 is eligible to receive power, that is to say, when the answer to 8306 is YES, power transmission system 7100 notifies vehicle 8100 of the start of the procedure for transmitting power (8308).

Note that one conceivable example of the procedure related to receiving power 8308 is a procedure like those in Embodiment 11 and Embodiment 12, but the method used for the procedure related to receiving power 8308 is not limited to these examples.

As described above, by implementing a warning related to parking eligibility and a warning related to power reception eligibility, it is possible to achieve the advantageous effect that it is possible to accurately provide services to vehicles that are eligible to park and vehicles that are eligible to receive power.

Next, operations illustrated in FIG. 84, which differ from those in FIG. 82, and operations illustrated in FIG. 85, which differ from those in FIG. 83, will be described.

Figure 84:
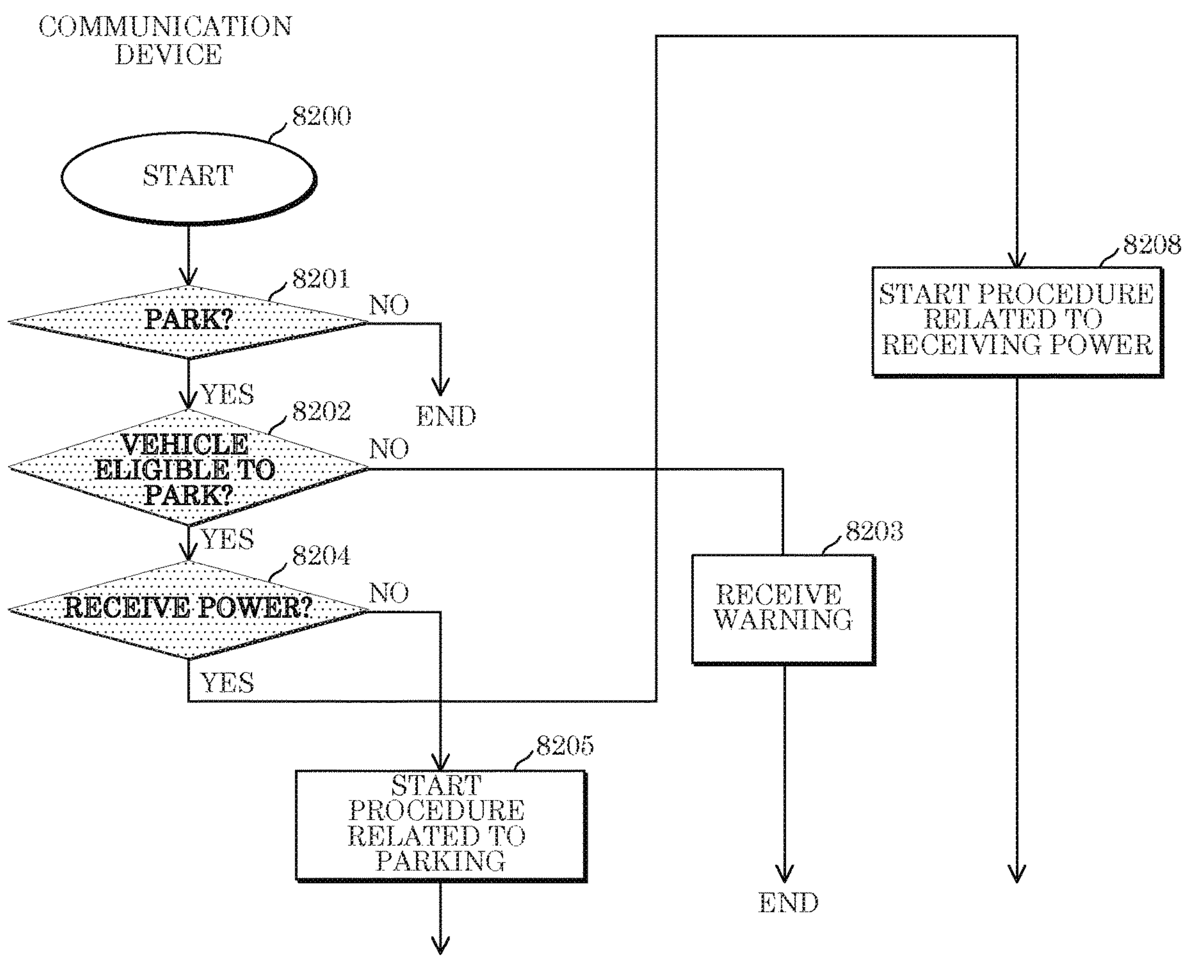
FIG. 84 relates to operations related to a communication device included in a vehicle.

FIG. 84 differs from FIG. 82 in that it relates to operations related to the communication device included in vehicle 6902 illustrated in FIG. 69 (vehicle 8100 illustrated in FIG. 81). Note that in FIG. 84, elements which operate in the same manner as those in FIG. 82 are assigned the same reference signs.

Vehicle 8100 illustrated in FIG. 81 first accesses power transmission system 7100 illustrated in FIG. 71, FIG. 77 and FIG. 78. Then, a procedure screen is displayed on the display included 8100 illustrated in FIG. 81, whereby the operations illustrated in FIG. 84 are performed. Next, FIG. 84 will be described.

Upon start (8200), the following procedure starts.

As illustrated in FIG. 82, vehicle 8100 illustrated in FIG. 81 tells power transmission system 7100 whether vehicle 8100 will park in the parking lot or not (8201). For example, when the communication device included in vehicle 8100 has the configuration illustrated in FIG. 81, transceiver 7011 generates and outputs transmission signal 7012 including information on whether vehicle 8100 will park or not, and outputs transmission signal 7012 as radio waves from communication antenna 7014. Power transmission system 7100 then receives this signal.

When vehicle 8100 will not park in the parking lot, that is to say, when the answer is NO to 8201, the procedure ends. On the other hand, when vehicle 8100 will park in the parking lot, that is to say, when the answer is YES to 8201, the procedure proceeds to the next step.

Next, determination for determining whether vehicle 8100 is a type of vehicle that may park in the parking lot is performed, that is to say, vehicle 8100 communicates with power transmission system 7100, and determines whether it is eligible to park or not (8202).

For example, when the communication device included in vehicle 8100 has the configuration illustrated in FIG. 81, transceiver 7011 generates and outputs transmission signal 7012 including information on the type of vehicle that vehicle 8100 is (for example, a truck, bus, or standard-sized automobile) and/or the model of vehicle that vehicle 8100 is, and outputs transmission signal 7012 as radio waves from communication antenna 7014.

Power transmission system 7100 receives this signal via communication antenna 7105, and transceiver 7108 included in the power transmission system obtains information on the type of vehicle that vehicle 8100 is (for example, a truck, bus, or standard-sized automobile) and/or the model of vehicle that vehicle 8100 is, determines whether vehicle 8100 is a type of vehicle that may park in the parking lot, generates and outputs modulated signal 7107 including information on the result of the determination, and outputs modulated signal 7107 from communication antenna 7105 as radio waves.

Vehicle 8100 receives this signal via communication antenna 7014, and transceiver 7011 obtains the determination result.

Note that the above operations will be described in even further detail later on.

When the result of the determination of whether the vehicle is eligible to park or not (8202) is that the vehicle is not eligible to park, that is to say, when the answer to 8202 is NO, vehicle 8100 receives a warning (8203), for example. In other words, vehicle 8100 knows that it is not eligible to park in the parking lot.

On the other hand, when the result of the determination of whether the vehicle is eligible to park or not (8202) is that the vehicle is eligible to park, that is to say, when the answer to 8202 is YES, the procedure proceeds to the next step.

The communication device included in vehicle 8100 tells power transmission system 7100 whether vehicle 8100 will receive power or not (8204). For example, when the communication device included in vehicle 8100 has the configuration illustrated in FIG. 81, controller 7003 outputs information indicating whether to receive power or not (7902) using first control signal 7007, transceiver 7011 generates and outputs transmission signal 7012 including this information, and outputs transmission signal 7012 from communication antenna 7014 as radio waves. Power transmission system 7100 then receives this signal. Note that controller 7003 in FIG. 81 may request the reception of power (7201) via an external input.

When vehicle 8100 will not receive power, that is to say, when the answer is NO to 8204, the procedure proceeds to 8205. Vehicle 8100 then starts the procedure related to parking (8205).

Note that one conceivable example of the procedure related to parking 8205 is a procedure like that in Embodiment 12, but the method used for the procedure related to parking 8205 is not limited to this example.

On the other hand, when vehicle 8100 will receive power, that is to say, when the answer is YES to 8204, the procedure proceeds to step 8208.

Vehicle 8100 then starts the procedure related to receiving power (8208).

Note that one conceivable example of the procedure related to receiving power 8208 is a procedure like those in Embodiment 11 and Embodiment 12, but the method used for the procedure related to receiving power 8208 is not limited to these examples.

Figure 85:
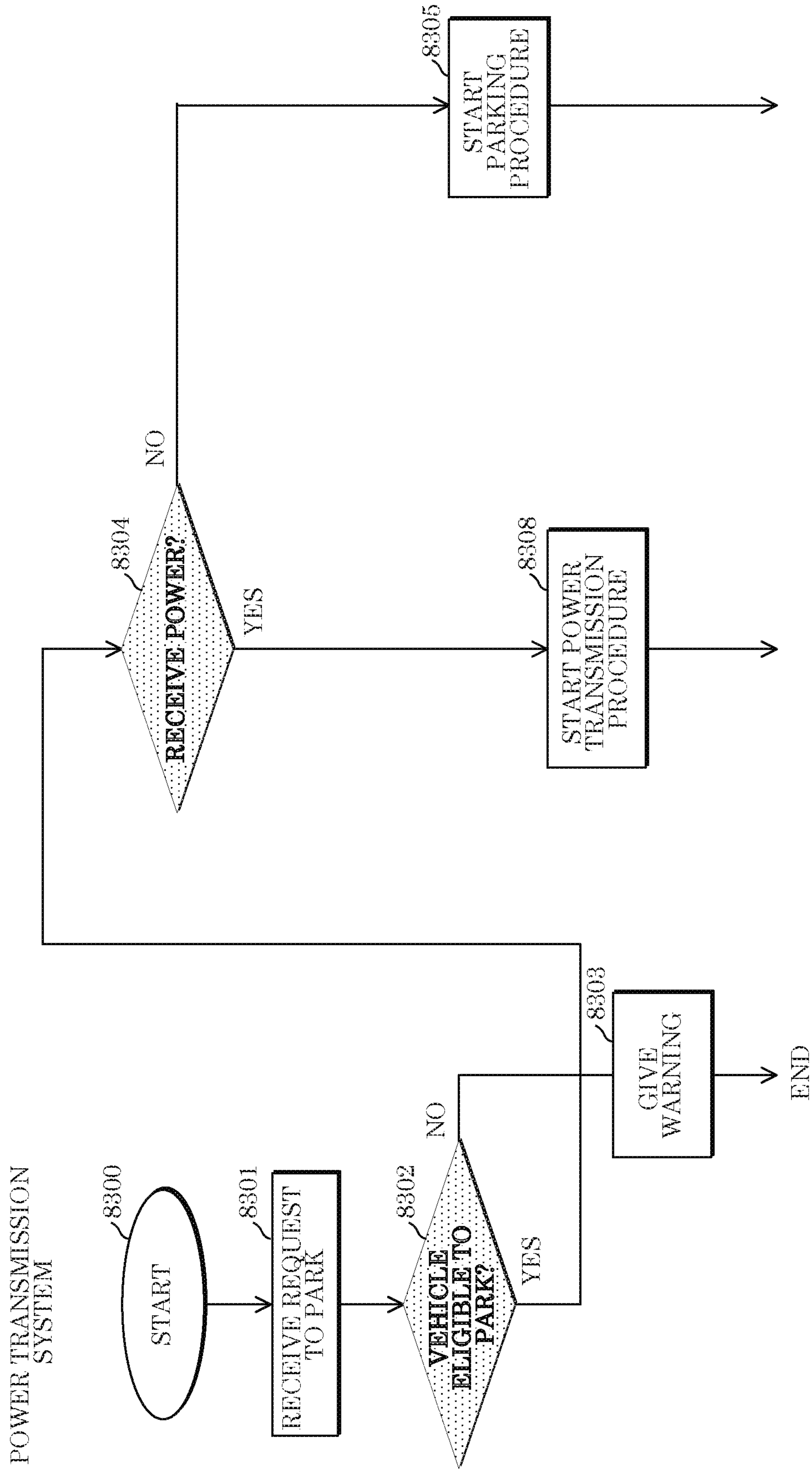
FIG. 85 relates to operations performed by a power transmission system.

FIG. 85 relates to operations performed by power transmission system 7100.

Power transmission system 7100 receives a request to park (8301) from the communication device included in vehicle 8100.

Next, power transmission system 7100 communicates with vehicle 8100 as described in FIG. 84 to determine whether vehicle 8100 is a vehicle that is eligible to park or not (8302). Note that details regarding this process are as described with reference to FIG. 84.

Power transmission system 7100 determines whether vehicle 8100 is eligible to park or not (8302), and when power transmission system 7100 determines that vehicle 8100 is not eligible to park, that is to say, determines that the answer to 8302 is NO, power transmission system 7100 transmits a modulated signal including warning information (8303).

Power transmission system 7100 determines whether vehicle 8100 is eligible to park or not (8302), and when power transmission system 7100 determines that vehicle 8100 is eligible to park, that is to say, determines that the answer to 8302 is YES, power transmission system 7100 transmits a modulated signal including information indicating that vehicle 8100 is eligible to park.

Power transmission system 7100 then receives, from vehicle 8100, information on whether vehicle 8100 will receive power or not (8304).

When the information on whether vehicle 8100 will receive power or not (8304) indicates that vehicle 8100 will not receive power, that is to say, when the answer to 8304 is NO, the procedure proceeds to 8305. Power transmission system 7100 then notifies vehicle 8100 of the start of the procedure related to parking (8305).

Note that one conceivable example of the procedure related to parking 8305 is a procedure like that in Embodiment 12, but the method used for the procedure related to parking 8305 is not limited to this example.

When the information on whether vehicle 8100 will receive power or not (8304) indicates that vehicle 8100 will receive power, that is to say, when the answer to 8304 is YES, the procedure proceeds to 8308. Power transmission system 7100 then notifies vehicle 8100 of the start of the procedure for transmitting power (8308).

Note that one conceivable example of the procedure related to receiving power 8308 is a procedure like those in Embodiment 11 and Embodiment 12, but the method used for the procedure related to receiving power 8308 is not limited to these examples.

As described above, by implementing a warning related to parking eligibility, it is possible to achieve the advantageous effect that it is possible to accurately provide services to vehicles that are eligible to park.

Next, a specific example of the determination for whether the vehicle is a vehicle that is eligible to park or not (8202) in FIG. 82 and FIG. 84 will be given.

Figure 86:
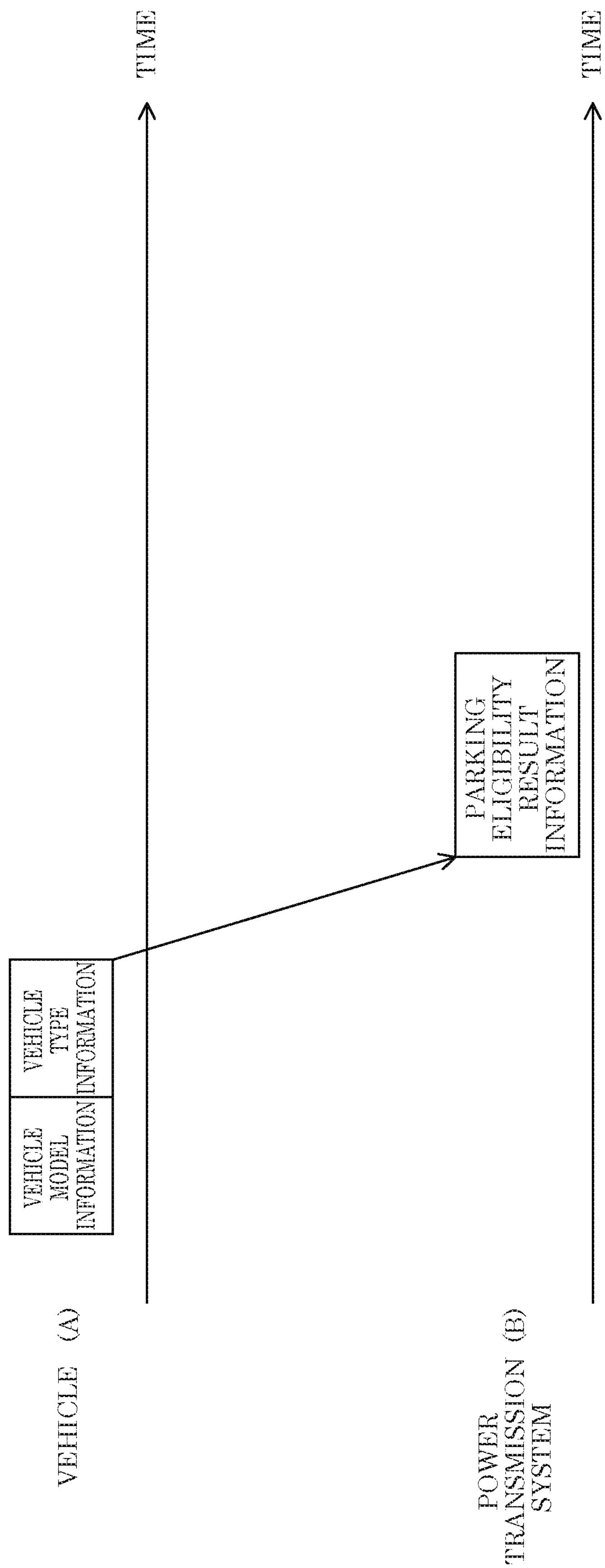
FIG. 86 illustrates an example of the flow of data between a vehicle and a power transmission system.

FIG. 86 illustrates one example of the flow of data between the vehicle and the power transmission system upon the communication device included in the power transmission system determining whether the vehicle is eligible to park or not (8202).

In FIG. 86, which illustrates a first example, the communication device included in the vehicle transmits a modulated signal including vehicle model information and vehicle type information. Note that the vehicle model information and the vehicle type information are the same as described above.

The communication device included in the power transmission system that received the modulated signal determines whether the vehicle that transmitted the modulated signal is eligible to park or not based on one or more of the vehicle model information and the vehicle type information included in the modulated signal, and transmits, to the communication device included in the vehicle, a modulated signal including parking eligibility result information. Note that details regarding these operations are as described above.

Figure 87:
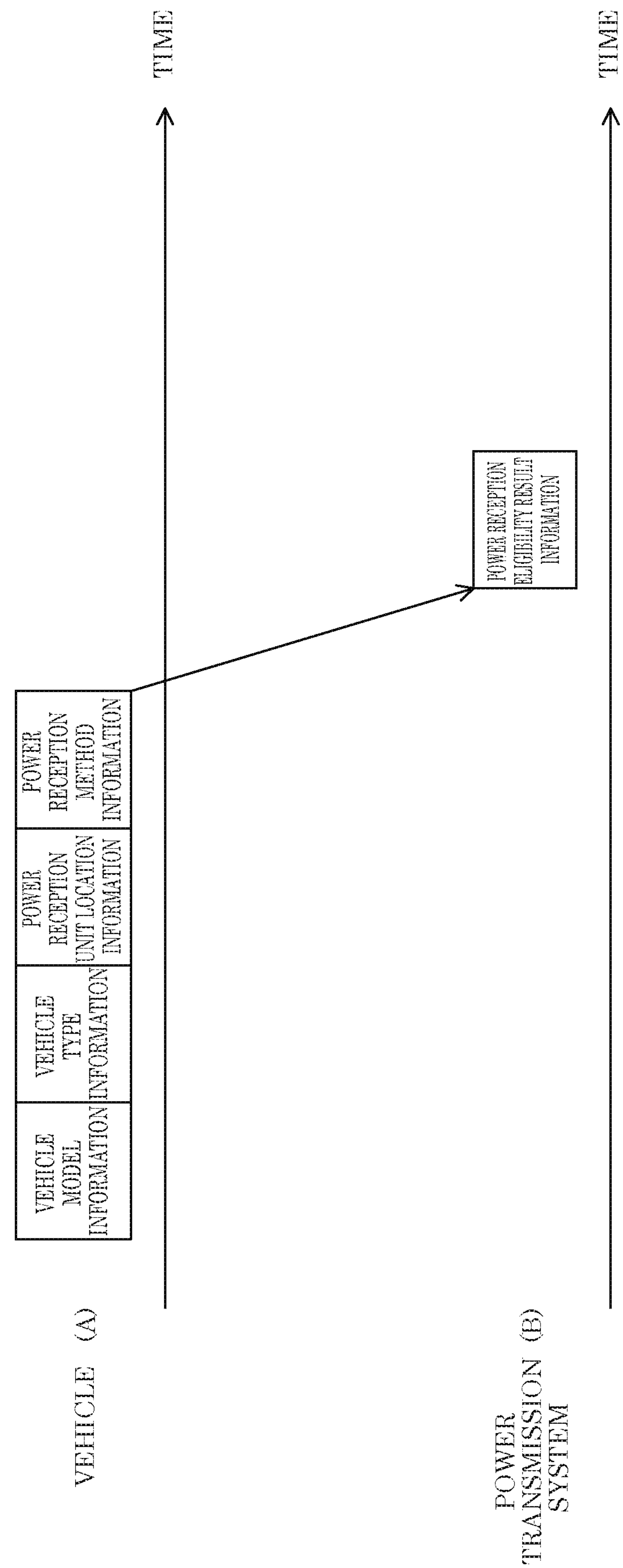
FIG. 87 illustrates an example of the flow of data between a vehicle and a power transmission system.

FIG. 87 illustrates an example, which differs from the example in FIG. 86, of the flow of data between the vehicle and the power transmission system upon the communication device included in the power transmission system determining whether the vehicle is eligible to park or not (8202).

In FIG. 87, which illustrates a second example, the communication device included in the vehicle transmits a modulated signal including vehicle model information, vehicle type information, power reception unit location information, and power reception method information. Note that the vehicle model information and the vehicle type information are the same as described above.

For example, when the power reception unit is located at the front of the vehicle, the power reception unit location information indicates that the power reception unit is located at the front of the vehicle.

In another example, when the power reception unit is located on the right-hand side at the back of the vehicle, the power reception unit location information indicates that the power reception unit is located on the right-hand side at the back of the vehicle.

Moreover, the information may include specific numerical values. For example, the power reception unit location information may indicate that the power reception unit is located 80 cm from the front of the vehicle and 50 cm from the right of the vehicle.

Moreover, for example, when the power reception method used by the vehicle supports wireless power reception, the power reception method information may indicate that the vehicle supports wireless power reception. On the other hand, when the power reception method used by the vehicle does not support wireless power reception, the power reception method information may indicate that the vehicle does not support wireless power reception.

The communication device included in the power transmission system that received the modulated signal determines whether the vehicle that transmitted the modulated signal is eligible to park or not based on one or more of the vehicle model information, the vehicle type information, the power reception unit location information, and the power reception method information included in the modulated signal, and transmits, to the communication device included in the vehicle, a modulated signal including parking eligibility result information. Note that an example of these operations has already been given above.

Hereinafter a different example will be given.

For example, when the communication device included in the power transmission system obtains the power reception method information illustrated in FIG. 87 and the power reception method information indicates that the vehicle does not support wireless power reception, the communication device included in the power transmission system generates, as power reception eligibility result information, information indicating that the vehicle is not eligible to receive power, and transmits this information to the communication device included in the vehicle.

As the next example, an example of operations performed when the power reception method information illustrated in FIG. 87 indicates that the vehicle supports wireless power reception will be given.

Figure 88:
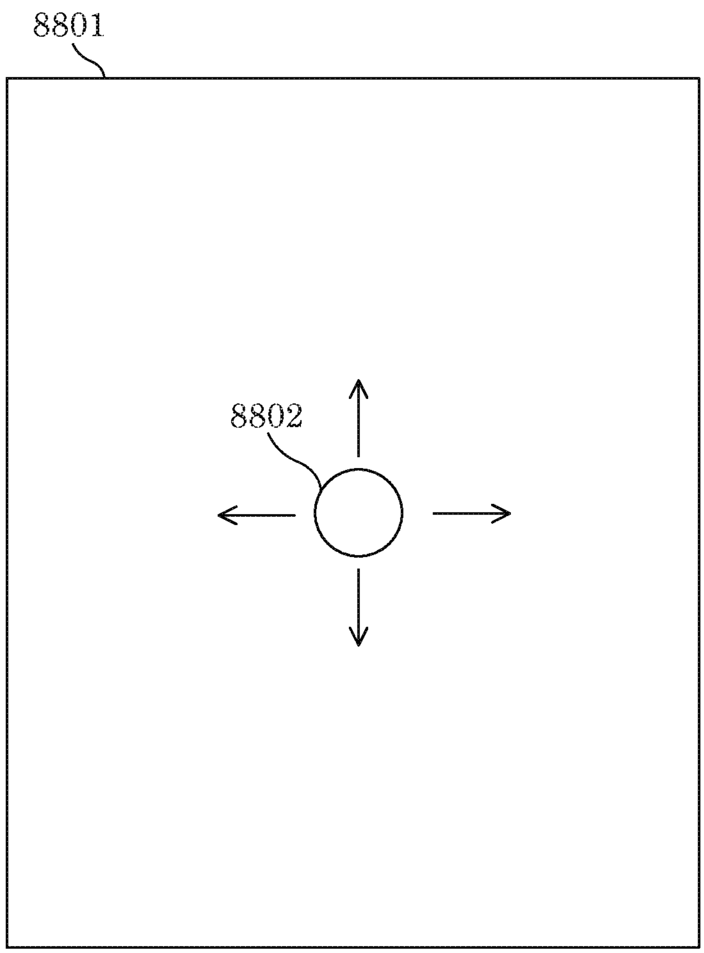
FIG. 88 illustrates one example of a vehicle parking space and a power transmission antenna in a parking lot.

8801 in FIG. 88 indicates a vehicle parking space in a parking lot. 8802 indicates a power transmission antenna included in the power transmission system. Note that in FIG. 88, in the power transmission system disposed at the parking space, the power transmission antenna portion is, except in rare cases, capable of moving up, down, left, and right at a given position.

As illustrated in FIG. 87, the communication device included in the vehicle transmits, to the communication device included in the power transmission system, vehicle model information, vehicle type information, power reception unit location information, and power reception method information. Note that in this example, as described above, the power reception method information indicates that the vehicle supports wireless power reception.

The power transmission system can then determine the following.

The power transmission system determines whether sufficient power can be transmitted to the vehicle or not based on the vehicle model information and the vehicle type information. For example, it is possible for the power transmission system to determine that sufficient power cannot be transmitted to the vehicle due to the power capacity of the power transmission system being insufficient. In such cases, the communication device included in the power transmission system notifies the vehicle with power reception eligibility result information indicating the vehicle is not eligible.

The power transmission system can move power transmission antenna unit 8802 in FIG. 88, based on the power reception unit location information. For example, moving power transmission antenna unit 8802 close to the location of the power reception antenna included in the vehicle has the advantage that vehicle charging efficiency can be improved. In cases in which the location of the power reception antenna varies from vehicle to vehicle, this gives the power transmission system the advantageous effect that more vehicles can be charged.

When, upon performing the above-described determination and control, the power transmission system determines that the vehicle can be charged, the communication device included in the power transmission system determines that the vehicle is eligible to receive power, and transmits this determination result, as power reception eligibility result information, to the communication device included in the vehicle.

Figure 89:
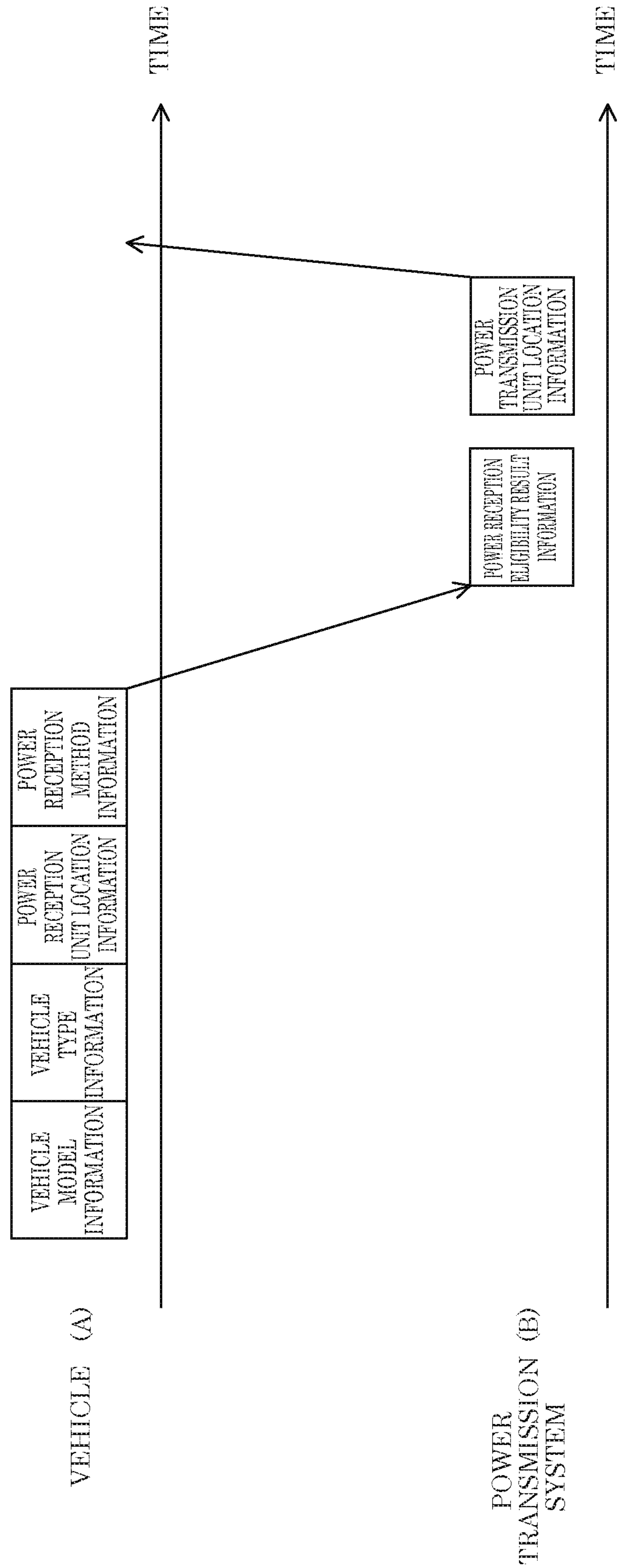
FIG. 89 illustrates an example of the flow of data between a vehicle and a power transmission system.

As another example, consider a case like that illustrated in FIG. 89.

For example, like in FIG. 89, the communication device included in the vehicle transmits a modulated signal including vehicle model information, vehicle type information, power reception unit location information, and power reception method information. Note that the vehicle model information and the vehicle type information are the same as described above.

For example, when the power reception unit is located at the front of the vehicle, the power reception unit location information indicates that the power reception unit is located at the front of the vehicle.

In another example, when the power reception unit is located on the right-hand side at the back of the vehicle, the power reception unit location information indicates that the power reception unit is located on the right-hand side at the back of the vehicle.

Moreover, the information may include specific numerical values. For example, the power reception unit location information may indicate that the power reception unit is located 80 cm from the front of the vehicle and 50 cm from the right of the vehicle.

Moreover, for example, when the power reception method used by the vehicle supports wireless power reception, the power reception method information may indicate that the vehicle supports wireless power reception. On the other hand, when the power reception method used by the vehicle does not support wireless power reception, the power reception method information may indicate that the vehicle does not support wireless power reception.

The communication device included in the power transmission system that received the modulated signal determines whether the vehicle that transmitted the modulated signal is eligible to park or not based on one or more of the vehicle model information, the vehicle type information, the power reception unit location information and the power reception method information included in the modulated signal, and transmits, to the communication device included in the vehicle, a modulated signal including parking eligibility result information. Note that an example of these operations has already been given above.

Furthermore, the communication device included in the power transmission system transmits, to the communication device included in the vehicle, power transmission unit location information.

For example, the power transmission unit location information is information indicating where, in the parking space illustrated in FIG. 88, power transmission antenna 8802 included in the power transmission system is located.

The vehicle having the configuration illustrated in FIG. 81 receives the power reception eligibility result information and the power transmission unit location information transmitted by the communication device included in the power transmission system in FIG. 89. The vehicle having the configuration illustrated in FIG. 81 knows whether power can be received in the parking space based on the power reception eligibility result information.

At this time, for example, the vehicle having the configuration illustrated in FIG. 81 knows that power can be received in the parking space, and based on the power transmission unit location information, the vehicle having the configuration illustrated in FIG. 81 controls vehicle controller 8101 to move itself so that the power reception antenna included in the vehicle is in a more favorable location that is closer to the location of the power transmission unit in the parking space.

Note that for the vehicle to move itself, the vehicle may use an image of the surrounding area to move the itself to a favorable location, may move itself to a favorable location while concurrently checking its location, and may move itself to a favorable location while concurrently monitoring the power/amount of power at the power reception antenna included in the vehicle. The vehicle may use any sort of information to move itself to a favorable location.

Note that while the vehicle is moving while in the process of parking, the communication device included in the vehicle may transmit, to the communication device included in the power transmission system, information such as the power reception unit location information, information on the amount of power received by the power reception unit, and information on estimated distance (positional relationship) between the power reception unit and the power transmission unit. Moreover, while the vehicle is moving while in the process of parking, the communication device included in the power transmission system may transmit, to the communication device included in the vehicle, information such as the power transmission unit location information, information on the amount of power transmitted by the power transmission unit, and information on estimated distance (positional relationship) between the power reception unit and the power transmission unit.

While the vehicle is moving to park in the parking spot, the power transmission system may move the location of the power transmission antenna included in the power transmission system to a favorable location.

As another example, after the vehicle has parked in the parking spot, the power transmission system may move the location of the power transmission antenna included in the power transmission system to a favorable location.

In yet another example, the power transmission system may first move the location of the power transmission antenna included in the power transmission system, and then the vehicle may move itself into the parking spot.

Here, one important point is that the communication device included in the vehicle transmits the power reception unit location information to the communication device included in the power transmission system, and the communication device included in the power transmission system transmits the power transmission unit location information to the communication device included in the vehicle, and control of the parking position of the vehicle and/or control of the location of the power transmission antenna included in the power transmission system is carried out.

Examples of methods used for the vehicle to autonomously park in a parking space include the following: the vehicle recognizes the parking space, takes control of the driving of the vehicle, and parks in the parking space; the communication device included in the vehicle and the communication device included in the power transmission system communicate, the communication device included in the vehicle and the communication device included in the power transmission system share information on the positional relationship between the power reception unit and the power transmission unit, and the communication device included in the vehicle and the communication device included in the power transmission system share information on the positional relationship between the vehicle and the parking space, whereby the vehicle can take control of the driving and park in the parking space.

In the above example, the power transmission system can move the location of the power transmission antenna included in the power transmission system, but this example is not limiting; the location of the power transmission antenna included in the power transmission system may be fixed relative to the parking space. In such cases, the vehicle can autonomously move itself into a favorable location so as to move the power reception antenna into a favorable location, to achieve high charging efficiency. At this time, in order to change the location to a favorable location, the communication device included in the vehicle may transmit the power reception unit location information to the communication device included in the power transmission system. Moreover, the communication device included in the power transmission system may transmit the power transmission unit location information. Note that the power transmission unit location information may indicate where in the parking space the power transmission unit is located (for example, at the front or right-hand side of the parking space), and may include specific numerical values, such as, in cases where there is a white line in the parking space, information indicating “3 meters behind the white line” or “2 meters from the right-hand side of the white line”.

Note that the power transmission antenna included in the power transmission system may be configured of a plurality of antennas and perform transmission beamforming. In such cases, the power transmission system can perform favorable power transmission by switching the beamforming method by using the power reception unit location information that the vehicle transmits, which is shown in FIG. 88 and FIG. 89. Note that the location of the power transmission antenna may be changeable and, alternatively, may be fixed.

Moreover, the power reception antenna included in the vehicle may be configured of a plurality of antennas and perform reception beamforming. In such cases, the vehicle can perform favorable power reception by switching the beamforming method by using the power transmission unit location information transmitted by the power transmission system, which is shown in FIG. 89.

As described above, by implementing the present embodiment, it is possible to screen for vehicles that are eligible to park and allow them to park, which achieves the advantageous effect that the rate of operation of the power transmission system can be improved. Moreover, it is possible to achieve the advantageous effect of an improved charging efficiency, by favorably controlling the location(s) of the power transmission antenna and/or power reception antenna.

Note that the communication between the communication device included in the vehicle and the power transmission system in the present embodiment may be wireless communication via radio waves, and, alternatively, may be optical communication via visible light.

Embodiment 14

In the present embodiment, a communication method and a device in a system that uses a first wireless communication method having a frequency band of A [Hz] (A is a real number greater than 0) and a second wireless communication method having a frequency band of B [Hz] (B is a real number greater than 0) will be described. The communication system, communication device, and communication method according to the present embodiment may improve frequency-usage efficiency or may facilitate an improvement in data transmission speeds in the system. Note that frequency bands A and B in, for example, Embodiment 9 and Embodiment 10 also satisfy the conditions that A is a real number greater than 0 and B is a real number greater than 0.

Figure 90A:
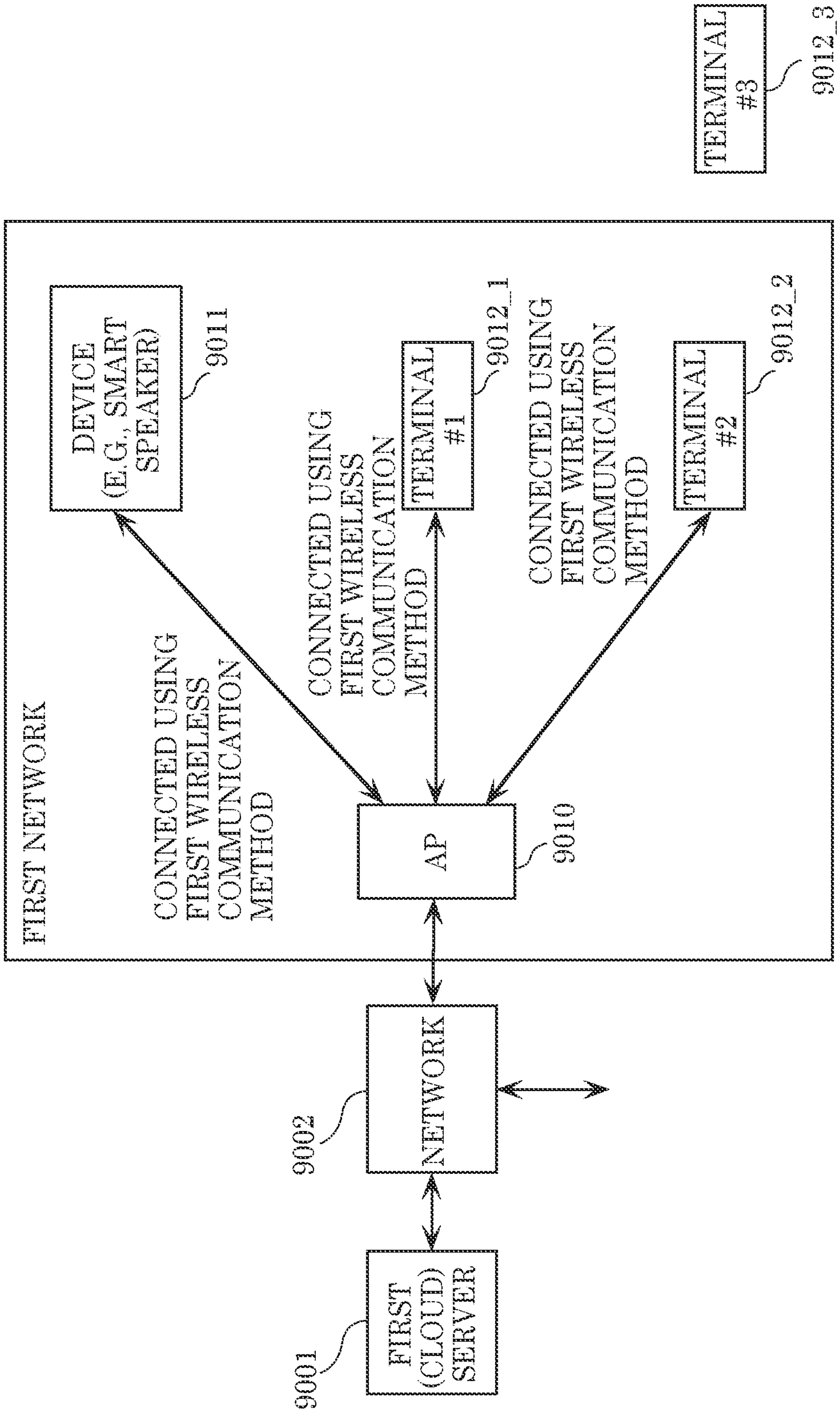
FIG. 90A illustrates an example of a configuration of a communication system.

FIG. 90A illustrates one example of a configuration of a communication system according to the present embodiment. Access point (AP) 9010 communicates with first server 9001 via network 9002. Although the terminology “AP” is used, so long as this element is a communication device such as a base station, a gateway, or a repeater device, the embodiment can be implemented in the same manner. Although the terminology “first server” is used, this element may be referred to as a cloud server or by some name other than server.

AP 9010 is capable of communicating, via network 9002, with a device other than first server 9001. First server 9001 is also capable of communicating, via network 9002, with a device other than AP 9010.

In FIG. 90A, the first network is a network configured using the first wireless communication method.

In FIG. 90A, AP 9010 and device 9011 communicate using the first wireless communication method.

AP 9010 and terminal #1 labeled 9012_1 communicate using the first wireless communication method.

AP 9010 and terminal #2 labeled 9012_2 communicate using the first wireless communication method.

Terminal #3 labeled 9012_3 includes a transceiver device for transmitting and receiving modulated signals conforming to the first wireless communication method, but terminal #3 labeled 9012_3 is exemplified as being outside of an area in which communication with AP 9010 using the first wireless communication method is possible.

Figure 90B:
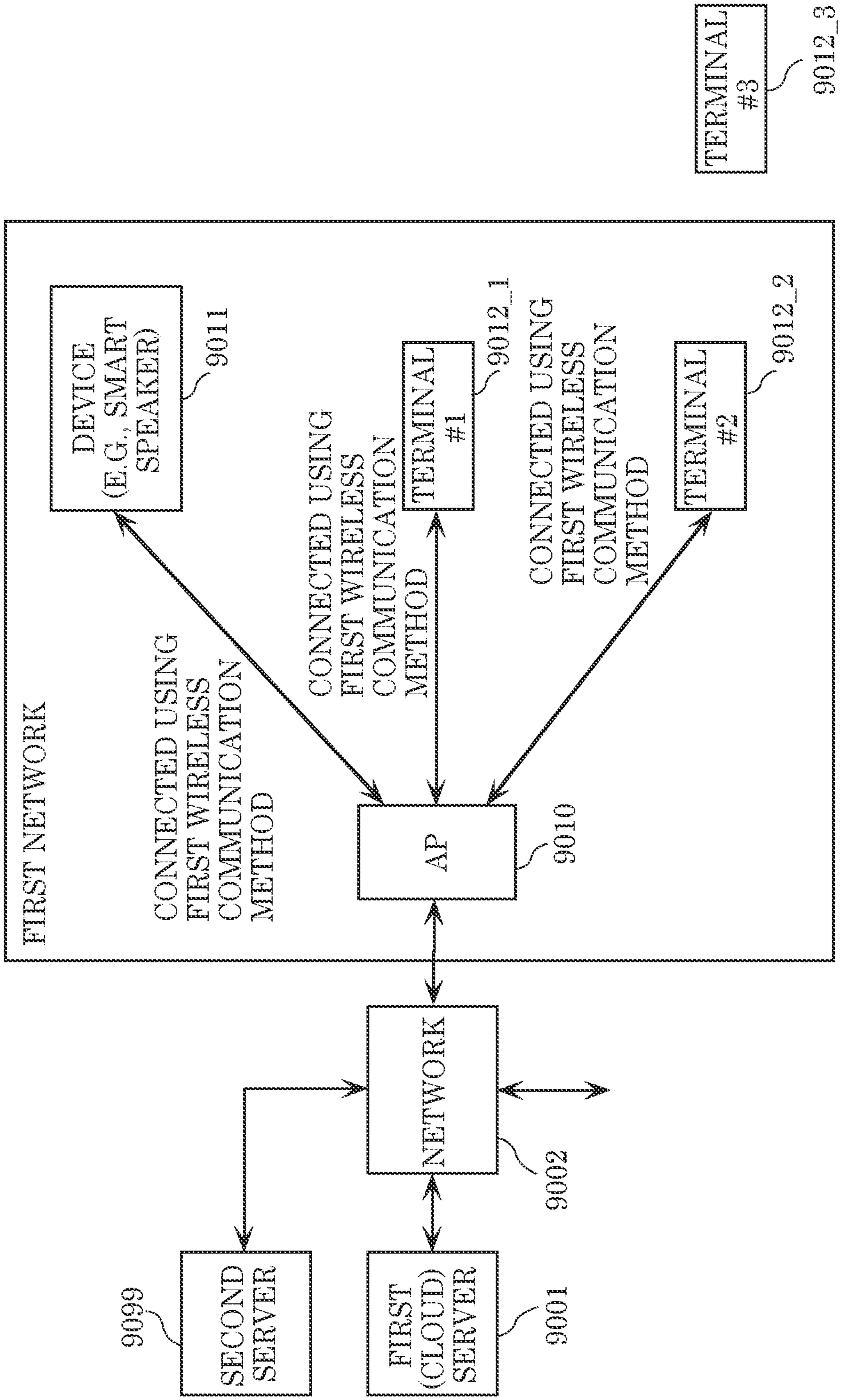
FIG. 90B illustrates an example of a configuration of a communication system.

FIG. 90B illustrates an example of a configuration of the communication system according to the present embodiment that differs from the example illustrated in FIG. 90A. Note that elements that are the same as those in FIG. 90A have the same reference signs.

AP 9010 communicates with first server 9001 via network 9002. AP 9010 communicates with second server 9099 via network 9002.

AP 9010 is also capable of communicating, via network 9002, with a device other than first server 9001 or second server 9099. First server 9001 and second server 9101 are also capable of communicating, via network 9002, with a device other than AP 9010.

In FIG. 90B, the first network is a network configured using the first wireless communication method.

In FIG. 90B, AP 9010 and device 9011 communicate using the first wireless communication method.

AP 9010 and terminal #1 labeled 9012_1 communicate using the first wireless communication method.

AP 9010 and terminal #2 labeled 9012_2 communicate using the first wireless communication method.

Terminal #3 labeled 9012_3 includes a transceiver device for transmitting and receiving modulated signals conforming to the first wireless communication method, but terminal #3 labeled 9012_3 is exemplified as being outside of an area in which communication with AP 9010 using the first wireless communication method is possible.

Next, an example of procedures implemented by each device in the communication system illustrated in FIG. 90A and FIG. 90B will be described with reference to FIG. 91, FIG. 92A, and FIG. 92B.

Figure 91:
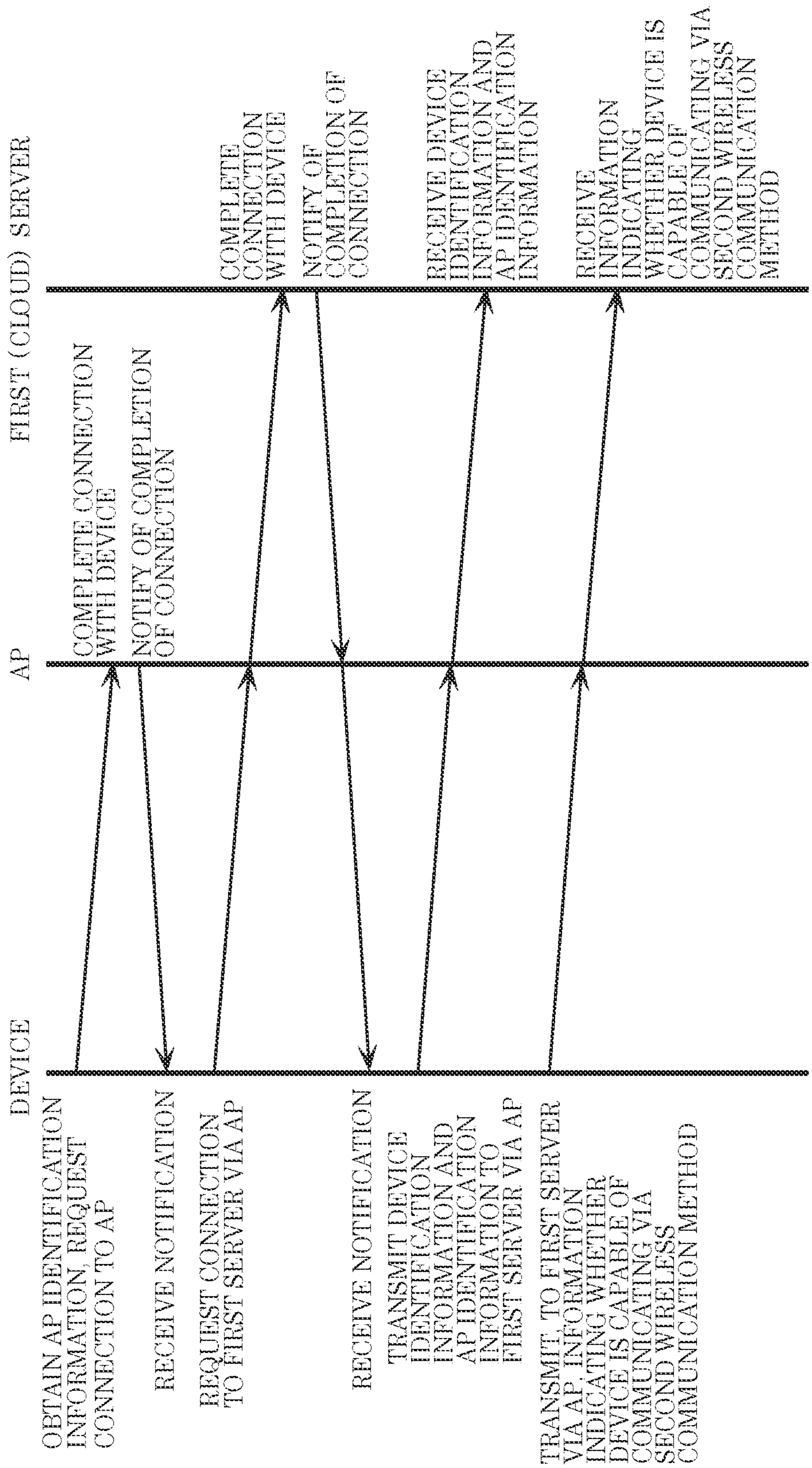
FIG. 91 illustrates one example of procedures for communicating in a communication system.

FIG. 91 illustrates one example of communication between device 9011, AP 9010, and first (cloud) server 9001. Note that the first wireless communication method is used for the communication between AP 9010 and device 9011.

First, device 9011 obtains identification information that identifies AP 9010, such as the service set identifier (SSID) of AP 9010, and requests connection to AP 9010 that corresponds to the obtained SSID.

AP 9010 receives the connection request from device 9011, and AP 9010 and device 9011 complete the connection. For example, AP 9010 transmits information indicating "connection complete" to device 9011, and device 9011 receives this information.

Device 9011 then requests connection to first server 9001 via AP 9010 (and network 9002). Device 9011 and first server 9001 then complete the connection. First server 9001 notifies device 9011 of the completion of the connection.

Device 9011 transmits identification information that identifies device 9011 (for example, an identification number) and identification information that identifies AP 9010, such as information indicating the SSID of AP 9010, to first server 9001. Note that this information is transmitted via AP 9010 (and network 9002).

First server 9001 thus obtains and stores the identification information that identifies device 9011 and the identification information that identifies AP 9010.

Device 9011 transmits information indicating whether device 9011 is capable of communicating via the second wireless communication method or not, and first server 9001 obtains this information via AP 9010 (and network 9002), and stores this information.

Consequently, first server 9001 possesses information indicating whether device 9011 is capable of communicating via the second wireless communication method.

Figure 92A:
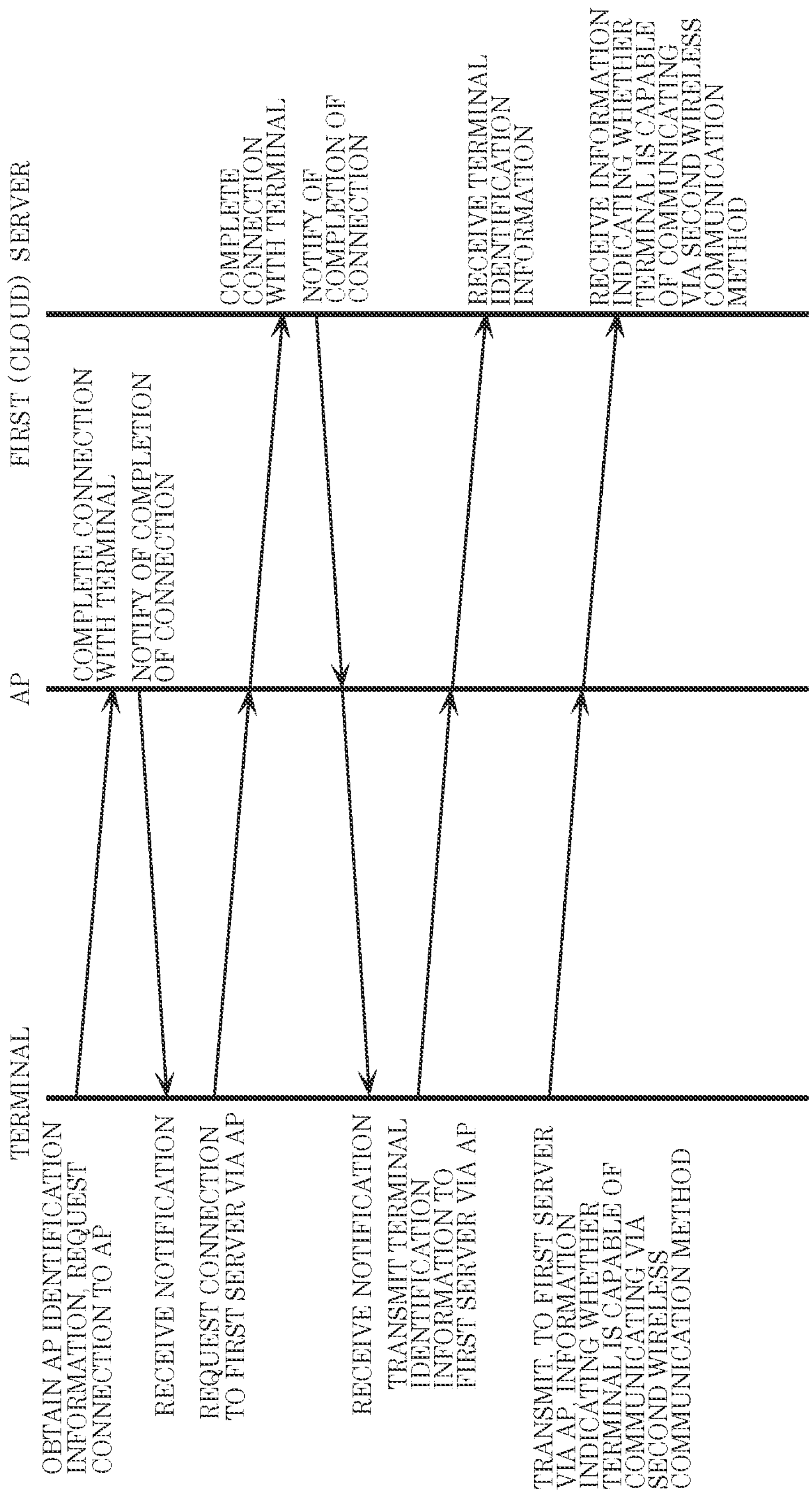
FIG. 92A illustrates one example of procedures for communicating in a communication system.

FIG. 92A illustrates one example of communication between (i) terminal #1 labeled 9012_1, terminal #2 labeled 9012_2, or terminal #3 labeled 9012_3, (ii) AP 9010, and (iii) first server 9001. Hereinafter, "terminal #1 labeled 9012_1, terminal #2 labeled 9012_2, or terminal #3 labeled 9012_3" will be referred to as "terminal". Note that terminal #3 labeled 9012_3 performs the procedures illustrated in FIG. 92A upon entering the communication area of first network. The first wireless communication method is used for the communication between AP 9010 and the terminal.

First, the terminal obtains identification information that identifies AP 9010, such as the SSID of AP 9010, and requests connection to AP 9010 that corresponds to the obtained SSID.

AP 9010 receives the connection request from the terminal, and the terminal and AP 9010 complete the connection. For example, AP 9010 transmits information indicating "connection complete" to the terminal, and the terminal receives this information.

The terminal requests connection to first server 9001 via AP 9010 (and network 9002). The terminal and first server 9001 complete the connection. First server 9001 notifies the terminal of the completion of the connection.

The terminal transmits identification information that identifies the terminal (for example, an identification number) and identification information that identifies AP 9010, such as information indicating the SSID of AP 9010, to first server 9001. Note that this information is transmitted via AP 9010 (and network 9002).

First server 9001 thus obtains and stores the identification information that identifies the terminal and the identification information that identifies AP 9010.

As a result of the procedures illustrated in FIG. 91 and FIG. 92A, first server 9001 knows that the first network is configured of AP 9010, device 9011, terminal #1 labeled 9012_1, and terminal #2 labeled 9012_2.

The terminal transmits information indicating whether the terminal is capable of communicating via the second wireless communication method or not, and first server 9001 obtains this information via AP 9010 (and network 9002), and stores this information.

Consequently, first server 9001 possesses information indicating whether each terminal is capable of communicating via the second wireless communication method.

Figure 92B:
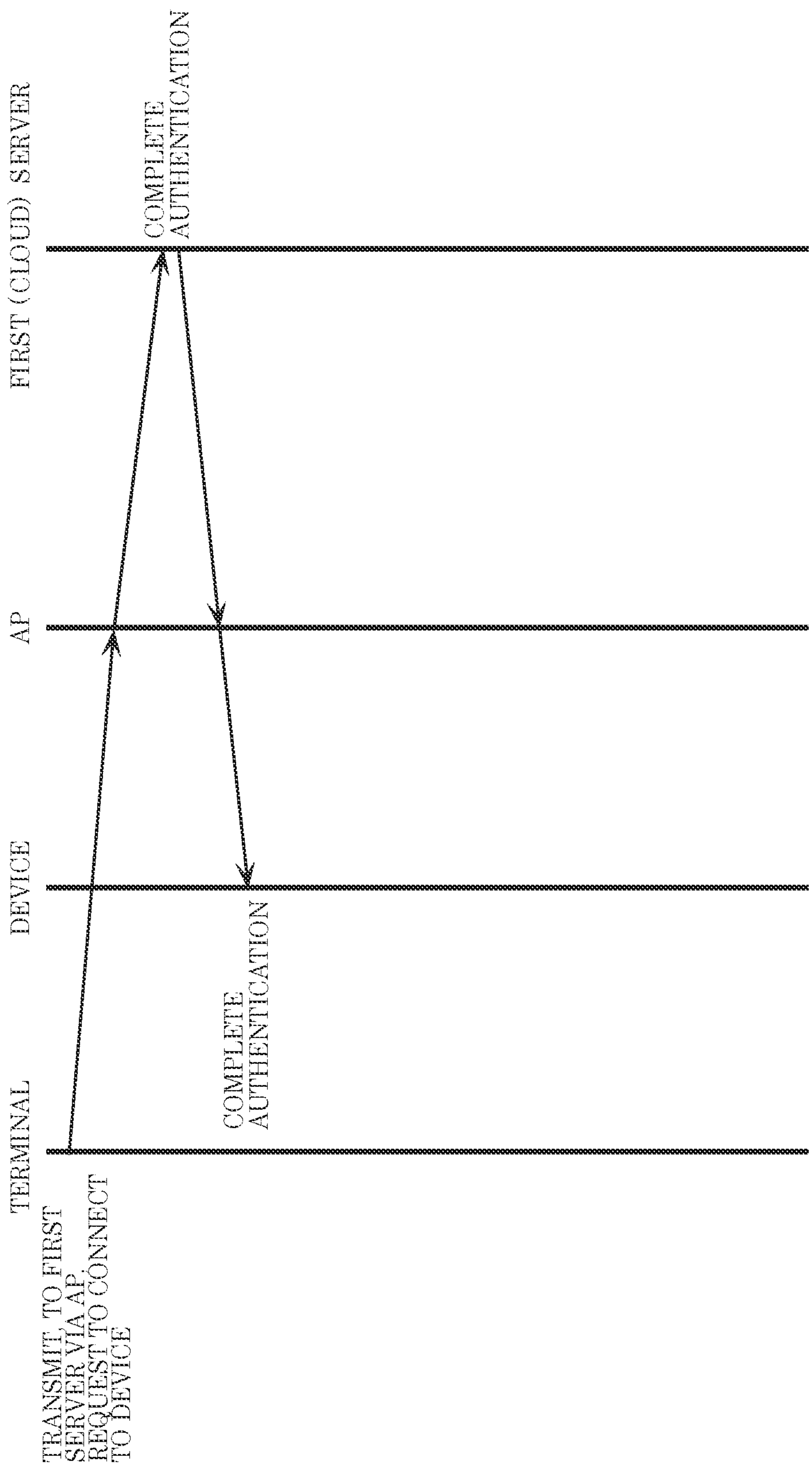
FIG. 92B illustrates one example of procedures for communicating in a communication system.

FIG. 92B illustrates one example of communication between the terminal, device 9011, AP 9010, and first server 9001 performed after the procedures illustrated in FIG. 91 and FIG. 92A. Note that the first wireless communication method is used for the communication between the terminal and AP 9010 as well as the communication between device 9011 and AP 9010.

The terminal transmits, to first server 9001, a request to connect to device 9011. Here, since first server 9001 knows that the terminal, AP 9010, and device 9011 belong to the first network as a result of the procedures illustrated in FIG. 91 and FIG. 92A, authentication for the terminal to connect to device 9011 is completed and connection is permitted. First server 9001 then notifies device 9011 that connection between the terminal and device 9011 is permitted.

Accordingly, thereafter, the communication of data between the terminal and device 9011 using the first network is performed via AP 9010 and first server 9001.

Although the above describes the communication of data between the terminal and device 9011 as being performed via AP 9010 and first server 9001, first server 9001 is not required to relay the data or control information or the like transmitted from the terminal to device 9011 or from device 9011 to the terminal. For example, based on an instruction from first server 9001, AP 9010 may forward, to device 9011, data transmitted from the terminal, and may forward, to the terminal, data transmitted from device 9011. Upon being notified by AP 9010 or first server 9001 that connection between the terminal and device 9011 is permitted, the terminal may specify the address of device 9011 as the destination of the packet including data to be transmitted to device 9011 and transmit the packet, and AP 9010 may determine the forwarding destination of the packet based on address information that indicates the destination and is included in the packet, and transmit the relay packet to device 9011 or the network to which device 9011 is connected. Similarly, upon being notified by AP 9010 or first server 9001 that connection between the terminal and device 9011 is permitted, device 9011 may specify the address of the terminal as the destination of the packet including data to be transmitted to the terminal and transmit the packet, and AP 9010 may determine the forwarding destination of the packet based on address information that indicates the destination and is included in the packet, and transmit the relay packet to the terminal or the network to which the terminal is connected.

Next, the configuration of each device will be described.

Figure 93:
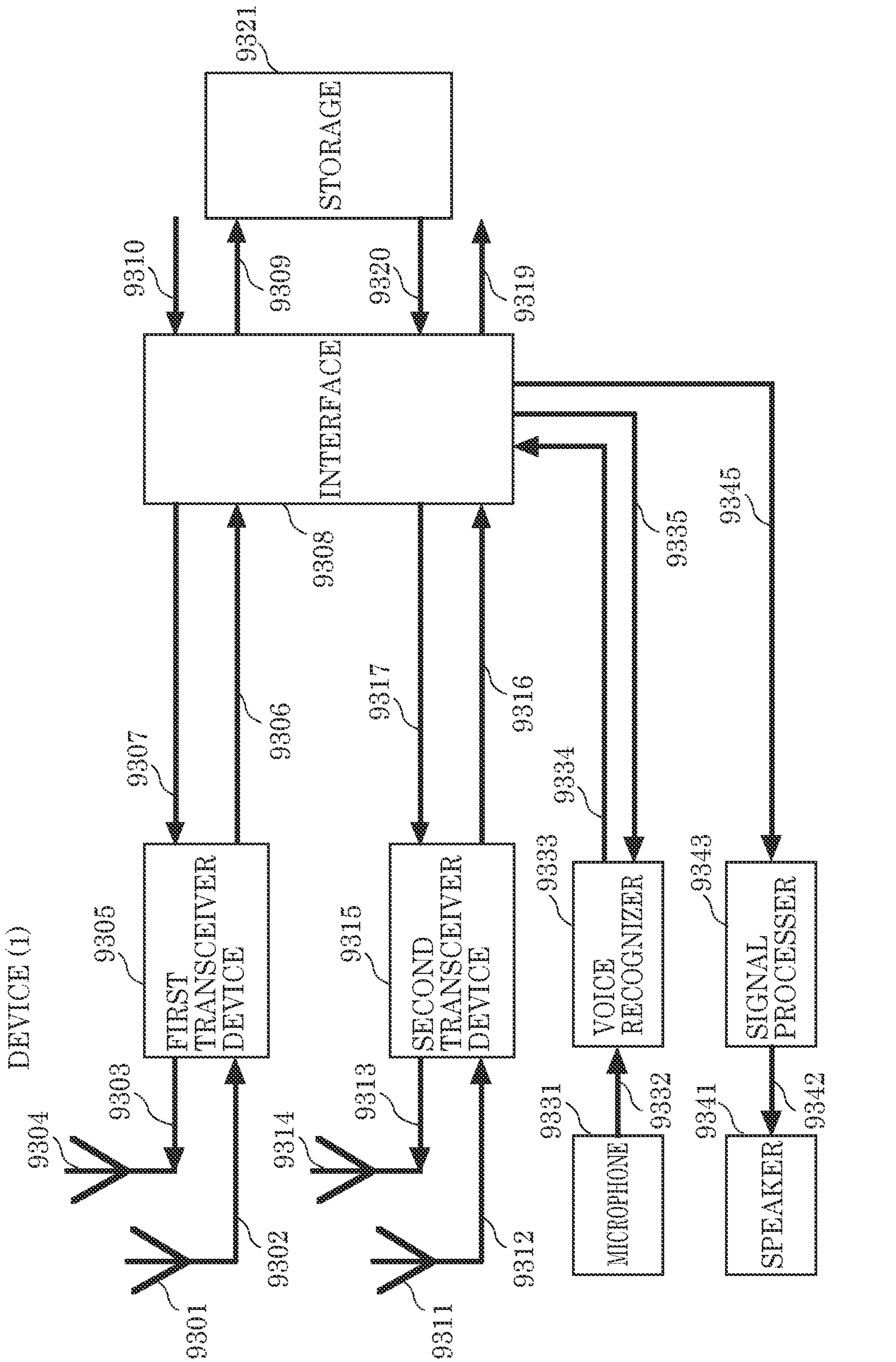
FIG. 93 illustrates an example of a configuration of a device.

FIG. 93 illustrates a first example of the configuration of device 9011 that is illustrated in, for example, FIG. 90A and FIG. 90B. Here, device 9011 includes first transceiver device 9305 that performs transmission and reception in accordance with the first wireless communication method, and second transceiver device 9315 that performs transmission and reception in accordance with the second wireless communication method.

First transceiver device 9305 receives an input of received signal 9302 received by antenna 9301, performs processing such as demodulation and error correction decoding, and outputs first received data 9306. In the examples illustrated in FIG. 90A and FIG. 90B, first transceiver device 9305 receives a modulated signal transmitted by AP 9010.

First transceiver device 9305 receives an input of first transmission data 9307, performs processing such as error correction coding, modulation (mapping), and frequency conversion, and generates and outputs transmission signal 9303. Transmission signal 9303 is output as radio waves from antenna 9304. In the examples illustrated in FIG. 90A and FIG. 90B, the first transceiver device transmits a modulated signal to AP 9010.

Second transceiver device 9315 receives an input of received signal 9312 received by antenna 9311, performs processing such as demodulation and error correction decoding, and outputs second received data 9316.

Second transceiver device 9315 receives an input of second transmission data 9317, performs processing such as error correction coding, modulation (mapping), and frequency conversion, and generates and outputs transmission signal 9313. Transmission signal 9313 is output as radio waves from antenna 9314.

Usage of the second wireless communication scheme will be described later.

Signal processor 9343 receives an input of speaker-related data group 9345. Here, for example, speaker-related data group 9345 is configured of data for updating an algorithm, and audio data.

When speaker-related data group 9345 includes audio data, signal processor 9343 implements signal processing on the audio data and outputs audio signal 9342, whereby sound based on audio signal 9342 is reproduced by speaker 9341.

When speaker-related data group 9345 includes data for updating an algorithm, signal processor 9343 updates, based on the data for updating an algorithm, an algorithm in the signal processing method used by signal processor 9343.

Voice recognizer 9333 receives an input of audio signal 9332 obtained by microphone 9331, implements, for example, signal processing for voice recognition on audio signal 9332, and outputs audio data 9334.

Voice recognizer 9333 receives an input of data for updating algorithm 9335, and, for example, updates the algorithm for the signal processing used in the voice recognition.

Next, a number of operation examples of interface 9308 will be given.

When interface 9308 obtains first received data 9306, interface 9308 outputs any of interface output data 9309, interface output data 9319, algorithm update data 9335, and speaker-related data group 9345.

For example, in FIG. 90A, when first server 9001 transmits algorithm update data for voice recognizer 9333 to device 9011 via network 9002 and AP 9010, interface 9308 obtains first received data 9306 and outputs algorithm update data 9335.

In FIG. 90A, when first server 9001 transmits algorithm update data for signal processor 9343 to device 9011 via network 9002 and AP 9010, interface 9308 obtains first received data 9306 and outputs speaker-related data group 9345 including the algorithm update data.

In FIG. 90A, when first server 9001 transmits audio data of an audio signal output from speaker 9342 via network 9002 and AP 9010, interface 9308 obtains first received data 9306 and outputs speaker-related data group 9345 including the audio data.

In FIG. 90B, when second server 9099 transmits algorithm update data for voice recognizer 9333 to device 9011 via network 9002 and AP 9010, interface 9308 obtains first received data 9306 and outputs algorithm update data 9335.

In FIG. 90B, when second server 9099 transmits algorithm update data for signal processor 9343 to device 9011 via network 9002 and AP 9010, interface 9308 obtains first received data 9306 and outputs speaker-related data group 9345 including the algorithm update data.

In FIG. 90B, when second server 9099 transmits audio data of an audio signal output from speaker 9342 via network 9002 and AP 9010, interface 9308 obtains first received data 9306 and outputs speaker-related data group 9345 including the audio data.

In the example in FIG. 90B, second server 9099 is a server for voice recognition and audio output.

When interface 9308 obtains second received data 9316, interface 9308 outputs either interface output data 9309 or interface output data 9319.

Interface 9308 receives inputs of data 9310 and storage output data 9320, and generates and outputs first transmission data 9307 and/or second transmission data 9317.

Figure 94:
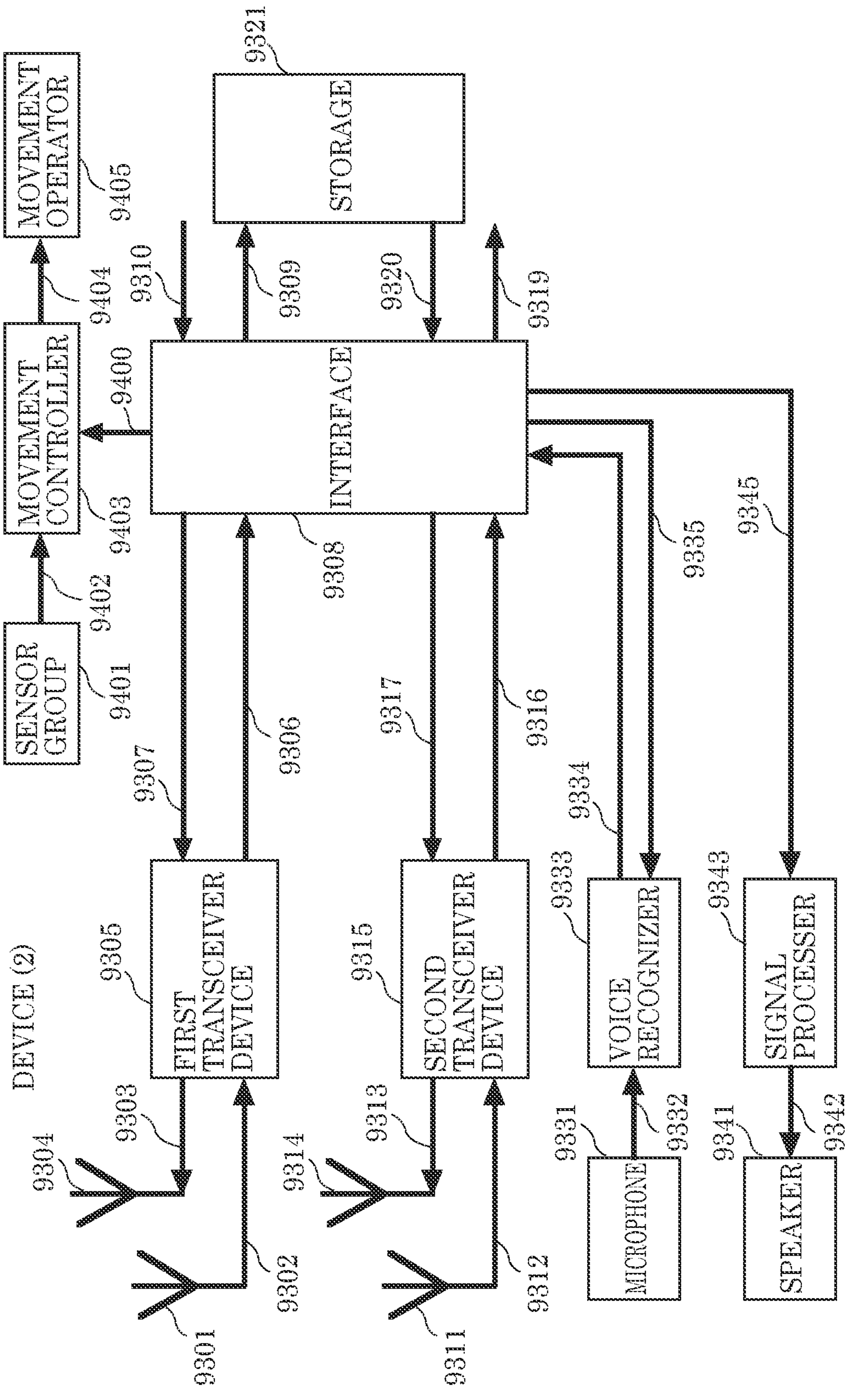
FIG. 94 illustrates an example of a configuration of a device.

FIG. 94 illustrates a second example of the configuration of device 9011 that is illustrated in, for example, FIG. 90A and FIG. 90B. Note that in FIG. 94, elements which operate in the same manner as those in FIG. 93 have the same reference signs, and repeated description thereof is omitted.

Interface 9308 receives inputs of first received data 9306 and second received data 9316, and based on this information, generates and outputs movement-related data 9400. Examples of movement-related data 9400 include information on whether to move or not, information on the direction in which to move, and information on how much to move.

Sensor group 9401 includes one or more sensors examples of which include a sound collection sensor, an image sensor, an acceleration sensor, a location information obtaining sensor that utilizes, for example, global positioning system (GPS), a temperature sensor, and a humidity sensor. Sensor group 9401 outputs sensor group data 9402 it obtains.

Movement controller 9403 receives inputs of sensor group data 9402 and movement-related data 9400, and using this data, generates and outputs movement control signal 9404.

Movement operator 9405 receives an input of movement control signal 9404, and based on movement control signal 9404, determines whether to stop or move, the direction in which to move, and the distance to move, etc., and moves the device. Note that movement operator 9405 may move the device on land, on water, in water, or though the air.

Figure 95A:
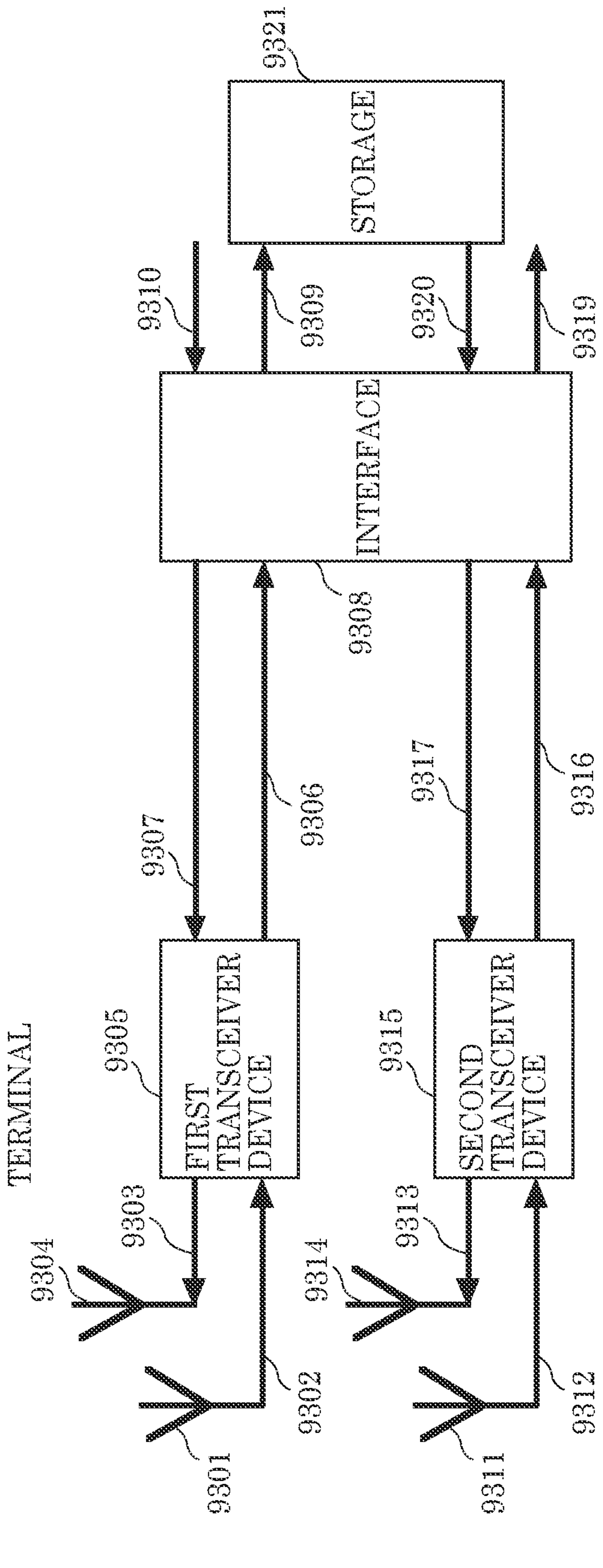
FIG. 95A illustrates an example of a configuration of a terminal.

FIG. 95A illustrates a first configuration example of terminal #1 labeled 9012_1, terminal #2 labeled 9012_2, or terminal #3 labeled 9012_3 (here simply referred to as "terminal") that is illustrated in, for example, FIG. 90A and FIG. 90B. Note that in FIG. 95A, elements which operate in the same manner as those in FIG. 93 have the same reference signs, and repeated description thereof is omitted.

As illustrated in FIG. 95A, the terminal includes first transceiver device 9305 that performs transmission and reception in accordance with the first wireless communication method, and second transceiver device 9315 that performs transmission and reception in accordance with the second wireless communication method.

Figure 95B:
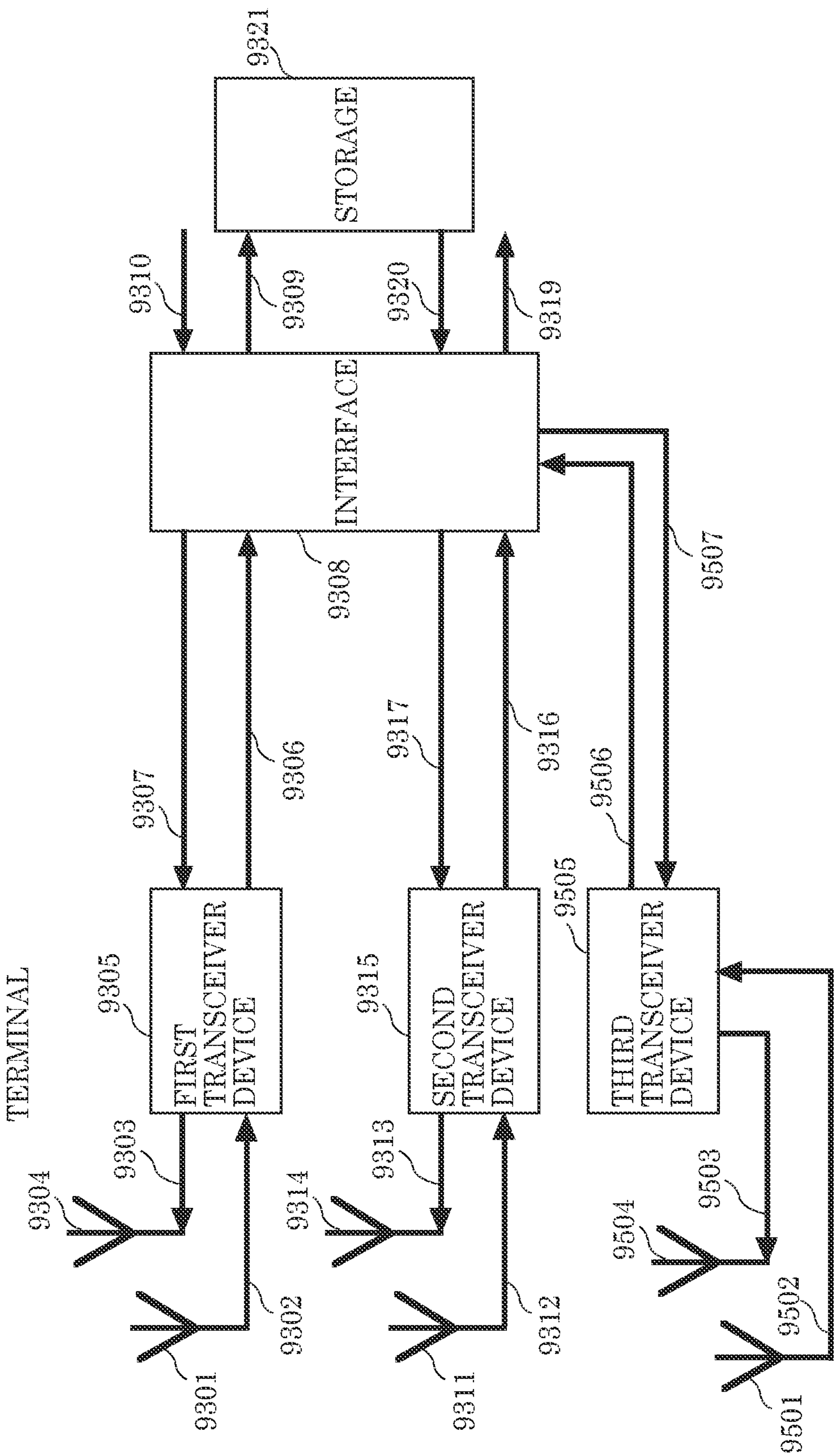
FIG. 95B illustrates an example of a configuration of a terminal.

FIG. 95B illustrates a second configuration example of terminal #1 labeled 9012_1, terminal #2 labeled 9012_2, or terminal #3 labeled 9012_3 (here simply referred to as "terminal") that is illustrated in, for example, FIG. 90A and FIG. 90B. Note that in FIG. 95B, elements which operate in the same manner as those in FIG. 93 have the same reference signs, and repeated description thereof is omitted.

Just like in FIG. 95A, as illustrated in FIG. 95B, the terminal includes first transceiver device 9305 that performs transmission and reception in accordance with the first wireless communication method, and second transceiver device 9315 that performs transmission and reception in accordance with the second wireless communication method.

The terminal also includes third transceiver device 9505 that performs transmission and reception in accordance with a third wireless communication method that differs from the first wireless communication method and the second wireless communication method.

Third transceiver device 9505 receives an input of a received signal received by antenna 9501, performs processing such as demodulation and error correction decoding, and outputs third received data 9506.

Third transceiver device 9505 receives an input of third transmission data 9507, performs processing such as error correction coding, modulation (mapping), and frequency conversion, and generates and outputs transmission signal 9503. Transmission signal 9503 is output as radio waves from antenna 9504. Note that third transceiver device 9505 performs wireless communication with, for example, a base station, which is not illustrated in FIG. 90A or FIG. 90B.

Next, an example of operations performed by the terminal illustrated in FIG. 95B will be given.

For example, interface 9308 generates and outputs third transmission data 9507 based on first received data 9306 obtained by first transceiver device 9305. Third transceiver device 9505 then transmits a modulated signal including third transmission data 9507.

In another example, interface 9308 generates and outputs third transmission data 9507 based on second received data 9316 obtained by second transceiver device 9315. Third transceiver device 9505 then transmits a modulated signal including third transmission data 9507.

By implementing the above, first received data 9306 and second received data 9316 can be transmitted to another communication device.

Figure 96:
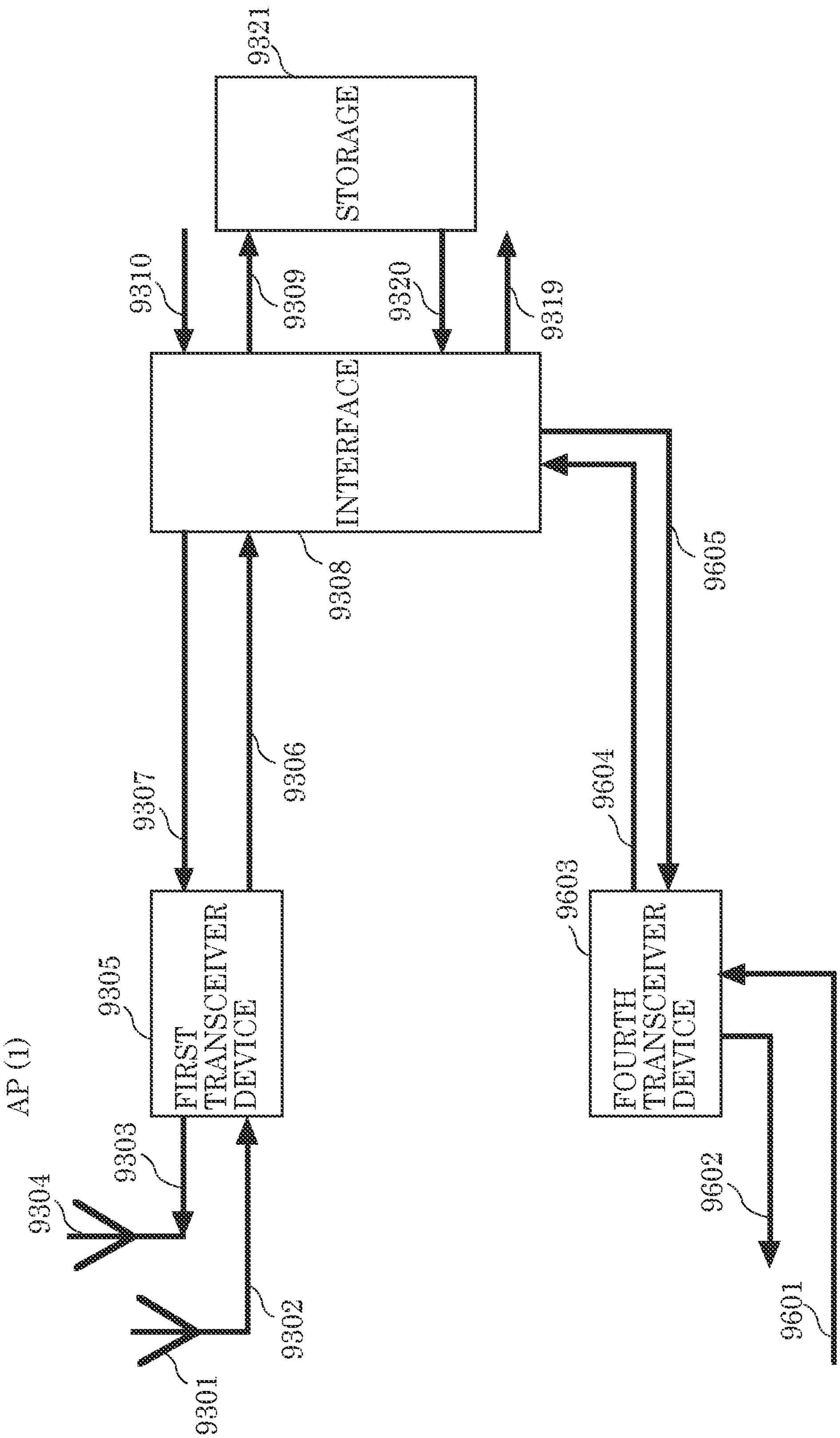
FIG. 96 illustrates an example of a configuration of an access point.

FIG. 96 illustrates a first configuration example of AP 9010 that is illustrated in, for example, FIG. 90A and FIG. 90B. Note that in FIG. 96, elements which operate in the same manner as those in FIG. 93 are assigned the same reference signs, and repeated description thereof is omitted.

As illustrated in FIG. 96, AP 9010 includes first transceiver device 9305 that performs transmission and reception in accordance with the first wireless communication method, and fourth transceiver device 9603 that performs transmission and reception in accordance with a fourth communication method. Fourth transceiver device 9603 is a transceiver device for communicating with first server 9001 or second server 9099 or the like via network 9002. The fourth communication method may be a wired communication method or a wireless communication method.

Fourth transceiver device 9603 receives an input of received signal 9601, performs processing such as demodulation, and outputs fourth received data 9604.

Fourth transceiver device 9603 receives an input of fourth transmission data 9605, and generates and outputs transmission signal 9602.

With this, AP 9010 can communicate with first server 9001 or second server 9099 or the like via network 9002.

Interface 9308 receives an input of fourth received data 9604, and outputs first transmission data 9307 based on fourth received data 9604. With this, first transceiver device 9305 transmits transmission signal 9303 that includes part or all of fourth received data 9604.

Interface 9308 outputs fourth transmission data 9605 based on first received data 9306. With this, fourth transceiver device 9603 transmits transmission signal 9602 that includes part or all of first received data 9306.

Figure 97:
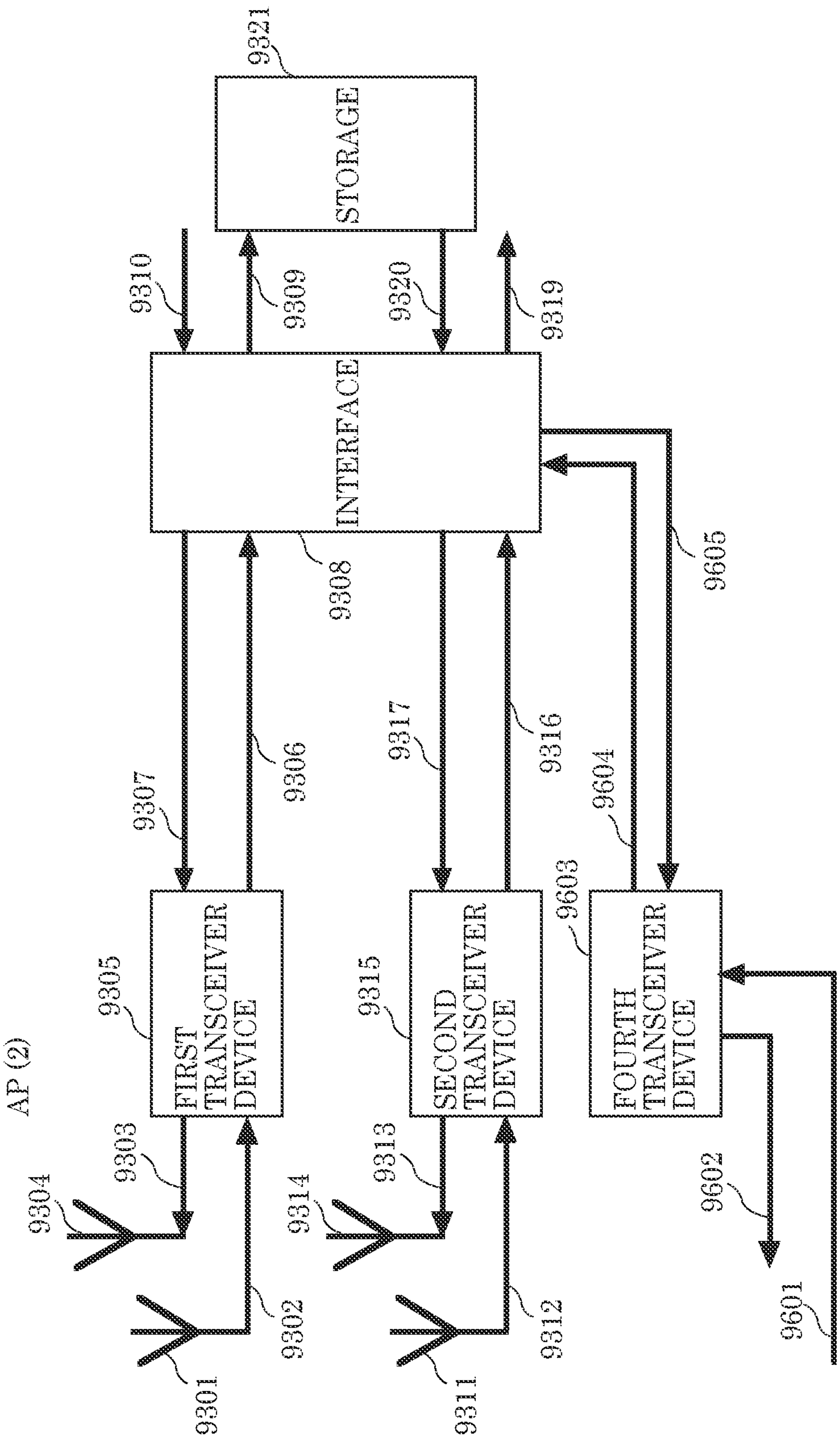
FIG. 97 illustrates an example of a configuration of an access point.

FIG. 97 illustrates a second configuration example of AP 9010 that is illustrated in, for example, FIG. 90A and FIG. 90B. Note that in FIG. 97, elements which operate in the same manner as those in FIG. 93 are assigned the same reference signs, and repeated description thereof is omitted. Moreover, elements which operate in the same manner as those in FIG. 96 are assigned the same reference signs, and repeated description thereof is omitted. Fourth transceiver device 9603 is a transceiver device for communicating with first server 9001 or second server 9099 or the like via network 9002 (fourth transceiver device 9603 may communicate with a device other than first server 9001 and second server 9099). The fourth communication method may be a wired communication method or a wireless communication method.

Interface 9308 may receive an input of fourth received data 9604, and may output first transmission data 9307 based on fourth received data 9604. With this, first transceiver device 9305 transmits transmission signal 9303 that includes part or all of fourth received data 9604.

Interface 9308 may output second transmission data 9317 based on fourth received data 9604. With this, second transceiver device 9315 transmits transmission signal 9313 that includes part or all of fourth received data 9604.

Interface 9308 outputs transmission data 9605 based on first received data 9306. With this, fourth transceiver device 9603 transmits transmission signal 9602 that includes part or all of first received data 9306.

Interface 9308 outputs transmission data 9605 based on second received data 9316. With this, fourth transceiver device 9603 transmits transmission signal 9602 that includes part or all of second received data 9316.

Next, an operation example will be given with focus on terminal #3 labeled 9012_3.

Figure 98:
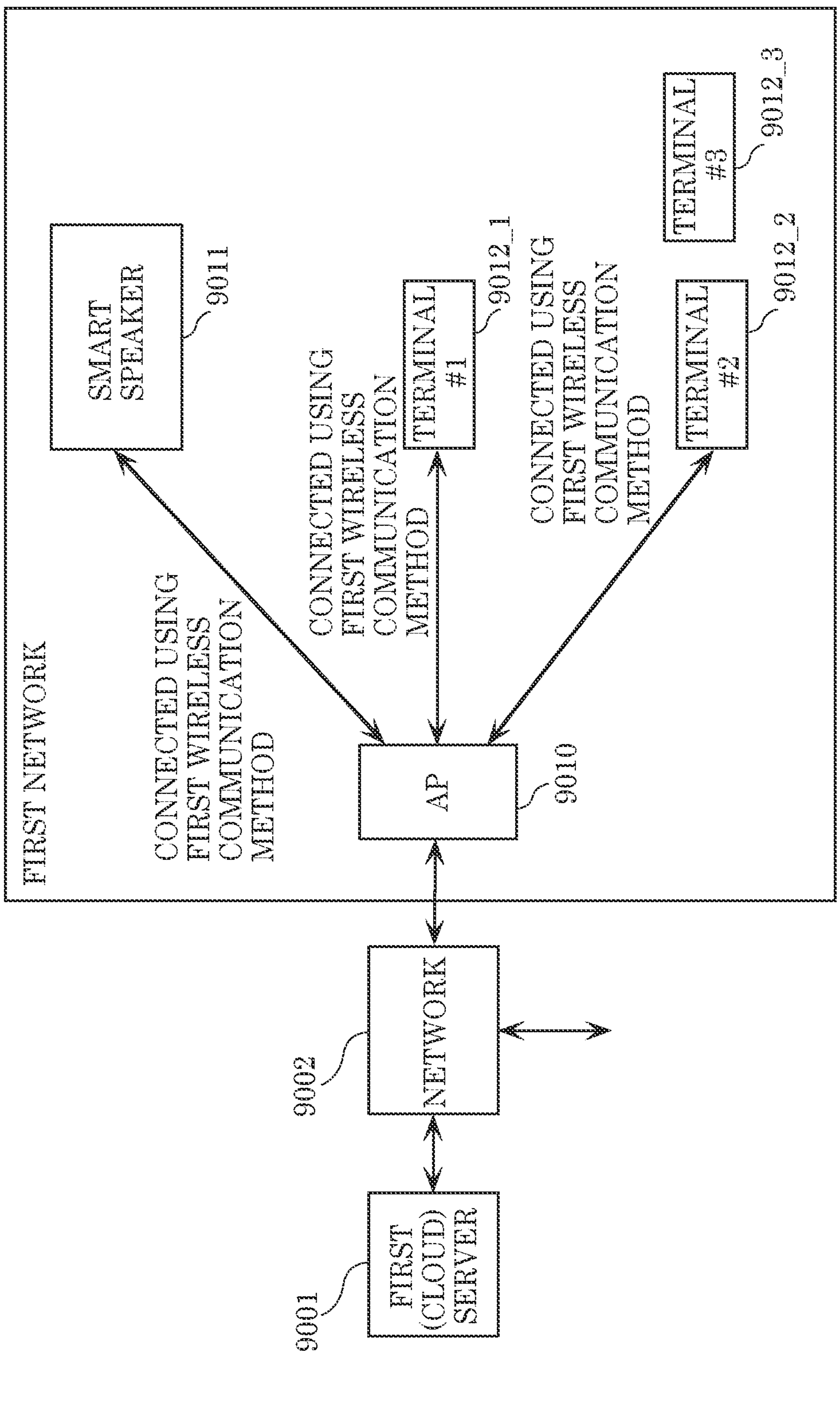
FIG. 98 illustrates one example of communication in a communication system.

As illustrated in FIG. 90A, terminal #3 labeled 9012_3 does not communicate with AP 9010 using the first wireless communication method. From this state, as illustrated in FIG. 98, terminal #3 labeled 9012_3 moves to a communication area of first network in which terminal #3 labeled 9012_3 is capable of communicating with AP 9010 via the first wireless communication method.

Next, a second example of such a state will be given.

As illustrated in FIG. 90B, terminal #3 labeled 9012_3 does not communicate with AP 9010 using the first wireless communication method. From this state, as illustrated in FIG. 99, terminal #3 labeled 9012_3 moves to a communication area of first network in which terminal #3 labeled 9012_3 is capable of communicating with AP 9010 via the first wireless communication method.

Here, terminal #3 labeled 9012_3, AP 9010, and first server 9001 communicate, examples of such communication being illustrated in FIG. 92A and FIG. 92B.

Terminal #3 labeled 9012_3 moves from the state illustrated in FIG. 98 and reaches an area in which terminal #3 labeled 9012_3 is capable of communicating with device 9011 via the second wireless communication method.

Figure 99:
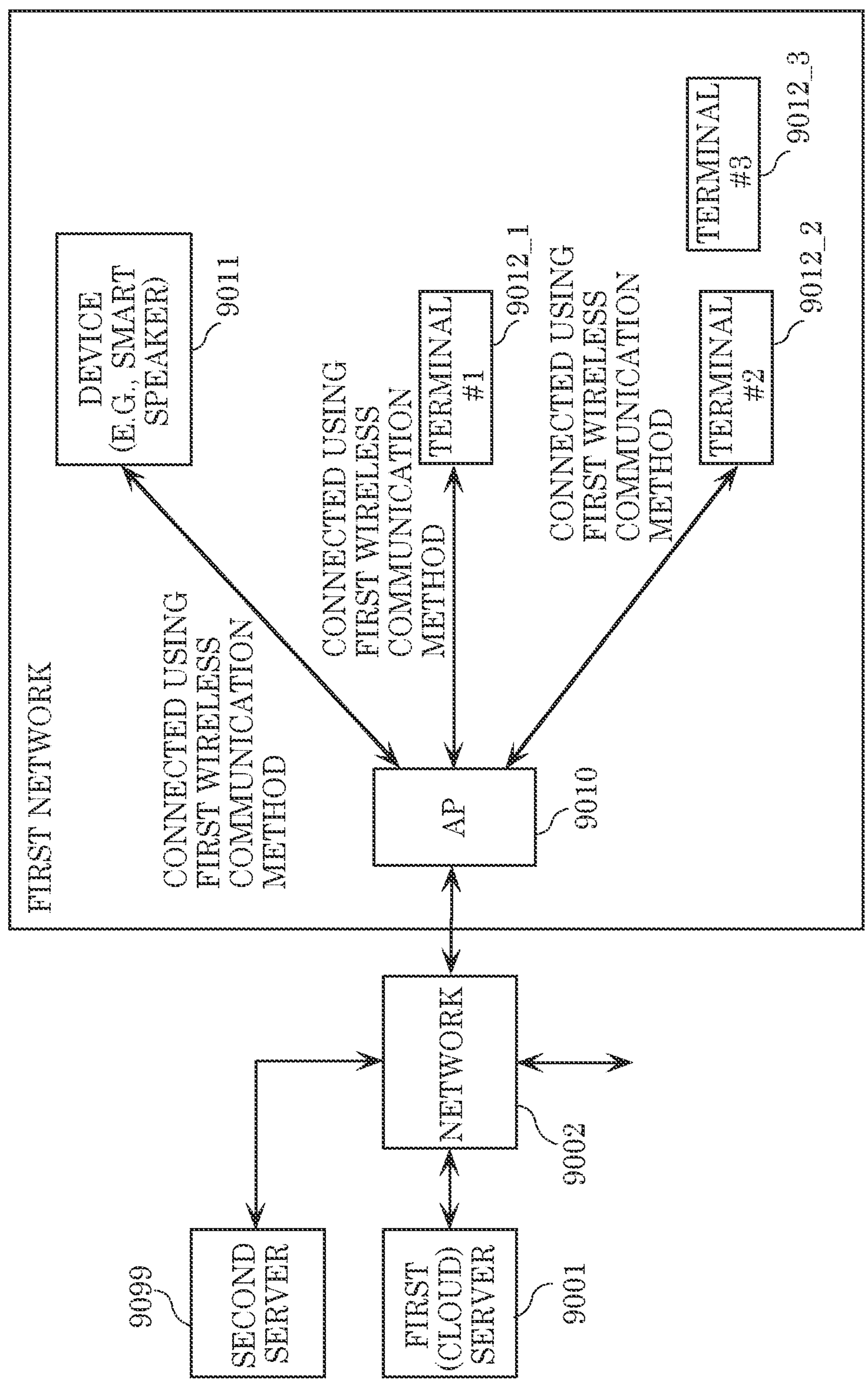
FIG. 99 illustrates one example of communication in a communication system.

As another example, terminal #3 labeled 9012_3 moves from the state illustrated in FIG. 99 and reaches an area in which terminal #3 labeled 9012_3 is capable of communicating with device 9011 via the second wireless communication method.

Next, an example of operations performed by each device, including terminal #3 labeled 9012_3 in this state, will be given.

Figure 102:
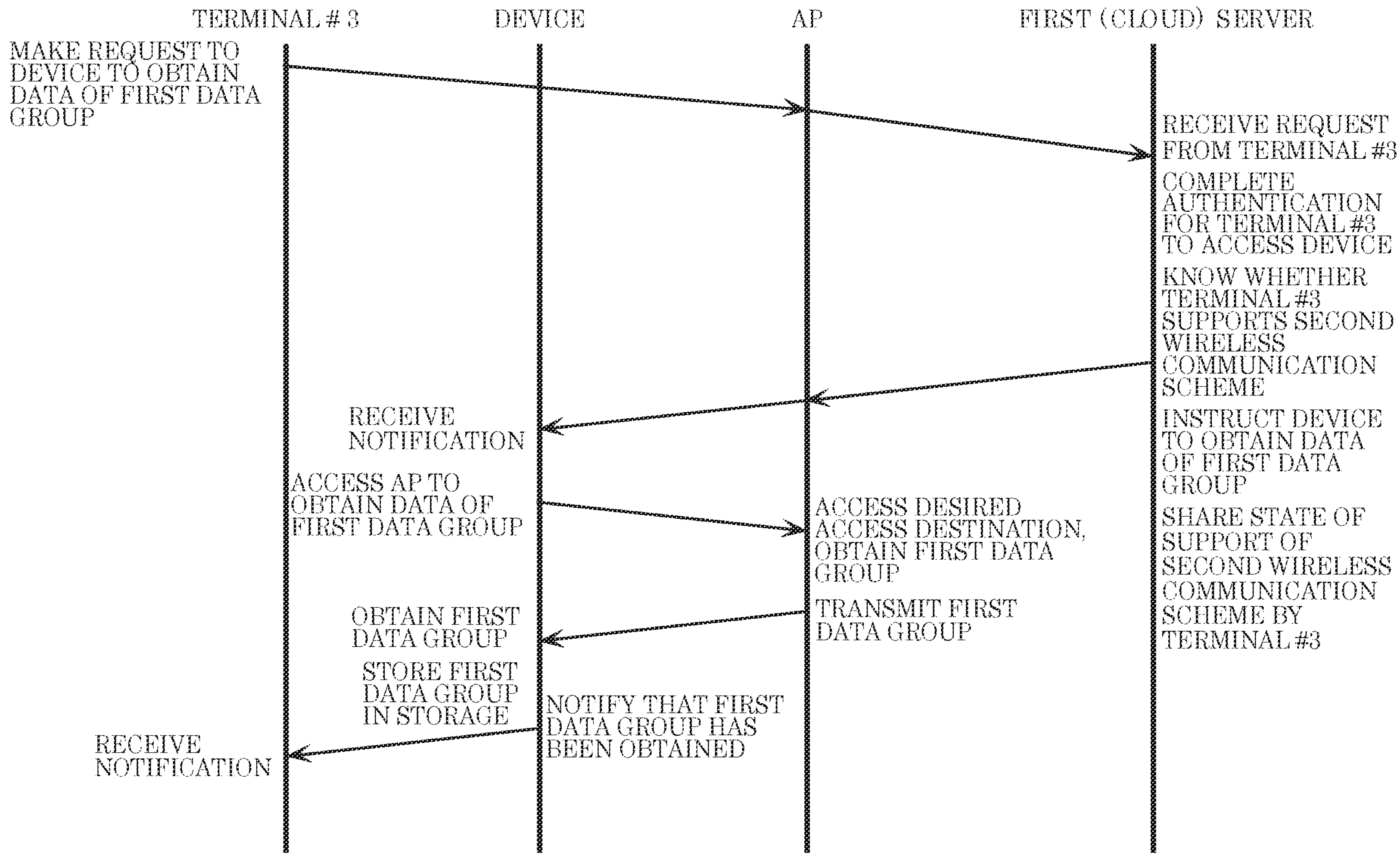
FIG. 102 illustrates one example of procedures for communicating in a communication system.

FIG. 102 illustrates one example of communication between terminal #3 labeled 9012_3, device 9011, AP 9010, and first server 9001.

First, terminal #3 labeled 9012_3 makes a request to device 9011 to obtain data of a first data group. To this end, terminal #3 labeled 9012_3 transmits, using the first wireless communication method, request information indicating the request to obtain data of the first data group to AP 9010. AP 9010 then transmits the request information indicating the request to obtain data of the first data group to first server 9001.

First server 9001 then receives the request information from terminal #3 labeled 9012_3 indicating the request to obtain data of the first data group. Since terminal #3 labeled 9012_3 has already completed the tasks illustrated in FIG. 92A and FIG. 92B, first server 9001 performs authentication for terminal #3 labeled 9012_3 to access device 9011, and determines whether to grant access. Moreover, since first server 9001 has already completed the tasks illustrated in FIG. 92A and FIG. 92B, first server 9001 knows that terminal #3 labeled 9012_3 is capable of communicating using the second wireless communication scheme, first server 9001 thereby knows the state of the support of the second wireless communication scheme by terminal #3 labeled 9012_3. In order to instruct device 9011 to obtain the data of the first data group in response to the request to obtain the first data group by terminal #3 labeled 9012_3, and share the state of support of the second wireless communication scheme by terminal #3 labeled 9012_3 with device 9011, first server 9001 transmits, to AP 9010, the instruction instructing device 9011 to obtain the data of the first data group in response to the request to obtain the first data group by terminal #3 labeled 9012_3 and information on the state of support of the second wireless communication scheme by terminal #3 labeled 9012_3.

AP 9010 transmits this information to device 9011. Here, AP 9010 may use either of the first wireless communication scheme and the second wireless communication scheme. Moreover, another communication scheme may be used when available.

Device 9011 receives this information. Device 9011 then accesses AP 9010 to obtain the first data group.

AP 9010 accesses a desired access destination to obtain the first data group, and then obtains the first data group. AP 9010 then transmits the first data group to device 9011.

Device 9011 then obtains the first data group and stores the first data group in storage 9321 illustrated in FIG. 93 and FIG. 94. Device 9011 notifies terminal #3 labeled 9012_3 of the completion of the obtaining of the first data group (here, the first wireless communication scheme is used from a point in the communication area, but some other communication means may be used).

Operations performed thereafter by terminal #3 labeled 9012_3, device 9011, AP 9010, and first server 9001 will be described with reference to FIG. 103A and FIG. 103B.

Figure 103A:
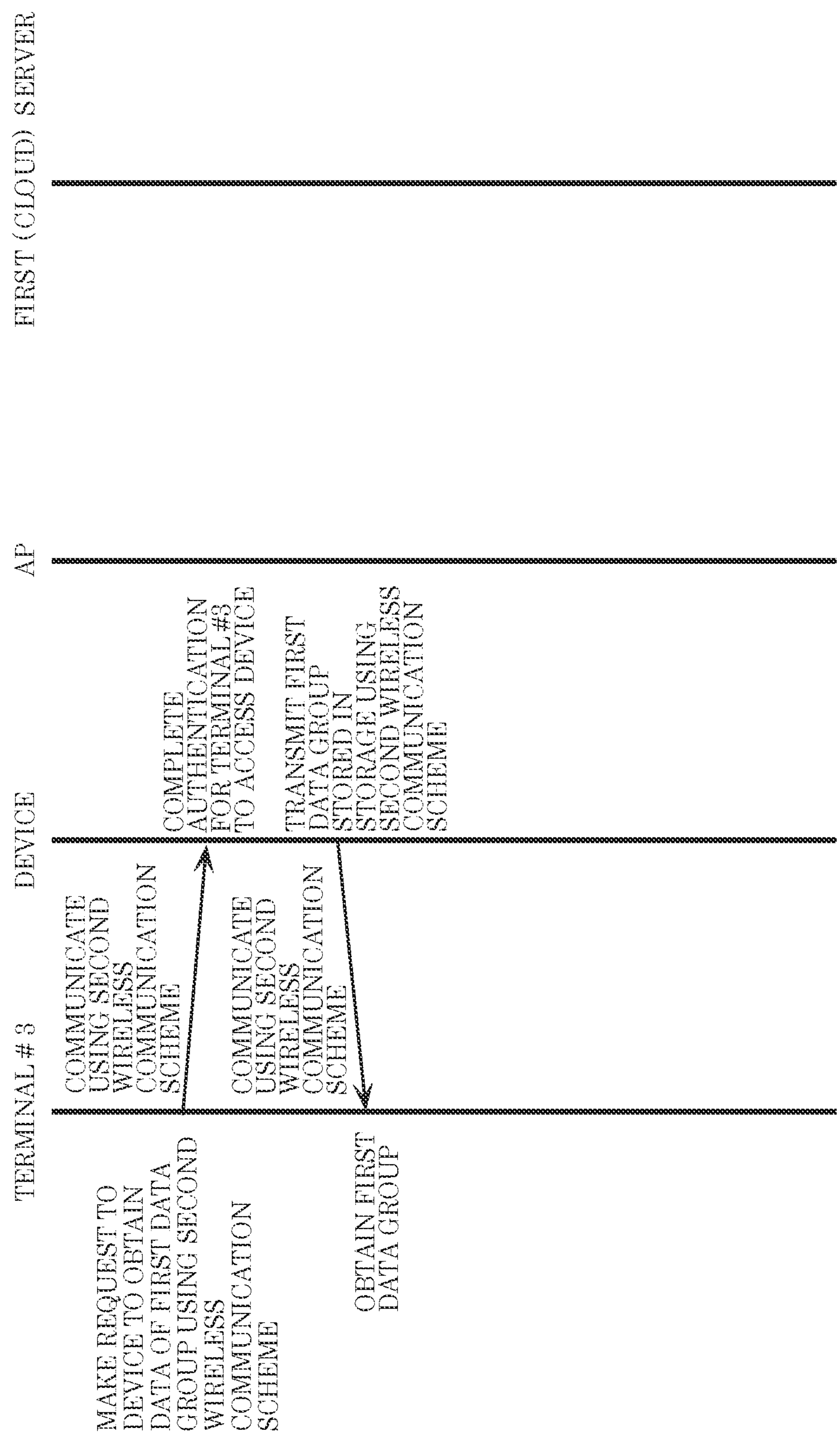
FIG. 103A illustrates one example of procedures for communicating in a communication system.

FIG. 103A illustrates a first example of operations performed thereafter by terminal #3 labeled 9012_3, device 9011, AP 9010, and first server 9001. FIG. 103A illustrates a first example of communication between terminal #3 labeled 9012_3, device 9011, AP 9010, and first server 9001.

Figure 100:
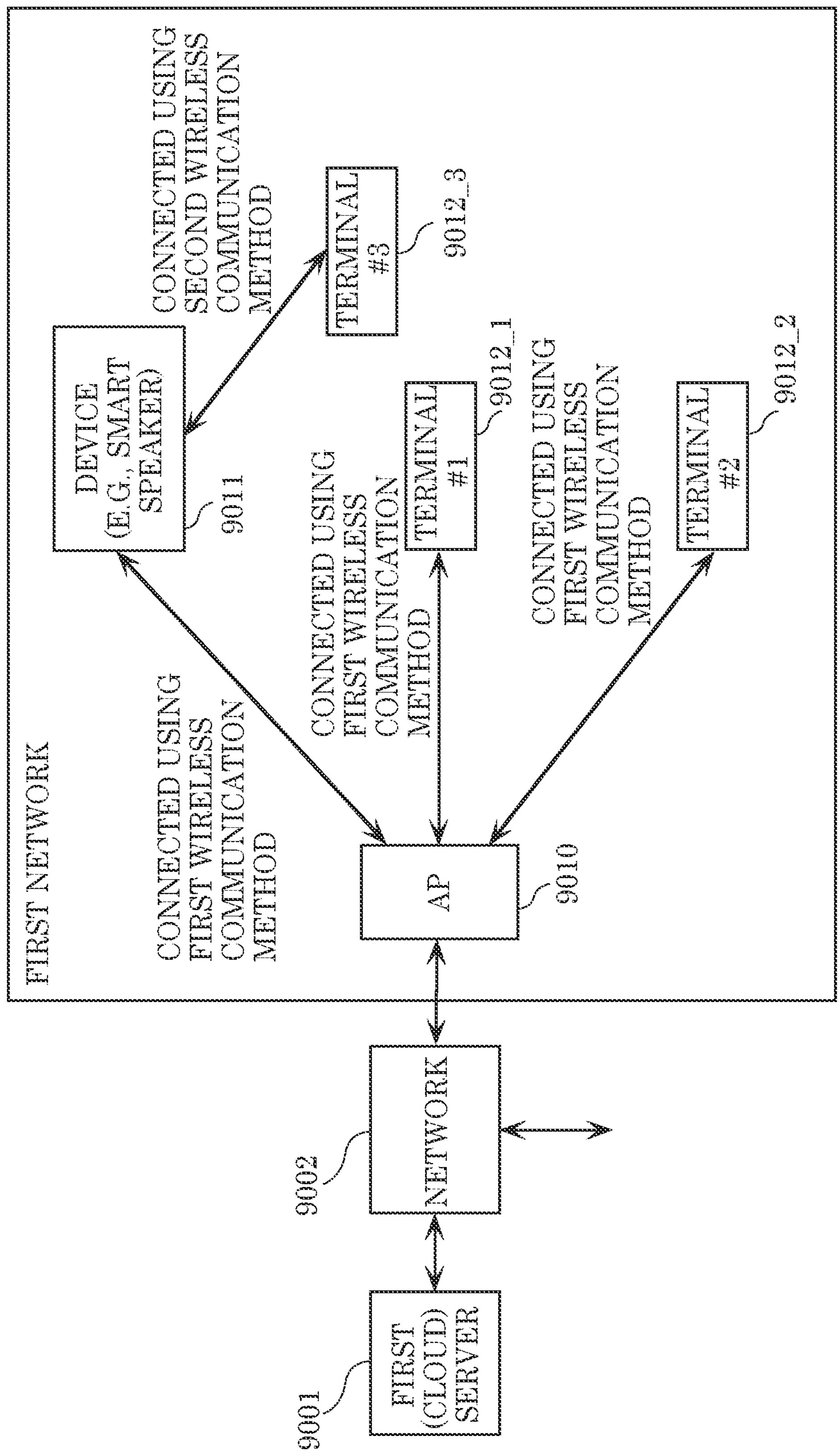
FIG. 100 illustrates one example of communication in a communication system.
Figure 101:
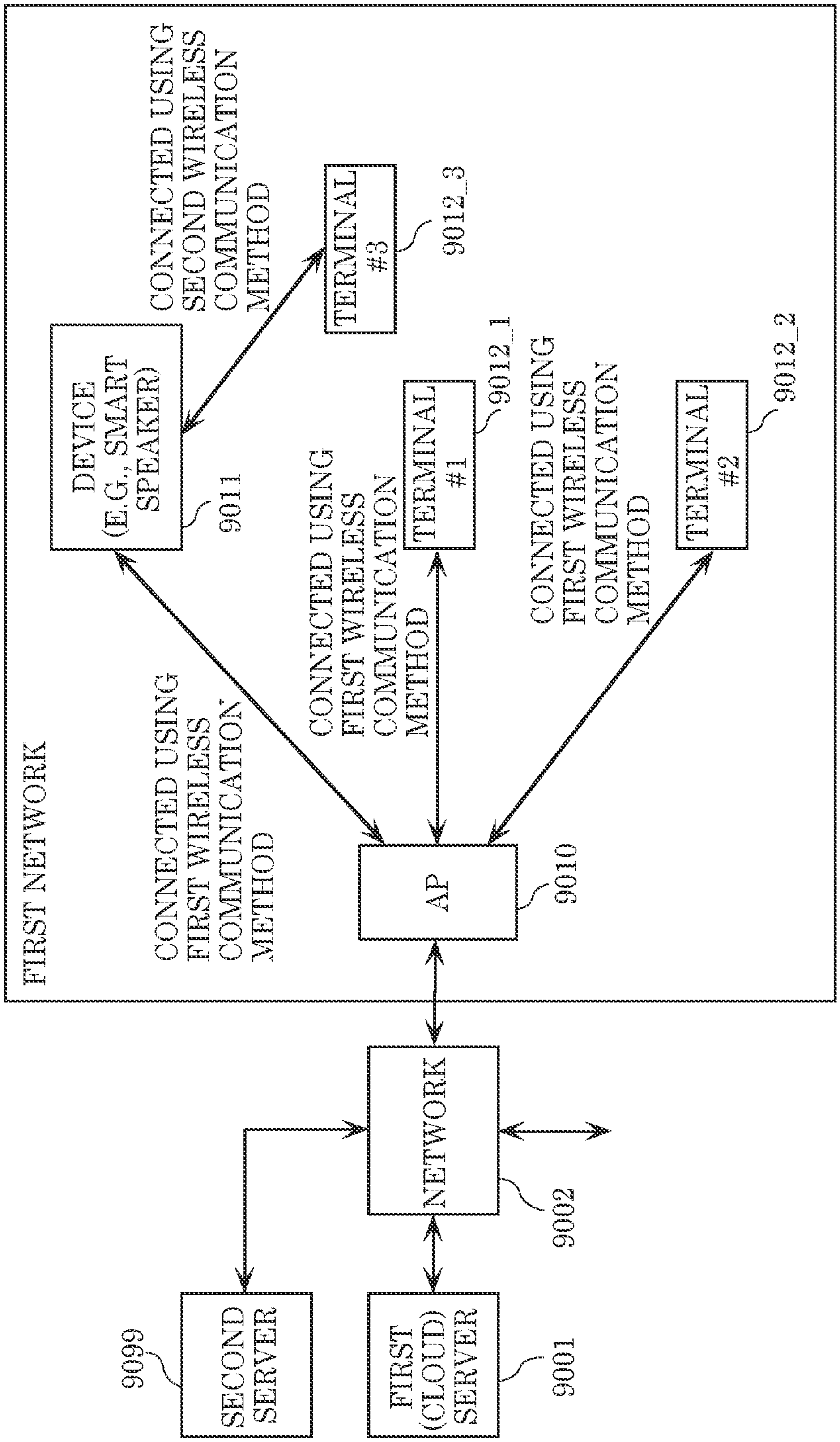
FIG. 101 illustrates one example of communication in a communication system.

As illustrated in FIG. 100 and FIG. 101, terminal #3 labeled 9012_3 is capable of communicating with device 9011 using the second wireless communication scheme (note that terminal #3 labeled 9012_3 is capable of determining that terminal #3 labeled 9012_3 is capable of communicating with device 9011 via the second wireless communication scheme by detecting a modulated signal transmitted by device 9011 using the second wireless communication method).

Terminal #3 labeled 9012_3 transmits, to device 9011, information indicating a request to obtain data of the first data group using the second wireless communication. Note that terminal #3 labeled 9012_3 transmits a modulated signal including this information using the second wireless communication scheme. Here, terminal #3 labeled 9012_3 may transmit terminal identification information.

Device 9011 receives the modulated signal transmitted by terminal #3 labeled 9012_3, and grants access permission to terminal #3 labeled 9012_3. Device 9011 then uses the second wireless communication scheme to transmit a modulated signal including the first data group stored in storage 9321 illustrated in FIG. 93 and FIG. 94.

Terminal #3 labeled 9012_3 thus obtains the first data group.

Figure 103B:
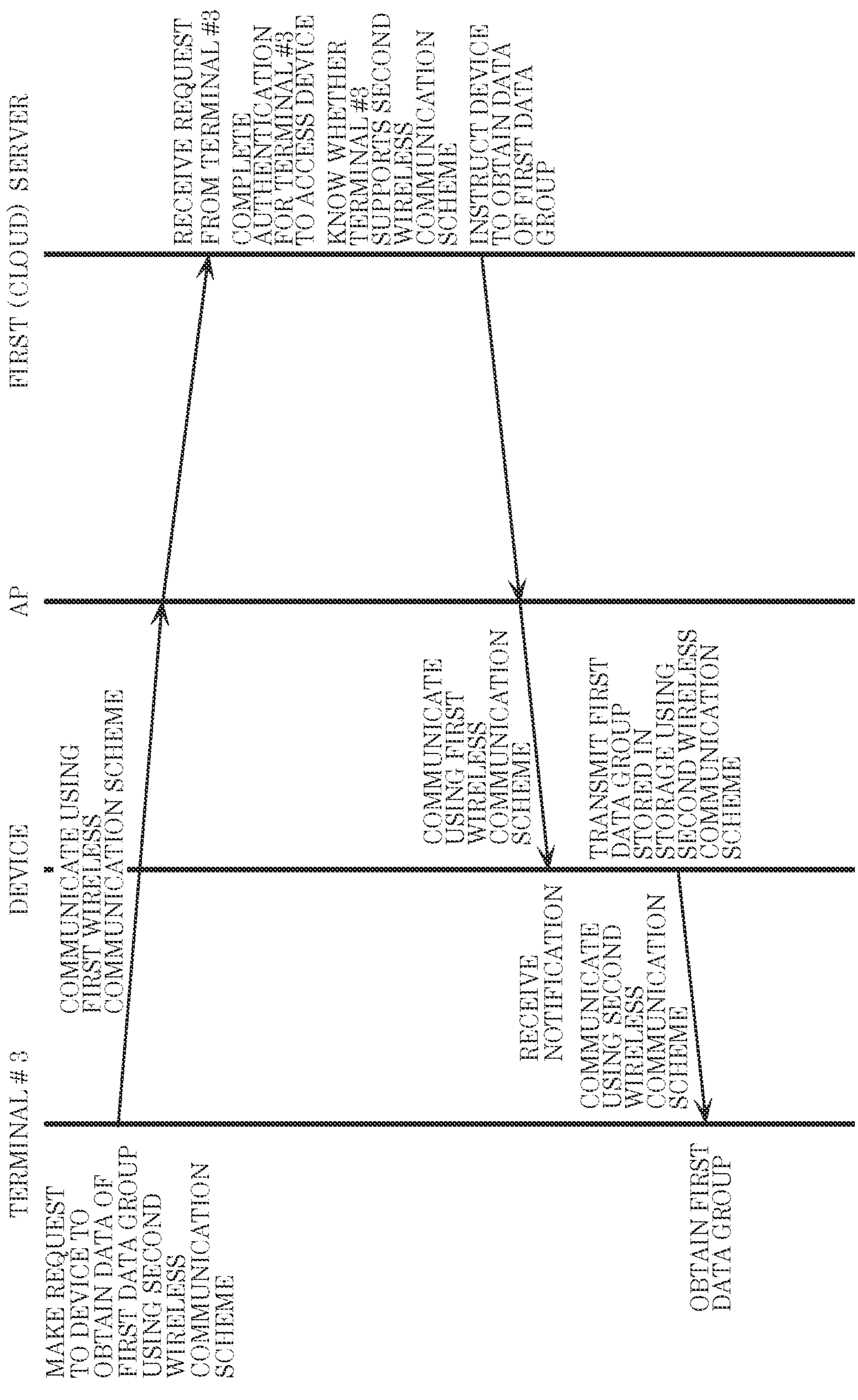
FIG. 103B illustrates one example of procedures for communicating in a communication system.

FIG. 103B illustrates a second example of operations performed thereafter by terminal #3 labeled 9012_3, device 9011, AP 9010, and first server 9001. FIG. 103B illustrates a second example of communication between terminal #3 labeled 9012_3, device 9011, AP 9010, and first server 9001.

As illustrated in FIG. 100 and FIG. 101, terminal #3 labeled 9012_3 is capable of communicating with device 9011 using the second wireless communication scheme (note that terminal #3 labeled 9012_3 is capable of determining that terminal #3 labeled 9012_3 is capable of communicating with device 9011 via the second wireless communication scheme by detecting a modulated signal transmitted by device 9011 using the second wireless communication method).

Terminal #3 labeled 9012_3 then transmits, to AP 9010 using the first wireless communication scheme, a modulated signal including information indicating the request to obtain the data of the first data group from device 9011 via the second wireless communication.

AP 9010 transmits this information to first server 9001.

First server 9001 then receives this request. Since terminal #3 labeled 9012_3 has already completed the tasks illustrated in FIG. 92A and FIG. 92B, first server 9001 performs authentication for terminal #3 labeled 9012_3 to access device 9011, and determines whether to grant access. Moreover, since first server 9001 has already completed the tasks illustrated in FIG. 92A and FIG. 92B, first server 9001 knows that terminal #3 labeled 9012_3 is capable of communicating using the second wireless communication scheme, first server 9001 thereby knows the state of the support of the second wireless communication scheme by terminal #3 labeled 9012_3.

First server 9001 then transmits, to AP 9010, information indicating the request that terminal #3 labeled 9012_3 wants to obtain the first data group, in order to perform the request to device 9011 that terminal #3 labeled 9012_3 wants to obtain the first data group. With this, AP 9010 transmits, to device 9011 using the first wireless communication scheme, a modulated signal including information indicating the request that terminal #3 labeled 9012_3 wants to obtain the first data group.

Device 9011 then receives this information, and uses the second wireless communication scheme to transmit a modulated signal including the first data group stored in storage 9321 illustrated in FIG. 93 and FIG. 94.

Terminal #3 labeled 9012_3 thus obtains the first data group.

Next, advantages achieved by the above operations will be described.

Consider a case in which the data size of the first data group is large. Terminal #3 labeled 9012_3 obtains the first data group from AP 9010 using the first wireless communication method. When the data size of the first data group is large, the communication time of the communication between AP 9010 and terminal #3 labeled 9012_3 increases. This makes it difficult for other terminals such as terminal #1 labeled 9012_1 and terminal #2 labeled 9012_2 to access AP 9010 using the first wireless communication method, which results in the problem that data transmission efficiency decreases in the system that uses the first wireless communication method and includes AP 9010 and the terminals.

In contrast, when the above operations are implemented, AP 9010 transmits the first data group to device 9011 using the first wireless communication method, but AP 9010 may take its time to transmit the first data group to device 9011 using the first wireless communication method at a time when there is little access from other devices. This makes it possible to inhibit a reduction in the data transmission efficiency of the system that uses the first wireless communication method.

Since device 9011 and terminal #3 labeled 9012_3 perform communication pertaining to the first data group by using the second wireless communication method, terminal #3 labeled 9012_3 can obtain the first data group in a short period of time.

Next, an example of operations performed by each device, which differs from the operations performed by each device including terminal #3 labeled 9012_3 and illustrated in FIG. 102, FIG. 103A, and FIG. 103B, will be described.

Figure 104:
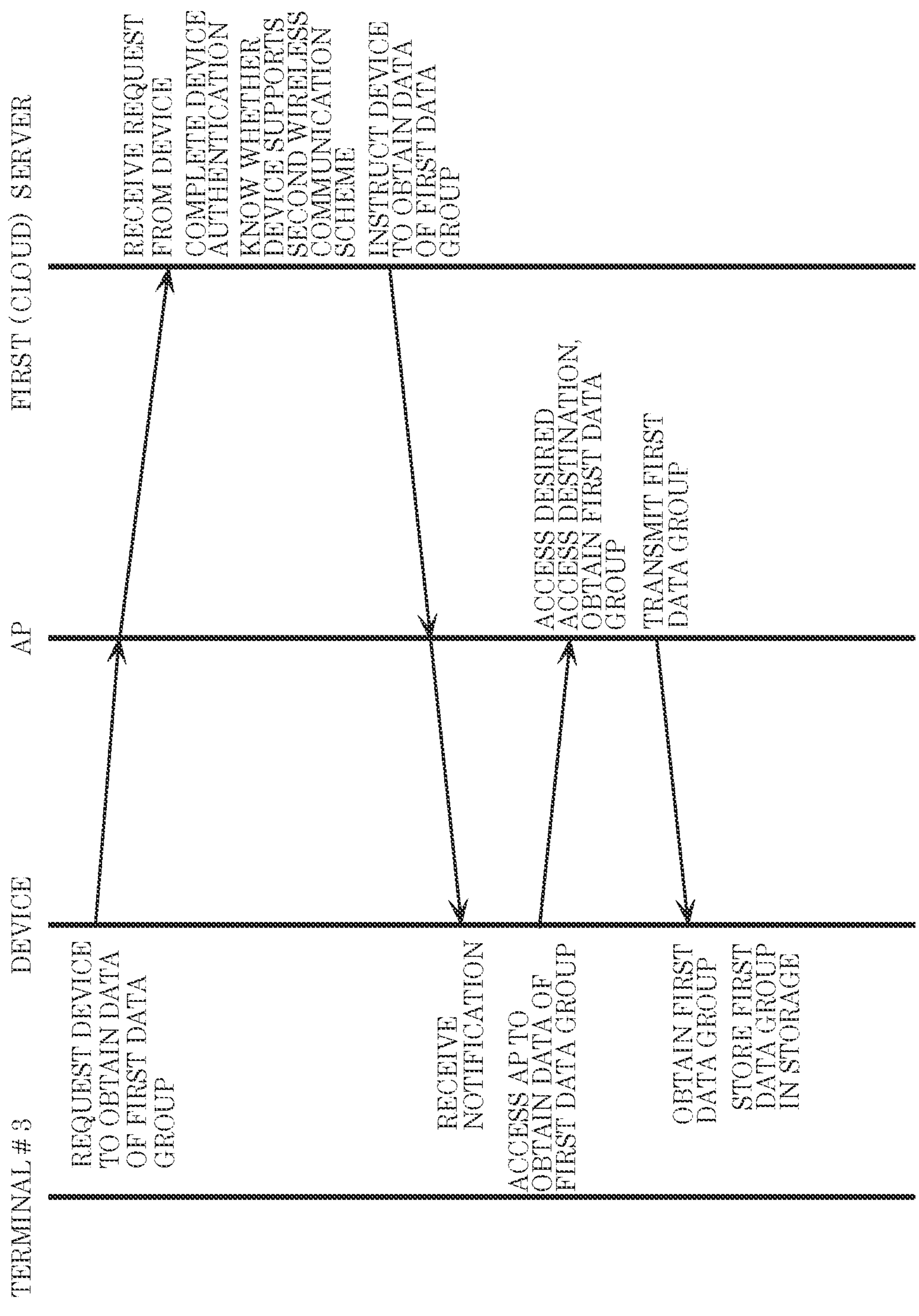
FIG. 104 illustrates one example of procedures for communicating in a communication system.

FIG. 104 illustrates one example of communication between terminal #3 labeled 9012_3, device 9011, AP 9010, and first server 9001.

First, a user requests device 9011 to obtain data of a first data group. For example, the user conveys the request to obtain the data of the first data group by using microphone 9331 and voice recognizer 9333 illustrated in FIG. 93 and FIG. 94.

For example, the user utters the following line into microphone 9331 of device 9011.

"Download the first data group".

Voice recognizer 9333 in FIG. 93 and FIG. 94 then performs voice recognition, and recognizes that the user has requested to download the first data group. Accordingly, device 9011 transmits request information indicating that it wants to obtain data of the first data group to AP 9010 using the first wireless communication method. AP 9010 then transmits the request information indicating the request to obtain data of the first data group to first server 9001.

Voice recognizer 9333 may perform signal processing on audio signal 9332 obtained by the microphone to carry out the voice recognition, and, alternatively, audio signal 9332 obtained by the microphone may be transmitted to first server 9001 and second server 9099, and first server 9001 and second server 9099 may perform signal processing for voice recognition, and transmit the result to voice recognizer 9333.

First server 9001 then receives the request information from device 9011 indicating that the user wants to obtain data of the first data group. Since device 9011 has already completed the tasks illustrated in FIG. 91, first server 9001 determines whether to grant device 9011 permission to access first server 9001. Since first server 9001 has already completed the tasks illustrated in FIG. 91, first server 9001 knows that device 9011 is capable of communication using the second wireless communication scheme, so first server 9001 knows the state of the support of the second wireless communication scheme by device 9011. First server 9001 then transmits, to device 9011, information indicating an instruction to obtain the data of the first data group.

AP 9010 transmits this information to device 9011. Here, AP 9010 may use either of the first wireless communication scheme and the second wireless communication scheme. Moreover, another communication scheme may be used when available.

Device 9011 receives this information. Device 9011 then accesses AP 9010 to obtain the first data group.

AP 9010 accesses a desired access destination to obtain the first data group, and then obtains the first data group. AP 9010 then transmits the first data group to device 9011.

Device 9011 then obtains the first data group and stores the first data group in storage 9321 illustrated in FIG. 93 and FIG. 94.

In this example, the user possesses terminal #3 labeled 9012_3. Operations performed by terminal #3 labeled 9012_3, device 9011, AP 9010, and first server 9001 after the operations described above will be described with reference to FIG. 105A and FIG. 105B.

First, the user uses terminal #3 labeled 9012_3 to access device 9011 via AP 9010. The user then uses terminal #3 labeled 9012_3 to ask device 9011 whether the downloading of the first data group is complete or not. When terminal #3 labeled 9012_3 receives a response from device 9011 that the downloading of the first data group is not complete, the user once again uses terminal #3 labeled 9012_3 to ask device 9011 whether the downloading of the first data group is complete or not.

Figure 105A:
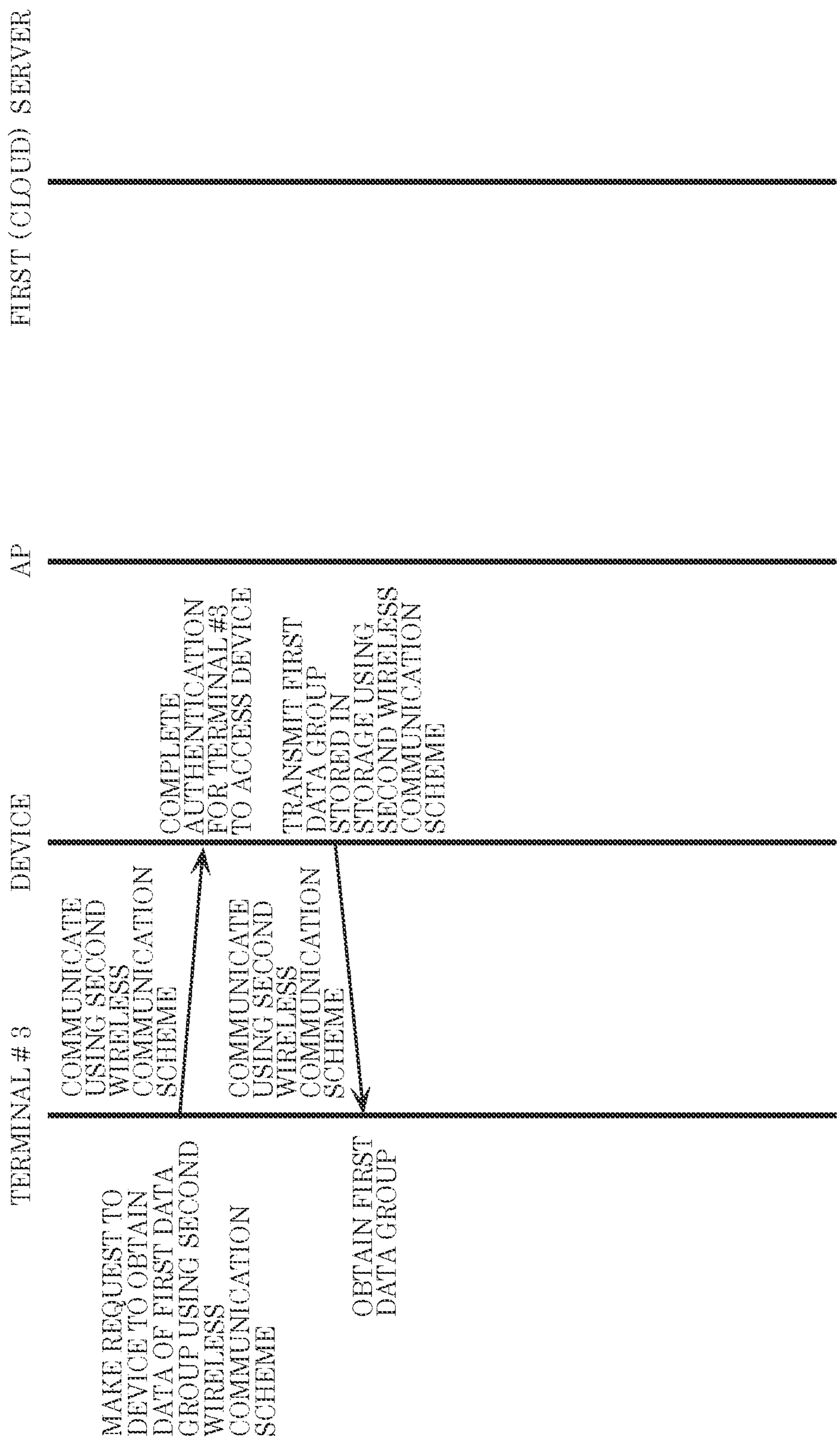
FIG. 105A illustrates one example of procedures for communicating in a communication system.
Figure 105B:
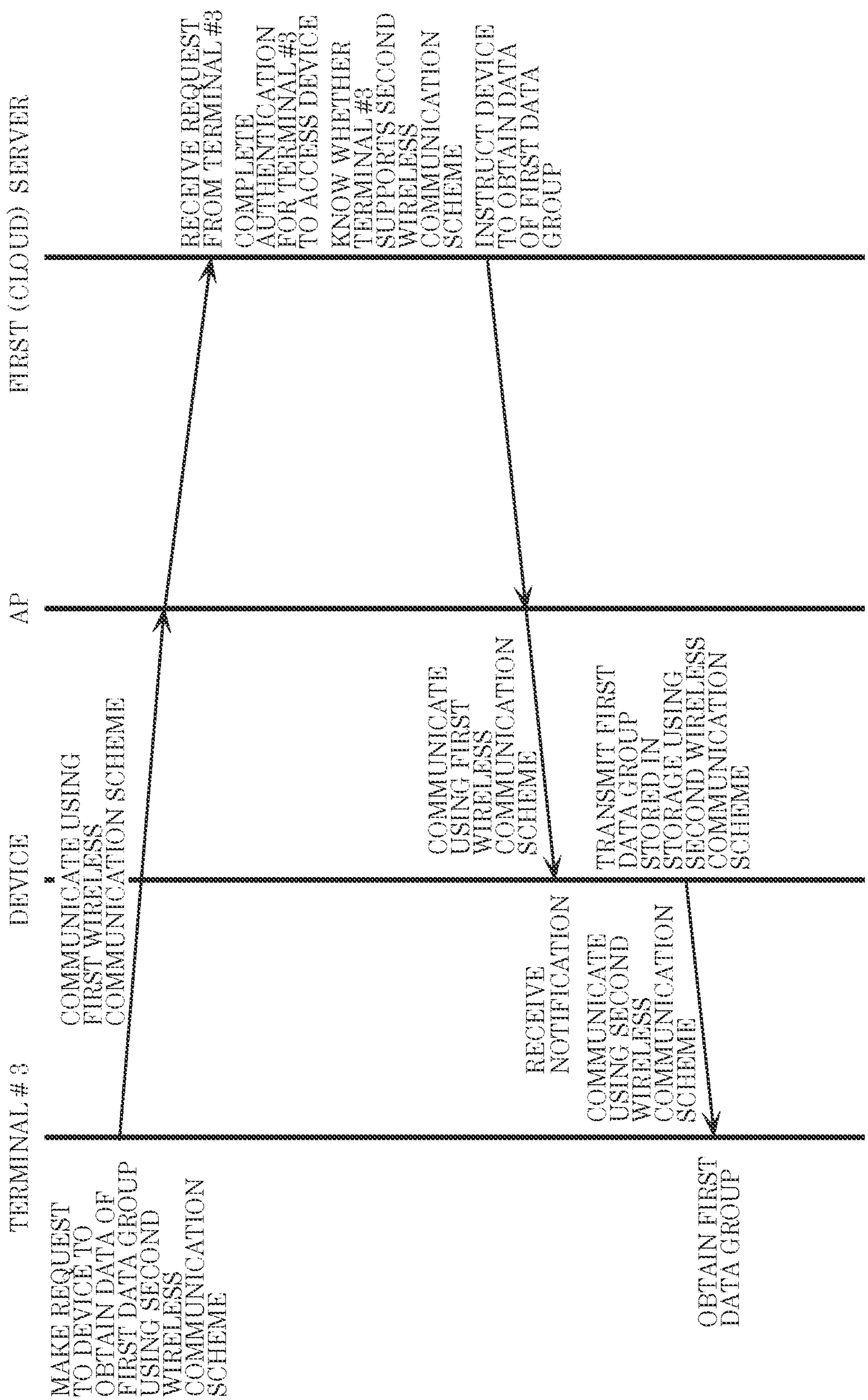
FIG. 105B illustrates one example of procedures for communicating in a communication system.

If terminal #3 labeled 9012_3 receives a response from device 9011 that the downloading of the first data group is complete, for example, terminal #3 labeled 9012_3 performs the operations illustrated in FIG. 105A or FIG. 105B.

Note that in the above operations, terminal #3 labeled 9012_3, AP 9010, and device 9011 may use the first wireless communication scheme or the second wireless communication scheme when transmitting the modulated signal. Moreover, some other communication method may be used.

Next, the operations illustrated in FIG. 105A will be described.

FIG. 105A illustrates a first example of operations performed by terminal #3 labeled 9012_3, device 9011, AP 9010, and first server 9001. As illustrated in FIG. 100 and FIG. 101, terminal #3 labeled 9012_3 is capable of communicating with device 9011 using the second wireless communication scheme (note that terminal #3 labeled 9012_3 is capable of determining that terminal #3 labeled 9012_3 is capable of communicating with device 9011 via the second wireless communication scheme by detecting a modulated signal transmitted by device 9011 using the second wireless communication method).

Terminal #3 labeled 9012_3 transmits, to device 9011, information indicating a request to obtain data of the first data group using the second wireless communication. Note that terminal #3 labeled 9012_3 transmits a modulated signal including this information using the second wireless communication scheme. Here, terminal #3 labeled 9012_3 may transmit terminal identification information.

Device 9011 receives the modulated signal transmitted by terminal #3 labeled 9012_3, and grants access permission to terminal #3 labeled 9012_3. Device 9011 then uses the second wireless communication scheme to transmit a modulated signal including the first data group stored in storage 9321 illustrated in FIG. 93 and FIG. 94.

Terminal #3 labeled 9012_3 thus obtains the first data group.

FIG. 105B illustrates a second example of operations performed by terminal #3 labeled 9012_3, device 9011, AP 9010, and first server 9001.

As illustrated in FIG. 100 and FIG. 101, terminal #3 labeled 9012_3 is capable of communicating with device 9011 using the second wireless communication scheme (note that terminal #3 labeled 9012_3 is capable of determining that terminal #3 labeled 9012_3 is capable of communicating with device 9011 via the second wireless communication scheme by detecting a modulated signal transmitted by device 9011 using the second wireless communication method).

Terminal #3 labeled 9012_3 then transmits, to AP 9010 using the first wireless communication scheme, a modulated signal including information indicating the request to obtain the data of the first data group from device 9011 via the second wireless communication.

AP 9010 transmits this information to first server 9001.

First server 9001 then receives this request. Since terminal #3 labeled 9012_3 has already completed the tasks illustrated in FIG. 92A and FIG. 92B, first server 9001 performs authentication for terminal #3 labeled 9012_3 to access device 9011, and determines whether to grant access. Moreover, since first server 9001 has already completed the tasks illustrated in FIG. 92A and FIG. 92B, first server 9001 knows that terminal #3 labeled 9012_3 is capable of communicating using the second wireless communication scheme, first server 9001 thereby knows the state of the support of the second wireless communication scheme by terminal #3 labeled 9012_3.

First server 9001 then transmits, to AP 9010, information indicating the request that terminal #3 labeled 9012_3 wants to obtain the first data group, in order to perform the request to device 9011 that terminal #3 labeled 9012_3 wants to obtain the first data group. With this, AP 9010 transmits, to device 9011 using the first wireless communication scheme, a modulated signal including information indicating the request that terminal #3 labeled 9012_3 wants to obtain the first data group.

Device 9011 then receives this information, and uses the second wireless communication scheme to transmit a modulated signal including the first data group stored in storage 9321 illustrated in FIG. 93 and FIG. 94.

Terminal #3 labeled 9012_3 thus obtains the first data group.

Performing the above operations achieves the advantageous effect that the same advantages as described above can be achieved.

In the present embodiment, in FIG. 93 and FIG. 94, the terminology "voice recognizer 9333" is used, but in addition to voice, an audio signal may also be input, and recognition related to sound may be performed.

The first wireless communication scheme and the second wireless communication scheme may be optical communication schemes that use visible light.

In the present embodiment, the interface for, for example, instructing device 9011, is exemplified as, but not limited to, a microphone and speaker; a function for inputting a command, an image sensor, or image recognition or the like may be used.

Embodiment 15

Next, an operation example that differs from Embodiment 14 will be given with focus on terminal #3 labeled 9012_3.

As illustrated in FIG. 90A, terminal #3 labeled 9012_3 does not communicate with AP 9010 using the first wireless communication method. From this state, as illustrated in FIG. 98, terminal #3 labeled 9012_3 moves to a communication area of first network in which terminal #3 labeled 9012_3 is capable of communicating with AP 9010 via the first wireless communication method.

Next, a second example of such a state will be given.

As illustrated in FIG. 90B, terminal #3 labeled 9012_3 does not communicate with AP 9010 using the first wireless communication method. From this state, as illustrated in FIG. 99, terminal #3 labeled 9012_3 moves to a communication area of first network in which terminal #3 labeled 9012_3 is capable of communicating with AP 9010 via the first wireless communication method.

Here, terminal #3 labeled 9012_3, AP 9010, and first server 9001 communicate, examples of such communication being illustrated in FIG. 92A and FIG. 92B.

Terminal #3 labeled 9012_3 moves from the state illustrated in FIG. 98 and reaches an area in which terminal #3 labeled 9012_3 is capable of communicating with AP 9010 via the second wireless communication method.

As another example, terminal #3 labeled 9012_3 moves from the state illustrated in FIG. 99 and reaches an area in which terminal #3 labeled 9012_3 is capable of communicating with AP 9010 via the second wireless communication method.

Next, an example of operations performed by each device, including terminal #3 labeled 9012_3 in this state, will be given.

Figure 108:
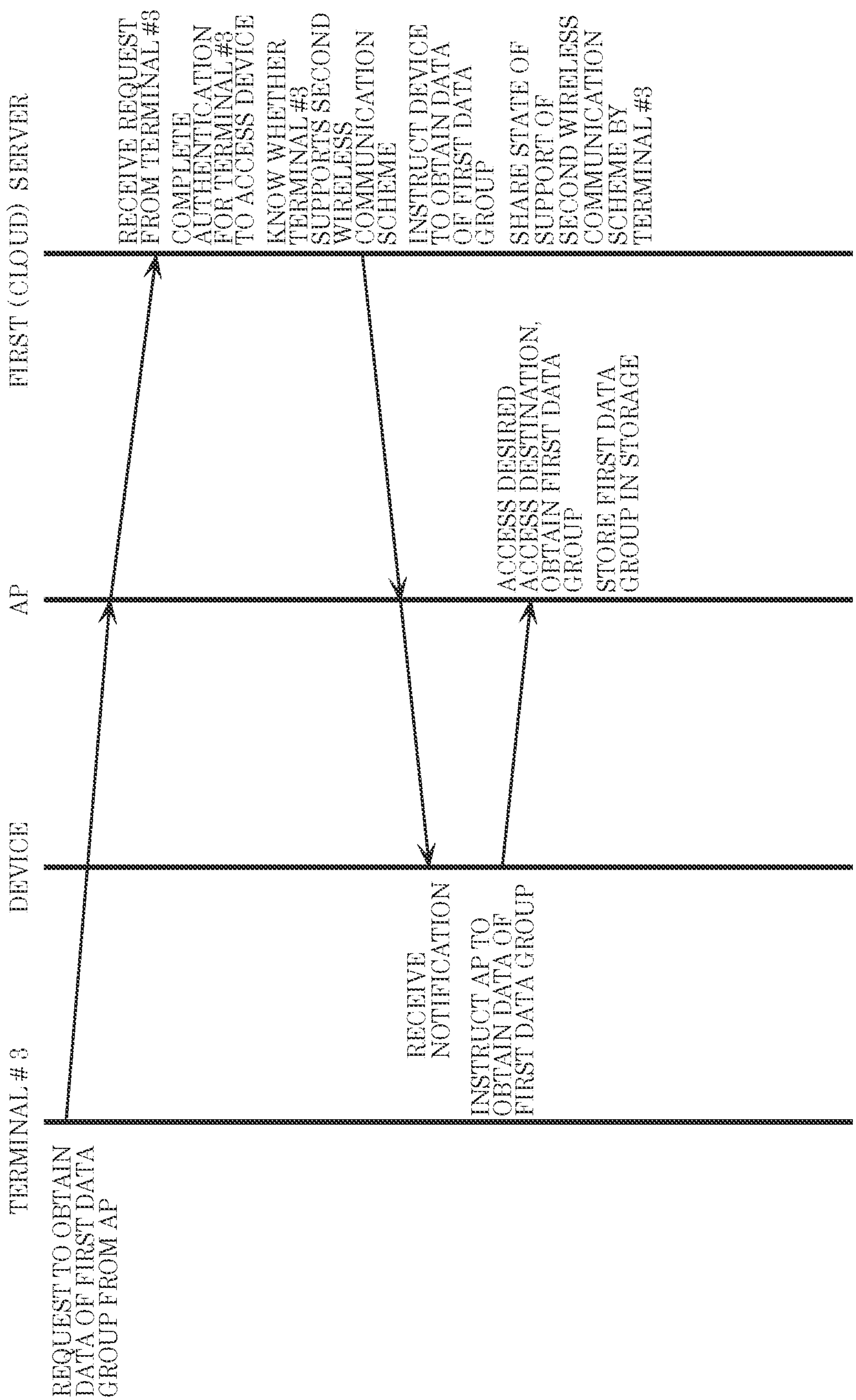
FIG. 108 illustrates one example of procedures for communicating in a communication system.

FIG. 108 illustrates one example of communication between terminal #3 labeled 9012_3, device 9011, AP 9010, and first server 9001.

First, terminal #3 labeled 9012_3 transmits, to first server 9001 via AP 9010, information indicating a request to obtain the data of the first data group from AP 9010. Note that the first wireless communication method or the second wireless communication method may be used for the communication between terminal #3 labeled 9012_3 and AP 9010. Alternatively, some other communication method may be used.

First server 9001 then obtains the information from terminal #3 labeled 9012_3 indicating the request to obtain the data of the first data group from AP 9010. Since terminal #3 labeled 9012_3 has already completed the tasks illustrated in FIG. 92A and FIG. 92B, first server 9001 performs authentication for terminal #3 labeled 9012_3 to access device 9011, and determines whether to grant access. Moreover, since first server 9001 has already completed the tasks illustrated in FIG. 92A and FIG. 92B, first server 9001 knows that terminal #3 labeled 9012_3 is capable of communicating using the second wireless communication scheme, first server 9001 thereby knows the state of the support of the second wireless communication scheme by terminal #3 labeled 9012_3. First server 9001 transmits, to device 9011 via AP 9010, an instruction in response to the request to obtain the data of the first data group from AP 9010 and information on the state of support of the second wireless communication scheme by terminal #3 labeled 9012_3.

AP 9010 transmits this information to device 9011. Here, AP 9010 may use either of the first wireless communication scheme and the second wireless communication scheme. Moreover, another communication scheme may be used when available.

Device 9011 receives this information. Device 9011 then transmits information indicating the instruction to obtain the first data group to AP 9010.

AP 9010 accesses a desired access destination to obtain the first data group, obtains the first data group, and stores the first data group in storage 9321 illustrated in FIG. 96 and FIG. 97.

Operations performed thereafter by terminal #3 labeled 9012_3, device 9011, AP 9010, and first server 9001 will be described with reference to FIG. 109A and FIG. 109B.

Figure 109A:
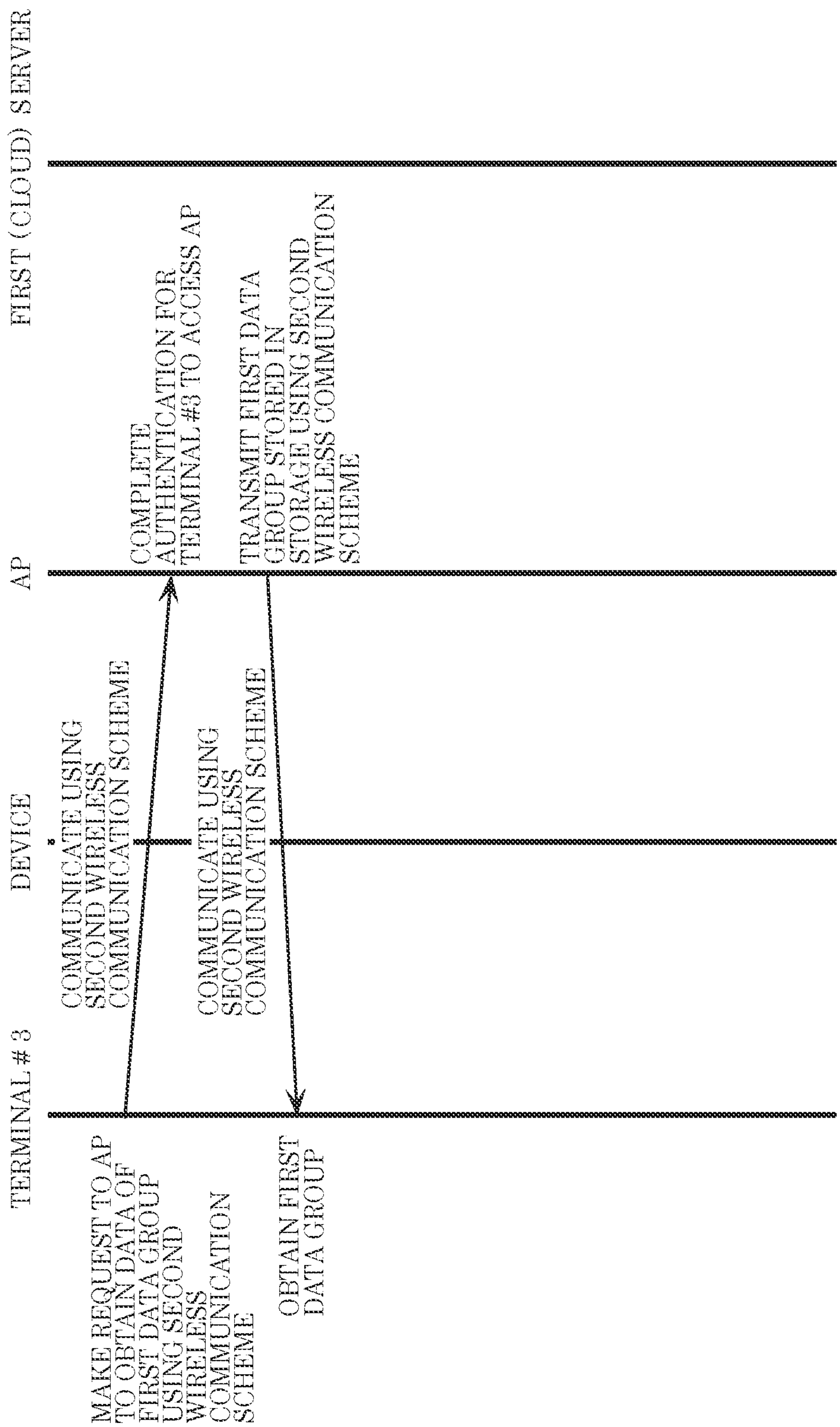
FIG. 109A illustrates one example of procedures for communicating in a communication system.

FIG. 109A illustrates a first example of operations performed thereafter by terminal #3 labeled 9012_3, device 9011, AP 9010, and first server 9001. FIG. 109A illustrates a first example of communication between terminal #3 labeled 9012_3, device 9011, AP 9010, and first server 9001.

Figure 106:
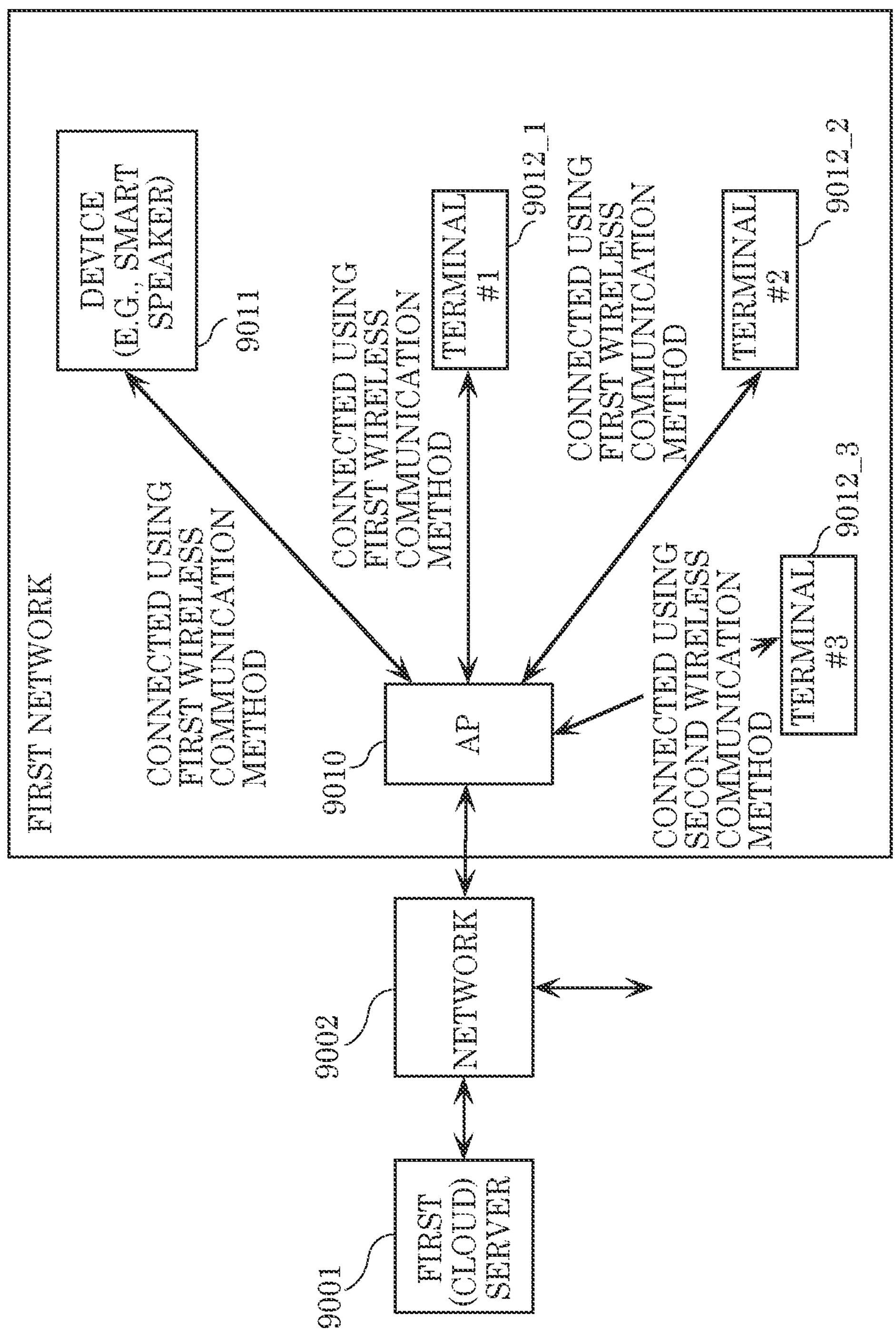
FIG. 106 illustrates one example of communication in a communication system.
Figure 107:
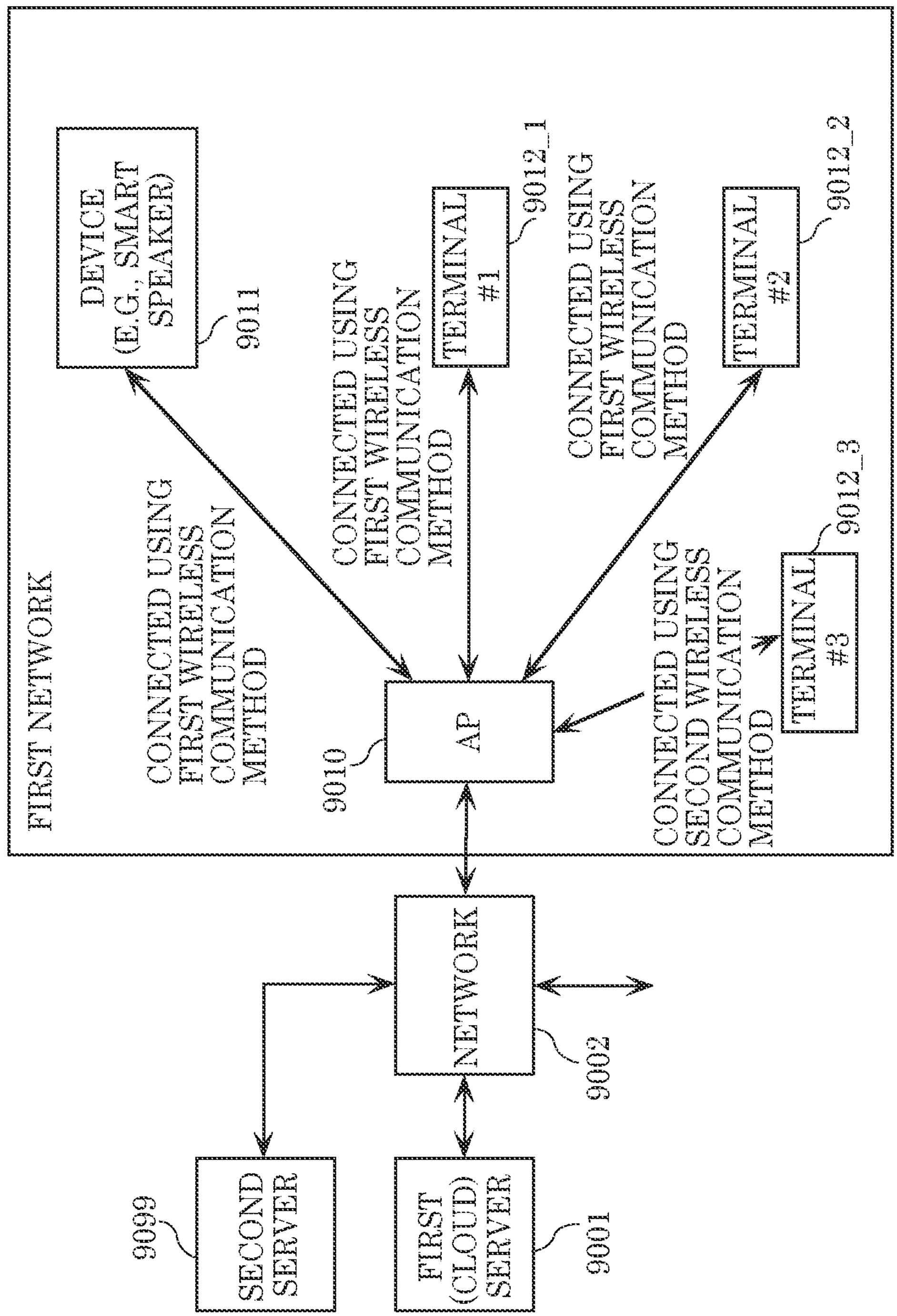
FIG. 107 illustrates one example of communication in a communication system.

As illustrated in FIG. 106 and FIG. 107, terminal #3 labeled 9012_3 is capable of communicating with AP 9010 using the second wireless communication scheme (note that terminal #3 labeled 9012_3 is capable of determining that terminal #3 labeled 9012_3 is capable of communicating with AP 9010 via the second wireless communication scheme by detecting a modulated signal transmitted by AP 9010 using the second wireless communication method).

Terminal #3 labeled 9012_3 transmits, to AP 9010, information indicating a request to obtain data of the first data group using the second wireless communication. Note that terminal #3 labeled 9012_3 transmits a modulated signal including this information using the second wireless communication scheme. Here, terminal #3 labeled 9012_3 may transmit terminal identification information.

AP 9010 receives the modulated signal transmitted by terminal #3 labeled 9012_3, and grants access permission to terminal #3 labeled 9012_3. AP 9010 then uses the second wireless communication scheme to transmit a modulated signal including the first data group stored in storage 9321 illustrated in FIG. 96 and FIG. 97.

Terminal #3 labeled 9012_3 thus obtains the first data group.

Figure 109B:
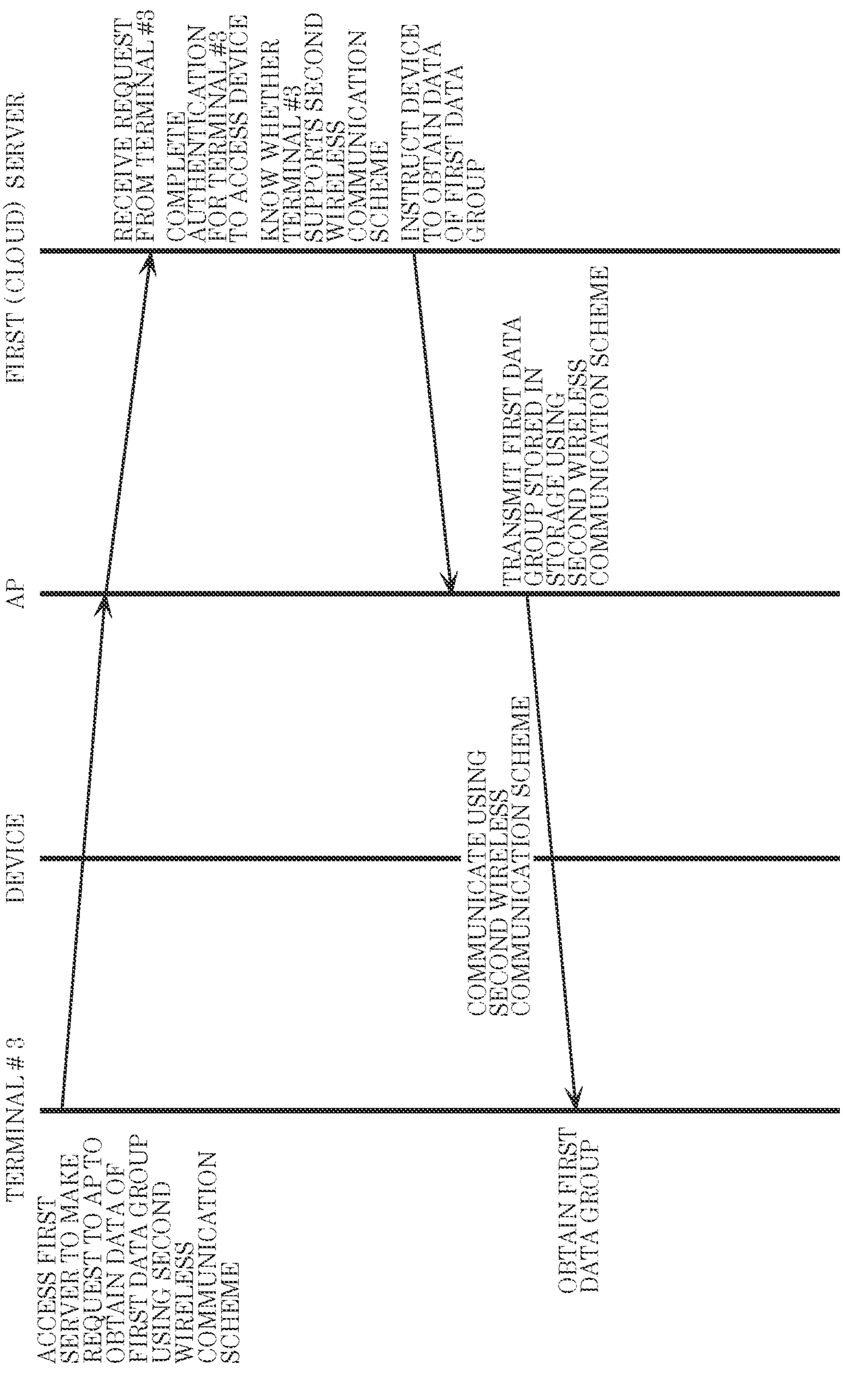
FIG. 109B illustrates one example of procedures for communicating in a communication system.

FIG. 109B illustrates a second example of operations performed thereafter by terminal #3 labeled 9012_3, device 9011, AP 9010, and first server 9001. FIG. 109B illustrates a second example of communication between terminal #3 labeled 9012_3, device 9011, AP 9010, and first server 9001.

As illustrated in FIG. 106 and FIG. 107, terminal #3 labeled 9012_3 is capable of communicating with AP 9010 using the second wireless communication scheme (note that terminal #3 labeled 9012_3 is capable of determining that terminal #3 labeled 9012_3 is capable of communicating with AP 9010 via the second wireless communication scheme by detecting a modulated signal transmitted by AP 9010 using the second wireless communication method).

Terminal #3 labeled 9012_3 transmits, to first server 9001 via AP 9010, information indicating a request to obtain data of the first data group from AP 9010 using the second wireless communication scheme.

Here, either of the first wireless communication scheme and the second wireless communication scheme may be used. Moreover, some other communication method may be used.

First server 9001 then receives this request. Since terminal #3 labeled 9012_3 has already completed the tasks illustrated in FIG. 92A and FIG. 92B, first server 9001 performs authentication for terminal #3 labeled 9012_3 to access device 9011, and determines whether to grant access. Moreover, since first server 9001 has already completed the tasks illustrated in FIG. 92A and FIG. 92B, first server 9001 knows that terminal #3 labeled 9012_3 is capable of communicating using the second wireless communication scheme, first server 9001 thereby knows the state of the support of the second wireless communication scheme by terminal #3 labeled 9012_3.

First server 9001 then transmits, to AP 9010, information indicating the request that terminal #3 labeled 9012_3 wants to obtain the first data group.

AP 9010 then receives this information, and uses the second wireless communication scheme to transmit a modulated signal including the first data group stored in storage 9321 illustrated in FIG. 96 and FIG. 97.

Terminal #3 labeled 9012_3 thus obtains the first data group.

Performing the above operations achieves the advantageous effect that the same advantages described in Embodiment 14 can be achieved.

Next, an example of operations performed by each device, which differs from the operations performed by each device including terminal #3 labeled 9012_3 and illustrated in FIG. 108, FIG. 109A, and FIG. 109B, will be described.

Figure 110:
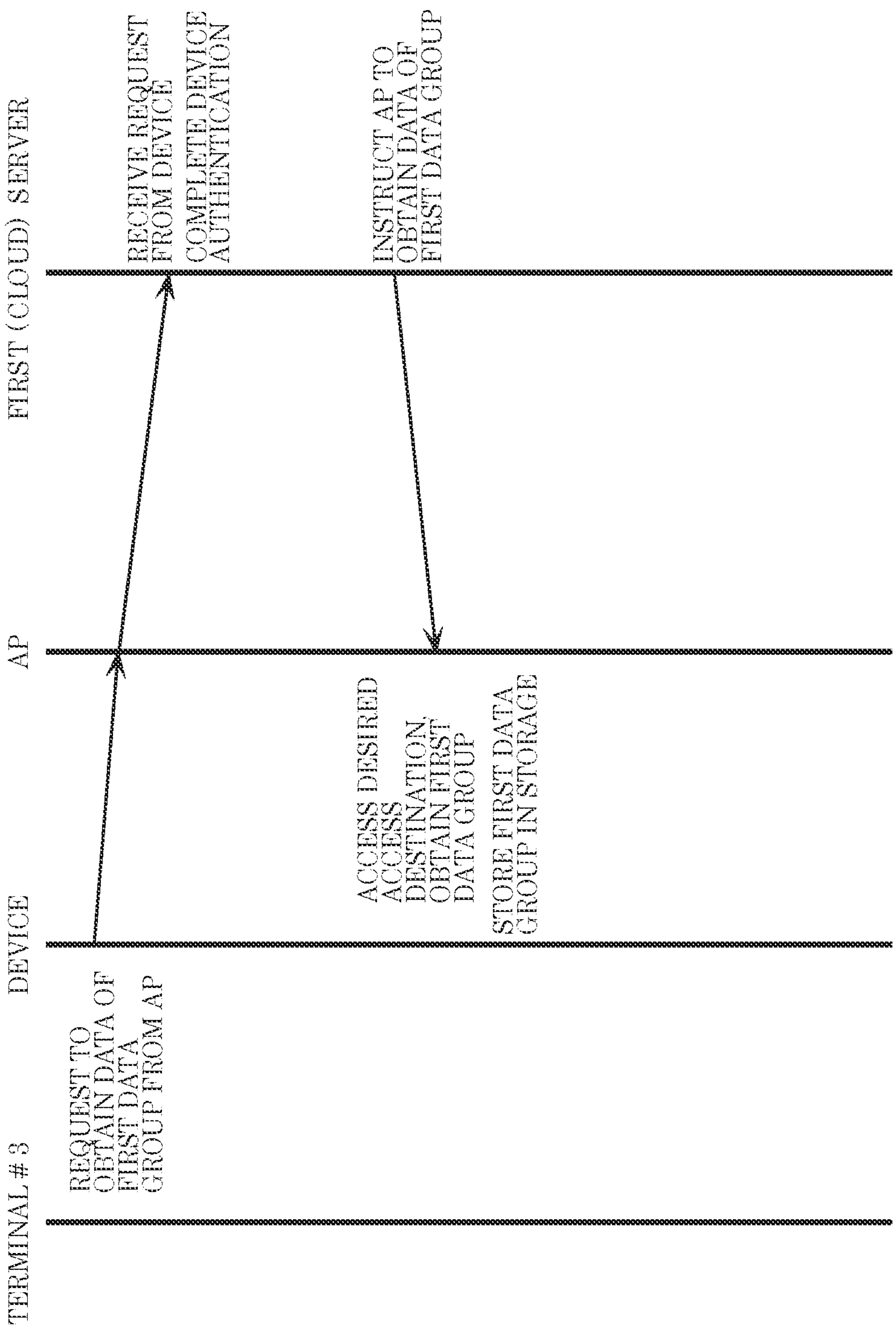
FIG. 110 illustrates one example of procedures for communicating in a communication system.

FIG. 110 illustrates one example of communication between terminal #3 labeled 9012_3, device 9011, AP 9010, and first server 9001.

First, a user requests device 9011 to obtain data of a first data group. For example, the user conveys the request to obtain the data of the first data group by using microphone 9331 and voice recognizer 9333 illustrated in FIG. 93 and FIG. 94.

For example, the user utters the following line into microphone 9331 of device 9011.

"Download the first data group".

Voice recognizer 9333 in FIG. 93 and FIG. 94 then performs voice recognition, and recognizes that the user has requested to download the first data group. Accordingly, device 9011 transmits request information indicating that it wants to obtain data of the first data group to AP 9010. Here, either of the first wireless communication scheme and the second wireless communication scheme may be used. Moreover, some other communication method may be used.

AP 9010 then transmits the request information indicating the request to obtain data of the first data group to first server 9001.

Voice recognizer 9333 may perform signal processing on audio signal 9332 obtained by the microphone to carry out the voice recognition, and, alternatively, audio signal 9332 obtained by the microphone may be transmitted to first server 9001 and second server 9099, and first server 9001 and second server 9099 may perform signal processing for voice recognition, and transmit the result to voice recognizer 9333.

First server 9001 then receives the request information from device 9011 indicating that the user wants to obtain data of the first data group.

Since device 9011 has already completed the tasks illustrated in FIG. 91, first server 9001 determines whether to grant device 9011 permission to access first server 9001. Since first server 9001 has already completed the tasks illustrated in FIG. 91, first server 9001 knows that device 9011 is capable of communication using the second wireless communication scheme, so first server 9001 knows the state of the support of the second wireless communication scheme by device 9011. First server 9001 then transmits information indicating the instruction to AP 9010 obtain the data of the first data group.

AP 9010 accesses a desired access destination to obtain the first data group, obtains the first data group, and stores the first data group in storage 9321 illustrated in FIG. 96 and FIG. 97.

In this example, the user possesses terminal #3 labeled 9012_3. Operations performed by terminal #3 labeled 9012_3, device 9011, AP 9010, and first server 9001 after the operations described above will be described with reference to FIG. 111A and FIG. 111B.

For example, the user uses terminal #3 labeled 9012_3 to access AP 9010. The user then uses terminal #3 labeled 9012_3 to ask AP 9010 whether the downloading of the first data group is complete or not. When terminal #3 labeled 9012_3 receives a response from AP 9010 that the downloading of the first data group is not complete, the user once again uses terminal #3 labeled 9012_3 to ask AP 9010 whether the downloading of the first data group is complete or not.

Figure 111A:
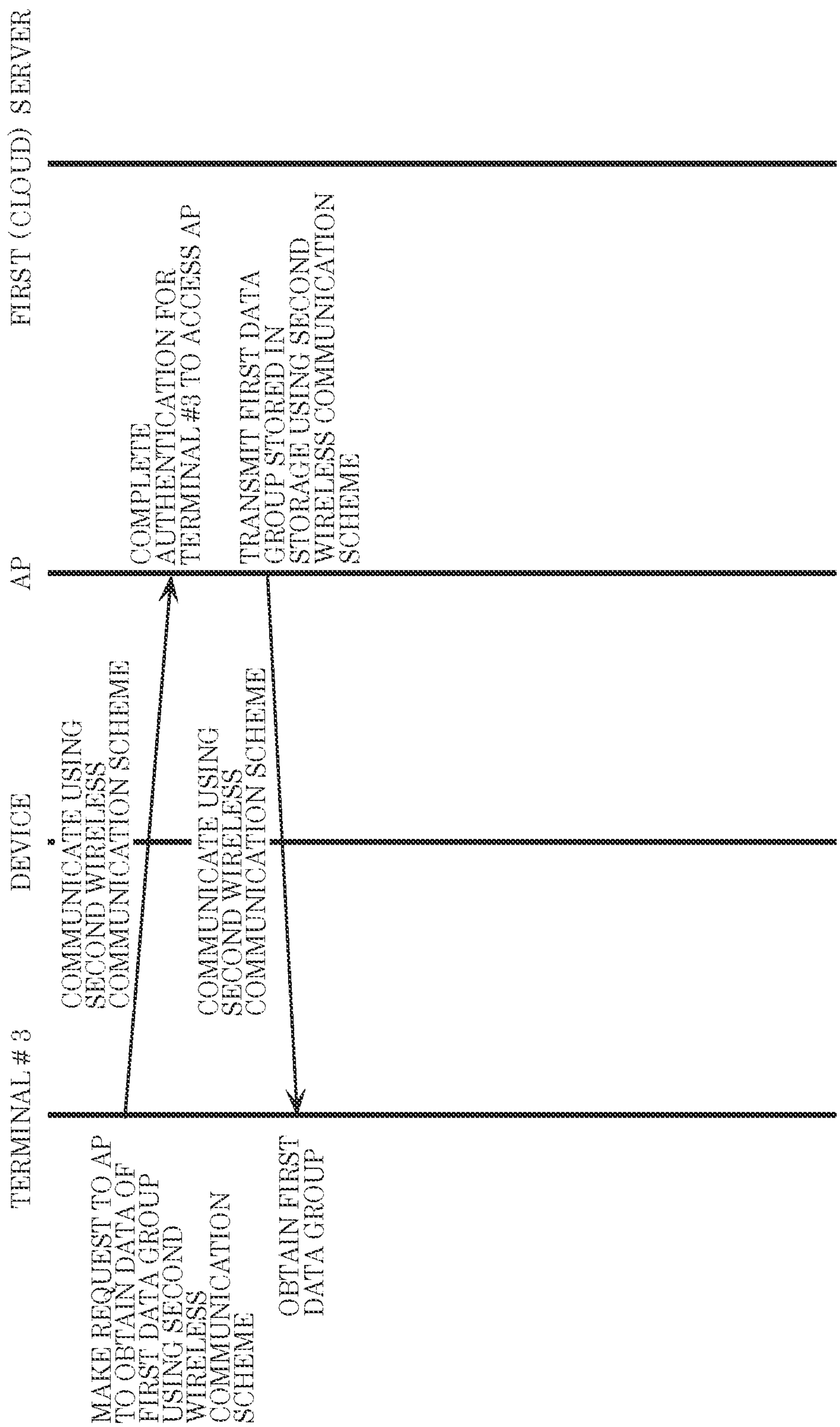
FIG. 111A illustrates one example of procedures for communicating in a communication system.
Figure 111B:
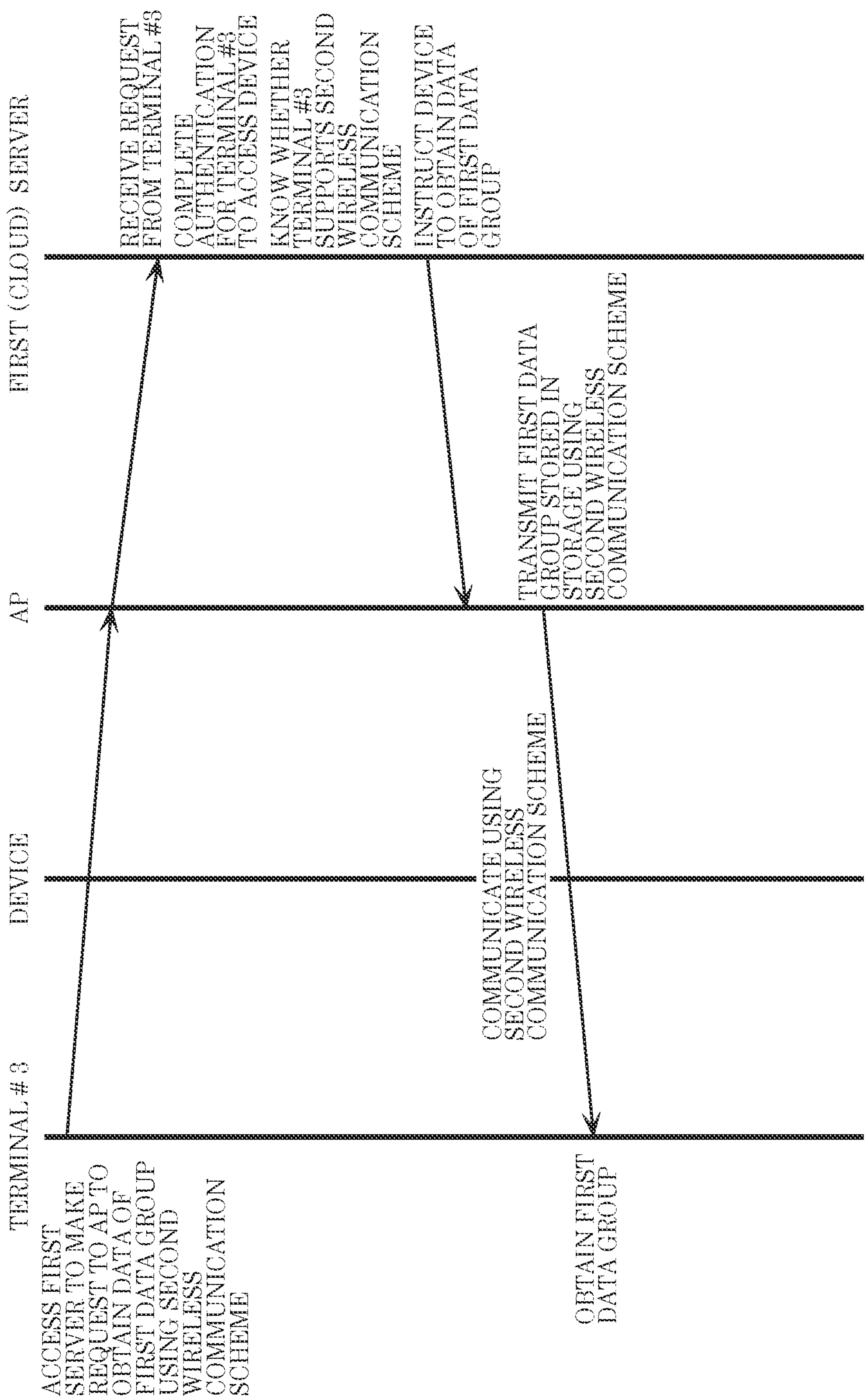
FIG. 111B illustrates one example of procedures for communicating in a communication system.

If terminal #3 labeled 9012_3 receives a response from AP 9010 that the downloading of the first data group is complete, for example, terminal #3 labeled 9012_3 performs the operations illustrated in FIG. 111A or FIG. 111B.

Note that in the above operations, terminal #3 labeled 9012_3 and AP 9010 may use the first wireless communication scheme or the second wireless communication scheme when transmitting the modulated signal. Moreover, some other communication method may be used.

Next, the operations illustrated in FIG. 111A will be described.

FIG. 111A illustrates a first example of operations performed by terminal #3 labeled 9012_3, device 9011, AP 9010, and first server 9001. As illustrated in FIG. 106 and FIG. 107, terminal #3 labeled 9012_3 is capable of communicating with device 9011 using the second wireless communication scheme (note that terminal #3 labeled 9012_3 is capable of determining that terminal #3 labeled 9012_3 is capable of communicating with device 9011 via the second wireless communication scheme by detecting a modulated signal transmitted by device 9011 using the second wireless communication method).

Terminal #3 labeled 9012_3 transmits, to AP 9010, information indicating a request to obtain data of the first data group using the second wireless communication. Note that terminal #3 labeled 9012_3 transmits a modulated signal including this information using the second wireless communication scheme. Here, terminal #3 labeled 9012_3 may transmit terminal identification information.

AP 9010 receives the modulated signal transmitted by terminal #3 labeled 9012_3, and grants access permission to terminal #3 labeled 9012_3. AP 9010 then uses the second wireless communication scheme to transmit a modulated signal including the first data group stored in storage 9321 illustrated in FIG. 96 and FIG. 97.

Terminal #3 labeled 9012_3 thus obtains the first data group.

FIG. 111B illustrates a second example of communication between terminal #3 labeled 9012_3, device 9011, AP 9010, and first server 9001. As illustrated in FIG. 106 and FIG. 107, terminal #3 labeled 9012_3 is capable of communicating with AP 9010 using the second wireless communication scheme (note that terminal #3 labeled 9012_3 is capable of determining that terminal #3 labeled 9012_3 is capable of communicating with AP 9010 via the second wireless communication scheme by detecting a modulated signal transmitted by AP 9010 using the second wireless communication method).

Terminal #3 labeled 9012_3 transmits, to first server 9001 via AP 9010, information indicating a request to obtain data of the first data group from AP 9010 using the second wireless communication scheme.

Here, either of the first wireless communication scheme and the second wireless communication scheme may be used. Moreover, some other communication method may be used.

First server 9001 then receives this request. Since terminal #3 labeled 9012_3 has already completed the tasks illustrated in FIG. 92A and FIG. 92B, first server 9001 performs authentication for terminal #3 labeled 9012_3 to access device 9011, and determines whether to grant access. Moreover, since first server 9001 has already completed the tasks illustrated in FIG. 92A and FIG. 92B, first server 9001 knows that terminal #3 labeled 9012_3 is capable of communicating using the second wireless communication scheme, first server 9001 thereby knows the state of the support of the second wireless communication scheme by terminal #3 labeled 9012_3.

First server 9001 then transmits, to AP 9010, information indicating the request that terminal #3 labeled 9012_3 wants to obtain the first data group.

AP 9010 then receives this information, and uses the second wireless communication scheme to transmit a modulated signal including the first data group stored in storage 9321 illustrated in FIG. 96 and FIG. 97.

Terminal #3 labeled 9012_3 thus obtains the first data group.

Performing the above operations achieves the advantageous effect that the same advantages described in Embodiment 14 can be achieved.

In the present embodiment, in FIG. 93 and FIG. 94, the terminology "voice recognizer 9333" is used, but in addition to voice, an audio signal may also be input, and recognition related to sound may be performed.

The first wireless communication scheme and the second wireless communication scheme may be optical communication schemes that use visible light.

In the present embodiment, the interface for, for example, instructing device 9011, is exemplified as, but not limited to, a microphone and speaker; a function for inputting a command, input via an image sensor or image recognition or the like, input via gesture using a speed sensor or acceleration sensor may be used.

Embodiment 16

In the present embodiment, one example of a communication system that obtains data stored in a forwarding source device via a mobile repeater device.

Figure 112:
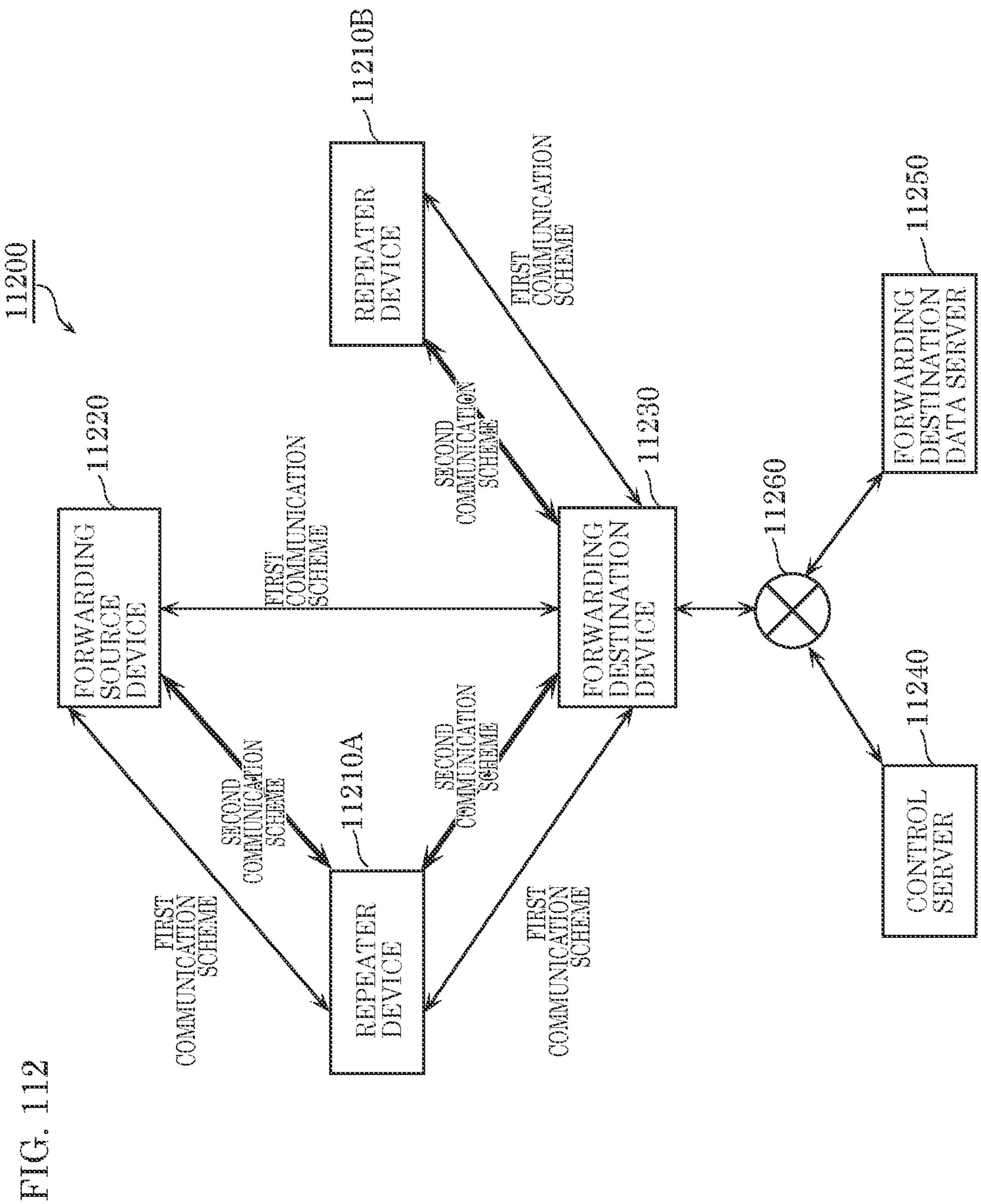

FIG. 112 illustrates one example of a configuration of communication system 11200 according to Embodiment 16.

As illustrated in FIG. 112, communication system 11200 includes one or more repeater devices 11210 (repeater device 11210A and repeater device 11210B), forwarding source device 11220, forwarding destination device 11230, control server 11240, forwarding destination data server 11250, and network 11260. Hereinafter, except for when it is necessary to clearly distinguish between repeater device 11210A and repeater device 11210B, the terminology "repeater device 11210" will be used to refer to both device 11210A and repeater device 11210B.

Forwarding source device 11220 stores data to be forwarded to forwarding destination device 11230, and communicates with an external device by switching between a first communication scheme and a second communication scheme. The second communication scheme is, for example, a scheme that has a narrower communication range than the first communication scheme and has a greater per-unit-time data forwarding capacity than the first communication scheme. An example of the relationship between the first communication scheme and the second communication scheme will be given later. Forwarding source device 1120 and repeater device 11210 are capable of communicating using the first communication scheme and the second communication scheme, and repeater device 11210 and forwarding destination device 11230 are capable of communicating using the first communication scheme and the second communication scheme.

The first communication scheme may be, for example, LoRa, which is one low power wide area (LPWA) scheme, and the second communication scheme may be, for example, Wigig (IEEE 802.11ad), which is one 60 GHz band wireless communication scheme. However, the first communication scheme need not be limited to LoRa, and the second communication scheme need not be limited to Wigig.

When the first communication scheme and the second communication scheme are wireless communication schemes, consider the following example of the relationship between the first communication scheme and the second communication scheme.

FIRST EXAMPLE

The first communication scheme has a $\alpha$ [Hz] ($\alpha$ is a real number greater than 0) frequency band, the second communication scheme has a $\beta$ [Hz] ($\beta$ is a real number greater than 0) frequency band, $\alpha$ is a real number greater than 0, $\beta$ is a real number greater than 0, and $\beta$ is greater than $\alpha$.

SECOND EXAMPLE

The frequency band used by the first communication scheme is different than the frequency band used by the second communication scheme. When the maximum data transmission speed of the first communication scheme is $\gamma$ bits per second ([bps]) and the maximum data transmission speed of the second communication scheme is $\delta$ [bps], $\gamma$ is a real number greater than 0, $\delta$ is a real number greater than 0, and $\delta$ is greater than $\gamma$.

THIRD EXAMPLE

The frequency band used by the first communication scheme is different than the frequency band used by the second communication scheme. When the minimum data transmission speed of the first communication scheme is g bits per second ([bps]) and the minimum data transmission speed of the second communication scheme is h [bps], g is a real number greater than 0, h is a real number greater than 0, and h is greater than g.

For example, forwarding source device 11220 may be a camera that captures video or still images, such as a security camera or surveillance camera, and may be, for example, an access point, base station, or repeater. However, forwarding source device 11220 is not limited to these examples. When forwarding source device 11220 is implemented as a security camera, the data stored by forwarding source device 11220 is, for example, 4K or 8K resolution video (the video may include audio) captured by forwarding source device 11220, or 4K or 8K resolution still images (the images may include audio).

Forwarding destination device 11230 is a device that is the destination of data to be forwarded that is stored in forwarding source device 11220. Forwarding destination device 11230 communicates with external devices by switching between the first communication scheme and the second communication scheme. An example of the relationship between the first communication scheme and the second communication scheme will be given later. Forwarding source device 1120 and repeater device 11210 are capable of communicating using the first communication scheme and the second communication scheme, and repeater device 11210 and forwarding destination device 11230 are capable of communicating using the first communication scheme and the second communication scheme.

Forwarding destination device 11230 is further connected to network 11260, and further communicates with devices connected to network 11260, via network 11260. Devices capable of communication via network 11260 include, for example, control server 11240 and forwarding destination data server 11250.

For example, forwarding destination device 11230 may be a personal computer, computer, or tablet equipped with a central processing unit (CPU). However, forwarding destination device 11230 is not limited to these examples.

Control server 11240 controls communication system 11200. Control server 11240 is connected to network 11260, and communicates with devices that are connected to network 11260, via network 11260. Devices capable of communication via network 11260 include, for example, forwarding destination device 11230 and forwarding destination data server 11250.

For example, control server 11240 may be a personal computer or a computer. However, control server 11240 is not limited to these examples.

Forwarding destination data server 11250 stores data obtained from forwarding destination device 11230. Forwarding destination data server 11250 is connected to network 11260, and communicates with devices that are connected to network 11260, via network 11260. Devices capable of communication via network 11260 include, for example, forwarding destination device 11230 and control server 11240.

Repeater device 11210 is a mobile device, and communicates with external devices by switching between the first communication scheme and the second communication scheme. Devices capable of communication using the first communication scheme and the second communication scheme include forwarding source device 11220 and forwarding destination device 11230.

For example, repeater device 11210 may be a drone. For example, repeater device 11210 may be a mobile robot or a mobile object. However, repeater device 11210 is not limited to these examples.

Figure 113:
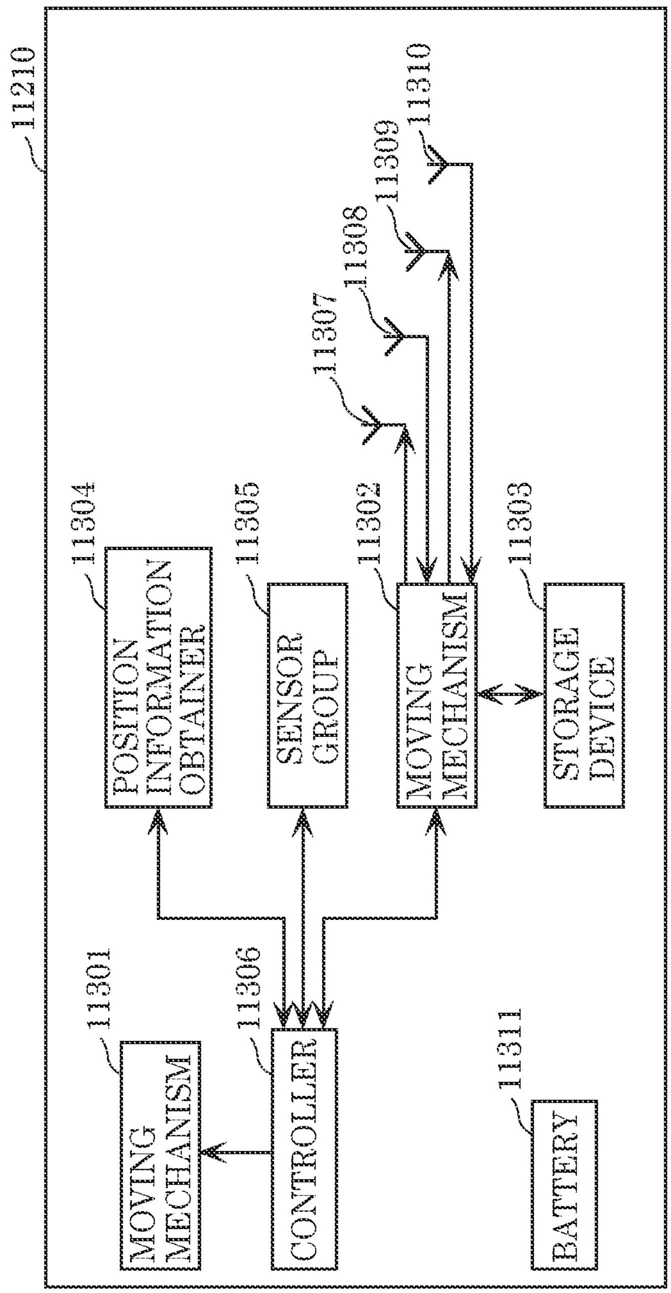

FIG. 113 is a block diagram illustrating one example of a configuration of repeater device 11210.

As illustrated in FIG. 113, repeater device 11210 includes moving mechanism 11301, communication device 11302, storage device 11303, position information obtainer 11304, sensor group 11305, controller 11306, first antenna 11307, second antenna 11308, third antenna 11309, fourth antenna 11310, and battery 11311.

Moving mechanism 11301 is a mechanism for moving repeater device 11210. When repeater device 11210 is implemented as a drone, moving mechanism 11301 may include, for example, a plurality of motors controlled by control signals from controller 11306 and a plurality of blades that generate wind power that lifts and propels repeater device 11210. In such cases, repeater device 11210 moves by flying.

Communication device 11302 communicates with external devices by switching between the first communication scheme and the second communication scheme. Devices capable of communication using the first communication scheme and the second communication scheme include forwarding source device 11220 and forwarding destination device 11230.

More specifically, communication device 11302 receives an input of a received signal that conforms to the first communication scheme and is received by first antenna 11307, performs processing such as demodulation and error correction decoding, and outputs received data. Communication device 11302 performs processing such as error correction coding, modulation (mapping), and frequency conversion on transmission data, and generates a transmission signal that conforms to the first communication scheme. The generated transmission signal that conforms to the first communication scheme is output to second antenna 11308. The transmission signal that conforms to the first communication scheme is then output as radio waves from second antenna 11308. Communication device 11302 receives an input of a received signal that conforms to the second communication scheme and is received by third antenna 11309, performs processing such as demodulation and error correction decoding, and outputs received data. Communication device 11302 performs processing such as error correction coding, modulation (mapping), and frequency conversion on transmission data, and generates a transmission signal that conforms to the second communication scheme. The generated transmission signal that conforms to the second communication scheme is output to fourth antenna 11310. The transmission signal that conforms to the second communication scheme is then output as radio waves from fourth antenna 11310.

For example, storage device 11303 stores data.

More specifically, storage device 11303 stores data obtained from communication device 11302.

For example, storage device 11303 may include volatile memory, may include non-volatile memory, and may include a hard disk device. However, storage device 11303 is not limited to these examples.

Position information obtainer 11304 obtains position information indicating the position of repeater device 11210.

For example, position information obtainer 11304 may include a position detection device that detects position using global positioning system (GPS). However, position information obtainer 11304 is not limited to these examples.

Sensor group 11305 includes one or more sensors controlled by a control signal from controller 11306, and outputs collected information in accordance with the control signal. The one or more sensors included in sensor group 11305 may be, for example, an image sensor, microphone, temperature sensor, humidity sensor, acceleration sensor, or speed sensor or the like. However, the one or more sensors are not limited to these examples.

Controller 11306 controls moving mechanism 11301, communication device 11302, position information obtainer 11304, and sensor group 11305.

For example, controller 11306 includes memory and a processor, and the processor executes a program stored in the memory to realize the various control functions. Controller 11306 may include dedicated hardware that realizes the various control functions.

Battery 11311 supplies power to electrical components included in repeater device 11210.

For example, battery 11311 may be a primary battery, may be a secondary battery that can be charged by an external AC or DC power source, and may be a capacitor that can store a charge from an external AC or DC power source.

One characterizing operation of communication system 11200 configured as described above is a first repeating process.

In the first repeating process, repeater device 11210 moves to a position at which repeater device 11210 is capable of communicating with forwarding source device 11220 using the second communication scheme, and obtains data to be forwarded from forwarding source device 11220 to forwarding source device 11220. This data is then forwarded to forwarding destination data server 11250 by forwarding destination device 11230.

Hereinafter, the first repeating process performed by communication system 11200 will be described with reference to the drawings.

Figure 114:
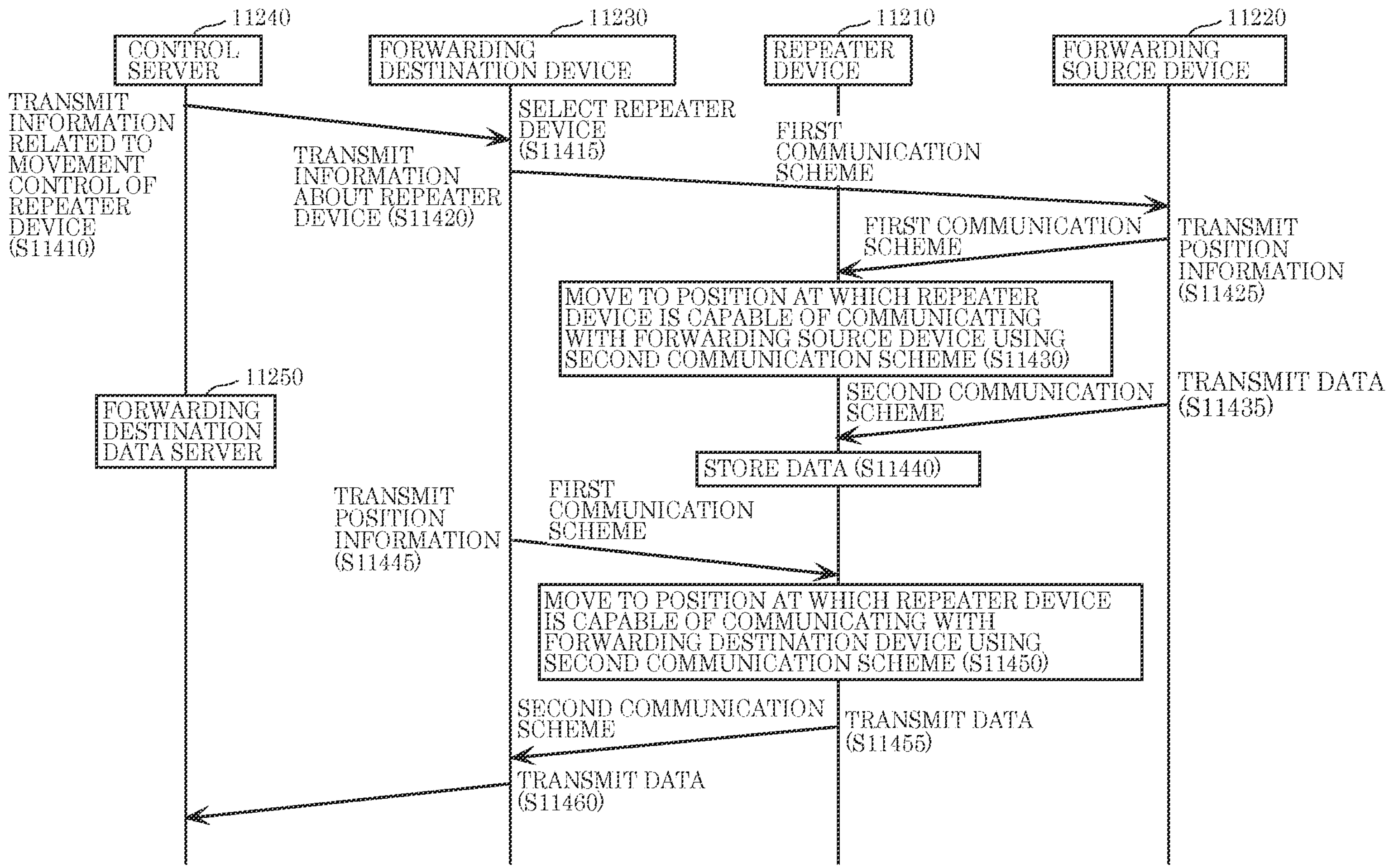

FIG. 114 is a sequence chart of the first repeating process.

When the first repeating process starts, control server 11240 transmits information related to movement control of repeater device 11210 to forwarding destination device 11230 via network 11260 (step S11410).

Upon receipt of the information related to movement control of repeater device 11210, forwarding destination device 11230 selects a repeater device 11210 that is favorable for obtaining the data from forwarding source device 11220 (step S11415). As one example, FIG. 112 illustrates an example in which forwarding destination device 11230 selects repeater device 11210A. For example, forwarding destination device 11230 may select repeater device 11210 based on the current position of repeater device 11210, and may select repeater device 11210 based on the moving capability of repeater device 11210.

Once forwarding destination device 11230 has selected repeater device 11210, forwarding destination device 11230 transmits information about repeater device 11210 to forwarding source device 11220 using the first communication scheme (step S11420).

Upon receipt of the information about repeater device 11210, forwarding source device 11220 transmits the position information of forwarding source device 11220 to repeater device 11210 using the first communication scheme (step S11425). Here, the position information of forwarding source device 11220 is information for moving repeater device 11210 to a position at which repeater device 11210 is capable of communicating with forwarding source device 11220 using the second communication scheme, and may be, for example, coordinates indicating the position of forwarding source device 11220, and may be information including a control command for guiding repeater device 11210 to the position at which repeater device 11210 is capable of communicating with forwarding source device 11220 using the second communication scheme.

When communication device 11302 in repeater device 11210 receives the position information of forwarding source device 11220, moving mechanism 11301 in repeater device 11210 moves repeater device 11210 to the position at which repeater device 11210 is capable of communicating with forwarding source device 11220 using the second communication scheme, based on the position information (step S11430).

Here, for example, when the position information of forwarding source device 11220 is coordinates indicating the position of forwarding source device 11220, controller 11306 generates a control signal that controls moving mechanism 11301, based on the position of forwarding source device 11220, the position of repeater device 11210 indicated in the position information obtained by position information obtainer 11304, and a sensing result indicated in collected information output from sensor group 11305. Moving mechanism 11301 may then move repeater device 11210 in accordance with the control signal generated by controller 11306.

For example, when the position information of forwarding source device 11220 is information including a control command that guides repeater device 11210 to a position at which repeater device 11210 is capable of communicating with forwarding source device 11220 using the second communication scheme, controller 11306 may generate a control signal that controls moving mechanism 11301 based on a control command included in the position information, and moving mechanism 11301 may move repeater device 11210 in accordance with the control signal generated by controller 11306.

Once repeater device 11210 has moved to the position at which repeater device 11210 is capable of communicating with forwarding source device 11220 using the second communication scheme, forwarding source device 11220 uses the second communication scheme to transmit, to repeater device 11210, data to be forwarded to forwarding destination device 11230 (step S11435).

Once communication device 11302 in repeater device 11210 receives, using the second communication scheme, the data transmitted by forwarding source device 11220, storage device 11303 stores that data (step S1440).

Next, forwarding destination device 11230, for example, uses the first communication scheme to transmit the position information of forwarding destination device 11230 to repeater device 11210 (step S11445). Here, the position information of forwarding destination device 11230 is information for moving repeater device 11210 to a position at which repeater device 11210 is capable of communicating with forwarding destination device 11230 using the second communication scheme, and may be, for example, coordinates indicating the position of forwarding destination device 11230, and may be information including a control command for guiding repeater device 11210 to the position at which repeater device 11210 is capable of communicating with forwarding destination device 11230 using the second communication scheme.

When communication device 11302 in repeater device 11210 receives the position information of forwarding destination device 11230, moving mechanism 11301 in repeater device 11210 moves repeater device 11210 to the position at which repeater device 11210 is capable of communicating with forwarding destination device 11230 using the second communication scheme, based on the position information (step S11450).

Here, for example, when the position information of forwarding destination device 11230 is coordinates indicating the position of forwarding destination device 11230, controller 11306 generates a control signal that controls moving mechanism 11301, based on the position of forwarding destination device 11230, the position of repeater device 11210 indicated in the position information obtained by position information obtainer 11304, and a sensing result indicated in collected information output from sensor group 11305. Moving mechanism 11301 may then move repeater device 11210 in accordance with the control signal generated by controller 11306.

For example, when the position information of forwarding destination device 11230 is information including a control command that guides repeater device 11210 to a position at which repeater device 11210 is capable of communicating with forwarding destination device 11230 using the second communication scheme, controller 11306 may generate a control signal that controls moving mechanism 11301 based on a control command included in the position information, and moving mechanism 11301 may move repeater device 11210 in accordance with the control signal generated by controller 11306.

Once repeater device 11210 has moved to the position at which repeater device 11210 is capable of communicating with forwarding destination device 11230 using the second communication scheme, communication device 11302 in repeater device 11210 uses the second communication scheme to transmit, to forwarding destination device 11230, data stored in storage device 11303 and obtained from forwarding source device 11220.

Once forwarding destination device 11230 receives, using the second communication scheme, the data transmitted by repeater device 11210, forwarding destination device 11230 transmits the received data to forwarding destination data server 11250 via network 11260 (step S11460).

Upon receiving this data, forwarding destination data server 11250 stores the received data (step S11465).

In this way, with communication system 11200 described above, even when the positional relationship between forwarding source device 11220 and forwarding destination device 11230 is such that direct communication using the second communication scheme is not possible, it is possible to achieve the advantageous effect that forwarding destination device 11230 can use the second communication scheme to receive, via repeater device 11210, data stored in forwarding source device 11220. Even when forwarding source device 11220 and forwarding destination device 11230 are in a state in which they are capable of communicating using the first communication scheme, by refraining from transmitting data using the first communication scheme, it is possible to achieve the advantageous effects that communication resources for the first communication scheme can used in other communication, and by using the second communication scheme to transmit data, communication can be completed in a short amount of time.

Note that in the description of communication system 11200, repeater device 11210 that relays the transmission of data is exemplified as a drone, but repeater device 11210 may be a device other than a drone. For example, repeater device 11210 may be a communication device known as a high altitude pseudo-satellite (HAPS), a communication satellite, or a vehicle equipped with a communication function. However, repeater device 11210 is not limited to these examples.

In the description of communication system 11200, an example is given in which repeater device 11210 that moves based on an instruction from control server 11240 acts as a relay to transmit data, but a repeater device whose path of movement is determined in advance may be used to relay transmission data. For example, from among a plurality of repeater devices whose path of movement is determined in advance or whose path of movement can be estimated, control server 11240 may select a repeater device that moves in order from an area in which communication with forwarding source device 11220 using the second communication scheme is possible and an area in which communication with forwarding destination device 11230 using the second communication scheme is possible, and instruct the selected repeater device, forwarding source device 11220, and forwarding destination device 11230 so that the selected repeater device acts as a relay for data transmission. Note that the procedures related to movement of repeater device 11210 are not limited to the above examples; what is important is that repeater device 11210 moves to be closer to forwarding source device 11220 and repeater device 11210 moves to be closer to forwarding destination device 11230.

In the description of communication system 11200, forwarding destination device 11230 is described as transmitting, to forwarding destination data server 11250 via network 11260, data obtained from repeater device 11210. In contrast to this, as another example, a person who manages communication system 11200 may carry forwarding destination device 11230 that obtained data from repeater device 11210 to a position at which forwarding destination device can directly connect to forwarding destination data server 11250, and directly connect forwarding destination device 11230 and forwarding destination data server 11250 to forward the data from forwarding destination device 11230 to forwarding destination data server 11250.

Embodiment 17

In the present embodiment, a communication system according to Embodiment 17, whose configuration has partially changed from communication system 11200 according to Embodiment 16, will be described.

Figure 115:
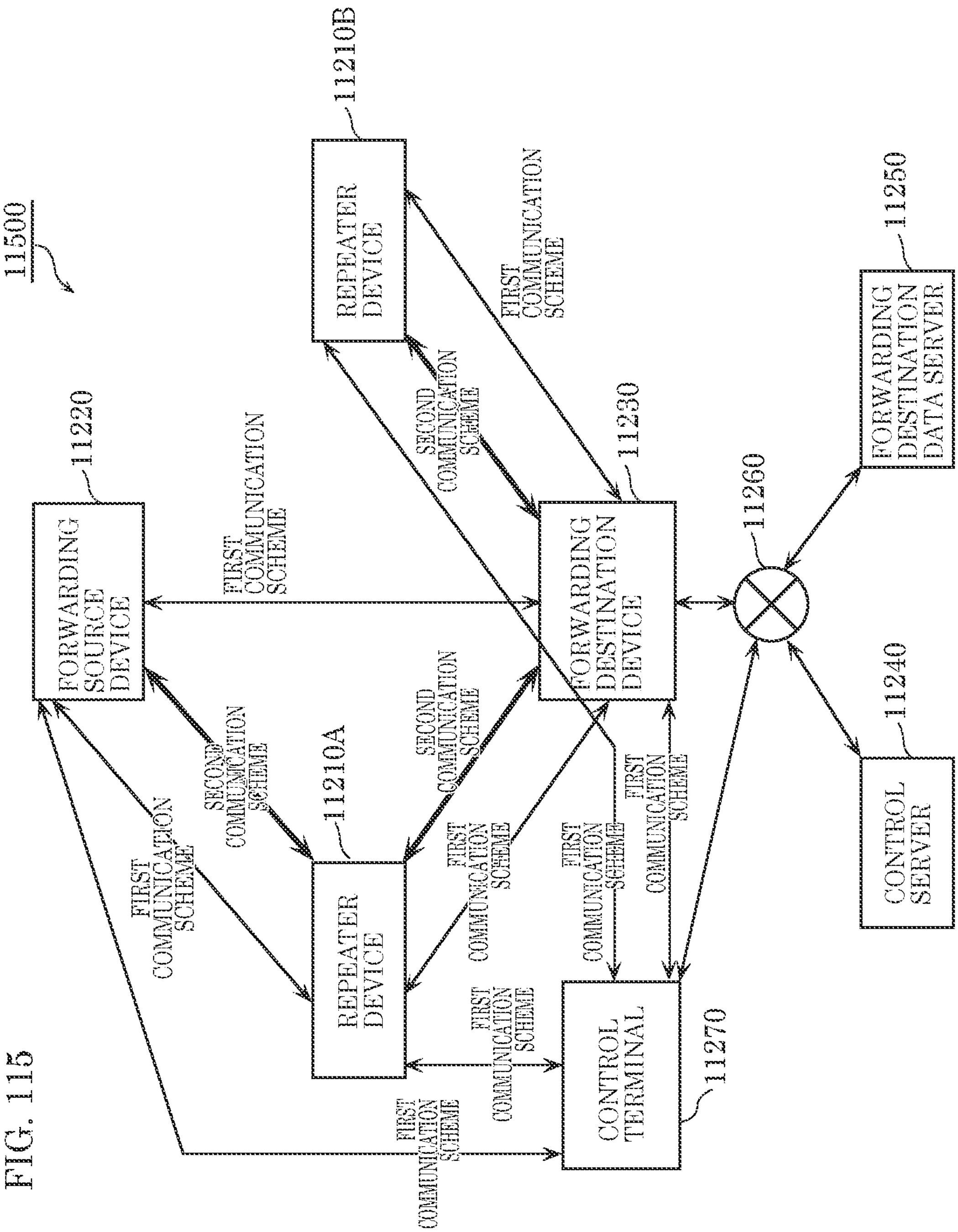

FIG. 115 illustrates one example of a configuration of communication system 11500 according to Embodiment 17.

As illustrated in FIG. 115, communication system 11500 differs from communication system 11200 according to Embodiment 16 (see FIG. 112) in regard to the inclusion of control terminal 11270. Hereinafter, description of the configuration of communication system 11500 will focus on the points of difference with communication system 11200 according to Embodiment 16.

Control terminal 11270 communicates with an external device using the first communication scheme. Devices capable of communicating using the first communication scheme include repeater device 11210, forwarding source device 11220, and forwarding destination device 11230.

Control terminal 11270 is further connected to network 11260, and further communicates with devices connected to network 11260, via network 11260. Devices capable of communication via network 11260 include control server 11240.

For example, control terminal 11270 may be a personal computer, computer, or tablet equipped with a central processing unit (CPU). However, control terminal 11270 is not limited to these examples.

One characterizing operation of communication system 11500 configured as described is a second repeating process, which is a partial modification of the first repeating process according to Embodiment 16.

Figure 116:
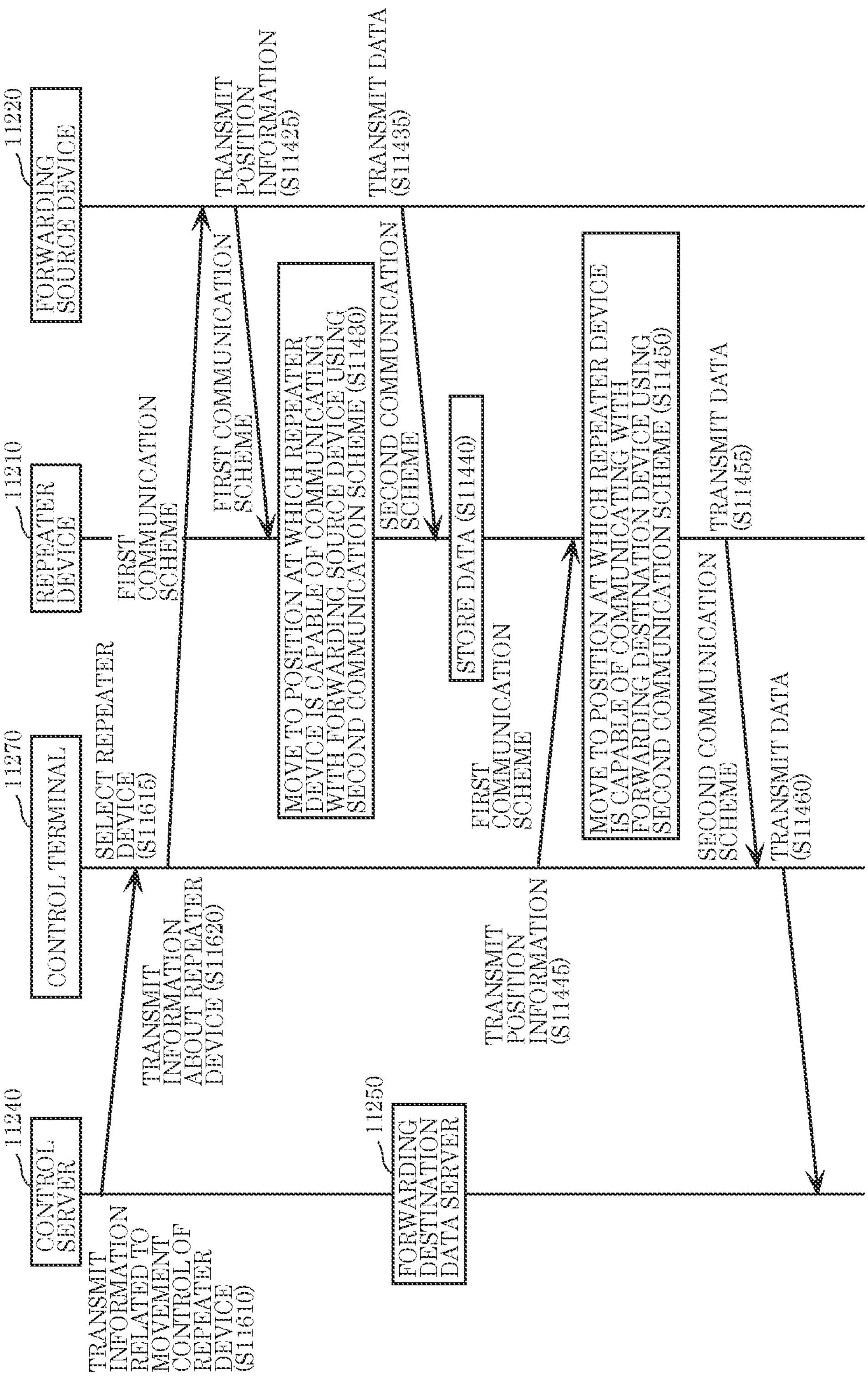

FIG. 116 is a sequence chart of the second repeating process.

As illustrated in FIG. 116, the second repeating process differs from the first repeating process according to Embodiment 16 (see FIG. 114) in that the process in step S11410 has changed to the process in step S11610, the process in step S11415 has changed to the process in step S11615, and the process in step S11420 has changed to the process in step S11620. Hereinafter, description of the second repeating process will focus on the points of difference from the first repeating process according to Embodiment 16.

When the second repeating process starts, control server 11240 transmits information related to movement control of repeater device 11210 to control terminal 11270 via network 11260 (step S11610).

Upon receipt of the information related to movement control of repeater device 11210, control terminal 11270 selects a repeater device 11210 that is favorable for obtaining the data from forwarding source device 11220 (step S11615). As one example, FIG. 115 illustrates an example in which control terminal 11270 selects repeater device 11210A.

Once control terminal 11270 has selected repeater device 11210, control terminal 11270 transmits information about repeater device 11210 to forwarding source device 11220 using the first communication scheme (step S11620).

Upon completion of the process in step S11620, communication system 11500 proceeds to the process in step S11425 in the first repeating process according to Embodiment 16, and performs step S11425 and subsequent processes.

In this way, with communication system 11500 described above, just like with communication system 11200 according to Embodiment 16, even when the positional relationship between forwarding source device 11220 and forwarding destination device 11230 is such that direct communication using the second communication scheme is not possible, it is possible to achieve the advantageous effect that forwarding destination device 11230 can use the second communication scheme to receive, via repeater device 11210, data stored in forwarding source device 11220. Even when forwarding source device 11220 and forwarding destination device 11230 are in a state in which they are capable of communicating using the first communication scheme, by refraining from transmitting data using the first communication scheme, it is possible to achieve the advantageous effects that communication resources for the first communication scheme can used in other communication, and by using the second communication scheme to transmit data, communication can be completed in a short amount of time.

Embodiment 18

In the present embodiment, a communication system according to Embodiment 18, whose configuration has partially changed from communication system 11200 according to Embodiment 16, will be described.

Figure 117:
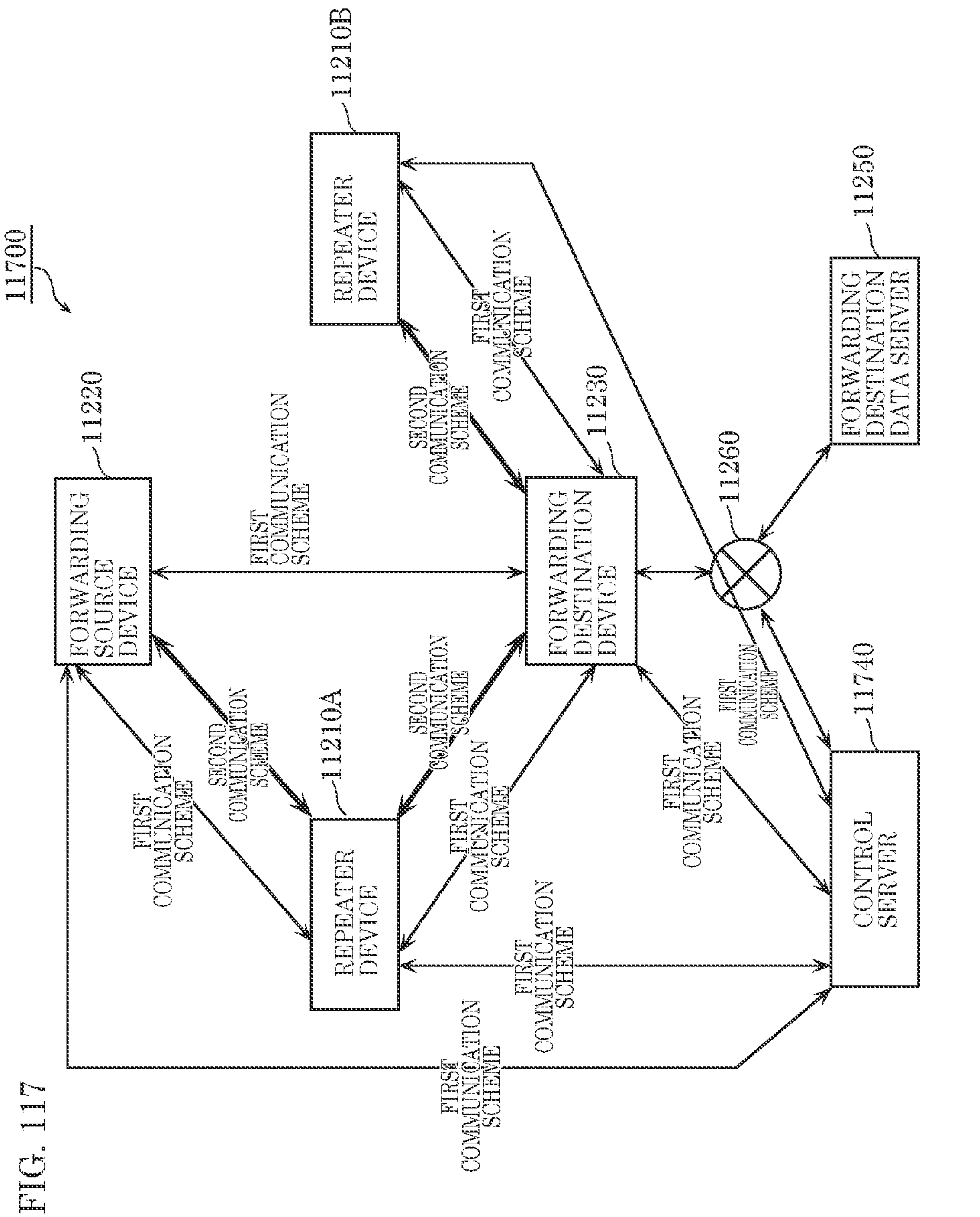

FIG. 117 illustrates one example of a configuration of communication system 11500 according to Embodiment 18.

As illustrated in FIG. 117, communication system 11700 differs from communication system 11200 according to Embodiment 16 (see FIG. 112) in that control server 11240 has been changed to control server 11740. Hereinafter, description of the configuration of communication system 11700 will focus on the points of difference with communication system 11200 according to Embodiment 16.

Control server 11740 includes the following functions in addition to the functions included in control server 11240 according to Embodiment 16.

Control server 11740 further communicates with external devices using the first communication scheme. Devices capable of communicating using the first communication scheme include repeater device 11210, forwarding source device 11220, and forwarding destination device 11230.

One characterizing operation of communication system 11700 configured as described is a third repeating process, which is a partial modification of the first repeating process according to Embodiment 16.

Figure 118:
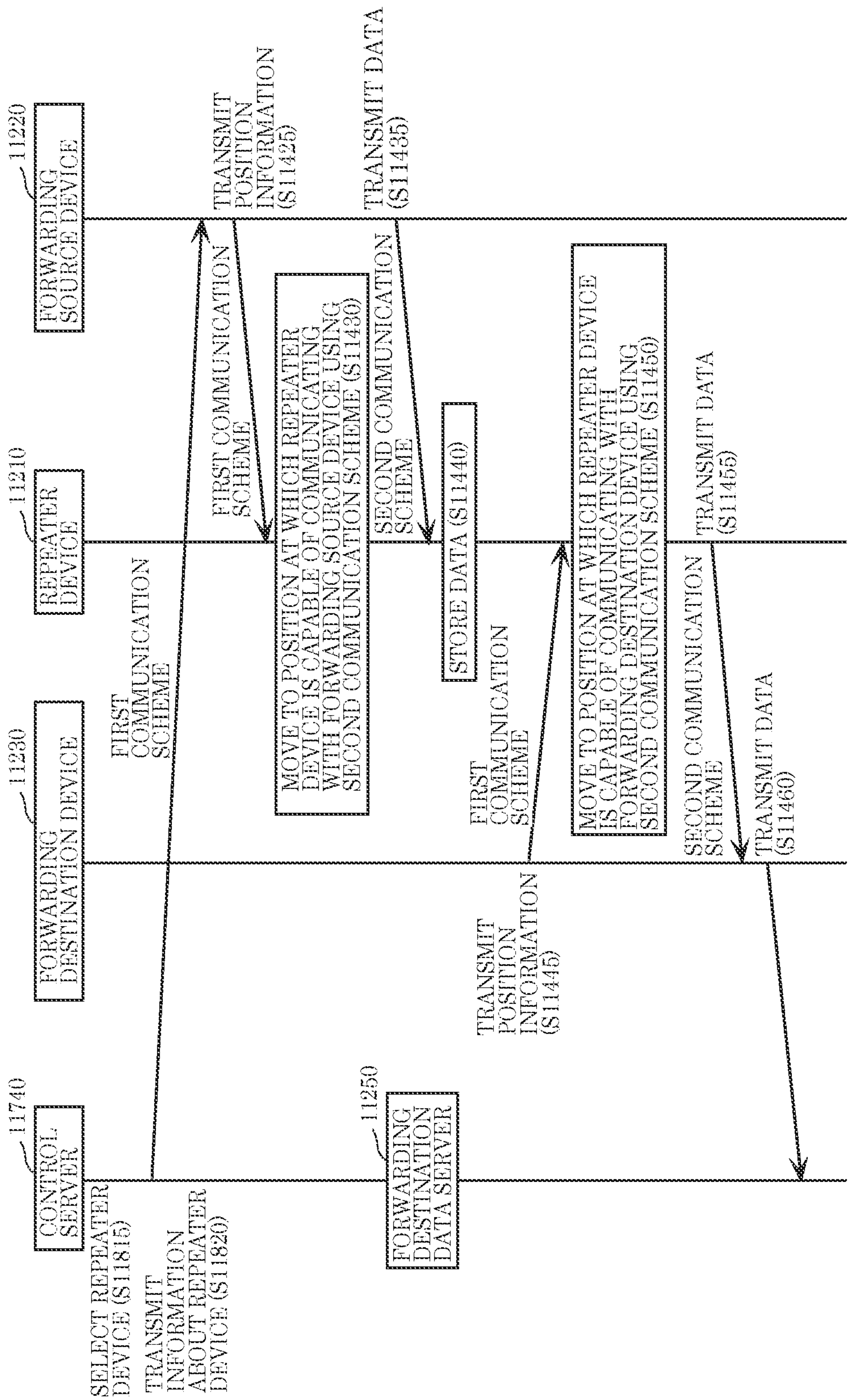

FIG. 118 is a sequence chart of the third repeating process.

As illustrated in FIG. 118, the third repeating process differs from the first repeating process according to Embodiment 16 (see FIG. 114) in that step S1140 has been eliminated, the process in step S11415 has changed to the process in step S11815, and the process in step S11420 has changed to the process in step S11820. Hereinafter, description of the third repeating process will focus on the points of difference from the first repeating process according to Embodiment 16.

When the third repeating process starts, control server 11740 selects repeater device 11210 that is favorable for obtaining data from forwarding source device 11220 (step S1185). As one example, FIG. 117 illustrates an example in which control server 11740 selects repeater device 11210A.

Once control server 11740 has selected repeater device 11210, control server 11740 transmits information about repeater device 11210 to forwarding source device 11220 using the first communication scheme (step S11820).

Upon completion of the process in step S11820, communication system 11700 proceeds to the process in step S11425 in the first repeating process according to Embodiment 16, and performs step S11425 and subsequent processes.

In this way, with communication system 11700 described above, just like with communication system 11200 according to Embodiment 16, even when the positional relationship between forwarding source device 11220 and forwarding destination device 11230 is such that direct communication using the second communication scheme is not possible, it is possible to achieve the advantageous effect that forwarding destination device 11230 can use the second communication scheme to receive, via repeater device 11210, data stored in forwarding source device 11220. Even when forwarding source device 11220 and forwarding destination device 11230 are in a state in which they are capable of communicating using the first communication scheme, by refraining from transmitting data using the first communication scheme, it is possible to achieve the advantageous effects that communication resources for the first communication scheme can used in other communication, and by using the second communication scheme to transmit data, communication can be completed in a short amount of time.

Embodiment 19

In the present embodiment, a communication system according to Embodiment 19, whose configuration has partially changed from communication system 11200 according to Embodiment 16, will be described.

Figure 119:
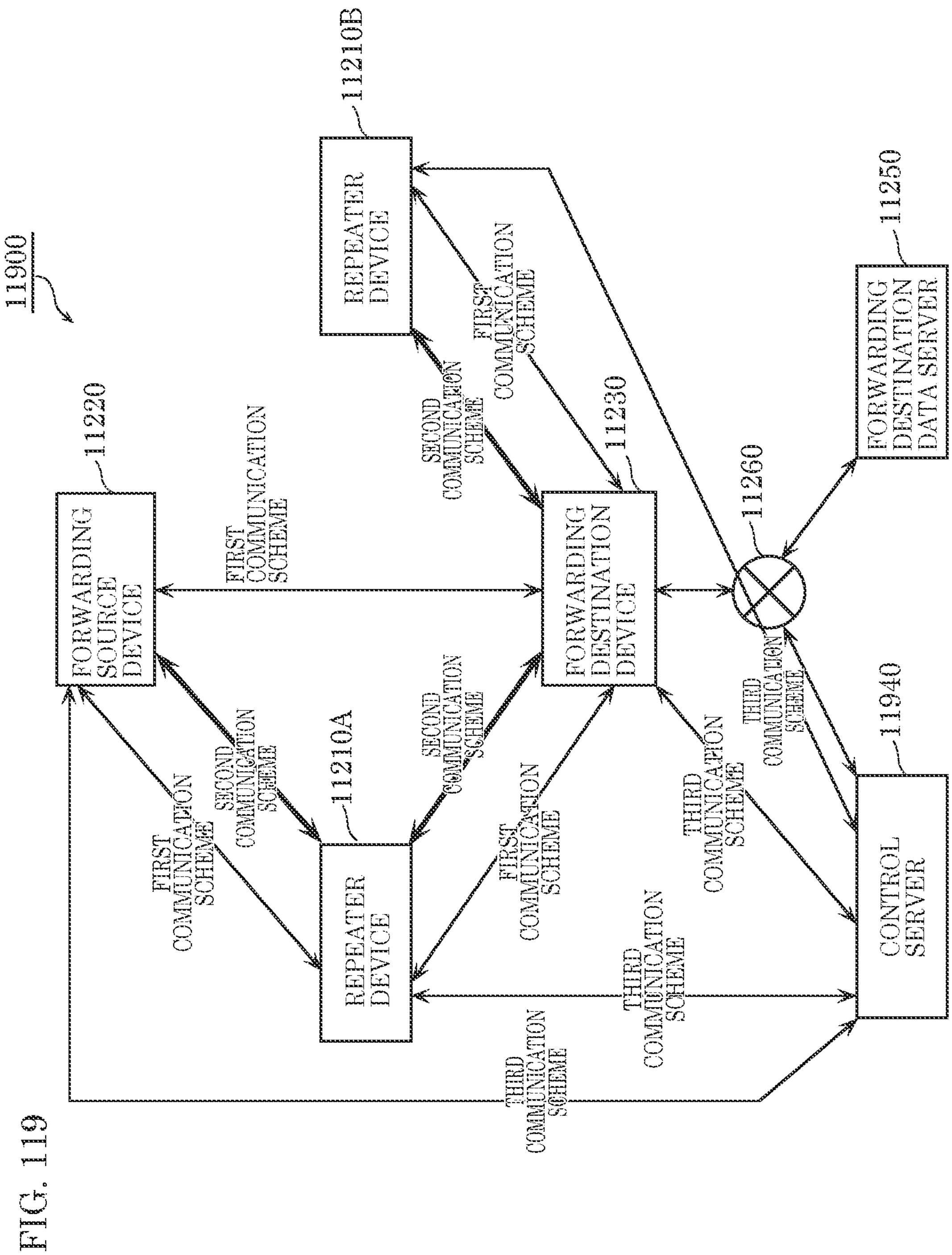

FIG. 119 illustrates one example of a configuration of communication system 11900 according to Embodiment 19.

As illustrated in FIG. 119, communication system 11900 differs from communication system 11200 according to Embodiment 16 (see FIG. 112) in that control server 11240 has been changed to control server 11940. Hereinafter, description of the configuration of communication system 11900 will focus on the points of difference with communication system 11200 according to Embodiment 16.

Control server 11940 includes the following functions in addition to the functions included in control server 11240 according to Embodiment 16.

Control server 11940 further communicates with external devices using the third communication scheme. Devices capable of communicating using the third communication scheme include repeater device 11210, forwarding source device 11220, and forwarding destination device 11230.

For example, the third communication scheme may be a cellular scheme. However, the third communication scheme is not limited to this example. The third communication scheme may be the first communication scheme. Furthermore, the third communication scheme may be a communication scheme that is used over wire.

One characterizing operation of communication system 11900 configured as described is a fourth repeating process, which is a partial modification of the first repeating process according to Embodiment 16.

Figure 120:
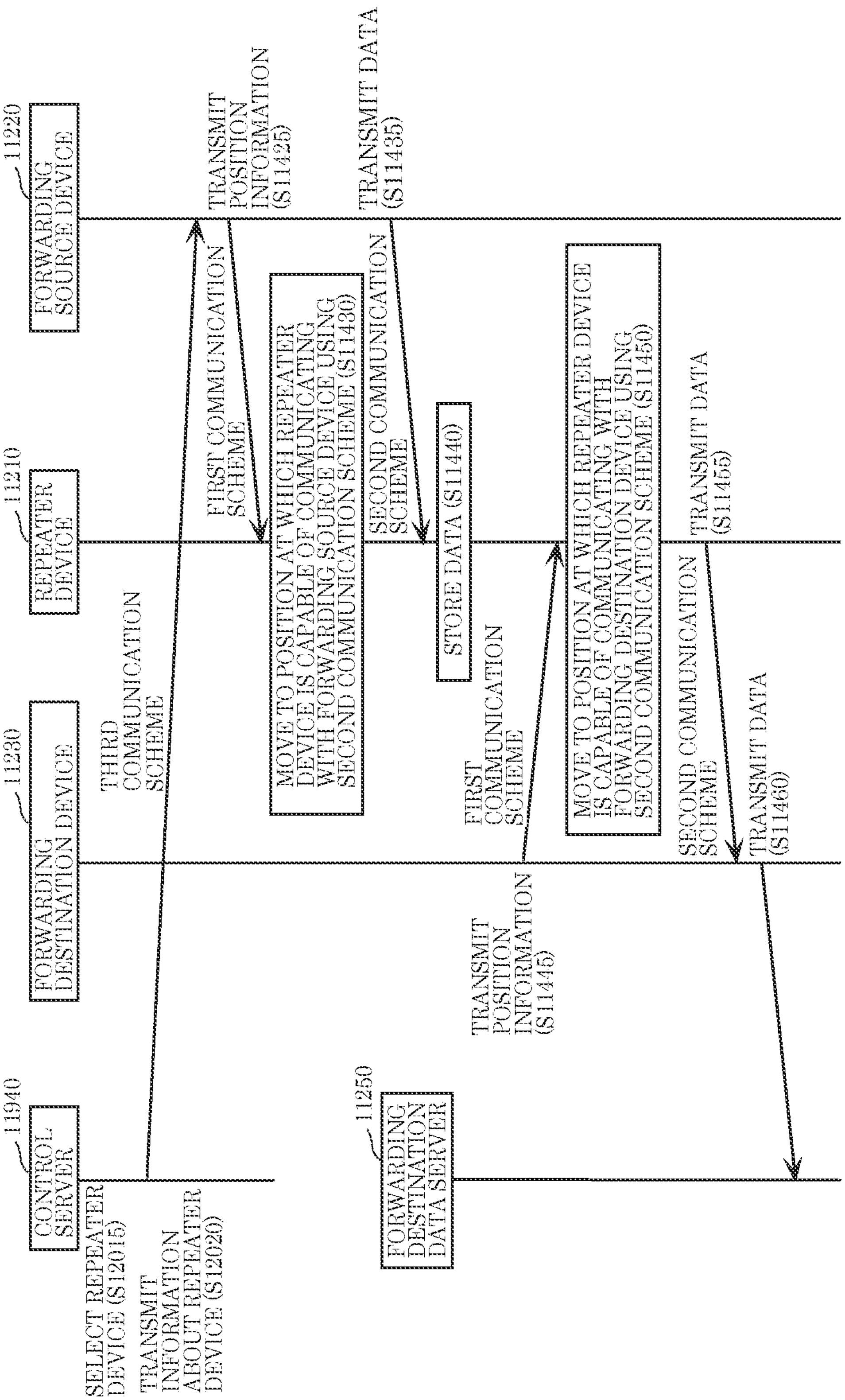

FIG. 120 is a sequence chart of the fourth repeating process.

As illustrated in FIG. 120, the fourth repeating process differs from the first repeating process according to Embodiment 16 (see FIG. 114) in that step S1140 has been eliminated, the process in step S11415 has changed to the process in step S12015, and the process in step S11420 has changed to the process in step S12020. Hereinafter, description of the fourth repeating process will focus on the points of difference from the first repeating process according to Embodiment 16.

When the fourth repeating process starts, control server 11940 selects repeater device 11210 that is favorable for obtaining data from forwarding source device 11220 (step S12015). As one example, FIG. 119 illustrates an example in which control server 11940 selects repeater device 11210A.

Once control server 11940 has selected repeater device 11210, control server 11940 transmits information about repeater device 11210 to forwarding source device 11220 using the third communication scheme (step S12020).

Upon completion of the process in step S12020, communication system 11900 proceeds to the process in step S11425 in the first repeating process according to Embodiment 16, and performs step S11425 and subsequent processes.

In this way, with communication system 11900 described above, just like with communication system 11200 according to Embodiment 16, even when the positional relationship between forwarding source device 11220 and forwarding destination device 11230 is such that direct communication using the second communication scheme is not possible, it is possible to achieve the advantageous effect that forwarding destination device 11230 can use the second communication scheme to receive, via repeater device 11210, data stored in forwarding source device 11220. Even when forwarding source device 11220 and forwarding destination device 11230 are in a state in which they are capable of communicating using the first communication scheme, by refraining from transmitting data using the first communication scheme, it is possible to achieve the advantageous effects that communication resources for the first communication scheme can used in other communication, and by using the second communication scheme to transmit data, communication can be completed in a short amount of time.

In the repeater device illustrated in, for example, FIG. 112, FIG. 115, FIG. 117, and FIG. 119, first video data may be obtained from the forwarding source device, second video data may be obtained by encoding the first video data using a video encoding method different than the first video data, and the second video data may be transmitted to the forwarding destination device.

In this example, reducing the data size of video data of the second video to less than the data size of the video data of the first video achieves the advantageous effect that communication time between the repeater device and the forwarding destination device can be reduced.

Moreover, in order to achieve some other advantage, in the repeater device, first video data may be obtained from the forwarding source device, second video data may be obtained by encoding the first video data using a video encoding method different than the first video data, and the second video data may be transmitted to the forwarding destination device.

Although the terminology "forwarding source device" is used in this example, the embodiment can be implemented in the same manner so long as any device that can obtain video or video and still images is used.

Embodiment 20

Next, for example, an example of a communication system including a mobile device such as a vehicle or robot that performs operation control, data collection, and signal processing while performing data communication with an access point will be given. When a mobile device attempts to perform an operation while maintaining communication with an access point or a server via an access point, the mobile device range in which the mobile device can move is, for example, limited to the range in which direct communication with the access point is possible or the range in which direct communication with any one of the access point and a preplaced repeater device is possible.

Embodiment 20 will describe a communication system that enables the expansion of the movable range of the mobile device while maintaining communication between the mobile device and the access point, and such a mobile device that can be used in the communication system.

Figure 121:
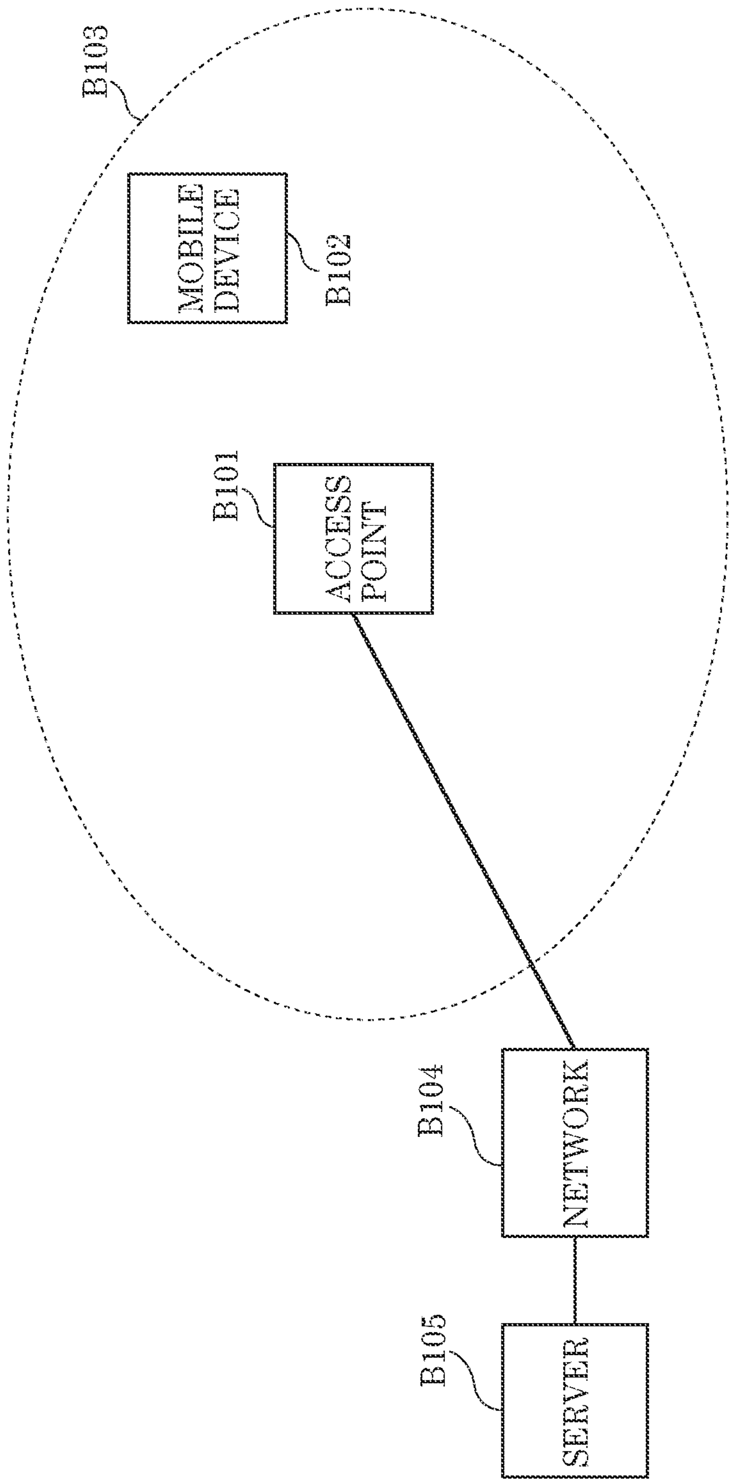

In FIG. 121, for example, the access point (AP) transmits a modulated signal including data using, for example, radio waves. Although the terminology "access point" is used in this example, the naming is not limited to this example; the device may be referred to as a base station or a communication device.

Mobile device B102 receives this modulated signal, performs processing such as demodulation and error correction decoding, and obtains the data transmitted from the access point.

Conceivable non-limiting examples of the mobile device include an automobile, a bicycle, an airplane, a drone, a robot, a satellite, a boat, and a seafloor mobile device.

For example, mobile device B102 performs processing such as modulation on the data obtained by moving its position to generate a modulated signal, and transmits the modulated signal to the access point using, for example, radio waves.

Assume access point B101 is communicating with, for example, server B105 via network B104. For example, access point B101 may provide data obtained from a communication device included in mobile device B102 to server B105. Access point B101 may transmit, to a communication device included in mobile device B102, a modulated signal created from the data obtained from server B105.

Access point B101 receives this modulated signal, performs processing such as demodulation and error correction decoding, and obtains data.

In FIG. 121, B103 indicates the boundary at which communication with access point B101 is possible. Accordingly, the area inside B103 (i.e., in the space delimited by B103), is an area in which communication with access point B101 is possible. Therefore, when a communication device included in mobile device B102 is within B103, mobile device B102 can operate while communicating with access point B101, but when a communication device included in mobile device B102 is outside B103, in such cases, communicating with access point B101 is difficult.

The present embodiment discloses a configuration of mobile device B102 and a communication method that enable a communication device included in mobile device B102 to communicate with access point B101 even when the communication device included in mobile device B102 is outside of B103.

Figure 122:
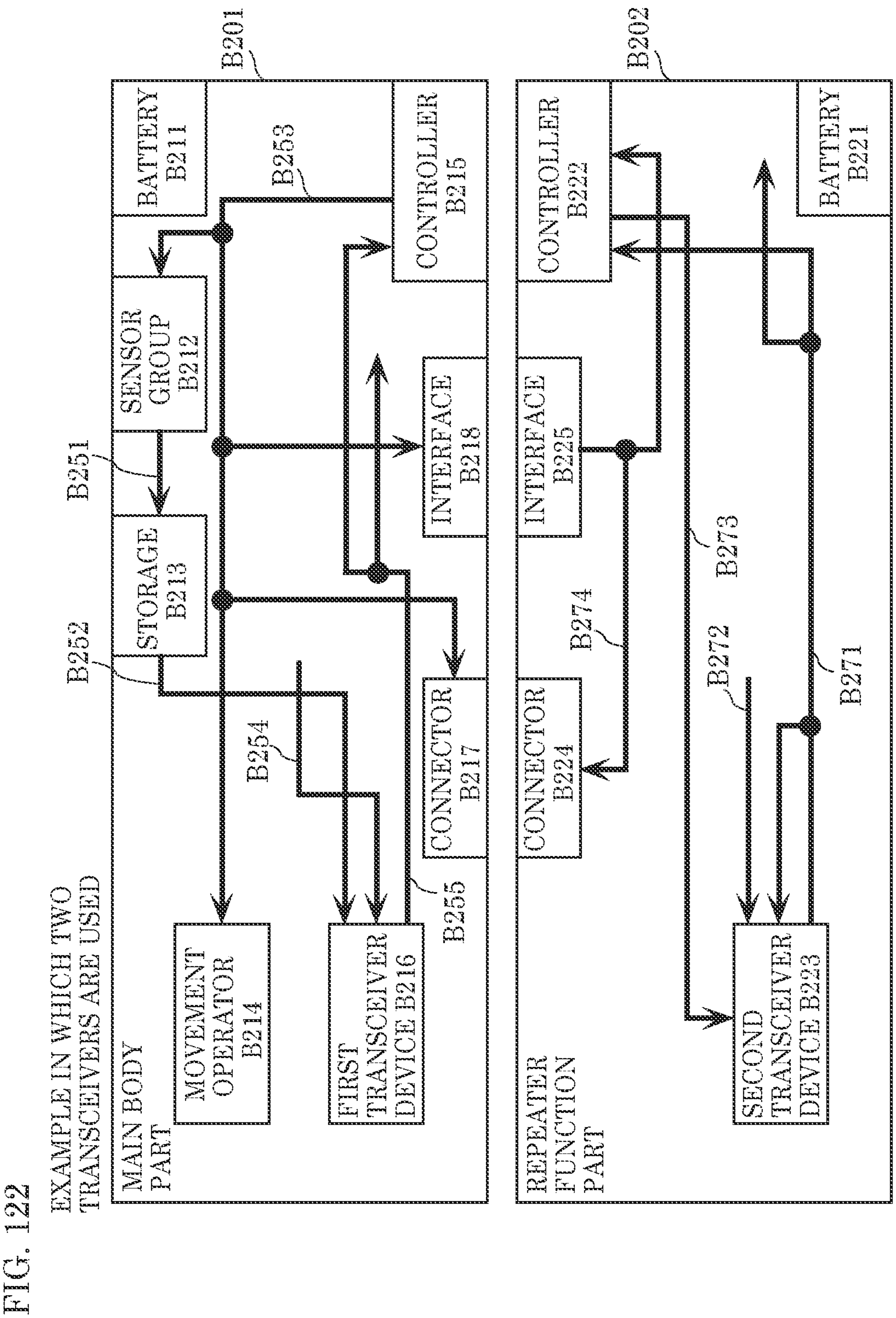

FIG. 122 illustrates one example of the configuration of mobile device B102 illustrated in FIG. 121. Mobile device B102 illustrated in FIG. 121 includes main body part B201 and repeater function part B202. Although the terminology "main body part" and "repeater function part" is used in this example, the naming is not limited to these examples. For example, these may be referred to as communication devices.

For example, main body part B201 includes battery B211. Battery B211 provides voltage and current to each part of main body part B201. Battery B211 may be chargeable via an external alternating current (AC) power source or an external direct current (DC) power source.

Similarly, for example, repeater function part B202 includes battery B221. Battery B221 provides voltage and current to each part of repeater function part B202. Battery B221 may be chargeable via an external AC power source or an external DC power source.

First, operations performed by main body part B201 will be described.

Sensor group B212 receives an input of control signal B253, operates based on the instructions in control signal B253, and outputs collected information 251. Sensor group B212 may include one or more sensors. Conceivable non-limiting examples of the sensors include an image sensor, a microphone, a thermometer, a hygrometer, an accelerometer, and a speedometer.

Storage B213 receives an input of collected information 251 and stores collected information 251. When needed, storage B213 outputs stored data as first data B252. Collected information 251 stored by storage B213 need not be data obtained from sensor group B212 included in mobile device B102. For example, collected information 251 may be data received by the mobile device from a device, not illustrated in the drawings, located in the vicinity of mobile device, via first transceiver device B216, second transceiver device B223, or some other transceiver device that is not illustrated in the drawings. Collected information 251 may be data generated internally such as an operation log of mobile device B102 or a device in the vicinity of mobile device B102.

First transceiver device B216 receives inputs of first data B252 and second data B254, performs processing such as error correction coding, modulation, and frequency conversion, generates a modulated signal, and, for example, outputs the modulated signal as radio waves. This modulated signal is received by repeater function part B202 and/or access point B101 illustrated in, for example, FIG. 121. Relative operations will be described in greater detail later.

First transceiver device B216 receives the modulated signal transmitted by repeater function part B202 and/or access point B101 illustrated in, for example, FIG. 121, performs processing such as demodulation and error correction decoding, and outputs received data B255. Relative operations will be described in greater detail later.

Controller B215 receives an input of received data B255, extracts data for controlling operations of sensor group B212, data for controlling operations of movement operator B214, data for controlling operations of connector B217, and data for controlling operations of interface B218, and outputs control signal B253. An example of these operations will be given later. Controller B215 may include an interface for receiving an instruction from an external source.

Movement operator B214 receives an input of control signal B253, controls movement operations based on data for controlling operations that is included in control signal B253, whereby main body part B201 or main body part B201 and repeater function part B202 move. For example, when main body part B201 is separated from repeater function part B202, main body part B201 moves. For example, when main body part B201 and repeater function part B202 are coupled, main body part B201 and repeater function part B202 move. Note that operations related to the separating and coupling will be described later.

Connector B217 receives an input of control signal B253, and performs operations for changing the connection state based on data for operations related to the connection of main body part B201 and repeater function part B202 that is included in control signal B253. For example, if the data for operations related to the connection indicates "connect", connector B217 in main body part B201 and connector B224 in repeater function part B202 connect. If the data for operations related to the connection indicates "separate", connector B217 in main body part B201 and connector B224 in repeater function part B202 separate.

Methods for connecting and separating connector B217 and connector B224 include, but are not limited to, a method whereby the connecting and separating is performed electronically using electromagnetic induction that utilizes, for example coils, and a method whereby the connecting and separating is performed mechanically by providing a configuration that allows connector B217 and connector B224 to mechanically connect.

Interface B218 receives an input of control signal B253, extracts data related to operations of the interface that is included in control signal B253, whereby control of interface B218 is carried out. In order for interface B218 to transmit control data included in control signal B253 to repeater function part B202, control data is output from interface B218.

Next, operations performed by repeater function part B202 will be described.

Interface B225 obtains and outputs control data B274 via interface B218. In this example, control data B274 includes data related to the connecting and separating of connector B217 and connector B224.

Connector B224 receives an input of control data B274, and controls the connecting and separating of connector B217 and connector B224 based on the data related to the connecting and separating that is included in control data B274.

Controller B222 receives inputs of control data B274 and received data B271, and based on this data, generates and outputs control signal B273.

Second transceiver device B223 receives an input of control signal B273. When control signal B273 includes information indicating to turn on second transceiver device operations, second transceiver device B223 operates, that is to say, performs operations for transmitting and/or receiving. When control signal B273 includes information indicating to turn off second transceiver device operations, second transceiver device B223 stops operating, that is to say, stops operations for transmitting and receiving. These operations will be described in greater detail later.

Operations performed by second transceiver device B223 will be described. Second transceiver device B223 receives a modulated signal transmitted by access point B101 illustrated in, for example, FIG. 121, performs processing such as demodulation and error correction decoding, and outputs received data B271.

Controller B222 may receive an input of received data B271, extract data for controlling operations of repeater function part B202 that is transmitted by access point B101 illustrated in, for example, FIG. 121, and generate control data B274.

The second transceiver device receives inputs of received data B271 and second data B272, performs processing such as error correction coding, modulation, and frequency conversion, generates a modulated signal, and transmits the modulated signal to main body part B201. Accordingly, repeater function part B202 fulfils relaying and multihop roles, such as transmitting to main body part B201 part or all of the data transmitted by access point B101.

Although the configuration of mobile device B102 is exemplified as the configuration illustrated in FIG. 122, the configuration of mobile device B102 is not limited to this example. A configuration of mobile device B102 different from the configuration illustrated in FIG. 122 will be given later.

Next, operations performed by the mobile device illustrated in FIG. 122 will be described with reference to FIG. 123, FIG. 124, and FIG. 125.

Figure 123:
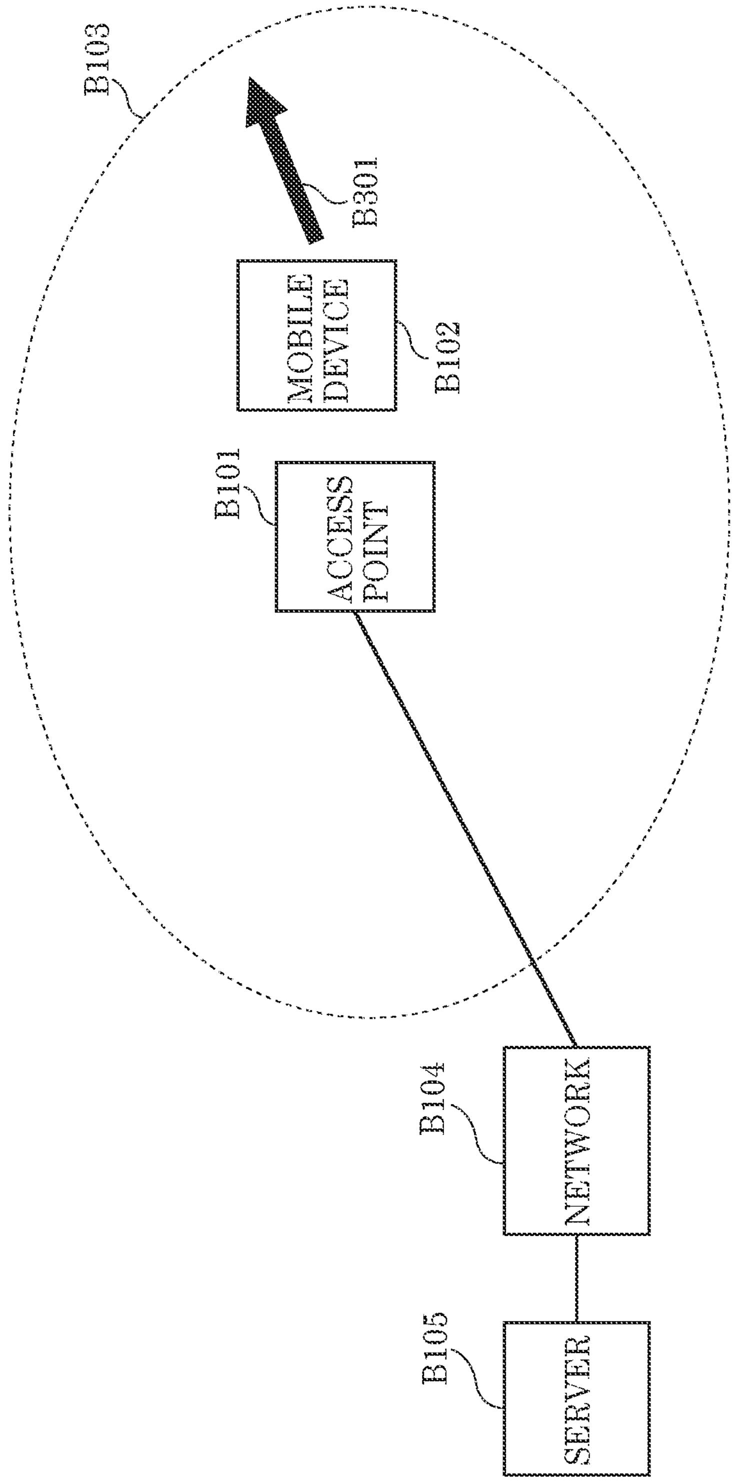

FIG. 123 indicates an example of communication between access point B101 and mobile device B102. Elements that operate in the same manner as those in FIG. 121 have the same reference signs.

As illustrated in FIG. 123, since mobile device B102 is located within B103, the mobile device illustrated in FIG. 122 moves, for example, in the direction indicated by arrow B301 in FIG. 123 in a state in which main body part B201 and repeater function part B202 are connected via connector B217 and connector B224. Here, assume mobile device B102 is communicating with access point B101.

Mobile device B102 estimates its communication state with access point B101 using, for example, controller B125 illustrated in FIG. 122, and determines to separate repeater function part B202 and main body part B201.

Next, examples of the separating of main body part B201 and repeater function part B202 will be given.

EXAMPLE 1

Since the communication state between access point B101 and mobile device B102 in which main body part B201 and repeater function part B202 are connected is near a predetermined communication state (a communication state to be secured), controller B215 determines to separate main body part B201 and repeater function part B202.

EXAMPLE 2

Since the communication state between access point B101 and mobile device B102 in which main body part B201 and repeater function part B202 are connected is set to a transmission speed that is desired to be ensured, and is near the value of the transmission speed that is desired to be ensured, controller B215 determines to separate main body part B201 and repeater function part B202.

Once controller B215 determines to separate main body part B201 and repeater function part B202, connector B217 and connector B224 perform operations for separating like those described above, whereby main body part B201 and repeater function part B202 separate.

An example of a state in which main body part B201 and repeater function part B202 are separated is illustrated in FIG. 124.

In FIG. 124, elements that operate the same as those in FIG. 121 and FIG. 122 have the same reference signs.

As illustrated in FIG. 124, repeater function part B202 and main body part B201 of mobile device B102 are separated. In this example, repeater function part B202 receives a modulated signal transmitted by access point B101. Repeater function part B202 then obtains data from the received modulated signal, generates a modulated signal from all or part of the data, and transmits the generated modulated signal to main body part B201.

With this, even when main body part B201 is at a position that is not within area B103 in which reception of the modulated signal transmitted by access point B101 is possible, main body part B201 can receive the modulated signal including data that is transmitted by access point B101. This achieves the advantageous effect that main body part B201 can receive the modulated signal including data that is transmitted by access point B101 even if main body part B201 moves outside B103 (in the direction indicated by arrow B401).

Thereafter, for example, main body part B201 moves closer to access point B101 as indicated by arrow B501 in FIG. 125, from a state in which access point B101 and repeater function part B202 are communicating and repeater function part B202 and main body part B201 are communicating, such as the state illustrated in FIG. 124 described above. In this case, main body part B201 is heading toward repeater function part B202. Then, connector B217 in main body part B201 and connector B224 in repeater function part B202 connect, thereby uniting main body part B201 and repeater function part B202, whereby these components operate as mobile device B102 as illustrated in FIG. 123.

Then, once again, as illustrated in FIG. 124, repeater function part B202 and main body part B201 of mobile device B102 separate, and perform operations like those described with reference to FIG. 124.

With the above configuration, even when outside of B103, a communication device included in main body part B201 of mobile device B102 can communicate with access point B101. Consequently, main body part B201 of mobile device B102 can expand the range that it can move in while maintaining communication with access point B101.

Repeater function part B202 of mobile device B102 may include a movement operator, and after main body part B201 and repeater function part B202 disconnect, the movement operator included in repeater function part B202 may move repeater function part B202 by operating based on an instruction from controller B222.

Although the communication between the access point and the mobile device, the communication between the access point and the repeater function part, and the communication between the repeater function part and the main body part are described as being performed over radio waves, they may be performed via, for example, visible light.

Although the present embodiment describes an example of a configuration in which mobile device B102 communicates with access point B101 using first transceiver device B216 included in main body part B201 when mobile device B102 is located within B103, mobile device B102 may communicate with access point B101 using second transceiver device B223 included in repeater function part B202 when mobile device B102 is located within B103. In such cases, data transmitted and received using second transceiver device B223 is transmitted and received between main body part B201 and repeater function part B202 via interface B218 and interface B225, for example.

Although the present embodiment uses the terminology "mobile device", "repeater function part", and "main body part", the naming of these elements is not limited to these examples. Each of the mobile device, the repeater function part, and the main body part includes a communication device.

Although the present embodiment gives an example in which the mobile device or the repeater function part is communicating with the access point, the access point may communicate with a repeater, and the repeater may communicate with the mobile device or the repeater function part.

The present embodiment describes an example in which the mobile device includes a main body part and a single repeater function part, but the mobile device is not limited to this example. The mobile device may include one or more main body parts and one or more repeater function parts. In such cases, the one or more main body parts and the one or more repeater function parts temporarily function as a single object to form the mobile device. The mobile device moves to separate the repeater function part and the main body part, and, for example, each main body part communicates with the access point via the one or more repeater function parts.

For example, the mobile device includes a first repeater function part, a second repeater function part, and a main body part. First, in the mobile device, the first repeater function part, the second repeater function part, and the main body part are connected, and form the mobile device as a single object. The mobile device then moves whereby the first repeater function part separates. The mobile device moves again, whereby the second repeater function part separates, and the main body part moves.

Here, for example, the access point communicates with the first repeater function part, the second repeater function part communicates with the first repeater function part, and the main body part communicates with the second repeater function part.

Then, for example, in order for the access point to deliver first data to the main body part, first, the access point transmits the first data to the first repeater function part, the first repeater function part transmits the first data to the second repeater function part, and the second repeater function part transmits the first data to the main body part.

In order for the main body part to deliver second data to the access point, first, the main body part transmits the second data to the second repeater function part, the second repeater function part transmits the second data to the first repeater function part, and the first repeater function part transmits the second data to the access point.

In another example, the mobile device includes a repeater function part, a first main body part, and a second main body part. First, in the mobile device, the repeater function part, the first main body part, and the second main body part are connected, and form the mobile device as a single object. The mobile device then moves to separate from the repeater function part, and the first main body part and the second main body part also separate. The first main body part then moves, and the second main body part also moves.

Here, for example, the access point communicates with the repeater function part, and the repeater function part communicates with the first main body part and the second main body part.

Then, for example, in order for the access point to deliver third data to the first main body part, first, the access point transmits the third data to the repeater function part, and the repeater function part transmits the third data to the first main body part.

Then, for example, in order for the access point to deliver fourth data to the second main body part, first, the access point transmits the fourth data to the repeater function part, and the repeater function part transmits the fourth data to the second main body part.

For example, in order for the first main body part to deliver fifth data to the access point, first, the first main body part transmits the fifth data to the repeater function part, and the repeater function part transmits the fifth data to the access point.

For example, in order for the second main body part to deliver sixth data to the access point, first, the second main body part transmits the sixth data to the repeater function part, and the repeater function part transmits the sixth data to the access point.

Supplementary Note 7

As a matter of course, the present disclosure may be carried out by combining embodiments and other supplementary notes described in the present specification.

The embodiments are merely examples. For example, while a "modulation method, an error correction coding method (error correction code, code length, coding rate, etc., to be used), control information, etc." are exemplified, it is possible to carry out the present disclosure with the same configuration even when other types of a "modulation method, an error correction coding method (error correction code, code length, coding rate, etc., to be used), control information, etc." are applied. The control information may be data transmitted to a communication partner for performing data communication.

Regarding the modulation method, even when a modulation method other than the modulation methods described herein is used, it is possible to carry out the embodiments and the other subject matter described herein. For example, amplitude phase shift keying (APSK) (such as 16APSK, 64APSK, 128APSK, 256APSK, 1024APSK and 4096APSK), pulse amplitude modulation (PAM) (such as 4PAM, 8PAM, 16PAM, 64PAM, 128PAM, 256PAM, 1024PAM and 4096PAM), phase shift keying (PSK) (such as BPSK, QPSK, 8PSK, 16PSK, 64PSK, 128PSK, 256PSK, 1024PSK and 4096PSK), and quadrature amplitude modulation (QAM) (such as 4QAM, 8QAM, 16QAM, 64QAM, 128QAM, 256QAM, 1024QAM and 4096QAM) may be applied, or in each modulation method, uniform mapping or non-uniform mapping may be performed. Moreover, a method for arranging 2, 4, 8, 16, 64, 128, 256, 1024, etc., signal points on an I-Q plane (a modulation method having 2, 4, 8, 16, 64, 128, 256, 1024, etc., signal points) is not limited to a signal point arrangement method of the modulation methods described herein.

In the present specification, it can be considered that the device which includes the transmitting device is a communications and broadcast apparatus, such as a broadcast station, a base station, an access point, a terminal or a mobile phone, or a repeater, satellite, or earth station that communicates with a satellite. In such cases, it can be considered that the device that includes the receiving device is a communication apparatus such as a television, a radio, a terminal, a personal computer, a mobile phone, an access point, or a base station, or a repeater, satellite, or earth station that communicates with a satellite. Moreover, it can also be considered that the transmitting device and the receiving device according to the present disclosure are each a device having a communication function, which is formed so as to be connectable via some interface to a device for executing an application in, for example, a television, a radio, a personal computer or a mobile phone. Moreover, in the present embodiment, symbols other than data symbols, such as pilot symbols (preamble, unique word, post-amble, reference symbol, mid-amble, etc.) or symbols for control information transmission, may be arranged in any way in a frame. Here, the terms "pilot symbol" and "symbol for control information transmission" are used, but the naming of such symbols is not important; the functions that they perform are.

A pilot symbol may be a known symbol that is modulated using PSK modulation in a transceiver, and the receiver may use this symbol to perform, for example, frequency synchronization, time synchronization, channel estimation (channel state information (CSI) estimation) for each modulated signal, and signal detection. Alternatively, a symbol transmitted by a transmitter can be known by a receiver by the receiver being synchronized.

The symbol for control information transmission is a symbol for transmitting information required to be transmitted to a communication partner in order to establish communication pertaining to anything other than data (such as application data) (this information is, for example, the modulation method, error correction coding method, coding rate of the error correction encoding method used in the communication, and/or upper layer settings information).

Note that the present disclosure is not limited to the embodiments; various modifications may be made to the embodiments. For example, each embodiment is described as being implemented as a communication device, but this example is not limiting, each embodiment may implement a corresponding communication method as software.

Note that a program for executing the above-described communication method may be stored in read only memory (ROM) in advance to cause a central processing unit (CPU) to operate this program.

Moreover, the program for executing the communication method may be stored in a computer-readable storage medium, the program stored in the recording medium may be recorded in random access memory (RAM) in a computer, and the computer may be caused to operate according to this program.

Each configuration of each of the above-described embodiments, etc., may be realized as a large scale integration (LSI) circuit, which is typically an integrated circuit that includes an input terminal and an output terminal. These integrated circuits may be formed as separate chips, or may be formed as one chip so as to include the entire configuration or part of the configuration of each embodiment. LSI is described here, but the circuit may also be referred to as an IC (integrated circuit), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a programmable FPGA or a reconfigurable processor which is reconfigurable in connection or settings of circuit cells inside the LSI circuit may be used. Further, when development of a semiconductor technology or another derived technology provides a circuit integration technology which replaces LSI, as a matter of course, functional blocks may be integrated by using this technology. Adaption of biotechnology, for example, is a possibility.

Various frame configurations are described in the present specification. The modulated signal having the frame configuration described in the present specification may be a modulated signal conforming to a multi-carrier scheme such as OFDM, and may be a modulated signal conforming to a single-carrier scheme. Examples of single carrier methods include discrete Fourier transform (DFT)-spread orthogonal frequency division multiplexing (OFDM), trajectory constrained DFT-Spread OFDM, OFDM based single carrier (SC), single carrier (SC)-frequency division multiple access (FDMA), and guard interval DFT-spread OFDM.

Note that at least one of the field programmable gate array (FPGA) and the central processing unit (CPU) may be configured to download, via wired or wireless communication, some or all of the software required to implement the communication method described in the present disclosure. At least one of the FPGA and the CPU may be further configured to download, via wired or wireless communication, some or all of software required to perform updates. The downloaded software may be stored in storage, and based on the stored software, at least one of the FPGA and the CPU may be operated to implement the digital signal processing described in the present disclosure.

Here, a device including at least one of the FPGA and the CPU may connect to a communications modem over a wired or wireless connection, and the device and the communications modem may implement the communication method described in the present disclosure.

For example, a communication device such as the base station, the AP, or the terminal described in the present specification may include at least one of the FPGA and the CPU, and include an interface for obtaining, from an external source, software for operating at least one of the FPGA and the CPU. The communication device may further include storage for storing software obtained from the external source, and implement the signal processing described in the present disclosure by operating the FPGA and the CPU based on the stored software.

In the present specification, an application related to processes associated with the receiving device may be provided by a server, and a terminal may install this application to implement the functions of the receiving device described in the present specification. Note that the application may be provided to the terminal by the communication device included in the transmitting device described in the present specification connecting to a server via a network, and the application may be provided to the terminal by the communication device, which has some other transmission function, connecting to a server via a network.

Similarly, in the present specification, an application related to processes associated with the transmitting device may be provided by a server, and a communication device may install this application to implement the functions of the transmitting device described in the present specification. Note that a method whereby the application is provided to another communication device by the communication device connecting to a server via a network is conceivable.

In the present specification, for example, the terminology "mobile terminal", "mobile device", "repeater", and "repeater device" are used, but the "mobile terminal", "mobile device", "repeater", and "repeater device" may each be a satellite, a robot, a (mobile) household appliance (consumer electronic equipment), a drone, a vehicle such as a car, aircraft, an (airborne) airship, a (mobile) access point, a (mobile) base station, a ship, a seafloor mobile device, a bicycle, or a two-wheeled vehicle (automobile).

Although the terminology "access point (AP)", "terminal", "device", "forwarding destination device", "repeater function part", "main body part", and "mobile device" is used, these devices are not limited to such naming; these devices may conceivably have a configuration in which they include any of a transmitting device, a receiving device, or a transmitting device and a receiving device.

In the present specification, the terminology "server" is used. One example of the configuration of this server will be given.

One example of the configuration of the server is illustrated in FIG. 126. The server includes, as an application programming interface (API) for performing processes, a recognition layer API, an analysis layer API, a learning layer API, and a communication/network layer API, etc. These APIs are connected to an API for application connection, and processes are performed in each API, such as determining instructions for operations in each device. The API for application connection is connected to a network, and outputs a result of the processing it performs.

Embodiment 21

In the present embodiment, a supplementary description of Embodiment 16, Embodiment 17, Embodiment 18, and Embodiment 19 will be given.

The modulated signal conforming to the "third communication scheme" described in, for example, Embodiment 16, Embodiment 17, Embodiment 18, and Embodiment 19 may be a modulated signal that is transmitted by a satellite communication system. Although the term "satellite communication system" is used here, this element may be referred to by some other term. For example, the satellite communication system may be implemented as a communication device equipped in a satellite, a communication device equipped in a high-altitude long-endurance (HALE) unmanned aircraft, a communication device equipped in a high-altitude platform station (HAPS), a communication device equipped in an unmanned aerial vehicle (UAV), a communication device equipped in a stationary satellite, etc. This will be described in greater detail with reference to the drawings.

FIG. 127 illustrates a variation of FIG. 115. Accordingly, in FIG. 127, elements which operate in the same manner as those in FIG. 115 have the same reference signs, and repeated description thereof is omitted. FIG. 127 differs from FIG. 115 in that control terminal 11270 in FIG. 125 is replaced with satellite communication system 12701, and communication between satellite communication system 12701 and a device that communicates with satellite communication system 12701 is performed using the third communication scheme.

As illustrated in FIG. 127, satellite communication system 12701 communicates with forwarding source device 11220 using the third communication scheme. Details regarding the communication performed between satellite communication system 12701 and forwarding source device 11220 are the same as the communication performed between control terminal 11270 and forwarding source device 11220 illustrated in FIG. 115.

Satellite communication system 12701 also communicates with repeater device 11210A using the third communication scheme. Details regarding the communication performed between satellite communication system 12701 and repeater device 11210A are the same as the communication performed between control terminal 11270 and repeater device 11210A illustrated in FIG. 115.

Satellite communication system 12701 also communicates with repeater device 11210B using the third communication scheme. Details regarding the communication performed between satellite communication system 12701 and repeater device 11210B are the same as the communication performed between control terminal 11270 and repeater device 11210B illustrated in FIG. 115.

Satellite communication system 12701 communicates with forwarding destination device 11230 using the third communication scheme. Details regarding the communication performed between satellite communication system 12701 and forwarding destination device 11230 are the same as the communication performed between control terminal 11270 and forwarding destination device 11230 illustrated in FIG. 115.

In FIG. 127, the first communication scheme and the second communication scheme may be different schemes, the first communication scheme and the third communication scheme may be different schemes, and the second communication scheme and the third communication scheme may be different schemes.

In another method, the first communication scheme and the second communication scheme may be the same scheme. In such cases, the frequency band used by the first communication scheme and the frequency band used by the second communication scheme may be the same or may be different.

Satellite communication system 12701 may obtain, from another communication device, data to be transmitted to forwarding source device 11220, repeater 11210A, repeater 11210B, and/or forwarding destination device 11230. Satellite communication system 12701 may transmit data obtained from forwarding source device 11220, repeater 11210A, repeater 11210B, and/or forwarding destination device 11230 to another communication device. Communication performed by satellite communication system 12701 in such cases will be described with reference to FIG. 128 and FIG. 129.

FIG. 128 illustrates a first example of the satellite communication system communicating with another communication device. Satellite communication system 12801 illustrated in FIG. 128 corresponds to satellite communication system 12701 illustrated in FIG. 127.

Satellite communication system 12801 communicates with communication device 12802. Separate from this communication, satellite communication system 12801 also communicates with forwarding source device 11220, repeater 11210A, repeater 11210B, and forwarding destination device 11230 illustrated in FIG. 127.

FIG. 129 illustrates a second example of the satellite communication system communicating with another communication device. Satellite communication system 12801 illustrated in FIG. 129 corresponds to satellite communication system 12701 illustrated in FIG. 127.

Satellite communication system 12801 communicates with communication device 12802 via network 12901. Network 12901 may include a repeater, an earth station, a satellite communication system, and/or another communication system. Separate from this communication, satellite communication system 12801 also communicates with forwarding source device 11220, repeater 11210A, repeater 11210B, and forwarding destination device 11230 illustrated in FIG. 127.

FIG. 130 illustrates a variation of FIG. 119. Accordingly, in FIG. 130, elements which operate in the same manner as those in FIG. 119 have the same reference signs, and repeated description thereof is omitted. FIG. 130 differs from FIG. 119 in that control server 11940 in FIG. 119 is replaced with satellite communication system 13001.

As illustrated in FIG. 130, satellite communication system 13001 communicates with forwarding source device 11220 using the third communication scheme. Details regarding the communication performed between satellite communication system 13001 and forwarding source device 11220 are the same as the communication performed between control server 11940 and forwarding source device 11220 illustrated in FIG. 119.

Satellite communication system 13001 also communicates with repeater device 11210A using the third communication scheme. Details regarding the communication performed between satellite communication system 13001 and repeater device 11210A are the same as the communication performed between control server 11940 and repeater device 11210A illustrated in FIG. 119.

Satellite communication system 13001 also communicates with repeater device 11210B using the third communication scheme. Details regarding the communication performed between satellite communication system 13001 and repeater device 11210B are the same as the communication performed between control server 11940 and repeater device 11210B illustrated in FIG. 119.

Satellite communication system 13001 communicates with forwarding destination device 11230 using the third communication scheme. Details regarding the communication performed between satellite communication system 13001 and forwarding destination device 11230 are the same as the communication performed between control server 11940 and forwarding destination device 11230 illustrated in FIG. 119.

In FIG. 130, the first communication scheme and the second communication scheme may be different schemes, the first communication scheme and the third communication scheme may be different schemes, and the second communication scheme and the third communication scheme may be different schemes.

In another method, the first communication scheme and the second communication scheme may be the same scheme. In such cases, the frequency band used by the first communication scheme and the frequency band used by the second communication scheme may be the same or may be different.

Satellite communication system 13001 may obtain, from another communication device, data to be transmitted to forwarding source device 11220, repeater 11210A, repeater 11210B, and/or forwarding destination device 11230. Satellite communication system 13001 may transmit data obtained from forwarding source device 11220, repeater 11210A, repeater 11210B, and/or forwarding destination device 11230 to another communication device. Communication performed by satellite communication system 13001 in such cases will be described with reference to FIG. 128 and FIG. 129.

FIG. 128 illustrates a third example of the satellite communication system communicating with another communication device. Satellite communication system 12801 illustrated in FIG. 128 corresponds to satellite communication system 13001 illustrated in FIG. 130.

Satellite communication system 12801 communicates with communication device 12802. Separate from this communication, satellite communication system 12801 also communicates with forwarding source device 11220, repeater 11210A, repeater 11210B, and forwarding destination device 11230 illustrated in FIG. 127.

FIG. 129 illustrates a fourth example of the satellite communication system communicating with another communication device. Satellite communication system 12801 illustrated in FIG. 129 corresponds to satellite communication system 13001 illustrated in FIG. 130.

Satellite communication system 12801 communicates with communication device 12802 via network 12901. Network 12901 may include a repeater, an earth station, a satellite communication system, and/or another communication system. Separate from this communication, satellite communication system 12801 also communicates with forwarding source device 11220, repeater 11210A, repeater 11210B, and forwarding destination device 11230 illustrated in FIG. 127.

In FIG. 127 and FIG. 130, repeater device 11210A and repeater device 11210B may obtain their own position information from the satellite communication system.

As illustrated in FIG. 114, FIG. 116, FIG. 118, and FIG. 120, repeater device 11210A and repeater 11210B in FIG. 127 and FIG. 130 may obtain their own position information from another system such as GPS, for example.

As another method, repeater device 11210A and repeater 11210B in FIG. 127 and FIG. 130 may not obtain the position information illustrated in FIG. 114, FIG. 116, FIG. 118, and FIG. 120. In such cases, repeater device 11210A and repeater 11210B obtain their own position information from the satellite communication system.

In FIG. 127 and FIG. 130, repeater device 11210A and repeater device 11210B may obtain information related to a path of movement from the satellite communication system. Obtaining the position information and the information related to a path of movement makes it possible to achieve the advantageous effect that repeater device 11210A and repeater device 11210B can move with a high degree of accuracy.

Implementing the above makes it possible to achieve the advantageous effect that the repeater device, the forwarding source device, and the forwarding destination device can be controlled in more remote locations, and that the communication between the repeater device and the forwarding source device as well as the communication between the repeater device and the forwarding destination device can be sped up.

Note that in FIG. 112, FIG. 115, FIG. 117, FIG. 119, FIG. 127, and FIG. 130, forwarding source device 11220 may be a communication device provided in an airport, and forwarding destination device 11230 may be a communication device provided in an airplane. Forwarding source device 11220 may be a communication device provided in an airplane, and forwarding destination device 11230 may be a communication device provided in an airport.

In FIG. 112, FIG. 115, FIG. 117, FIG. 119, FIG. 127, and FIG. 130, forwarding source device 11220 may be a communication device provided in a port, and forwarding destination device 11230 may be a communication device provided in a boat. Forwarding source device 11220 may be a communication device provided in a boat, and forwarding destination device 11230 may be a communication device provided in a port.

In FIG. 112, FIG. 115, FIG. 117, FIG. 119, FIG. 127, and FIG. 130, forwarding source device 11220 may be a communication device provided in a building, and forwarding destination device 11230 may be a communication device provided in a vehicle, motorcycle, or bicycle. Forwarding source device 11220 may be a communication device provided in a vehicle, motorcycle, or bicycle, and forwarding destination device 11230 may be a communication device provided in a building.

In FIG. 112, FIG. 115, FIG. 117, FIG. 119, FIG. 127, and FIG. 130, information collected by sensors included in repeater 11210A and repeater 11210B may be transmitted by repeater 11210A and repeater 11210B to forwarding source device 11220, forwarding destination device 11230, control terminal 11270, control server 11740, control server 11940, satellite communication system 12701, and/or satellite communication system 13001.

In FIG. 112, FIG. 115, FIG. 117, FIG. 119, FIG. 127, and FIG. 130, the first communication scheme and the second communication scheme may be the same scheme. In such cases, the frequency band used by the first communication scheme and the frequency band used by the second communication scheme may be the same or may be different.

Embodiment 22

In the present embodiment, variations of Embodiment 16, Embodiment 17, Embodiment 18, and Embodiment 19 will be given.

Variations corresponding to each of FIG. 112, FIG. 115, FIG. 117, FIG. 119, FIG. 127, and FIG. 130 will be described.

System 13100 illustrated in FIG. 131 is a variation corresponding to FIG. 112. In FIG. 131, elements that operate in the same manner as those in FIG. 112 have the same reference signs, and as they have already been described in detail, repeated description will be omitted.

System 13100 illustrated in FIG. 131 differs from the illustration in FIG. 112 in that system 13100 includes communication device 13101, and communication device 13101 transmits a modulated signal conforming to a fourth communication scheme to forwarding destination device 11220, repeater device 11210A, repeater device 11210B, and/or forwarding destination device 11230.

When communication device 13101 needs to transmit information such as control information to one or more or two or more of forwarding destination device 11220, repeater device 11210A, repeater device 11210B, and forwarding destination device 11230, communication device 13101 transmits a modulated signal conforming to the fourth communication scheme and including the information such as control information.

For example, communication device 13101 may transmit a modulated signal conforming to the fourth communication scheme and including the information such as the control information, where the information such as the control information is information for transmitting the starting of the operations described in Embodiment 16, Embodiment 17, Embodiment 18, Embodiment 19, and Embodiment 21.

Communication device 13101 may transmit a modulated signal conforming to the fourth communication scheme and including the information such as the control information, where the information such as the control information is information for stopping the operations described in Embodiment 16, Embodiment 17, Embodiment 18, Embodiment 19, and Embodiment 21.

Communication device 13101 may transmit a modulated signal conforming to the fourth communication scheme and including the information such as the control information, where the information such as the control information is information for starting each of the operations described in Embodiment 16, Embodiment 17, Embodiment 18, Embodiment 19, and Embodiment 21.

Examples of the information transmitted by communication device 13101 are not limited to these examples.

Implementing the above makes it possible to achieve the same advantageous effects as those in Embodiment 16, Embodiment 17, Embodiment 18, Embodiment 19, and Embodiment 21.

System 13200 illustrated in FIG. 132 is a variation corresponding to FIG. 115. In FIG. 132, elements that operate in the same manner as those in FIG. 115 have the same reference signs, and as they have already been described in detail, repeated description will be omitted.

System 13200 illustrated in FIG. 132 differs from the illustration in FIG. 115 in that it includes communication device 13101, and communication device 13101 transmits a modulated signal conforming to the fourth communication scheme to forwarding destination device 11220, repeater device 11210A, repeater device 11210B, forwarding destination device 11230, and/or control terminal 11270.

When communication device 13101 needs to transmit information such as control information to one or more or two or more of forwarding destination device 11220, repeater device 11210A, repeater device 11210B, forwarding destination device 11230, and control terminal 11270, communication device 13101 transmits a modulated signal conforming to the fourth communication scheme and including the information such as control information.

For example, communication device 13101 may transmit a modulated signal conforming to the fourth communication scheme and including the information such as the control information, where the information such as the control information is information for transmitting the starting of the operations described in Embodiment 16, Embodiment 17, Embodiment 18, Embodiment 19, and Embodiment 21.

Communication device 13101 may transmit a modulated signal conforming to the fourth communication scheme and including the information such as the control information, where the information such as the control information is information for stopping the operations described in Embodiment 16, Embodiment 17, Embodiment 18, Embodiment 19, and Embodiment 21.

Communication device 13101 may transmit a modulated signal conforming to the fourth communication scheme and including the information such as the control information, where the information such as the control information is information for starting each of the operations described in Embodiment 16, Embodiment 17, Embodiment 18, Embodiment 19, and Embodiment 21.

Examples of the information transmitted by communication device 13101 are not limited to these examples.

Implementing the above makes it possible to achieve the same advantageous effects as those in Embodiment 16, Embodiment 17, Embodiment 18, Embodiment 19, and Embodiment 21.

System 13300 illustrated in FIG. 133 is a variation corresponding to FIG. 117. In FIG. 133, elements that operate in the same manner as those in FIG. 117 have the same reference signs, and as they have already been described in detail, repeated description will be omitted.

System 13300 illustrated in FIG. 133 differs from the illustration in FIG. 117 in that it includes communication device 13101, and communication device 13101 transmits a modulated signal conforming to the fourth communication scheme to forwarding destination device 11220, repeater device 11210A, repeater device 11210B, forwarding destination device 11230, and/or control server 11740.

When communication device 13101 needs to transmit information such as control information to one or more or two or more of forwarding destination device 11220, repeater device 11210A, repeater device 11210B, forwarding destination device 11230, and control server 11740, communication device 13101 transmits a modulated signal conforming to the fourth communication scheme and including the information such as control information.

For example, communication device 13101 may transmit a modulated signal conforming to the fourth communication scheme and including the information such as the control information, where the information such as the control information is information for transmitting the starting of the operations described in Embodiment 16, Embodiment 17, Embodiment 18, Embodiment 19, and Embodiment 21.

Communication device 13101 may transmit a modulated signal conforming to the fourth communication scheme and including the information such as the control information, where the information such as the control information is information for stopping the operations described in Embodiment 16, Embodiment 17, Embodiment 18, Embodiment 19, and Embodiment 21.

Communication device 13101 may transmit a modulated signal conforming to the fourth communication scheme and including the information such as the control information, where the information such as the control information is information for starting each of the operations described in Embodiment 16, Embodiment 17, Embodiment 18, Embodiment 19, and Embodiment 21.

Examples of the information transmitted by communication device 13101 are not limited to these examples.

Implementing the above makes it possible to achieve the same advantageous effects as those in Embodiment 16, Embodiment 17, Embodiment 18, Embodiment 19, and Embodiment 21.

System 13400 illustrated in FIG. 134 is a variation corresponding to FIG. 119. In FIG. 134, elements that operate in the same manner as those in FIG. 119 have the same reference signs, and as they have already been described in detail, repeated description will be omitted.

System 13400 illustrated in FIG. 134 differs from the illustration in FIG. 119 in that it includes communication device 13101, and communication device 13101 transmits a modulated signal conforming to the fourth communication scheme to forwarding destination device 11220, repeater device 11210A, repeater device 11210B, forwarding destination device 11230, and/or control server 11940.

When communication device 13101 needs to transmit information such as control information to one or more or two or more of forwarding destination device 11220, repeater device 11210A, repeater device 11210B, forwarding destination device 11230, and control server 11940, communication device 13101 transmits a modulated signal conforming to the fourth communication scheme and including the information such as control information.

For example, communication device 13101 may transmit a modulated signal conforming to the fourth communication scheme and including the information such as the control information, where the information such as the control information is information for transmitting the starting of the operations described in Embodiment 16, Embodiment 17, Embodiment 18, Embodiment 19, and Embodiment 21.

Communication device 13101 may transmit a modulated signal conforming to the fourth communication scheme and including the information such as the control information, where the information such as the control information is information for stopping the operations described in Embodiment 16, Embodiment 17, Embodiment 18, Embodiment 19, and Embodiment 21.

Communication device 13101 may transmit a modulated signal conforming to the fourth communication scheme and including the information such as the control information, where the information such as the control information is information for starting each of the operations described in Embodiment 16, Embodiment 17, Embodiment 18, Embodiment 19, and Embodiment 21.

Examples of the information transmitted by communication device 13101 are not limited to these examples.

Implementing the above makes it possible to achieve the same advantageous effects as those in Embodiment 16, Embodiment 17, Embodiment 18, Embodiment 19, and Embodiment 21.

System 13500 illustrated in FIG. 135 is a variation corresponding to FIG. 127. In FIG. 135, elements that operate in the same manner as those in FIG. 127 have the same reference signs, and as they have already been described in detail, repeated description will be omitted.

System 13500 illustrated in FIG. 135 differs from the illustration in FIG. 127 in that it includes communication device 13101, and communication device 13101 transmits a modulated signal conforming to the fourth communication scheme to forwarding destination device 11220, repeater device 11210A, repeater device 11210B, and/or forwarding destination device 11230.

When communication device 13101 needs to transmit information such as control information to one or more or two or more of forwarding destination device 11220, repeater device 11210A, repeater device 11210B, and forwarding destination device 11230, communication device 13101 transmits a modulated signal conforming to the fourth communication scheme and including the information such as control information.

For example, communication device 13101 may transmit a modulated signal conforming to the fourth communication scheme and including the information such as the control information, where the information such as the control information is information for transmitting the starting of the operations described in Embodiment 16, Embodiment 17, Embodiment 18, Embodiment 19, and Embodiment 21.

Communication device 13101 may transmit a modulated signal conforming to the fourth communication scheme and including the information such as the control information, where the information such as the control information is information for stopping the operations described in Embodiment 16, Embodiment 17, Embodiment 18, Embodiment 19, and Embodiment 21.

Communication device 13101 may transmit a modulated signal conforming to the fourth communication scheme and including the information such as the control information, where the information such as the control information is information for starting each of the operations described in Embodiment 16, Embodiment 17, Embodiment 18, Embodiment 19, and Embodiment 21.

Examples of the information transmitted by communication device 13101 are not limited to these examples.

Implementing the above makes it possible to achieve the same advantageous effects as those in Embodiment 16, Embodiment 17, Embodiment 18, Embodiment 19, and Embodiment 21.

System 13600 illustrated in FIG. 136 is a variation corresponding to FIG. 130. In FIG. 136, elements that operate in the same manner as those in FIG. 130 have the same reference signs, and as they have already been described in detail, repeated description will be omitted.

System 13600 illustrated in FIG. 136 differs from the illustration in FIG. 130 in that it includes communication device 13101, and communication device 13101 transmits a modulated signal conforming to the fourth communication scheme to forwarding destination device 11220, repeater device 11210A, repeater device 11210B, and/or forwarding destination device 11230.

When communication device 13101 needs to transmit information such as control information to one or more or two or more of forwarding destination device 11230, communication device 13101 transmits a modulated signal conforming to the fourth communication scheme and including the information such as control information.

For example, communication device 13101 may transmit a modulated signal conforming to the fourth communication scheme and including the information such as the control information, where the information such as the control information is information for transmitting the starting of the operations described in Embodiment 16, Embodiment 17, Embodiment 18, Embodiment 19, and Embodiment 21.

Communication device 13101 may transmit a modulated signal conforming to the fourth communication scheme and including the information such as the control information, where the information such as the control information is information for stopping the operations described in Embodiment 16, Embodiment 17, Embodiment 18, Embodiment 19, and Embodiment 21.

Communication device 13101 may transmit a modulated signal conforming to the fourth communication scheme and including the information such as the control information, where the information such as the control information is information for starting each of the operations described in Embodiment 16, Embodiment 17, Embodiment 18, Embodiment 19, and Embodiment 21.

Examples of the information transmitted by communication device 13101 are not limited to these examples.

Implementing the above makes it possible to achieve the same advantageous effects as those in Embodiment 16, Embodiment 17, Embodiment 18, Embodiment 19, and Embodiment 21.

Favorable examples of the fourth communication scheme include broadcast and multicast transmission schemes.

Embodiment 23

In the present embodiment, variations of Embodiment 16, Embodiment 17, Embodiment 18, Embodiment 19, and Embodiment 21 will be given.

System 13700 illustrated in FIG. 137 is a variation corresponding to FIG. 127. In FIG. 137, elements that operate in the same manner as those in FIG. 127 have the same reference signs, and as they have already been described in detail, repeated description will be omitted.

System 13700 illustrated in FIG. 137 differs from the illustration in FIG. 127 in that the communication scheme used in the communication between forwarding source device 11220 and repeater device 11210A is the second communication scheme, and the communication scheme used in the communication between repeater device 11210A and forwarding destination device 11230 is the first communication scheme.

Here, repeater device 11210A moves to forwarding source device 11220 so that forwarding source device 11220 can transmit data to repeater device 11210A and repeater device 11210A can transmit and receive modulated signals conforming to the second communication scheme.

Repeater device 11210A then transmits the data obtained from forwarding source device 11220 to forwarding destination device 11230. In order to do this, repeater device 11210A moves to a position that allows for faster data transmission using the first communication scheme (for example, a modulation method with a high number of modulation levels or a modulation scheme where the number of transmitted modulated signals is high), and transmits data to forwarding destination device 11230.

With this, the communication between forwarding source device 11220 and repeater device 11210A and the communication between repeater device 11210A and forwarding destination device 11230 can be sped up, whereby forwarding source device 11220 can transmit data to forwarding destination device 11230 via repeater device 11210A in a short amount of time.

Although the first communication scheme and the second communication scheme are described in Embodiment 16, Embodiment 17, Embodiment 18, Embodiment 19, and Embodiment 21, the conditions described therein need not be satisfied.

System 13800 illustrated in FIG. 138 is a variation corresponding to FIG. 130. In FIG. 138, elements that operate in the same manner as those in FIG. 130 have the same reference signs, and as they have already been described in detail, repeated description will be omitted.

System 13800 illustrated in FIG. 138 differs from the illustration in FIG. 130 in that the communication scheme used in the communication between forwarding source device 11220 and repeater device 11210A is the second communication scheme, and the communication scheme used in the communication between repeater device 11210A and forwarding destination device 11230 is the first communication scheme.

Here, repeater device 11210A moves to forwarding source device 11220 so that forwarding source device 11220 can transmit data to repeater device 11210A and repeater device 11210A can transmit and receive modulated signals conforming to the second communication scheme.

Repeater device 11210A then transmits the data obtained from forwarding source device 11220 to forwarding destination device 11230. In order to do this, repeater device 11210A moves to a position that allows for faster data transmission using the first communication scheme (for example, a modulation method with a high number of modulation levels or a modulation scheme where the number of transmitted modulated signals is high), and transmits data to forwarding destination device 11230.

With this, the communication between forwarding source device 11220 and repeater device 11210A and the communication between repeater device 11210A and forwarding destination device 11230 can be sped up, whereby forwarding source device 11220 can transmit data to forwarding destination device 11230 via repeater device 11210A in a short amount of time.

Although the first communication scheme and the second communication scheme are described in Embodiment 16, Embodiment 17, Embodiment 18, Embodiment 19, and Embodiment 21, the conditions described therein need not be satisfied.

In FIG. 112, FIG. 115, FIG. 117, FIG. 119, FIG. 127, FIG. 130, FIG. 131, FIG. 132, FIG. 133, FIG. 134, FIG. 135, and FIG. 136, the first communication scheme and the second communication scheme may be the same scheme (the first communication scheme and the second communication scheme may be different schemes).

Although the first communication scheme and the second communication scheme are described in Embodiment 16, Embodiment 17, Embodiment 18, Embodiment 19, and Embodiment 21, the conditions described therein need not be satisfied.

Embodiment 24

In the present embodiment, variations of Embodiment 16, Embodiment 17, Embodiment 18, Embodiment 19, Embodiment 21, and Embodiment 23 will be given.

System 13900 illustrated in FIG. 139 is a variation corresponding to FIG. 112. In FIG. 139, elements that operate in the same manner as those in FIG. 112 have the same reference signs, and as they have already been described in detail, repeated description will be omitted.

System 13900 illustrated in FIG. 139 differs from the illustration in FIG. 112 in that forwarding source device 11220 is connected to server 13901 via network 13902.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

System 14000 illustrated in FIG. 140 is a variation of FIG. 115. Elements that operate in the same manner as those in FIG. 115 have the same reference signs, and as they have already been described in detail, repeated description will be omitted. In FIG. 140, elements that operate in the same manner as those in FIG. 139 have the same reference signs.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

System 14100 illustrated in FIG. 141 is a variation of FIG. 117. In FIG. 141, elements that operate in the same manner as those in FIG. 117 have the same reference signs, and as they have already been described in detail, repeated description will be omitted. In FIG. 141, elements that operate in the same manner as those in FIG. 139 have the same reference signs.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

System 14200 illustrated in FIG. 142 is a variation of FIG. 119. In FIG. 142, elements that operate in the same manner as those in FIG. 119 have the same reference signs, and as they have already been described in detail, repeated description will be omitted. In FIG. 142, elements that operate in the same manner as those in FIG. 139 have the same reference signs.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

System 14300 illustrated in FIG. 143 is a variation of FIG. 127. In FIG. 143, elements that operate in the same manner as those in FIG. 127 have the same reference signs, and as they have already been described in detail, repeated description will be omitted. In FIG. 143, elements that operate in the same manner as those in FIG. 139 have the same reference signs.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

System 14400 illustrated in FIG. 144 is a variation of FIG. 130. In FIG. 144, elements that operate in the same manner as those in FIG. 130 have the same reference signs, and as they have already been described in detail, repeated description will be omitted. In FIG. 144, elements that operate in the same manner as those in FIG. 139 have the same reference signs.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

System 14500 illustrated in FIG. 145 is a variation of FIG. 131. In FIG. 145, elements that operate in the same manner as those in FIG. 131 have the same reference signs, and as they have already been described in detail, repeated description will be omitted. In FIG. 145, elements that operate in the same manner as those in FIG. 139 have the same reference signs.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

System 14600 illustrated in FIG. 146 is a variation of FIG. 132. In FIG. 146, elements that operate in the same manner as those in FIG. 132 have the same reference signs, and as they have already been described in detail, repeated description will be omitted. In FIG. 146, elements that operate in the same manner as those in FIG. 139 have the same reference signs.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

System 14700 illustrated in FIG. 147 is a variation of FIG. 133. In FIG. 147, elements that operate in the same manner as those in FIG. 133 have the same reference signs, and as they have already been described in detail, repeated description will be omitted. In FIG. 147, elements that operate in the same manner as those in FIG. 139 have the same reference signs.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

System 14800 illustrated in FIG. 148 is a variation of FIG. 134. In FIG. 148, elements that operate in the same manner as those in FIG. 134 have the same reference signs, and as they have already been described in detail, repeated description will be omitted. In FIG. 148, elements that operate in the same manner as those in FIG. 139 have the same reference signs.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

System 14900 illustrated in FIG. 149 is a variation of FIG. 135. In FIG. 149, elements that operate in the same manner as those in FIG. 135 have the same reference signs, and as they have already been described in detail, repeated description will be omitted. In FIG. 149, elements that operate in the same manner as those in FIG. 139 have the same reference signs.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

System 15000 illustrated in FIG. 150 is a variation of FIG. 136. Elements that operate in the same manner as those in FIG. 136 have the same reference signs, and as they have already been described in detail, repeated description will be omitted. In FIG. 150, elements that operate in the same manner as those in FIG. 139 have the same reference signs.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

System 15100 illustrated in FIG. 151 is a variation of FIG. 137. In FIG. 151, elements that operate in the same manner as those in FIG. 137 have the same reference signs, and as they have already been described in detail, repeated description will be omitted. In FIG. 151, elements that operate in the same manner as those in FIG. 139 have the same reference signs.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

System 15200 illustrated in FIG. 152 is a variation of FIG. 138. In FIG. 152, elements that operate in the same manner as those in FIG. 137 have the same reference signs, and as they have already been described in detail, repeated description will be omitted. In FIG. 152, elements that operate in the same manner as those in FIG. 139 have the same reference signs.

Forwarding source device 11220 obtains data to be forwarded to forwarding destination device 11230 from server 13901 via network 13902.

Forwarding source device 11220 transmits data to forwarding destination device 11230. As this has already been described in Embodiment 16, Embodiment 17, Embodiment 18, Embodiment 19, Embodiment 21, and Embodiment 23, repeated description will be omitted.

Conceivable examples of forwarding source device 11220 include a base station or access point that includes storage, conceivable examples of forwarding destination device 11230 include a computer, terminal, mobile phone, tablet, or smartphone, and conceivable examples of forwarding destination data server 11250 include a cloud server. However, these examples are not limiting.

Implementing the above makes it possible to achieve the same advantageous effects as those in Embodiment 16, Embodiment 17, Embodiment 18, Embodiment 19, Embodiment 21, and Embodiment 23.

Embodiment 25

In the present embodiment, variations of Embodiment 16, Embodiment 17, Embodiment 18, Embodiment 19, Embodiment 21, Embodiment 23, and Embodiment 24 will be given.

In FIG. 112, FIG. 115, FIG. 117, FIG. 119, FIG. 127, FIG. 130, FIG. 131, FIG. 132, FIG. 133, FIG. 134, FIG. 135, FIG. 136, FIG. 139, FIG. 140, FIG. 141, FIG. 142, FIG. 143, FIG. 144, FIG. 145, FIG. 146, FIG. 147, FIG. 148, FIG. 149, and FIG. 150, there may be a time in which forwarding source device 11220 transmits both a modulated signal conforming to the first communication scheme and a modulated signal conforming to the second communication scheme. Next, detailed examples of such a case will be given.

FIRST EXAMPLE

The figure that is related to the presence of a modulated signal conforming to the first communication scheme is FIG. 153A, and the figure that is related to the presence of a modulated signal conforming to the second communication scheme is FIG. 153B. In FIG. 153A and FIG. 153B, time is represented on the horizontal axis.

FIG. 153A indicates an example of a transmission signal of a first device. Here, assume the first device is forwarding source device 11220. Region of time 15301 in which a modulated signal conforming to the first communication scheme is present is present in a first period.

FIG. 153B indicates an example of a transmission signal of a first device. Here, assume the first device is forwarding source device 11220. Region of time 15302 in which a modulated signal conforming to the second communication scheme is present is present in the first period.

SECOND EXAMPLE

The figure that is related to the presence of a modulated signal conforming to the first communication scheme is FIG. 154A, and the figure that is related to the presence of a modulated signal conforming to the second communication scheme is FIG. 154B. In FIG. 154A and FIG. 154B, time is represented on the horizontal axis.

FIG. 154A indicates an example of a transmission signal of a first device. Here, assume the first device is forwarding source device 11220. Region of time 15401 in which a modulated signal conforming to the first communication scheme is present is present in the first period.

FIG. 154B indicates an example of a transmission signal of a first device. Here, assume the first device is forwarding source device 11220. Region of time 15402 in which a modulated signal conforming to the second communication scheme is present is present in part of the first period. Here, the left end of region of time 15402 in which a modulated signal conforming to the second communication scheme is present and the left end of the first period fall on the same point in time.

THIRD EXAMPLE

The figure that is related to the presence of a modulated signal conforming to the first communication scheme is FIG. 155A, and the figure that is related to the presence of a modulated signal conforming to the second communication scheme is FIG. 155B. In FIG. 155A and FIG. 155B, time is represented on the horizontal axis.

FIG. 155A indicates an example of a transmission signal of a first device. Here, assume the first device is forwarding source device 11220. Region of time 15501 in which a modulated signal conforming to the first communication scheme is present is present in the first period.

FIG. 155B indicates an example of a transmission signal of the first device. Here, assume the first device is forwarding source device 11220. Region of time 15502 in which a modulated signal conforming to the second communication scheme is present is present in part of the first period.

FOURTH EXAMPLE

The figure that is related to the presence of a modulated signal conforming to the first communication scheme is FIG. 156A, and the figure that is related to the presence of a modulated signal conforming to the second communication scheme is FIG. 156B. In FIG. 156A and FIG. 156B, time is represented on the horizontal axis.

FIG. 156A indicates an example of a transmission signal of a first device. Here, assume the first device is forwarding source device 11220. Region of time 15601 in which a modulated signal conforming to the first communication scheme is present is present in a first period.

FIG. 156B indicates an example of a transmission signal of a first device. Here, assume the first device is forwarding source device 11220. Region of time 1 labeled 15602_1 in which a modulated signal conforming to the second communication scheme is present, region of time 2 labeled 15602_2 in which a modulated signal conforming to the second communication scheme is present, and region of time 3 labeled 15602_3 in which a modulated signal conforming to the second communication scheme is present, are present in the first period. Here, two or more regions of time in which a modulated signal conforming to the second communication scheme are present in the first period. Note that FIG. 156B merely illustrates one non-limiting example in which three regions of time in which a modulated signal conforming to the second communication scheme are present in the first period.

FIFTH EXAMPLE

The figure that is related to the presence of a modulated signal conforming to the first communication scheme is FIG. 157A, and the figure that is related to the presence of a modulated signal conforming to the second communication scheme is FIG. 157B. In FIG. 157A and FIG. 157B, time is represented on the horizontal axis.

FIG. 157A indicates an example of a transmission signal of a first device. Here, assume the first device is forwarding source device 11220. Region of time 15701 in which a modulated signal conforming to the first communication scheme is present is present in part of the first period. Here, the left end of region of time 15701 in which a modulated signal conforming to the first communication scheme is present and the left end of the first period fall on the same point in time.

FIG. 157B indicates an example of a transmission signal of a first device. Here, assume the first device is forwarding source device 11220. Region of time 15702 in which a modulated signal conforming to the second communication scheme is present is present in a first period.

SIXTH EXAMPLE

The figure that is related to the presence of a modulated signal conforming to the first communication scheme is FIG. 158A, and the figure that is related to the presence of a modulated signal conforming to the second communication scheme is FIG. 158B. In FIG. 158A and FIG. 158B, time is represented on the horizontal axis.

FIG. 158A indicates an example of a transmission signal of a first device. Here, assume the first device is forwarding source device 11220. Region of time 15801 in which a modulated signal conforming to the first communication scheme is present is present in part of the first period.

FIG. 158B indicates an example of a transmission signal of a first device. Here, assume the first device is forwarding source device 11220. Region of time 15802 in which a modulated signal conforming to the second communication scheme is present is present in a first period.

SEVENTH EXAMPLE

The figure that is related to the presence of a modulated signal conforming to the first communication scheme is FIG. 159A, and the figure that is related to the presence of a modulated signal conforming to the second communication scheme is FIG. 159B. In FIG. 159A and FIG. 159B, time is represented on the horizontal axis.

FIG. 159A indicates an example of a transmission signal of a first device. Here, assume the first device is forwarding source device 11220. Region of time 1 labeled 15901_1 in which a modulated signal conforming to the first communication scheme is present, region of time 2 labeled 15901_2 in which a modulated signal conforming to the first communication scheme is present, and region of time 3 labeled 15901_3 in which a modulated signal conforming to the first communication scheme is present, are present in the first period. Here, two or more regions of time in which a modulated signal conforming to the first communication scheme are present in the first period. Note that FIG. 159A merely illustrates one non-limiting example in which three regions of time in which a modulated signal conforming to the first communication scheme are present in the first period.

FIG. 159B indicates an example of a transmission signal of a first device. Here, assume the first device is forwarding source device 11220. Region of time 15902 in which a modulated signal conforming to the second communication scheme is present is present in a first period.

In FIG. 112, FIG. 115, FIG. 117, FIG. 119, FIG. 127, FIG. 130, FIG. 131, FIG. 132, FIG. 133, FIG. 134, FIG. 135, FIG. 136, FIG. 139, FIG. 140, FIG. 141, FIG. 142, FIG. 143, FIG. 144, FIG. 145, FIG. 146, FIG. 147, FIG. 148, FIG. 149, and FIG. 150, there may be a time in which repeater device 11210A (or repeater device 11210B) transmits both a modulated signal conforming to the first communication scheme and a modulated signal conforming to the second communication scheme. Detailed examples of such a case include cases in which repeater device 11210A (or repeater device 11210B) is implemented as the first device in the first through seventh examples described above.

In FIG. 112, FIG. 115, FIG. 117, FIG. 119, FIG. 127, FIG. 130, FIG. 131, FIG. 132, FIG. 133, FIG. 134, FIG. 135, FIG. 136, FIG. 139, FIG. 140, FIG. 141, FIG. 142, FIG. 143, FIG. 144, FIG. 145, FIG. 146, FIG. 147, FIG. 148, FIG. 149, and FIG. 150, there may be a time in which forwarding destination device 11230 transmits both a modulated signal conforming to the first communication scheme and a modulated signal conforming to the second communication scheme. Detailed examples of such a case include cases in which forwarding destination device 11230 is implemented as the first device in the first through seventh examples described above.

In FIG. 112, FIG. 115, FIG. 117, FIG. 119, FIG. 127, FIG. 130, FIG. 131, FIG. 132, FIG. 133, FIG. 134, FIG. 135, FIG. 136, FIG. 139, FIG. 140, FIG. 141, FIG. 142, FIG. 143, FIG. 144, FIG. 145, FIG. 146, FIG. 147, FIG. 148, FIG. 149, and FIG. 150, repeater device 11210A and repeater device 11210B may be considered to be access points or base stations. In such cases, repeater device 11210A and repeater device 11210B may be mobile, and, alternatively, may be fixed devices.

This makes it possible to achieve the advantageous effect of enabling high-speed data transmission, since modulated signals can be transmitted using the first communication scheme and the second communication scheme.

The frequency band used by the first communication scheme may be different than the frequency band used by the second communication scheme.

The frequency bands used by the first communication scheme and the second communication scheme may be the same, and the channels used by the first communication scheme and the second communication scheme may be different.

Embodiment 26

Next, in the present embodiment, the communication system including a mobile device such as a vehicle or robot that performs operation control, data collection, and signal processing while performing data communication with an access point, which is described in Embodiment 20, will be described.

FIG. 160 illustrates a configuration example of a communication system including (i) a mobile device such as a vehicle or robot that performs operation control, data collection, and signal processing while performing data communication with an access point, and (ii) a system in which a terminal communicates with an access point via a repeater device, which are described in Embodiment 20. Elements in FIG. 160 which operate in the same manner as in FIG. 125 have the same reference signs, and repeated description thereof will be omitted.

Hereinafter, characterizing features in FIG. 160 will be described.

Access point B101 in FIG. 160 is capable of communicating with the mobile device that includes repeater function part B202 and main body part B201, and is capable of communicating with a terminal such as terminal #1 labeled 16002_1 or terminal #2 labeled 16002_2, via repeater device 16001.

Here, repeater function part B202 and repeater device 16001 both have repeating functions. However, while repeater function part B202 has a repeating function for main body part B201, repeater device 16001 has a repeating function for a plurality of terminals.

A method whereby each device (access point B101, repeater function part B202, main body part B201, repeater device 16001, terminal #1 labeled 16002_1, and terminal #2 labeled 16002_2 in FIG. 160) knows this difference between repeater function part B202 and repeater device 16001 and carries out appropriate communication will be described hereinafter.

FIG. 161 illustrates one example of a configuration of a frame of a modulated signal transmitted by access point B101, repeater function part B202, main body part B201, repeater device 16001, terminal #1 labeled 16002_1, and terminal #2 labeled 16002_2 in FIG. 160. In FIG. 161, time is represented on the horizontal axis.

For example, preamble 16101 is a symbol for a communication partner to perform signal detection, frequency synchronization, time synchronization, frequency offset estimation, and/or channel estimation and the like.

Control information symbol 16102 is a symbol for transmitting control information transmitted for communicating with a communication partner.

Data symbol 16103 is a symbol for transmitting data including information.

Note the frame may include symbols other than preamble 16101, control information symbol 16102, and data symbol 16103 illustrated in FIG. 161, and the order in which the symbols are transmitted and the configuration method of the symbols are not limited to the example illustrated in FIG. 161. For example, symbols may be present along the frequency axis. A method of transmitting a plurality of modulated signals using a plurality of antennas may be used as the transmitting method for transmitting frames.

For example, control information symbol 16102 illustrated in FIG. 161 and included in the modulated signal transmitted by repeater device 16001 and repeater function part B202 includes information related to a repeating method. For example, the information related to a repeating method is expressed as a0.

When repeater device 16001 and repeater function part B202 include a repeating function dedicated to a first communication device for realizing communication between the first communication device and an access point, a0 is set to 0 (zero).

When repeater device 16001 and repeater function part B202 include a repeating function for realizing communication between a communication device and an access point that is not dependent on a communication device, a0 is set to 1. Alternatively, when repeater device 16001 and repeater function part B202 include a repeating function for realizing communication between a communication device and an access point that is for a plurality of communication devices, a0 is set to 1.

Accordingly, since repeater function part B202 includes a repeating function dedicated to main body part B201 for realizing communication between main body part B201 and an access point, a0 is set to 0 (zero), and repeater function part B202 transmits a modulated signal including control information symbol 16102 including a0 to access point B101 (or main body part B201).

Moreover, since repeater device 16001 includes a repeating function for realizing communication between terminal #1 labeled 16002_1 and an access point and communication between terminal #2 labeled 16002_2 and an access point, a0 is set to 1, and repeater device 16001 transmits a modulated signal including control information symbol 16102 including a0 to access point B101 (or terminal #1 labeled 16002_1 or terminal #2 labeled 16002_2).

This makes it possible to achieve the advantageous effect that communication via a repeater can be performed more accurately.

Access point B101, repeater function part B202, main body part B201, repeater device 16001, terminal #1 labeled 16002_1, and terminal #2 labeled 16002_2 illustrated in FIG. 160 may transmit a modulated signal including capability information related to repeating capability.

For example, capability information to be transmitted to a transmission partner for indicating that the device supports repeating dedicated to a first communication device for realizing communication between the first communication device and an access point is expressed as b0.

When the device is a device that supports the repeating dedicated to a first communication device for realizing communication between the first communication device and an access point, b0 is set to 1, and when the device is not such a device, b0 is set to 0.

For example, capability information to be transmitted to a transmission partner for indicating the device supports the repeating for realizing communication between a communication device and an access point that is not dependent on a communication device is expressed as b1.

When the device is a device that supports the repeating for realizing communication between a communication device and an access point that is not dependent on a communication device, b1 is set to 1, and when the device is not such a device, b1 is set to 0.

For example, since repeater function part B202 illustrated in FIG. 160 includes a repeating function dedicated to a first communication device that is for realizing communication between the first communication device and an access point, that is to say, since repeater function part B202 illustrated in FIG. 160 supports such repeating, b0 is set to 1. On the other hand, since repeater function part B202 does not include a repeating function for realizing communication between a communication device and an access point that is not dependent on a communication device, that is to say, since repeater function part B202 does not support such repeating, b1 is set to 0 (zero).

Accordingly, repeater function part B202 transmits a modulated signal including a frame such as that in FIG. 161, for example, that includes the b0 and b1 capability information set as described above. The b0 and b1 capability information may be transmitted in control information symbol 16102, and may be transmitted in data symbol 16103.

Since repeater device 16001 illustrated in FIG. 160 includes a repeating function for realizing communication between a communication device and an access point that is not dependent on a communication device, that is to say, since repeater device 16001 illustrated in FIG. 160 supports such repeating, b1 is set to 1. On the other hand, since repeater device 16001 does not include a repeating function dedicated to a first communication device that is for realizing communication between the first communication device and an access point, that is to say, since repeater device 16001 does not support such repeating, b0 is set to 0 (zero).

Accordingly, repeater device 16001 transmits a modulated signal including a frame such as that in FIG. 161, for example, that includes the b0 and b1 capability information set as described above. The b0 and b1 capability information may be transmitted in control information symbol 16102, and may be transmitted in data symbol 16103.

This makes it possible to achieve the advantageous effect that communication via a repeater can be performed more accurately.

Embodiment 27

Embodiment 20 states "the present embodiment describes an example in which the mobile device includes a main body part and a single repeater function part, but the mobile device is not limited to this example. The mobile device may include one or more main body parts and one or more repeater function parts. In such cases, the one or more main body parts and the one or more repeater function parts temporarily function as a single object to form the mobile device. The mobile device moves to separate the repeater function part and the main body part, and, for example, each main body part communicates with the access point via the one or more repeater function parts." A variation of this will be described in the present embodiment.

Similar to Embodiment 20, first, assume the state illustrated in FIG. 123. Note that as FIG. 123 has already been described in Embodiment 20, repeated description thereof will be omitted. Mobile device B102 illustrated in FIG. 123 includes repeater function part B202, communication device 16301, and main body part B201 illustrated in FIG. 162 and FIG. 163.

Assume the state illustrated in FIG. 123 shifts to the state illustrated in FIG. 162. Mobile device B102 moves as shown in FIG. 123, and thereafter, as shown in FIG. 162, detaches from repeater function part B202. Main body part B201 and communication device 16301 are connected, and main body part B102 and communication device 16301 move in the direction indicated by B401 (note that main body part B201 and communication device 16301 need not be connected; another detailed example will be given later).

For example, communication device 16301 separates from main body part B201, and is placed. Next, the state illustrated in FIG. 162 shifts to the state illustrated in FIG. 163.

Main body part B201 detaches from communication device 16301, and moves in the direction indicated by arrow B401, for example. Main body part B201 then communicates with repeater function part B202 and communication device 16301. Here, main body part B201 performs triangulation using a modulated signal transmitted by communication device 16301 and a modulated signal transmitted by repeater function part B202. Main body part B201 communicates with access point B101 via repeater function part B202. This achieves the advantageous effect that main body part B201 can obtain data from access point B101 and position estimation can be performed. Here, communication device 16301 communicates with one or more of access point B101 and repeater function part B202.

As described in Embodiment 20, when main body part B201 is inside communication boundary B103, communication performed by main body part B201 is performed via communication device 16301 and/or repeater function part B202 (main body part B201 is connected to communication device 16301 and/or repeater function part B202).

Next, another variation will be described.

Similar to Embodiment 20, first, assume the state illustrated in FIG. 123. Note that as FIG. 123 has already been described in Embodiment 20, repeated description thereof will be omitted. Mobile device B102 illustrated in FIG. 123 includes repeater function part B202, communication device 16301, and main body part B201 illustrated in FIG. 162 and FIG. 163.

Assume the state illustrated in FIG. 123 shifts to the state illustrated in FIG. 164. Mobile device B102 moves as shown in FIG. 123, and as shown in FIG. 164, repeater function part B202 separates into communication device 16301 and main body part B201. Communication device 16301 then moves in the direction indicated by arrow 16501, and main body part B201 moves in the direction indicated by arrow B401. Next, communication device 16301 is placed.

Main body part B201 performs triangulation using a modulated signal transmitted by communication device 16301 and a modulated signal transmitted by repeater function part B202. Main body part B201 communicates with access point B101 via repeater function part B202. This achieves the advantageous effect that main body part B201 can obtain data from access point B101 and position estimation can be performed. Here, communication device 16301 communicates with one or more of access point B101 and repeater function part B202.

As described in Embodiment 20, when main body part B201 is inside communication boundary B103, communication performed by main body part B201 is performed via communication device 16301 and/or repeater function part B202 (main body part B201 is connected to communication device 16301 and/or repeater function part B202). Here, both main body part B201 and communication device 16301 may congregate on the position of repeater function part B202.

Note that in the states illustrated in FIG. 163 and FIG. 164, for example, in order to perform triangulation, communication device 16301 and repeater function part B202 may include a timer function for estimating time. As another method, access point B101 may communicate with communication device 16301 and repeater function part B202, whereby communication device 16301 and repeater function part B202 obtain time information.

Supplementary Note 8

In the present specification, the terminology "server", "control server", and "forwarding destination data server" is used, but each of these may be referred to as a personal computer, a computer, an electronics device, a tablet, a cloud server, a smartphone, a mobile phone, a device, an apparatus, or a communication device.

In the present specification, the terminology "repeater device", is used, but the repeater device may be referred to as an access point, a mesh point, a base station, a personal computer, a computer, an electronics device, a tablet, a cloud server, a smartphone, a mobile phone, a device, an apparatus, or a communication device.

In the present specification, the terminology "(control) terminal", is used, but this may be referred to as an access point, a mesh point, a base station, a personal computer, a computer, an electronics device, a tablet, a cloud server, a smartphone, a mobile phone, a device, an apparatus, a communication device, or a server.

In the present specification, the terminology "forwarding source device", is used, but the forwarding source device may be referred to as an access point, a mesh point, a base station, a personal computer, a computer, an electronics device, a tablet, a cloud server, a smartphone, a mobile phone, a device, an apparatus, a communication device, or a server.

In the present specification, the terminology "forwarding destination device", is used, but the forwarding destination device may be referred to as an access point, a mesh point, a base station, a personal computer, a computer, an electronics device, a tablet, a cloud server, a smartphone, a mobile phone, a device, an apparatus, a communication device, or a server.

In the present specification, the terminology "communication device", is used, but the communication device may be referred to as an access point, a mesh point, a base station, a personal computer, a computer, an electronics device, a tablet, a cloud server, a smartphone, a mobile phone, a device, an apparatus, a communication device, or a server.

In the present specification, the transmitting method of the first communication scheme and the transmitting method of the second communication scheme may be different (the transmitting method of the first communication scheme and the transmitting method of the second communication scheme may be the same).

It is possible for the present disclosure to facilitate, for example, improvement in the performance of a communication system and the provision of new services.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable in communication systems.

What is claimed is:

1. A repeater device, comprising:

a moving mechanism configured to move the repeater device;

a communication device configured to communicate with an external device by switching between a first communication scheme and a second communication scheme, the second communication scheme having a narrower communication range and a greater per-unit-time data forwarding capacity than the first communication scheme;

a storage device for storing data; and an encoding device configured to encode video data, wherein the communication device is configured to receive, using the first communication scheme, position information of a forwarding source device and position information of a forwarding destination device, based on the position information of the forwarding source device received by the communication device, the moving mechanism is configured to move the repeater device to a position at which the repeater device is capable of communicating with the forwarding source device using the second communication scheme, the communication device is configured to receive, using the second communication scheme, first video data transmitted from the forwarding source device, the encoding device is configured to generate second video data by encoding the first video data using a video encoding method different than a video encoding method of the first video data, the storage device is configured to store the second video data, based on the position information of the forwarding destination device received by the communication device, the moving mechanism is configured to move the repeater device to a position at which the repeater device is capable of communicating with the forwarding destination device using the second communication scheme, the storage device is configured to continue storing the second video data while the repeater device moves to the position at which the repeater device is capable of communicating with the forwarding destination device using the second communication scheme, the communication device is configured to transmit, using the second communication scheme, the second video data stored in the storage device, to the forwarding destination device, and the repeater device is selected by the forwarding source device based on information indicating a path of movement of the repeater device, information indicating a path of movement of another repeater device, and the position information of the forwarding destination device.

2. A repeating method performed by a repeater device, the repeating method comprising:

receiving, using a first communication scheme, position information of a forwarding source device and position information of a forwarding destination device;

based on the position information of the forwarding source device received, moving to a position at which communication with the forwarding source device using a second communication scheme is possible, the second communication scheme having a narrower communication range and a greater per-unit-time data forwarding capacity than the first communication scheme;

receiving, using the second communication scheme, first video data transmitted from the forwarding source device;

generating second video data by encoding the received first video data using a video encoding method different than a video encoding method of the first video data, and storing the generated second video data;

based on the position information of the forwarding destination device received, moving to a position at which communication with the forwarding destination device using the second communication scheme is possible;

continuing storing the second video data while the repeater device moves to the position at which communication with the forwarding destination device using the second communication scheme is possible; and transmitting, using the second communication scheme, the stored second video data, to the forwarding destination device, wherein the repeater device is selected by the forwarding source device based on information indicating a path of movement of the repeater device, information indicating a path of movement of another repeater device, and the position information of the forwarding destination device.

* * * * *